US012657815B2

(12) United States Patent
Huergo Wagner et al.

(10) Patent No.: US 12,657,815 B2
(45) Date of Patent: Jun. 16, 2026

(54) DEVICES, METHODS, AND GRAPHICAL USER INTERFACES FOR PROVIDING COMPUTER-GENERATED EXPERIENCES

(71) Applicant: Apple Inc., Cupertino, CA (US)

(72) Inventors: Alfred B. Huergo Wagner, Redwood City, CA (US); William A. Sorrentino, III, Mill Valley, CA (US); Peter D. Anton, Portola Valley, CA (US); Alan C. Dye, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 194 days.

(21) Appl. No.: 18/370,849

(22) Filed: Sep. 20, 2023

(65) Prior Publication Data

US 2024/0153205 A1     May 9, 2024

Related U.S. Application Data

(60) Provisional application No. 63/470,926, filed on Jun. 4, 2023, provisional application No. 63/409,752, filed on Sep. 24, 2022.

(51) Int. Cl.
*G06T 17/00*     (2006.01)
*G06F 3/04815*     (2022.01)
(Continued)

(52) U.S. Cl.
CPC .......... *G06T 17/00* (2013.01); *G06F 3/04815* (2013.01); *G06T 13/40* (2013.01); *G06V 20/44* (2022.01)

(58) Field of Classification Search
CPC ......... G06T 17/00; G06T 13/40; G06T 13/00; G06F 3/04815; G06F 1/163; G06F 3/011; G06V 20/44; G02B 27/017
See application file for complete search history.

(56) References Cited

U.S. PATENT DOCUMENTS 6,842,175 B1     1/2005 Schmalstieg et al.
8,675,067 B2     3/2014 Chou et al.
(Continued)

FOREIGN PATENT DOCUMENTS

EP          2896986 A1     7/2015
KR      20190053278 A     5/2019
WO      WO 2021188439 A1     9/2021

OTHER PUBLICATIONS

Microsoft, "Holoportation: Virtual 3D Teleportation in Real-Time", https://wwwyoutube.com/watch?v=7d5906cfaM0, Mar. 25, 2016, 14 pages.

(Continued)

*Primary Examiner* — Jitesh Patel
(74) *Attorney, Agent, or Firm* — Morgan, Lewis & Bockius LLP

(57)          ABSTRACT

While a representation of a three-dimensional environment is visible via the first display generation component, a computer system, displays, via a second display generation component, one or more graphical elements that provide a visual indication of a status associated with a user who is in a position to view the representation of the three-dimensional environment, including changing the one or more graphical elements to represent changes in the status associated with the user. In response to detecting a first event that corresponds to the start of media capture using the computer system, the computer system displays, via the second display generation component, a first visual alert that indicates the start of media capture, wherein the first visual alert is displayed concurrently with at least a portion of the one or more graphical elements.

39 Claims, 75 Drawing Sheets

(51) Int. Cl.
     *G06T 13/40*     (2011.01)
     *G06V 20/40*     (2022.01)

(56)                    References Cited

U.S. PATENT DOCUMENTS

| | | | |
|---|---|---|---|
| 8,896,655 | B2 | 11/2014 | Mauchly et al. |
| 9,256,072 | B2 | 2/2016 | Lyren |
| 9,325,943 | B2 | 4/2016 | Wilson et al. |
| 9,615,081 | B2 | 4/2017 | Torma |
| 9,641,805 | B2 | 5/2017 | Wilson et al. |
| 9,883,138 | B2 | 1/2018 | Chen et al. |
| 10,044,982 | B2 | 8/2018 | Wilson et al. |
| 10,048,856 | B2 | 8/2018 | Veranjes et al. |
| 10,168,778 | B2 | 1/2019 | Kazansky et al. |
| 10,430,985 | B2 | 10/2019 | Harrises et al. |
| 10,492,981 | B1 | 12/2019 | Kumar |
| 10,692,290 | B2 | 6/2020 | Estable |
| 10,719,105 | B2 | 7/2020 | Seo et al. |
| 10,838,210 | B2 | 11/2020 | Robaina et al. |
| 10,957,083 | B2 | 3/2021 | Du |
| 11,244,485 | B2 | 2/2022 | Harrises et al. |
| 11,257,467 | B2 | 2/2022 | Kim et al. |
| 11,520,456 | B2 | 12/2022 | Kawashima et al. |
| 11,562,528 | B2 | 1/2023 | Rockel et al. |
| 11,733,769 | B2 | 8/2023 | Butcher et al. |
| 11,861,255 | B1 | 1/2024 | Ive et al. |
| 11,995,285 | B2 | 5/2024 | Henderson et al. |
| 2004/0075735 | A1 | 4/2004 | Marmaropoulos |
| 2005/0140696 | A1 | 6/2005 | Buxton |
| 2009/0174658 | A1 | 7/2009 | Blatchley et al. |
| 2011/0185057 | A1 | 7/2011 | Waugaman et al. |
| 2011/0317399 | A1 | 12/2011 | Hsu |
| 2012/0050458 | A1 | 3/2012 | Mauchly et al. |
| 2012/0281059 | A1 | 11/2012 | Chou et al. |
| 2013/0154906 | A1 | 6/2013 | Braun et al. |
| 2014/0232816 | A1 | 8/2014 | Wilson et al. |
| 2015/0091780 | A1 | 4/2015 | Lyren |
| 2015/0102995 | A1 | 4/2015 | Shen et al. |
| 2015/0116463 | A1 | 4/2015 | Torma |
| 2015/0234508 | A1 | 8/2015 | Cho et al. |
| 2015/0244976 | A1 | 8/2015 | Chen et al. |
| 2015/0253573 | A1 | 9/2015 | Sako et al. |
| 2016/0018655 | A1 | 1/2016 | Imoto et al. |
| 2016/0054565 | A1 | 2/2016 | Izumihara et al. |
| 2016/0202758 | A1 | 7/2016 | Peana et al. |
| 2016/0205353 | A1 | 7/2016 | Wilson et al. |
| 2016/0210602 | A1 | 7/2016 | Siddique et al. |
| 2016/0300325 | A1 | 10/2016 | Ikegami |
| 2016/0313790 | A1 | 10/2016 | Clement et al. |
| 2016/0350136 | A1 | 12/2016 | Karlo et al. |
| 2016/0354686 | A1 * | 12/2016 | Fukuda ................. A63F 13/497 |
| 2017/0031434 | A1 | 2/2017 | Files et al. |
| 2017/0053456 | A1 | 2/2017 | Cho et al. |
| 2017/0201722 | A1 | 7/2017 | Wilson et al. |
| 2017/0206691 | A1 | 7/2017 | Harrises et al. |
| 2017/0264851 | A1 | 9/2017 | Kuplevakhsky |
| 2017/0326457 | A1 | 11/2017 | Tilton et al. |
| 2017/0329399 | A1 | 11/2017 | Azam et al. |
| 2017/0339372 | A1 | 11/2017 | Valli |
| 2018/0004478 | A1 | 1/2018 | Chen |
| 2018/0005429 | A1 | 1/2018 | Osman et al. |
| 2018/0075659 | A1 | 3/2018 | Browy et al. |
| 2018/0095636 | A1 | 4/2018 | Valdivia et al. |
| 2018/0157333 | A1 | 6/2018 | Ross et al. |
| 2018/0165854 | A1 | 6/2018 | Du |
| 2018/0330535 | A1 | 11/2018 | Hawthorne et al. |
| 2018/0335929 | A1 | 11/2018 | Scapel et al. |
| 2019/0011703 | A1 | 1/2019 | Robaina et al. |
| 2019/0066381 | A1 | 2/2019 | Estable |
| 2019/0188895 | A1 | 6/2019 | Miller, IV et al. |
| 2019/0279407 | A1 | 9/2019 | McHugh et al. |
| 2019/0310757 | A1 | 10/2019 | Lee et al. |
| 2019/0313059 | A1 | 10/2019 | Agarawala et al. |
| 2019/0347817 | A1 | 11/2019 | Ferrantelli et al. |
| 2019/0371028 | A1 | 12/2019 | Harrises et al. |
| 2019/0385368 | A1 | 12/2019 | Carwright et al. |
| 2019/0385372 | A1 | 12/2019 | Carwright et al. |
| 2020/0026922 | A1 | 1/2020 | Pekelny et al. |
| 2020/0078103 | A1 | 3/2020 | Duindam et al. |
| 2020/0106955 | A1 | 4/2020 | Fleizach et al. |
| 2020/0117336 | A1 | 4/2020 | Mani et al. |
| 2020/0209609 | A1 | 7/2020 | Clarke et al. |
| 2020/0225734 | A1 | 7/2020 | Magnussen et al. |
| 2020/0358963 | A1 * | 11/2020 | Manzari .............. H04N 23/633 |
| 2020/0372878 | A1 | 11/2020 | Kim et al. |
| 2021/0034222 | A1 | 2/2021 | Brems et al. |
| 2021/0049817 | A1 | 2/2021 | Lee et al. |
| 2021/0286502 | A1 * | 9/2021 | Lemay .................. G06T 19/006 |
| 2021/0327156 | A1 | 10/2021 | Bramwell et al. |
| 2021/0382544 | A1 | 12/2021 | Butcher et al. |
| 2022/0078339 | A1 | 3/2022 | Yang |
| 2022/0101593 | A1 | 3/2022 | Rockel et al. |
| 2022/0155909 | A1 | 5/2022 | Kawashima et al. |
| 2022/0201273 | A1 | 6/2022 | Matsuda et al. |
| 2023/0008537 | A1 | 1/2023 | Henderson et al. |
| 2024/0103608 | A1 | 3/2024 | Wagner et al. |
| 2024/0103615 | A1 | 3/2024 | Wagner et al. |
| 2024/0153205 | A1 | 5/2024 | Huergo Wagner et al. |
| 2025/0238114 | A1 | 7/2025 | Sorrentino, II et al. |

OTHER PUBLICATIONS

Invitation to Pay Additional Fees, dated Jan. 3, 2024, received in International Patent Application No. PCT/US2023/033529, which corresponds with U.S. Appl. No. 18/370,849, 16 pages.

Android Developer, "Determine and Monitor the Docking State and Type", https://developer.android.com/training/monitoring-device-state/docking-monitoring, Oct. 27, 2021, 2 pages.

Jabre Elite 85h, How does on-ear detection work with my Jabra headphones, https://www.jabra.com/supportpages/jabra-elite-85h/100-99030001-02/faq/how-does-on-ear-detection-work-with-my-jabra-headphones, Jul. 15, 2022, 6 pages.

Lang, "Microsoft is Adding Pass-through Video to Windows VR Headsets", https://www.roadtovr.com/microsoft-is-adding-pass-through-video-to-windows-vr-headsets/, Jul. 27, 2018, 2 pages.

Li et al., "Interactive Two-Sided Transparent Displays: Designing for Collaboration", https://www.researchgate.net/publication/266658112, Jun. 2014, 10 pages.

Lindlbauer, "Combing Shape-Changing Interfaces and Spatial Augmented Reality Enables Extended Object Appearance", https//www.youtube.com/watch?v-uyvBJgv3s, May 7, 2016, 12 pages.

Meta Research, "Ray-Ban Stories / Round", https://store.facebook.com/glasses/products/ray-ban-stories/round/, Aug. 1, 2022, 11 pages.

Meta Research, "Display Systems Research: Reverse Passthrough", https://research.facebook.com/blog/2021/08/display-systems research reverse-vr/, Aug. 2, 2021, 11 pages.

Microsoft, "Use Microsoft Modern Wireless Headset in Microsoft Teams", https://support.microsoft.com/en-us/topic/use-microsoft-wireless-headset-in-microwave-teams-5E2ffae3-d2ad-409a-bc81-56d1da8999e, Jul. 15, 2022, 7 pages.

Spectacles by Snap Inc. Products, "Next Generation Spectacles", https://www.spectacles.com/shop, Jul. 15, 2022, 5 pages.

U.S. Appl. No. 17,030,200, "Devices, Methods, and_Graphical_User_Interfaces_for_Interacting_with_Three-Dimensional_Environments", Sep. 23, 2020, 170 pages.

U.S. Appl. No. 17/483,722, "Devices, Methods, and Graphical User Interfaces for Interacting with Three-Dimensional Environments" dated Sep. 23, 2021, 213 pages.

YouTube, "Augmented Reality for Children's Coloring Books", https://www.youtube.com/watch?v=0E8E1vsTa-E, Jun. 13, 2017, 3 pages.

YouTube, "Drum Pants at Augmented World Expo 2013", https://www.youtube.com/watch?v-Y6d_HObOj3w, Jun. 8, 2013, 2 pages.

YouTube, "How to use on-ear detection features with your Jabra Elite 85h", https://www.youtube.com/watch?v=JSX0zynYpyl, Oct. 25, 2019, 3 pages.

YouTube, "HP Reveal Augmented Reality Example", https://www.youtube.com/watch?v=MVluQ0q6jFw, Dec. 28, 2017, 3 pages.

(56) References Cited

OTHER PUBLICATIONS

YouTube, "Snapchat Spectacles 3 Review", httpos://www.youtube.com/watch?v=9P8PmQ4AgXI, Nov. 30, 2019, 5 pages.

YouTube, "Transparent Dual-Touch Display Android Smartphone Prototype #DigInfo", https://www.youtube.com/watch?v=Xbyoool5ZwY, May 30, 2012, 2 pages.

YouTube, "TripicAR: Mobile App Demo", https://youtu.be/pQOND-NX0sU, Aug. 9, 2018, 3 pages.

Office Action, dated Aug. 1, 2022, received in U.S. Appl. No. 17/200,676, 19 pages.

Final Office Action, dated Jan. 4, 2023, received in U.S. Appl. No. 17/200,676, 22 pages.

Office Action, dated Aug. 16, 2023, received in U.S. Appl. No. 17/200,676, 18 pages.

Final Office Action, dated Feb. 26, 2024, received in U.S. Appl. No. 17/200,676, 20 pages.

Office Action, dated May 31, 2024, received in European Patent Application No. 2171929.1, which corresponds with U.S. Appl. No. 17/200,676, 7 pages.

Patent, dated Oct. 2, 2024, received in Japanese Patent Application No. 2022-554242, which corresponds with U.S. Appl. No. 17/200,676, 3 pages.

Office Action, dated Aug. 21, 2024, received in Korean Patent Application No. 2022-7030543, which corresponds with U.S. Appl. No. 17/200,676, 6 pages.

Office Action, dated Sep. 11, 2024, received in U.S. Appl. No. 18/370,851, 43 pages.

Final Office Action, dated Mar. 3, 2025, received in U.S. Appl. No. 18/370,851, 41 pages.

Office Action, dated Aug. 23, 2024, received in U.S. Appl. No. 18/370,853, 25 pages.

International Search Report and Written Opinion, dated Feb. 26, 2024, received in International Patent Application No. PCT/US2023/033529, which corresponds with U.S. Appl. No. 18/370,849, 25 pages.

Notice of Allowance, dated Mar. 18, 2025, received in U.S. Appl. No. 17/200,676, 9 pages.

Patent, dated Oct. 2, 2024, received in Australian Patent Application No. 2021239971, which corresponds with U.S. Appl. No. 17/200,676, 3 pages.

Office Action, dated Apr. 1, 2025, received in Indian Patent Application No. 202217051700, which corresponds with U.S. Appl. No. 17/200,676, 12 pages.

Notice of Allowance, dated Apr. 21, 2025, received in Korean Patent Application No. 2022-7030543, which corresponds with U.S. Appl. No. 17/200,676, 3 pages.

Patent, dated Jul. 21, 2025, received in Korean Patent Application No. 2022-7030543, which corresponds with U.S. Appl. No. 17/200,676, 3 pages.

Final Office Action, dated Apr. 15, 2025, received in U.S. Appl. No. 18/370,853, 21 pages.

Office Action, dated May 13, 2025, received in Australian Patnet Application No. 2024203325, which corresponds with U.S. Appl. No. 19/173,485, 4 pages.

* cited by examiner

Location
B
7000-b

Location
A
7000-a

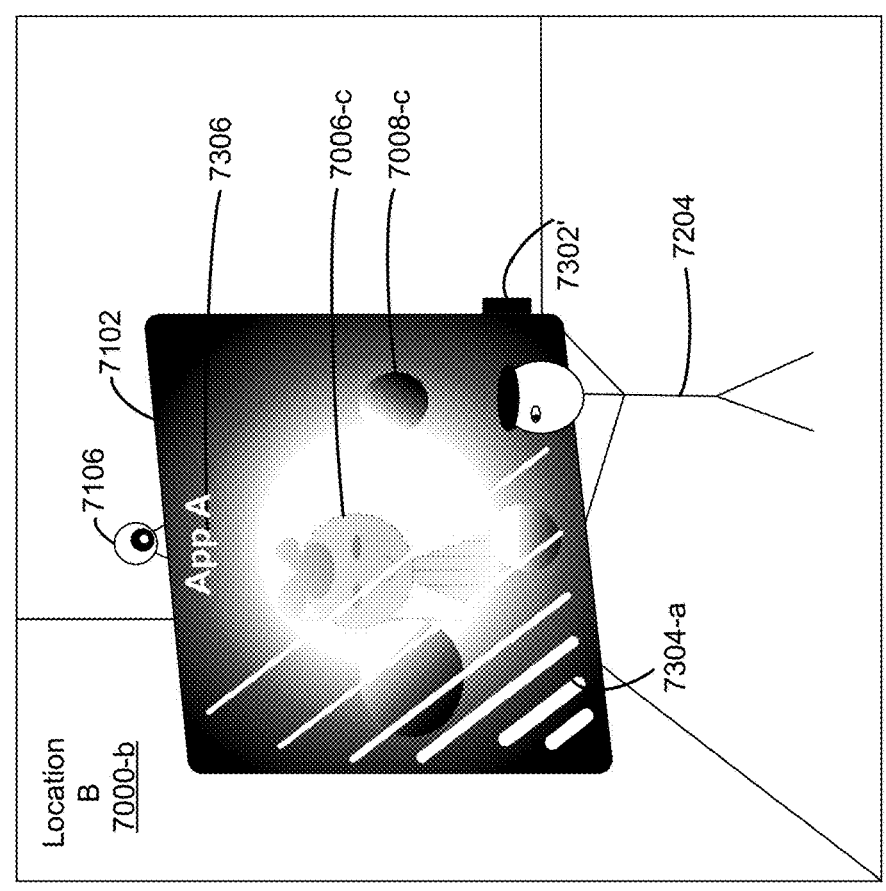
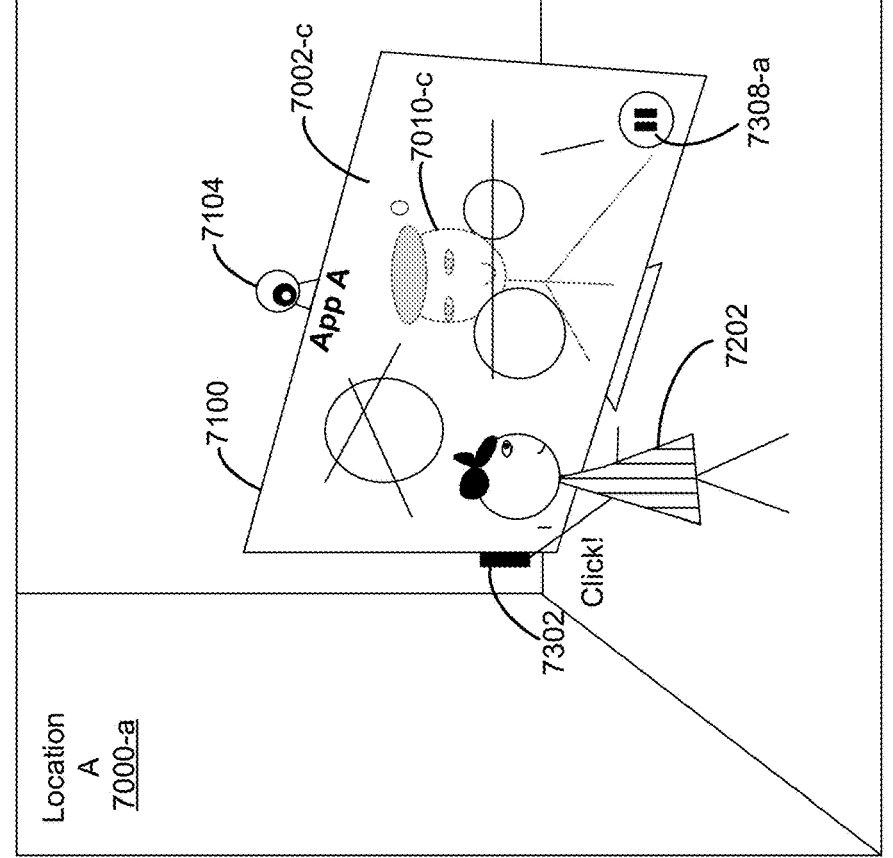
Figure 7G1

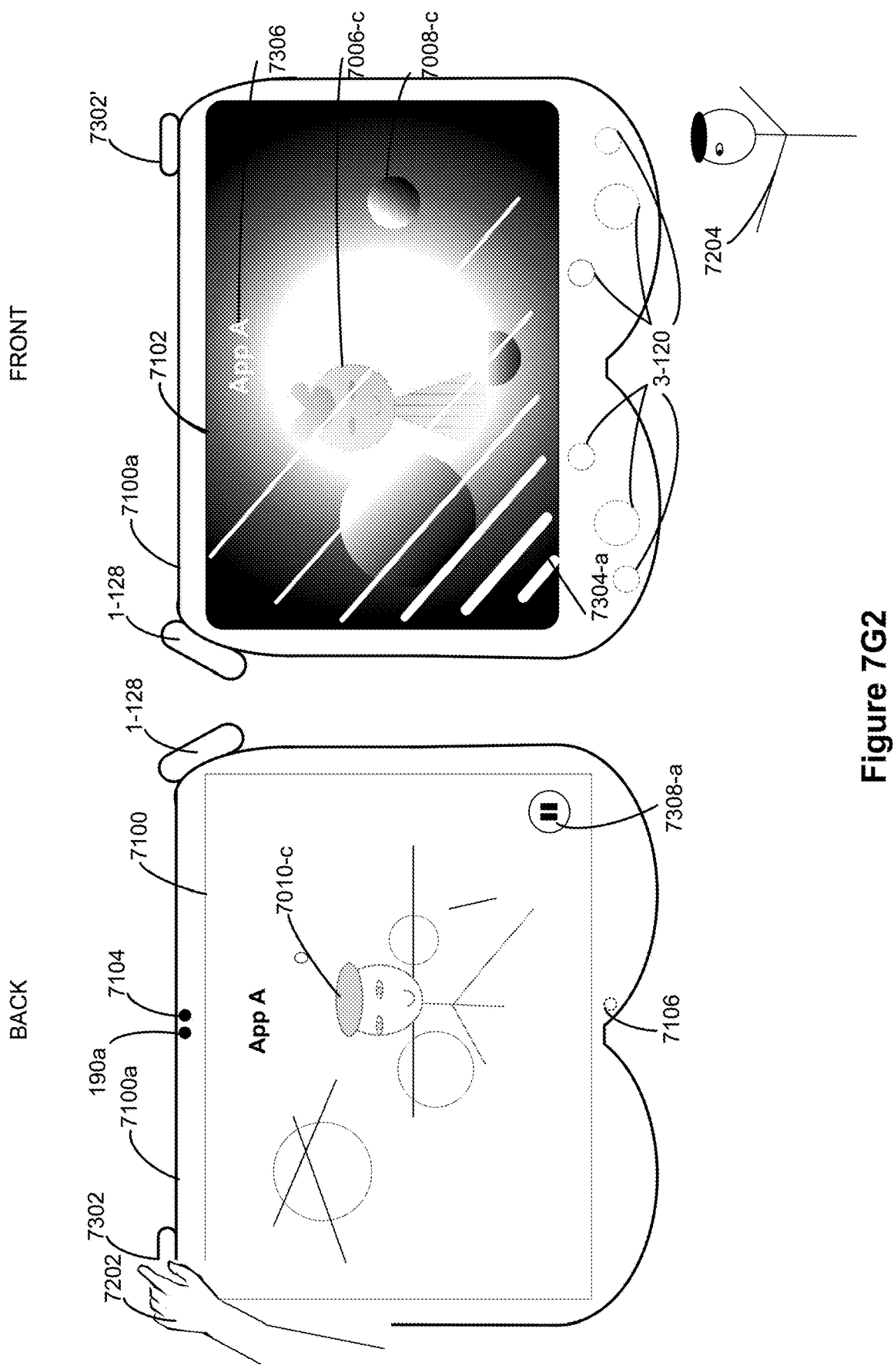
Figure 7G2

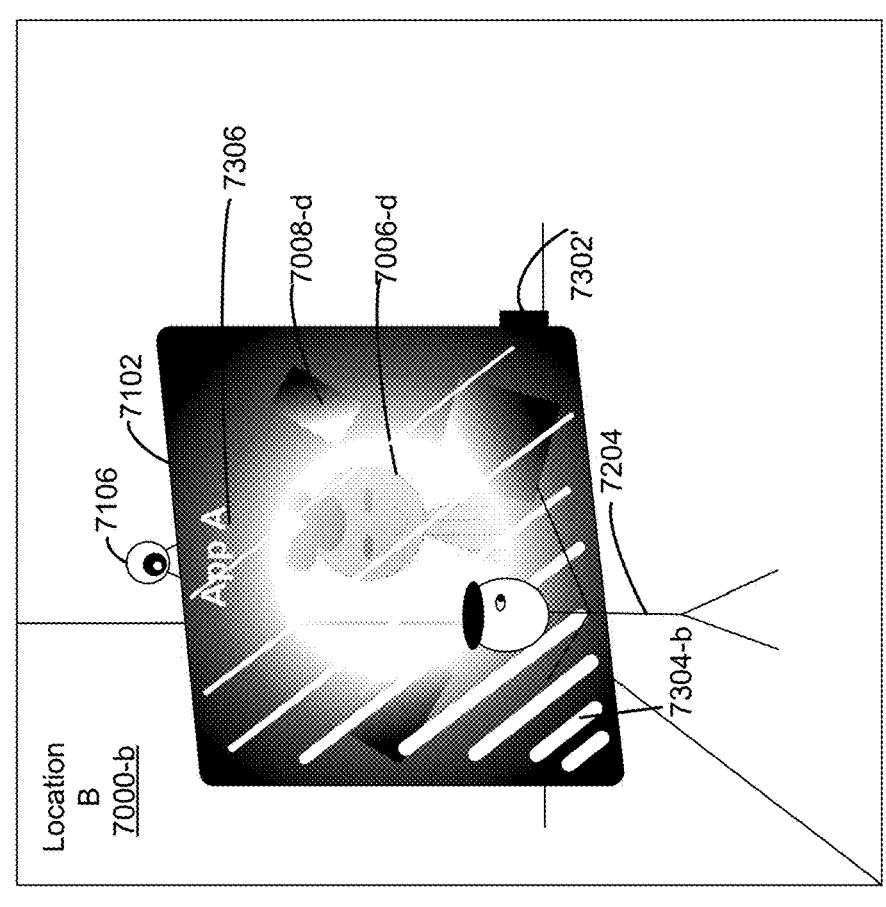
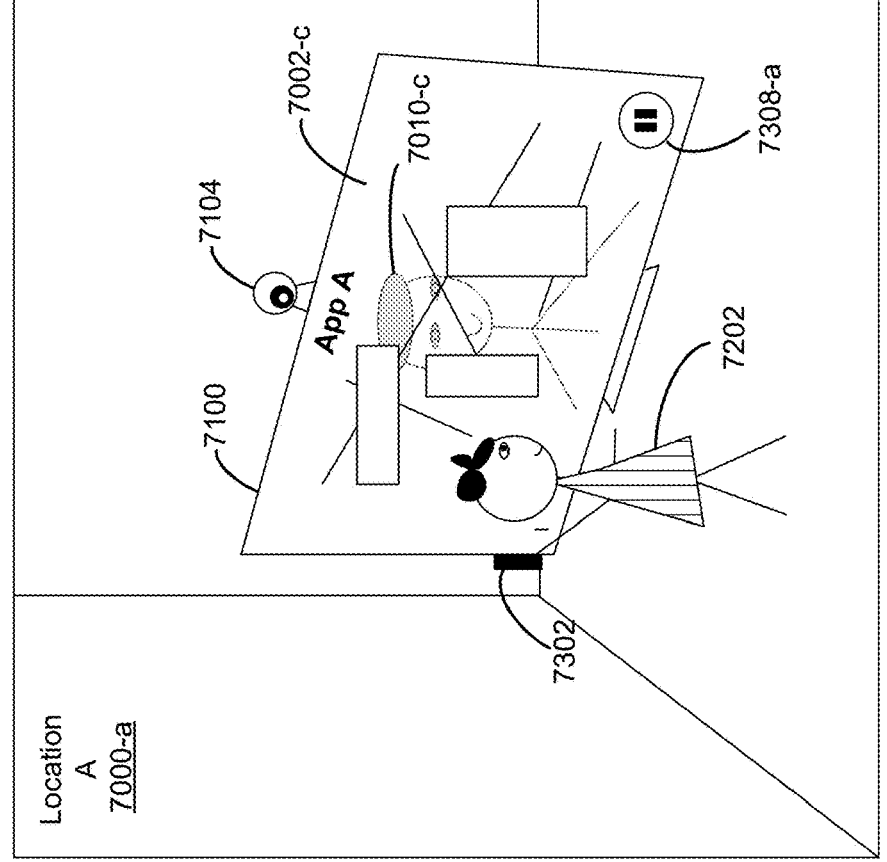
Figure 7H1

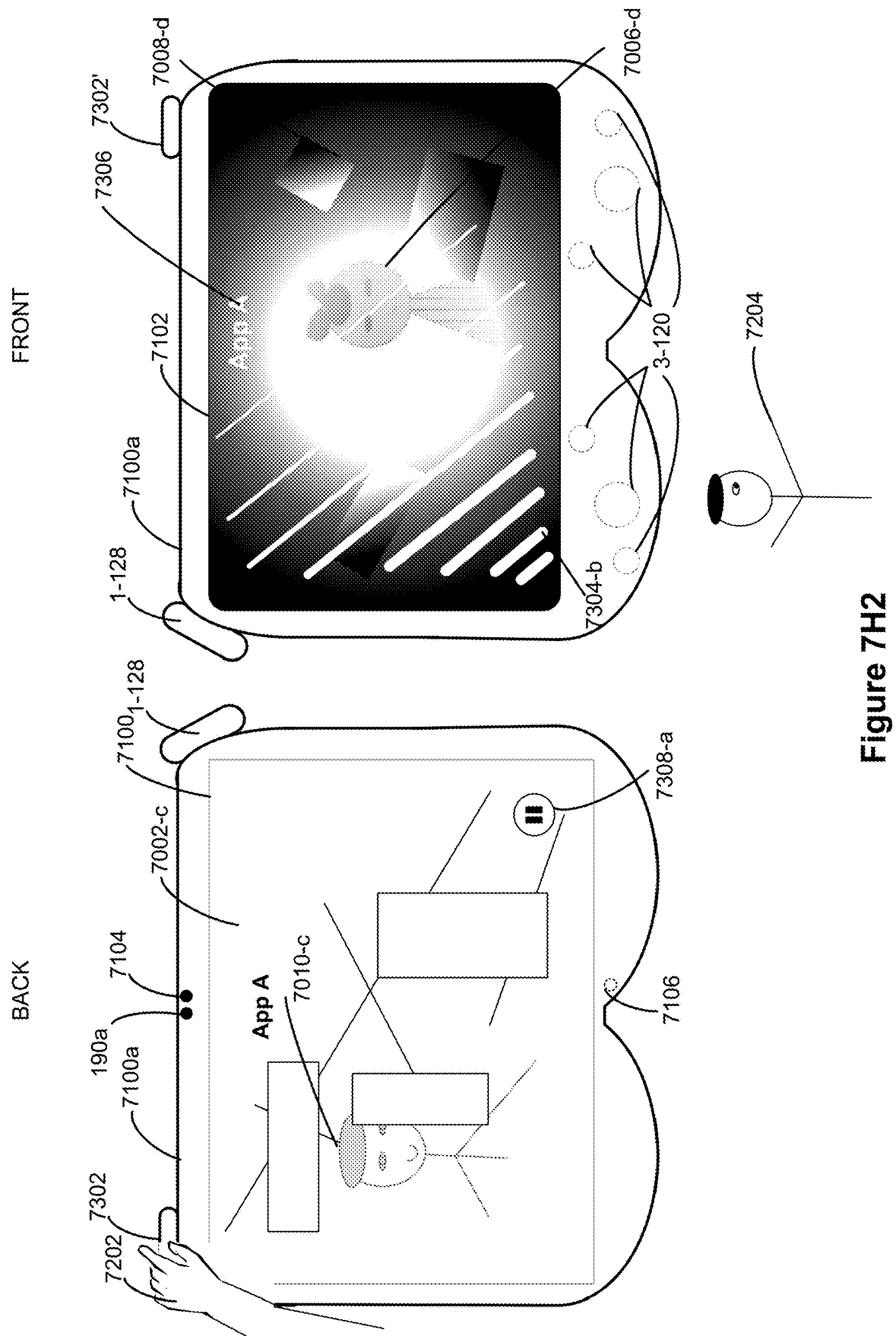
Figure 7H2

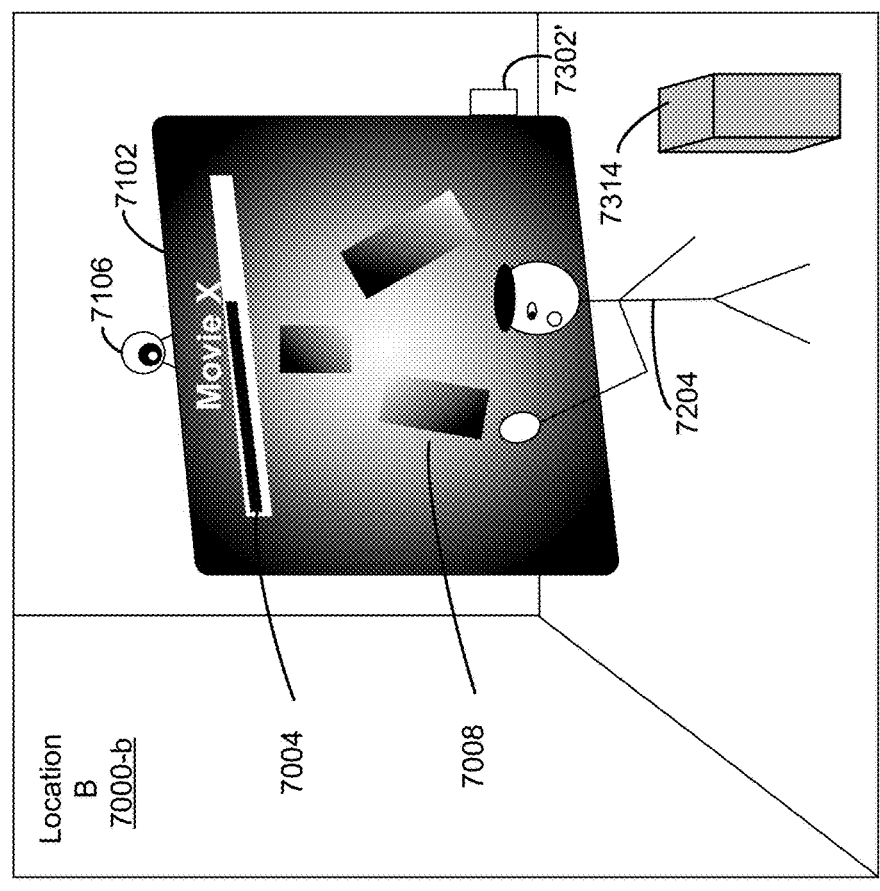
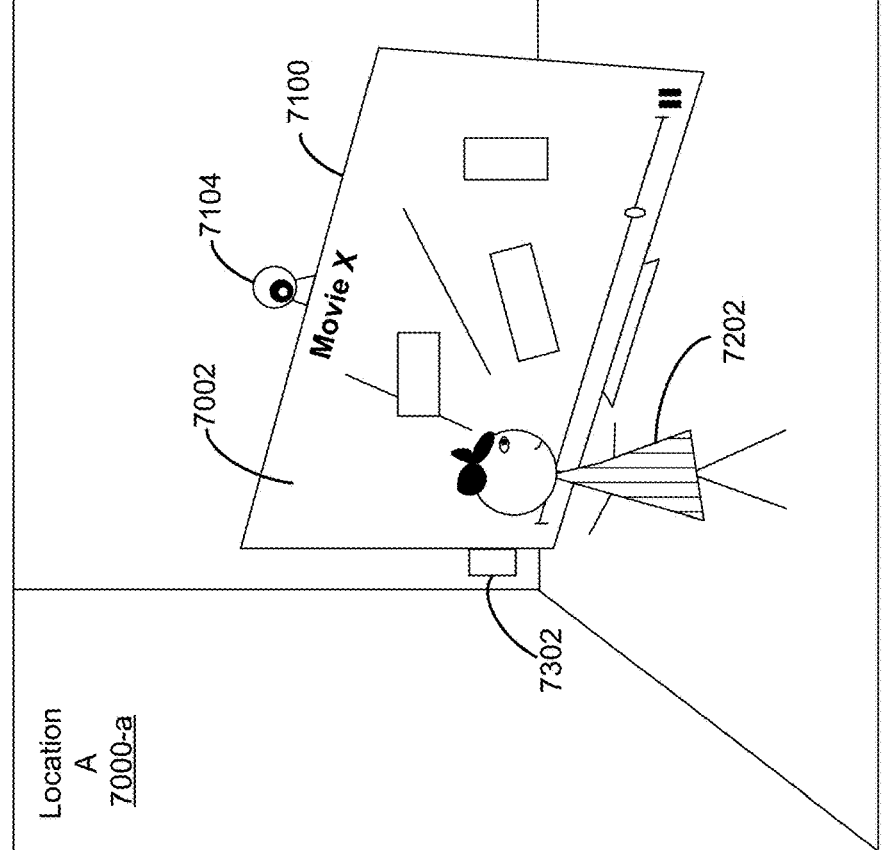
Figure 7L1

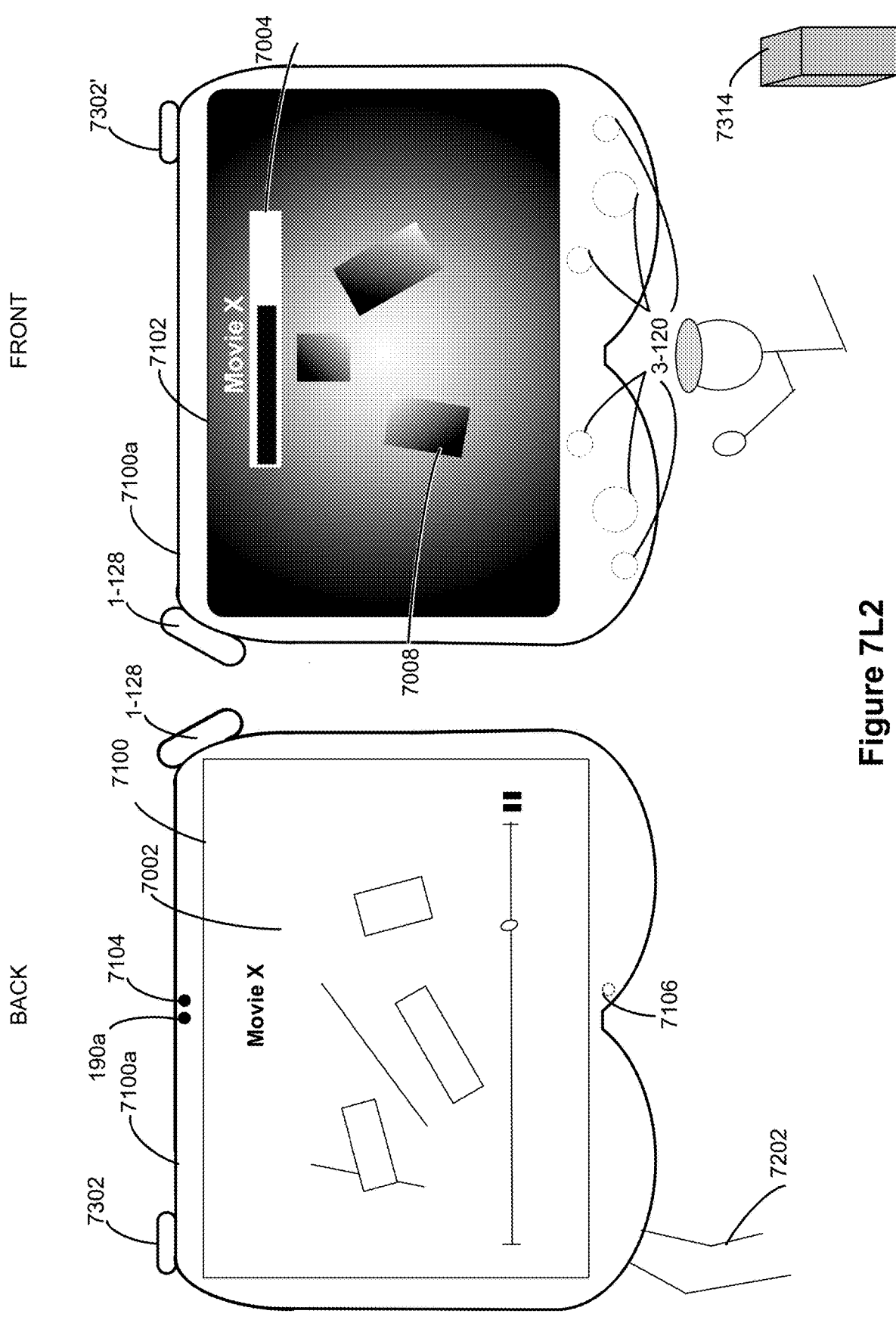
Figure 7L2

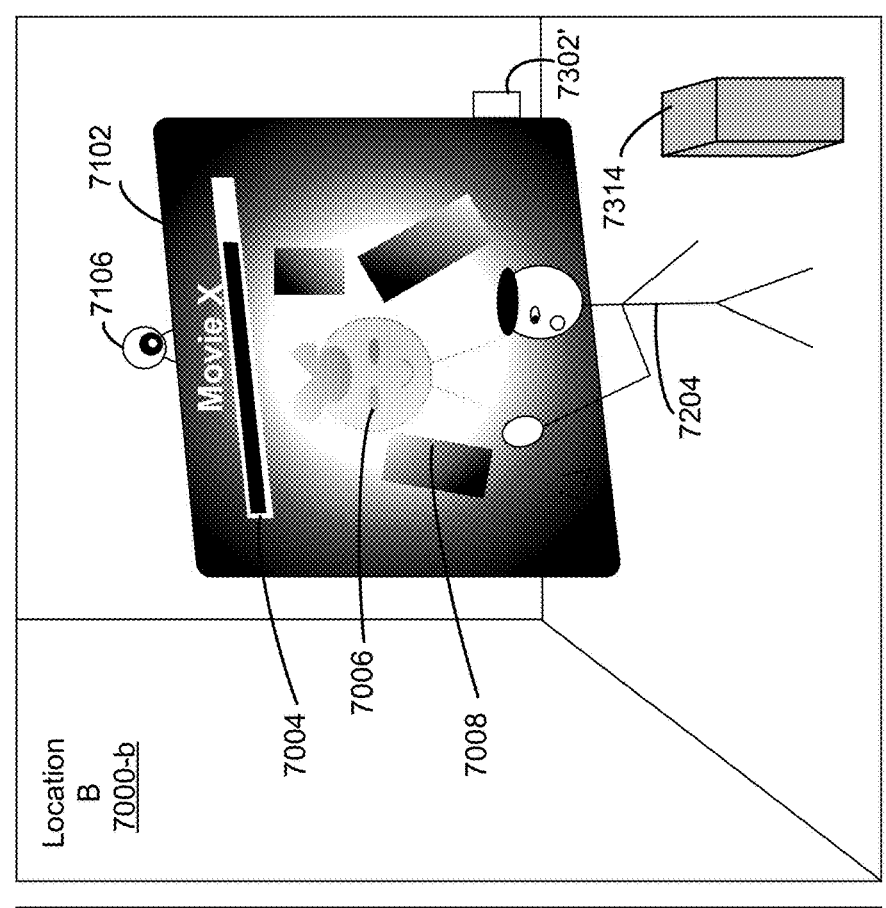
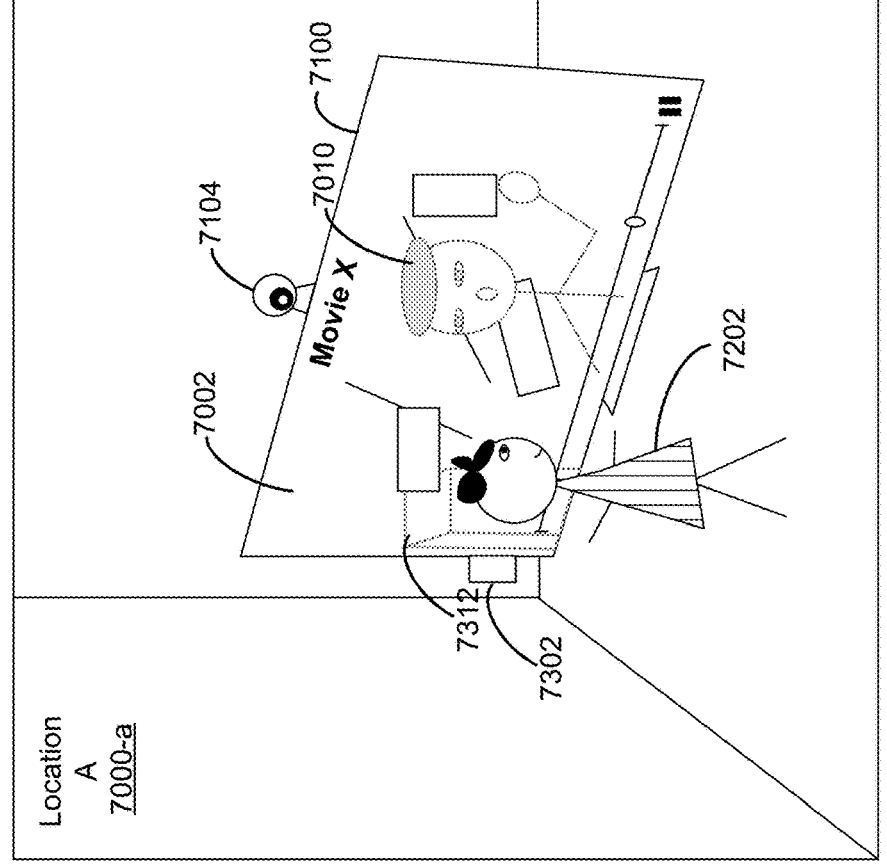
Figure 7M1

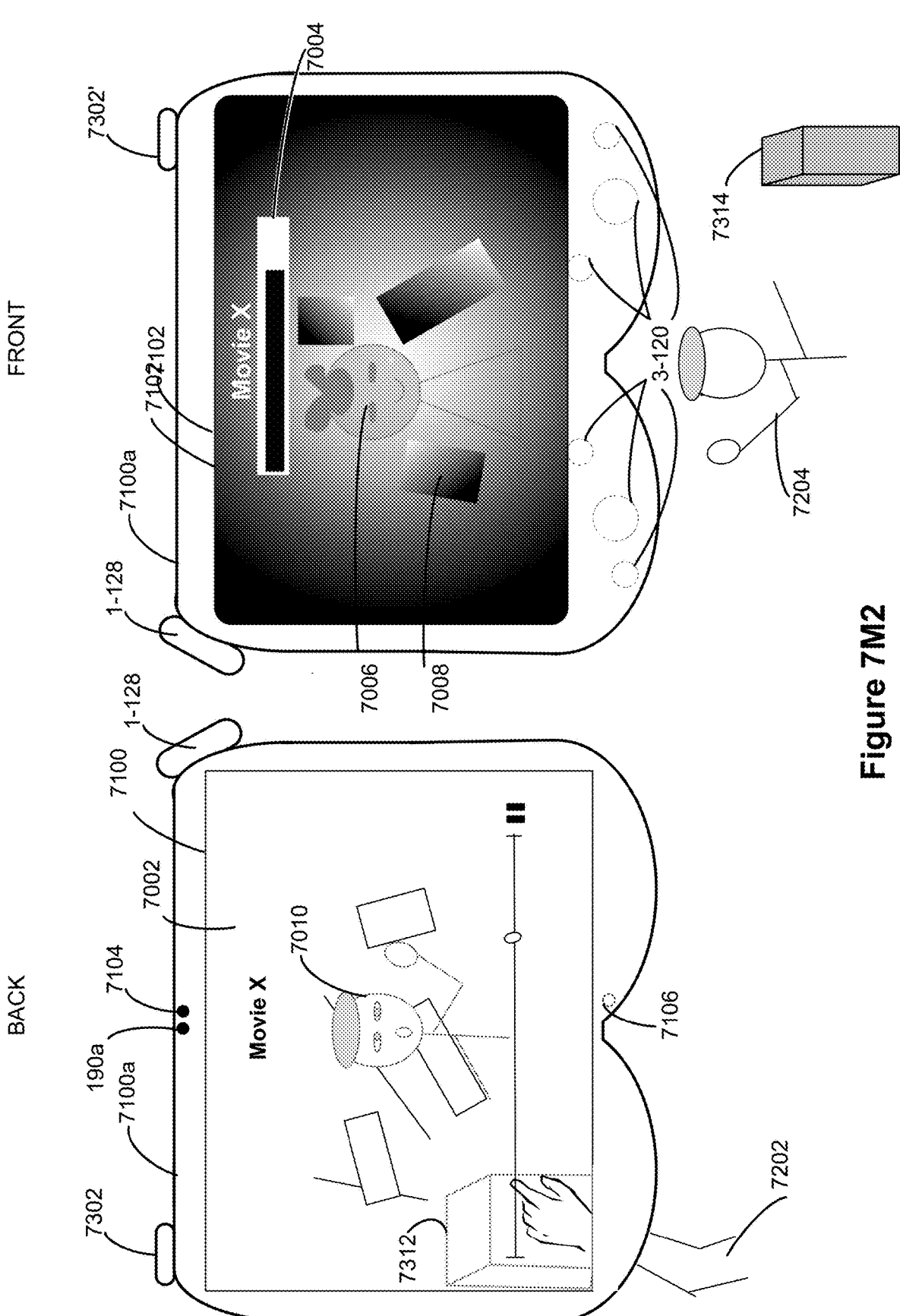
Figure 7M2

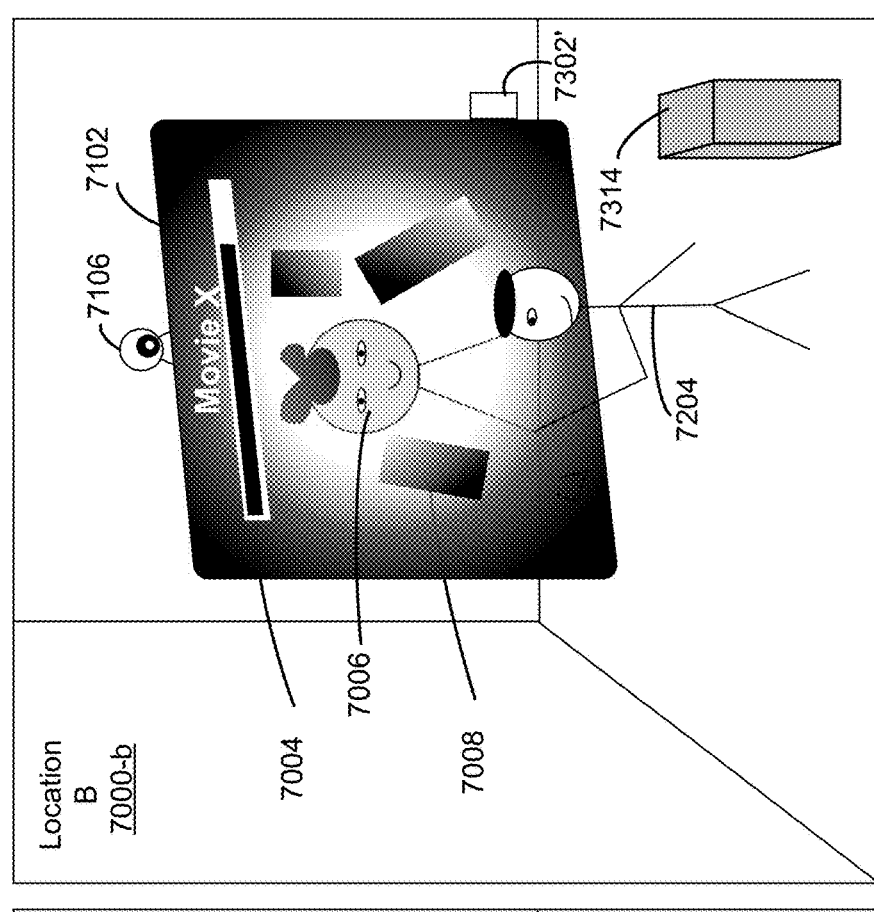
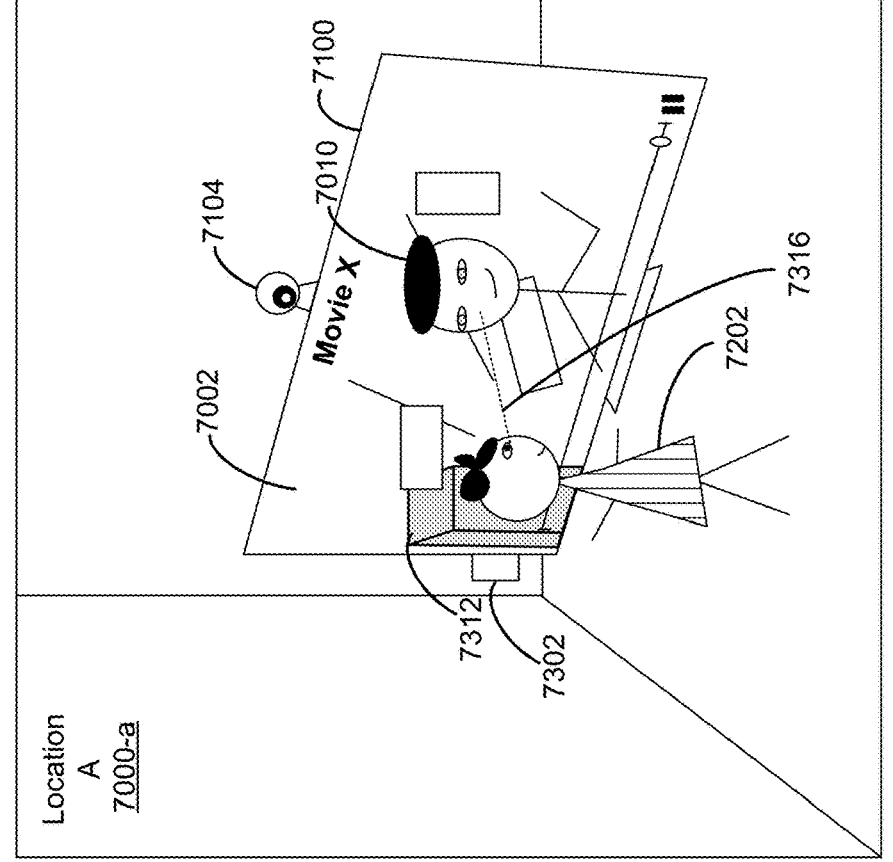
Figure 7N1

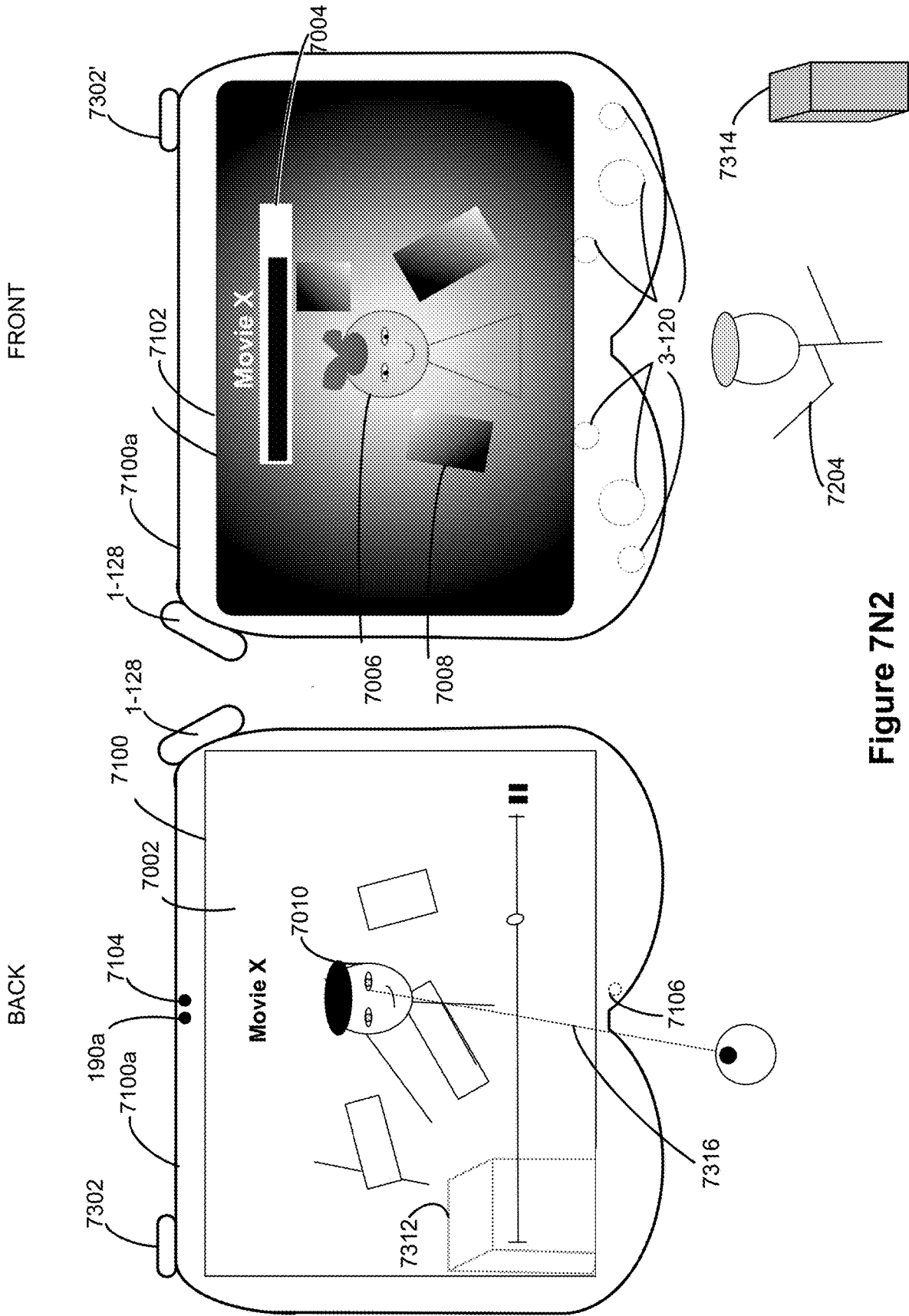
Figure 7N2

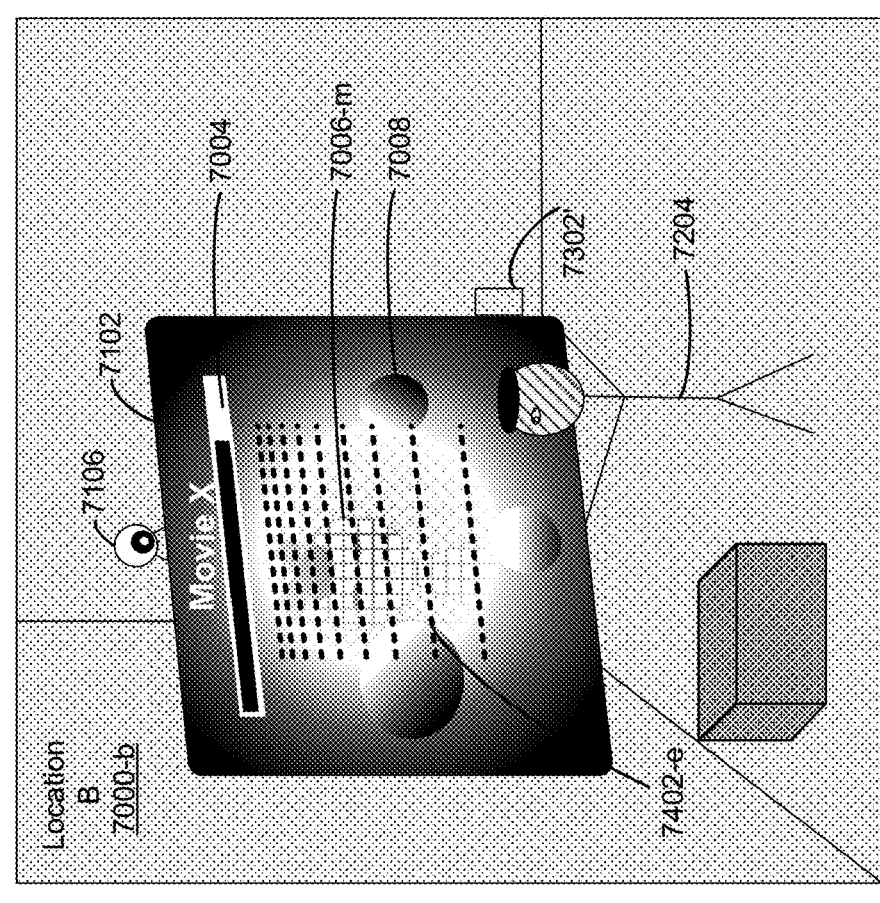
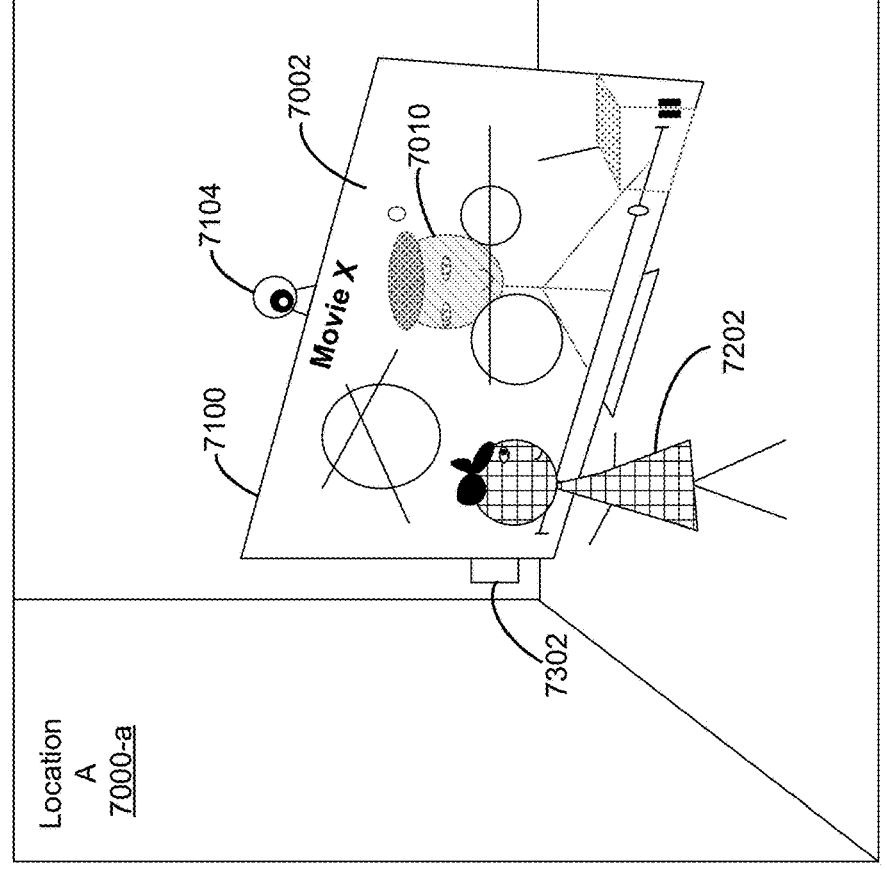
Figure 7AA1

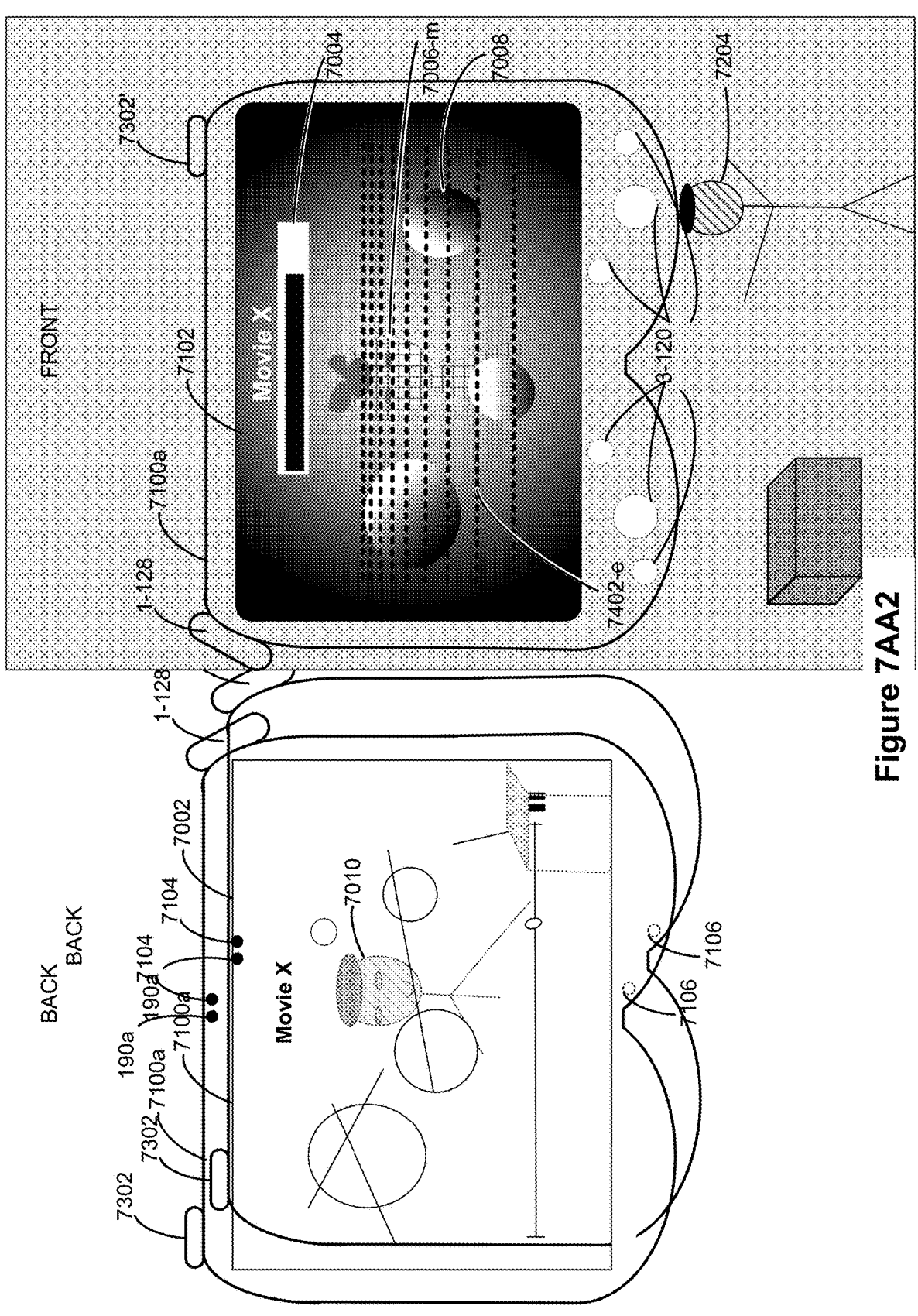
Figure 7AA2

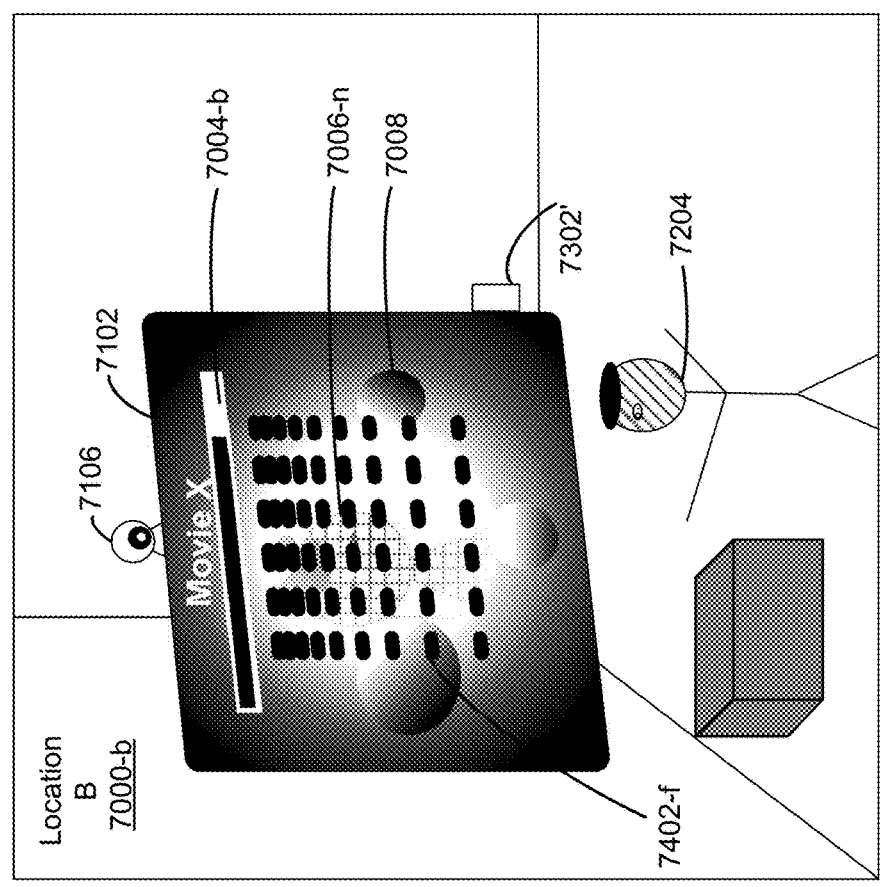
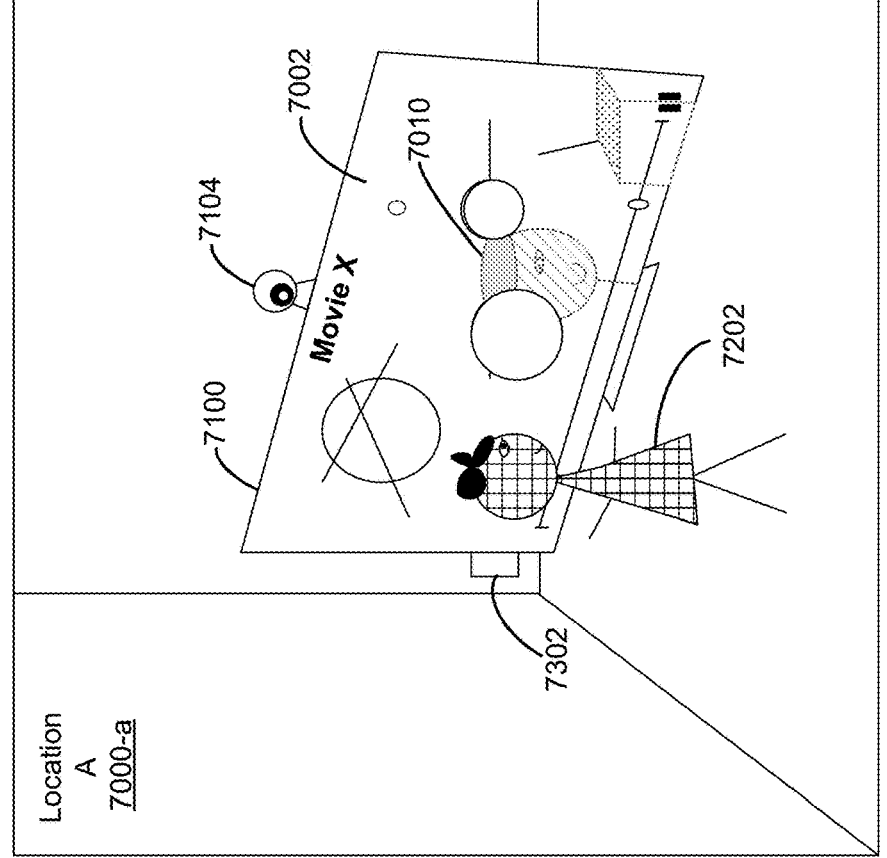
Figure 7AB1

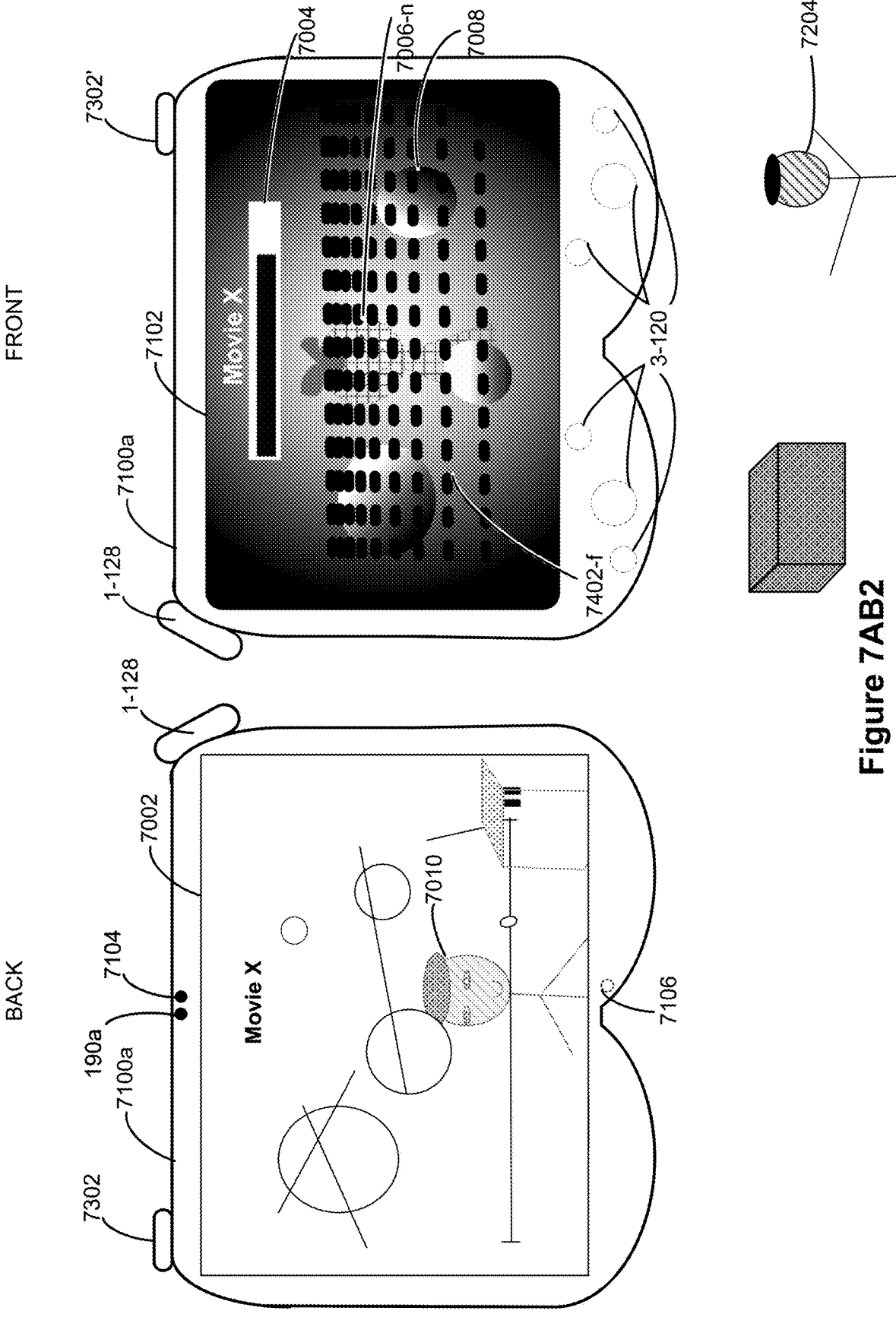
Figure 7AB2

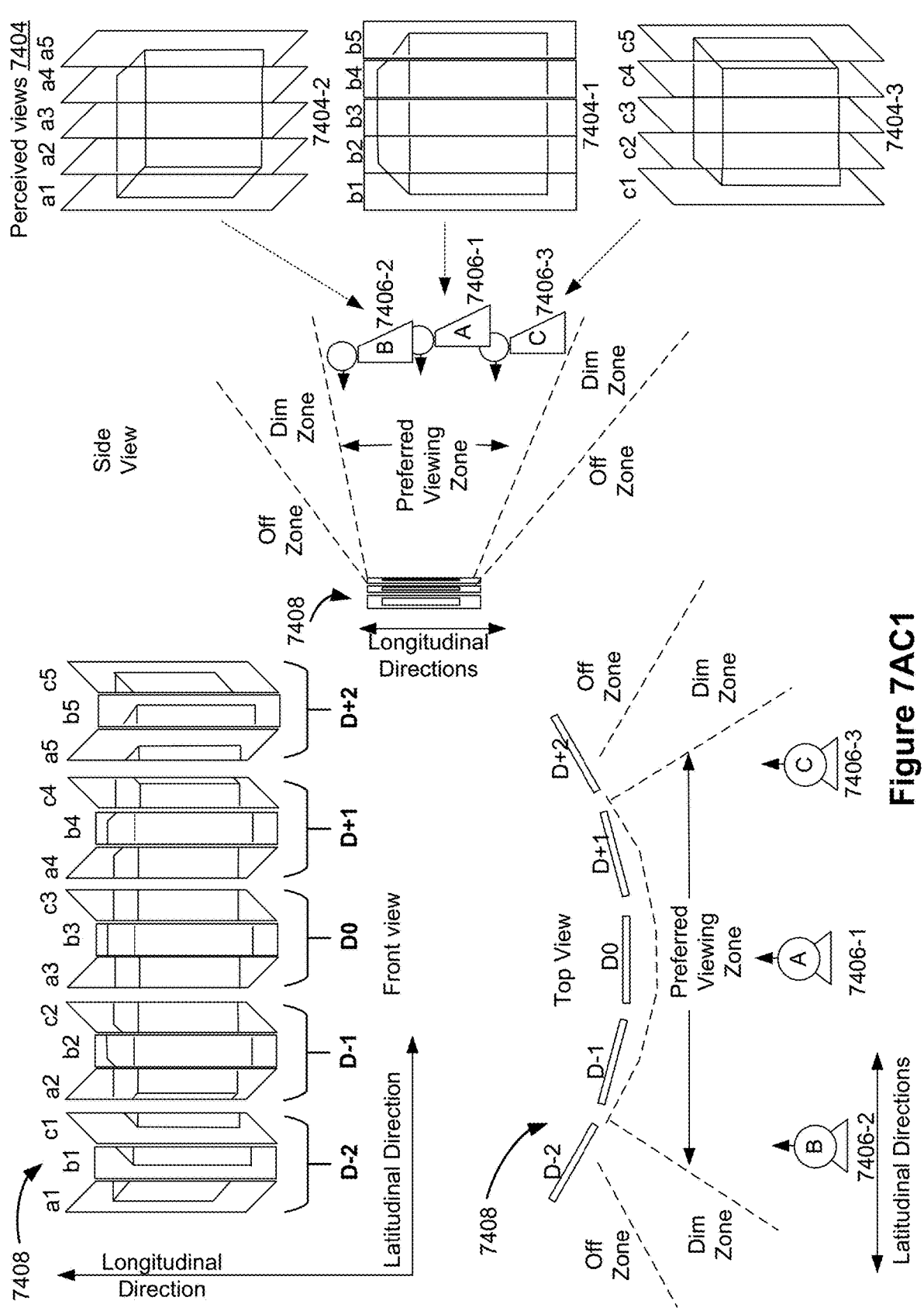
Figure 7AC1

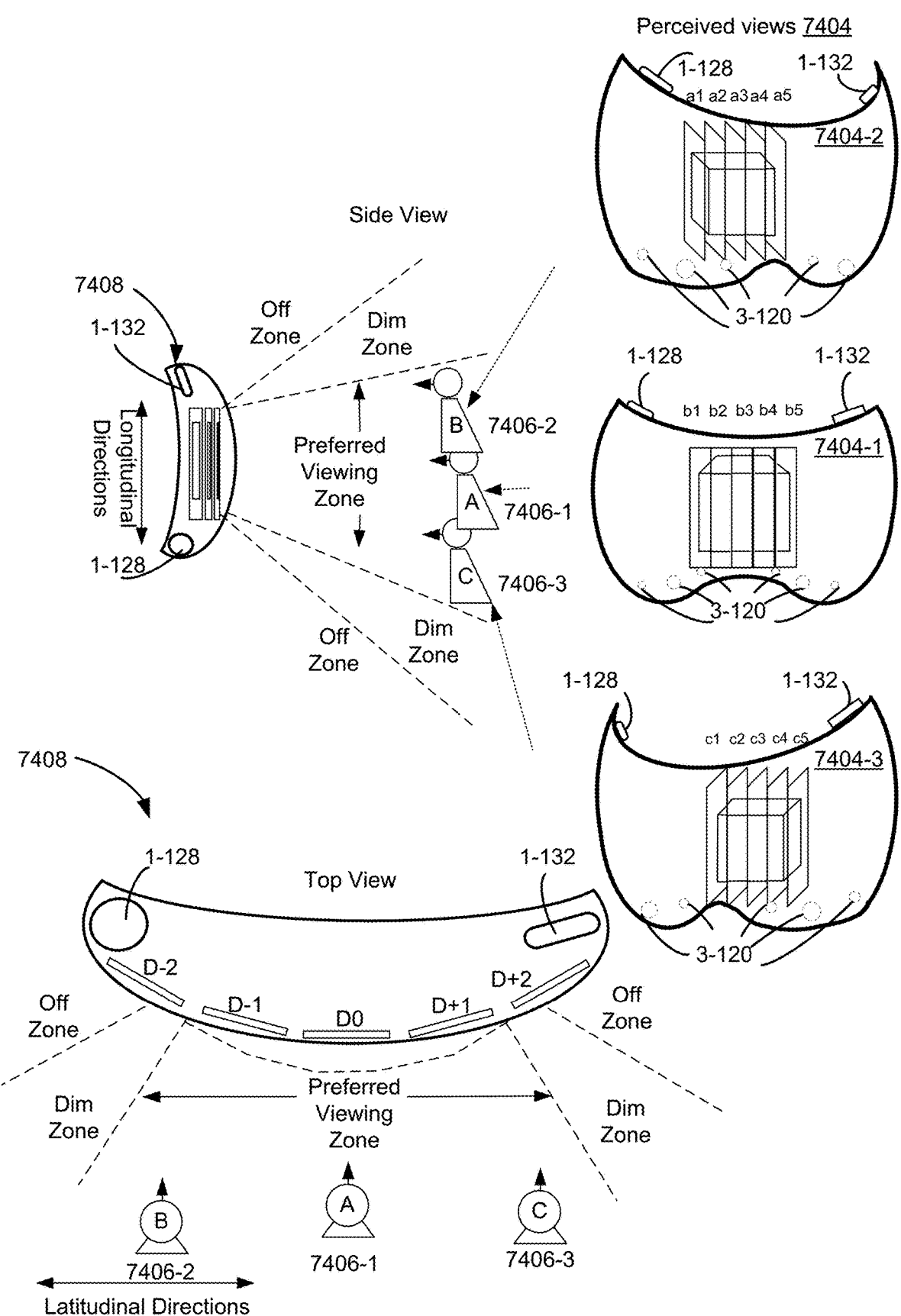
Figure 7AC2

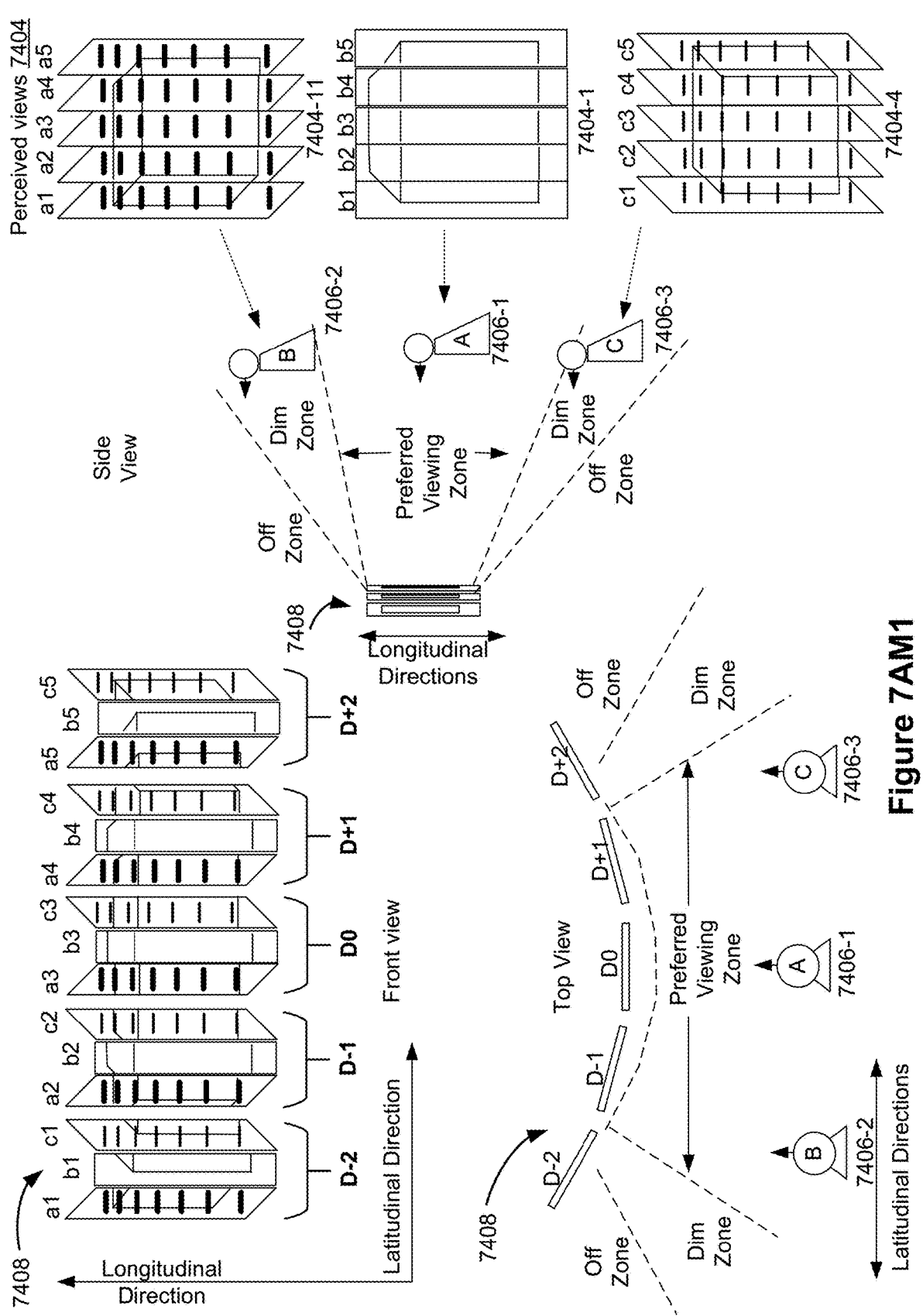
Figure 7AM1

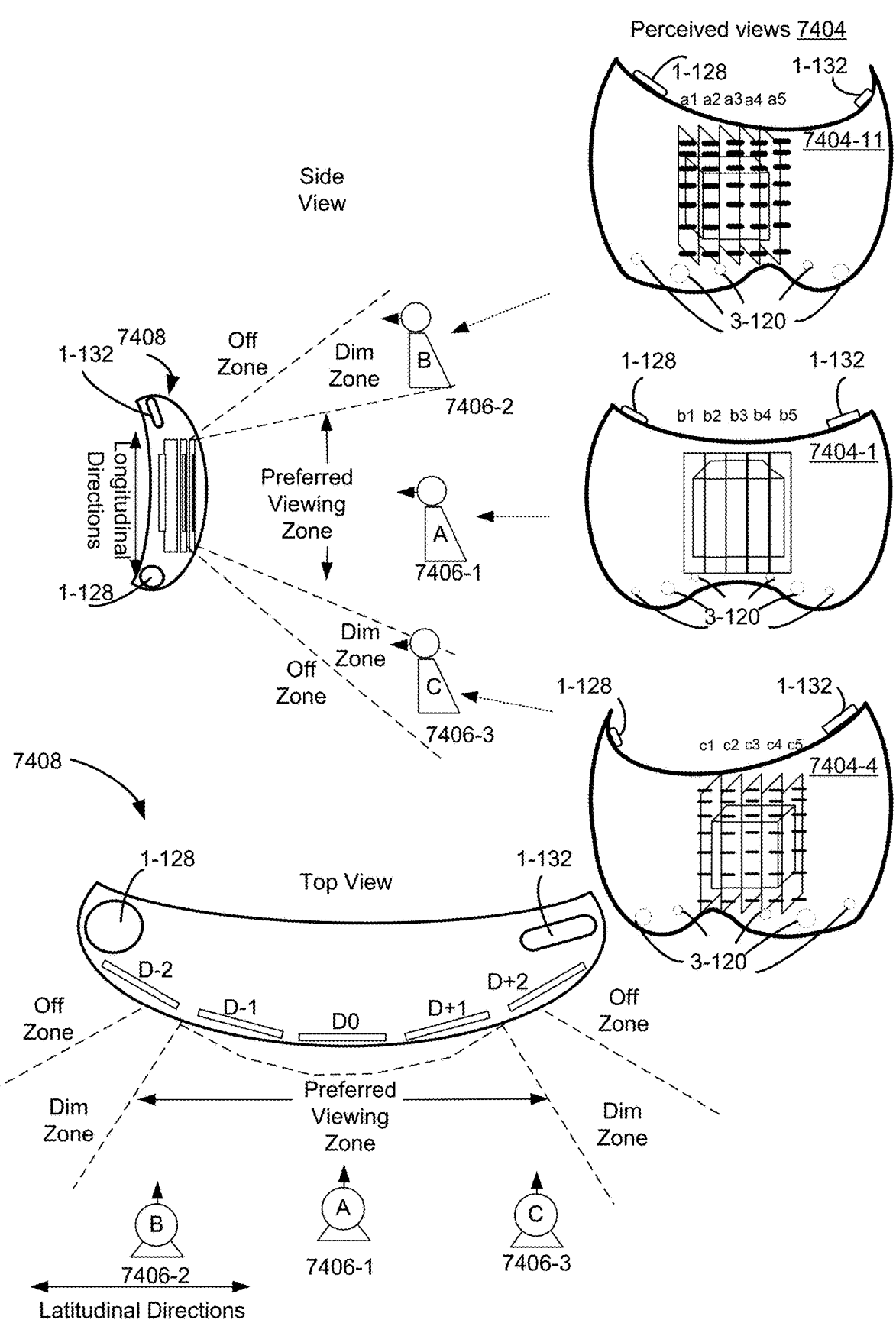
Figure 7AM2

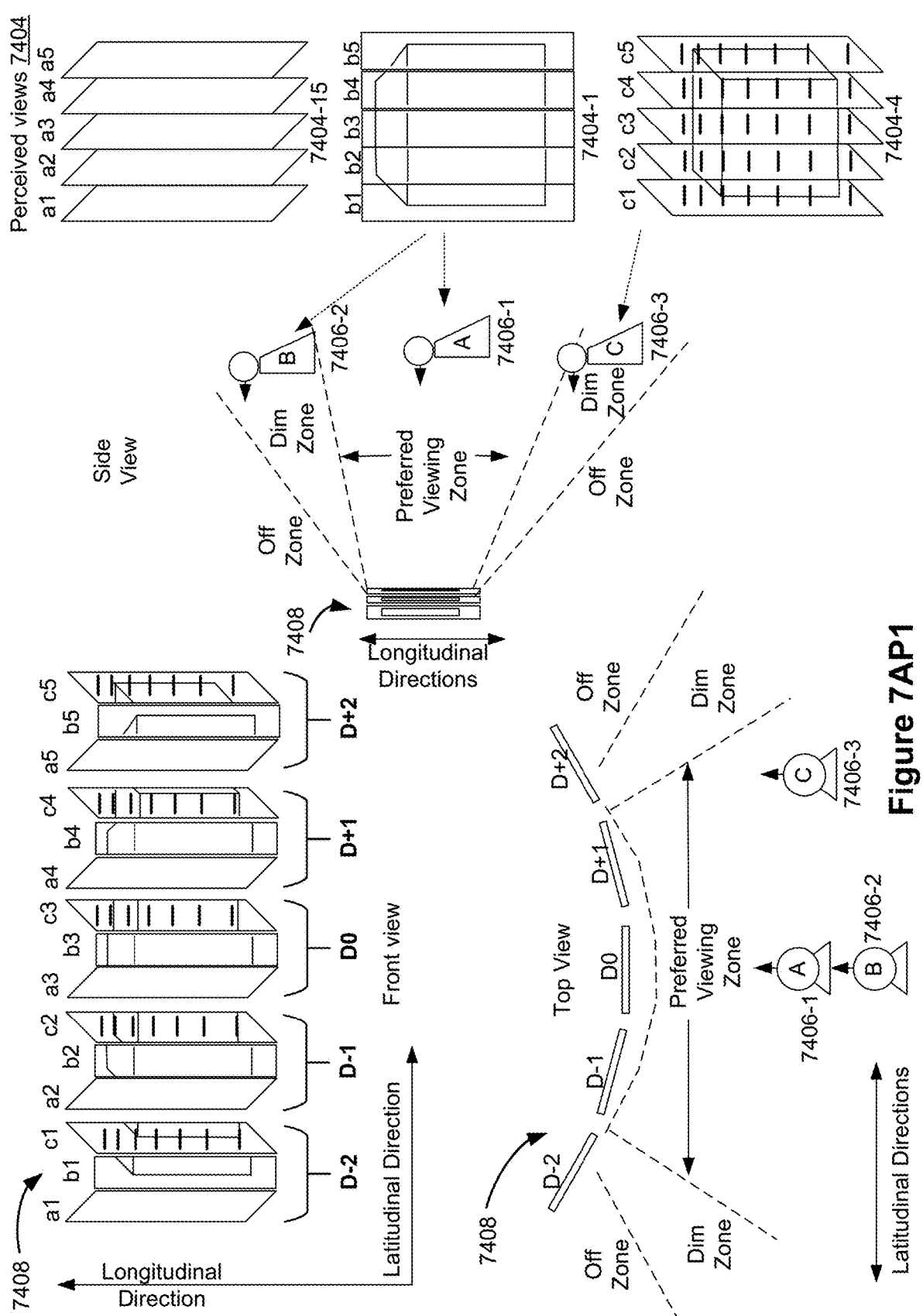
Figure 7AP1

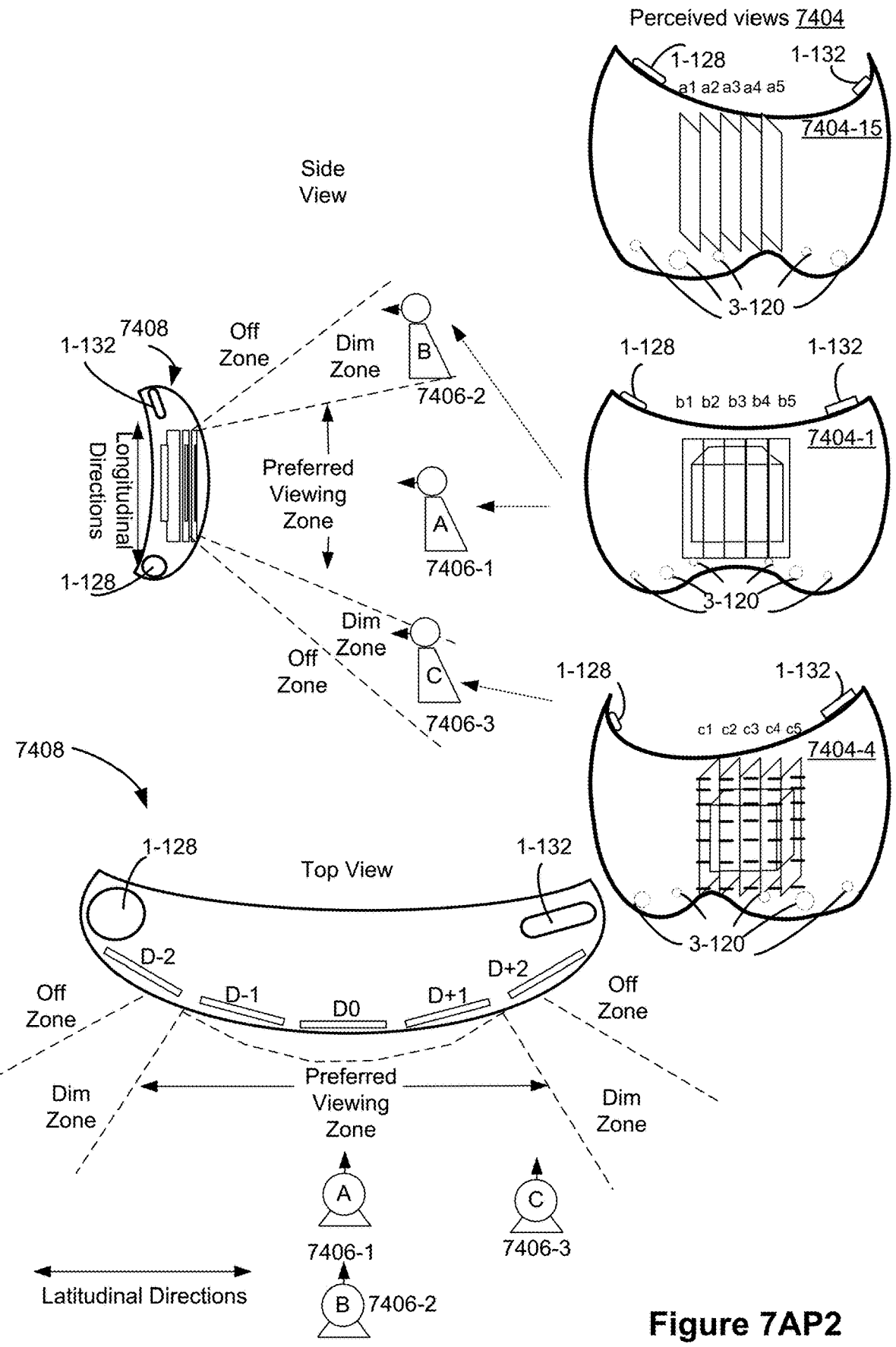
Figure 7AP2

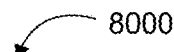
8000

8002 While a representation of a three-dimensional environment is visible via the first display generation component, display, via the second display generation component, a respective visual representation of a portion of a body of a user who is in a position to view the three-dimensional environment via the first display generation component, wherein displaying the respective visual representation of the portion of the body includes:

8004 In accordance with a determination that the user meets first criteria, wherein the first criteria require an identity of the user to meet a first condition in order for the first criteria to be met, displaying a first visual representation of the portion of the body 8006 In accordance with a determination that the user does not meet the first criteria, displaying a second visual representation of the portion of the body, wherein the second visual representation has a lower level of fidelity than the first visual representation 8008 While displaying, via the second display generation component, the respective visual representation of the portion of the body, detect a first change in appearance of the portion of the body of the user while the user is in a position to view the three-dimensional environment via the first display generation component 8010 In response to detecting the first change in appearance of the portion of the body of the user while the user is in a position to view the three-dimensional environment via the first display generation component, update an appearance of the respective visual representation of the portion of the body that is displayed via the second display generation component based on the first change in appearance of the portion of the body of the user, including:

8012 In accordance with a determination that the user meets the first criteria, changing an appearance of the first visual representation of the portion of the body based on the first change in appearance of the portion of the body of the user 8014 In accordance with a determination that the user does not meet the first criteria, changing an appearance of the second visual representation of the portion of the body based on the first change in appearance of the portion of the body of the user

Figure 8

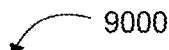

9000

9002 While a representation of a three-dimensional environment is visible via the first display generation component, display, via the second display generation component, one or more graphical elements that provide a visual indication of a status associated with a user who is in a position to view the representation of the three-dimensional environment that is visible via the first display generation component, wherein displaying the one or more graphical elements includes changing the one or more graphical elements to represent changes in the status associated with the user who is in a position to view content that is visible via the first computer-generated environment 9004 While displaying the one or more graphical elements via the second display generation component and while the representation of the three-dimensional environment is visible via the first display generation component, detect a first event that corresponds to a start of media capture using the computer system 9006 In response to detecting the first event that corresponds to the start of media capture using the computer system, display, via the second display generation component, a first visual alert that indicates the start of media capture, wherein first visual alert is displayed concurrently with at least a portion of the one or more graphical elements that represent the status associated with the user who is in a position to view content that is visible via the first computer-generated environment

Figure 9

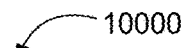 10000

10002 While a representation of a three-dimensional environment is visible via the first display generation component, display, via the second display generation component, one or more graphical elements that represent a status associated with a user who is in a position to view content that is visible via the first computer-generated environment, wherein displaying the one or more graphical elements that represent the status associated with the user includes:

10004 In accordance with a determination that a current level of immersion with which the representation of the three-dimensional environment is provided via the first display generation component is a first level of immersion, displaying the one or more graphical elements that represent the status associated with the user with a first appearance that is based on a first set of one or more visual properties and the status associated with the user 10006 In accordance with a determination that the current level of immersion is a second level of immersion different from the first level of immersion, displaying the one or more graphical elements that represent the status associated with the user with a second appearance that is based on a second set of one or more visual properties, different from the first set of one or more visual properties, and the status associated with the user 10008 While displaying the representation of the first computer-generated environment via the first display generation component with the first level of immersion and displaying the one or more graphical elements that represent the status associated with the user with the first appearance that is based on the first set of one or more visual properties and the status associated with the user, detect that first criteria for changing the current level of immersion are met 10010 In response to detecting that the first criteria for changing the current level of immersion are met:

10012 Change from displaying one or more virtual elements in the three-dimensional environment with the first level of immersion to displaying the one or more virtual elements in the three-dimensional environment with the second level of immersion, via the first display generation component 10014 Change from displaying the one or more graphical elements that represent the status associated with the user with the first appearance that is based on the first set of one or more visual properties and the status associated with the user to displaying the one or more graphical elements that represent the status associated with the user with the second appearance that is based on the second set of one or more visual properties and the status associated with the user, via the second display generation component

Figure 10

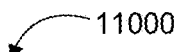

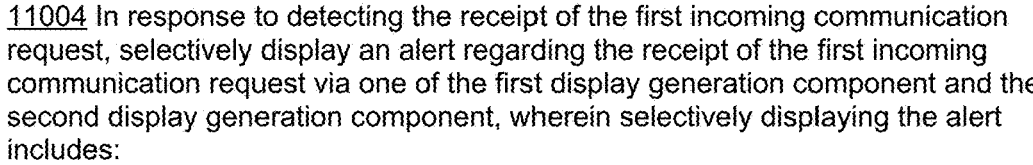

11002 Detect receipt of a first incoming communication request

11004 In response to detecting the receipt of the first incoming communication request, selectively display an alert regarding the receipt of the first incoming communication request via one of the first display generation component and the second display generation component, wherein selectively displaying the alert includes:

11006 In accordance with a determination that the first display generation component has a first spatial relationship with a user, displaying, via the first display generation component, a first alert indicating the receipt of the first incoming communication request 11008 In accordance with a determination that the first display generation component does not have the first spatial relationship with the user, displaying, via the second display generation component, a second alert indicating the receipt of the first incoming communication request

Figure 11

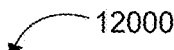

12000

12002 While a representation of a three-dimensional environment is visible via the first display generation component, display, via the second display generation component, a representation of a portion of a body 12004 While displaying the representation of the portion of the body via the second display generation component, detect one or more changes in a first set of environmental parameters associated with a physical environment in which the representation of the portion of the body is displayed via the second display generation component 12006 In response to detecting the one or more changes in the first set of environmental parameters associated with the physical environment in which the representation of the portion of the body is displayed via the second display generation component, change a respective value of a first display parameter for the representation of the portion of the body in accordance with the one or more changes in the first set of environmental parameters associated with the physical environment in which the representation of the portion of the body is displayed via the second display generation component, including:

12008 In accordance with a determination that one or more visual properties of the representation of the portion of the body meet first appearance criteria, change the respective value of the first display parameter for the representation of the portion of the body by a first amount 12010 In accordance with a determination that the one or more visual properties of the representation of the portion of the body meet second appearance criteria different from the first appearance criteria, change the respective value of the first display parameter for the representation of the portion of the body by a second amount, different from the first amount

Figure 12

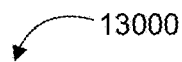

13000

13002 Display, via the first display generation component, a first object

13004 While displaying the first object via the first display generation component, detect one or more movements that change a viewing angle of a first viewer relative to content that is displayed via the first display generation component 13006 In response to detecting the one or more movements that change the viewing angle of the first viewer relative to the content that is displayed via the first display generation component, in accordance with a determination that the change in the viewing angle of the first viewer meets first criteria, change a value of at least a first display parameter of the first object other than a viewing perspective of the first object

Figure 13

DEVICES, METHODS, AND GRAPHICAL USER INTERFACES FOR PROVIDING COMPUTER-GENERATED EXPERIENCES

RELATED APPLICATIONS

This application claims priority to U.S. Provisional Patent Application No. 63/470,926, filed Jun. 4, 2023, and U.S. Provisional Patent Application No. 63/409,752, filed Sep. 24, 2022, each of which is hereby incorporated by reference in its entirety.

TECHNICAL FIELD

This disclosure relates generally to computer systems with a display generation component and one or more input devices that provide computer-generated extended reality (XR) experiences, including but not limited to electronic devices that provide virtual reality and mixed reality experiences via a display generation component.

BACKGROUND

The development of computer systems for virtual reality, augmented reality, and extended reality has increased significantly in recent years. Example augmented reality and extended reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented/extended reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, virtual reality environments, and/or extended reality environments) are cumbersome, inefficient, and limited. For example, systems that provide insufficient feedback for performing actions associated with virtual objects, systems that require a series of inputs to achieve a desired outcome in a virtual/augmented/extended reality environment, and systems in which manipulation of virtual objects are complex, tedious and error-prone, create a significant cognitive burden on a user, and detract from the experience with the virtual/augmented/extended reality environment. In addition, these methods take longer than necessary, thereby wasting energy. This latter consideration is particularly important in battery-operated devices.

SUMMARY

Accordingly, there is a need for computer systems with improved methods and interfaces for providing computer-generated experiences to users that make interaction with the computer systems more efficient and intuitive for a user. The above deficiencies and other problems associated with user interfaces for computer systems with a display generation component and one or more input devices are reduced or eliminated by the disclosed systems, methods, and user interfaces. Such systems, methods and interfaces optionally complement or replace conventional systems, methods, and user interfaces for providing extended reality experiences to users. Such methods and interfaces reduce the number, extent, and/or nature of the inputs from a user by helping the user to understand the connection between provided inputs and device responses to the inputs, thereby creating a more efficient human-machine interface.

SUMMARY

Accordingly, there is a need for computer systems with improved methods and interfaces for providing computer-generated experiences to users that make interaction with the computer systems more efficient and intuitive for a user. There is also a need for computer systems with improved methods and interfaces for providing computer-generated experiences to users that facilitate better social interaction, etiquette, and information exchange with the surrounding environment while users are engaged in various virtual reality and mixed reality experiences. Such methods and interfaces optionally complement or replace conventional methods for providing computer-generated reality experiences to users. Such methods and interfaces reduce the number, extent, and/or nature of the inputs from a user by helping the user to understand the connection between provided inputs and device responses to the inputs, thereby creating a more efficient human-machine interface. Such methods and interfaces also improve the user's experience, e.g., by reducing mistakes, interruptions, and time delays, due to lack of social cues and visual information on the part of the user and others present in the same physical environment, when the user is engaged in the virtual reality experience and/or the mixed reality experience provided by the computer systems.

The above deficiencies and other problems associated with user interfaces for a computer system with a display generation component and one or more input devices are reduced or eliminated by the disclosed systems. In some embodiments, the computer system is a desktop computer with one or more associated displays. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to one or more display generation components, the output devices including one or more tactile output generators and one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through stylus and/or finger contacts and gestures on the touch-sensitive surface, movement of the user's eyes and hand in space relative to the GUI or the user's body as captured by cameras and other movement sensors, and voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In one aspect, a method includes, while a representation of a three-dimensional environment is visible via the first display generation component, displaying, via the second display generation component, a respective visual representation of a portion of a body of a user who is in a position to view the three-dimensional environment via the first display generation component, wherein displaying the respective visual representation of the portion of the body includes: in accordance with a determination that the user meets first criteria, wherein the first criteria require an identity of the user to meet a first condition in order for the first criteria to be met, displaying a first visual representation of the portion of the body; and in accordance with a determination that the user does not meet the first criteria, displaying a second visual representation of the portion of the body, wherein the second visual representation has a lower level of fidelity than the first visual representation. The method further includes, while displaying, via the second display generation component, the respective visual representation of the portion of the body, detecting a first change in appearance of the portion of the body of the user while the user is in a position to view the three-dimensional environment via the first display generation component. The method includes, in response to detecting the first change in appearance of the portion of the body of the user while the user is in a position to view the three-dimensional environment via the first display generation component, updating an appearance of the respective visual representation of the portion of the body that is displayed via the second display generation component based on the first change in appearance of the portion of the body of the user, including: in accordance with a determination that the user meets the first criteria, changing an appearance of the first visual representation of the portion of the body based on the first change in appearance of the portion of the body of the user; and in accordance with a determination that the user does not meet the first criteria, changing an appearance of the second visual representation of the portion of the body based on the first change in appearance of the portion of the body of the user.

In one aspect, a method is performed at a computer system including a first display generation component, a second display generation component and one or more input devices. The method includes, while a representation of a three-dimensional environment is visible via the first display generation component, displaying, via the second display generation component, one or more graphical elements that provide a visual indication of a status associated with a user who is in a position to view the representation of the three-dimensional environment that is visible via the first display generation component, wherein displaying the one or more graphical elements includes changing the one or more graphical elements to represent changes in the status associated with the user who is in a position to view content that is visible via the first display generation component. The method further includes, while displaying the one or more graphical elements via the second display generation component and while the representation of the three-dimensional environment is visible via the first display generation component, detecting a first event that corresponds to a start of media capture using the computer system. The method includes, in response to detecting the first event that corresponds to the start of media capture using the computer system, displaying, via the second display generation component, a first visual alert that indicates the start of media capture, wherein first visual alert is displayed concurrently with at least a portion of the one or more graphical elements that represent the status associated with the user who is in a position to view content that is visible via the first display generation component.

In one aspect, a method is performed at a computer system including a first display generation component, a second display generation component and one or more input devices. The method includes, while a representation of a three-dimensional environment is visible via the first display generation component, displaying, via the second display generation component, one or more graphical elements that represent a status associated with a user who is in a position to view content that is visible via the first display generation component, wherein displaying the one or more graphical elements that represent the status associated with the user includes: in accordance with a determination that a current level of immersion with which the representation of the three-dimensional environment is provided via the first display generation component is a first level of immersion, displaying the one or more graphical elements that represent the status associated with the user with a first appearance that is based on a first set of one or more visual properties and the status associated with the user; and in accordance with a determination that the current level of immersion is a second level of immersion different from the first level of immersion, displaying the one or more graphical elements that represent the status associated with the user with a second appearance that is based on a second set of one or more visual properties, different from the first set of one or more visual properties, and the status associated with the user. The method includes, while displaying the representation of the three-dimensional environment via the first display generation component with the first level of immersion and displaying the one or more graphical elements that represent the status associated with the user with the first appearance that is based on the first set of one or more visual properties and the status associated with the user, detecting that first criteria for changing the current level of immersion are met. The method further includes, in response to detecting that the first criteria for changing the current level of immersion are met: changing from displaying one or more virtual elements in the three-dimensional environment with the first level of immersion to displaying the one or more virtual elements in the three-dimensional environment with the second level of immersion, via the first display generation component; and changing from displaying the one or more graphical elements that represent the status associated with the user with the first appearance that is based on the first set of one or more visual properties and the status associated with the user to displaying the one or more graphical elements that represent the status associated with the user with the second appearance that is based on the second set of one or more visual properties and the status associated with the user, via the second display generation component.

In one aspect, a method is performed at a computer system including a first display generation component, a second display generation component and one or more input devices. The method includes detecting receipt of a first incoming communication request. The method further includes, in response to detecting the receipt of the first incoming communication request, selectively displaying an alert regarding the receipt of the first incoming communication request via one of the first display generation component and the second display generation component, wherein selectively displaying the alert includes: in accordance with a determination that the first display generation component has a first spatial relationship with a user, displaying, via the first display generation component, a first alert indicating the receipt of the first incoming communication request; and in accordance with a determination that the first display generation component does not have the first spatial relationship with the user, displaying, via the second display generation component, a second alert indicating the receipt of the first incoming communication request.

In one aspect, a method is performed at a computing system including a first display generation component, a second display generation component and one or more input devices. The method includes, while a representation of a three-dimensional environment is visible via the first display generation component, displaying, via the second display generation component, a representation of a portion of a body (e.g., the body of the user of the computing system). The method further includes, while displaying the representation of the portion of the body via the second display generation component, detecting one or more changes in a first set of environmental parameters associated with a physical environment in which the representation of the portion of the body is displayed via the second display generation component. The method further includes, in response to detecting the one or more changes in the first set of environmental parameters associated with the physical environment in which the representation of the portion of the body is displayed via the second display generation component, changing a respective value of a first display parameter for the representation of the portion of the body in accordance with the one or more changes in the first set of environmental parameters associated with the physical environment in which the representation of the portion of the body is displayed via the second display generation component, including: in accordance with a determination that one or more visual properties of the representation of the portion of the body meet first appearance criteria, changing the respective value of the first display parameter for the representation of the portion of the body by a first amount; and in accordance with a determination that the one or more visual properties of the representation of the portion of the body meet second appearance criteria different from the first appearance criteria, changing the respective value of the first display parameter for the representation of the portion of the body by a second amount, different from the first amount.

In another aspect, a method is performed at a computing system including at least a first display generation component and one or more input devices. The method includes displaying, via the first display generation component, a first object. The method further includes, while displaying the first object via the first display generation component, detecting one or more movements that change a viewing angle of a first viewer relative to content that is displayed via the first display generation component. The method further includes, in response to detecting the one or more movements that change the viewing angle of the first viewer relative to the content that is displayed via the first display generation component, in accordance with a determination that the change in the viewing angle of the first viewer meets first criteria, changing a value of at least a first display parameter of the first object other than a viewing perspective of the first object.

In accordance with some embodiments, a computer system includes one or more display generation components (e.g., one or more displays, projectors, and/or head-mounted displays, enclosed in the same housing or different housings), one or more input devices (e.g., one or more cameras, a touch-sensitive surface, optionally one or more sensors to detect intensities of contacts with the touch-sensitive surface), optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by a computer system with one or more display generation components, one or more input devices (e.g., one or more cameras, a touch-sensitive surface, optionally one or more sensors to detect intensities of contacts with the touch-sensitive surface), and optionally one or more tactile output generators, cause the device to perform or cause performance of the operations of any of the methods described herein. In accordance with some embodiments, a graphical user interface on a computer system with one or more display generation components, one or more input devices (e.g., one or more cameras, a touch-sensitive surface, optionally one or more sensors to detect intensities of contacts with the touch-sensitive surface), optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes: one or more display generation components, one or more input devices (e.g., one or more cameras, a touch-sensitive surface, optionally one or more sensors to detect intensities of contacts with the touch-sensitive surface), and optionally one or more tactile output generators; and means for performing or causing performance of the operations of any of the methods described herein. In accordance with some embodiments, an information processing apparatus, for use in a computer system with one or more display generation components, one or more input devices (e.g., one or more cameras, a touch-sensitive surface, optionally one or more sensors to detect intensities of contacts with the touch-sensitive surface), and optionally one or more tactile output generators, includes means for performing or causing performance of the operations of any of the methods described herein.

Thus, computer systems with one or more display generation components are provided with improved methods and interfaces for providing computer-generated experiences to users that make interaction with the computer systems more efficient and intuitive for a user. The computer systems are also provided with improved methods and interfaces for providing computer-generated experiences to users that facilitate better social interaction, etiquette, and information exchange with the surrounding environment while users are engaged in various virtual reality and mixed reality experiences. Such methods and interfaces optionally complement or replace conventional methods for providing computer-generated reality experiences to users. Such methods and interfaces reduce the number, extent, and/or nature of the inputs from a user by helping the user to understand the connection between provided inputs and device responses to the inputs, thereby creating a more efficient human-machine interface. Such methods and interfaces also improve the user's experience, e.g., by reducing mistakes, interruptions, and time delays, due to lack of social cues and visual information on the part of the user and others present in the same physical environment, when the user is engaged in the virtual reality experience and/or the mixed reality experience provided by the computer systems.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1A:
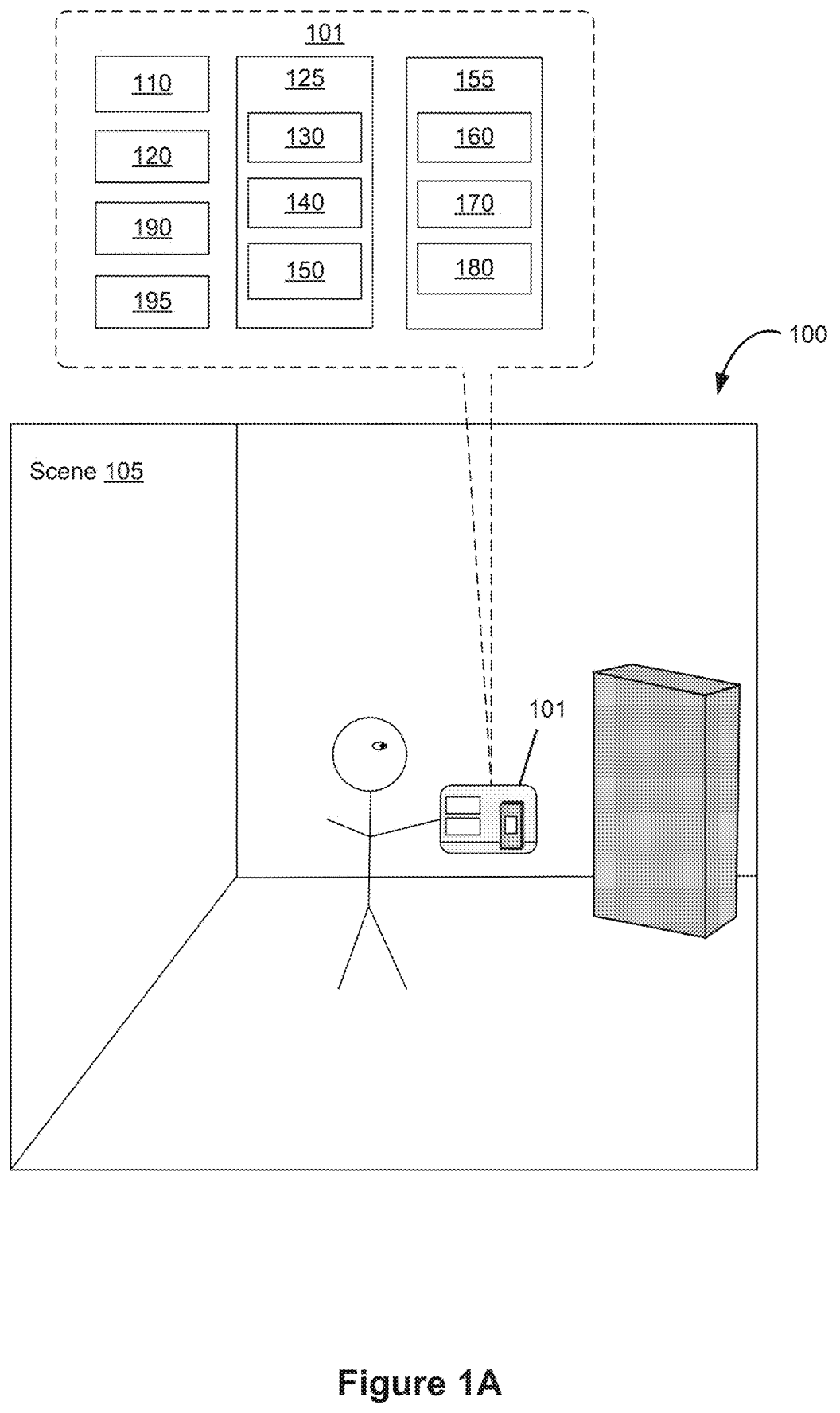

FIG. 1A is a block diagram illustrating an operating environment of a computer system for providing extended-reality (XR) experiences in accordance with some embodiments.

FIGS. 7G1-7J illustrate a computer system that displays XR content to a user via a first display generation component and dynamically updated status information associated with the user via the second display generation component, where the computer system displays an alert via the second display generation component in response to detecting a start of media capture using the computer system, in accordance with some embodiments.

FIGS. 7K-7O illustrate a computer system that displays XR content to a user via a first display generation component and dynamically updated status information associated with the user via the second display generation component, where the computer system changes the level of immersion with which the XR content is displayed via the first display generation component in response to detecting a first event, and also changes the appearance of the status information based on the change in the level of immersion, in accordance with some embodiments.

FIGS. 7U-7AB2 illustrate a computer system that changes one or more display parameters of a representation of a portion of the body of a user in response to detecting changes in one or more environmental parameters associated with a physical environment in which the representation of the portion of the body of the user is displayed, in accordance with some embodiments.

FIGS. 7AC1-7AQ illustrate a computer system that changes respective values of one or more display parameters of an object other than a viewing perspective of the object, in response to detecting one or more movements that change the viewing angle of a viewer relative to the object, in accordance with some embodiments.

FIG. 8 is a flowchart of a method of displaying XR content to a user via a first display generation component and updating status information associated with the user via a second display generation component, in accordance with some embodiments.

FIG. 9 is a flowchart of a method of displaying an alert in response to detecting a start of media capture, in accordance with some embodiments.

FIG. 10 is a flowchart of a method of changing a level of immersion with which XR content is displayed via a first display generation component in response to detecting an event, and changing the appearance of the status information associated with the user that is displayed via a second display generation component, in accordance with the change in the level of immersion, in accordance with some embodiments.

FIG. 11 is a flowchart of a method of displaying an alert for an incoming communication request via a first display generation component or a second display generation component depending on whether the computer system or a wearable device corresponding to the computer system is worn by the user, in accordance with some embodiments.

FIG. 12 is a flowchart of a method of changing one or more display parameters of a representation of a portion of the body of a user in response to detecting changes in one or more environmental parameters associated with a physical environment in which the representation of the portion of the body of the user is displayed, in accordance with some embodiments.

FIG. 13 is a flowchart of a method of changing respective values of one or more display parameters of an object other than a viewing perspective of the object, in response to detecting one or more movements that change the viewing angle of a viewer relative to the object, in accordance with some embodiments.

DESCRIPTION OF EMBODIMENTS

Figure 1B:
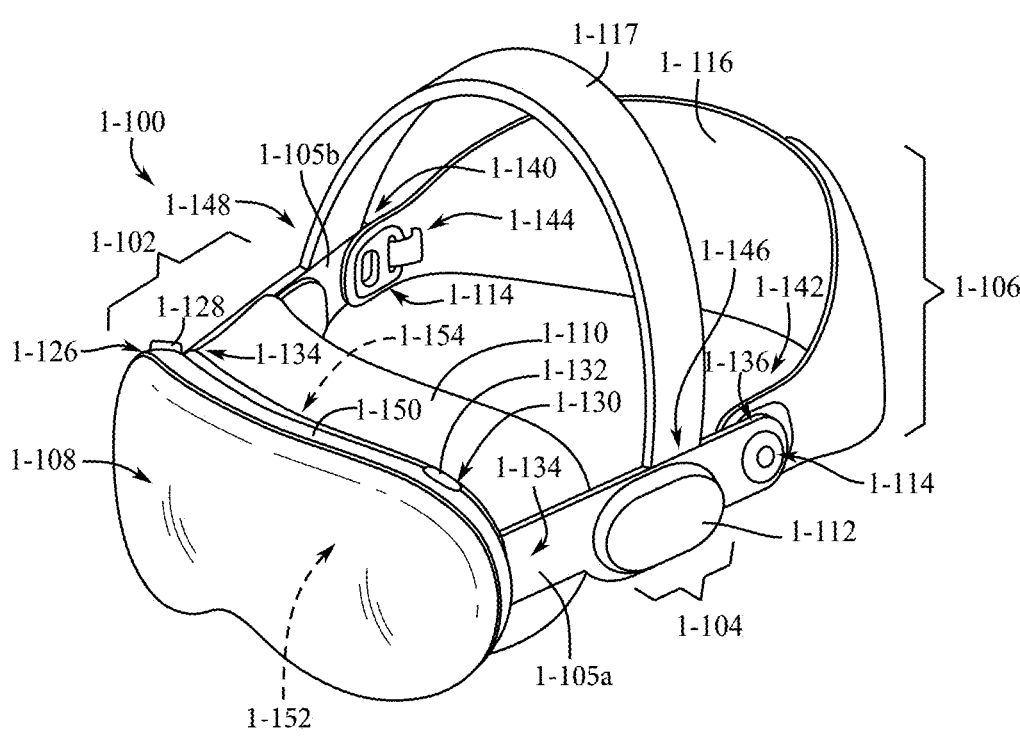
FIGS. 1B-1P are examples of a computer system for providing XR experiences in the operating environment of FIG. 1A.

The present disclosure relates to user interfaces for providing a computer-generated extended reality (XR) experience to a user, in accordance with some embodiments.

The systems, methods, and GUIs described herein improve user interface interactions with virtual/augmented reality environments in multiple ways.

As disclosed herein, a computer system includes at least two display generation components, with a first display generation component facing the user and providing the three-dimensional computer-generated experiences to the user, and a second display generation component facing away from the user and providing status information related to the user (e.g., the movement of the user's eyes, and or other facial features; and/or change in appearance of the user's face and/or eyes) and/or the computer-generated experience currently being viewed by the user (e.g., the metadata related to the content viewed by the user and the level of immersion associated with the content). The first display generation component and the second display generation component are optionally two displays enclosed in the same housing of a head-mounted display device (IMD) and respectively facing inwardly toward the user wearing the HMD and outwardly toward a physical environment surrounding the user. The second display generation component optionally provides real-time status information (e.g., the real-time status information, optionally, includes status information that has some computational and/or signal processing delays (e.g., delays that are less than 0.5, 0.25, 0.1, 0.05, or 0.01 seconds and/or an amount that is not perceptible to most users)) including visual representation of a portion of the body of the user that is shielded behind the first display generation component and including metadata related to the content and/or level of immersion associated thereof currently shown to the user via the first display generation component, such that another person or persons in the surrounding physical environment of the user can see the visual information and the metadata provided by the second display generation component and act accordingly, e.g., engaging the user when appropriate, as opposed to unnecessarily avoiding interaction with the user or inappropriately interrupting the user, while the user is viewing computer-generated content via the first display generation component. In some embodiments, as described herein, the computer system differentiates between a user that meets first criteria and a user that does not meet the first criteria, when displaying a representation of a portion of the body of the user via the second display generation component as described herein. In particular, the first criteria are used to distinguish between a primary user or enrolled user of the computer system and a guest user of the computer system. In some embodiments, the computer system stores one or more images and models of the portion of the body of the enrolled user during an enrollment process, and subsequently uses the stored images and/or models to generate the representation of the portion of the body of the enrolled user to indicate the real-time status of the enrolled user (e.g., the real-time status, optionally, includes status of the enrolled user that has some computational and/or signal processing delays (e.g., delays that are less than 0.5, 0.25, 0.1, 0.05, or 0.01 seconds and/or an amount that is not perceptible to most users)). In contrast, the computer system does not have an established set of images and/or models for a guest user, and optionally, uses a generic image or reduced fidelity images and/or models for the guest user to generate the representation of the portion of the body of the guest user to indicate the real-time status of the guest user (e.g., the real-time status, optionally, includes status information of the guest user that has some computational and/or signal processing delays (e.g., delays that are less than 0.5, 0.25, 0.1, 0.05, or 0.01 seconds and/or an amount that is not perceptible to most users)). Differentiating the representation of the portion of the body of the user based on whether the user is an enrolled user or a guest user alert the people in the surrounding environment of the identity of the person that is using the computer system when the face of the person is largely blocked by the presence of the first display generation component, and helps the people interact with the person using the computer system more appropriately, avoiding misunderstanding, accidents, and/or mistakes. In addition, a guest user is allowed to use the computer system without causing other people to mistake his/her identity as the primary user of the computer system, which may improve the usability of the computer system. In some embodiments, the primary user of the computer system optionally activates different modes of the computer system to suit his/her intended engagement level and privacy needs when engaged in the computer-generated three-dimensional environment provided via the first display generation component, and the computer system provides status information related to the various modes to alert people in the surrounding physical environment of such intentions and needs of the user, so that unintended, undesirable, and/or unnecessary interruptions and avoidance of interactions by the people in the surrounding physical environment are reduced. In particular, the primary user can opt to use a generic or guest representation of the portion of the body in the status displayed via the second display generation component, in some of these modes.

As disclosed herein, a computer system is in communication with a first display generation component for displaying XR content to a user that has a first spatial relationship with the first display generation component, and a second display generation component for displaying status information associated with the user that is in the first spatial relationship with the first display generation component. In some embodiments, the computer system also uses the second display generation component to display an indication of a start, continuation, and/or termination of media capture using the computer system. Using the second display generation component to display an alert for the start, continuation, and/or termination of media capture provides an alert to the people in the surrounding environment regarding the media capture, improving the security and privacy of the people in the surrounding environment, in some embodiments.

As disclosed herein, a computer system includes at least two display generation components, with a first display generation component facing the user and providing the three-dimensional computer-generated experiences to the user, and a second display generation component facing away from the user and providing status information related to the user (e.g., the movement of the user's eyes, and or other facia features; and/or change in appearance of the user's face and/or eyes) and/or the computer-generated experience currently being viewed by the user (e.g., the metadata related to the content viewed by the user and the level of immersion associated with the content). The first display generation component and the second display generation component are optionally two displays enclosed in the same housing of a head-mounted display device (HMD) and respectively facing inwardly toward the user wearing the HMD and outwardly toward a physical environment surrounding the user. In some embodiments, the computer system detects events that meet the criteria for changing (e.g., increasing, and/or decreasing) the level of immersion with which XR content is being presented to the user that is viewing the XR content via the first display generation component; and in response to detecting such events, the computer system changes the level of immersion for the XR content displayed via the first display generation component, and also changes the status associated with the user as displayed via the second display generation component. Allowing the computer system to automatically change the level of immersion (e.g., breakthrough to reveal more of the physical environment in the XR content, and/or decrease the amount of virtual content that is displayed in the XR environment) based on occurrence of certain types of events, helps to improve the safety of the user and the people in the surrounding environment, and may help facilitate interaction between the user and the people in the surrounding environment while the user is using the computer system.

As disclosed herein, when an incoming communication request is received at a computer system that is in communication with a first display generation component and a second display generation component, the computer system displays an alert for the incoming communication request on either the first display generation component or the second display generation component, depending on whether the first display generation component has a first spatial relationship with the user such that the user may view content displayed via the first display generation component, and/or whether the first display generation component or another component of the computer system is worn on the body of the user, in some embodiments. Providing the alert for an incoming communication request on either the first display generation component and the second display generation component provides alert in a manner that is more easily seen by the user, and allow the user to deal with the incoming communication request in a more efficient manner, and reducing mistakes when interacting with the computer system, in accordance with some embodiments.

As disclosed herein, when displaying a representation of a portion of a body of a user via a display generation component (e.g., an external display of an HMD worn by the user, a display that is obscuring an external viewer's direct view of the portion of the body of the user located behind the display, or another display that displays a representation of a portion of a body of a user (optionally, when the user is not physically present in the same physical environment as the display)), in response to detecting one or more changes in a set of environmental parameters associated with a physical environment in which the representation of the portion of the body of the user is displayed, the computer system changes at least a value of a first display parameter of the representation of the portion of the body of the user according to the one or more changes in the set of environmental parameters. For example, a change in ambient lighting and/or a change in the viewing angle of a viewer of the representation of the portion of the body of the user cause the computer system to change (e.g., increase, decrease, and/or otherwise change a value of) the color, brightness, translucency, and/or other display parameters of the representation of the portion of the body of the user, e.g., to reflect the changes in the environmental parameters and/or simulate the effect of the change in the external environment on the view of the representation of the portion of the body of the user. However, in some embodiments, depending on the visual characteristics of the representation of the portion of the body of the user, the computer system applies different amounts of changes to the one or more display parameters of the representation of the portion of the body of the user for the same amount and/or type of changes in the environmental parameters of the external environment in which the representation of the portion of the body of the user is displayed. Customizing the amount of change applied to a display parameter of the representation of the portion of the body of the user based on the visual characteristics of the representation of the portion of the body of the user, in response to and in accordance with a change in the environmental parameters associated with a physical environment in which the representation of the portion of the body of the user is displayed, balances the benefit of using the appearance of the representation of the portion of the body of the user to provide feedback to a viewer regarding the change in the environmental parameter of the physical environment, and the need to maintain sufficient visual saliency and/or realism of the representation of the portion of the body for different representations of the user with different visual characteristics, thereby making the computer system more efficient in communicating with the viewer about the states of the computer system, the user, and/or the physical environment.

As disclosed herein, when the viewing angle of a respective viewer relative to an object displayed via a display generation component changes (e.g., due to movement of the display generation component, and/or movement of the respective viewer), the computer system changes values of one or more display parameters of the object that affect the visual prominence of the object if the change in viewing angle causes the respective viewer to move out of a preferred viewing zone for the object. In some embodiments, when multiple viewers are present in the environment of the display generation component, and as a respective viewer moves from one viewing zone to another viewing zone relative to the object displayed via the display generation component, the computer system changes the values of one or more display parameters of the object that affect the visual prominence of the object for the respective viewer, and optionally changes the values of the one or more display parameters of the object that is displayed for another viewer who is in the same viewing zone with the respective viewer before and/or after the movement of the respective viewer, in accordance with various embodiments. Changing the values of one or more display parameters of the object based on a change in viewing angle of a respective viewer provides improved feedback to the viewer(s) in the environment (e.g., by indicating the movement of the viewers in the environment and/or the change in relative viewing angle of the viewers in the environment), and provides improved security and privacy for the user whose representation and/or status is displayed as the object via the display generation component (e.g., by changing the values of the display parameters of the representation of the user, optionally relative to other status indicators associated with the status of the user).

FIGS. 1A-6 provide a description of example computer systems for providing XR experiences to users. FIGS. 7A-7F illustrate a computer system that displays XR content to a user via a first display generation component and dynamically updated status information associated with the user via a second display generation component, where the status information includes a respective representation of a portion of the body of the user that has different levels of fidelity depending on whether the user meets first criteria, in accordance with some embodiments. FIGS. 7G-7J illustrate a computer system that displays XR content to a user via a first display generation component and dynamically updated status information associated with the user via the second display generation component, where the computer system displays an alert via the second display generation component in response to detecting a start of media capture using the computer system, in accordance with some embodiments. FIGS. 7K-7O illustrate a computer system that displays XR content to a user via a first display generation component and dynamically updated status information associated with the user via the second display generation component, where the computer system changes the level of immersion with which the XR content is displayed via the first display generation component in response to detecting a first event, and also changes the appearance of the status information based on the change in the level of immersion, in accordance with some embodiments. FIGS. 7P-7T illustrate a computer system that displays an alert for an incoming communication request via a first display generation component or a second display generation component depending on whether the computer system or a wearable device corresponding to the computer system (e.g., an HMD, a wrist band or watch, a backpack containing a component of the computer system, and/or the first display generation component) is worn by the user (e.g., being worn on the user's head, wrist, or back), in accordance with some embodiments. FIGS. 7U-7AB2 illustrate a computer system that changes values of one or more display parameters of a representation of a portion of the body of a user in response to detecting changes in one or more environmental parameters associated with a physical environment in which the representation of the portion of the body of the user is displayed, in accordance with some embodiments. FIGS. 7AC-7AQ illustrate a computer system that changes values of one or more display parameters of an object other than a viewing perspective of the object, in response to detecting one or more movements that change the viewing angle of a viewer relative to the object, in accordance with some embodiments. FIG. 8 is a flowchart of a method of displaying XR content to a user via a first display generation component and updating status information associated with the user via a second display generation component, in accordance with some embodiments. FIG. 9 is a flowchart of a method of displaying an alert in response to detecting a start of media capture, in accordance with some embodiments. FIG. 10 is a flowchart of a method of changing a level of immersion with which XR content is displayed via a first display generation component in response to detecting an event, and changing the appearance of the status information associated with the user that is displayed via a second display generation component, in accordance with the change in the level of immersion, in accordance with some embodiments. FIG. 11 is a flowchart of a method of displaying an alert for an incoming communication request via a first display generation component or a second display generation component depending on whether the computer system or a wearable device corresponding to the computer system is worn by the user, in accordance with some embodiments. FIG. 12 is a flowchart of a method of changing values of one or more display parameters of a representation of a portion of the body of a user in response to detecting changes in one or more environmental parameters associated with a physical environment in which the representation of the portion of the body of the user is displayed, in accordance with some embodiments. FIG. 13 is a flowchart of a method of changing values of one or more display parameters of an object other than a viewing perspective of the object, in response to detecting one or more movements that change the viewing angle of a viewer relative to the object, in accordance with some embodiments. The user interfaces in FIGS. 7A-7AQ are used to illustrate the processes in FIGS. 8-13, respectively.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques may also reduce power usage and improve battery life of the device by enabling the user to use the device more quickly and efficiently. Saving on battery power, and thus weight, may improve the ergonomics of the device. These techniques may also allow the use of fewer and/or less precise sensors resulting in a more compact, lighter, and/or lower cost device, and/or enable the device to be used in a variety of lighting conditions. These techniques may reduce energy usage, thereby reducing heat emitted by the device, which is particularly important for a wearable device that is directly in contact with a wearer's skin. Other advantages and benefits are also possible in accordance with various embodiments.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, or another type of display generation component), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, and/or velocity sensors), and optionally one or more peripheral devices 195 (e.g., home appliances, and/or wearable devices). In some embodiments, one or more of the input devices 125, output devices 155, sensors 190, and peripheral devices 195 are integrated with the display generation component 120 (e.g., in a head-mounted device or a hand-held device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specfies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment).

In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objets such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, or another type of server). In some embodiments, the controller 110 is communicatively coupled with the display generation component 120 (e.g., an HMD, a display, a projector, a touchscreen, or another type of display generation component) via one or more wired or wireless communication channels 144 (e.g., BLUETOOTH, IEEE 802.11x, IEEE 802.16x, IEEE 802.3x, or another type of communication channel). In another example, the controller 110 is included within the enclosure (e.g., a physical housing) of the display generation component 120 (e.g., an HMD, or a portable electronic device that includes a display and one or more processors), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, or on his/her hand). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1C:
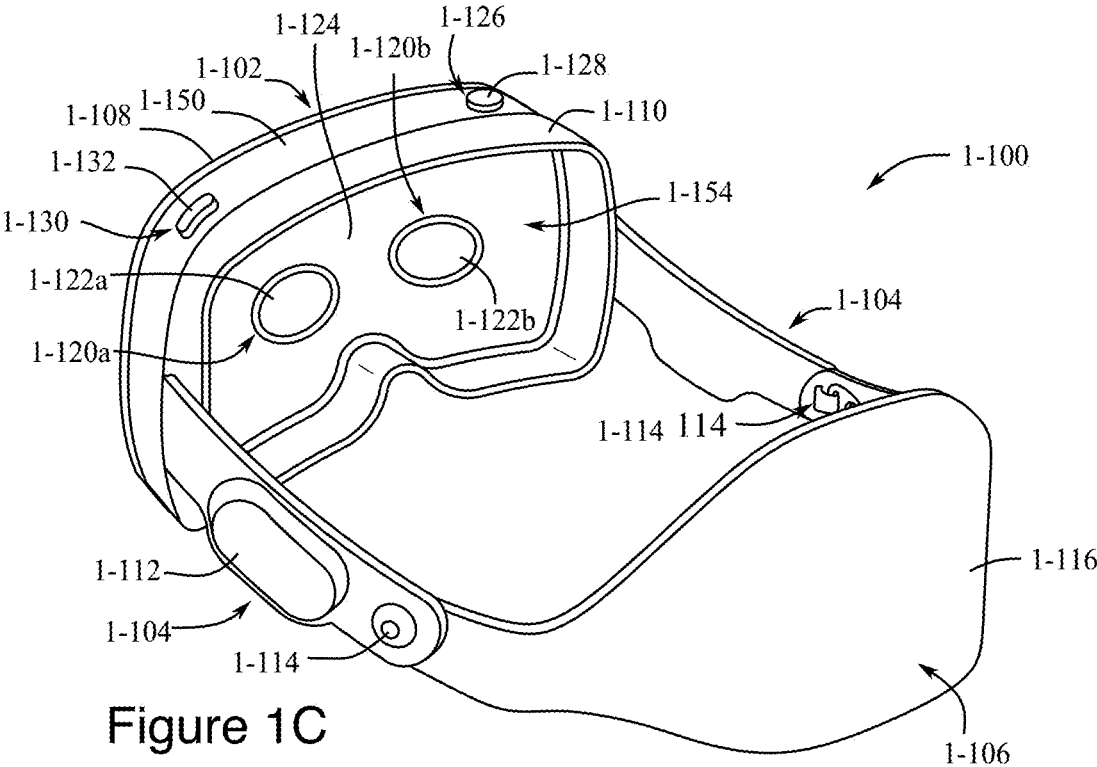
Figure 1D:
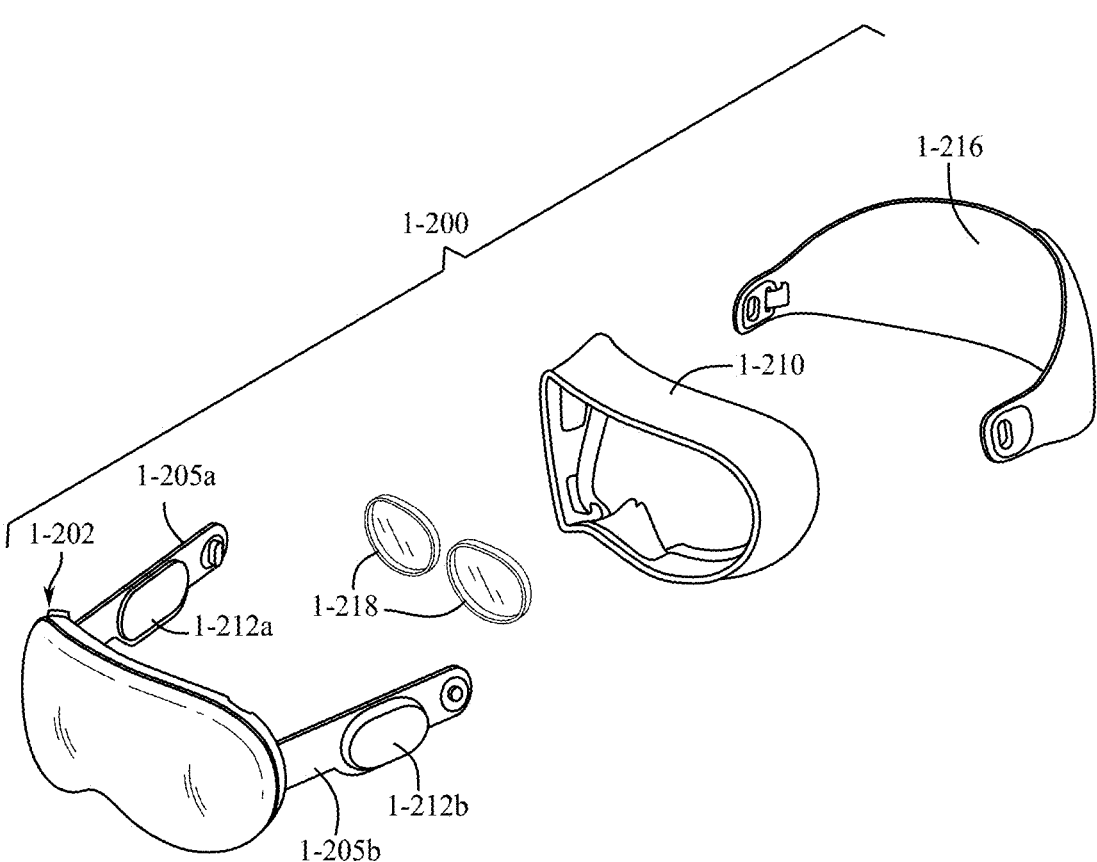
Figure 1E:
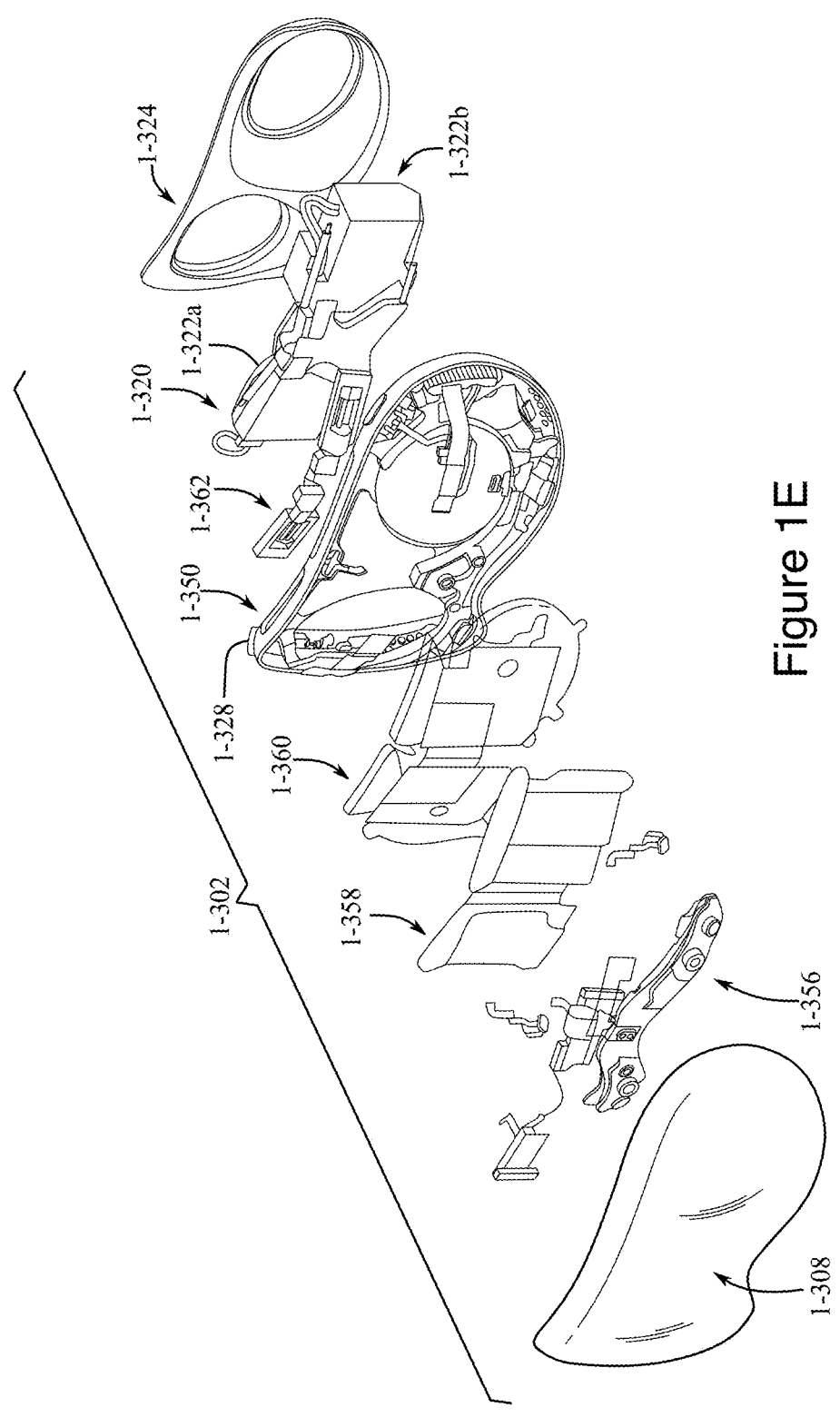
Figure 1F:
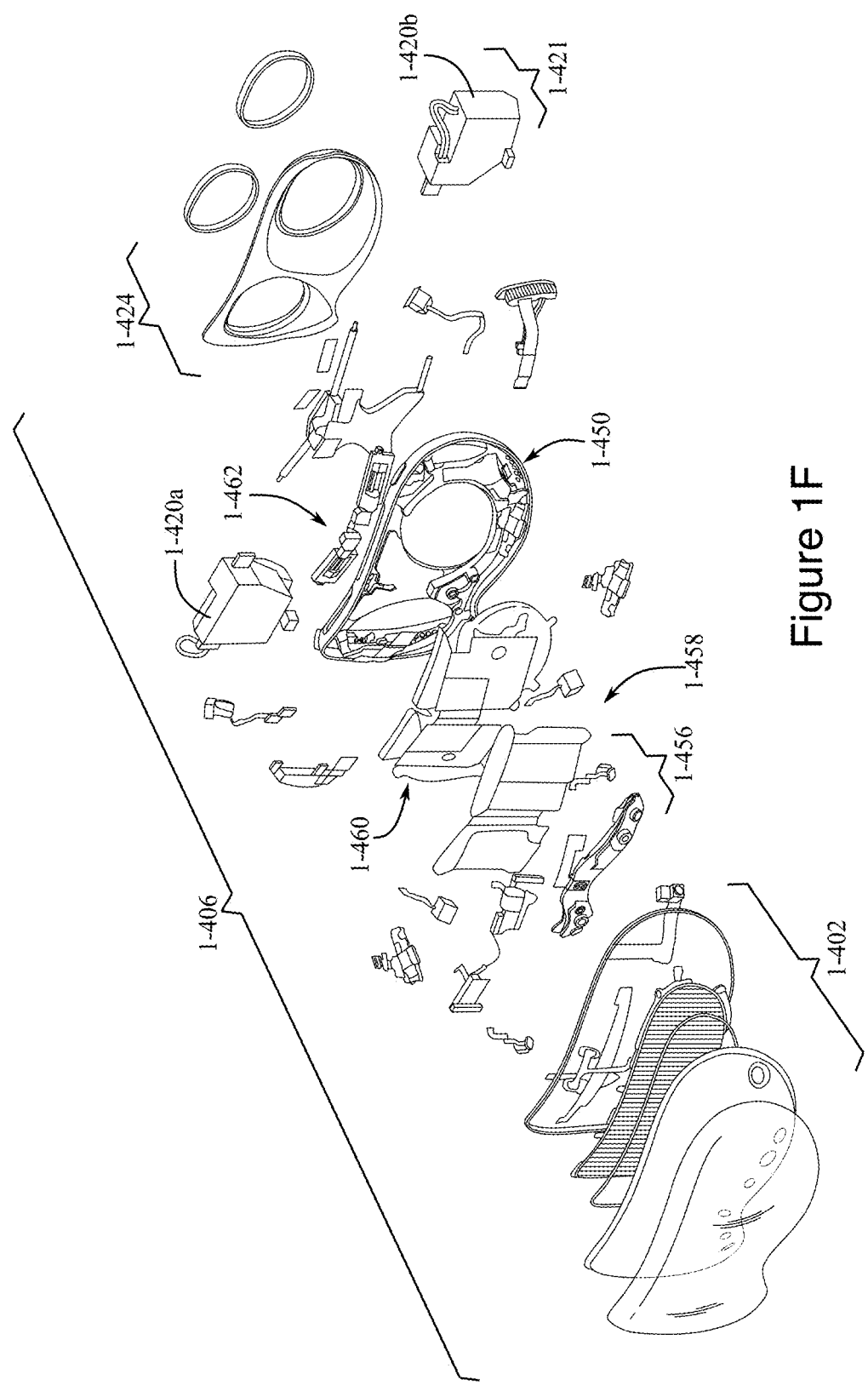
Figure 1G:
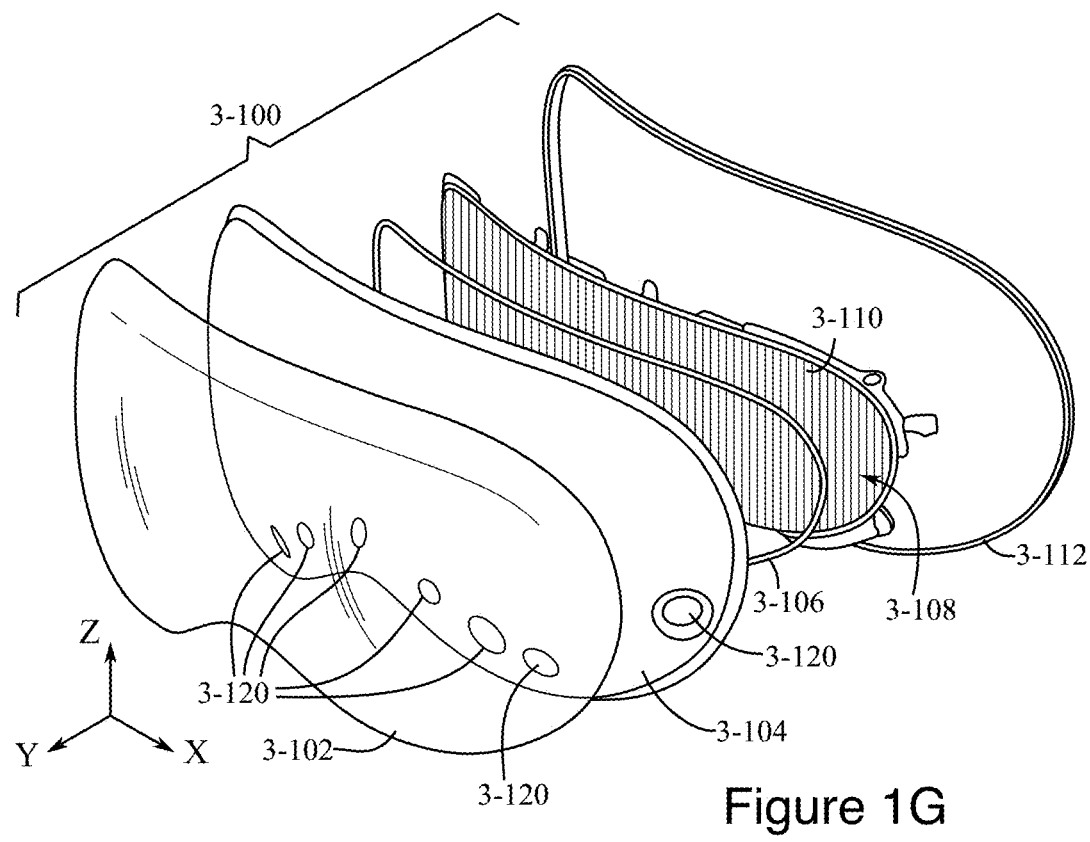
Figure 1H:
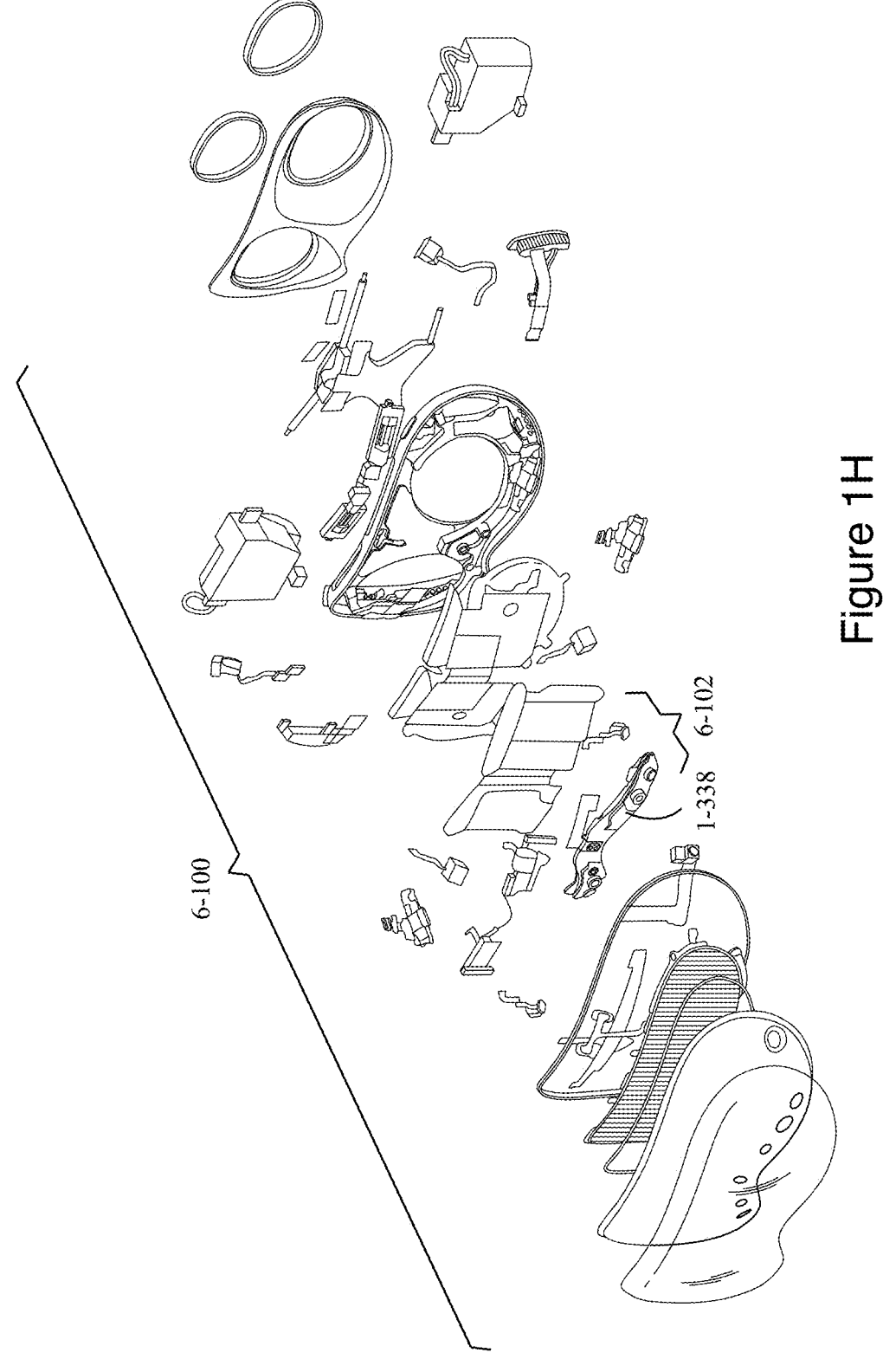
Figure 1I:
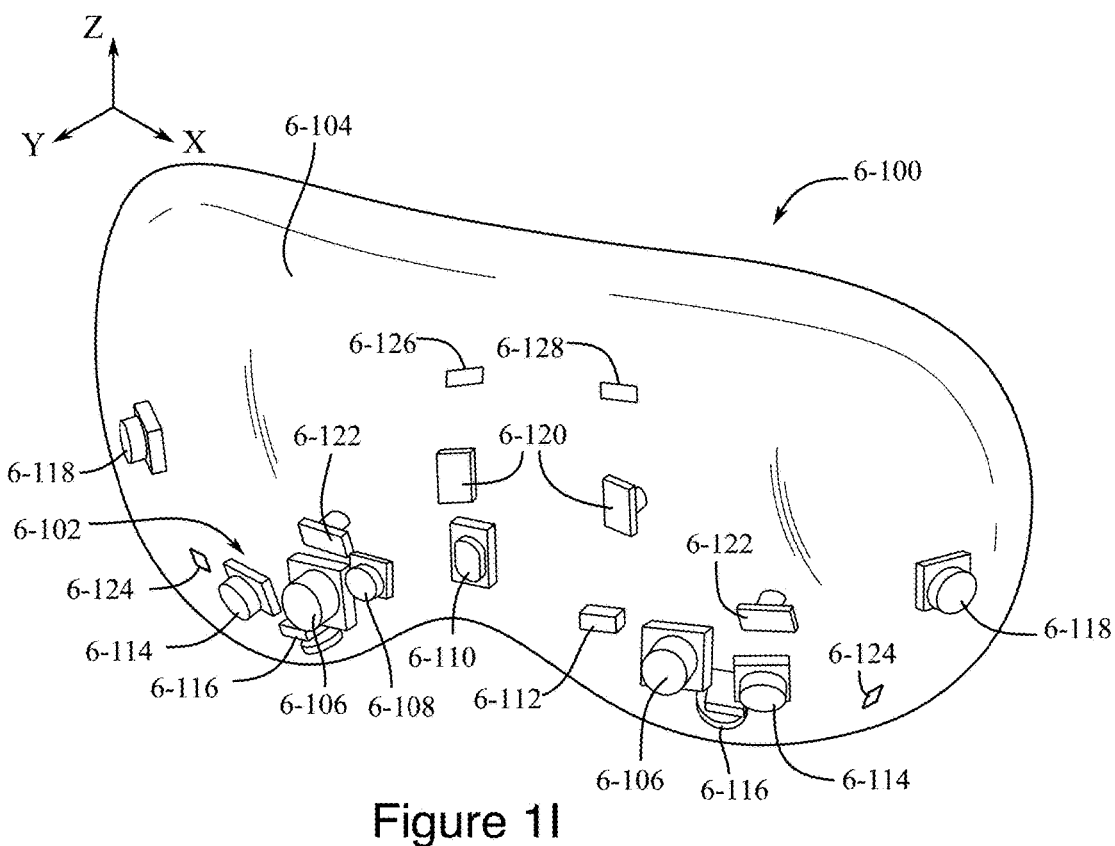
Figure 1J:
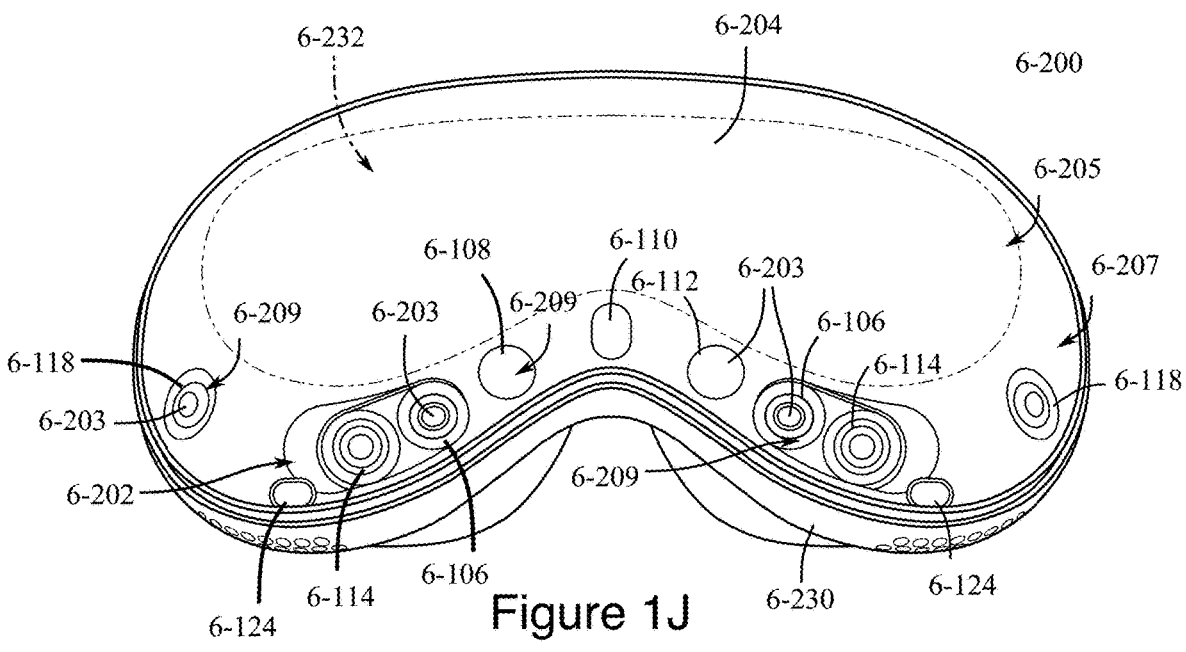
Figure 1K:
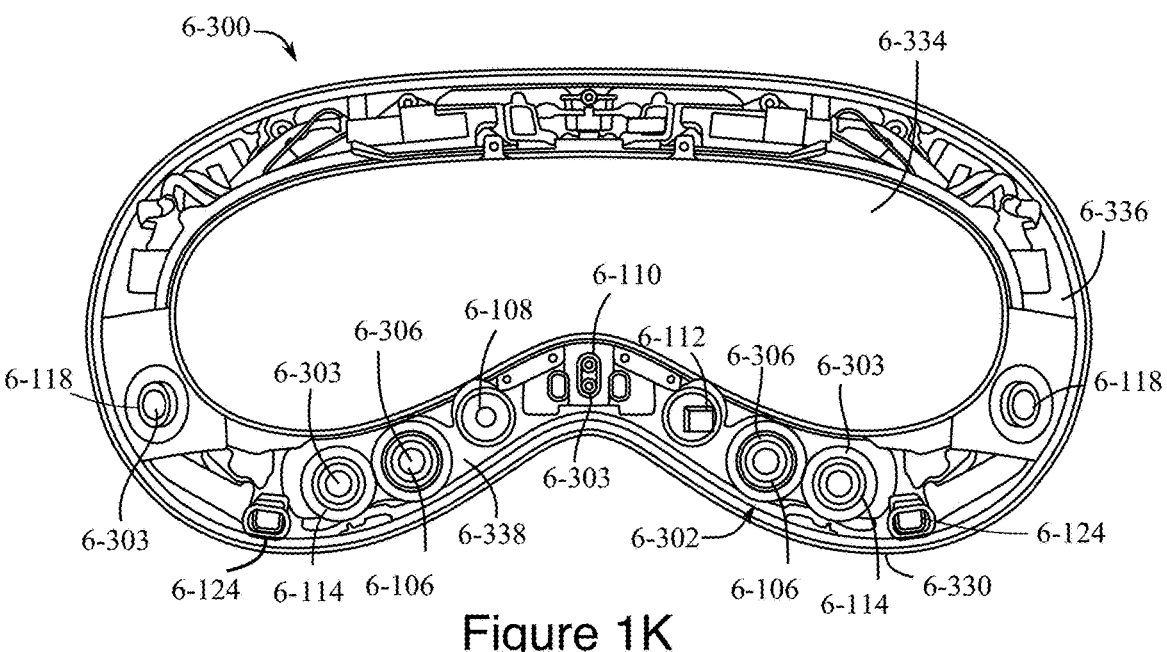
Figure 1L:
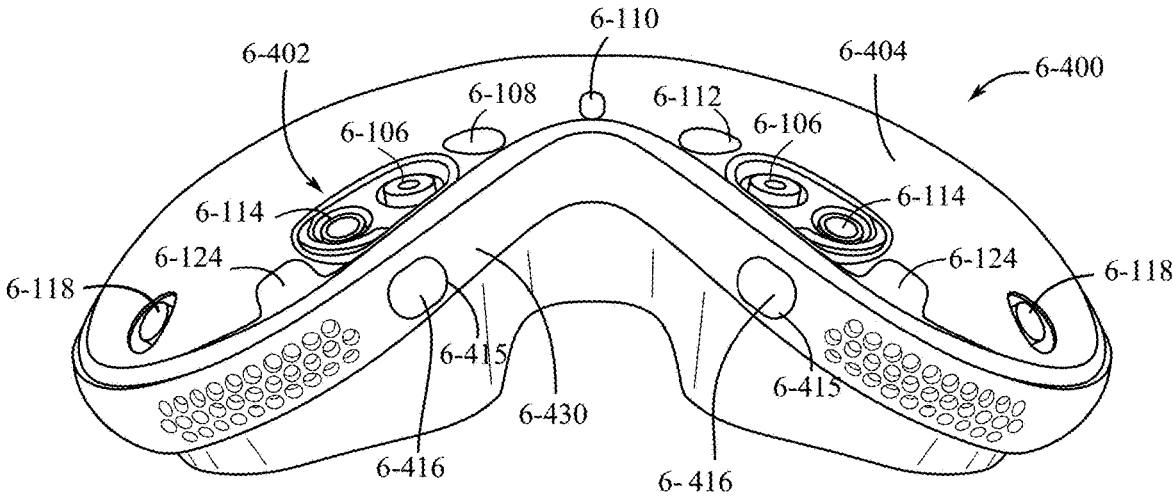
Figure 1M:
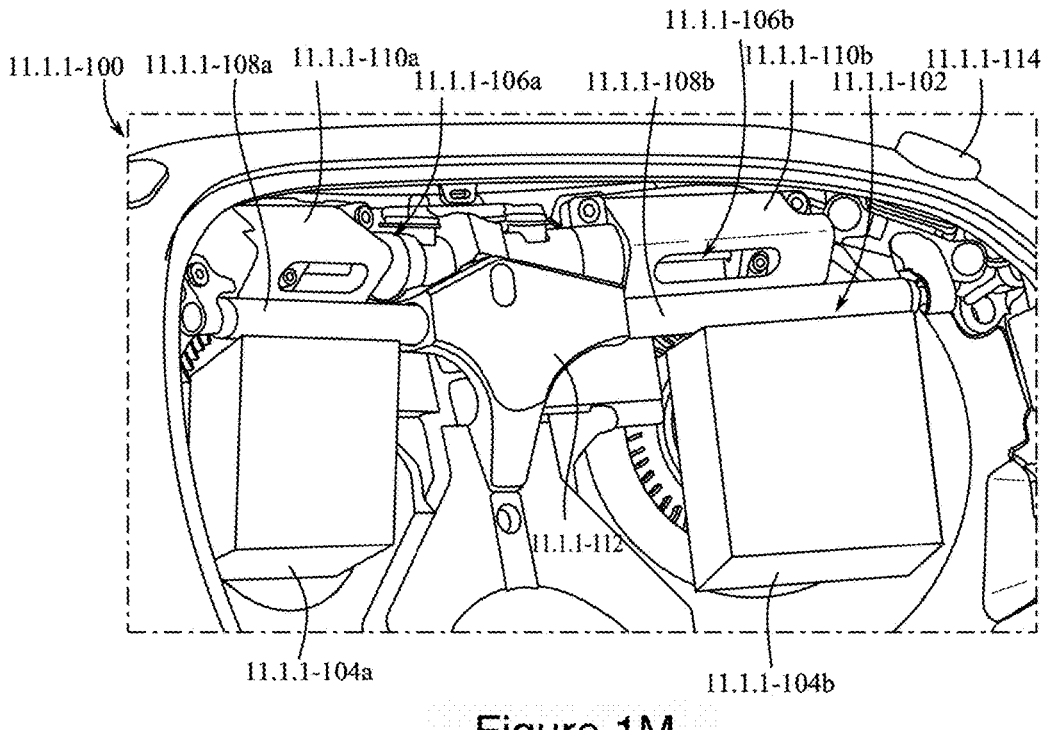
Figure 1N:
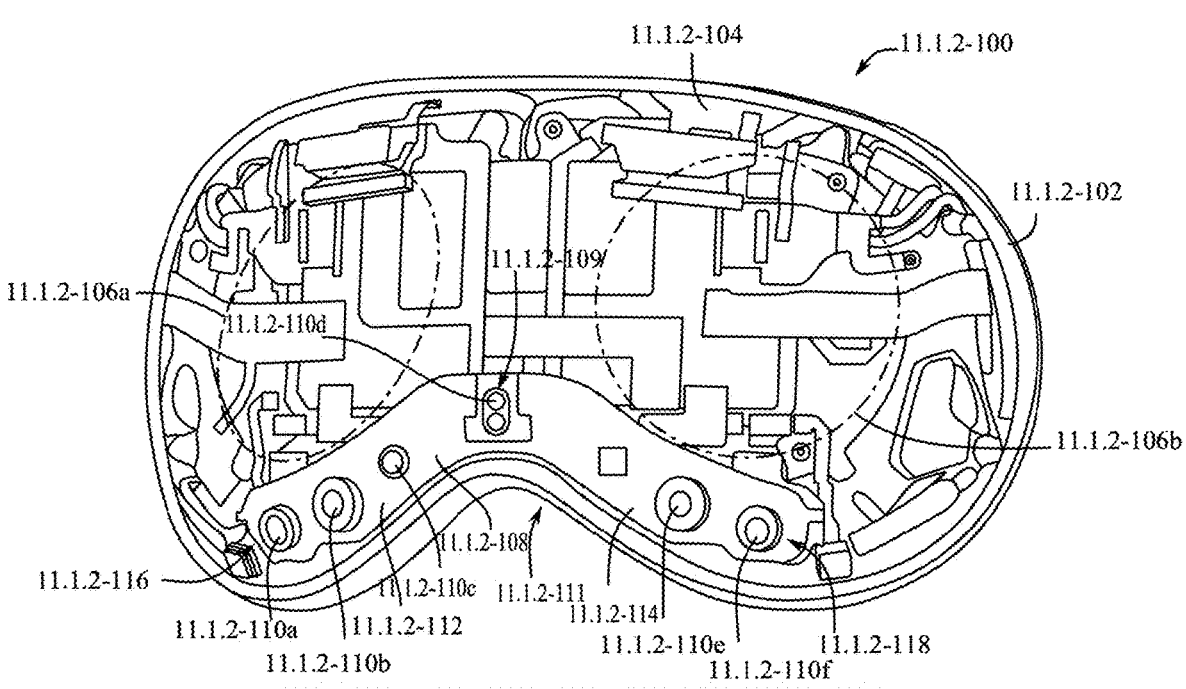
Figure 1O:
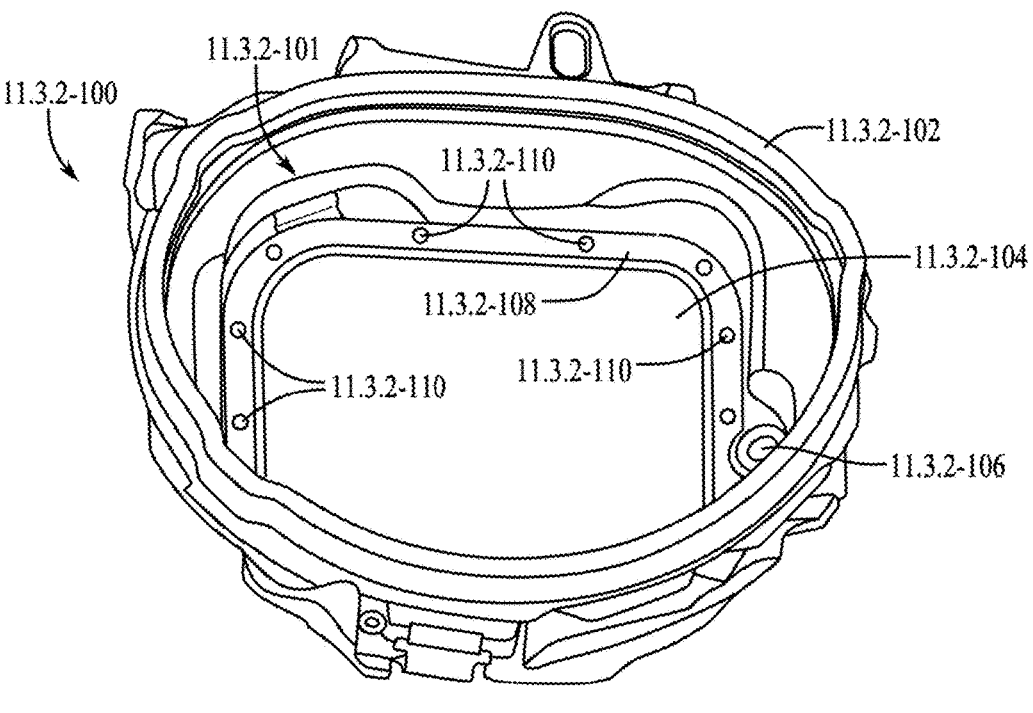
Figure 1P:
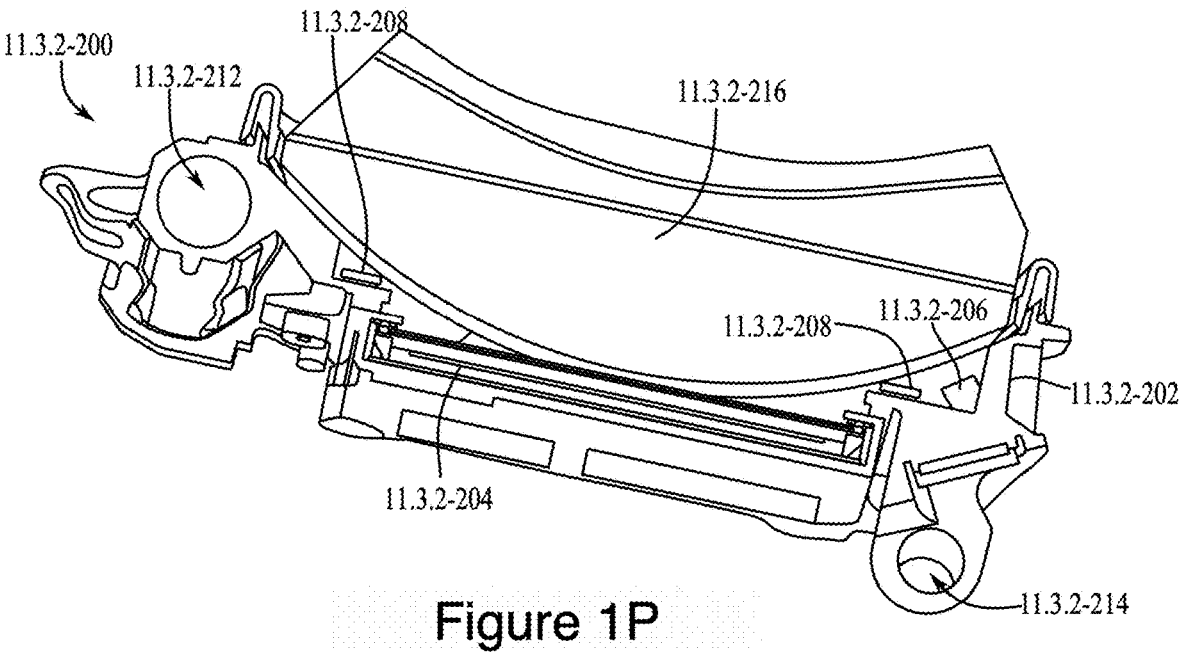

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures)

disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120a-b. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first secure-ment strap 1-205*a* can include a first electronic component 1-212*a* and the second securement strap 1-205*b* can include a second electronic component 1-212*b*. In at least one example, the first and second straps 1-205*a-b* can be remov-ably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322*a*, 1-322*b* disposed between the frame 1-350 and the curtain assembly 1-324.

In at least one example, the display unit 1-306 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assem-bly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. For hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the AMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106a, 11.1.2-106b. The apertures 11.1.2-106a-b are shown in dotted lines in FIG. 1N because a view of the apertures 11.1.2-106a-b can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106a-b.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106a-b such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110a-f. Each sensor of the plurality of sensors 11.1.2-110a-f can include various types of sensors, including cameras, IR sensors, and so forth. In some examples, one or more of the sensors 11.1.2-110a-f can be used for object recognition in three-dimensional space such that it is important to maintain a precise relative position of two or more of the plurality of sensors 11.1.2-110a-f. The cantilevered nature of the mounting bracket 11.1.2-108 can protect the sensors 11.1.2-110a-f from damage and altered positioning in the case of accidental drops by the user. Because the sensors 11.1.2-110a-f are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110a-f coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
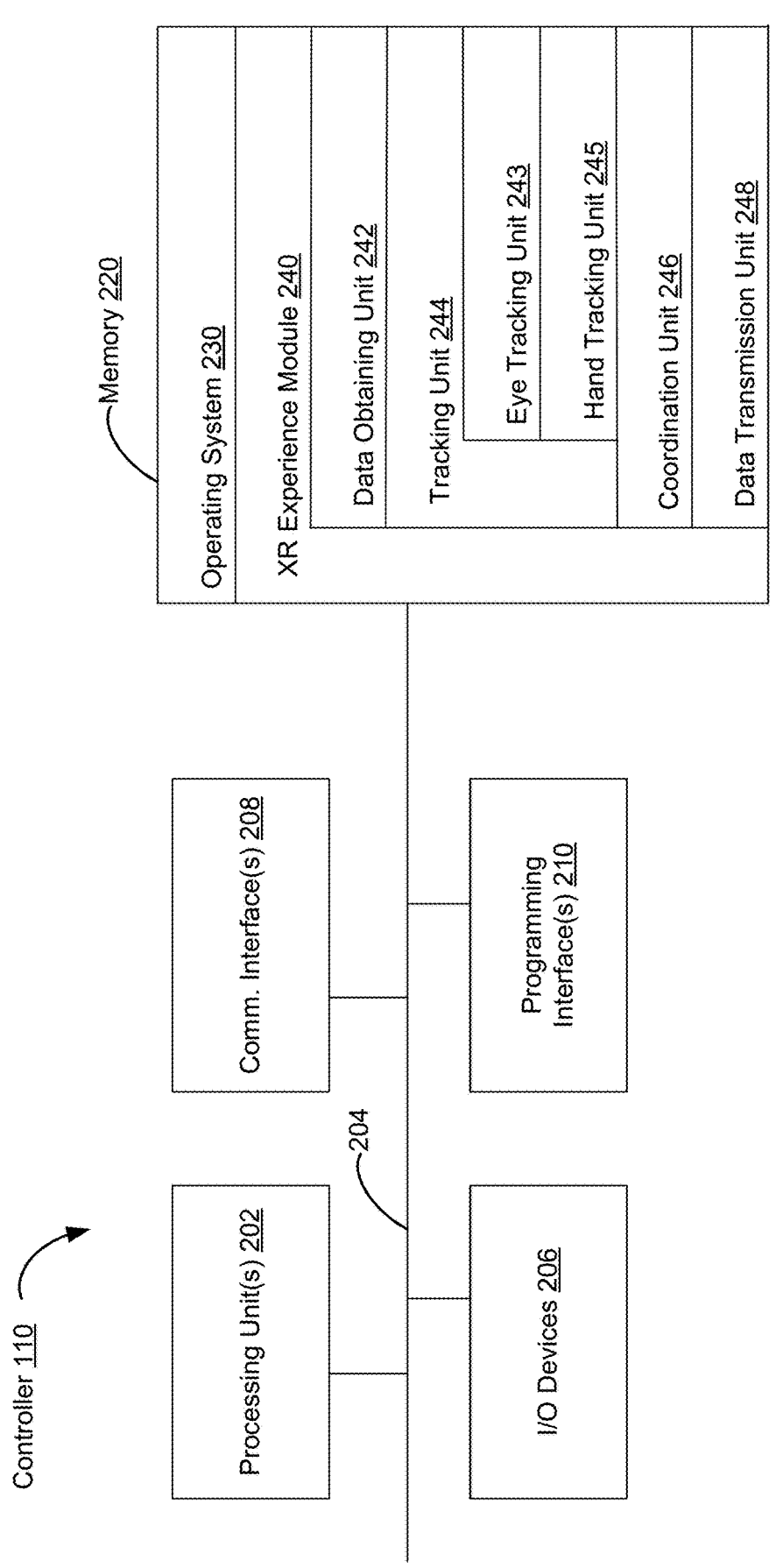
FIG. 2 is a block diagram illustrating a controller of a computer system that is configured to manage and coordinate an XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 245 and/or eye tracking unit 243. In some embodiments, the hand tracking unit 245 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 245 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, and/or other types of data) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 245), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 245), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
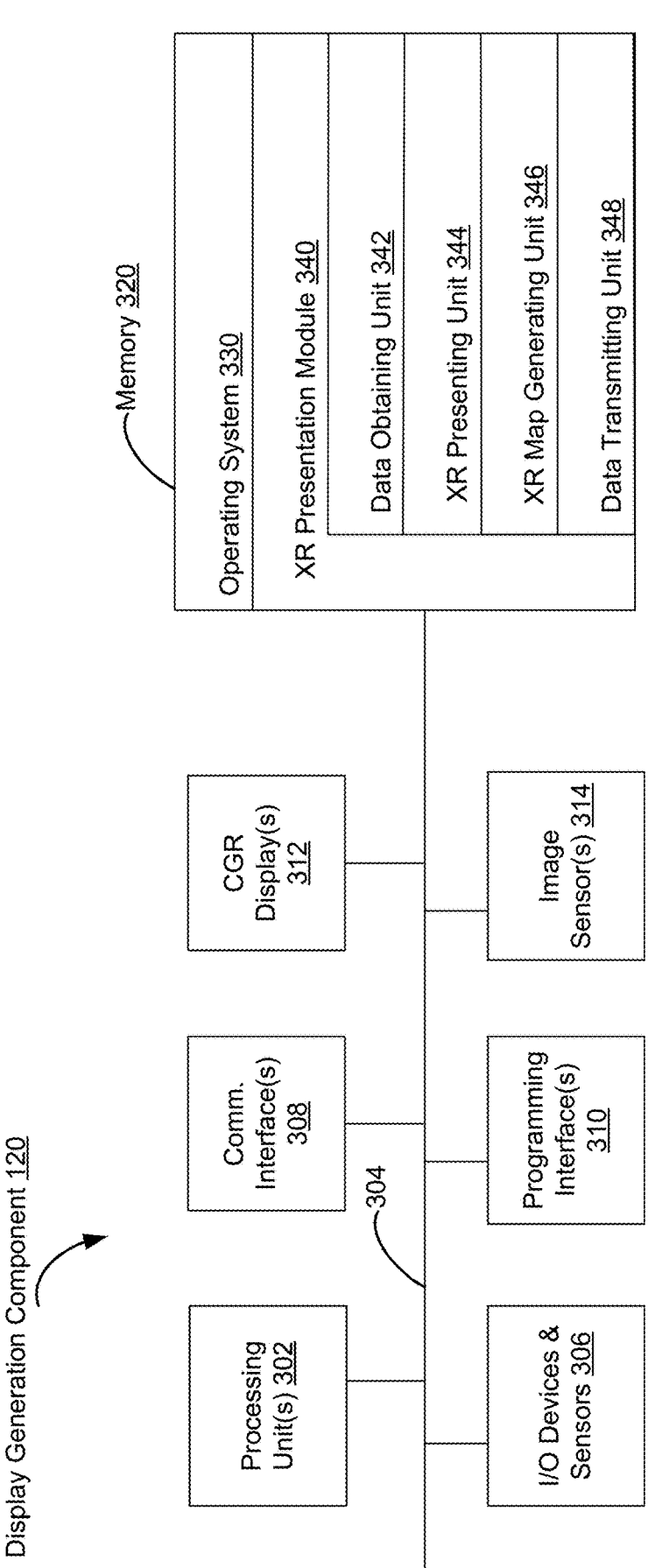
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IU), an accelerometer, a gyroscope, a thermometer, one or more physiological sensors (e.g., blood pressure monitor, heart rate monitor, blood oxygen sensor, blood glucose sensor, and/or other types of sensors), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transistor (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, waveguide and/or other types of displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, and/or other types of data) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, and/or other types of data) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
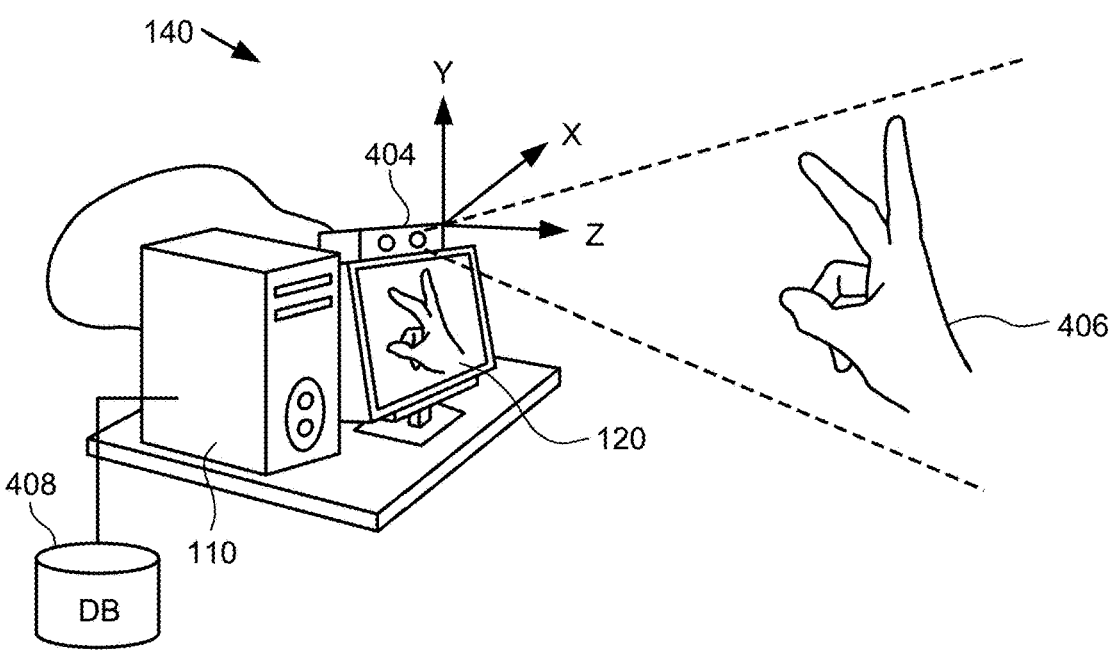
FIG. 4 is a block diagram illustrating a hand tracking unit of a computer system that is configured to capture gesture inputs of the user in accordance with some embodiments.
Figure 4:
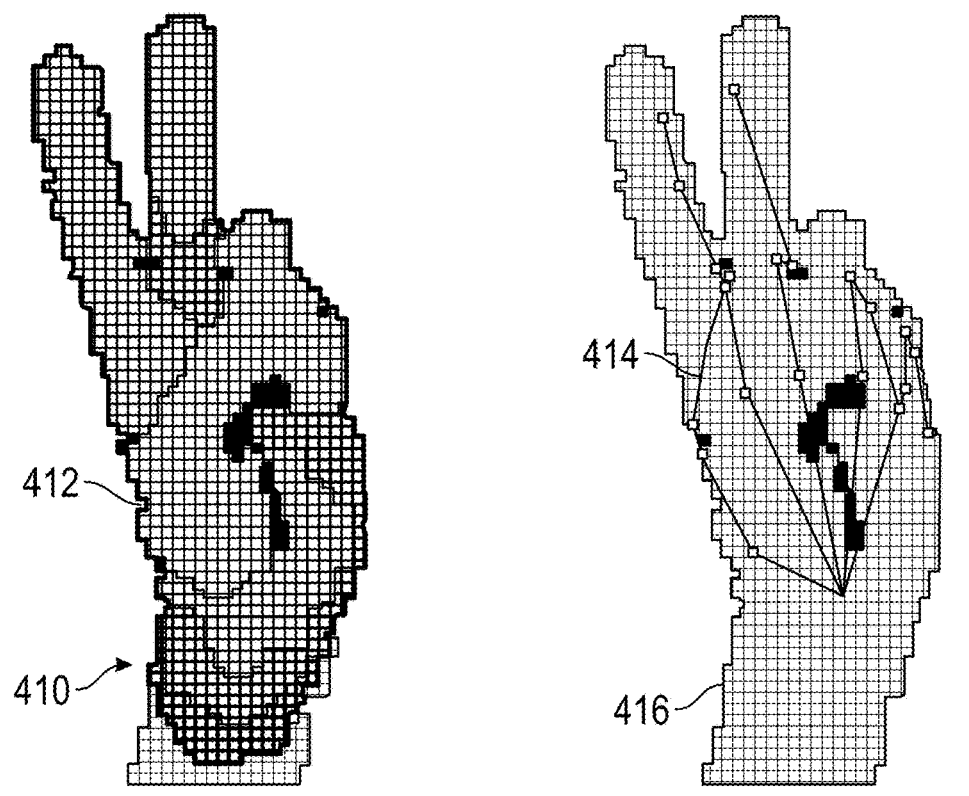

FIG. 4 is a schematic, pictorial illustration of an example embodiment of the hand tracking device 140. In some embodiments, hand tracking device 140 (FIG. 1A) is controlled by hand tracking unit 245 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, and/or other types of image sensors) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture (e.g., an air drag gesture or an air swipe gesture) includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user, user inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, wherein the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, fingertips, center of the palm, and/or end of the hand connecting to wrist) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
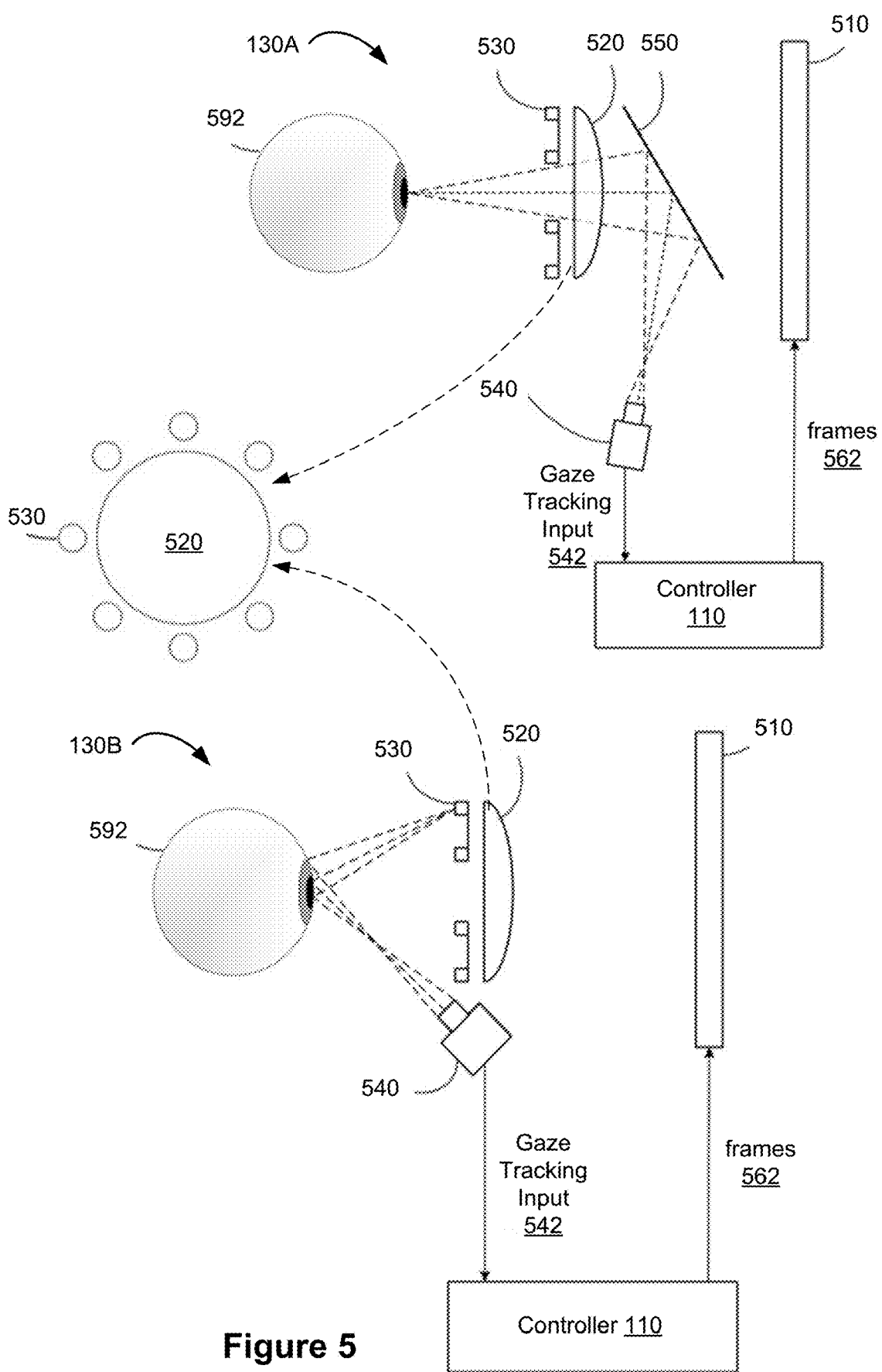
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, and/or other eye parameters. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and a light source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, and/or other types of displays) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
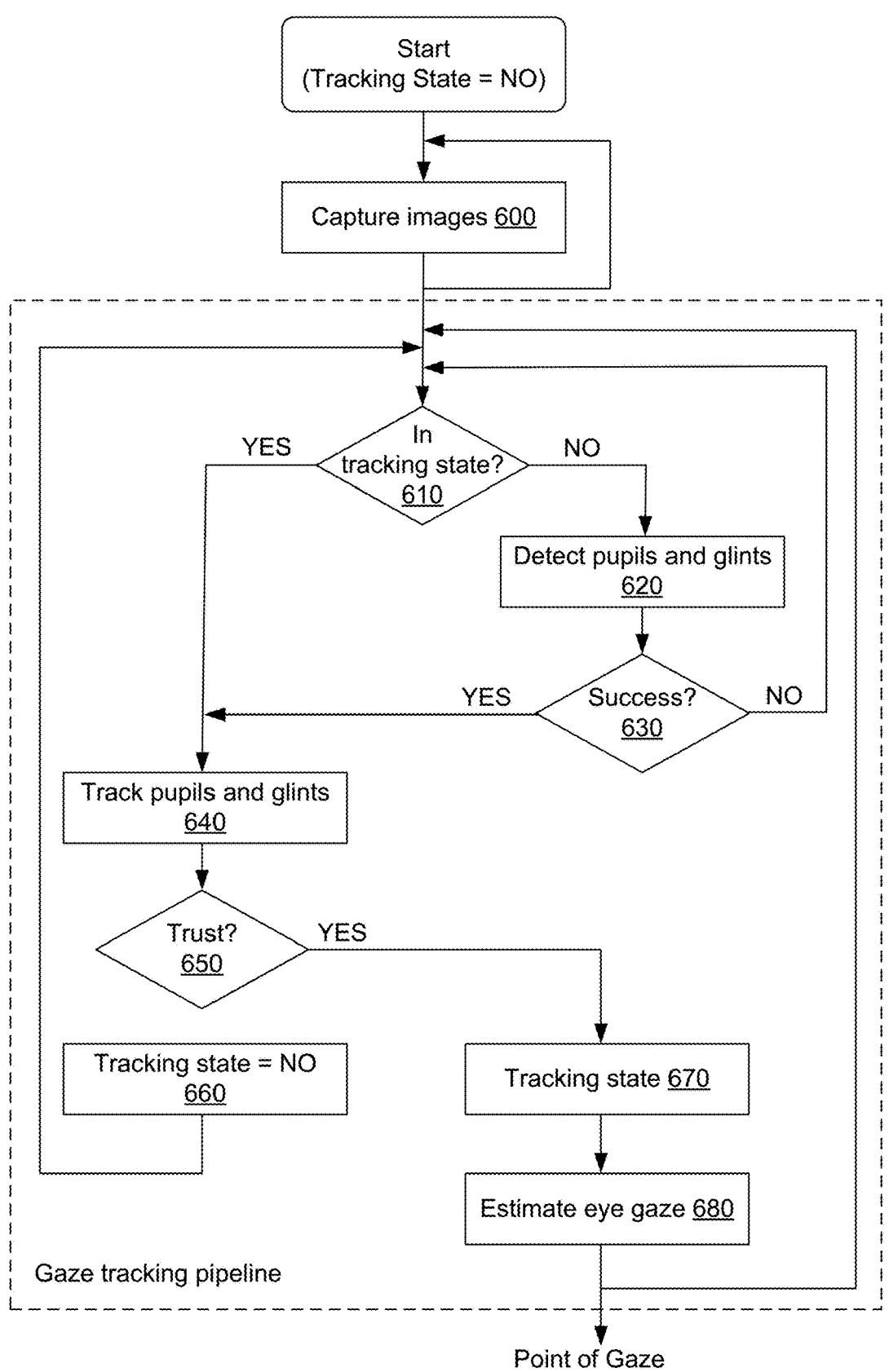
FIG. 6 is a flowchart illustrating a glint-assisted gaze tracking pipeline in accordance with some embodiments.
Figure 7A:
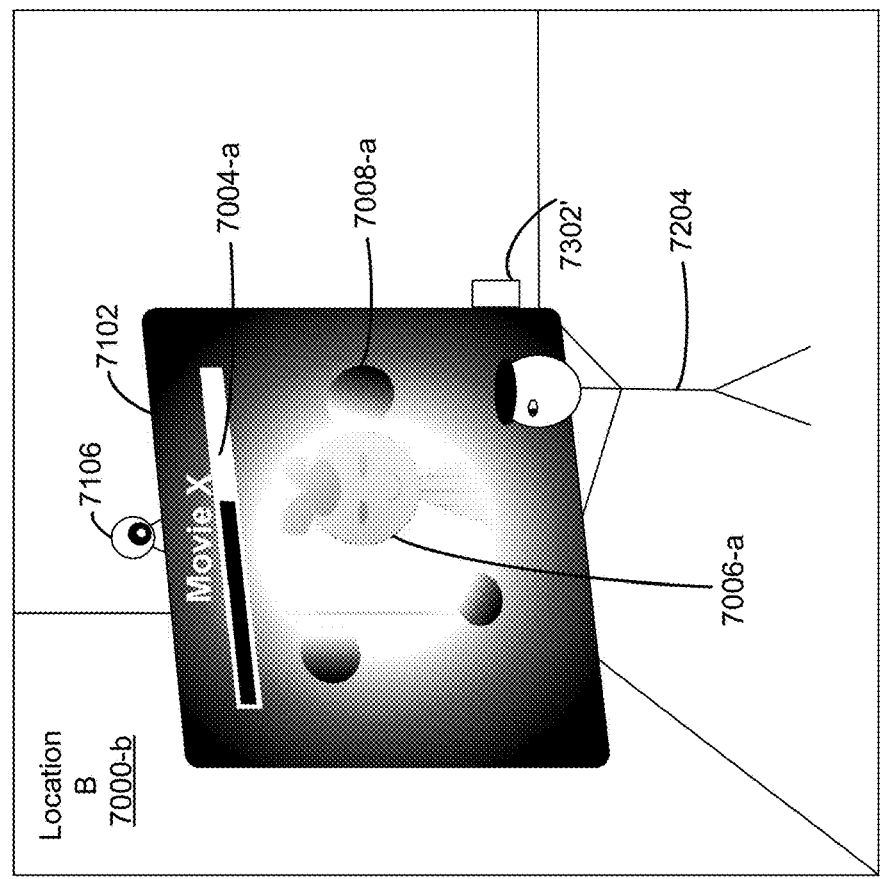
FIGS. 7A-7F illustrate a computer system that displays XR content to a user via a first display generation component and dynamically updated status information associated with the user via a second display generation component, where the status information includes a respective representation of a portion of the body of the user that has different levels of fidelity depending on whether the user meets first criteria, in accordance with some embodiments.
Figure 7A:
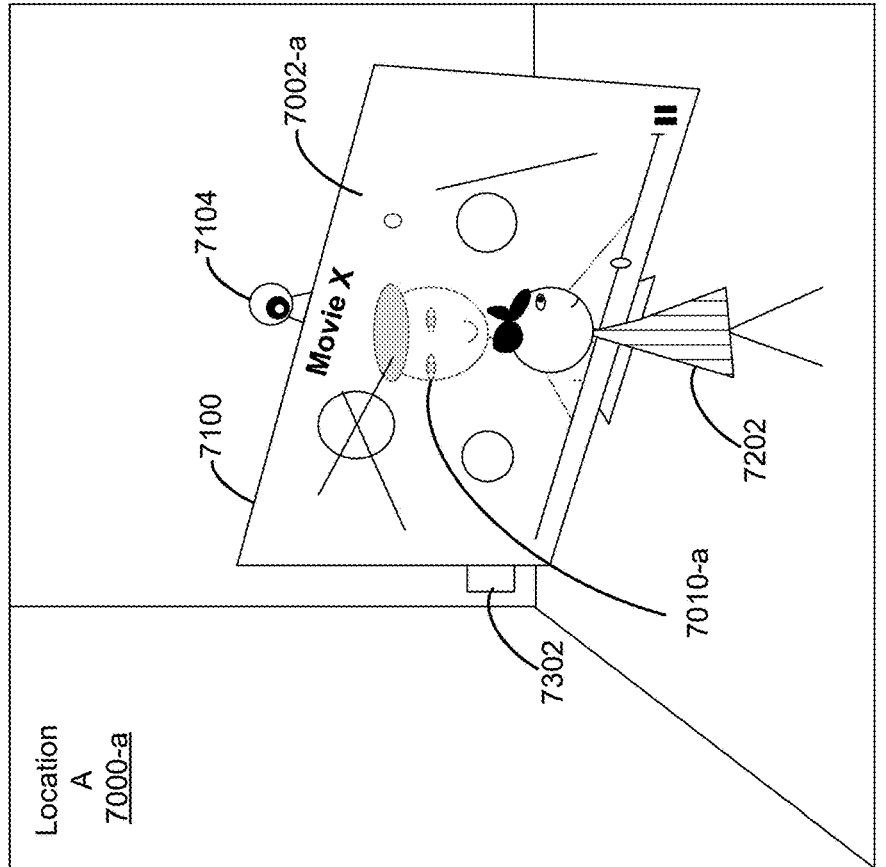

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points).

In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with one or more display generation components, one or more input devices, and (optionally) one or more cameras.

FIGS. 7A-7AB2 illustrate a computer system (e.g., computer system 101 in FIG. 1A or computer system 140 in FIG. 4) that includes and/or is in communication with at least a first display generation component (e.g., illustrated as a display generation component 7100) and a second display generation component (e.g., illustrated as a second display generation component 7102), where the computer system displays computer-generated XR content to a user via the first display generation component (e.g., display 7100) while displaying dynamically updated status information associated with the user and/or the computer-generated XR content, and/or displaying visual alerts related to media capture and/or incoming communication requests via the second display generation component (e.g., display 7102), in accordance with some embodiments. Furthermore, in some embodiments, the computer system displays a representation of a portion of the body of the user, e.g., as part of the dynamically updated status information associated with the user and/or the computer-generated XR content, via the second display generation component (e.g., display 7102, or another display), and alters the value of at least a first display parameter of the representation of the portion of the user based on changes in a set of environmental parameters for a physical environment in which the representation of the portion of the body of the user is displayed. In some embodiments, depending on the visual properties of the representation of the portion of the body of the user, the computer system alters the value of at least the first display parameter of the representation of the portion of the user in different manners for a same change in the set of environmental parameters (e.g., dimming and/or otherwise changing another display parameter of the representation of the portion of the body of the user by different amounts for the same change in ambient lighting or other environmental parameter, if the visual properties of the representation are different by more than a threshold amount). FIGS. 7A-7AB2 are used to illustrate the processes described below, including the processes in FIGS. 8-13.

In some embodiments, the display generation component (s), including first display generation component 7100 and/or second display generation component 7102 comprises a head mounted display (HMD) (e.g., HMD device 1-100 described with reference to FIGS. 1A-1P). In some embodiments, the head mounted display includes one or more inward-facing displays (e.g., second display generation component 7100) (e.g., labeled "BACK" of HMD 7100*a* in FIGS. 7G2, 7H2, 7L2, 7M2, 7N2, 7AA2, and 7AB2)) that displays a representation of a portion of the three-dimensional environment that corresponds to the perspective of the user that is wearing the HMD (e.g., first user 7202, first user 7206, and/or another user) and one or more outward-facing displays (e.g., second display generation component 7102) (e.g., labeled "FRONT" of HMD 7100*a* in FIGS. 7G2, 7H2, 7L2, 7M2, 7N2, 7AA2, and 7AB2)) that optionally displays status information associated with the user that is wearing the HMD. In some embodiments, the back of HMD 7100*a* corresponds to the rear view of HMD 1-100 described with reference to FIG. 1C, where the back of HMD 7100*a* includes one or more displays for displaying the user interface (e.g., first and second display assemblies 1-120*a*, 1-120*b* and/or first and second optical modules 11.1.1-104*a* and 11.1.1-104*b*) to the user that wears the HMD. In some embodiments, the front of HMD 7100*a* corresponds to the front perspective view of HMD 1-100, where the front of HMD 7100*a* includes one or more external displays (e.g., display assembly 1-108).

In some embodiments, the front of HMD 7100*a* includes portions 3-120 (e.g., as described above with reference to FIG. 1G), in which sensors (e.g., one or more sensors in sensor assembly 1-356, and/or FIG. 1I) can extend or send and receive signals. In some embodiments, HMD 7100*a* includes one or more sensors (e.g., one or more interior-and/or exterior-facing image sensors 314) (e.g., one or more sensors in sensor assembly 1-356, and/or FIG. 1I), such as sensor 190*a*, sensor 7104 and/or sensor 7106 for detecting a state of the user wearing the HMD 7100*a*, including facial and/or eye tracking of the user (e.g., using one or more inward-facing sensors 190*a* and/or 7104) (e.g., eye tracking and gaze tracking sensors in FIG. 1I which can be used (optionally in conjunction with one or more lights such as lights 11.3.2-110 in FIG. 1O)) to determine attention or gaze position and/or gaze movement which can optionally be used to detect gaze-only inputs based on gaze movement and/or dwell and/or tracking hand, torso, or other movements of the user (e.g., using one or more outward-facing sensors 7106). In some embodiments, HMD 7100*a* includes one or more input devices that are optionally located on a housing of HMD 7100*a*, such as one or more buttons, trackpads, touchscreens, scroll wheels, digital crowns that are rotatable and depressible or other input devices. In some embodiments input elements are mechanical input elements, in some embodiments input elements are solid state input elements that respond to press inputs based on detected pressure or intensity. For example, in FIGS. 7G2, 7H2, 7L2, 7M2, 7N2, 7AA2, and 7AB2), HMD 7100*a* includes one or more of button 7302 (e.g., and/or button 11.1.1-114, second button 1-132, and or dial or button 1-328) and a digital crown (e.g., first button 1-128 and/or button 11.1.1-114, and/or dial or button 1-328) for providing inputs to HMD 7100*a*. It will be understood that additional and/or alternative input devices may be included in HMD 7100*a*.

While an HMD typically includes multiple displays including a display for a right eye and a separate display for a left eye that display slightly different images to generate user interfaces with stereoscopic depth, in the figures a single image is shown that corresponds to the image for a single eye and depth information is indicated with other annotations or description of the figures.

Figure 7B:
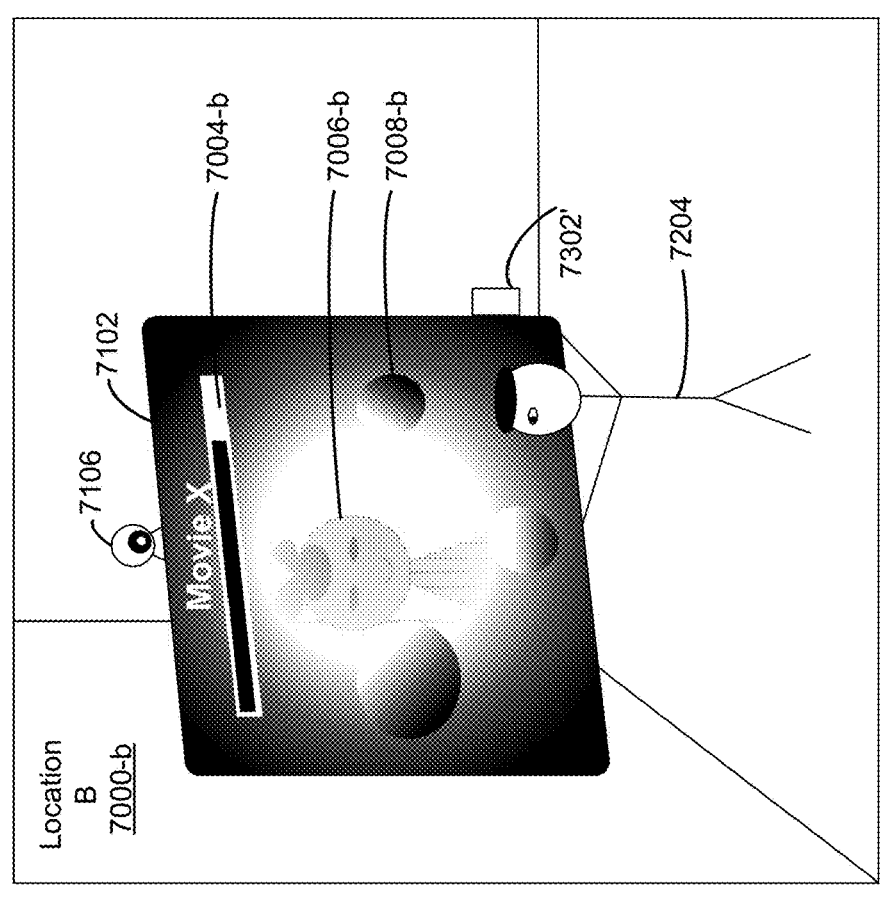
Figure 7B:
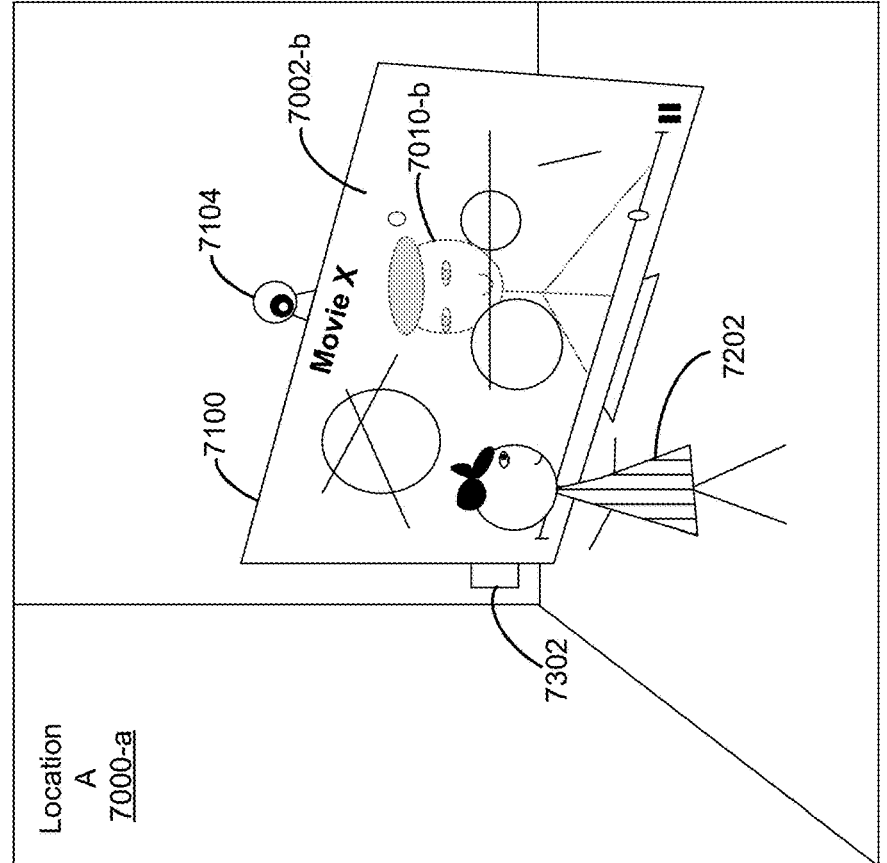
Figure 7C:
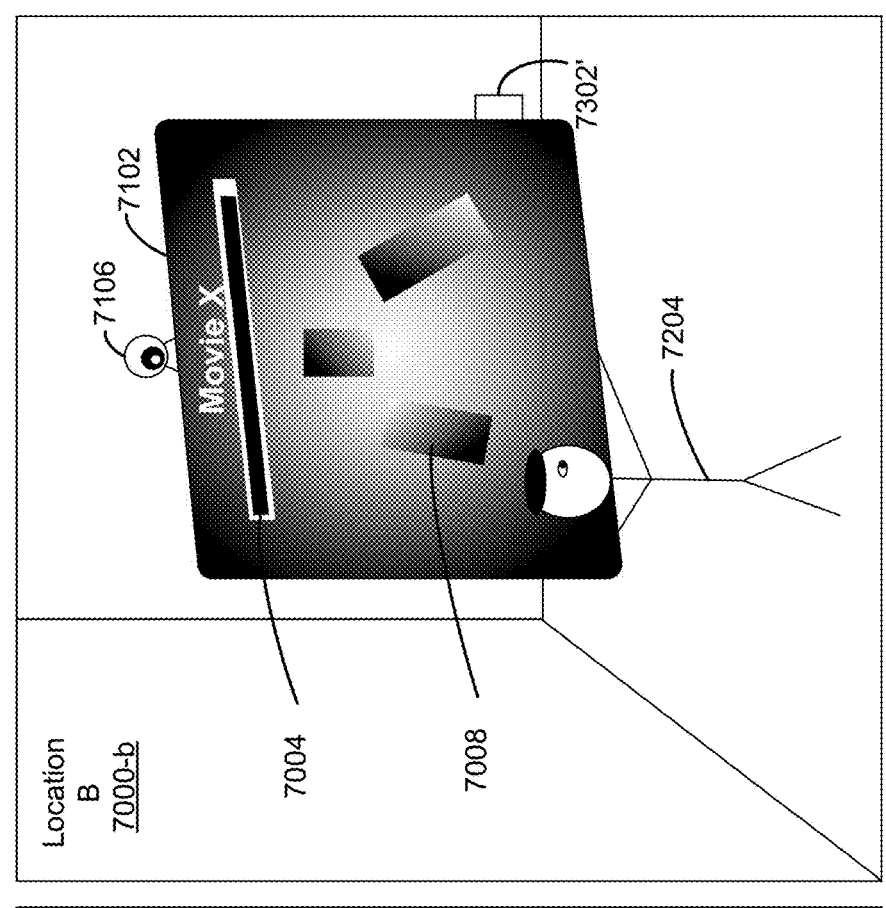
Figure 7C:
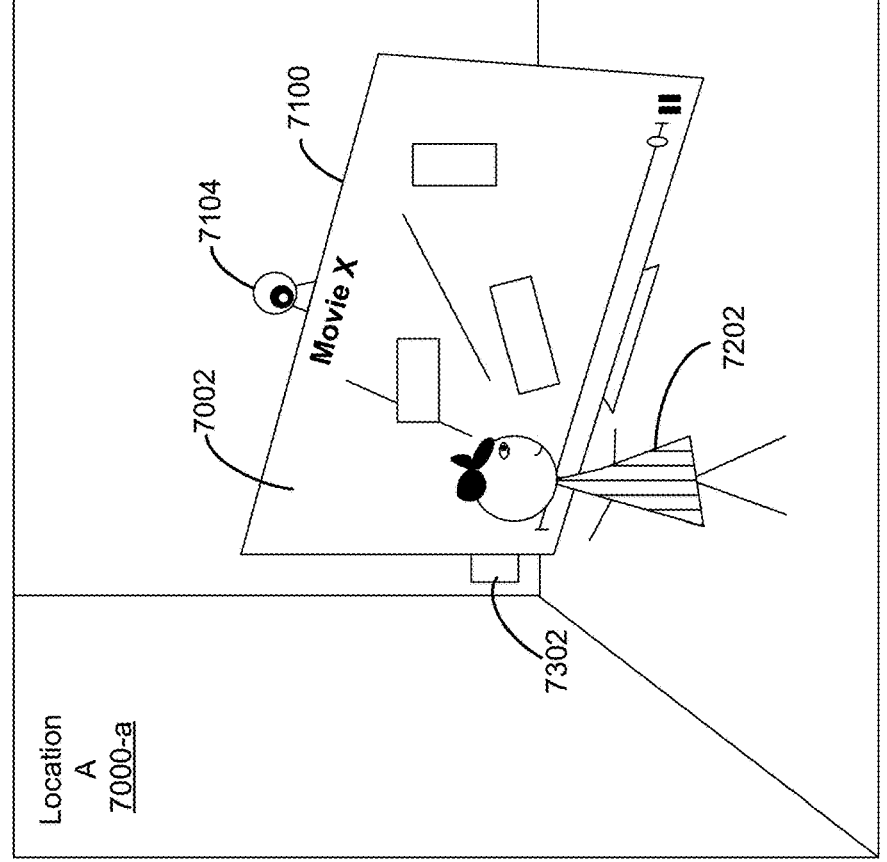
Figure 7D:
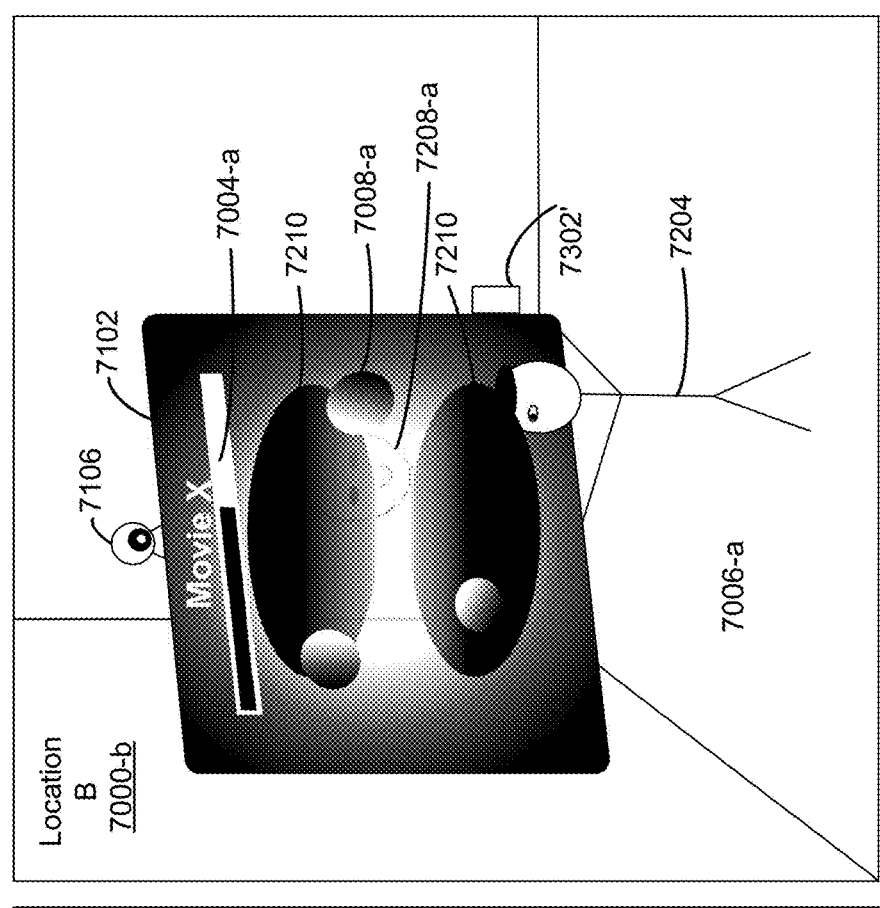
Figure 7D:
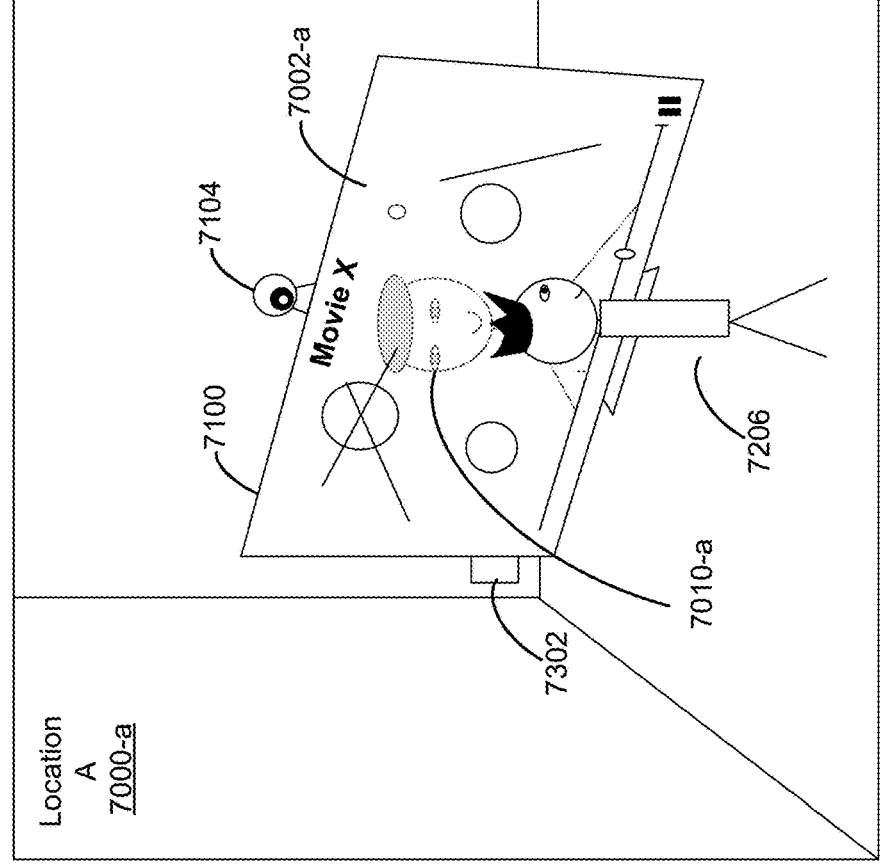
Figure 7E:
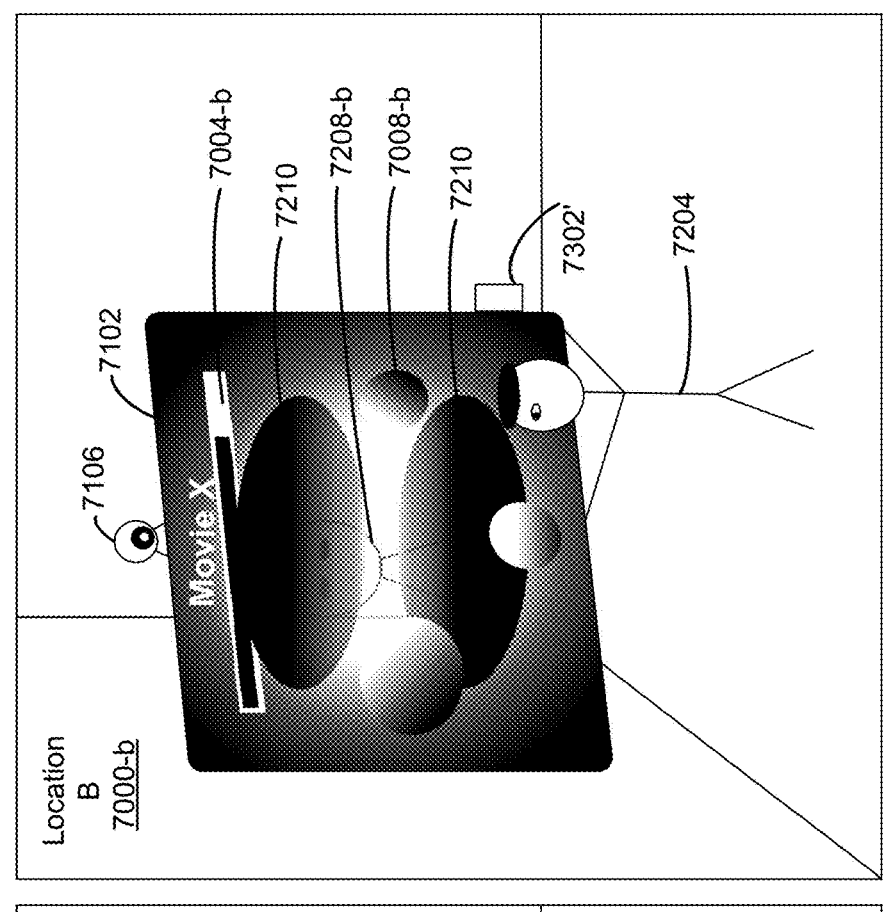
Figure 7E:
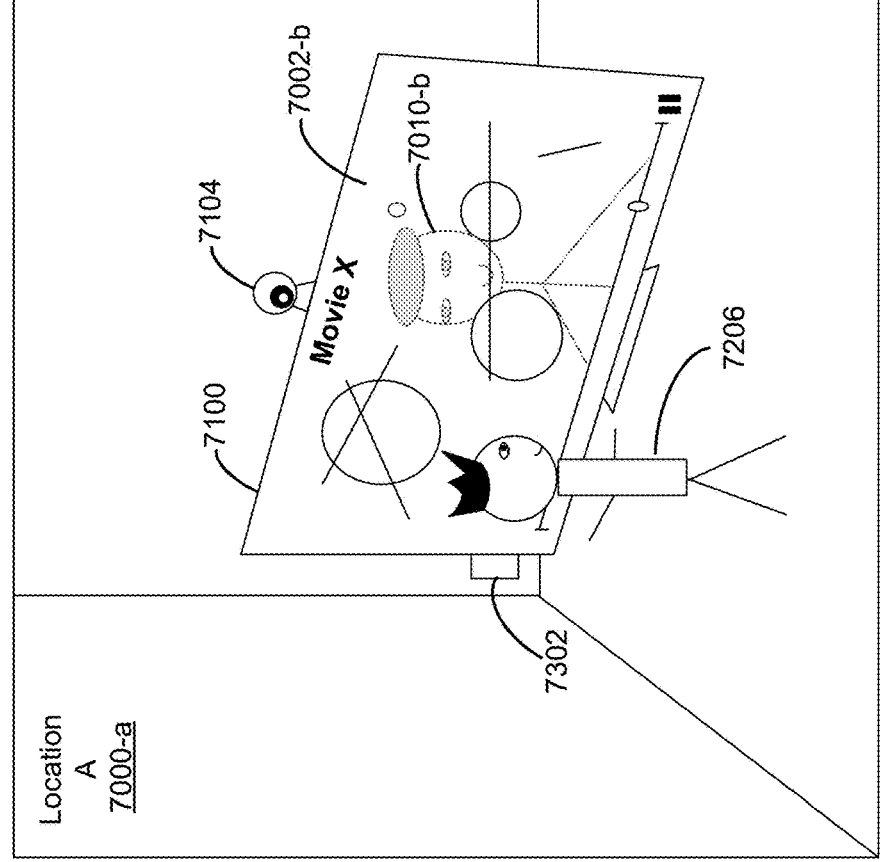
Figure 7F:
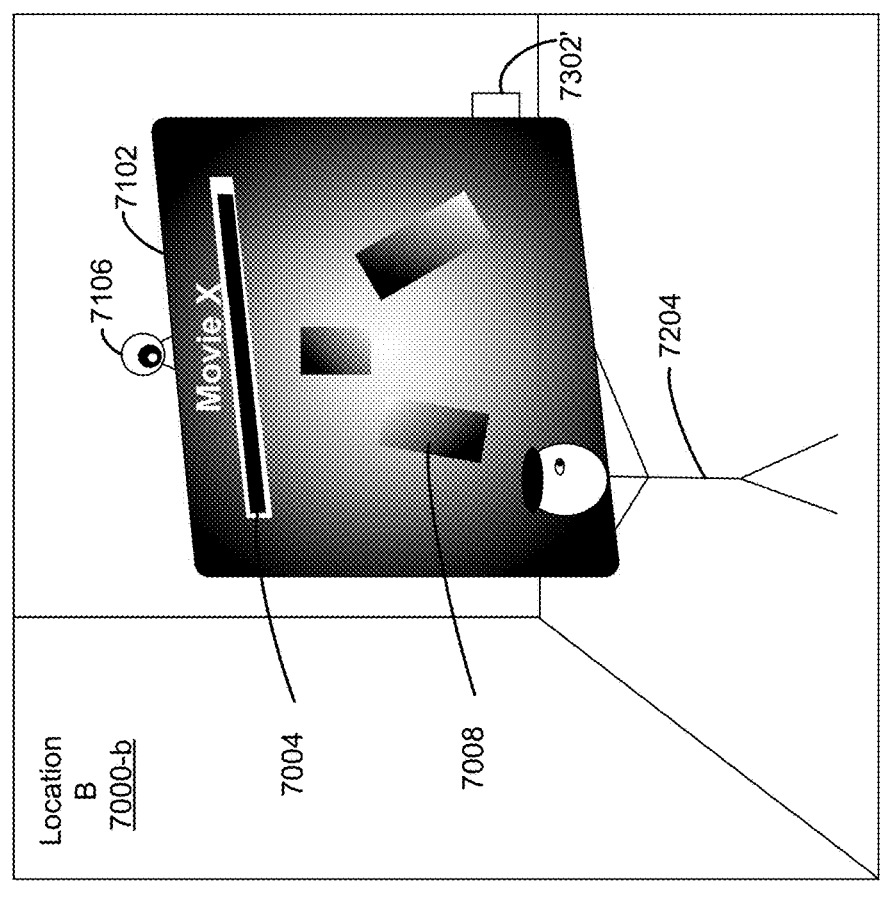
Figure 7F:
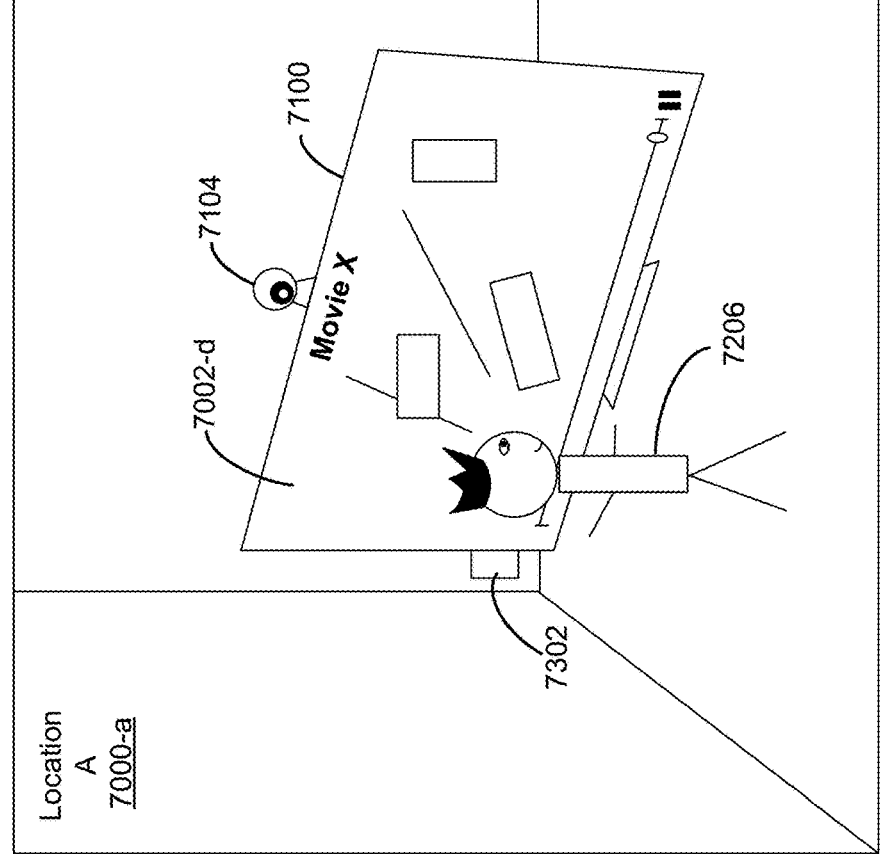
Figure 7I:
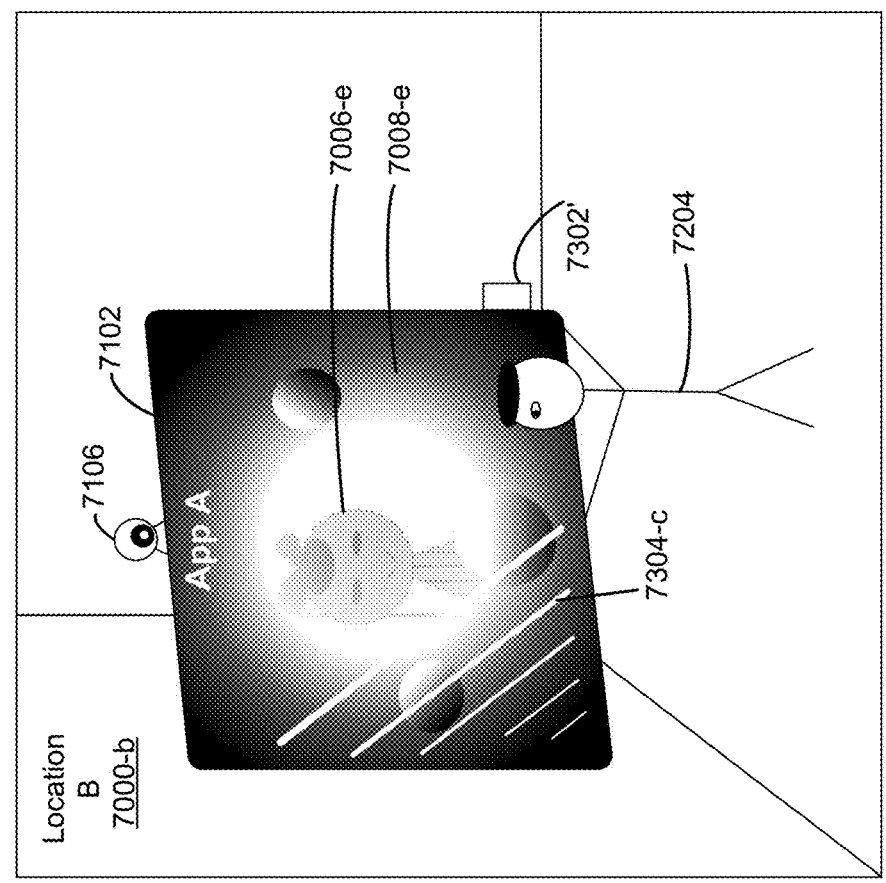
Figure 7I:
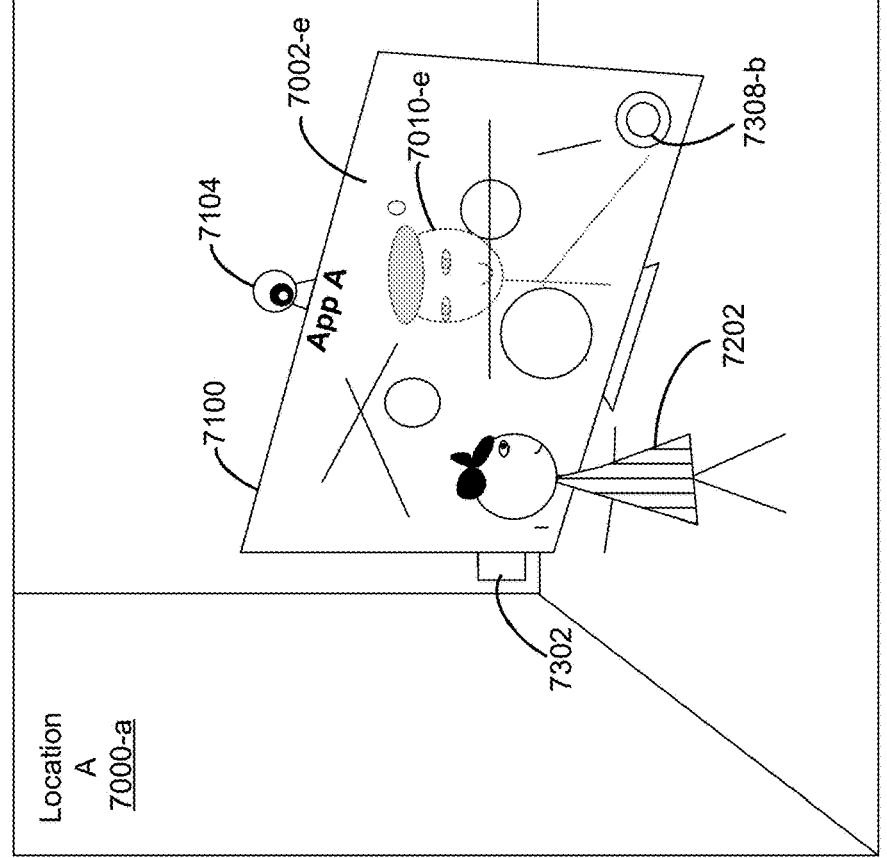
Figure 7J:
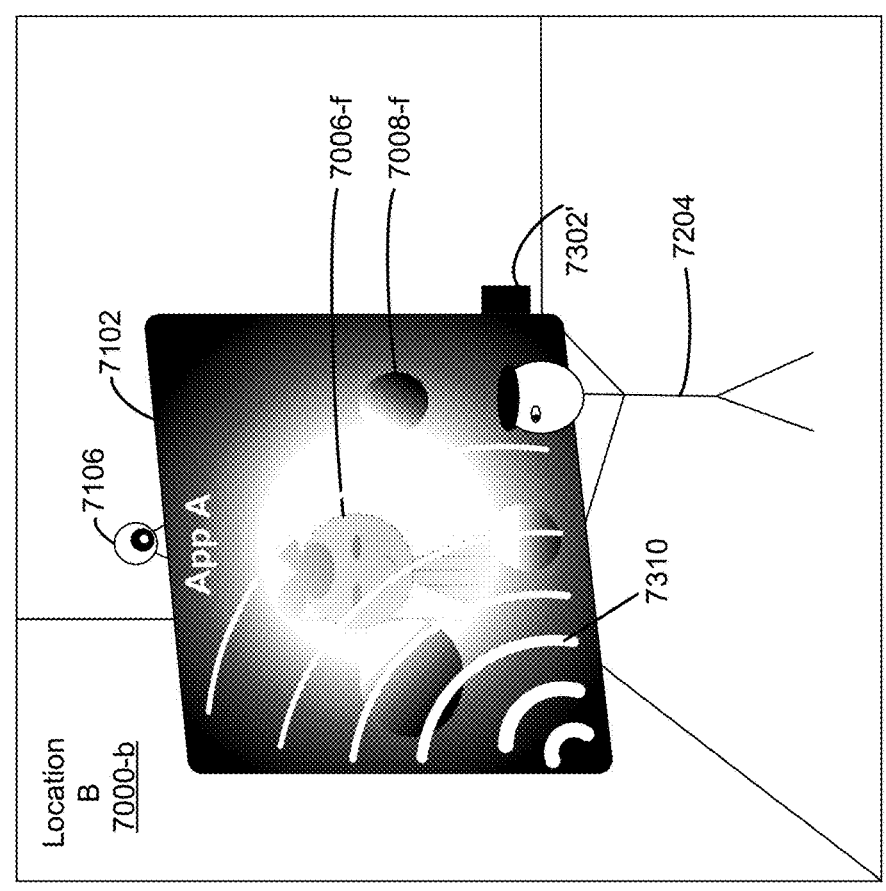
Figure 7J:
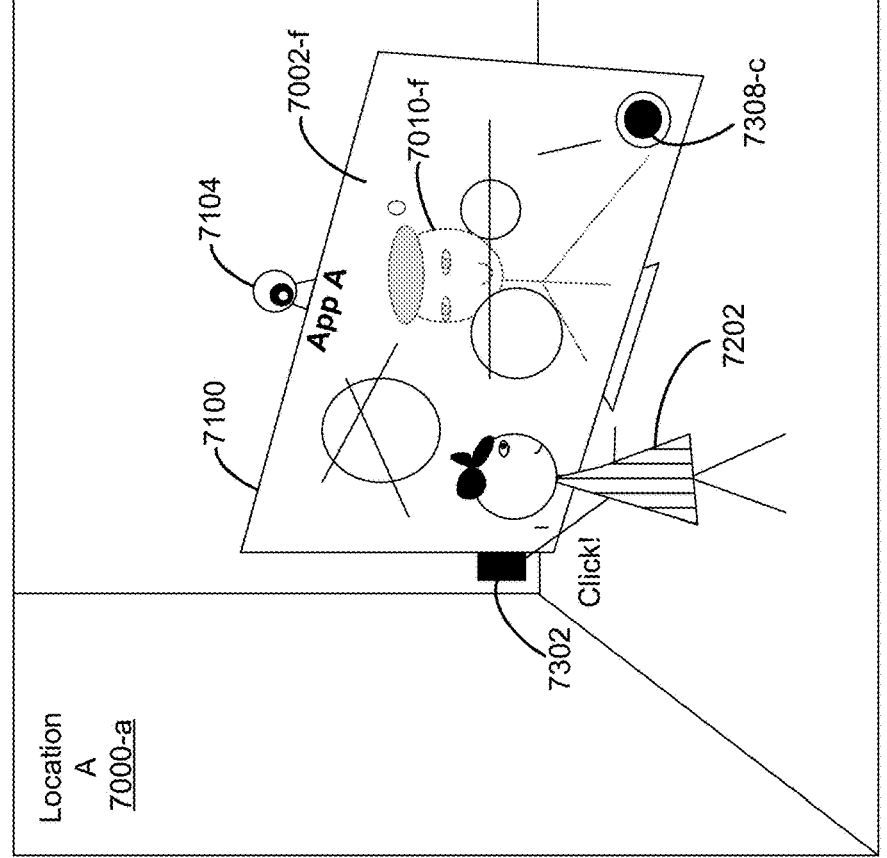

In FIGS. 7A-7F, two different users (e.g., a first user 7202 in FIGS. 7A-7C, and a third user 7206 in FIGS. 7D-7F) are respectively present in front of the display side the first display generation component 7100 through which XR content is displayed, and the computer system displays respective representations of a portion of the body of the two users with different levels of fidelity (e.g., the representation 7006 for the first user 7202 in FIGS. 7A-7B have a higher level of fidelity than the representation 7208 for the third user 7206 in FIGS. 7D-7E) in accordance with a determination of whether the user meets first criteria related to an identity of the user (e.g., in FIGS. 7A-7C, the first user 7202 meets the first criteria; and in FIGS. 7D-7F, the third user 7206 does not meet the first criteria), in accordance with some embodiments. In FIGS. 7A-7B, the computer system updates the appearance of the representation 7006 of the portion of the body of the first user 7202 in accordance with the change in appearance of the first user 7202; and in FIGS. 7D-7E, the computer system updates the appearance of the representation 7208 of the portion of the body of the third user 7206 in accordance with the change in appearance of the third user 7206, where the computer system continues to maintain a difference in the levels of fidelity with which the representation 7006 for the first user 7202 and the representation 7208 for the third user 7206 because the first user 7202 meets the first criteria while the third user 7206 does not, in accordance with some embodiments. In some embodiments, as shown in FIGS. 7C and 7F, when the level of immersion reaches above a threshold level of immersion (e.g., reaching a fully immersive state, or another highly immersive state), the computer system forgoes displaying the representation of the portion of the body of the user (e.g., the representation 7006 for the first user 7202 and the representation 7208 for the third user 7206) via the first display generation component, irrespective of whether the user meets the first criteria (e.g., the first user 7202 meets the first criteria, and the third user 7206 does not meet the first criteria), and only displays the status information of the CGR content (e.g., the overlay 7008 and the progress bar 7004 in FIGS. 7C and 7F, respectively). In some embodiments, when the level of immersion reaches above a threshold level of immersion (e.g., reaching a fully immersive state, or another highly immersive state), the computer system displays the same status information (e.g., optionally, including a generic representation for both the first user 7202 and the third user 7206, and the same overlay 7008 for the status of the XR content) via the second display generation component 7102, irrespective of whether the user meets the first criteria (e.g., the first user 7202 meets the first criteria, and the third user 7206 does not meet the first criteria). More details related to the characteristics of different levels of immersion for presenting XR content via the first display generation component 7100 and their impact on the display of XR content via the first display generation component and the display of the status information associated with the first user via the second display generation component 7102, are provided with respect to the method 8000 in FIG. 8, in accordance with some embodiments. More details of the computer system and interactions illustrated in FIGS. 7A-7F are provided below.

As show in the left portion of FIG. 7A, a first display generation component (e.g., illustrated as the first display generation component 7100) is present at location A 7000-*a* and displaying XR content (e.g., a three-dimensional movie, a virtual reality game, a video, and/or a three-dimensional environment that includes user interface objects and, optionally, a representation of the physical environment). A first user 7202 is also present at location A 7000-*a*.

As shown in the right portion of FIG. 7A, the second display generation component (e.g., illustrated as the second display generation component 7102) is present at location B 7000-*b* and displaying status information associated with the first user (e.g., including status information corresponding to the first user 7202 and/or to the XR content presented via the first display generation component 7100). In the example scenario illustrated in FIG. 7A, a second user 7204 is, optionally, present at location B 7000-*b*. The second user 7204, for the purposes of the discussion herein, is not a user of the computer system and does not proactively provide user inputs to the computer system using the input devices of the computer system to interact with the computer system (even though, optionally, the computer system detects the actions and appearances of the first user as contextual information gathered from the physical environment in some operations of the computer system), in accordance with some embodiments.

As shown in FIG. 7A, the spatial relationship between the first display generation component 7100 and the first user 7202 is such that the first user 7202 is in a position to view the XR content 7002 presented via the first display generation component 7100. For example, the first user 7202 is facing toward a display side of the first display generation component 7100. In some embodiments, the first display generation component 7100 is an inner display of an HMD (e.g., HMD device 1-100 described with reference to FIGS. 1A-1P, where the first display generation component 7100 corresponds to one or more inward-facing displays (e.g., labeled "BACK" of HMD 7100-*a* in FIGS. 7G2, 7H2, 7L2, 7M2, 7N2, 7AA2, and 7AB2)), and the spatial relationship represented by the co-presence of the first display generation component 7100 and the first user 7202 in the same location A 7000-*a* corresponds to the first user wearing the HMD on his/her head and/or holding the HMD with the inner display of the HMD facing the first user's eyes. In some embodiments, the first user 7202 is in a position to view the XR content presented via the first display generation component 7100 when the first user 7202 is facing a portion of the physical environment that is illuminated by a projection system of the first display generation component 7100. For example, virtual content is projected onto a portion of the physical environment, and the virtual content and the portion of the physical environment are seen by the first user 7202 through a camera view of the portion of the physical environment, or through a transparent portion of the first display generation component 7100, when the first user 7202 is facing the display side of the first display generation component 7100. In some embodiments, the first display generation component 7100 emits light that form images on the first user's retina when the first user is facing the display side of the first display generation component 7100. For example, the virtual content is displayed by an LCD or LED display overlaid or replacing a portion of the view of the physical environment displayed by the LCD or LED display, and the first user facing the display side of the LCD or LED display can see the virtual content together with a view of the portion of the physical environment. In some embodiments, the first display generation component displays a camera view of the physical environment in front of the first user or includes a transparent or semi-transparent portion through which a portion of the physical environment in front of the first user is visible to the first user. In some embodiments, the portion of physical environment that is made visible to the first user 7202 through the first display generation component 7100 is the portion of the physical environment that corresponds to the display side of the second display generation component 7102 (e.g., the location B 7000-*b* that includes the display side of the second display generation component 7102 and, optionally, the second user 7204). In some embodiments, the display side of the second display generation component 7102 is a side of the second display generation component 7102 that faces away from the first user 7202 when the first user 7202 is in a position to view the content shown by the first display generation component 7100 (e.g., when the first user 7202 is facing the display side of the first display generation component 7100), and the side that emits light that forms images viewable by others facing a preset portion of the first user (e.g., the second user 7204 or others that are facing toward the first user's face or eyes in the physical environment). In some embodiments, the copresence of the first user 7202 and the first display generation component 7100 at the location A 7000-*a* in FIG. 7A illustrates that the first user 7202 is wearing (e.g., on the user's head, over the user's eyes, on the user's wrist, on the user's back, and/or other parts of the user) a wearable device (e.g., a watch, a wrist band, a backpack, and/or other wearable devices) including the first display generation component, the second display generation component, the computer system, and/or a component of one or more of the above.

As shown in FIG. 7A, the spatial relationship between the second display generation component 7102 and the second user 7204 is such that the second user 7204 is in a position to view the status information presented via the second display generation component 7102. For example, the second user 7204 is in front of and/or facing toward the display side of the second display generation component 7102. In some embodiments, the second display generation component 7102 is the outer display of the HMD (e.g., HMD device 1-100 described with reference to FIGS. 1A-1P, where the second display generation component 7102 corresponds to one or more outward-facing displays (e.g., labeled "FRONT" of HMD 7100a in FIGS. 7G2, 7H2, 7L2, 7M2, 7N2, 7AA2, and 7AB2)) that also includes the inner display (e.g., represented by the first display generation component 7100 that corresponds to one or more inward-facing displays (e.g., labeled "BACK" of HMD 7200a in FIGS. 7G2, 7H2, 7L2, 7M2, 7N2, 7AA2, and 7AB2)) that is presenting the XR content to the first user 7202. In such an embodiment, the spatial relationship represented by the co-presence of the second display generation component 7102 and the second user 7204 in the same location B 7000-b corresponds to the second user 7204 being in a portion of a physical environment toward which the outer display of the HMD is facing (e.g., the physical environment is also hosting the first display generation component 7100 and the first user 7202). In some embodiments, the first display generation component 7100 displays a camera view of the physical environment in front of the first user 7202 or includes a transparent or semi-transparent pass-through portion through which a portion of the physical environment in front of the first user 7202 is visible to the first user 7202, and the portion of the physical environment included in the camera view or the pass-through portion is also the portion of the physical environment that is in front of the display side of the second display generation component 7102. In some embodiments, the second display generation component 7102 is positioned back to back with the first display generation component 7100, such that the portion of the physical environment that is in front of the display side of the second display generation component 7102 (e.g., the location B 7000-b that includes the display side of the second display generation component 7102 and optionally the second user 7204) is also in front of the first user 7202, and within the field of view of the first user if the first and the second display generation components were not blocking the first user's face. In some embodiments, unlike the case with respect to the copresence of the first user 7202 and the first display generation component 7100 in the location A 7000-a, the copresence of the second user 7204 and the second display generation component 7102 at the location B 7000-b in FIG. 7A does not mean that the second user 7204 is wearing (e.g., on the user's head, over the user's eyes, on the user's wrist, on the user's back, and/or other parts of the user) a wearable device (e.g., the wearable device worn by the first user 7202, a watch, a wrist band, a backpack, and/or other wearable devices) including the first display generation component, the second display generation component, the computer system, and/or a component of any of the above. In fact, in at least some scenarios illustrated in FIGS. 7A-7T, the presence of the second user 7204 in the location B 7000-b is not required for the changes occurring on the first display generation component 7100 and the second display generation component 7102, in accordance with some embodiments.

As set forth above, and will be reiterated here, although FIG. 7A (and FIGS. 7B-7T) shows the first display generation component 7100 and the second display generation component 7102 as being located in two separate and disjoint portions of a physical environment, it is to be understood that the first display generation component and the second display generation component are optionally two display generation components that are contained in the same housing (e.g., a housing of a single HMD (e.g., HMD device 1-100 described with reference to FIGS. 1A-1P, where the first display generation component 7100 corresponds to one or more inward-facing displays and the second display generation component 7102 corresponds to one or more outward-facing displays that are enclosed in the same housing of the HMD device 1-100), a housing of a handheld device, or a housing of another wearable device) or attached to the same support structure (e.g., attached back to back with each other or on two sides of a single wall or surface), and facing different (e.g., substantially opposite, or at an angle) directions. As such, location A 7000-a represents a first portion of a physical environment from which content presented via the first display generation component 7100 can be seen by a first user (e.g., the first user 7202) facing toward a display side of the first display generation component 7100 and from which content presented via the second display generation component 7102 (e.g., status information and/or visual alerts) cannot be seen by the first user (e.g., the first user 7202 while the first user 7202 is facing the display side of the first display generation component 7100); and location B 7000-b represents a second portion of the same physical environment from which the content presented via the first display generation component 7100 cannot be seen by another user facing a display side of the second display generation component 7102 (e.g., the second user 7204, or the first user 7202 when the first user 7202 moves (or turns the display generation component(s)) to face the display side of the second display generation component 7102) and from which the content presented via the second display generation component 7102 (e.g., status information and/or visual alert) can be seen by said other user (e.g., the second user 7204, or the first user 7202 when the first user moves (or turns the display generation component(s)) to face the display side of the second display generation component 7102). In the disclosure presented herein, the first display generation component 7100 and the second display generation component 7102 are controlled by the same computer system (e.g., the UNMD, a portable electronic device that is separately housed from the display generation components, a portable electronic device that has two displays facing different directions, and/or a remote server computer), and a user of the computer system, unless otherwise specified, generally refers to a person that has control of at least the first display generation component 7100 to place it or himself/herself in a position that enables him/her to see the XR content shown via the first display generation component 7100. It should be evident from the disclosure presented herein that, the first display generation component 7100 and the second display generation component 7200 are different from two separate display devices (and computer systems) used by two different users in a communication session (e.g., video call, a voice call, a co-presence session, and/or other shared three-dimensional experiences), and the example scenarios presented herein address different challenges and provide different solutions due to the nature of the display generation components and their functions related to providing XR experiences to the user, in accordance with some embodiments.

As shown in FIG. 7A, the computer system that controls the first display generation component 7100 and the second display generation component 7102 are in communication with a first image sensor (e.g., camera 7104, and/or sensor assembly 1-356 in FIG. 1I) and a second image sensor (e.g., camera 7106, eye-tracking sensors, gaze tracking sensors, and/or sensor assembly 1-356 described with respect to FIGS. 1A-1P). The first image sensor is configured to capture images of a portion of the physical environment (e.g., location A 7000-a) that includes at least a portion of the body of the first user (e.g., the first user's face, upper portion of the user, eye region, and/or eyes) that faces the display side of the first display generation component 7100 and that does not include the second user 7204 (or any other user, in the case where the first display generation component 7100 is an inner display of an HMD worn by the first user 7202). The second image sensor (e.g., image sensor 7106) is configured to capture images of a portion of the physical environment (e.g., location B 7000-b) that does not include the portion of the body of the first user 7202 (e.g., the first user's face, upper portion of the first user, eye region, and/or eyes), but, optionally, includes at least a portion of the second user (e.g., the portion of the second user 7204 that is in the field of view of the first user 7202 provided by the first display generation component 7100). As discussed earlier, in some embodiments, the portion of the physical environment that is captured by the second image sensor 7106 includes the portion of the physical environment that is in the field of view of the first user 7202 if the first user's eyes had not been physically blocked by the presence of the second display generation component 7102 (and optionally, the presence of the first display generation component 7100). Similarly, in some embodiments, the portion of the physical environment that is captured by the first image sensor 7104 includes the portion of the first user 7202 (e.g., the first user's face, upper portion of the user, eye region, and/or eyes) that is physically blocked by the presence of the first display generation component 7100 (and optionally, the presence of the second display generation component 7102). In some embodiments, the computer system is also in communication with the first image sensor, the second image sensor, and/or other image sensors to receive images of the hands and wrists of the first user 7202 for identifying gesture inputs provided by the first user 7202, and/or for detecting the presence, movement, and gestures of the second user 7204. In some embodiments, the first image sensor 7104 is also used to capture gaze inputs provided by the first user 7202. In some embodiments, the first image sensor and the second image sensor optionally serve as the image sensors for capturing the gesture inputs of the first user 7202 and/or the second user 7204.

In some embodiments, the computer system optionally controls one or more audio output devices (e.g., electronic component 1-112 in FIGS. 1A-1P, or other audio output devices) that respectively provide audio outputs (e.g., sounds of the XR content, and/or audio alerts and feedback) to the first user 7202 present at location A 7000-a, and optionally, audio outputs (e.g., status indication sounds or alerts, sounds of the XR content, and/or other types of audio outputs) to the second user 7204 present at location B 7000-b. In some embodiments, the computer system optionally partially or completely shields (e.g., through one or more active or passive noise suppression or cancellation components) location A and the first user 7202 from the sounds propagated from location B, and optionally partially or completely shields location B and the second user 7204 from the sounds propagated from location A. In some embodiments, the amount of active sound shielding and/or sound pass-through is determined by the computer system based on the current level of immersion associated with the XR content shown via the first display generation component 7100 (e.g., no sound shielding when in a pass-through mode, partial sound shielding when in a mixed reality mode, and/or full sound shielding when in a virtual reality mode), and optionally, based on whether there is another user present at location B (e.g., no sound shielding when no one is present at location B, and/or sound shielding when people are present or noise level exceeds a threshold level at location B).

In some embodiments, as shown in FIG. 7A, the computer system displays XR content 7002 (e.g., shown as 7002-a in FIG. 7A) via the first display generation component 7100 (e.g., an inner display of an HMD) while the first user 7202 is in a position to view the XR content 7002 (e.g., the first user 7202 is collocated in location A with and at least partially facing toward the display side of the first display generation component 7100, and/or the first user 7202 is wearing the HMD on her head, or holding or carrying the HMD or a device containing the first display generation component, the second display generation component, the computer system, and/or a component of any of the above, with the display region facing toward his/her eyes). In the moment illustrated in FIG. 7A, the computer system is displaying XR content 7002 (e.g., a three-dimensional environment, a movie X, a three-dimensional movie, a two-dimensional movie, and/or other interactive or non-interactive computer-generated experiences). The XR content 7002 is displayed in a mixed reality mode in which the XR content 7002 includes virtual content that is concurrently visible with a representation of a physical environment (e.g., representation of the location B (e.g., the portion of the physical environment that is in front of the first user that is blocked by the presence of the first display generation component)) through the first display generation component 7100. In some embodiments, this mixed realty mode corresponds to an intermediate level of immersion associated with the XR content presented via the first display generation component 7100. In some embodiments, the intermediate level of immersion also corresponds to partial shielding or partial pass-through of the sounds propagated from the physical environment (e.g., the location B (e.g., the portion of the physical environment that surrounds the first user 7202)). In this example, the representation of the physical environment includes a representation 7010 (e.g., shown as 7010-a in FIG. 7A) of the second user 7204 that is located in location B 7000-b, in front of the second display generation component 7102 (e.g., also in front of the back side of the first display generation component 7100). In some embodiments, the representation of the physical environment includes a camera view of the portion of the physical environment that would be within the first user's field of view if the first user's eyes were not blocked by the presence of the first display generation component and the second display generation component (e.g., if the first user 7202 were not wearing the HMD, or holding or carrying the HMD in front of his/her eyes). In the mixed reality mode, the XR content 7002 (e.g., the three-dimensional environment, the movie X, a three-dimensional augmented reality environment, user interfaces, virtual objects and/or other XR content) is displayed to overlay or replace at least a portion of, but not all of, the representation of the physical environment. In some embodiments, the first display generation component 7100 includes a transparent portion through which a portion of the physical environment is visible to the first user 7202. In some embodiments, in the mixed reality mode, the XR content 7002 (e.g., the three-dimensional environment, the movie X, a three-dimensional augmented reality environment, user interfaces, virtual objects, and/or other XR content) is projected onto the physical surfaces or empty space in the physical environment and are visible through the transparent portion with the physical environment and viewable through the transparent portion of the first display generation component 7100 or viewable through a camera view of the physical environment provided by the first display generation component 7100. In some embodiments, the XR content 7002 is displayed to overlay a portion of the display and blocks the view of at least a portion of, but not all of, the physical environment visible through the transparent or semi-transparent portion of the first display generation component 7100. In some embodiments, the first display generation component 7100 does not provide a view of a physical environment, and provides a completely virtual environment (e.g., no camera view or transparent pass-through portion) that is augmented with real-time visual representation(s) (e.g., a stylized representation or segmented camera images) of the physical environment as presently captured by one or more sensors (e.g., cameras, motion sensors, other posture sensors, and/or other types of sensors). In some embodiments, the real-time visual representation(s) of the physical environment includes representations that are based on images captured with some computational and/or signal processing delays (e.g., delays that are less than 0.5, 0.25, 0.1, 0.05, or 0.01 seconds and/or an amount that is not perceptible to most users)). In the mixed-reality mode (e.g., augmented reality based on camera view or transparent display, or augmented virtuality based on virtualized representation of the physical environment), the first user 7202 is not fully immersed in the computer-generated environment, and is still receiving sensory information (e.g., visual and audio) that directly corresponds to the physical environment surrounding the first user and the first display generation component. In some embodiments, an increasing level of immersion corresponds to an increasing amount (e.g., increasing quantity, increasing spatial extent, and/or increasing prominence) of visual and/or sensory information from the physical environment in the XR environment and/or a decreasing amount (e.g., increasing quantity, increasing spatial extent, and/or increasing prominence) of information from the virtual content in the XR environment. In some embodiments, the degree of immersion of the user (e.g., a low level of immersion, a medium level of immersion, and/or a high level of immersion) is determined based on a pixel occupancy of virtual content relative to representations of real-world content (e.g., what percentage of the viewport of the user is taken up with virtual content, compared to passthrough content). In some embodiments, the determination that a current level of immersion with which the representation of the three-dimensional environment is provided via the first display generation component is based on a comparison between a respective amount of virtual content and a respective amount of passthrough content that are currently presented via the first display generation component (e.g., a comparison based on pixel occupancy (e.g., absolute numbers of pixels respectively used to represent virtual content and passthrough content, and/or total display areas respectively occupied by virtual content and passthrough content), a ratio between pixels representing virtual content and pixels representing passthrough content, and/or other indications of relative visual dominance of virtual content and passthrough content). Other definitions of levels of immersion are possible, in accordance with various embodiments.

As shown in FIG. 7A, at the same time that the computer system displays the XR content 7002-*a* (e.g., a three-dimensional environment, the movie X, a three-dimensional augmented reality environment, user interfaces, virtual objects, and/or other XR content) in the mixed reality mode via the first display generation component 7100, the computer system displays status information related to the first user and the XR content via the second display generation component 7102. As shown in the right portion of FIG. 7A, the second display generation component 7102 displays one or more graphical elements that represent the status of the XR content 7002 that is being displayed via the first display generation component 7100, as well as a representation 7006 (e.g., shown as 7006-*a* in FIG. 7A) of at least a portion of the body of the first user 7202 that is in front of the display side of the first display generation component 7100. In this example, the one or more graphical elements that represent the status of the XR content that is being displayed via the first display generation component 7100 optionally includes an identifier of the XR content 7002 (e.g., the title of the movie X), a progress bar 7004 (e.g., shown as 7004-*a* in FIG. 7A) showing the current progress of the XR content, and a visual representation (e.g., shown as an overlay 7008-*a* in FIG. 7A) of the XR content. In some embodiments, the overlay 7008 representing the status of the XR content is generated by obfuscating the XR content (e.g., through blurring, distortion, darkening, desaturating, and/or increasing translucency) and merely conveys a sense of change and colors or tones of the XR content 7002. As shown in the right portion of FIG. 7A, the representation 7006 of the portion of the body of the first user 7202 optionally includes a camera view of the face of the first user, or a graphical representation that is generated based on a camera view of the face of the first user. In some embodiments, the representation 7006 of the portion of the body of the first user 7202 optionally includes a camera view of the portion of the body of the first user 7202, such as the face, upper portion of the face, eye region, or eyes, of the first user 7202, or a graphical representation that is generated based on a camera view and/or stored images of the portion of the body of the first user 7202. In some embodiments, the representation 7006 of the portion of the body of the first user 7202 is based on images and/or models obtained through an enrollment process gone through by the first user 7202, where a high-fidelity image and/or model of the first user forms the basis of the representation 7006 for the first user 7202. In some embodiments, the representation 7006 may look different from the real-time image of the first user 7202 (e.g., the real-time images, optionally, including images of the first user that have been captured with some computational and/or signal processing delays (e.g., delays that are less than 0.5, 0.25, 0.1, 0.05, or 0.01 seconds and/or an amount that is not perceptible to most users)) (e.g., the skin tone and/or other display properties of the representation 7202 is different from the skin tone and/or other display properties of the first user 7202 in FIGS. 7A-7B), because the first user's looks may have changed since the completion of the enrollment process.

In some embodiments, the animated movement and change in appearance of body features in the representation 7006 of the portion of the body of the first user 7202 is generated to correspond to the real-time movement and change in appearance of the body features in the portion of the body of the first user 7202 (e.g., the real-time movement and change in appearance, optionally, include movement and change in appearance that have some computational and/or signal processing delays (e.g., delays that are less than 0.5, 0.25, 0.1, 0.05, or 0.01 seconds and/or an amount that is not perceptible to most users)). In some embodiments, the representation 7006 of the portion of the body of the first user 7202 is displayed in a different display layer from the display layer(s) of the one or more graphical elements that represent the status of the XR content (e.g., the overlay 7008 and the progress bar 7004). In some embodiments, the content displayed on different display layers can be told apart when a viewer moves relative to the second display generation component and sees different amounts of parallax effect for the content shown on the different display layers. In some embodiments, the concurrent display of the representation of the status of the XR content (e.g., the overlay 7008 and the progress bar 7004) and the representation 7006 of the portion of the body of the first user 7202 by the second display generation component 7102 provides an indication that the XR content is being displayed via the first display generation component 7100 in a mixed reality mode and that the first user 7202 is provided with a view of the physical environment along with the XR content 7002. By displaying, on the second display generation component 7102, the visual representation of the first user's body features (e.g., face and/or eyes) and the representation of the status of the XR content being viewed by the first user 7202 while the body features (e.g., face and/or eyes) of the first user are shielded by the presence of the first display generation component 7100 (and optionally the presence of the second display generation component 7102) (e.g., by the presence of the HMD including the inner display and the outer display), other people in the surrounding physical environment of the first user 7202 are provided with more information to initiate or refrain from interaction with the first user 7202, or conduct himself/herself in an appropriate manner in the presence of the first user 7202.

FIG. 7B follows FIG. 7A and illustrates that at a later time, the XR content 7002 has progressed further on the first display generation component 7100, and the appearance of the portion of the body of the first user 7202 has changed. For example, the change in appearance of the portion of the body of the first user 7202 is due to movement of at least a portion of the body of the first user 7202 (e.g., the eyes, nose, brows, mouth, or other body features of the portion of the body of the first user) relative to the first display generation component 7100 (e.g., the movement includes sideway and/or up and down movements of the first user's eye balls, squinting, opening, closing and/or blinking of the user's eyes, movement of the brows (e.g., furrowing, raising, and/or flashing), movement of the nose (e.g., wriggling, scrunching, and/or flaring), movement and/or changes of the cheeks (e.g., bulging or twitching) and/or the movement includes the movement of the user's face or head relative to the display side of the first display generation component (e.g., moving away or toward from the first display generation component 7100)) within location A 7000-a (e.g., while the first user 7202 is still wearing the HMD and/or facing the inner display of the HMD). In some embodiments, the change in appearance of the portion of the body of the first user 7202 is due to a change in color, shape, and/or other visual characteristics of the body features in the portion of the body (e.g., sweating, skin turning white, red, and/or blue, pupils dilating, tears swelling in eyes, jaws dropping, and/or facial muscles relaxing). At this time, the XR content 7002 is still displayed in the mixed reality mode and the representation of the physical environment (e.g., location B, optionally, including the second user 7204), including the representation 7010 of the second user 7204 (e.g., shown as 7010-b in FIG. 7B), remains concurrently displayed among the XR content 7002 via the first display generation component 7100. In some embodiments, changes in the appearance of the physical environment (e.g., visual changes in the body features of the second user 7204 and movement of the second user 7204 relative to the first display generation component 7100, the second display generation component

7102, and/or the first user 7202) are reflected by the representation of the physical environment shown by the first display generation component 7100, as well. In some embodiments, in accordance with the changes in appearance including movement of the portion of the body of the first user 7202 relative to the first display generation component (e.g., change in appearance and movement of the first user's eyes, eye region, and/or face), the computer system updates the representation 7006 (e.g., shown as 7006-b in FIG. 7B) displayed via the second display generation component 7102. For example, when the first user 7202 or a portion of the body of the first user (e.g., the first user's face or eyes) moved in a direction toward a first edge of the first display generation component 7100 (e.g., the left edge of the display side of the first display generation component, or the top edge of the display side of the first display generation component, when seen from the display side of the first display generation component 7100), the representation 7006 of the portion of the body of the first user 7202 shown on the display side of the second display generation component also moves toward a corresponding second edge of the second display generation component 7102 (e.g., the right edge of the display side of the second display generation component (e.g., corresponding to the left edge of the display side of the first display generation component), or the top edge of the display side of the second display generation component (e.g., corresponding to the top edge of the display side of the first display generation component), when seen from the display side of the second display generation component 7102). In addition to updating the representation 7006 of the portion of the body of the first user 7202, the computer system also updates the representation of the status of the XR content (e.g., overlay 7008 and/or progress bar 7004) on the second display generation component 7102. For example, the progress bar 7004 (e.g., shown as 7004-b in FIG. 7B) is updated to show that the playback of the XR content 7002 has advanced by a first amount since the time shown in FIG. 7A. In some embodiments, the overlay 7008 (e.g., shown as 7008-b in FIG. 7B) representing the status of the XR content, as shown on the second display generation component 7102, is also updated in accordance with the current appearance of the XR content 7002 shown via the first display generation component 7100. In some embodiments, showing the real-time update of the appearance of the portion of the body of the first user 7202 (e.g., showing the changes and movements of the first user's face and eyes behind the first display generation component 7202) and showing real-time or periodic update of the status of the XR content shown by the first display generation component 7100, allow others in the physical environment around the first user 7202 to gain information about the attention state of the first user 7202 and whether it is appropriate to engage or interrupt the first user 7202 at the present time. In some embodiments, while changes to the appearance of the portion of the body of the first user 7202 and to the appearance of the XR content are reflected by updates to the status information shown by the second display generation component 7102, any changes in the appearance of the physical environment (e.g., movement of the second user 7204 relative to the first display generation component 7100, the second display generation component 7102, and/or the first user 7202) is reflected by the representation of the physical environment shown by the first display generation component 7100, as well. In some embodiments, the real-time updates, optionally, includes updates that have some computational and/or signal processing delays (e.g., delays that are less than 0.5, 0.25, 0.1, 0.05, or 0.01 seconds and/or an amount that is not perceptible to most users).

Skipping ahead to FIGS. 7D-7E, where the scenarios and features described in FIGS. 7A-7B regarding the location A 7000-*a* and location B 7000-*b*, the first display generation component 7100 and the second display generation component 7102, the XR content 7002 and the status of the XR content, the computer-generated environment, and the physical environment (optionally, including the second user 7204), are applicable to the location A 7000-*a* and location B 7000-*b*, the first display generation component 7100 and the second display generation component 7102, the XR content 7002 and status of the XR content, the computer-generated environment, and the physical environment (optionally, including the second user 7204), respectively, as shown in FIGS. 7D-7E, in accordance with some embodiments.

In addition, the scenarios and features described with respect to the first user 7202, the portion of the body of the first user 7202, and the representation 7006 of the portion of the body of the first user in FIGS. 7A-7B, are also applicable to a third user 7206, a portion of the body of the third user 7206, and a representation 7208 (e.g., shown as 7208-*a* in FIG. 7D, and 7208-*b* in FIG. 7E) of the portion of the body of the third user 7206, except that the third user 7206 is different from the first user 7202, and the representation 7208 of the portion of the body of the third user 7206 is displayed with a different level of fidelity from the representation 7006 (e.g., shown as 7006-*a* in FIG. 7A, and 7006-*b* in FIG. 7B) of the portion of the body of the first user 7002, in accordance with a determination that the first user 7202 meets first criteria and that the third user 7206 does not meet the first criteria. In some embodiments, the first criteria determines whether a respective user in question is an enrolled user (also referred to as a primary user) for the computer system or a guest user for the computer system. In some embodiments, a user becomes an enrolled user or primary user after going through an enrollment process which may involve one or more of: scanning the facial features of the user, receiving subscription or registration information from the user for using the computer system as an enrolled user, and/or receiving valid authentication information from the user for using the computer system as a primary user. In some embodiments, a user becomes an enrolled user or primary user after the user has been using the computer system with more than a threshold level of frequency, duration, and/or occurrences. In some embodiments, a guest user is a user of the computer system that does not meet the first criteria for qualifying as an enrolled user or primary user. In some embodiments, the guest user is a user that has not gone through an enrollment process that scans the user's facial features, that has not provided subscription or registration information to the computer system for using the computer system as an enrolled user (e.g., optionally, has provided subscription or registration information for using the computer system as a guest user), and/or that has not provided valid authentication information for using the computer system as a primary user (e.g., optionally, has provided valid authentication information for using the computer system as a guest user). In some embodiments, a user may transition from being a guest user to an enrolled user or primary user once the user completes the necessary requirements for becoming an enrolled user or primary user (e.g., by going through the facial scanning process, going through a subscription and/or registration process, and/or using the computer system in a manner that qualify the user as an enrolled or primary user). In some embodiments, the computer system does not have to have a primary user, or a guest user, at a given time to function properly. For example, for a period of time (e.g., when the computer system first comes into use, and/or after information of all prior primary users have been erased), a computer system may only have one primary current user and not yet encounter any guest users; similarly, a computer system may only have been used by guest users, and not yet encountered any primary user at a given time. The different levels of fidelity for displaying the representation of the portion of the body of the user as described herein with respect to FIGS. 7A-7B, and 7D-7E come into effect when the computer system has encountered both an enrolled user and a guest user (e.g., on different occasions). In some embodiments, the computer system determines whether a current user is an enrolled user or a guest user in accordance with a determination of whether the current user meets the first criteria. The computer system treats the current user as an enrolled user if the current user meets the first criteria, and treats the current user as a guest user if the current user does not meet the first criteria. Therefore, in some embodiments, even if the same person may be using the computer system on multiple occasions over a period of time, the person may be recognized as a primary user for some of those occasions, and recognized as a guest user for some other instances of those occasions, depending on whether the person meets the first criteria at the time that he/she is using the computer system.

As shown in FIGS. 7D and 7E (and also in FIGS. 7A and 7B), while XR content 7002, including a representation of a three-dimensional environment, is visible via the first display generation component 7100 (e.g., a view of one or more virtual elements and/or a representation of one or more portions of a physical environment are visible via digital and/or optical passthrough provided by the first display generation component), the computer system displays, via the second display generation component 7102, a respective visual representation of a portion of a body of a user (e.g., the representation 7208 for the third user 7206 in FIGS. 7D and 7E, and the representation 7006 for the first user 7202 in FIGS. 7A and 7B) who is in a position to view the three-dimensional environment via the first display generation component 7100. In some embodiments, the respective visual representation of the portion of the body of the user (e.g., the representation 7208 for the third user 7206 in FIGS. 7D and 7E, and the representation 7006 for the first user 7202 in FIGS. 7A and 7B) is a computer-generated image (e.g., a realistic or stylized image generated based on a camera view of the user's face and/or eyes, a generic image that correspond to the user that is wearing the HMD or facing the inner display of the HMD), or a camera view of the user's face and/or eyes). In some embodiments, the representation of the portion of the body of the user is displayed via the outer display of an HMD, when the user is wearing the HMD, and the user's face and/or eyes are facing the inner display of the HMD and the HMD is blocking others' direct view of the user's face and/or eyes and the user's direct view of the surrounding environment. In some embodiments, in accordance with a determination that the user meets first criteria (e.g., the first user 7202 meets the first criteria in FIGS. 7A-7B), the computer system displays a first visual representation of the portion of the body (e.g., the representation 7006 in FIGS. 7A-7B). In some embodiments, the first criteria require an identity of the user to meet a first condition in order for the first criteria to be met (e.g., the user is a registered user for the computer system, the user has gone through an enrollment process for the computer system, the user's facial features and/or eyes have been captured and modelled previously in a registration process, and/or the user's identity has been verified by the computer system as a primary user of the computer system). In some embodiments, displaying the representation of the portion of the body of the first user that meets the first criteria includes displaying a computer-generated image or camera view of the first user's face and/or eyes in accordance with the current appearance or a stored appearance of the user's face and/or eyes behind the HMD. In contrast, in accordance with a determination that the user does not meet the first criteria (e.g., the third user 7206 does not meet the first criteria (e.g., the third user 7206 is not a registered user for the computer system, the third user 7206 has not gone through an enroll-ment process for the computer system, the third user's facial features and/or eyes have not been captured and modelled previously in a registration process, and/or the third user's identity has not been verified by the computer system as a primary user of the computer system)), the computer system displays a second visual representation of the portion of the body of the user (e.g., the visual representation 7208 in FIGS. 7D-7E), where the second visual representation has a lower level of fidelity than the first visual representation (e.g., displaying a lower fidelity or generic computer-gen-erated image of the third user's face and/or eyes, optionally, in accordance with a current appearance of the third user's face and/or eyes behind the HMD).

As shown in FIGS. 7D and 7E (and also in FIGS. 7A and 7B), while displaying, via the second display generation component, the respective visual representation of the por-tion of the body of the user (e.g., the representation 7006 for the first user 7002 in FIGS. 7A and 7B, and the represen-tation 7208 for the third user 7206 in FIGS. 7D-7E), the computer system detects a first change in appearance of the portion of the body of the user while the user is in a position to view the three-dimensional environment via the first display generation component 7100. In some embodiments, the first change in appearance of the portion of the body of the user (e.g., the first user 7002 in FIGS. 7A and 7B, and the third user 7206 in FIGS. 7D and 7E, respectively) includes changes caused by the movement of the user's eyes (e.g., opening, closing, blinking, squinting, winking, eyerolling, and/or other intentional and/or unintentional eye movements), eyebrows (e.g., twitching, rising, lowering, flashing, furrowing, and/or other movements of eyebrows that accompany speech and/or that form part of a facial expression), forehead (e.g., forming creases or furrows), nose (e.g., twitching, flaring, and/or wriggling), mouth (e.g., opening, smiling, closing, puckering, and/or other move-ments that produce speech and/or form part of a facial expression), and/or other portions of the user's face (e.g., cheeks, ears, and/or chin). In some embodiments, the first change in appearance of the portion of the body of the user (e.g., the first user 7002 in FIGS. 7A and 7B, and the third user 7206 in FIGS. 7D and 7E, respectively) are changes in appearance that would be visible to another person facing the user, but for the visual barrier that is present between the user (e.g., the first user 7002 in FIGS. 7A and 7B, and the third user 7206 in FIGS. 7D and 7E, respectively) and said other person (e.g., the second user 7204 in FIGS. 7A, 7B, 7D, and 7E). In some embodiments, the first change in appearance of the user (e.g., the first user 7002 in FIGS. 7A and 7B, and the third user 7206 in FIGS. 7D and 7E, respectively) does not include visible changes that are caused by the overall movement of the user's head relative to his/her body, and/or the overall movement of the user in the physical environment.

As shown in FIGS. 7D and 7E (and also in FIGS. 7A and 7B), in response to detecting the first change in appearance of the portion of the body of the user (e.g., the first user 7002 in FIGS. 7A and 7B, and the third user 7206 in FIGS. 7D and 7E, respectively) while the user is in a position to view the three-dimensional environment via the first display genera-tion component 7100, the computer system updates the appearance of the respective visual representation of the portion of the body of the user (e.g., the representation 7006 for the first user 7002 in FIGS. 7A and 7B, and the representation 7208 for the third user 7206 in FIGS. 7D and 7E, respectively) that is displayed via the second display generation component 7102, based on the first change in appearance of the portion of the body of the user (e.g., the first user 7002 in FIGS. 7A and 7B, and the third user 7206 in FIGS. 7D and 7E, respectively). In some embodiments, when updating the appearance of the first visual represen-tation of the portion of the body of the user (e.g., the representation 7006 for the first user 7002 in FIGS. 7A and 7B, and the representation 7208 for the third user 7206 in FIGS. 7D and 7E, respectively), in accordance with a determination that the user meets the first criteria (e.g., the first user 7202 meets the first criteria), the computer system changes the appearance of the first visual representation of the portion of the body (e.g., the representation 7006 for the first user 7002 in FIGS. 7A and 7B) based on the first change in appearance of the portion of the body of the user (e.g., movement of the portion of the body of the first user 7202 in FIGS. 7A-7B) (e.g., displaying real-time updates to the computer-generated image or camera view of the first user's face and/or eyes in accordance with the real-time movement of the first user's face and/or eyes behind the HMD during a respective period of time). In some embodiments, the real-time updates, optionally, include updates that has some computational and/or signal processing delays (e.g., delays that are less than 0.5, 0.25, 0.1, 0.05, or 0.01 seconds and/or an amount that is not perceptible to most users). In addition, in some embodiments, when updating the appearance of the first visual representation of the portion of the body of the user (e.g., the representation 7006 for the first user 7002 in FIGS. 7A and 7B, and the representation 7208 for the third user 7206 in FIGS. 7D and 7E, respectively), in accordance with a determination that the user does not meet the first criteria (e.g., the third user 7206 does not meet the first criteria), the computer system changes the appearance of the second visual representation of the portion of the body of the user (e.g., the representation 7208 for the third user 7206 in FIGS. 7D-7E) based on the first change in appearance of the portion of the body of the user (e.g., movement of the portion of the body of the third user 7206 in FIGS. 7D-7E) (e.g., displaying real-time updates to a lower fidelity or generic computer-generated image of the third user's face and/or eyes in accordance with the real-time movement of the third user's face and/or eyes behind the HMD during the respective period of time). In some embodiments, the real-time updates and/or the real-time movement of the third user's face and/or eyes behind the HMD, optionally, include updates and movement that have some computational and/or signal processing delays (e.g., delays that are less than 0.5, 0.25, 0.1, 0.05, or 0.01 seconds and/or an amount that is not perceptible to most users).

For example, in accordance with the illustration in FIGS. 7A-7B, in some embodiments, when the first user's eyes moved (e.g., blinked, closed, squinted, winked, looked the side, and/or moved in other visible ways), in accordance with a determination that the first user 7202 meets the first criteria, the computer system updates the computer-generated image or camera view of the first user's face and/or eyes (e.g., representation 7006 in FIGS. 7A-7B, or another representation) in accordance with the real-time movement of the first user's eyes behind the HMD (e.g., the portions of the computer-generated image or camera view that correspond to the user's eyes show visual changes that correspond to the movement of the user's eyes), where the visual changes are produced with the same or similar level of visual fidelity as the initially displayed computer-generated image or camera view of the first user's face and/or eyes. In contrast, in accordance with the illustration in FIGS. 7D-7E, in some embodiments, in accordance with a determination that the third user 7206 does not meet the first criteria, the computer system updates the lower fidelity or generic computer-generated image of the third user's face and/or eyes (e.g., representation 7208 in FIGS. 7D-7E, or another representation) in accordance with the real-time movement of the third user's eyes behind the HMD (e.g., the portions of the lower fidelity computer-generated image or generic image that correspond to the third user's eyes show visual changes that correspond to the movement of the third user's eyes), where the visual changes are produced with the same or similar level of visual fidelity as the initially displayed computer-generated image or generic image of the third user's face and/or eyes. In some embodiments, the change in appearance in the first visual representation (e.g., representation 7006 for the first user 7202 in FIGS. 7A and 7B) more closely corresponds to the real-time movement of the first user's face and/or eyes when the first user 7202 meets the first criteria, while the changes in appearance in the second visual representation (e.g., representation 7208 for the third user 7206 in FIGS. 7D and 7E) less closely corresponds to the real-time movement of the third user's face and/or eyes (e.g., generic, or canned movements) when the third user does not meet the first criteria. In some embodiments, the real-time movements of the user's face and/or eyes, optionally, include movements of the user's face and/or eyes that have some computational and/or signal processing delays (e.g., delays that are less than 0.5, 0.25, 0.1, 0.05, or 0.01 seconds and/or an amount that is not perceptible to most users).

In some embodiments, as shown in FIGS. 7A-7B in contrast to FIGS. 7D-7E, where the level of fidelity with which the representation 7006 of the portion of the body of the first user 7202 in FIGS. 7A-7B includes a first degree of information about the portion of the body of the first user 7202, while the level of fidelity with which the representation 7208 of the portion of the body of the third user 7206 in FIGS. 7D-7E includes a second degree of information about the portion of the body of the third user 7206 that is less than the first degree of information. For example, in some embodiments, the first degree of information includes the shape, color, eye lashes, and eyebrows of the eyes of the first user 7202, while the second degree of information includes a generic image of a pair of eyes that do not correspond to the shape, color, eye lashes and eyebrows of the eyes of the third user 7206. In some embodiments, the first degree of information includes the color, shape, and/or size of the eyes and skin color surrounding the eyes of the first user 7202, and the second degree of information includes less information and/or less accurate information about the color, shape, and/or size of the eyes and skin color surrounding the eyes of the third user 7206.

In some embodiments, the representation 7208 of the portion of the body of the third user 7206 in FIGS. 7D-7E includes a darkening gradient 7210 that gets darker as it gets closer to a more recognizable portion of the body feature (e.g., the eyes, the nose, and/or the eye region) in the portion of the body of the third user 7206. In some embodiments, the representation 7208 of the portion of the body of the third user 7206 in FIGS. 7D-7E is generated with a gradient filter that reduces the visual fidelity of the computer-generated image or generic image of the third user 7206 by a greater amount in a first portion of the representation 7208 (e.g., the top portion, and/or the bottom portion), and reduces the visual fidelity of the computer-generated image or generic image of the third user 7206 by a lesser amount in a second portion of the representation 7208 (e.g., in the middle portion, and/or a portion other than the first portion). In some embodiments, the representation 7208 in FIGS. 7D-7E includes a darkening and/or blurring gradient that gets increasing darker and/or blurrier as it gets closer to a more recognizable portion of the body of the third user 7206 (e.g., the first region of the body, such as the eyes, or the eyes and eyebrows).

In some embodiments, a curved treatment mask is applied to the respective image of the portion of the body of the user (e.g., a computer-generated image, a camera image, and/or or a generic image of the portion of the body) to generate the respective visual representation (e.g., the representation 7006 for the first user 7202 in FIGS. 7A-7B, the representation 7208 for the third user 7206 in FIGS. 7D-7E, or both). In some embodiments, the gradient mask used to reduce the visual fidelity of the representation 7208 of the portion of the body of the third user 7206 is a curved mask. In some embodiments, the respective image of the portion of the body includes an image on a curved surface (e.g., a contoured surface that mimics the contours of the face of the user, a contoured surface of the second display generation component 7102, or a curved surface on which an image of the face or eye region of the face is wrapped). In some embodiments, the mask is a curved mask that alters at least one visual property (e.g., luminance, blur radius, resolution, color saturation, and/or other visual properties that affect the visual fidelity of the image) across the curved surface of the respective image of the portion of the body. For example, in some embodiments, the respective image of the portion of the body includes an image that shows the eyes and regions of the face between the eyes and below the eyes, as well as the regions around the temple areas, and these facial features are laid out on a curved surface that follow the contour of the face in the regions near the eyes, between the eyes, around cheeks and temples.

In some embodiments, the mask treatment alters some portion of the image of the portion of the body of the user, while leaving some portions of the image unaltered (e.g., a gradient filter is applied above the eye line and not below the eye line). In some embodiments, the gradient mask alters at least one visual property (e.g., luminance, blur radius, resolution, color saturation, and/or other visual properties that affect the visual fidelity of the image) across a first region of the respective image of the portion of the body that corresponds to a first body feature of the user (e.g., eyes, eyes and brows, or other more recognizable and individualized features of a person), optionally, without altering the at least one visual property of a second region of the respective image of the portion of the body that does not correspond to the first body feature of the user. For example, in some embodiments, the respective image of the portion of the body includes an image that shows the eyes and regions of the face between the eyes and below the eyes, as well as the regions around the temple areas, and the gradient mask darkens and/or blurs the portion of the respective image that corresponds to the eyes and brows, without darkening and/or blurring the portion of the respective image that correspond to the cheeks and temples. In some embodiments, the gradient gets darker and blurrier as it gets closer to the eyes from the region below the eyes.

In some embodiments, the representation 7006 for the first user 7202 in FIGS. 7A-7B, and/or the representation 7208 for the third user 7206 in FIGS. 7D-7E, although displayed with different levels of fidelity, both show a first body feature of the user (e.g., pupils, irises, and/or outlines of the eyes) in the portion of the body of the user (e.g., the first user 7202 in FIGS. 7A-7B, and the third user 7206 in FIGS. 7D-7E, respectively).

In some embodiments, the computer system automatically (e.g., without explicit user inputs or requests) detects whether the user that is currently using the computer system and viewing content via the first display generation component 7100 is a primary user or a guest user. In some embodiments, the computer system initiates the process to determine whether the current user viewing content via the first display generation component (e.g., the first user 7202 in FIGS. 7A-7B, or the third user 7206 in FIGS. 7D-7E) meets the first criteria in response to detecting the user putting the NMD on his/her head (or otherwise wearing the wearable device (e.g., including the first display generation component, the second display generation component, the computer system, and/or a component of any of the above)). In some embodiments, the computer system initiates the process to determine whether the current user viewing content via the first display generation component (e.g., the first user 7202 in FIGS. 7A-7B, or the third user 7206 in FIGS. 7D-7E) meets the first criteria, in response to detecting presence of eyes facing toward the display side of the first display generation component 7100. In some embodiments, the computer system initiates the process to determine whether the current user viewing content via the first display generation component (e.g., the first user 7202 in FIGS. 7A-7B, or the third user 7206 in FIGS. 7D-7E) meets the first criteria, in response to detecting the presence of other people in front of the second display generation component 7102 or in the surrounding physical environment of the user (e.g., the first user 7202 in FIGS. 7A-7B, or the third user 7206 in FIGS. 7D-7E).

In some embodiments, the computer system utilizes data collected from one or more biometric sensors (e.g., sensors that capture biometric features, such as irises, pupils, voice-print, fingerprint, and/or facial features) to determine whether the identity of the user (e.g., the first user 7202 in FIGS. 7A-7B, or the third user 7206 in FIGS. 7D-7E) meets the first criteria (e.g., stored biometric information that corresponds to a primary user or enrolled user).

In some embodiments, the representation of the portion of the body of the user (e.g., the representation 7006 for the first user 7202 in FIGS. 7A-7B, and/or the representation 7208 for the third user 7206 in FIGS. 7D-7E, respectively) includes a representation of a skin tone of the portion of the body. In some embodiments, a skin tone of the face of the user as detected by one or more cameras is reproduced or is used as the basis to produce the skin tone of the respective image of the portion of the body in the representation of the portion of the body of the user (e.g., the representation 7006 for the first user 7202 in FIGS. 7A-7B, and/or the representation 7208 for the third user 7206 in FIGS. 7D-7E, respectively). In some embodiments, in accordance with a determination that the current user does not meet the first criteria (e.g., the third user 7206 does not meet the first criteria), the computer system detects the skin tone of the portion of the body of the user while the user is using the computer system, to generate the representation of the portion of the body. For example, a representation of the skin tone of the portion of the body as detected in real-time is included in the representation 7208 of the portion of the body of the third user 7206 in FIGS. 7D-7E. In some embodiments, in accordance with a determination that the first user meets the first criteria, the computer system does not detect the skin tone of the portion of the body in real-time, but uses a stored skin tone to generate the representation of the skin tone in the representation 7006 of the portion of the body of the first user 7202 in FIGS. 7A-7B. In some embodiments, irrespective of whether the user meets the first criteria, the computer system detects the skin tone of the user in real-time and generates the respective representation of the portion of the body of the user based on the detected skin tone. In some embodiments, the detection of the skin tone in real-time includes detection that has some computational and/or signal processing delays (e.g., delays that are less than 0.5, 0.25, 0.1, 0.05, or 0.01 seconds and/or an amount that is not perceptible to most users). In some embodiments, the user is optionally given an opportunity and/or selectable configuration options during an enrollment process to choose and/or adjust the skin tone and/or other display properties (e.g., brightness, texture, and/or other display properties) for the representation of the portion of the body of the user that is to be displayed via the second display generation component during a time when the user views content using the first display generation component.

In some embodiments, in accordance with a determination that the user meets the first criteria (e.g., the first user 7202 meets the first criteria), the computer system displays the representation of the portion of the body of the user based on a stored skin tone of the portion of the body that was detected in a previous use of the computer system by the user (e.g., a representation of the skin tone of the portion of the body as detected during a prior enrollment of the first user 7202 as a primary user of the computer system is included in the representation 7006 of the portion of the body of the first user shown in FIGS. 7A-7B).

In some embodiments, the skin tone (and/or other display properties) of the portion of the body that is presented in the representation of the portion of the body of the user is based on a skin tone (and/or other visual properties) detected from the face of the user (e.g., skin tone (and/or other visual properties, such as skin brightness and skin texture) from the face of the first user 7202 (e.g., detected in real time (e.g., optionally, accounting for some computational and/or signal processing delays (e.g., delays that are less than 0.5, 0.25, 0.1, 0.05, or 0.01 seconds and/or an amount that is not perceptible to most users)), and/or detected from a previous enrollment session) is used to generate the skin tone (and/or other display properties) of the representation 7006 of the first user 7202 in FIGS. 7A-7B, and skin tone (and/or other visual properties) from the face of the third user 7206 (e.g., detected in real-time) is used to generate the skin tone (and/or other display properties) of the representation 7208 of the third user 7206 in FIGS. 7D-7E). In some embodiments, the real-time detection of skin tone (and/or other visual properties), optionally, includes detection of skin tone (and/or other visual properties) that has some computational and/or signal processing delays (e.g., delays that are less than 0.5, 0.25, 0.1, 0.05, or 0.01 seconds and/or an amount that is not perceptible to most users). In some embodiments, instead of, or in addition to the skin tone (and/or other visual properties) of the face of the user, the skin tone (and/or other visual properties) of the hand(s) or other portions of the body of the user is used to generate the skin tone (and/or other display properties) of the representation of the portion of the body of the user shown via the second display generation component 7102.

As described with respect to FIGS. 7A-7B, and 7D-7E, the computer system animates the representation of the portion of the body of the user (e.g., animating the representation 7006 of the first user 7202 (e.g., a higher fidelity computer-generated image or camera view) of the eyes, eyeballs, eye lids, eye brows, nose, cheeks, and/or area between the eyes and eye brows) in FIGS. 7A-7B, and/or animating the representation 7208 of the third user 7206 (e.g., a lower fidelity computer-generated image or generic image) of the eyes, eyeballs, eye lids, eye brows, nose, cheeks, and/or area between the eyes and eye brows) in FIGS. 7D-7E), based on real-time movement of the portion of the body of the user (e.g., movements of the eyes, eyeballs, eye lids, eye brows, nose, cheeks, and/or area between the eyes and eye brows). In some embodiments, the real-time movement of the portion of the body of the user, optionally, includes detected movement that has some computational and/or signal processing delays (e.g., delays that are less than 0.5, 0.25, 0.1, 0.05, or 0.01 seconds and/or an amount that is not perceptible to most users).

In some embodiments, the computer system allows the primary user (e.g., the first user 7202 in FIGS. 7A-7B) to explicitly change the display mode of the representation of the portion of the body of the primary user to that of a guest user, or to a low fidelity representation of the primary user. In some embodiments, in accordance with a determination that the first user is a primary user of the computer system and that the user has disabled usage of the high fidelity representation 7006 of the portion of the body in showing the status associated with the first user via the second display generation component 7102, the computer system does not display the representation 7006 via the second display generation component 7102 to show the status information associated with the first user 7202. In some embodiments, the computer system does not show any representation of the portion of the body of the first user 7202, or uses a low fidelity representation of the first user 7202, such as the representation 7208 used for the third user 7206 in FIGS. 7D-7E or a different generic representation.

In some embodiments, the representation of the portion of the body of the user (e.g., representation 7006 for the first user 7202 in FIGS. 7A-7B, or the representation 7208 for the third user 7206 in FIGS. 7D-7E, respectively) is displayed with different levels of fidelity for a primary user (e.g., the first user 7202) and a guest user (e.g., the third user 7206), via the second display generation component 7102, with a representation of the status of XR content and/or the level of immersion for the first display generation component 7100 (e.g., the overlay 7008 and the progress bar 7004 in FIGS. 7A-7B, and 7D-7E) overlaid on the representation of the portion of the body of the user (e.g., on a display layer above the representation of the portion of the body of the user, and optionally separately by a distance from the display layer of the representation of the portion of the body of the user).

In some embodiments, the representation of the portion of the body of the user (e.g., representation 7006 for the first user 7202 in FIGS. 7A-7B, and/or representation 7208 for the third user 7206 in FIGS. 7D-7E, respectively) is a three-dimensional representation (e.g., with a contour that corresponds to the contour of the face of the user, and/or the contour of the HMD; and/or with a curved surface that wrap around the eye region and the tempo regions of the user). In some embodiments, when the second user 7204 has moved relative to the second display generation component 7102 and is viewing the second display generation component 7102 from a different angle as compared to the scenario shown in FIGS. 7A, 7B, 7D, and/or 7E, the appearance of the representation of the portion of the body of the user (e.g., representation 7006 for the first user 7202 in FIGS. 7A-7B, and/or representation 7208 for the third user 7206 in FIGS. 7D-7E, respectively) would look different to the second user 7204 at the different location in the physical environment. This virtual parallax effect is illustrated in FIG. 7G1 followed by FIG. 7H1 and FIG. 7G2 followed by FIG. 7H2, for example, where the representations 7006-$c$ and 7006-d for the first user 7202 have different positions, when viewed by the second user 7204 from different locations relative to the display side of the second display generation component 7102, in accordance with some embodiments. In some embodiments, when the first user 7202 and/or the third user 7206 move relative to the second user 7204 and the appearance of the portion of the body of the first user 7202 and/or the third user 7206 as seen through the second display generation component 7102 would also look different to the second user 7204 as compared to the scenarios shown in FIGS. 7A, 7B, 7D, and/or 7E.

In some embodiments, the first display generation component 7100 and the second display generation component 7102 are positioned back to back (e.g., with their respective display sides facing different directions (e.g., substantially opposite directions, or at an angle to each other)) in an HMD that is worn on the first user's head or placed in front of the user's face. In some embodiments, the second display generation component 7102 shows a visual representation of the first user's eyes that is generated based real images of the first user's eyes using one or more image processing filters. For example, the visual representation of the first user's eyes is optionally generated by reducing an opacity, increasing a transparency, reducing a color saturation level, reducing a luminance level, reducing a pixel resolution, and/or reducing a color resolution of a camera image of the first user's eyes. In some embodiments, the amount of modification applied to the various display properties of a respective camera image of the first user's eyes is optionally specified relative to values of various display properties of the overlay 7008 indicating the status of the XR content that is concurrently shown. For example, when the overlay 7008 indicating the status of the XR content is relatively dark (e.g., with a first range of luminance values), the representation of the eyes is also made darker, more translucent, and/or less color saturated (e.g., with a second range of luminance values, a second range of transparency values, a second range of color saturation values, that are selected based on the first range of luminance values); and when the overlay indicating the status of the XR content is brighter (e.g., with a second range of luminance values that are greater than the first range of luminance values), the representation of the eyes is made brighter, less translucent, and/or more color saturated (e.g., with a third range of luminance values, a third range of transparency values, a third range of color saturation values, that are selected based on the second range of luminance values). In some embodiments, other display properties (e.g., color saturation, pixel resolution, color resolution, and/or tone) are used as the basis for selecting the value ranges for the display properties of the representation of the portion of the body of the user (e.g., the user's face or eyes). In some embodiments, the representation of the first user's eyes is generated by applying one or more preset image filters, such as a blur filter, a color filter, a luminance filter, and/or other types of filters. that changes the original appearance of the first user's eyes when the representation is displayed by the second display generation component. Similarly, the representation of the third user's eyes can be similarly generated from a generic image of the third user's eyes, and/or use a first set of values for the filters, to further reduce the level of fidelity of the representation of the third user's eyes, in accordance with some embodiments.

In some embodiments, the representation of the status of XR content (e.g., the overlay 7008, or another overlay or representation) shown by the second display generation component 7102 is generated by applying a diffusion filter on the XR content (e.g., all visible content, media content only, or, optionally, visible content excluding the pass-through view of the physical environment) displayed via the first display generation component 7100. For example, the color and tones of a scene is preserved by the overlay 7008 indicating the status of the XR content, but the outlines of the objects in the XR content are blurred and not clearly defined in the overlay 7008. In some embodiments, the representation of the status of the XR content is translucent, and through which the representation of the portion of the user (e.g., the representation 7006 for the first user 7202 in FIGS. 7A-7B, or the representation 7208 for the third user 7206 in FIGS. 7D-7E, respectively) is visible on the second display generation component 7102. In some embodiments, graphical user interface elements that represent metadata associated with the XR content (e.g., progress bar 7004, the title of the XR content, the application name associated with the XR content, and/or other user interface elements) are displayed (e.g., in the same display layer as or in a different display layer from the overlay 7008 indicating the status of the XR content, and/or in the same display layer of or in a different display layer from the representation of the portion of the user) by the second display generation component 7102. In some embodiments, the graphical user interface elements that represent metadata associated with the XR content are displayed with a higher pixel resolution, higher color resolution, higher color saturation, greater opacity, greater luminance, and/or better defined outlines, as compared to the overlay 7008 indicating the status of the XR content and/or the representation of the portion of the user (e.g., the representation 7006 for the first user 7202 in FIGS. 7A-7B, or the representation 7208 for the third user 7206 in FIGS. 7D-7E, respectively).

In some embodiments, the portion of the body of the user (e.g., the eyes and/or face of the first user 7202 in FIGS. 7A-7B, or the third user 7206 in FIGS. 7D-7E, respectively) moves relative to the first display generation component 7100, while the XR content 7002 presented via the first display generation component 7100 does not change. In such a case, the representation of the portion of the body of the user is, optionally, updated on the second display generation component 7102 without updating the overlay 7008 or the progress bar 7004 of the XR content. In some embodiments, the XR content is not displayed or is paused and the user (e.g., the first user 7202 or the third user 7206) is viewing a pass-through view of the physical environment via the first display generation component 7100 without concurrent display of the XR content; and the second display generation component 7102 optionally shows updates to the representation of the portion of the body of the user (e.g., the first user 7202 or the third user 7206, respectively) in accordance with the change in appearance of the portion of the body of the user (e.g., due to movement of the portion of the body of the user or other visual changes thereof), without displaying a representation of the XR content (e.g., overlay 7008 or another representation), or showing the representation of the XR content (e.g., overlay 7008) in a static or paused state.

In the example scenarios shown in FIGS. 7A-7C and 7D-7E, the level of immersion associated with the XR content and the attention state of the user (e.g., first user 7202, and the third user 7206, respectively) has not changed and corresponds to an intermediate level of immersion associated with the presentation of the XR content. In some embodiments, the level of immersion associated with the presentation of the XR content and corresponding attention state of the first user are optionally altered over a period of time, e.g., increased to a more immersive level and a more engaged user attention state, or decreased to a less immersive level and a less engaged user attention state. In some embodiments, the status information shown by the second display generation component 7102 is updated based on the changes in the level of immersion by which the XR content is presented via the first display generation component 7100. In some embodiments, the update to the status information includes an update to the representation of the portion of body of the user (e.g., updating the visibility of the representations 7006 and 7208 of the portion of the body of the user 7202 and 7206, respectively, and/or updating the appearance of the representations 7006 and 7208 of the portion of the body of the users 7202 and 7206, respectively).

In some embodiments, the computer system is configured to display the XR content 7002 with at least a first level of immersion, a second level of immersion, and a third level of immersion. In some embodiments, the level of immersion is a continuum of levels that represents an increasing amount of virtual content relative to a decreasing amount of pass-through of the physical environment in the XR content presented via the first display generation component 7100. In some embodiments, the computer system causes the XR content displayed via the first display generation component 7100 to transition between the different levels or degrees of immersion in response to a set of one or more events (e.g., natural termination or progression of an application or experience; the start, stop, and/or pausing of an experience in response to a user input; changing the levels of immersion of an experience in response to a user input, a change in the state of the computer system, and/or a change in external environment)). In some embodiments, the first, second, and third levels of immersion correspond to increasing amount of virtual content that is present in the XR environment and/or decreasing amount of representation of the surrounding physical environment (e.g., representation of the location B or the portion of the physical environment in front of the display side of the second display generation component 7102) present in the XR environment. In some embodiments, first, second, and third levels of immersion correspond to different modes of content display that have increasing image fidelity (e.g., increasing pixel resolution, increasing color resolution, increasing color saturation, increasing luminance, increasing opacity, and/or increasing image details) and/or spatial extent (e.g., angular extent, and/or spatial depth) for the computer-generated content, and/or decreasing image fidelity and/or spatial extent for representations of the surrounding physical environment (e.g., representation of the location B or the portion of the physical environment in front of the display side of the second display generation component). In some embodiments, the first level of immersion is a pass-through mode where the physical environment (e.g., the location B or the portion of the physical environment in front of the display side of the second display generation component) is fully visible to the first user through the first display generation component (e.g., as a camera view of the physical environment or through a transparent portion of the first display generation component)). In some embodiments, the XR content presented in the pass-through mode includes the pass-through view of the physical environment with a minimal number of virtual elements concurrently visible as the view of the physical environment or with only virtual elements that are peripheral (e.g., indicators and controls displayed in the peripheral region of the display) to the user's view of the physical environment. FIG. 7O illustrates an example of the first level of immersion associated with the XR content 7002, where a view of the physical environment (e.g., the portion of the physical environment in front of the display side of the second display generation component 7102 (e.g., also the portion of the physical environment in front of the first user 7202)) occupies the central and majority region of the field of view provided by the first display generation component 7100, and only a few controls (e.g., the title of the movie, the progress bar, and/or playback control (e.g., play button)) are displayed in the peripheral region of the field of view provided by the first display generation component 7100. In some embodiments, the second level of immersion is a mixed reality mode where the pass-through view of the physical environment is augmented with virtual elements generated by the computer system, where the virtual elements occupy the central and/or majority region of the user's field of view (e.g., the virtual content is integrated with the physical environment in the view of the computer-generated environment). An example of the second-level of immersion associated with the XR content 7002 is illustrated in FIGS. 7A-7B and FIGS. 7D-7E, in accordance with some embodiments. In some embodiments, the third level of immersion is a virtual reality mode in which that user's view of the physical environment is completely replaced or blocked by the view of virtual content provided by the first display generation component 7100. FIGS. 7D and 7F illustrate an example of the third level of immersion associated with the XR content 7002, which corresponds to a fully immersive level, in accordance with some embodiments.

As shown in FIG. 7C following FIG. 7B, the computer system has switches from displaying the XR content 7002 in the mixed reality mode to displaying the XR content 7002 in a virtual reality mode (e.g., the movie X, shown as 7002) with no representation of the physical environment (e.g., location B including the second user 7204 (e.g., the portion of the physical environment that is in front of the display side of the second display generation component 7102)). In some embodiments, the switching performed by the computer system is in response to a request from the first user 7202 (e.g., a gesture input that meets the criteria for changing the level of immersion of the XR content (e.g., lifting the hands of the first user away from the HMD after putting the HMD on, covering the external display of the HMD with a hand for a threshold amount of time, or other gesture inputs)). In conjunction with switching from displaying the XR content 7002 in the mixed reality mode to displaying the XR content 7002 in the virtual reality mode via the first display generation component 7100, the computer system changes the status information displayed via the second display generation component 7102. As shown in FIG. 7C, although the one or more graphical elements that indicate status of the XR content 7002 (e.g., the title, progress bar 7004, and the overlay 7008, in FIG. 7C) are still displayed and continue to be updated in accordance with the changes in the status of the XR content 7002 shown by the first display generation component 7100, the representation 7006 of the portion of the first user 7202 (e.g., the first user's eyes or face) is no longer displayed by the second display generation component 7102. In some embodiments, instead of fully ceasing to display the representation of the portion of the body of the first user, the computer system decreases visibility (e.g., reducing luminance, reducing color resolution, reducing opacity, and/or reducing pixel resolution) of the representation of the portion of the first user 7202 relative to that of other status information (e.g., the representation of the XR content, and/or representation of metadata related to the XR content or the user) on the second display generation component 7102. In some embodiments, the representation 7006 of the portion of body of the first user 7202 is optionally displayed with a reduced visibility (e.g., not visible at all, or with reduced luminance, increased transparency, reduced opacity, reduced color saturation, and/or increased blur level) relative to its previous appearance to indicate an increase in the level of immersion associated with the XR content shown by the first display generation component 7100. The other status information (e.g., the overlay 7008 indicating the status of the XR content and the progress bar 7004) is continuously or periodically updated in accordance with the changes in the status of the XR content 7002 shown by the first display generation component 7100 while such other status information remains displayed by the second display generation component 7102 (e.g., without reduction of visibility relative to its previous appearance unless the reduction is due to the change in appearance of the XR content).

In some embodiments, the switching from the mixed reality mode to the virtual reality mode is triggered by the movement of the second user 7204 exiting the estimated field of view that the first user 7202 would have had when the first user's eyes were not blocked by the presence of the first and/or second display generation components. In some embodiments, the switching from the mixed reality mode to the virtual reality mode is triggered by the movement of the second user 7204 exiting the physical environment surrounding the first user 7202 (e.g., out of the room occupied by the first user). In some embodiments, the computer system ceases to display the representation of the physical environment (e.g., representation of location B (e.g., representation of the portion of the physical environment in front of the first user)) when there is no other user present in the physical environment. In some embodiments, the switching from the mixed reality mode to the virtual reality mode goes through a plurality of intermediate modes, and the relative visual prominence of the representation of the portion of the body of the user and the representation of the status of the XR content decreases gradually (e.g., from one to zero, or a smaller range) through the plurality of intermediate modes.

The scenario illustrated in FIG. 7F is analogous to that illustrated in FIG. 7C, except that the first user 7202 is replaced by the third user 7206 in front of the first display generation component 7100. As shown in FIG. 7F, although the one or more graphical elements that indicate status of the XR content 7002 (e.g., the title, progress bar 7004, and the overlay 7008, in FIG. 7F) are still displayed and continue to be updated in accordance with the changes in the status of the XR content 7002 shown by the first display generation component 7100, the representation 7208 of the portion of the third user 7206 (e.g., the third user's eyes or face) is no longer displayed by the second display generation component 7102. In some embodiments, instead of fully ceasing to display the representation of the portion of the body of the third user, the computer system decreases visibility (e.g., reducing luminance, reducing color resolution, reducing opacity, and/or reducing pixel resolution) of the representation of the portion of the third user 7206 relative to that of other status information (e.g., the representation of the XR content, and/or representation of metadata related to the XR content or the user) on the second display generation component 7102. In some embodiments, the representation 7208 of the portion of body of the third user 7206 is optionally displayed with a reduced visibility (e.g., not visible at all, or with reduced luminance, increased transparency, reduced opacity, reduced color saturation, and/or increased blur level) relative to its previous appearance to indicate an increase in the level of immersion associated with the XR content shown by the first display generation component 7100. The other status information (e.g., the overlay 7008 indicating the status of the XR content and the progress bar 7004) is continuously or periodically updated in accordance with the changes in the status of the XR content 7002 shown by the first display generation component 7100 while such other status information remains displayed by the second display generation component 7102 (e.g., without reduction of visibility relative to its previous appearance unless the reduction is due to the change in appearance of the XR content).

In some embodiments, the switching from the mixed reality mode to the virtual reality mode is triggered by the movement of the second user 7204 exiting the estimated field of view that the third user 7206 would have had when the first user's eyes were not blocked by the presence of the first and/or second display generation components. In some embodiments, the switching from the mixed reality mode to the virtual reality mode is triggered by the movement of the second user 7204 exiting the physical environment surrounding the third user 7206 (e.g., out of the room occupied by the third user). In some embodiments, the computer system ceases to display the representation of the physical environment (e.g., representation of location B (e.g., representation of the portion of the physical environment in front of the third user)) when there is no other user present in the physical environment. In some embodiments, the switching from the mixed reality mode to the virtual reality mode goes through a plurality of intermediate modes, and the relative visual prominence of the representation of the portion of the body of the user and the representation of the status of the XR content decreases gradually (e.g., from one to zero, or a smaller range) through the plurality of intermediate modes.

In some embodiments, as shown in FIGS. 7C and 7F, the computer system does not display a representation of the portion of the body of the user (e.g., the first user 7202 in FIG. 7C, and the third user 7206 in FIG. 7F, respectively) via the second display generation component 7102 when the computer system has switched to displaying the XR content 7002 using a fully immersive mode or VR mode (e.g., with no representation of the physical environment, and/or in a virtual three-dimensional environment). In some embodiments, as shown in FIGS. 7C and 7F, the status indications shown via the second display generation component 7102 have the same appearance, irrespective of the identity of the user viewing the XR content via the first display generation component 7100.

In some embodiments, as shown in FIGS. 7C and/or 7F, the computer system detects that a current level of immersion with which the XR content, including the representation of the three-dimensional environment, is displayed via the first display generation component 7100, has increased (e.g., the amount of virtual content, the ratio between virtual content versus passthrough content, and/or the spatial extent covered by virtual content, in the representation of the three-dimensional environment have increased, e.g., due to progression of an experience or program that is already started, due to events occurring in the computer system, and/or due to user requests). In response to detecting that the current level of immersion with which the XR content is displayed via the first display generation component 7100 has increased: in accordance with a determination that the current level of immersion does not meet immersion criteria, wherein the immersion criteria require that an amount of virtual content in the representation of the three-dimensional environment exceeds a first threshold amount of virtual content (e.g., a first threshold quantity of virtual content, a first threshold ratio between virtual content and representation of physical environment, a first spatial extent of virtual content in the representation of the three-dimensional environment, and/or a threshold value based on other measures of the level of immersion) in order for the immersion criteria to be met, the computer system continues to differentiate display of the respective representation of the portion of the body of the user via the second display generation component 7102 based on whether the user meets the first criteria (e.g., whether the user is a primary user such as the first user 7202, or the user is a guest user such as the third user 7206) (and, optionally, to update the appearance of the respective representation of the portion of the body of the user in accordance with the changes in appearance of the portion of the body of the user). In accordance with a determination that the current level of immersion meets the immersion criteria (e.g., the second level of immersion is a fully immersive level, that completely or substantially blocks out the view of the surrounding physical environment, and/or an amount of virtual content in the representation of the three-dimensional environment exceeds the first threshold amount of virtual content (e.g., the first threshold quantity of virtual content, the first threshold ratio between virtual content and representation of physical environment, the first spatial extent of virtual content in the representation of the three-dimensional environment, and/or the threshold value based on other measures of the level of immersion)), the computer system displays content on the second display generation component 7102, irrespective of whether the user meets the first criteria (e.g., irrespective of whether the user is the first user 7202 or the third user 7206) (e.g., displaying only the status information, or displaying a generic representation of the portion of the body of the user, irrespective of whether the primary user or the guest user is using the computer system). For example, the second display generation component 7102 shows the status information of the XR content with the same appearance for both a primary user and a guest user, when the primary user and the guest user is viewing XR content in a fully immersive way using the first display generation component 7100, respectively.

More details regarding the user interfaces and operations of the computer system are provided with respect to FIGS. 7G1-7AB, and FIGS. 8-12, and accompanying descriptions.

FIGS. 7G1-7J illustrate a computer system that is the same or analogous to the computer system described above with respect to FIGS. 7A-7F, in accordance with some embodiments. The computer system described with respect to FIGS. 7G1-7J provide at least some or all of the functions and features described with respect to the computer system in FIGS. 7A-7F. Similarly, the first display generation component 7100 and the second display generation component

7102 in FIGS. 7G1-7J are also the same or analogous to the first display generation component 7100 and the second display generation component 7102 in FIGS. 7A-7F, respectively. In some embodiments, the computer system is an HMD (e.g., HMD device 1-100 described with reference to FIGS. 1A-1P). In some embodiments, the HMD includes one or more inward-facing displays (e.g., second display generation component 7100) (e.g., labeled "BACK" of HMD 7100*a* in FIGS. 7G2 and 7H2)) that displays a representation of a portion of the three-dimensional environment that corresponds to the perspective of the user that is wearing the HMD (e.g., first user 7202, and/or another user) and one or more outward-facing displays (e.g., second display generation component 7102) (e.g., labeled "FRONT" of HMD 7100*a* in FIGS. 7G2, 7H2)) that optionally displays status information associated with the user that is wearing the HMD and the visual indication of media capture. In some embodiments, the back of HMD 7100*a* corresponds to the rear view of HMD 1-100 described with reference to FIG. 1C, where the back of HMD 7100*a* includes one or more displays for displaying the user interface (e.g., first and second display assemblies 1-120*a*, 1-120*b* and/or first and second optical modules 11.1.1-104*a* and 11.1.1-104*b*) to the user that wears the HMD. In some embodiments, the front of HMD 7100*a* corresponds to the front perspective view of HMD 1-100, where the front of HMD 7100*a* includes one or more external displays (e.g., display assembly 1-108). In FIGS. 7G1-7J, the first user 7202 is shown as the user that is viewing content via the first display generation component 7100 (e.g., the "BACK" portion of the HMD 7100*a* in FIGS. 7G2 and 7H2) and operating a control 7302 (e.g., a hardware button on the HMD (e.g., one of the buttons (e.g., first button 1-128, button 11.1.1-114, second button 1-132, and or dial or button 1-328), knobs (e.g., first button 1-128, button 11.1.1-114, and/or dial or button 1-328), or digital crowns (e.g., first button 1-128 which is depressible and twistable or rotatable, button 11.1.1-114, and/or dial or button 1-328) of the HMD 1-100), a software control in a user interface presented on a control device associated with the computer system or via the first display generation component 7100) associated with the computer system. In some embodiments, the user that is operating the control 7302 is another primary user, or a guest user (e.g., the third user 7206 or another guest user), and the computer system functions similarly as described in FIGS. 7G1-7J, except that, optionally, the representation of the portion of the body of the user has different levels of fidelity when shown via the second display generation component 7102, depending on whether the user is an enrolled user (also referred to as a primary user) or a guest user (e.g., as described with respect to FIGS. 7A-7F and FIG. 8).

In FIGS. 7G1-7I, the computer system detects a start of media capture (e.g., video capture, or another type of media capture) using the computer system; and in response to detecting the start of the media capture, the computer system displays a visual alert 7304 (e.g., an animated light pattern that, optionally, expands and/or propagates across the display region of the second display generation component 7102, or other visual alert) via the second display generation component 7102, in accordance with some embodiments. In FIG. 7J, the computer system detects a start of media capture (e.g., still image capture, or another type of media capture) using the computer system; and in response to detecting the start of the media capture, the computer system displays a visual alert 7310 (e.g., another animated light pattern that, optionally, expands and/or propagates across the display region of the second display generation component 7102, or other visual alert) via the second display generation component 7102, in accordance with some embodiments. As shown in FIGS. 7G1-7I and FIG. 7J, different types of media capture are indicated by different visual appearances and/or visual characteristics (e.g., color, pattern, and/or animated changes) on the second display generation component 7102, in accordance with some embodiments. In some embodiments, the visual alerts for media capture are visually biased (e.g., asymmetrical, and/or more visually prominent on one portion relative to another portion) toward the side of the display region of the second display generation component that is farther away from the control that is used to start the media capture (e.g., drawing attention to the other people who are not in a position to see the control). As shown in FIGS. 7G1-7J, the visual alert for the start of media capture (e.g., the alert 7304 in FIGS. 7G1-7I, and/or the alert 7310 in FIG. 7J) is displayed, via the second display generation component 7102, concurrently with the graphical elements that represent the status associated with the first user 7202 (e.g., the overlay 7008 indicating the status of the XR content, the representation 7006 of the portion of the body of the first user 7202, the application name 7306, and/or other graphical elements), in accordance with some embodiments. More details of the computer system illustrated in FIGS. 7G1-7J are provided below.

FIGS. 7G1 and 7G2 illustrate analogous user interfaces shown via the computer system, but with different illustration of the display generation components, in accordance with some embodiments. While user interactions and operations are described in more detail with respect to the setup shown in FIG. 7G1 (e.g., showing the first display generation component 7100 and the second display generation component as separate displays located in separate locations), analogous interactions and operations can be implemented on an HMD (e.g., HMD 1-100, or HMD 7100*a*) that includes one or more inward-facing displays (e.g., labeled as "BACK" of HMD 7100*a*) and one or more outward-facing displays (e.g., labeled "FRONT" of HMD 7100*a*), as shown in FIG. 7G2, in accordance with some embodiments. Although only some of the user interface interactions and operations described with respect to FIGS. 7A-7AB2 using the setup shown in FIG. 7G1 are reproduced using the setup shown in FIG. 7G2 (e.g., FIGS. 7G2, 7H2, 7L2, 7M2, 7N2, 7AA2, and 7AB2 are reproduced with an HMD setup, based on FIGS. 7G1, 7H1, 7L1, 7M1, 7N1, 7AA1, and 7AB1, respectively), a person skilled in the art would appreciate that, other user interactions and operations described with respect to FIGS. 7A-7AB2 using the setup shown in FIG. 7G1 can be implemented analogously in an HMD setup shown in FIG. 7G2, in accordance with some embodiments.

As shown in FIGS. 7G1 and 7G2, while the XR content 7002 (e.g., including a representation of a three-dimensional environment, a movie, and/or other virtual and/or mixed reality content) is visible via the first display generation component 7100 (e.g., viewed by the first user 7202 facing the display side of the first display generation component 7100), the computer system displays, via the second display generation component 7102, one or more graphical elements that provide a visual indication of a status associated with the first user 7202 (e.g., application name 7306, progress bar, and other icons and/or indicators associated with the XR content, and the representation 7006 of the portion of the body of the first user 7202), wherein the one or more graphical elements are updated in accordance with the changes of the status associated with the first user (e.g., in the manner described with respect to FIGS. 7A-7C), in accordance with some embodiments. For example, as shown in FIGS. 7G1-7J, the computer system is displaying the XR content 7002 in a mixed-reality mode, and a representation of the physical environment (e.g., including a representation 7010 of the second user 7204 (e.g., shown as 7010-*c*, 7010-*d*, 7010-*e*, and 7010-*f* in FIGS. 7G1-7J, respectively) in the physical environment (e.g., represented as location B 7000-*b* in FIGS. 7G1-7J, and/or the physical environment surrounding the HMD 7100*a* in FIGS. 7G1 and 7H2)) is visible via the first display generation component 7100. Correspondingly, the computer system also displays, via the second display generation component 7102, a representation 7006 of the first user 7202 (e.g., shown as 7006-*c*, 7006-*d*, 7006-*e*, and 7006-*f* in FIGS. 7G1-7J, respectively) along with one more graphical elements that indicate the status of the XR content and the level of immersion (e.g., the application name 7306, the overlay 7008** representing the status of XR content, and/or other objects and indicators).

In FIGS. 7G1 and 7G2, while displaying, via the second display generation component 7102, the one or more graphical elements (e.g., representation 7006 of the portion of the body of the first user 7202, the overlay 7008 representing the status of the XR content and the level of immersion, the application name 7306, and/or other graphical elements indicting the status associated with the first user 7202), the computer system detects a first event (e.g., activation of a shutter button 7302 on the computer system or display generation component(s), or activation of a software control (e.g., software control 7308, or another software control) in a media capture application displayed via the first display generation component 7100) that corresponds to a start of media capture using the computer system (e.g., video recording, audio recording, and/or image capturing of the physical environment surrounding the first display generation component 7100 and the second display generation component 7102). As shown in FIGS. 7G1 and 7G2, in response to detecting the first event that corresponds to the start of media capture using the computer system (e.g., the first user 7302 activating the control 7302 to start media capture using the computer system), the computer system displays, via the second display generation component 7102, a first visual alert 7304 (e.g., shown as 7304-*a* in FIG. 7G1 and 7G2) that indicates the start of media capture. For example, the first visual alert 7304 is an animated visual effect (e.g., an animated wave of light that, optionally, expands and/or propagates across the surface of the display side of the second display generation component 7102, a flash, a blinking light, and/or other visual indications). As shown in FIGS. 7G1 and 7G2, the first visual alert 7304-*a* is displayed concurrently with at least a portion of the one or more graphical elements that represent the status associated with the first user 7202. In some embodiments, displaying the visual alert 7304 includes displaying a visual effect, an animation, and/or a visual indicator, concurrently with the one or more graphical elements (e.g., representation 7006 of the portion of the body of the first user 7202, and/or the overlay 7008 representing the status of the XR content display). In some embodiments, displaying the visual alert 7304 includes displaying an animated change of the one or more graphical elements (e.g., representation 7006 of the portion of the body of the first user 7202, and/or the overlay 7008 representing the status of the XR content display) that are not caused by the changes in the content 7002 displayed via the first display generation component 7100, the change in the level of immersion, the changes in the appearance of the first user 7202, or the changes in other aspects of the status associated with the first user 7202.

In some embodiments, as described with respect to FIGS. 7A-7C earlier, the one or more graphical elements (e.g., representation 7006 of the portion of the body of the first user 7202, and/or the overlay 7008 representing the status of the XR content display) change over time. For example, the computer system displays real-time or periodic updates to the one or more graphical elements (e.g., representation 7006 of the portion of the body of the first user 7202, and/or the overlay 7008 representing the status of the XR content display) in accordance with the real-time or periodic changes occurring in the XR content, and/or in accordance with real-time or periodic changes occurring to the appearance of the portion of the body of the first user 7202. In some embodiments, the real-time updates and/or changes, optionally, include updates and changes that have some computational and/or signal processing delays (e.g., delays that are less than 0.5, 0.25, 0.1, 0.05, or 0.01 seconds and/or an amount that is not perceptible to most users).

In some embodiments, the one or more graphical elements include a first set of graphical elements (e.g., represented by "App A" 7306 in FIG. 7G1 and FIG. 7G2) (e.g., application icons, application names, content from the applications that has appearances unique to the applications, or other identifiers of applications) that indicates one or more active applications shown in the three-dimensional environment.

In some embodiments, the representation 7006 for the first user 7202 is replaced with the representation 7208 for the third user 7206, when the third user 7206 replaces the first user 7202 in the example scenario illustrated in FIG. 7G1 and FIG. 7G2 (e.g., the third user 7206 becomes the user that activated the control 7302, and that is viewing the XR content via the first display generation component 7100 in FIGS. 7G1 and 7G2). In some embodiments, the representation of the portion of the body of the user does not have different levels of fidelity depending on whether the user that is viewing the XR content via the first display generation component is a primary user or a guest user. For example, the representation 7006 may be replaced with a generic representation used for a guest user (e.g., representation 7208 used for the third user in FIGS. 7D-7E, or another generic representation), in accordance with a request of the first user 7202 to turn on a DND mode, a private mode, a parental control mode, and/or other modes, in accordance with some embodiments. More details regarding these modes are provided in the description of FIG. 11, in accordance with some embodiments.

As shown in FIG. 7G1 and FIG. 7G2, the representation 7006 of the portion of the body of the first user 7202 includes a representation based on a computer-generated image, a generic image, or a camera image of the portion of the body of the first user 7202 (e.g., eyes, upper portion of the face, or the face of the first user 7202), in accordance with some embodiments. In some embodiments, as described with respect to FIGS. 7A-7F, the appearance of representation of the portion of the body of the user (e.g., the representation 7006 for the first user 7202, and/or the representation 7208 for the third user 7206, respectively) is updated to reflect in real time the change in visual appearance of the portion of the body of the user to simulate the change in visual appearance caused by different virtual lights cast from the XR content and/or the alerts 7304 (in FIGS. 7G1-7I) and 7310 (in FIG. 7J) onto portion of the body of the user (e.g., eyes and/or portion of the face of the user that is in front of the display region of the first display generation component 7100). In some embodiments, the real-time change in the visual appearance of the portion of the body of the user and the detected change caused by the virtual light, optionally, include changes that have some computational and/or signal processing delays (e.g., delays that are less than 0.5, 0.25, 0.1, 0.05, or 0.01 seconds and/or an amount that is not perceptible to most users). In some embodiments, when light from the ambient physical environment changes, and/or when the virtual light from the virtual content and pass-through content shown via the first display generation component 7100 changes (e.g., due to change in the three-dimensional environment), the physical and virtual light cast on the portion of the body of the user changes the visual appearance of the portion of the body of the user; and as a result, the computer system changes the appearance of the representation of the portion of the body of the user (e.g., the representation 7006 for the first user 7202 in FIGS. 7A-7B and 7G1-7J, and the representation 7208 for the third user 7206 in FIGS. 7D-E) shown by the second display generation component 7102, in accordance with the change in the virtual and physical light and the resulting change in the appearance of the portion of the body of the user (e.g., the first user 7202 in FIGS. 7A-7B and 7G1-7J, and the third user 7206 in FIGS. 7D-7E, respectively).

As shown in FIG. 7H1 following FIG. 7G1, and analogously in FIG. 7H2 following FIG. 7G2, the first visual alert 7304 (e.g., shown as 7304-*a* in FIGS. 7G1 and 7G2, and 7304-*b* in FIGS. 7H1 and 7H2) includes animated light, optionally, expanding and propagating from a starting location across the rest of the display region of the second display generation component 7102, in accordance with some embodiments. In some embodiments, the computer system displays a change in visual appearance of the content displayed via the second display generation component 7102, such as animated light that is overlaid on top or below the status indications on the second display generation component 7102 and/or visual effects (e.g., variations of values and/or spatial distributions of values for one or more display properties, such as color, luminance, sharpness, blur radius, and/or resolution) applied to part or all of the status indications on the second display generation component 7102, that expands from a first portion of the second display generation component 7102 (e.g., a lower left corner, a portion that is close to the control 7302 (e.g., also shown as 7302' for the second display generation component 7102 in FIGS. 7G1 and 7G2, and FIGS. 7H1 and 7H2) for media capture, a portion that is opposite to the control 7302 (e.g., also shown as 7302' for the second display generation component 7102 in FIGS. 7G1 and 7G2, and FIGS. 7H1 and 7H2) for media capture, or a region that is selected without consideration of the location of the control for media capture, respectively) toward a second portion of the second display generation component (e.g., a side, corner, a region that is farther away from the control for media capture, a region that is close to the control for media capture, or a region that is selected without consideration of the location of the control for media capture, respectively).

In some embodiments, the change in the visual appearance of the content (e.g., the alert 7304, the representation 7006 of the portion of the body of the first user 7202, the overlay 7008 indicating the status of the XR content, the identifier of the application 7306, and other graphical elements indicating the status associated with the first user 7202) displayed via the second display generation component 7102 occurs across a three-dimensional surface (e.g., projecting animated light and colors onto a three-dimensional mesh (e.g., a mesh that corresponds to the three-dimensional contours of the user's face and/or the surface of the second display generation component 7102)) via the second display generation component 7102. In some embodiments, the visual alert 7304 (e.g., shown as in FIGS. 7G1-7I) includes animated light and colors that, optionally, expands or propagates from a first side or corner region of the display region of the second display generation component 7102 toward a second, opposite side or corner of the display regions of the second display generation component 7102, across a three-dimensional mesh or surface that wrap around the head, face, or eyes of the first user 7202.

In some embodiments, as shown in FIG. 7G1 and FIG. 7G2, the media capture is started in response to the user activating the control 7302. In some embodiments, the control 7302 is a first hardware control (e.g., a hardware or solid-state button, switch, touch-sensitive surface, toggle, a digital crown and/or dial, that is located on a remote-control device, the computer system, the first display generation component 7100, the second display generation component 7102, and/or the HMD comprising the first display generation component and the second display generation component (e.g., a button (e.g., button 11.1.1-114, second button 1-132, and or dial or button 1-328), and/or a digital crown (e.g., first button 1-128 and/or button 11.1.1-114, and/or dial or button 1-328) for providing inputs to HMD 7100*a*). In some embodiments, the animated changes in appearance of the content shown via the second display generation component 7102, as the alert 7304 for the start and/or progress of the media capture, optionally, expands and/or propagates outwardly from the location corresponding to the first hardware control. For example, as shown in FIG. 7H1 following FIG. 7G1, and/or FIG. 7H2 following FIG. 7G2, the alert 7304 would, optionally, expand and propagate outwardly from the lower right corner of the display region of the second display generation component 7102 (e.g., the location of the control 7302 when the first display generation component 7100 and the second display generation component 7102 are placed back to back in an HMD worn by the first user 7202), in accordance with some embodiments.

In some embodiments, the activation of the first hardware control (e.g., the control 7302 or another hardware control) corresponds to a down-click of the first hardware control. In some embodiments, the media capture is started and the first visual alert 7304 is displayed, in response to detecting the down-click of the first hardware control without detecting the up-click of the first hardware control or irrespective of whether the up-click of the first hardware control has been detected. In some embodiments, the activation of the first hardware control (e.g., the control 7302, or another hardware control) corresponds to an up-click of the first hardware control following a down-click of the first hardware control. In some embodiments, the media capture is started and the first visual alert 7304 is displayed, in response to detecting the up-click of the first hardware control after having detected the down-click of the first hardware control.

In some embodiments, the computer system displays different visual feedback for video media capture and still media capture. For example, as shown in FIG. 7H1 following FIG. 7G1, and/or FIG. 7H2 following FIG. 7G2, the visual alert 7304 is displayed to indicate that a first type of media capture (e.g., video capture, or video and audio capture, or other types of continuous media capture) has been started (and, optionally, is in progress). In FIG. 7J, the visual alert 7310 is displayed to indicate that a second type of media capture (e.g., still image capture, photo capture, and/or other types of discrete media capture) has been started (and, optionally, is in progress). As shown in FIG. 7H1 following FIG. 7G1, and/or FIG. 7H2 following FIG. 7G2, in contrast to FIG. 7J, the appearances of the visual alerts 7304 and 7310 for the two different types of media capture are different. In some embodiments, the computer system uses different colors for the visual alerts for different types of media capture. In some embodiments, the computer system uses different animations for the visual alerts for different types of media capture. In some embodiments, the alert for one type of media capture includes animated changes, while the alert for another type of media capture does not include animated changes. For example, in some embodiments, the alert and visual feedback for the start and progress of video capture includes animated light that continues to be displayed while the video capture is ongoing, while the alert for a still photo capture is a discrete visual change rather than continuous animated changes (e.g., includes a single flash of light, one pulse of light moving across the display generation component, or a fixed number of blinks) and ceases to be displayed after the alert is displayed once for a respective still photo capture.

In some embodiments, as shown in FIG. 7H1 following FIG. 7G1, and/or FIG. 7H2 following FIG. 7G2, and FIG. 7J, the visual alerts that are displayed for the start of media capture (e.g., the alerts 7304 and 7310, respectively) are asymmetrical. In some embodiments, the visual alerts are displayed with a biased toward a side of the display generation component(s) that does not have the hardware control used for starting the media control. In some embodiments, the visual alerts 7304 and 7310 are biased toward the bottom of the display region of the second display generation component 7102 (e.g., is more visually prominent (e.g., has a greater intensity, luminance, faster changes, and/or more color saturation and/or opacity), and/or has more rapid changes) toward the bottom of the display region of the second display generation component 7102. In some embodiments, the visual alerts 7304 and 7310 are biased toward one corner or side of the display region of the second display generation component 7102.

In some embodiments, the animated changes in the visual alert 7304 continue to be displayed while media capture of the external environment is in progress. For example, as shown in FIGS. 7G1-7H, while the media capture is in progress (e.g., as indicated by the state of the software control 7308 shown via the first display generation component 7100, and the state of the hardware control 7302 (e.g., pressed and held down by the first user 7202, or clicked and locked by the first user 7202)), the computer system maintains the display of the visual indicator 7304 (e.g., continuously animated and propagating across the display region of the second display generation component 7102) to indicate that the media capture is ongoing.

In some embodiments, upon termination of the media capture after the start and continuation of media capture, the computer system ceases to display the visual alert for the media capture. For example, as shown in FIG. 7I, in response to detecting the release of the hardware control 7302, the computer system ceases to display the visual alert 7304 via the second display generation component. In some embodiments, the computer system displays an animated transition showing the visual alert 7304 retracting back to its starting location and disappears from the display region of the second display generation component. In some embodiments, the computer system displays an animated transition showing the visual alert 7304 expanding and propagating away from its starting location and then disappears from the display region of the second display generation component. In some embodiments, detecting the termination of the media capture includes detecting an automatic termination of the media capture and/or termination of media capture caused by user request. In some embodiments, detecting the user request to terminate the media capture includes detecting that the user has pressed a hardware button 7302 on the HMD again, that the user has released the hardware button on the HMD that was held down for the media capture, that the user has selected the stop option (e.g., the control 7308 in FIG. 7H1 and FIG. 7H2) in a camera user interface displayed via the first display generation component 7100, that the user has stopped a process or application that is performing the media capture using an application user interface of the process or application, and/or that the user has provided a voice command or gesture command to stop or pause the media capture. In some embodiments, detecting the termination of the media capture includes detecting a system event or system limitation (e.g., lack of data storage, file access authority, and/or lighting or stability conditions; and/or preestablished limitations on the duration, file size, and/or subject matter of the media capture) that causes the termination of the media capture.

In some embodiments, the media that is captured can be played back via the first display generation component 7100 at a later time, e.g., using a media player application or the application through which the media was captured. In some embodiments, the media captured through the media capturing process is stored as one or more media files in a media library locally on the computer system and/or uploaded to another computer system (e.g., a companion device, such as a desktop computer or a mobile device, a smart phone, or a tablet device; or a remote server). In some embodiments, the media that is captured can be searched and located in a media library and played back using the media player of the computer system and/or one or more applications that were used to perform the media capture.

More details regarding the user interfaces and operations of the computer system are provided with respect to FIGS. 7A-7F and 7K-7AB2, and FIGS. 8-12, and accompanying descriptions.

FIGS. 7K-7O illustrate a computer system that is the same or analogous to the computer system(s) described above with respect to FIGS. 7A-7J, in accordance with some embodiments. The computer system described with respect to FIGS. 7K-7O provide at least some or all of the functions and features described with respect to the computer system(s) in FIGS. 7A-7J, in accordance with some embodiments. Similarly, the first display generation component 7100 and the second display generation component 7102 in FIGS. 7K-7O are also the same or analogous to the first display generation component 7100 and the second display generation component 7102 in FIGS. 7A-7J, in accordance with some embodiments. In FIGS. 7K-7O, the first user 7202 is shown as the user that is viewing content via the first display generation component 7100. In some embodiments, the user that is viewing the XR content via the first display generation component 7100 is another primary user, or a guest user (e.g., the third user 7206 or another guest user), and the computer system functions similarly as described in FIGS. 7A-7J, except that, optionally, the representation of the portion of the body of the user has different levels of fidelity when shown via the second display generation component 7102, depending on whether the user is an enrolled user (also referred to as a primary user) or a guest user (e.g., as described with respect to FIGS. 7A-7F and FIG. 8).

Figure 7K:
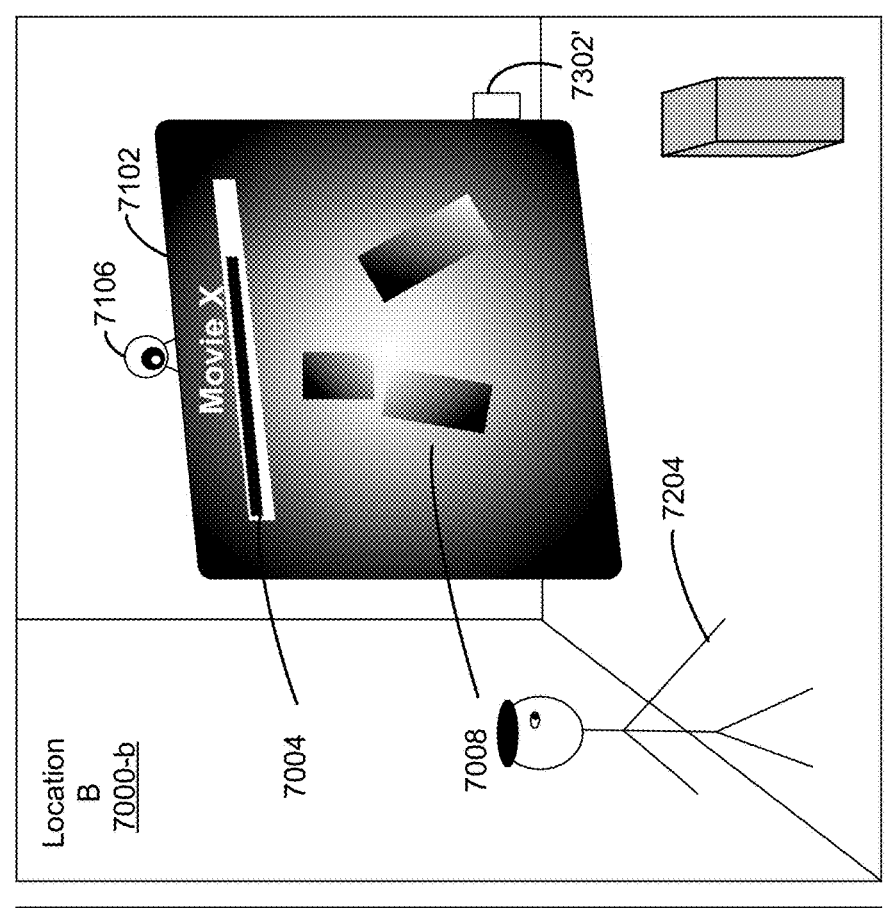
Figure 7K:
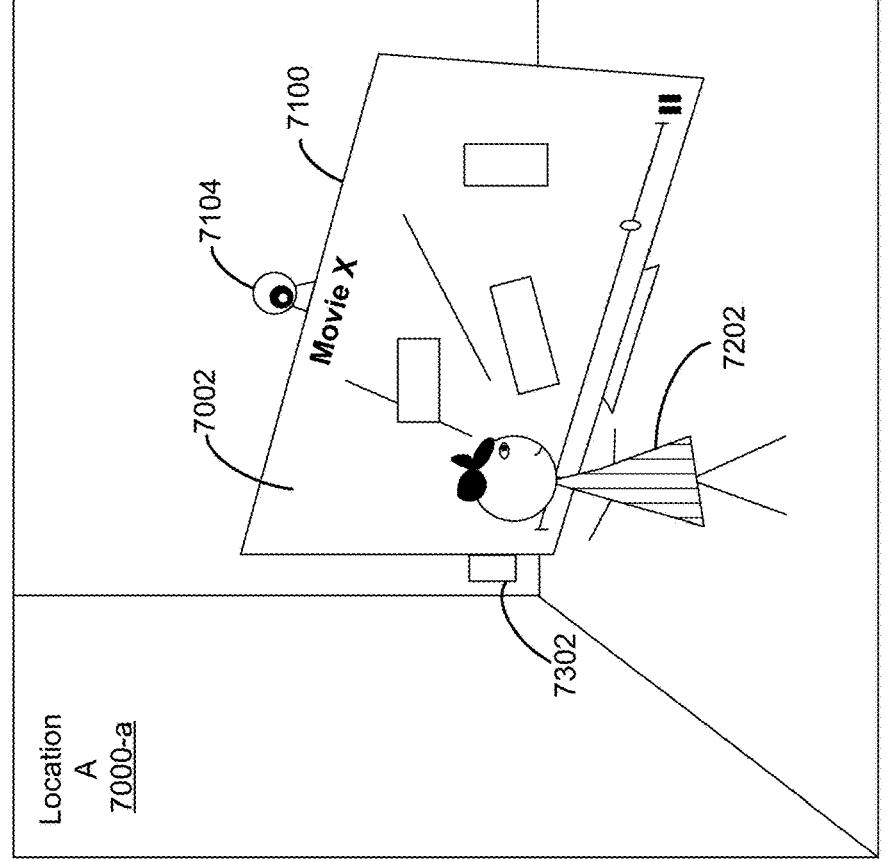
Figure 7O:
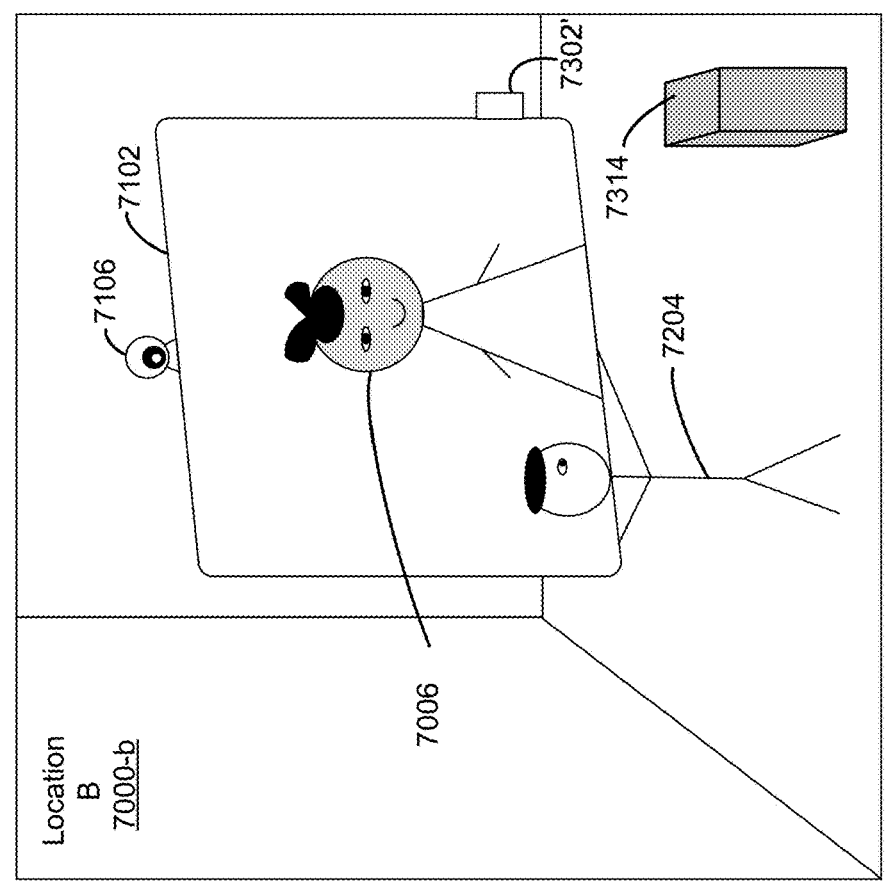
Figure 7O:
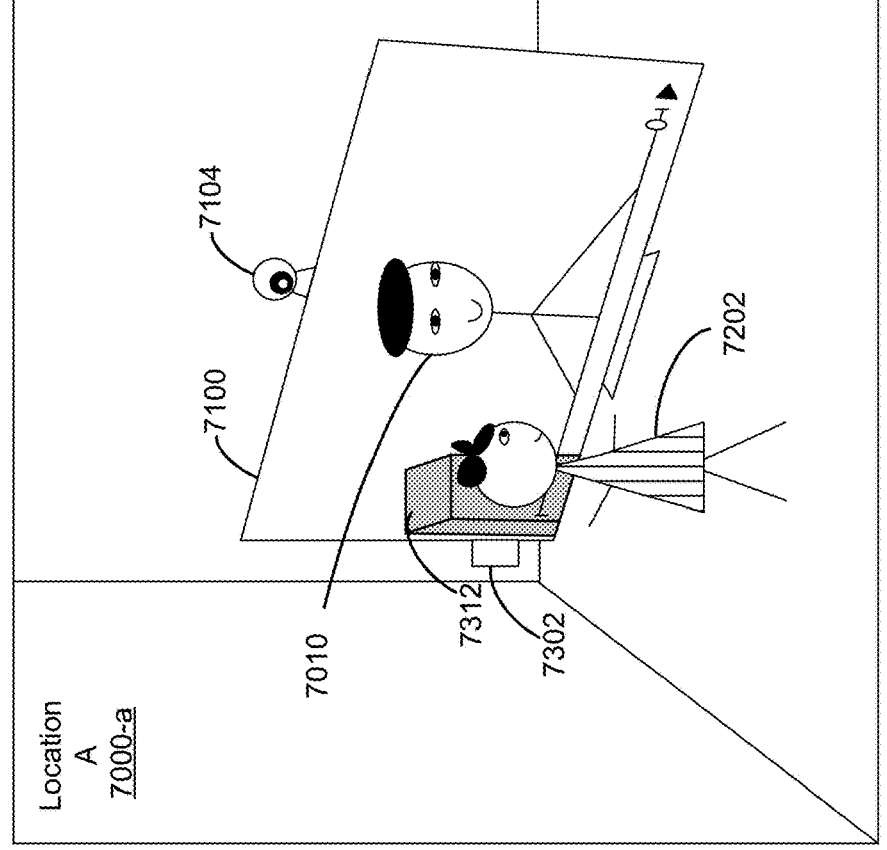

In FIGS. 7K-7O, the computer system automatically changes the level of immersion with which XR content 7002 is presented via the first display generation component 7100 to the first user 7202, in response to detecting one or more events, in accordance with some embodiments. In addition to changing the level of immersion in response to detecting the one or more events, the computer system also changes the appearance of the graphical elements that indicate the status associated with the first user (e.g., the overlay 7008 indicating the status of the XR content displayed via the first display generation component, the progress bar 7004, the representation 7006 of the portion of the body of the first user 7202, and/or other graphical elements) on the second display generation component 7102, in accordance with some embodiments. In FIG. 7K, the computer system displays the XR content in a fully immersive mode or virtual reality mode; in FIG. 7L1 and FIG. 7L2, the computer system detects one or more events would cause the computer system to decrease the level of immersion with which to display the XR content via the first display generation component 7100; in FIG. 7M1 and FIG. 7M2, the computer system decreases the level of immersion in response to detecting the one or more events, and changes the appearance of the graphical elements that indicate the status associated with the first user 7202 to correspond to the decrease of the level of immersion, in accordance with some embodiments. In FIG. 7M1 and FIG. 7M2, the computer system detects additional events that causes the computer system to further decrease the level of immersion, and the computer system further changes the appearance of the graphical elements that indicate the status associated with the first user 7202 to correspond to the further decrease of the level of immersion, in accordance with some embodiments. In FIG. 7N1 and FIG. 7N2, the computer system detects additional events that causes the computer system to further decrease the level of immersion to a passthrough mode, and the computer system further changes the appearance of the graphical elements that indicate the status associated with the first user 7202 (e.g., overlay 7008 and progress bar 7004 are no longer displayed, and only the representation 7006 of the portion of the body of the user 7202 remains displayed via the second display generation component 7102) to correspond to the further decrease of the level of immersion to the passthrough mode, in accordance with some embodiments. In some embodiments, the computer system also detects events that causes the computer system to increase the level of immersion, and the computer system changes the appearance of the graphical elements that indicate the status associated with the first user 7202 to correspond to the increase in the level of immersion (e.g., in a manner that reverses the changes shown in FIGS. 7K-7O). More details of the computer system illustrated in FIGS. 7K-7O are provided below.

As discussed earlier with respect to FIGS. 7A-7C, while XR content 7002 (e.g., including a representation of a three-dimensional environment, a movie, or other virtual and/or mixed reality content) is visible via the first display generation component 7100 (e.g., viewed by the first user 7202 facing the display side of the first display generation component 7100), the computer system displays, via the second display generation component 7102, one or more graphical elements that provide a visual indication of a status associated with the first user 7202 (e.g., overlay 7008 indicating a status of the XR content, application name, progress bar, and other icons and/or indicators associated with the XR content, and, optionally, the representation 7006 of the portion of the body of the first user 7202), wherein the one or more graphical elements are updated in accordance with the changes of the status associated with the first user (e.g., in the manner described with respect to FIGS. 7A-7C, and 7D-7F), in accordance with some embodiments.

In the example scenario shown in FIG. 7K, the first user 7202 is viewing the XR content 7002 with a level of immersion that meets immersion criteria (e.g., the XR content is displayed in a completely immersive manner, in a virtual reality mode, without an indication of the physical environment; and/or more than a first threshold amount of virtual content and/or less than a second threshold amount of the representation of the physical environment are presented via the first display generation component 7100), in accordance with some embodiments. As a result, in some embodiments, as shown in FIG. 7K, the computer system displays, via the second display generation component 7102, the graphical elements that indicates the status of the XR content and level of immersion (e.g., the progress bar 7004, the movie title, the overlay 7008 that represents the status of the XR content, and/or other graphical elements) without including a representation of the portion of the body of the first user 7202.

In a different example scenario, such as that illustrated in FIG. 7N1 and FIG. 7N2, the computer system is displaying the XR content 7002 in a mixed-reality mode, and a representation of the physical environment (e.g., including a representation 7010 of the second user 7204 in the physical environment (e.g., represented as location B 7000-b in FIG. 7N1, the environment of the HMD 7100a in FIG. 7N2 that includes the second user or external viewer 7204)) is visible via the first display generation component 7100. Correspondingly, the computer system also displays, via the second display generation component 7102, a representation 7006 of the first user 7202 along with one more graphical elements that indicate the status of the XR content and the level of immersion (e.g., the progress bar 7004, the movie name, the overlay 7008 representing the status of XR content, and/or other objects and indicators), in accordance with some embodiments.

In some embodiments, the one or more graphical elements that represent the status associated with the first user 7202 (e.g., the representation 7006 of the portion of the body of the first user 7202, and the graphical elements 7008 and 7004 that represent the status of the XR content and the level of immersion) have different appearances (e.g., different values for a set of visual properties, using a different sets of visual filters and/or processing steps for generating the graphical elements from the content displayed via the first display generation component and/or from the image of the portion of the body of the first user), depending on the current level of immersion with which the XR content 7002 is displayed to the first user 7202 via the first display generation component 7102.

In some embodiments, the computer system detects whether criteria for changing the current level of immersion are met, while displaying the XR content via the first display generation component 7100 with a respective level of immersion. In response to detecting that the criteria for changing the current level of immersion are met, the computer system changes the level of immersion with which the XR content is displayed via the first display generation component 7100, and changes the appearance of the graphical elements that represent the status associated with the user shown via the second display generation component 7102. For example, as shown in FIG. 7M1 following FIG. 7L1 and/or FIG. 7M2 following FIG. 7L2, in some embodiments, the computer system determines that the criteria for changing the level of immersion are met in accordance with detection of actions of the second user 7204 that is present in the physical environment (e.g., in the location B 7000-b in FIG. 7L1, and/or in the portion of the physical environment in front of the forward-facing displays 7102 (e.g., labeled as "FRONT") in FIG. 7L2). For example, in some embodiments, detecting the actions of the second user 7204 that cause the computer system to change the current level of immersion (e.g., when the current level of immersion is a fully immersive level, or more than a threshold level of immersion) includes detecting that the second user 7204 has moved into a region in front of the second display generation component 7102 (e.g., also the region in front of the first user 7202 if the first user is wearing the HMD including the first display generation component 7100 and the second display generation component 7102). In some embodiments, detecting the actions of the second user 7204 that cause the computer system to change the current level of immersion (e.g., when the current level of immersion is a fully immersive level, or more than a threshold level of immersion) includes detecting that the second user 7204 is making a gesture (e.g., waving to the first user 7202, tapping on the shoulder or arm of the first user 7202, or other gestures that calls for the attention of the first user 7202) to the first user 7202. As shown in FIG. 7L1 or FIG. 7L2 following 7K, the second user 7204 has moved to a region in front of the second display generation component 7102, is waving to the first user 7202, and/or is calling out the name of the first user 7202; and upon detecting one or more of the above, the computer system determines that the criteria for changing the current level of immersion are met, in accordance with some embodiments. In FIG. 7M1 and FIG. 7M2, in response to detecting that the criteria for changing the current level of immersion are met, the computer system changes the way that XR content is displayed via the first display generation component in accordance with the change of the current level of immersion, in accordance with some embodiments. In this example scenario shown in FIG. 7M1 following FIG. 7L1 and FIG. 7M2 following FIG. 7L2, the computer system decreases the level of immersion from a fully immersive level to an intermediate level of immersion, and displays a representation of the physical environment (e.g., including a representation 7312 of the physical object 7314 in the physical environment (e.g., in location B 7000-b in FIG. 7M1, and/or in front of the forward-facing displays 7100 in FIG. 7M2), and a representation 7010 of the second user 7204) in front of the first user (e.g., in location B 7000-b in FIG. 7M1, and/or in front of the forward-facing displays 7100 in FIG. 7M2) among the XR content displayed via the first display generation component 7100. In addition, as described earlier with respect to FIGS. 7A-7C, when the computer system decreases the level of immersion from a fully immersive level to an intermediate level of immersion, the computer system also displays the representation 7006 of the portion of the body of the first user 7202 via the second display generation component 7102, in accordance with some embodiments. The representation 7006 of the portion of the body of the first user 7202 are updated in accordance with the changes in appearance of the first user 7202, and the graphical elements that indicate the status of the XR content and the current level of immersion are updated in accordance with the changes in the status of the XR content and the level of immersion, as described earlier with respect to FIGS. 7A-7F, in accordance with some embodiments.

In some embodiments, the computer system changes the appearance of the representation 7006 of the portion of the body of the first user 7202 as well as the graphical elements representing the status of the XR content, by increasingly greater amounts, as the degree of change in the level of immersion increases. As shown in FIG. 7N1 following FIG. 7M1 and FIG. 7N2 following FIG. 7M2, in some embodiments, even though the XR content 7002 is presented via the first display generation component 7102 in a mixed reality mode in both the scenario shown in FIG. 7M1 and FIG. 7M2, and the scenario shown in FIG. 7N1 and FIG. 7N2, the change in appearance of the graphical elements representing the status associated with the first user 7202 as shown in FIG. 7N1 and FIG. 7N2 (e.g., relative to the appearance of the set of graphical elements representing the status associated with the first user as shown in FIG. 7L1 and FIG. 7L2) is greater than the change in appearance of the graphical elements representing the status associated with the first user as shown in FIG. 7M1 and FIG. 7M2 (e.g., relative to the appearance of the set of graphical elements representing the status associated with the first user as shown in FIG. 7L1 and FIG. 7L2), because the level of immersion shown in FIG. 7N1 and FIG. 7N2 represents a further decrease in the level of immersion from that shown in FIG. 7M1 and FIG. 7M2, while the level of immersion shown in FIG. 7M1 and FIG. 7M2 represents a decrease in the level of immersion from that shown in FIG. 7L1 and FIG. 7L2.

In some embodiments, the representation of the portion of the body of the first user (e.g., the representation of the eyes and/or face of the first user, and/or the representation 7006 of the first user 7202) changes in appearance in accordance with the change in the level of immersion. For example, the representation 7006 of the portion of the body of the first user 7202 shown in FIG. 7N1 and FIG. 7N2 has greater clarity, luminance, less blurring, higher resolution, and/or less obfuscation from the overlay 7008 than the representation of the portion of the body of the first user 7202 shown in FIG. 7M1 and FIG. 7M2, because there is a decrease in the level of immersion with which the XR content is presented via the first display generation component 7100 when transitioning from the scenario shown in FIG. 7M1 and FIG. 7M2 to the scenario shown in FIG. 7N1 and FIG. 7N2.

In some embodiments, the computer system determines that the criteria for changing the level of immersion are met based on whether the first user 7202 is paying attention to the outside world (e.g., as a representation of the physical environment presented in a mixed reality mode among the XR content). For example, in some embodiments, as shown in FIG. 7N1 following FIG. 7M1 and FIG. 7N2 following FIG. 7M2, before the computer system detects that the first user 7202 is paying attention to the physical environment (e.g., to the representation 7010 of the second user 7204 that is displayed via the first display generation component), the computer system displays the graphical elements representing the status associated with the first user with a first appearance (e.g., the representation 7006 of the first user 7202 is more blurred and/or darkened, and the overlay 7008 representing the status of the XR content is more vibrant and expansive across the display region of the second display generation component 7102), as shown in FIG. 7M1 and FIG. 7M2; and in response to detecting that the first user 7202 is paying attention to the physical environment (e.g., to the representation 7010 of the second user 7204 that is displayed via the first display generation component 7100), the computer system displays the graphical elements representing the status associated with the first user with a second appearance (e.g., the representation 7006 of the first user 7202 is less blurred and/or darkened, and the overlay 7008 representing the status of the XR content is less vibrant and less expansive across the display region of the second display generation component 7102), as shown in FIG. 7N1 and FIG. 7N2.

In some embodiments, the computer system determines that the first user 7202 is paying attention to the physical environment surrounding the first user 7202, based on a determination that the first user's attention has shifted from computer-generated content (e.g., application windows, virtual objects, virtual experiences, and/or augmented reality experiences) to an object or person that does not form part of the three-dimensional extended reality experience generated by the computer system. In some embodiments, the computer system determines that the first user is paying attention to the physical environment surrounding the first user in response to detecting the first user verbally and/or gesturally engaged another person present in the physical environment surrounding the first user 7202 (e.g., saying hi, calling out someone's name, or other socially understood ways of getting someone's attention). In some embodiments, the computer system determines that the first user 7202 is paying attention to the physical environment, in response to detecting that the first user's gaze 7316 is directed to a representation of the physical environment (e.g., the representation 7010 of the second user 7204 in FIG. 7N1 and FIG. 7N2) shown via the first display generation component 7100. In some embodiments, the computer system continuously decreases the level of immersion (e.g., toward and/or to a complete passthrough mode) as the computer system detects that the first user 7102 continues to pay attention to the representation of the physical environment displayed via the first display generation component 7100 (e.g., continuing to gaze at the representation 7010 of the second user 7204), as shown in FIG. 7O following FIG. 7N1 and/or FIG. 7N2.

In some embodiments, as shown in FIG. 7O, when the computer system detects that the criteria for reaching the lowest level of immersion (e.g., displaying a complete passthrough view of the physical environment, and/or pause the display of the XR content via the first display generation component) are met (e.g., based on the first user's attention to the physical environment; based on the presence of the second user 7204 in front of the first user 7202; based on the attention from the second user 7204 to the first user 7202; based on the gestures and/or poses of the first user 7202 and/or the second user 7204 that indicate an interest to engage the other person, and/or based on other factors and criteria), the computer system ceases to display the XR content via the first display generation component 7100, and displays a passthrough view of the physical environment (e.g., including the representation 7010 of the second user 7204, the representation 7312 of the physical object 7314, and the representation of the location B 7000-b) via the first display generation component 7100. In some embodiments, the representation of the physical environment (e.g., including the representation 7010 of the second user 7204, the representation 7312 of the physical object 7314, and the representation of the location B 7000-b) that is displayed via the first display generation component 7100 has increasing visibility and/or visual prominence (e.g., has greater luminance, greater clarity, less blurring and obfuscation by the XR content, and/or greater spatial extent) as the level of immersion is decreased in FIGS. 7M1-7O. Correspondingly, the representation 7006 of the first user that is displayed via the second display generation component 7102 has increasing visibility and/or visual prominence (e.g., has greater luminance, greater clarity, less blurring and obfuscation by the overlay representing the status of the XR content, and/or greater spatial extent) as the level of immersion is decreased in FIGS. 7M1-7O, in accordance with some embodiments.

In some embodiments, the computer system determines that the criteria for changing the level of immersion are met based on the detection of the body pose (e.g., waving, pointing, clapping, leaning toward someone, using a hand to shield the eyes to look, cupping a hand behind the ears to listen, and/or other gestures and/or postures that indicate the person is paying attention to and/or trying to draw attention of someone) of the first user 7202 and/or the second user 7204.

In some embodiments, the computer system determines that the criteria for changing the level of immersion are met based on the detection of an object or person that is approaching the first user 7202 or is in the first user's way.

In some embodiments, the computer system determines that the criteria for changing the level of immersion are met based on an explicit input from the first user 7202, such as turning a control dial on the HMD, putting on the HMD, putting hands on the side of the HMD, and/or pressing a button on the HMD or in a user interface displayed via the first display generation component 7100. In some embodiments, the computer system determines that the criteria for changing the level of immersion are met based on starting or stopping of an immersive experience, application, and/or media playback in the three-dimensional environment, entering and/or exiting a shared three-dimensional experience or communication session, and/or activating and/or deactivating the DND mode on the first display generation component 7100. In some embodiments, the computer system determines that the criteria for changing the level of immersion are met in response to detecting the first user 7202 providing a mode switching gesture (e.g., hand shielding over the eyes, hand closing/opening in front of eyes, and other suitable gestures) or a voice command for changing the level of immersion.

In some embodiments, when displaying one or more graphical elements that represent the status associated with the first user 7202, the computer system displays different sets of graphical elements across several different display layers. For example, in FIG. 7K, the computer system displays a first set of the graphical elements that represent the status of the XR content that is displayed via the first display generation component 7100 (e.g., progress bar 7004, the title of the movie, or another user interface object that indicates the status information associated with the display of XR content 7002) in a first display layer (e.g., an outermost display layer on the display of the second display generation component 7102, or another display layer different from the outermost display layer), and displays a second set of graphical elements that represent the status of the XR content that is displayed via the first display generation component 7100 (e.g., the overlay 7008 that is animated to dynamically indicate the colors and other visual properties of the XR content) in a second display layer (e.g., a display layer behind the outermost display layer on the display of the second display generation component 7102, or another display layer that is different from the first display layer). In some embodiments, the different displayers are visible to the second user 7024 based on simulated parallax effect and/or optionally, based on different views of the second user 7024 as the second user 7024 moves relative to the second display generation component 7102 in the physical environment. In some embodiments, the second display generation component 7102 is a lenticular display (e.g., a lenticular lens panel or array 3-110, as described with reference to FIG. 1G) that displays different views of an object on the second display generation component based on the viewing angle of a respective viewer relative to the object, and as a result shows different views of the first set of graphical elements in the first display layer, and the different views of the second set of graphical elements in the second display layer, based on the different simulated depths of the first display layer and the second display layer. In some embodiments, the graphical elements displayed on the second display generation components are distributed on more than two display layers, based on their functional grouping (e.g., groupings to indicate stable status information or dynamic status information, and/or groupings to indicate user-specific status information or generic status information) and/or form (e.g., discrete objects versus amorphous visual effects, different spatial extent, or other form-related properties).

In some embodiments, as shown in FIGS. 7M1-7O, as the level of immersion with which the XR content is presented via the first display generation component decreases (e.g., from a fully immersive state shown in FIGS. 7L1 and 7L2 to a first intermediate level of immersion shown in FIGS. 7M1 and 7M2, and a second, lower, intermediate level of immersion shown in FIGS. 7N1 and 7N2, and finally to a lowest level of immersion shown in FIG. 7O, the computer system reduces the graphical elements or completely removes the graphical elements in at least some of the display layers of the second display generation component. For example, as shown in FIGS. 7M1 and 7M2 and FIGS. 7N1 and 7N2, the set of graphical elements (e.g., overlay 7008, and other graphical elements displayed in this display layer and/or between the representation 7006 of the portion of the body of the user and the outermost display layer) that are displayed in the display layer underlying the outermost display layer are removed and/or reduced in spatial extent, in response to a decrease in the current level of immersion with which the XR content is displayed via the first display generation component 7100. Furthermore, in FIG. 7O, the set of graphical elements that are displayed on the outermost display layer (e.g., the progress bar 7004, the movie title, and other graphical elements indicating the status associated with the XR content display) are also removed in response to a further decrease in the current level of immersion with which the XR content is displayed via the first display generation component 7100.

In some embodiments, different display layers of the second display generation component have different simulated z-depths relative to a surface of the second display generation component 7102. For example, in some embodiments, as shown in FIGS. 7M1-7N2, the progress bar 7004 and the movie title are displayed in the outermost display layer and has a small simulated depth; the overlay 7008 is displayed in a display layer underlying the display layer of the progress bar 7004, and has a simulated depth that is greater than the simulated depth of the progress bar 7004 and the movie title; and the representation 7006 of the portion of the body of the user is displayed in a display layer underlying the display layers of the progress bar 7004 and the overlay 7008, and has the greater simulated depth than the simulated depths of the progress bar 7004 and the overlay 7008. In some embodiments, the display of the second display generation component has a curved profile (e.g., wrapping around the face or head of the first user 7202), and the display layers are parallel or substantially parallel to the curved profile of the display of the second display generation component. In some embodiments, the respective display layers of the different sets of graphical elements displayed via the second display generation components have respective curved and/or planar profiles independent of one another (e.g., the profile of the representation of the portion of the body of the user is curved and corresponds to the curved profile of the portion of the body of the user, and the profile of the overlay 7008 is a simple convex surface, and the profile of the progress bar 7004 is planar).

In some embodiments, the respective sets of graphical elements displayed in different display layers have different sets of visual characteristics that change in different manners in response to changes in the environment and/or changes in the level of immersion. For example, as shown in FIGS. 7M1-7N2, the overlay 7008 is translucent and includes visual effects that are animated dynamically based on the current appearance of the XR content shown via the first display generation component, while the progress bar 7004 is opaque and is not animated. In another example, the representation of the portion of the body of the user is dimmed in accordance with a determination that the ambient lighting is changed to a lower level, while the overlay 7008 is made more translucent in accordance with a determination that the ambient lighting is changed to a lower level, in accordance with some embodiments. In another example, the representation of the portion of the body of the user is made more vivid and color saturated in accordance with a determination that the level of immersion is changed to a lower level, while the overlay 7008 is made more translucent and less color saturated in accordance with a determination that the level of immersion is changed to a lower level, in accordance with some embodiments.

In some embodiments, graphical elements in different display layers of the second display generation component are animated independently of one another. For example, the progress bar 7004 is updated (e.g., the indicator of playback location moves along the progress bar 7004, or update in another manner) based on playback progress of the XR content shown via the first display generation component, the overlay 7008 is animated based on changes in the visual properties (e.g., colors and movements of XR content, mood of the XR content, or other visual properties) if the XR content as the XR content is displayed, and the representation 7006 of the portion of the body of the first user is animated based on the change in the appearance of the portion of the body of the first user (e.g., based on the movement of the eyes, based on the color of the face, and other visual properties and movements of the portion of the body of the first user).

In some embodiments, at least some of the display layers are partially transparent. In some embodiments, at least some of the display layers are opaque. For example, in FIGS. 7N1 and 7N2, the progress bar 7004 is opaque, and completely obscures the portion of overlay 7008 that underlies the progress bar 7004, in accordance with some embodiments. Furthermore, the overlay 7008 is partially transparent, e.g., more translucent in the central region and less translucent in the peripheral regions, and allows a viewer to see at least partially the representation 7006 of the portion of the body of the first user 7202 underlying the overlay 7008, in accordance with some embodiments.

In some embodiments, different types of indications are displayed on the second display generation component to indicate the type of the XR content or experience that is displayed via the first display generation component. For example, a green indicator is displayed (e.g., replacing display of the progress bar 7004 and the movie title) if the XR content is a live communication session in a shared three-dimensional environment, and a blue indicator is displayed (e.g., replacing display of the progress bar 7004 and the movie title) if the XR content is a media capturing activity (e.g., recording video and/or still photos) that records an XR experience, in accordance with some embodiments. In some embodiments, other visual indications are used to indicate the type of the XR content that is displayed (e.g., types based on whether the activity is interruptible, whether the activity is a shared experience, whether the activity is private to the first user, and/or other properties of the XR content).

In some embodiments, the visual properties of the representation 7006 of the portion of the body of the first user is displayed with simulated lighting and/or shadow that is based on a detected direction of ambient lighting. For example, if the ambient lighting is coming from a first direction (e.g., from the top, from the left, or from another first direction) relative to the representation of the portion of the body of the first user (e.g., relative to the display of the second display generation component 7102 and/or relative to the first user 7202 that has a respective spatial relationship with the second display generation component in the physical environment), the representation of the portion of the body of the first user is displayed with simulated lighting coming from the first direction (e.g., showing highlighted regions and/or shadows based on simulated lighting coming from the first direction); and if the ambient lighting is coming from a second direction (e.g., from the bottom, from the right, or another second direction that is different from the first direction) relative to the representation of the portion of the body of the first user (e.g., relative to the display of the second display generation component 7102 and/or relative to the first user 7202 that has a respective spatial relationship with the second display generation component in the physical environment), the representation of the portion of the body of the first user is displayed with simulated lighting coming from the second direction (e.g., showing different highlighted regions and/or shadows based on simulated lighting coming from the second direction). In some embodiments, if the ambient lighting does not have a strong directionality, and is coming from all or substantially all directions around the representation of the portion of the body of the first user (e.g., around the display of the second display generation component 7102 and/or around the first user 7202 that has a respective spatial relationship with the second display generation component in the physical environment), the representation of the portion of the body of the first user is displayed with simulated lighting that is neutral and without a strong directionality (e.g., with little highlighting and/or shadows on the representation of the portion of the body of the user).

More details regarding the user interfaces and operations of the computer system are provided with respect to FIGS. 7A-7J and 7P-7AB, and FIGS. 8-12, and accompanying descriptions.

FIGS. 7P-7T illustrate a computer system that is the same or analogous to the computer system(s) described above with respect to FIGS. 7A-7O, in accordance with some embodiments. The computer system described with respect to FIGS. 7P-7T provides at least some or all of the functions and features described with respect to the computer system (s) in FIGS. 7A-7O, in accordance with some embodiments. Similarly, the first display generation component 7100 and the second display generation component 7102 in FIGS. 7P-7T are the same or analogous to the first display generation component 7100 and the second display generation component 7102 in FIGS. 7A-7O, in accordance with some embodiments. In FIGS. 7P-7T, the first user 7202 is shown as the user that is viewing content via the first display generation component 7100 at one time, and as the user that is present in location B 7000-*b* and viewing content via the second display generation component 7102 at a different time; however, the first user 7202 in the example scenarios shown in FIGS. 7P-7T is also representative of another primary user or a guest user (e.g., the third user 7206 or another guest user) in some example scenarios, in accordance with some embodiments. In some embodiments, the computer system in FIGS. 7P-7T functions similarly as described in FIGS. 7A-7O, except that, optionally, the representation of the portion of the body of the user has different levels of fidelity when shown via the second display generation component 7102, depending on whether the user is an enrolled user (also referred to as a primary user) or a guest user (e.g., as described with respect to FIGS. 7A-7F and FIG. 8). In some embodiments, the computer system does not differentiate between an enrolled user and/or the guest user when presenting the representation of the portion of the body of the user (e.g., the representation is generated based on a generic image of the portion of the body of the user, or a camera view of the portion of the body of the user, and is updated based on the real-time change in appearance of the portion of the body of the user) via the second display generation component 7102. In some embodiments, the real-time change in appearance of the portion of the body of the user and/or the real-time updates to the representation of the portion of the body of the user, optionally, include changes and updates that have some computational and/or signal processing delays (e.g., delays that are less than 0.5, 0.25, 0.1, 0.05, or 0.01 seconds and/or an amount that is not perceptible to most users).

Figure 7P:
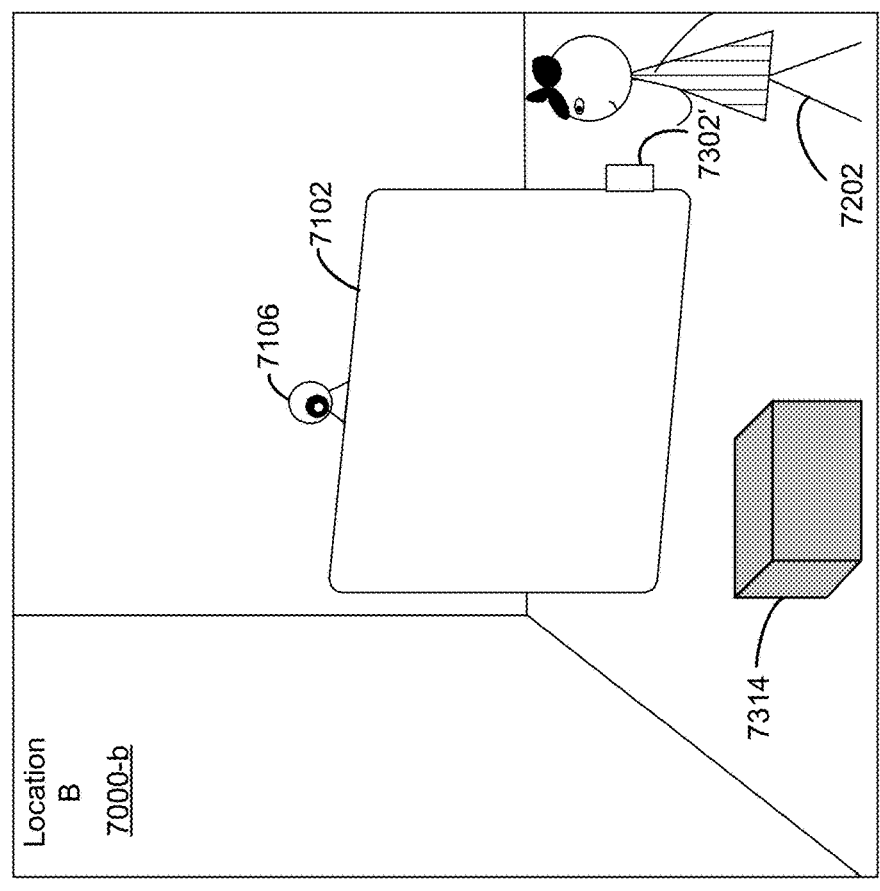
FIGS. 7P-7T illustrate a computer system that displays an alert for an incoming communication request via a first display generation component or a second display generation component depending on whether the computer system or a wearable device corresponding to the computer system (e.g., an HMD, a wrist band or watch, a backpack containing a component of the computer system, and/or the first display generation component) is worn by the user (e.g., being worn on the user's head, wrist, or back), in accordance with some embodiments.
Figure 7P:
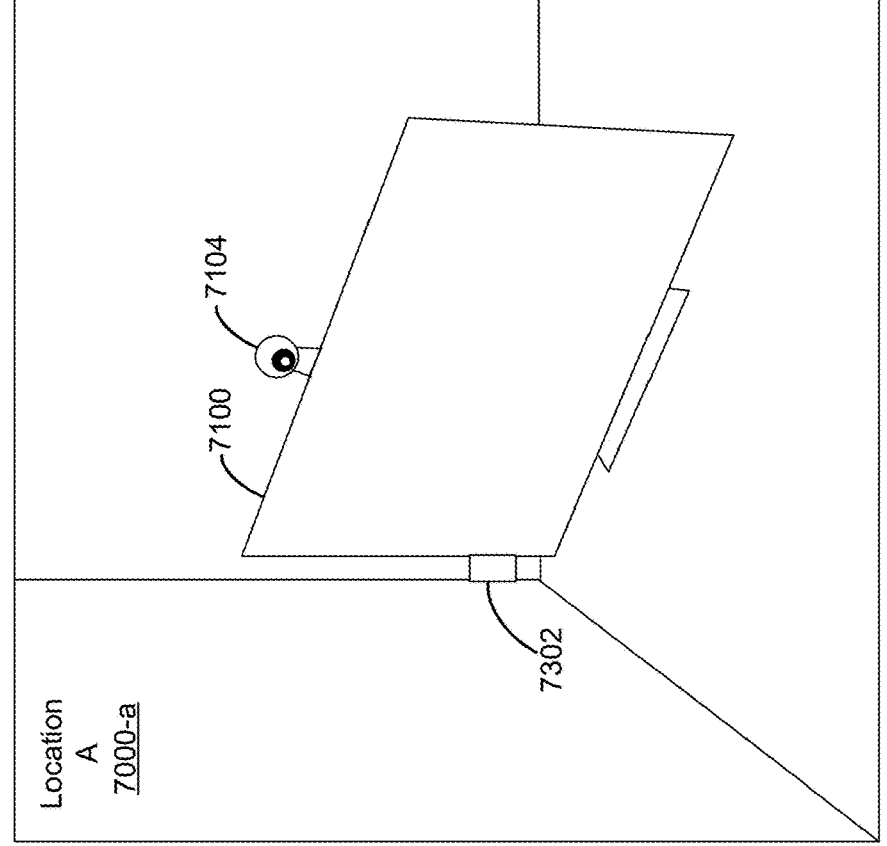
Figure 7Q:
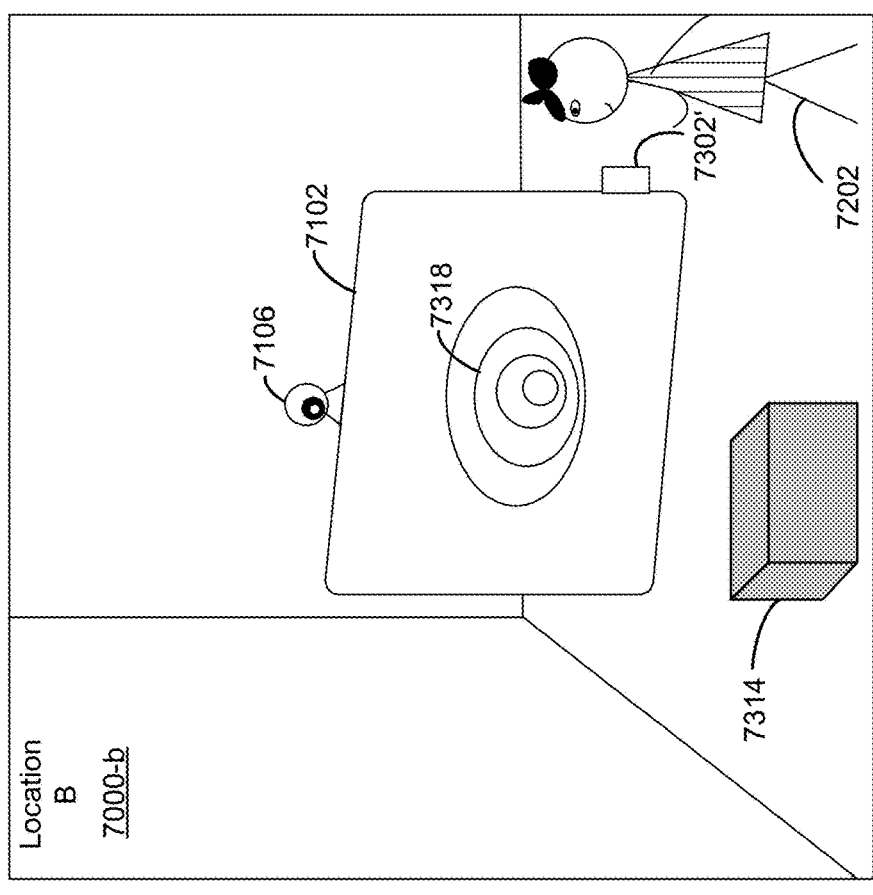
Figure 7Q:
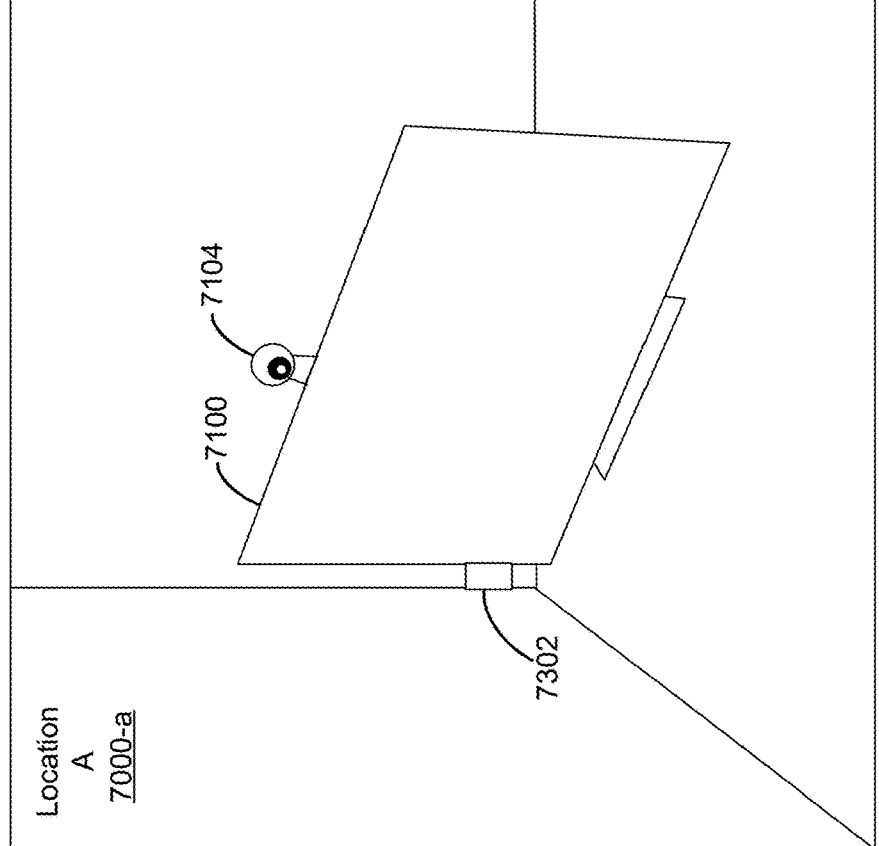
Figure 7R:
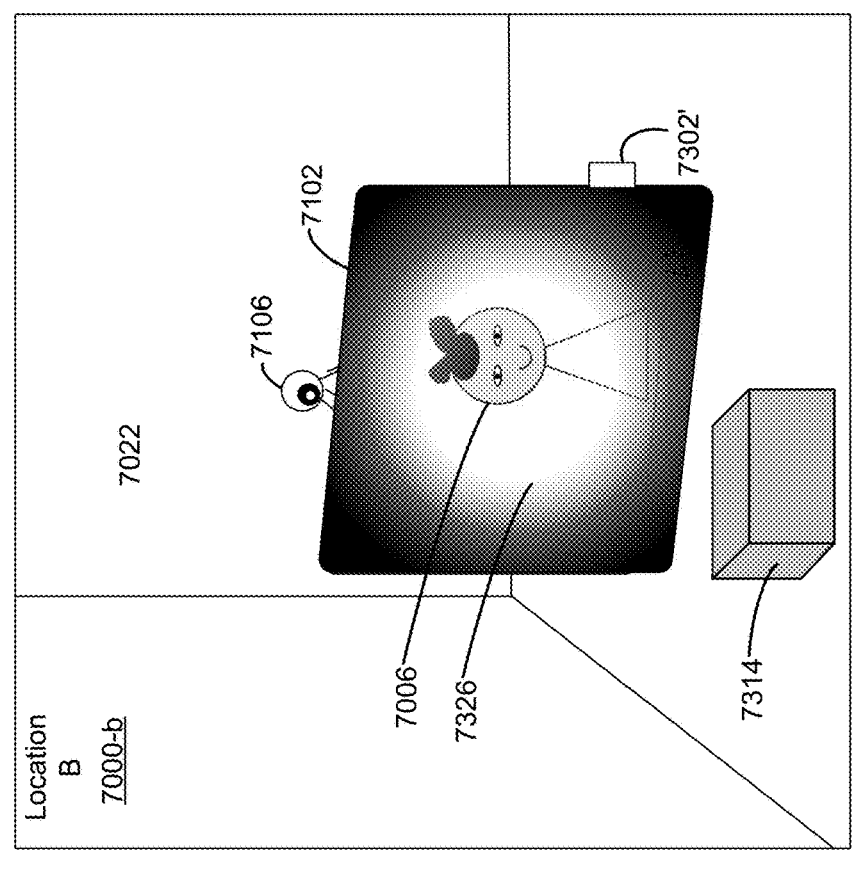
Figure 7R:
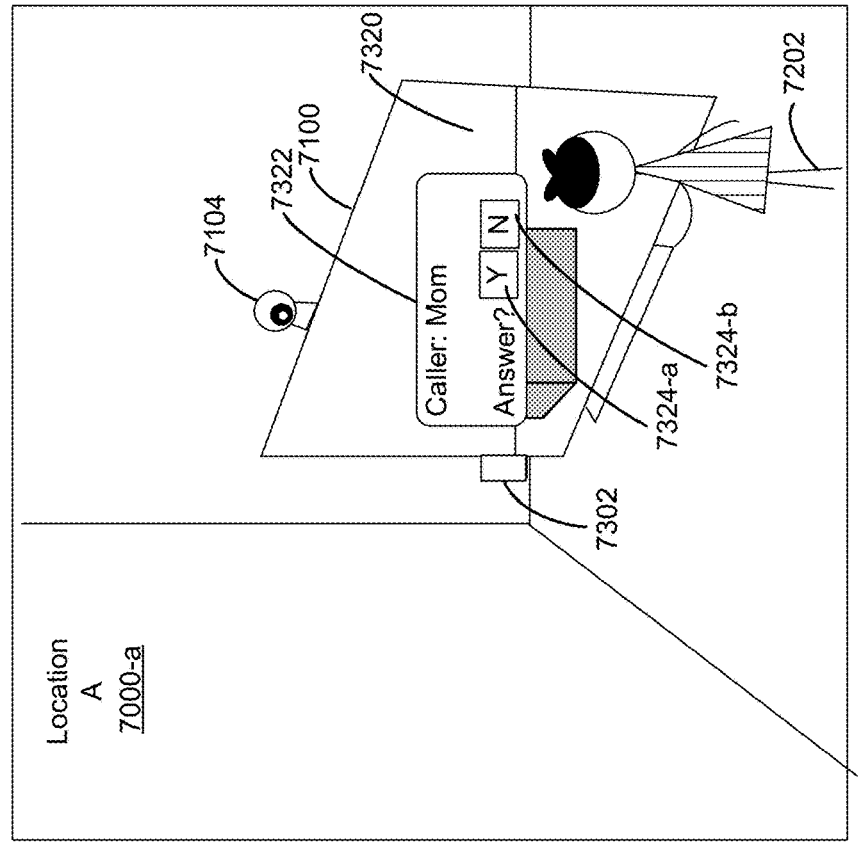
Figure 7S:
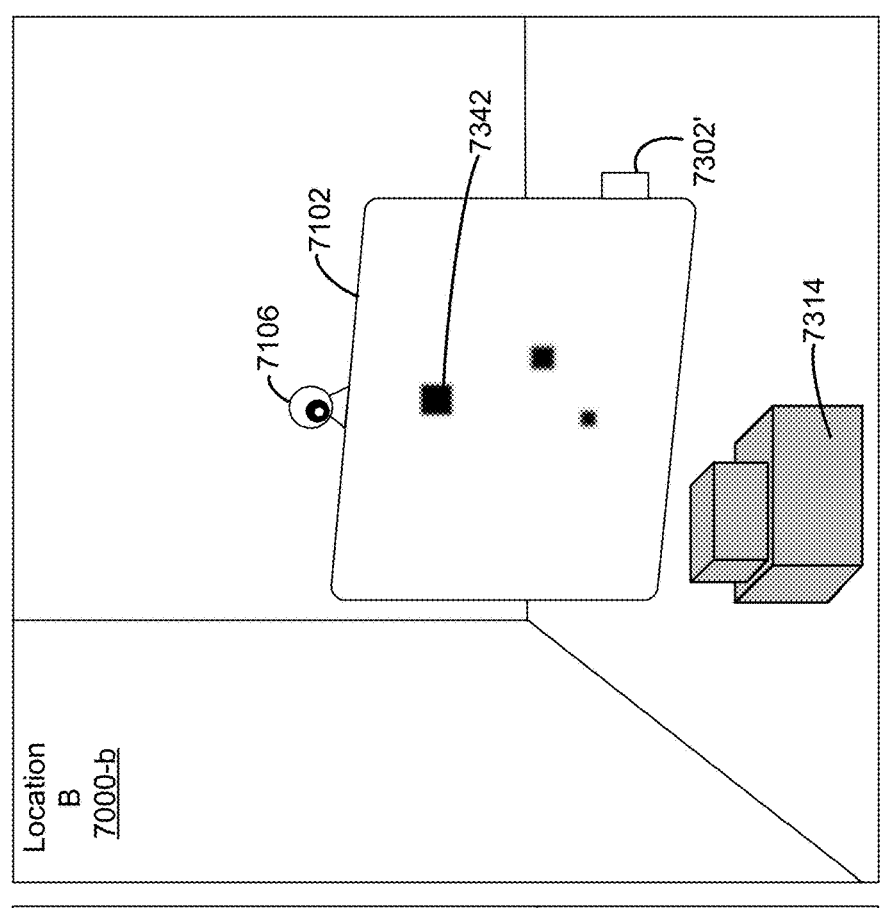
Figure 7S:
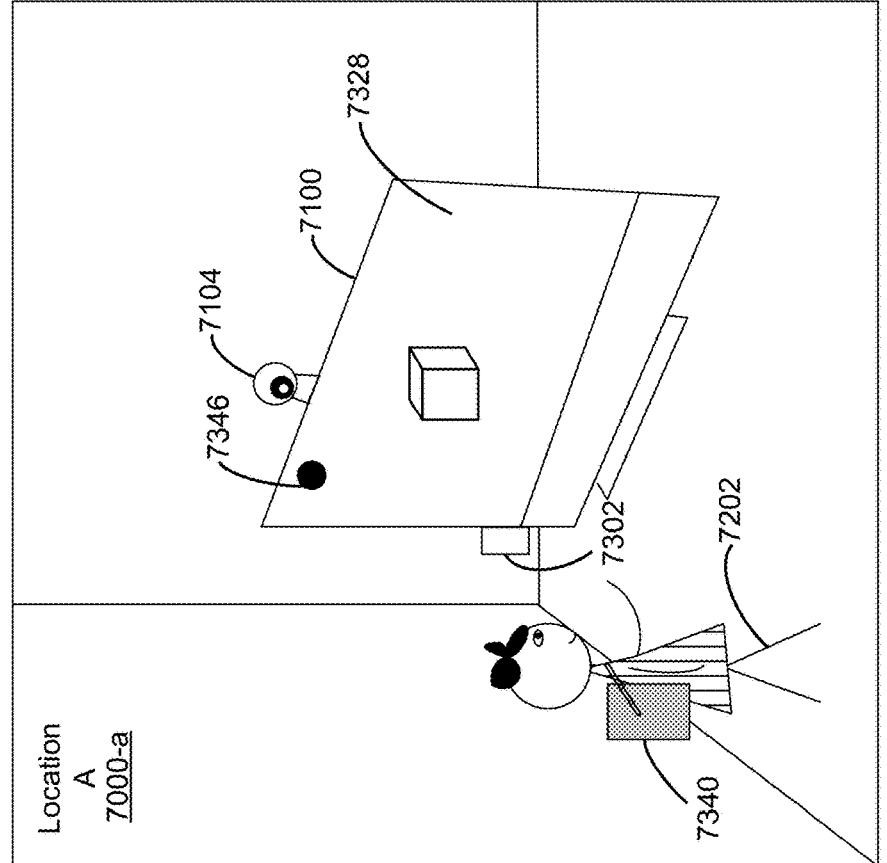
Figure 7T:
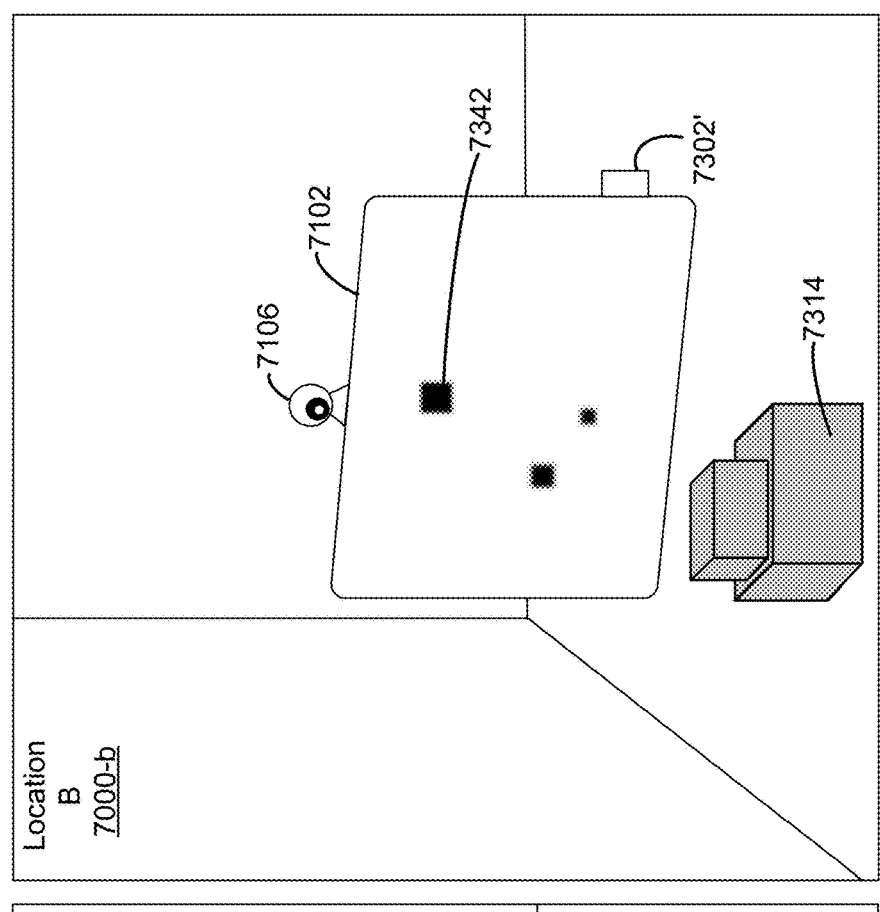
Figure 7T:
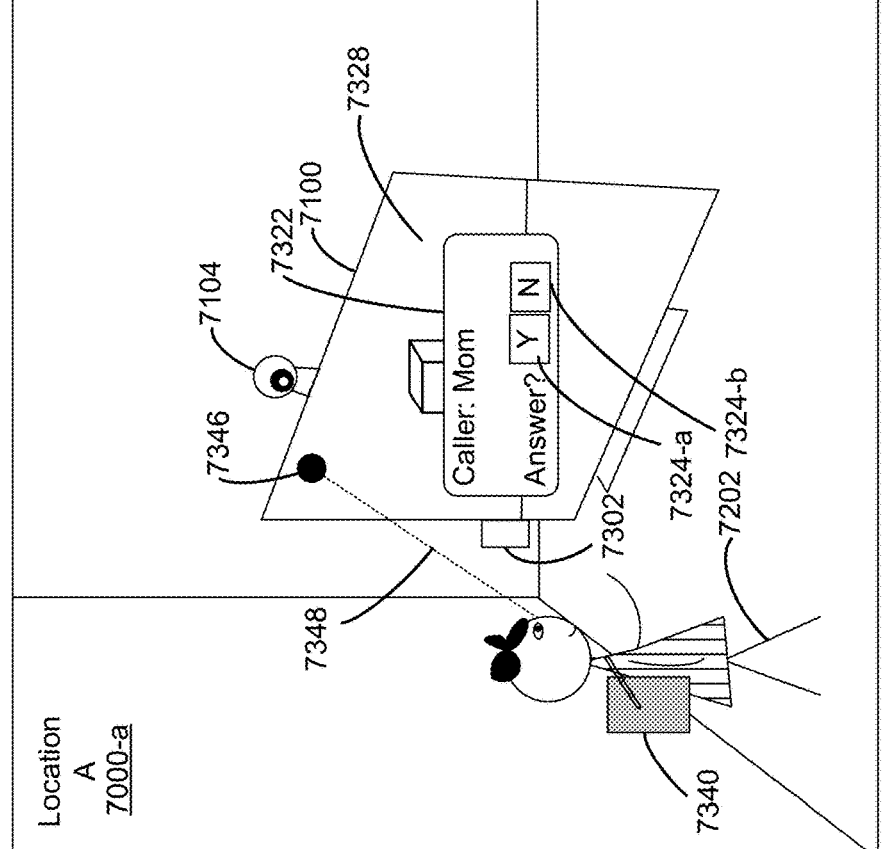
Figure 7U:
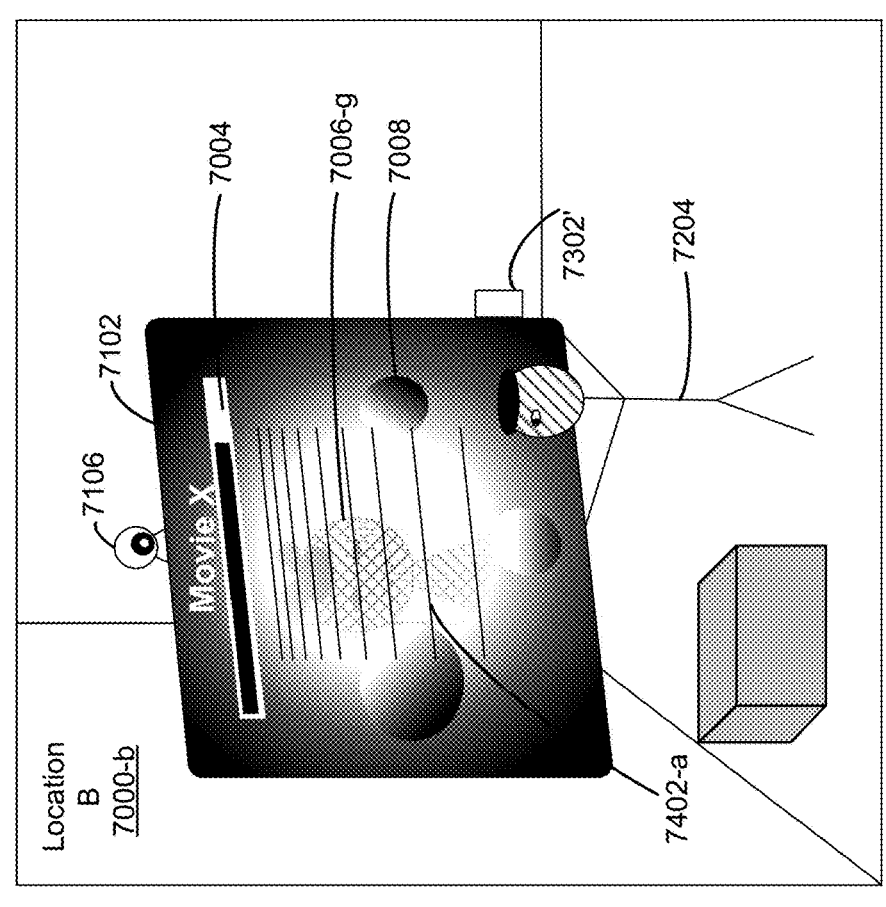
Figure 7U:
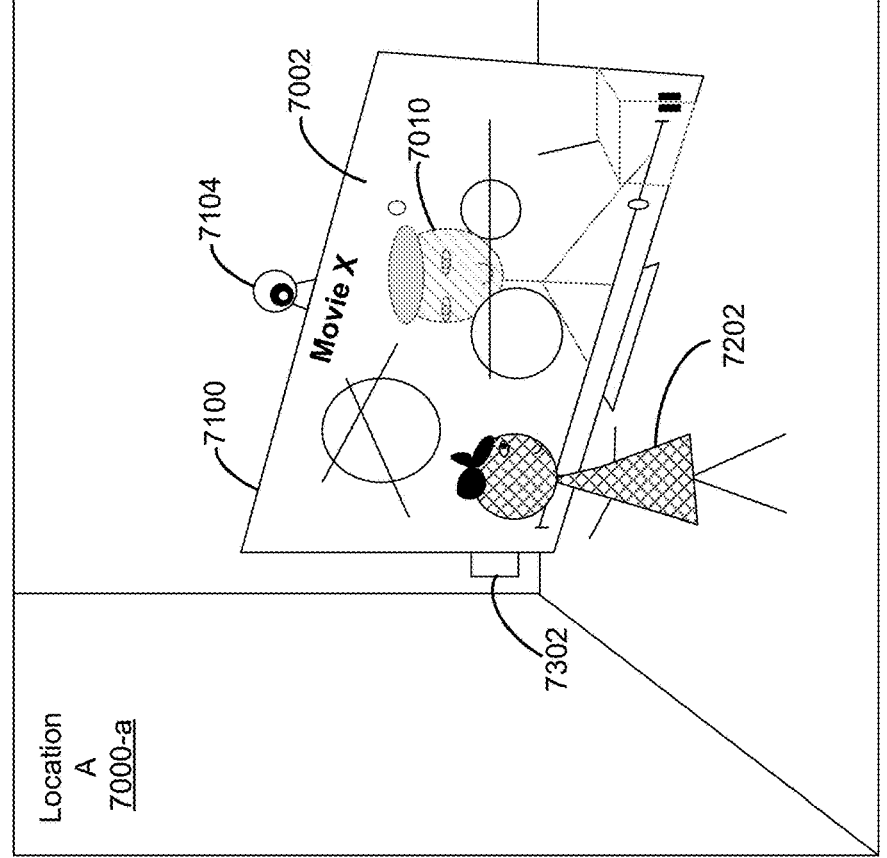

In FIGS. 7P-7T, it is illustrated that, in some embodiments, the computer system that is in communication with the first display generation component 7100 and the second display generation component 7102, utilizes the second display generation component 7102 to display a visual alert in response to receiving an incoming communication request (e.g., a request to start a voice call, a video call, a shared experience, a group meeting, an group gaming session, and/or other real-time communication and interactions) when the first display generation component 7100 is not placed into a first spatial relationship with the first user 7202 such that the first user 7202 may be able to view content displayed via the second display generation component 7102 (e.g., as shown in FIGS. 7P-7Q). In some embodiments, the real-time communications and/or interactions, optionally, include communications and/or interactions that have some computational and/or signal processing delays (e.g., delays that are less than 0.5, 0.25, 0.1, 0.05, or 0.01 seconds and/or an amount that is not perceptible to most users. In some embodiments, after the visual alert (e.g., the visual alert 7318 in FIG. 7Q) is displayed via the second display generation component 7102, if the computer system detects that the first user 7202 has placed the first display generation component 7100 in the first spatial relationship with the first user 7202, the computer system ceases to display the alert 7318 via the second display generation component 7102, and displays a user interface object 7322 via the first display generation component with selectable options 7324 to accept the incoming communication request or otherwise dispose of the incoming communication request (e.g., as shown in FIG. 7R following FIG. 7Q). In some embodiments, if the first display generation component 7100 is already placed into the first spatial relationship with the first user 7202, the computer system does not display a visual alert via the second display generation component 7100 in response to receiving an incoming communication request (e.g., as shown in FIG. 7S), and optionally, displays a visual alert via the first display generation component 7100 (e.g., as shown in FIG. 7S). In some embodiments, the computer system displays a reduced indicator (e.g., the indicator 7346 in FIG. 7S) via the first display generation component 7100 if the first display generation component 7100 already has the first spatial relationship with the first user 7202 when the incoming communication request is received (e.g., as shown in FIG. 7S); and the computer system displays a user interface object 7322 (e.g., as shown in FIG. 7T) with an option 7342-*a* to accept the incoming communication request and options for otherwise disposing of the incoming communication request via the first display generation component 7100, in response to the first user's interaction with the reduced indicator (e.g., the indicator 7346 in FIG. 7T) (e.g., as shown in FIG. 7T). In some embodiments, when the first display generation component 7100 and the second display generation component 7102 respectively represent the inner display and the outer display of a two-sided HMD (e.g., HMD 7100a, HMD 1-100, and/or another HMD illustrated in and/or described with respect to FIGS. 1A-1P, FIGS. 7A-7AQ, and FIGS. 1-13), the HMD displays a first alert (e.g., the alert 7318 in FIG. 7Q) in response to receiving an incoming communication request on the outer display of the HMD if the HMD is not worn by the first user; and the HMD displays a user interface object 7322 for accepting or rejecting the incoming communication request on the inner display of the HMD in response to detecting the user putting on the HMD (and optionally, ceasing to display the alert 7318 on the outer display of the HMD). In some embodiments, when the incoming communication request is received while the first user 7202 is wearing the HMD, the computer system displays a visual indicator (e.g., the indicator 7346 in FIG. 7S) on the inner display of the HMD and does not display an alert (e.g., the alert 7318 in FIG. 7Q) on the outer display of the HMD. In some embodiments, if the first user gazes at the indicator 7346 displayed on the inner display of the HMD, the computer system displays a user interface object 7322 on the inner HMD for accepting or rejecting the incoming communication request. More details of the interactions and user interfaces for the above scenarios illustrated in FIGS. 7P-7T are described below.

FIGS. 7P-7R illustrate an example scenario in which the incoming communication request for a real-time communication session is received by the computer system while the first display generation component 7100 does not have the first spatial relationship with the first user 7202 such that the first user 7202 can view content displayed via the first display generation component 7100. For example, in some embodiments, the first user 7202 does not have the first spatial relationship with the first display generation component 7100 when the first user 7102 is not wearing the HMD including the first display generation component 7100 (e.g., the inner display of the HMD, and/or inward-facing displays labeled "BACK" in FIGS. 7G2, 7H2, 7L2, 7M2, 7N2, 7AA2, and 7AB2) and the second display generation component 7102 (e.g., the outer display of the HMD, and/or outward-facing displays labeled "FRONT" in FIGS. 7G2, 7H2, 7L2, 7M2, 7N2, 7AA2, and 7AB2). In some embodiments, the first user 7202 does not have the first spatial relationship with the first display generation component 7100 when the first user 7202 is not wearing a respective component, such as a wrist band, a watch, a backpack (e.g., the backpack 7340 in FIG. 7S), or another component of the computer system. In FIGS. 7P-7R, the first user 7202 does not have the first spatial relationship with the first display generation component 7100 to view content displayed via the first display generation component 7100 when the first user 7202 is not collocated with the first display generation component 7100 in the location A 7000-*a* (e.g., while the first user 7202 is collocated with the second display generation component 7102 in location B 7000-*b*, or when first user 7202 is not in the same physical environment as the first and second display generation components). In some embodiments, the computer system determines that the first user 7202 does not have the first spatial relationship with the first display generation component 7100 to view content displayed via the first display generation component 7100 when the computer system has not detected (e.g., using one or more sensors of the sensor system 6-102 of the HMD 1-100 in FIG. 1I, and/or other sensors) a respective portion of the body of the first user 7202 (e.g., the eyes of the first user, the gaze of the first user, and/or other features of the portion of the first user's body that are typically in front of the display region of the first display generation component 7100 when the first user is using the computer system) (e.g., while the first user 7202 is facing the second display generation component 7102, while the first user's eyes are closed, and/or when the first user 7202 is not near the first and second display generation components).

FIGS. 7S-7T, in contrast to FIGS. 7P-7R, illustrate an example scenario in which the incoming communication request for a real-time communication session is received by the computer system while the first display generation component 7100 has the first spatial relationship with the first user 7202 such that the first user 7202 can view content displayed via the first display generation component 7100, in accordance with some embodiments. For example, in some embodiments, the first user 7202 has the first spatial relationship with the first display generation component 7100 when the first user 7100 is wearing the HMD including the first display generation component 7100 (e.g., the inner display of the HMD) and the second display generation component 7102 (e.g., the outer display of the HMD). In some embodiments, the first user 7202 has the first spatial relationship with the first display generation component 7100 when the first user 7202 is wearing a respective component, such as a wrist band, a watch, a backpack (e.g., the backpack 7340 in FIG. 7S), or another component of the computer system. In FIGS. 7S-7T, the first user 7202 has the first spatial relationship with the first display generation component 7100 to view content displayed via the first display generation component 7100 when the first user 7202 is collocated with the first display generation component 7100 in the location A 7000-*a*. In some embodiments, the computer system determines that the first user 7202 has the first spatial relationship with the first display generation component 7100 to view content displayed via the first display generation component 7100 when the computer system has detected a respective portion of the body of the first user 7202 (e.g., the eyes of the first user, the gaze of the first user, and/or other features of the portion of the user's body that are typically in front of the display region of the first display generation component 7100 when the first user is using the computer system).

In FIG. 7R, the first user 7202 has transitioned from not having the first spatial relationship with the first display generation component 7100 (e.g., when the incoming communication request is first received, e.g., in FIG. 7Q) to having the first spatial relationship with the first display generation component 7100 (e.g., after the alert 7318 for the incoming communication request has been displayed via the second display generation component, e.g., in FIG. 7Q). The computer system determines whether the first user 7202 and the first display generation component 7100 have the first spatial relationship in a manner analogous to that described with respect to FIGS. 7S-7T, in some embodiments.

As shown in FIGS. 7P-7Q, before an incoming communication request is received and while the first user 7202 does not have the first spatial relationship with the first display generation component 7100 (e.g., the HMD is not worn or used by the first user 7202, or the HMD is held in the user's hand or placed on a table), the computer system does not display content via the first display generation component 7100 or the second display generation component 7102. In some embodiments, the first display generation component 7100 and the second display generation component 7102 are in a standby state or power saving state. In some embodiments, the computer system optionally displays one or more system indicators via the second display generation component 7102, such as battery status if the first and/or second display generation components are being charged or are low on charge, a current date and time, one or more missed notifications or indicators thereof, a local weather forecast, and/other system-level status indicators.

In FIG. 7Q, while the first user 7202 does not have the first spatial relationship with the first display generation component 7100 (e.g., while the first user 7202 is in front of the display region of the second display generation component 7102, while the first user 7202 is within a threshold distance of the second display generation component 7102, and/or while the eyes or face of the first user 7202 are not detected by the sensor 7104 on the side of the first display generation component 7100), the computer system detects receipt of a first incoming communication request. In some embodiments, the first incoming communication request is for the first user 7202 to start a shared experience, a VR or AR conference call, a group game in a shared AR or VR environment, a request to establish a voice or video communication session between the first user and one or more other users, a calendar reminder for joining a prescheduled conference or meeting at the present time or with a short period of time (e.g., in 1, 2, 5, 15, 30, 60 minutes, or another threshold amount of time), and/or another type of real-time communication between the requester of the first incoming communication request and the user of the computer system (e.g., the first user 7202, or another user of the computer system).

As shown in FIG. 7Q, in response to detecting the receipt of the first incoming communication request, the computer system selectively displays an alert 7318 regarding the receipt of the first incoming communication request via the second display generation component 7102, in accordance with a determination that the first display generation component 7100 does not have the first spatial relationship with the first user 7202 (e.g., the display area of the first display generation component 7100 is not facing toward the first user 7202, the first display generation component 7100 is not worn on the first user's head, and/or the first user's eyes are not detected in front of the display area provided by the first display generation component 7100). In some embodiments, the alert 7318 is displayed via the second display generation component 7102 further in accordance with a determination that the HMD is not worn on the first user's head, a wrist band or watch is not worn on the first user's wrist, a backpack 7340 (e.g., shown in FIG. 7S) containing the computer system or a component thereof is not worn on the user's back. It is noted that, when the alert 7318 is displayed via the second display generation component 7102, the computer system, optionally, does not display another alert for the first incoming communication request via the first display generation component 7100 at the same time.

In contrast to the example scenario shown in FIG. 7Q, in FIG. 7S, the computer system detects the receipt of a first incoming communication request while the first user 7202 has the first spatial relationship with the first display generation component 7100 (e.g., the HMD is worn or used by the first user 7202, or the inner display of the HMD is held in front of the first user's eyes by the first user's hand). As shown in FIG. 7S, in this example scenario, the computer system is displaying XR content 7328 in a fully immersive mode, e.g., without a representation of the physical environment among the XR content 7328, in accordance with some embodiments. Accordingly, the computer system displays, via the second display generation component 7102, one or more graphical elements 7342 that represents a status associated with the XR content and the fully immersive level with which the XR content 7328 is being presented to the first user 7202 (e.g., without displaying a representation of a portion of the body of the first user 7202). In some embodiments, the one or more graphical elements 7342 are updated by the computer system in accordance with the changes in the appearance of the XR content 7328, and in accordance with the change in the level of immersion with which the XR content 7328 is displayed via the first display generation component 7100. In some embodiments, if the first user changes the level of immersion with which the XR content 7326 is displayed via the first display generation component 7100 from a fully immersive level to an intermediate level or a low level of immersion, the computer system changes the appearance of the one or more graphical elements 7342 to include a representation of the portion of the body of the first user (e.g., the representation 7006 of the portion of the body of the first user 7202, or a generic representation such as the representation 7208 in FIGS. 7A-7O) in accordance with the changes in the XR content 7342, the changes in appearance of the portion of the body of the first user 7202, and the current level of immersion with which the XR content 7342 is being displayed via the first display generation component 7100.

As shown in FIG. 7S, in response to detecting the receipt of the first incoming communication request, the computer system selectively displays an alert or indicator 7346 regarding the receipt of the first incoming communication request via the first display generation component 7100, in accordance with a determination that the first display generation component 7100 has the first spatial relationship with the first user 7202 (e.g., the display area of the first display generation component 7100 is facing toward the first user 7202, the first display generation component 7100 is worn on the first user's head, and/or the first user's eyes are detected in front of the display area provided by the first display generation component 7100). In some embodiments, the alert or indicator 7318 displayed via the second display generation component 7102 (e.g., as shown in FIG. 7Q) has a different appearance from the alert 7346 that is displayed via the first display generation component 7100 (e.g., as shown in FIG. 7S). In some embodiments, when the alert 7346 is displayed via the first display generation component 7100, the computer system does not concurrently display an alert (e.g., the alert 7318) via the second display generation component 7102 regarding the receipt of the first incoming communication request.

In some embodiments, in response to detecting the receipt of the first incoming communication request, the computer system also generates a non-visual output (e.g., an audio alert, a speech alert, a ringtone, a vibration, and/or a combination of the above) to accompany the visual alert (e.g., the alert 7318 in FIG. 7Q, and/or the alert 7346 in FIG. 7S)

that is displayed via the first display generation component 7100 and/or the second display generation component 7102. In some embodiments, the computer system generates different types of non-visual outputs to accompany the visual alerts displayed via the first display generation component 7100 and the second display generation component 7102. For example, the computer system generates a first non-visual alert to accompany the alert 7318 displayed via the second display generation component 7102 in FIG. 7Q, and a second non-visual alert to accompany the alert 7346 displayed via the first display generation component, in accordance with some embodiments. In some embodiments, the first non-visual alert has a greater volume and/or amplitude than the second non-visual alert. In some embodiments, the first non-visual alert includes a non-localized vibration of the entirety of the HMD while the second non-visual alert includes a localized vibration on a portion of the HMD closer to the location of the alert 7346. In some embodiments, the first non-visual alert does not utilize spatial audio while the second non-visual alert utilizes spatial audio to indicate the location of the alert 7346 in the three-dimensional environment presented via the first display generation component 7100.

In some embodiments, the second display generation component 7102 provides a display region on an exterior of a head-mounted device (e.g., an HMD that is not currently worn on the user's eyes or head) and displays the alert 7318 for the first incoming communication request on the exterior display of the HMD. In some embodiments, the computer system detects a user input via an input device that corresponds to a request to mute the non-visual output (e.g., activating a button on the exterior of the HMD, picking up the HMD, putting the first display generation component 7100 in front of the first user's eyes, and/or other user inputs to mute a visual and/or non-visual alerts of the second display generation component 7102). In response to detecting the user input, the computer system ceases to generate the non-visual output (e.g., muting the audio and/or vibration alerts that accompany the alert 7318 displayed via the second display generation component 7102), and optionally ceasing to display the alert 7318 via the second display generation component 7102.

In some embodiments, as shown in FIG. 7R following FIG. 7Q, after muting the non-visual alert that is provided in conjunction with the alert 7318 and/or while the non-visual alert is still provided with the alert 7318, the computer system displays, via the first display generation component 7100, a first user interface object 7322 (e.g., an accept button 7324-*a*, a reject button 7324-*b*, or another user interface object that disposes of the first incoming communication request (e.g., send to voicemail, and/or send an automatic reply) that, when selected by the user, cause the computer system to accept, reject, or otherwise dispose of the first incoming communication request. In some embodiments, the computer system displays the first user interface object 7322 via the first display generation component 7100, without requiring the first user 7202 to place the first display generation component 7100 into the first spatial relationship with the first user 7202 (e.g., only requiring that the first user has provided the input to mute the non-visual alert, picked up the HMD, and/or held the inner display of the HMD in front of the user's eyes) (e.g., without requiring the first user to put on the HMD, without requiring the first user to put the wrist band or watch on his/her wrist, without requiring the first user to put the backpack containing a component of the computer system on his/her back, and/or without requiring detecting the first user's eyes in front of the first display generation component 7100).

In some embodiments, after the first user 7202 has provided the input to mute the non-visual alert that is provided in conjunction with the alert 7318, the computer system continues to display the alert 7318 via the second display generation component 7102 (e.g., until a threshold amount of time has expired and/or until the first user 7202 has placed the first display generation component 7100 into the first spatial relationship with the first user 7202).

In some embodiments, the computer system does not reject the first incoming communication request in response to the input that mutes the non-visual alert that was provided with the visual alert 7318. In some embodiments, after detecting the user input that mutes the non-visual alert, the computer system continues to maintain an option to accept the first incoming communication request, and, optionally, continues to display the alert 7318 via the second display generation component 7102 and/or displays the first user interface object 7322 via the first display generation component 7100 for accepting or rejecting the first incoming communication request (e.g., as that shown in FIG. 7R). In some embodiments, the computer system detects a user input that corresponds to a request to decline the first incoming communication request (e.g., the user input to decline the communication request is of the same input type, using the same control on an input device, and/or is a repeat of the user input that muted the non-visual alert accompanying the alert 7318 (e.g., as shown in FIG. 7Q); and in response to detecting the input that corresponds to the request to decline the first incoming communication request, the computer system declines the first incoming communication request. For example, in some embodiments, the computer system mutes the non-visual alert of the first incoming communication request in response to a first activation of a button on the exterior of the HMD without rejecting the first incoming communication request, and the computer system rejects the first incoming communication request in response to a second activation of the same button.

In some embodiments, the user input that corresponds to a request to mute the non-visual alert that is displayed with the alert 7318 via the second display generation component 7102 is different from an input that corresponds to a request to reject the first incoming communication request. For example, the request to mute the non-visual alert and the request to reject the incoming communication request include activation of two different hardware controls that is in communication with the computer system (e.g., two different buttons or switches on the exterior of the HMD, or two different ways of activating the same button or control on the HMD or an external input device), in accordance with some embodiments.

In some embodiments, in response to the user input that corresponds to the request to decline the first incoming communication request (e.g., detected after detecting the user input to mute the non-visual alert that accompanied the alert 7318 and while maintaining display of the alert 7318), the computer system ceases to display the alert 7318 via the second display generation component 7102.

In some embodiments, in accordance with a determination that the first incoming communication request is neither accepted nor rejected within a first threshold amount of time (e.g., 30 seconds, 1, 2, 5, 10, 15, or 30 minutes) after the receipt of the first incoming communication request, the computer system ceases to display the alert 7318 via the second display generation component 7102, and, optionally, ceases to generate the non-visual output if it has not already been muted by the first user input, and/or ceases to maintain the option to reject or accept the first incoming communication request (e.g., ceases display of the user interface object 7322 via the first display generation component 7100 if it has been displayed). In some embodiments, the first threshold amount of time for ceasing display of the alert and the options to accept and/or reject the incoming communication request is based on whether the computer system, the first display generation component, and/or the second display generation component, are connected to a charging station and/or based on the remaining power level of the computer system, the first display generation component, and/or the second display generation component.

In some embodiments, as shown in FIG. 7R following FIG. 7Q, the computer system ceases to display the alert 7318 via the second display generation component 7102 and ceases to generate the non-visual alert accompanying the alert 7318, in response to detecting that the first display generation component 7100 is placed into the first spatial relationship with the first user 7202 (e.g., with its display region facing toward the first user, or placed in front of the first user's eyes). In some embodiments, the computer system determines whether the first display generation component 7100 is placed into the first spatial relationship with the first user 7202 based on whether certain biometric features of the first user 7202 have been detected (e.g., eyes of the first user have been detected in front of the display region of the first display generation component 7100, and/or facial features, fingerprints and/or irises have been detected as matching a registered user of the computer system).

In some embodiments, as shown in FIG. 7R following FIG. 7Q, the computer system displays the user interface object 7322 in a three-dimensional environment, such as an augmented reality environment that includes a representation of the physical environment surrounding the first display generation component 7100 and/or the second display generation component 7102 (e.g., the location B 7000-*b* in FIG. 7R, or a location in which the HMD is present, the location that would be in the first user's field of view if the field of view had not been blocked by the presence of the first display generation component 7100 and/or the second display generation component 7102) among virtual content in a three-dimensional environment. In some embodiments, the computer system displays a virtual environment (e.g., a virtual reality environment, a virtual three-dimensional environment, or a virtual two-dimensional or pseudo-three-dimensional environment) that does not include a representation of the physical environment. In some embodiments, when the computer system displays the user interface object 7322 in a mixed reality mode (e.g., with a representation of the physical environment among virtual content in a three-dimensional environment, as shown in FIG. 7R), the computer system displays one or more graphical elements that represent the status associated with the first user 7202 (e.g., including the representation of the status of the XR content displayed via the first display generation component 7100 (e.g., the overlay 7326 indicating that a user interface corresponding to an incoming communication request is being viewed with an intermediate level of immersion, an overlay indicating other content that is being viewed by the first user via the first display generation component 7100, or a generic overlay), and the representation 7006 of the portion of the body of the first user 7202). In some embodiments, when the computer system displays the user interface object 7322 in a virtual reality mode (e.g., without a representation of the physical environment among virtual content in a three-dimensional environment), the computer system displays one or more graphical elements that represent the status associated with the first user (e.g., including the representation of the status of the XR content displayed via the first display generation component 7100 (e.g., an overlay 7342 indicating content 7328 that is being viewed by the first user 7202 via the first display generation component 7100, or a generic overlay), and, optionally, without the representation 7006 of the portion of the body of the first user 7202).

In some embodiments, the user interface object 7322 (e.g., as shown in FIGS. 7R, and 7T) includes information regarding the first incoming communication request (e.g., the caller, type of communication, invitees or attendees of the communication session, and/or other information related to the first incoming communication request). In some embodiments, the user interface object 7322 includes an accept button 7324-*a*, a reject button 7324-*b*, and/or another user interface object that disposes of the first incoming communication request (e.g., send to voicemail, switch to a different device for the call, and/or send an automatic reply) that, when selected by the user, cause the computer system to accept, reject, or otherwise dispose of the first incoming communication request, respectively.

In some embodiments, the user interface object 7322 (e.g., in FIG. 7R and FIG. 7T) displayed via the first display generation component 7100 include different information depending on whether the first incoming communication request has been accepted using a different device (e.g., a companion device of the computer system, the first display generation component, and/or the second display generation component, such as a watch, a smartphone, a tablet device, a computer, a device that is paired with the HMD, another HMD that is associated with the first user 7202, and/or other wearable and/or nonwearable devices). In some embodiments, in accordance with a determination that the first user 7202 has accepted the first incoming communication request on another device, the computer system displays first information in the user interface object 7322 (e.g., displaying a textual and/or graphical prompt indicating that the communication request has been accepted on another device, and an option is available for switching to the first display generation component 7100 to continue the communication session); and in accordance with a determination that the first incoming communication request has not been accepted on another device, the computer system displays second information in the user interface object 7322 (e.g., displaying a textual and/or graphical prompt indicating that the communication request has not been accepted on another device, and an option is available for accepting the communication request using the first display generation component 7100). In some embodiments, in accordance with a determination that the user has accepted the first incoming communication request on another device, the computer system displays a respective user interface object that, when selected, causes the computer system to continue the communication session using the first display generation component 7100 instead of the other device; and in accordance with a determination that the first incoming communication request has not been accepted, the computer system displays a respective user interface object that, when selected, causes the computer system to accept the first incoming communication request using the first display generation component 7100.

In some embodiments, as shown in FIG. 7T, the computer system displays an alert 7346 via the first display generation component 7100 in response to detecting receipt of the first incoming communication request and in accordance with a determination that the first display generation component 7100 has the first spatial relationship with the first user 7202. In some embodiments, the alert 7346 is a first notification that corresponds to the first incoming communication request. In some embodiments, the alert 7346 is a viewpoint-locked or head-locked user interface element (e.g., a dot, a banner, or another type of user interface element)). In some embodiments, while displaying the alert 7346, the computer system detects an input that includes first gaze input 7348 directed to the alert 7346; and in response to detecting the input that includes the first gaze input 7348 directed to the alert 7346, the computer system expands the alert 7346 to display the user interface object 7322, displays a new user interface object 7322 with the alert 7346, ceases to display the alert 7346 and/or replaces it with the user interface object 7322.

In some embodiments, the alert 7346 (e.g., the notification, or other types of alert) for the first incoming communication request includes an indication of a caller (e.g., a username, and/or an avatar of a second user or group that initiated the communication request) of the first incoming communication request.

In some embodiments, before the user interface object 7322 is displayed, the alert 7346 follows the viewpoint of the first user 7202 (e.g., follows the viewpoint with a synchronized movement with the viewpoint, or follows the viewpoint with a time delay or relaxed locking distance) as the viewpoint of the first user 7202 moves in the three-dimensional environment displayed via the first display generation component 7100. In some embodiments, after the user interface object 7322 is displayed (e.g., in response to a gaze input 7348 directed to the user interface object 7322 in FIG. 7T), the user interface object 7322 is world-locked to the three-dimensional environment displayed via the first display generation component 7100 and does not follow the viewpoint of the first user 7202.

As shown in FIGS. 7R and 7T, after the user interface object 7322 is displayed via the first display generation component 7100 with the option 7324-a to accept the first incoming communication request and/or the option 7324-b to reject the first incoming communication request, the computer system detects a user input that selects one of the options provided in the user interface object 7322. In some embodiments, the user input that selects the option for accepting the first incoming communication request includes a gaze input directed to the option 7324-a in conjunction with an air gesture, such as an air tap gesture or an air pinch gesture. In some embodiments, the user input that selects the option for rejecting the first incoming communication request includes a gaze input directed to the option 7324-b in conjunction with an air gesture, such as an air tap gesture or an air pinch gesture. In some embodiments, the computer system, in response to detecting the selection of the option 7324-a for accepting the first incoming communication request, accepts the first incoming communication request, e.g., including starting a telephone call, a video call, a teleconference, a VoIP call, a live chat session, a shared three-dimensional experience, an online gaming session, and/or other real-time live communication sessions, with the requesting user of the first incoming communication request. In some embodiments, the computer system, in response to detecting the selection of the option 7324-b for rejecting the first incoming communication request, rejects the first incoming communication request, e.g., including ceasing to display the user interface object 7322 and sending a rejection signal to the requester of the first incoming communication request, ignoring the first incoming communication request, or performing another operation that corresponds to the rejection of the first incoming communication request.

In some embodiments, the alert 7318 displayed via the second display generation component 7102 (e.g., as shown in FIG. 7Q) and/or the alert 7346 displayed via the first display generation component 7100 (e.g., as shown in FIG. 7S) do not include a textual element. In some embodiments, the alert 7318 is an animated light pattern. In some embodiments, the alert 7346 is a graphic icon or an animated indicator. In some embodiments, the alert 7346 includes a small textual element or graphics element conveying some information regarding the first incoming communication request (e.g., the identity of the caller, an application requesting the communication, and/or the type of the communication that is requested).

In some embodiments, even though the alert 7318 displayed via the second display generation component 7102 does not include a textual element and/or information about the incoming communication request (e.g., the same alert is used for different types of calls, different callers, and/or different applications making the requests), the computer system displays additional information about the incoming communication request via the first display generation component 7100 in response to detecting that the first display generation component 7100 has been placed into the first spatial relationship with the first user 7202.

In some embodiments, a different alert (e.g., with a different color, and/or a different animated light pattern) is displayed via the second display generation component 7102 in response to detecting receipt of a second incoming communication request and in accordance with a determination that the second incoming communication request is of a different type from the first incoming communication request, and a determination that the first display generation component 7100 is not placed into the first spatial relationship with the first user 7202. In some embodiments, a visual alert is not displayed for the second incoming communication request that is of a different type from the first incoming communication request (e.g., only a non-visual alert is generated).

In some embodiments, while the alert 7346 and/or the user interface object 7322 are displayed (e.g., in response to detecting receipt of the first incoming communication request and in accordance with a determination that the first display generation component 7100 has the first spatial relationship with the first user 7202 at the time when the first incoming communication request is received by the computer system), if the computer system detects that the first display generation component 7100 no longer has the first spatial relationship with the first user 7202 (e.g., the first user 7202 took off the HMD, the first user's eyes are no longer detected in front of the display region of the first display generation component 7100, and/or the first user 7202 took off the watch, backpack 7340, or other component containing the first display generation component 7100), the computer system ceases to display the alert 7346 and/or the user interface object 7322, ceases to generate a non-visual alert that accompanied the alert 7346, and/or forgoes displaying an alert via the second display generation component 7102 for the first incoming communication request.

In some embodiments, after the first user 7202 accepts the incoming communication request and is viewing the user interface of the communication session via the first display generation component 7100, the computer system displays, via the second display generation component 7102, an indication that the communication session is ongoing (e.g., displayed as an overlay or animated light pattern, and/or displayed as a graphical icon that indicates the ongoing status of the communication session). In some embodiments, the indication includes a set of visual characteristics (e.g., color, animated movement, shape, and/or other visual characteristics) that indicate various types of information about the communication session (e.g., status as being paused or active, identity of a caller of the communication session, identities of participants of the communication session, indication of whether the communication session is a shared experience, indication of whether the communication session is being recorded, and/or other status or state information about the communication session). In some embodiments, the indication is displayed as an overlay or graphical element in a display layer above display layer of the representation 7006 of the portion of the body of the first user 7202, as described earlier with respect to FIGS. 7A-7F, for example.

More details regarding the user interfaces and operations of the computer system are provided with respect to FIGS. 7A-7AQ and FIGS. 8-13, and accompanying descriptions.

FIGS. 7U-7AB2 illustrate a computer system that is the same or analogous to the computer system(s) described above with respect to FIGS. 7A-7T, in accordance with some embodiments. The computer system described with respect to FIGS. 7U-7AB2 provides at least some or all of the functions and features described with respect to the computer system(s) in FIGS. 7A-7T, in accordance with some embodiments. Similarly, the first display generation component 7100 and the second display generation component 7102 in FIGS. 7U-7AB2 are the same or analogous to the first display generation component 7100 and the second display generation component 7102 in FIGS. 7A-7T, in accordance with some embodiments. In FIGS. 7U-7AB2, the first user 7202 is shown as the user that is viewing CGR content via the first display generation component 7100 and operating a control 7302 (e.g., a hardware button on the HMD, a software control in a user interface presented on a control device associated with the computer system or via the first display generation component 7100) associated with the computer system.

In some embodiments, the user that is operating the control 7302 is another primary user, or a guest user (e.g., the third user 7206, or another guest user) of the computer system, and the computer system functions similarly as described in FIGS. 7G1-7J, except that, optionally, the representation 7006 of the portion of the body of the user has different levels of fidelity when shown via the second display generation component 7102, depending on whether the user is an enrolled user (also referred to as a primary user) or a guest user (e.g., as described with respect to FIGS. 7A-7F and FIG. 8).

In some embodiments, the computer system does not differentiate between an enrolled user and/or the guest user when presenting the representation 7006 of the portion of the body of the user (e.g., the representation that is generated based on a generic image of the portion of the body of the user or a camera view of the portion of the body of the user, and that is, optionally, updated based on the real-time change in appearance of the portion of the body of the user) via the second display generation component 7102. In some embodiments, the real-time change in appearance of the portion of the body of the user and/or the real-time updates to the representation of the portion of the body of the user, optionally, include changes and updates that have some computational and/or signal processing delays (e.g., delays that are less than 0.5, 0.25, 0.1, 0.05, or 0.01 seconds and/or an amount that is not perceptible to most users).

As shown in FIGS. 7U-7AB2, the first user 7202 who is in a position to view CGR content presented via the first display generation component 7100 and/or has the first spatial relationship relative to the first display generation component 7100 is shown to have two different appearances (e.g., as represented by the different fill patterns of the first user 7202 in FIGS. 7U-7Y and 7Z-7AB2, respectively). In FIGS. 7U-7AB2, the different appearances of the first user 7202 (e.g., the appearance shown in FIGS. 7U-7Y versus the appearance shown in FIGS. 7Z-7AB2) are used to indicate that the first user 7202 represents different users that use and/or control the computer system at different times, or that the same user can take on different appearances at different times due to various reasons (e.g., due to make-up, clothing, accessories, hair styles and colors, or other natural changes in appearance (e.g., skin tone, skin texture, eye color, and/or hair color)).

Figure 7V:
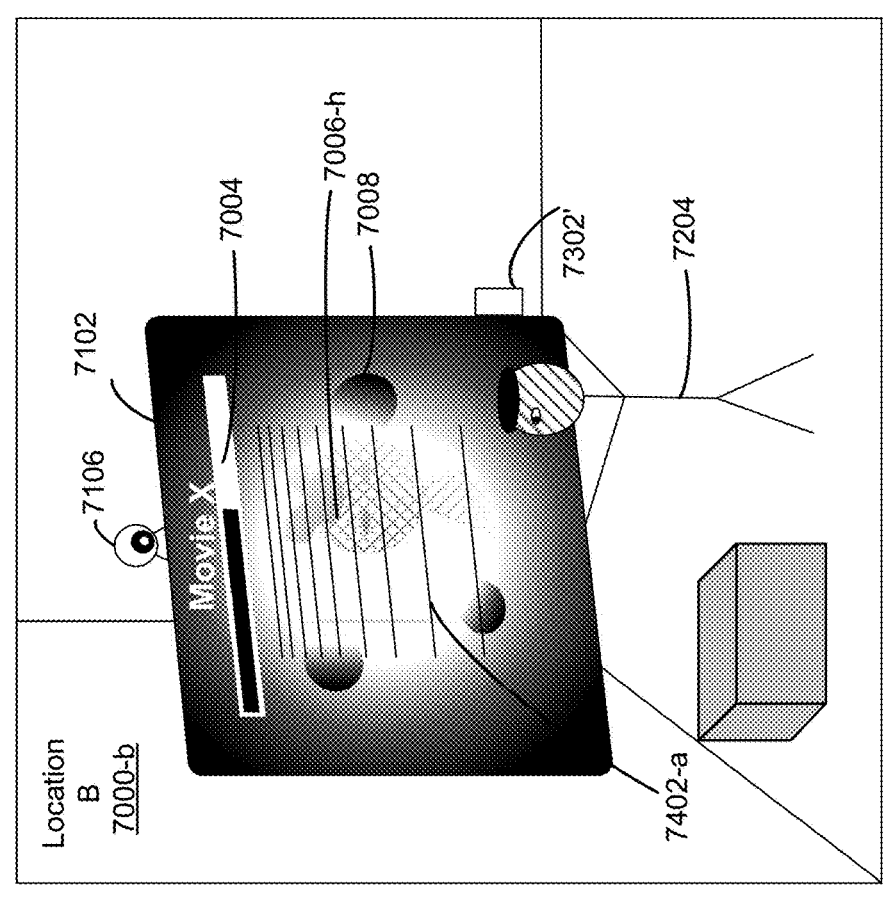
Figure 7V:
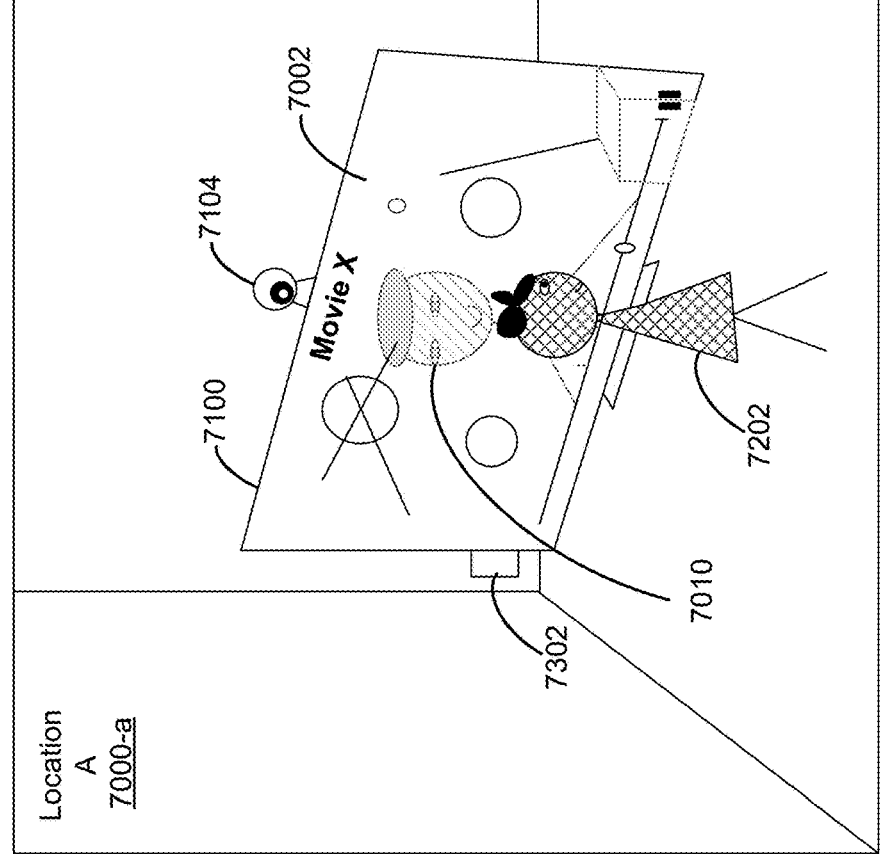
Figure 7W:
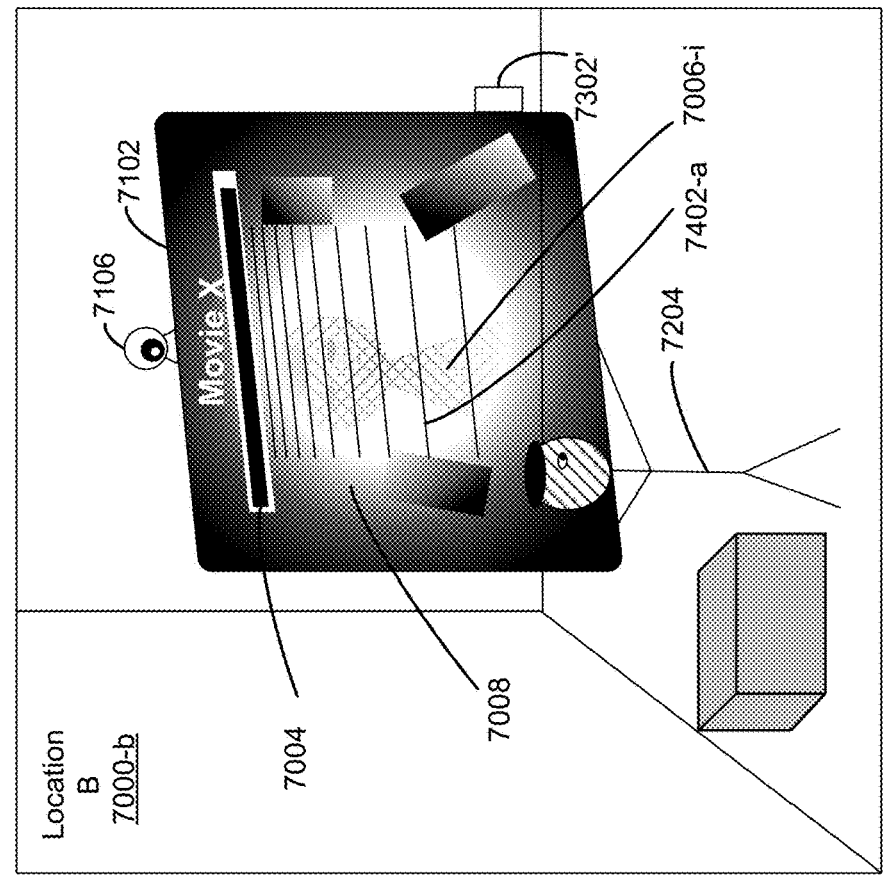
Figure 7W:
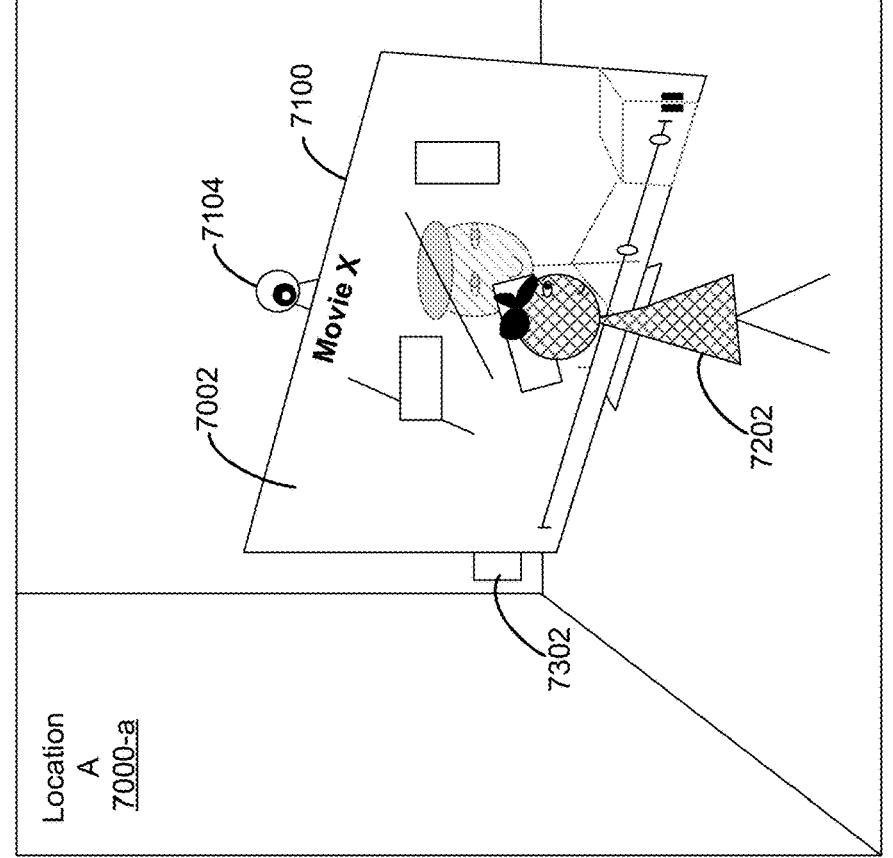
Figure 7X:
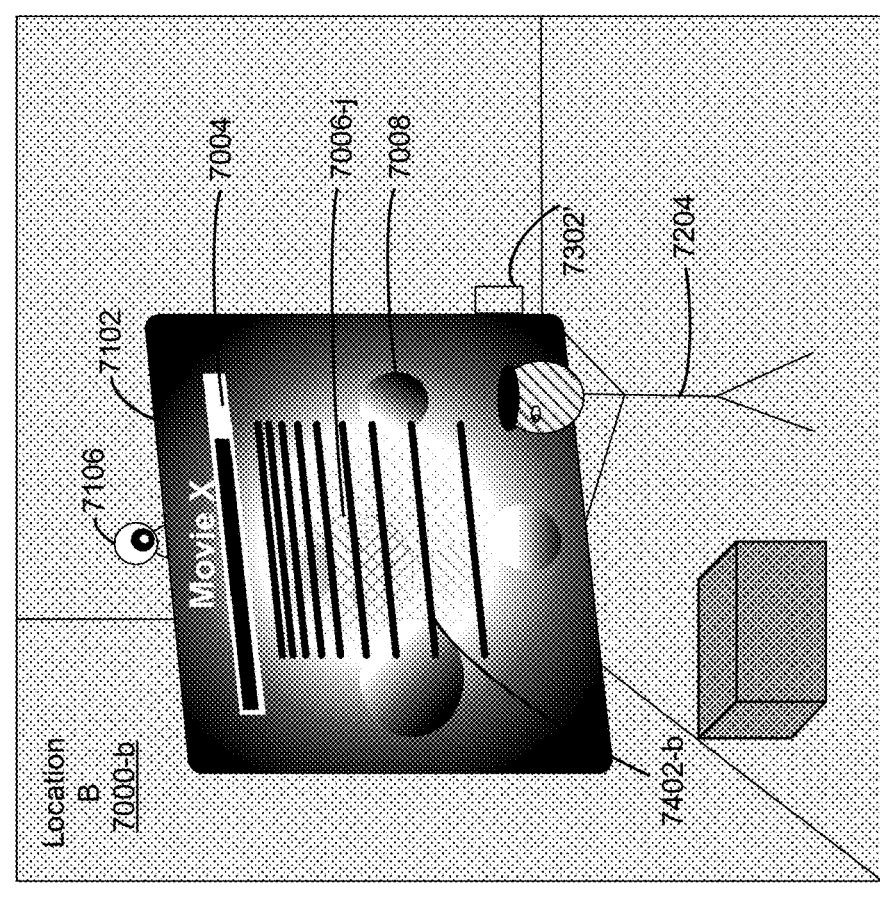
Figure 7X:
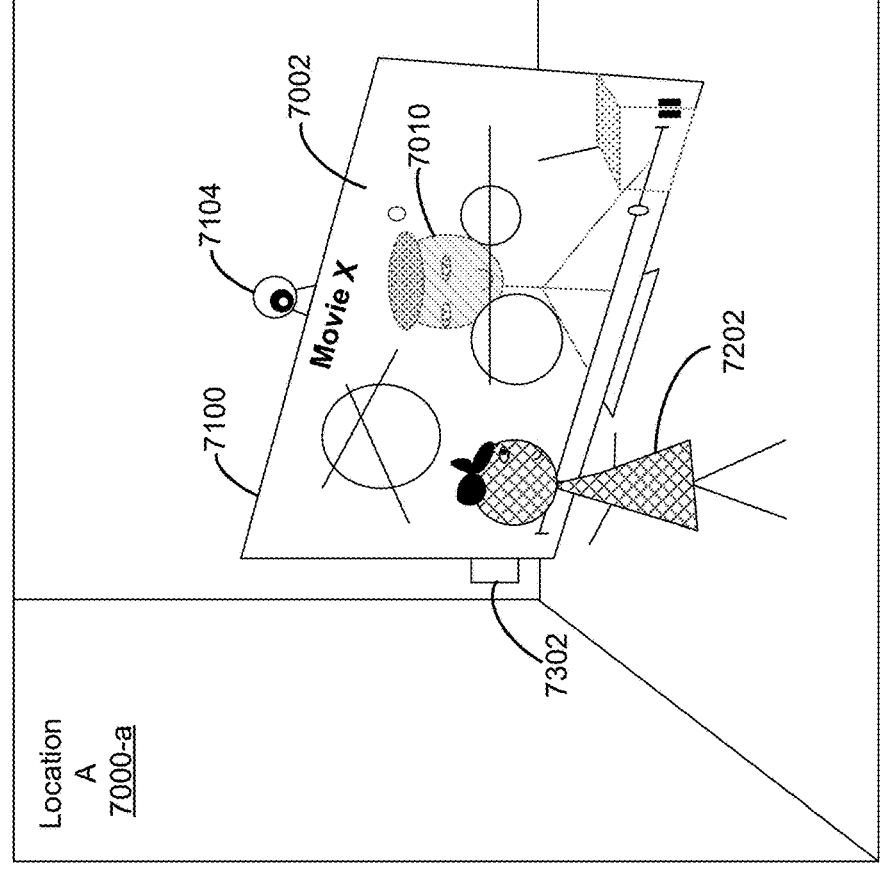
Figure 7Y:
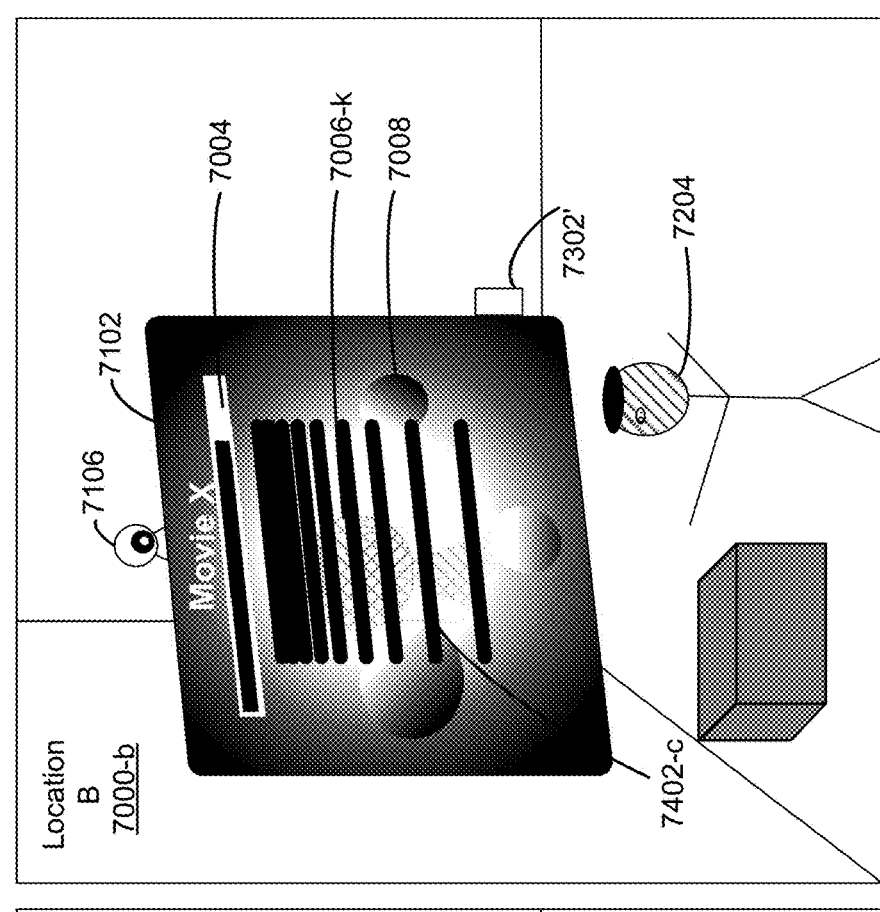
Figure 7Y:
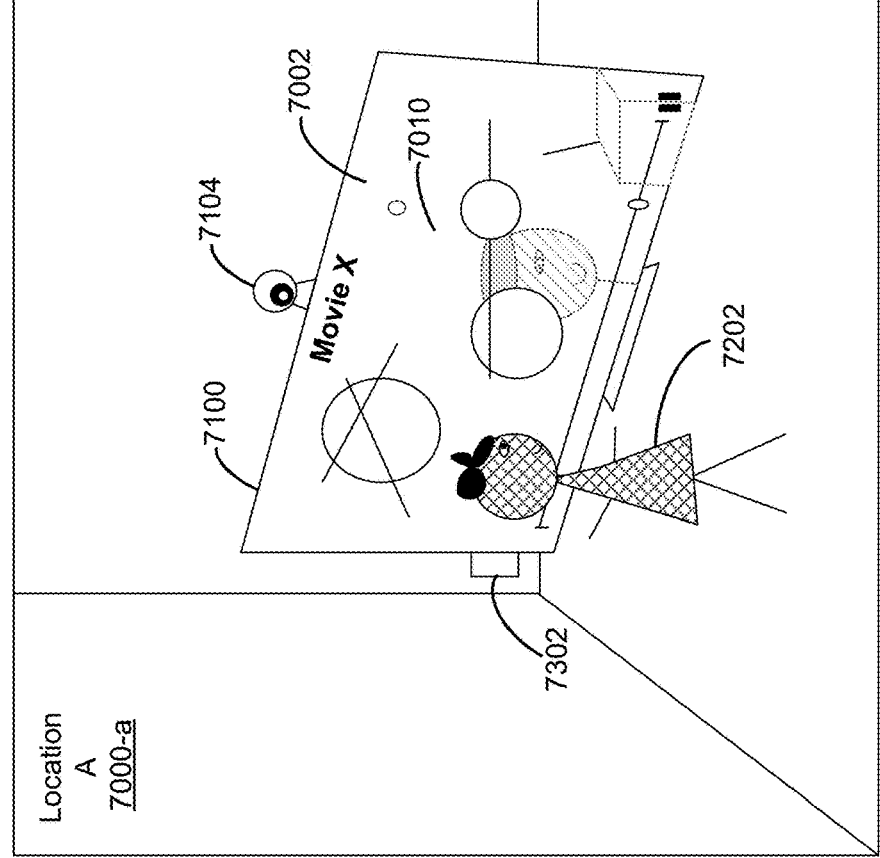
Figure 7Z:
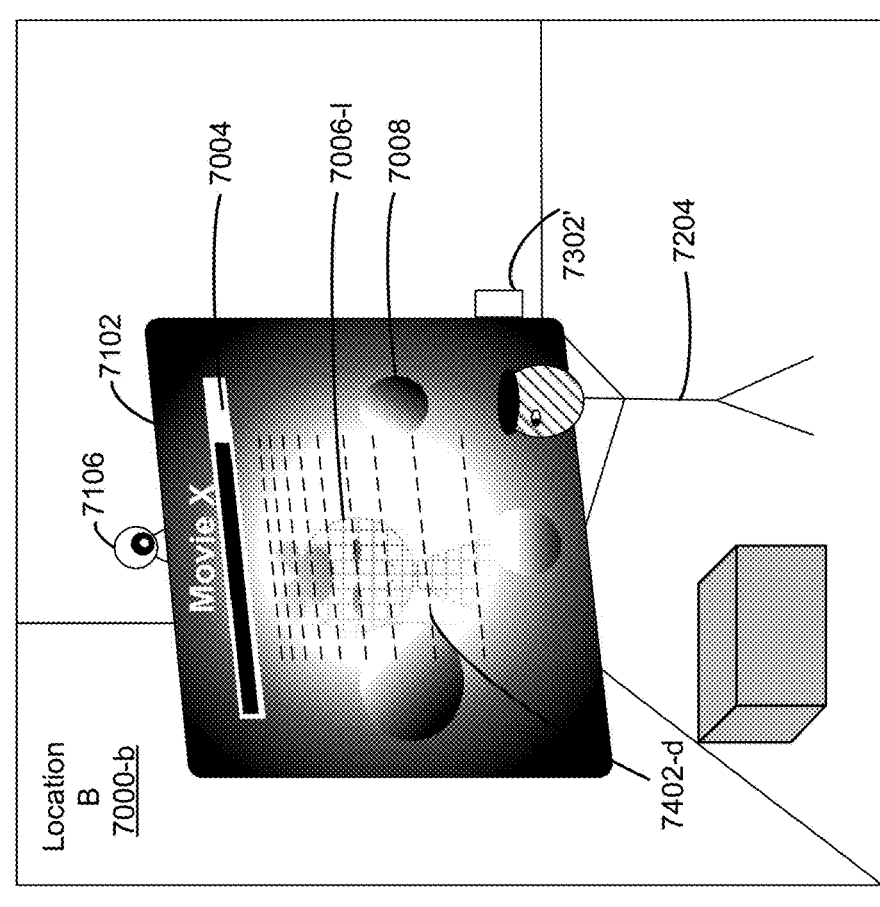
Figure 7Z:
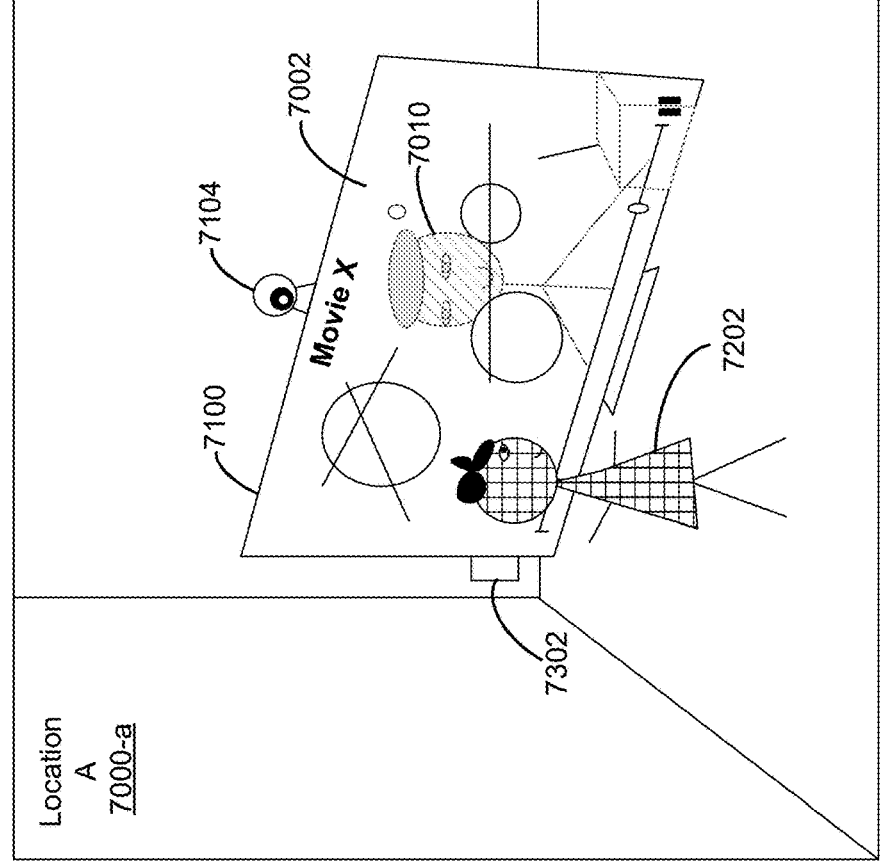
Figure 7A:
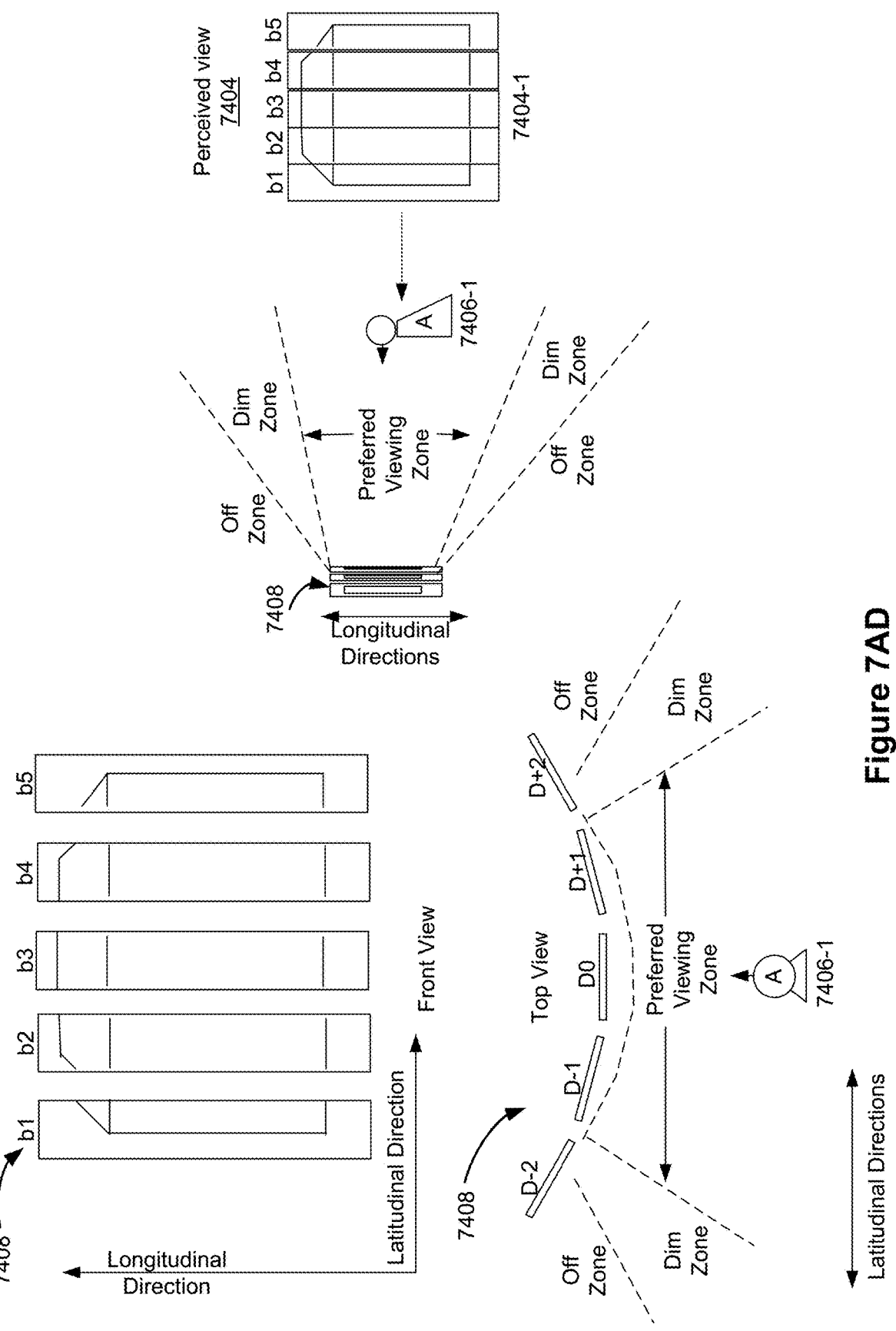
Figure 7A:
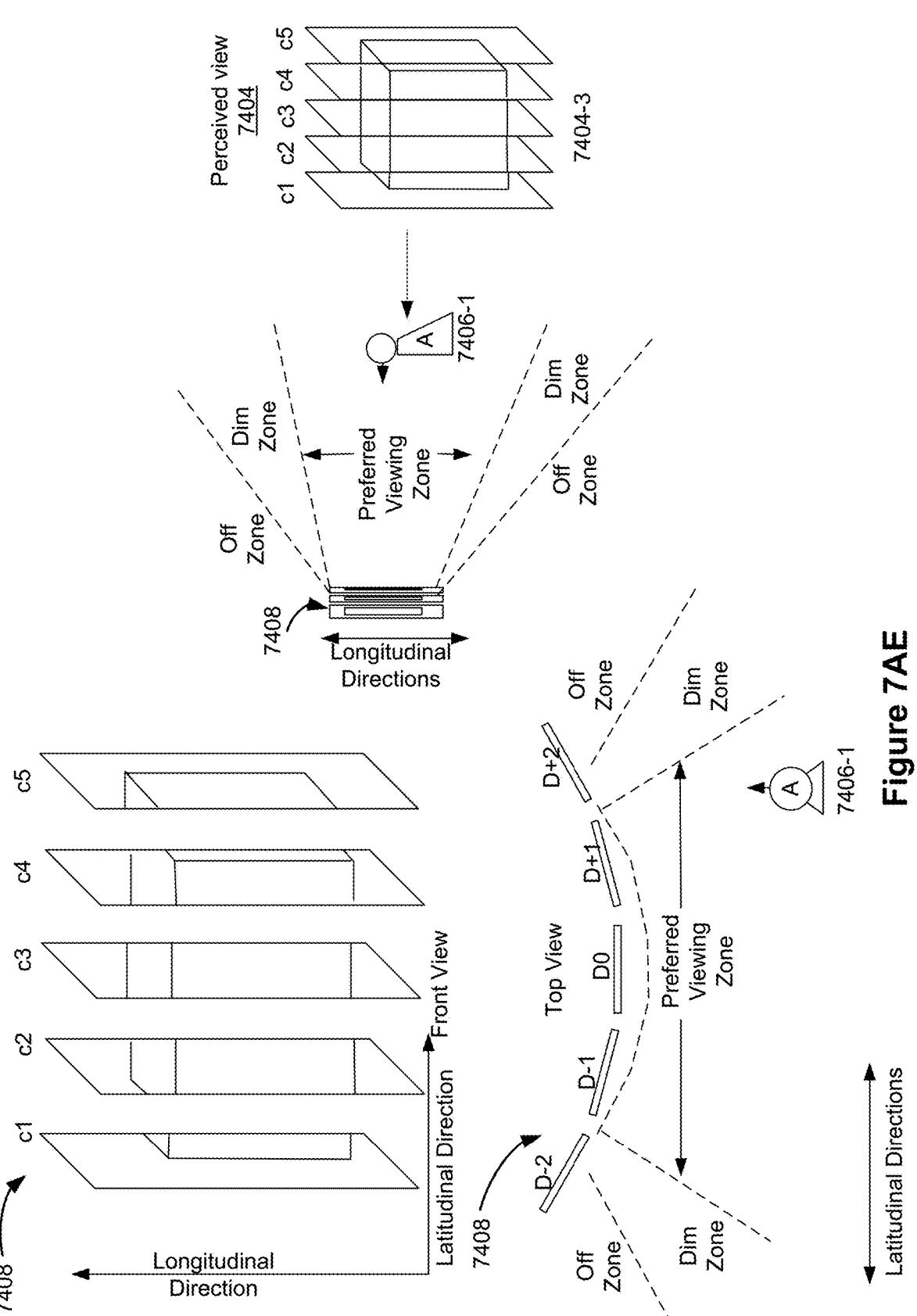
Figure 7A:
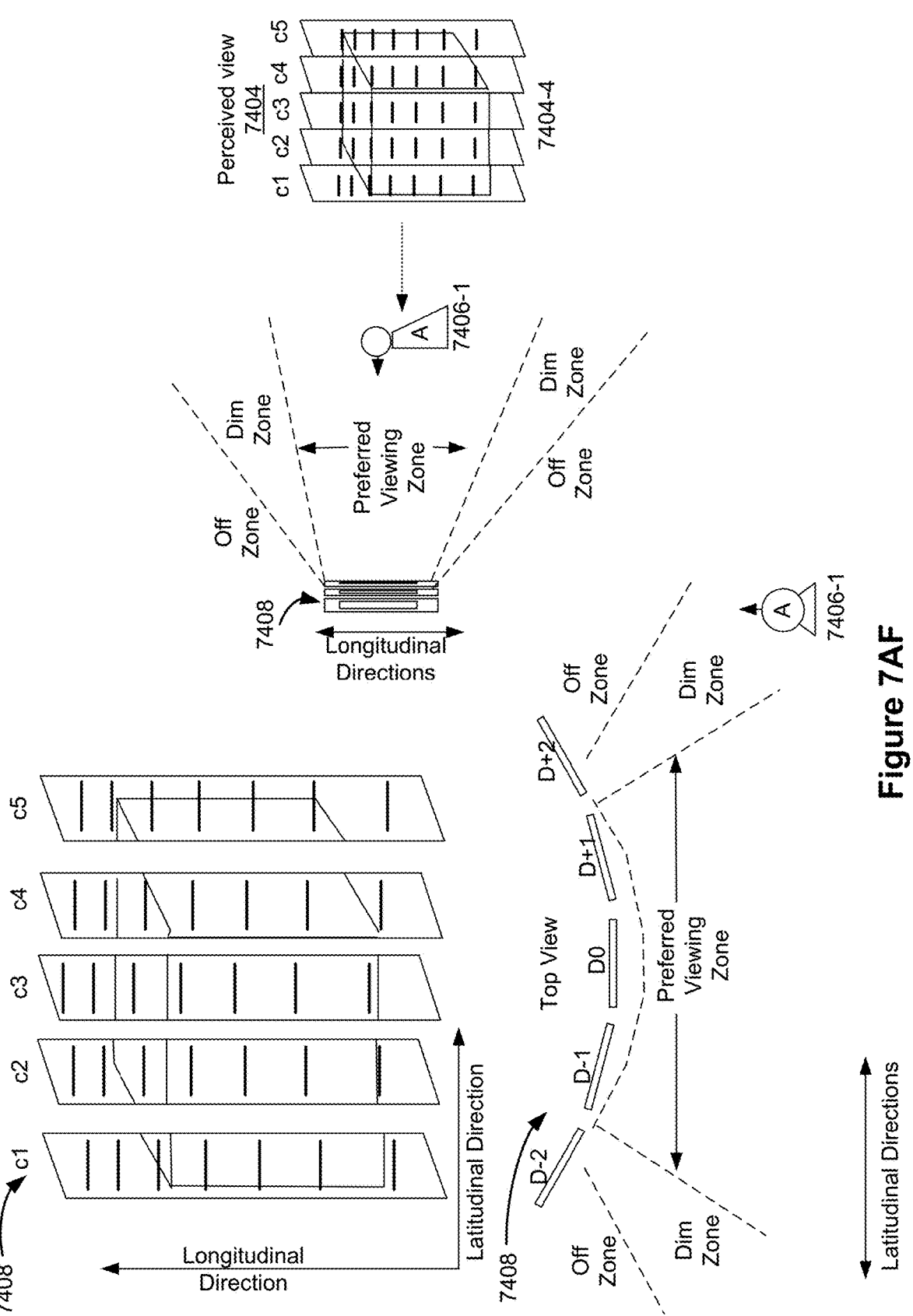
Figure 7A:
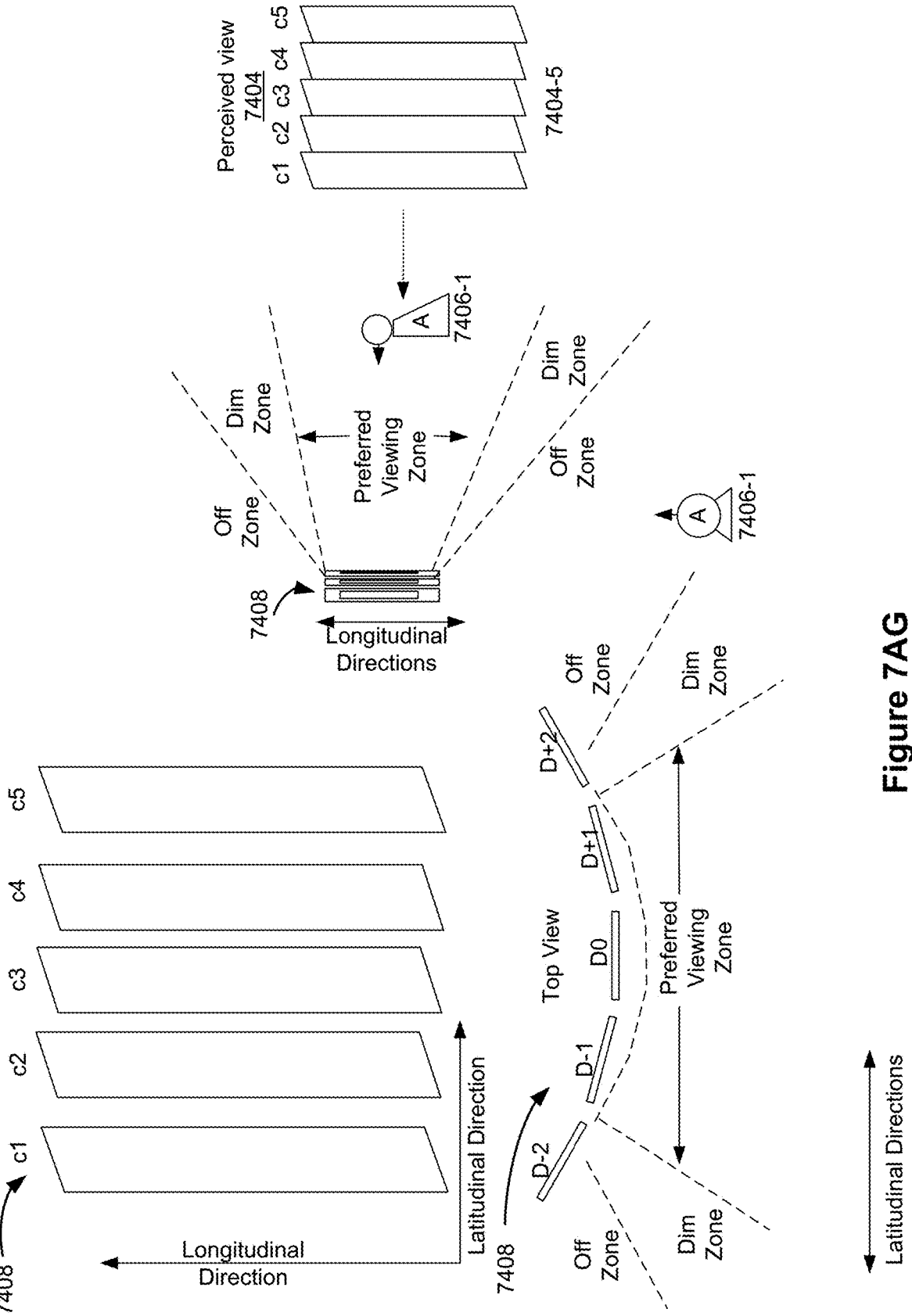
Figure 7A:
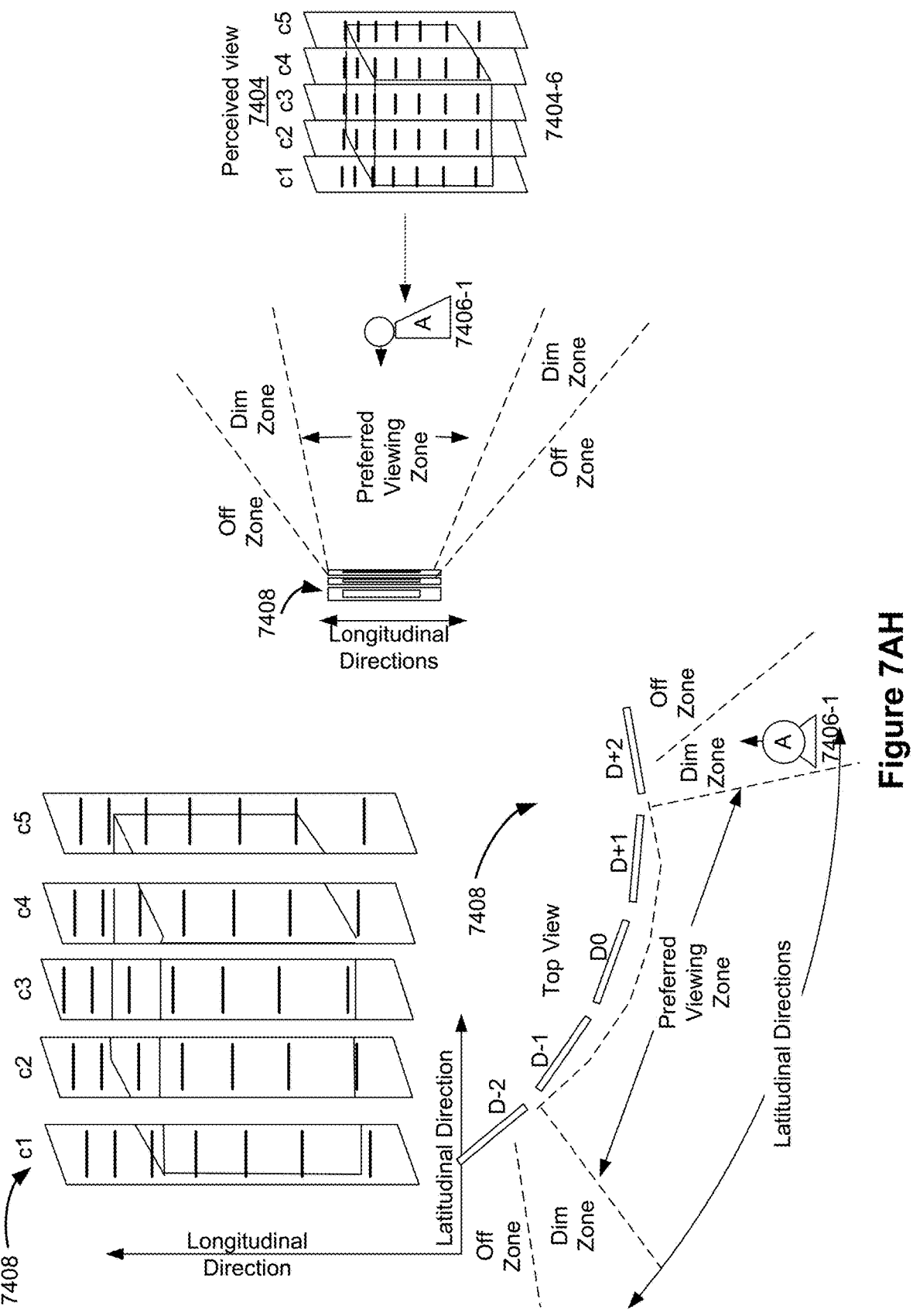
Figure 7A:
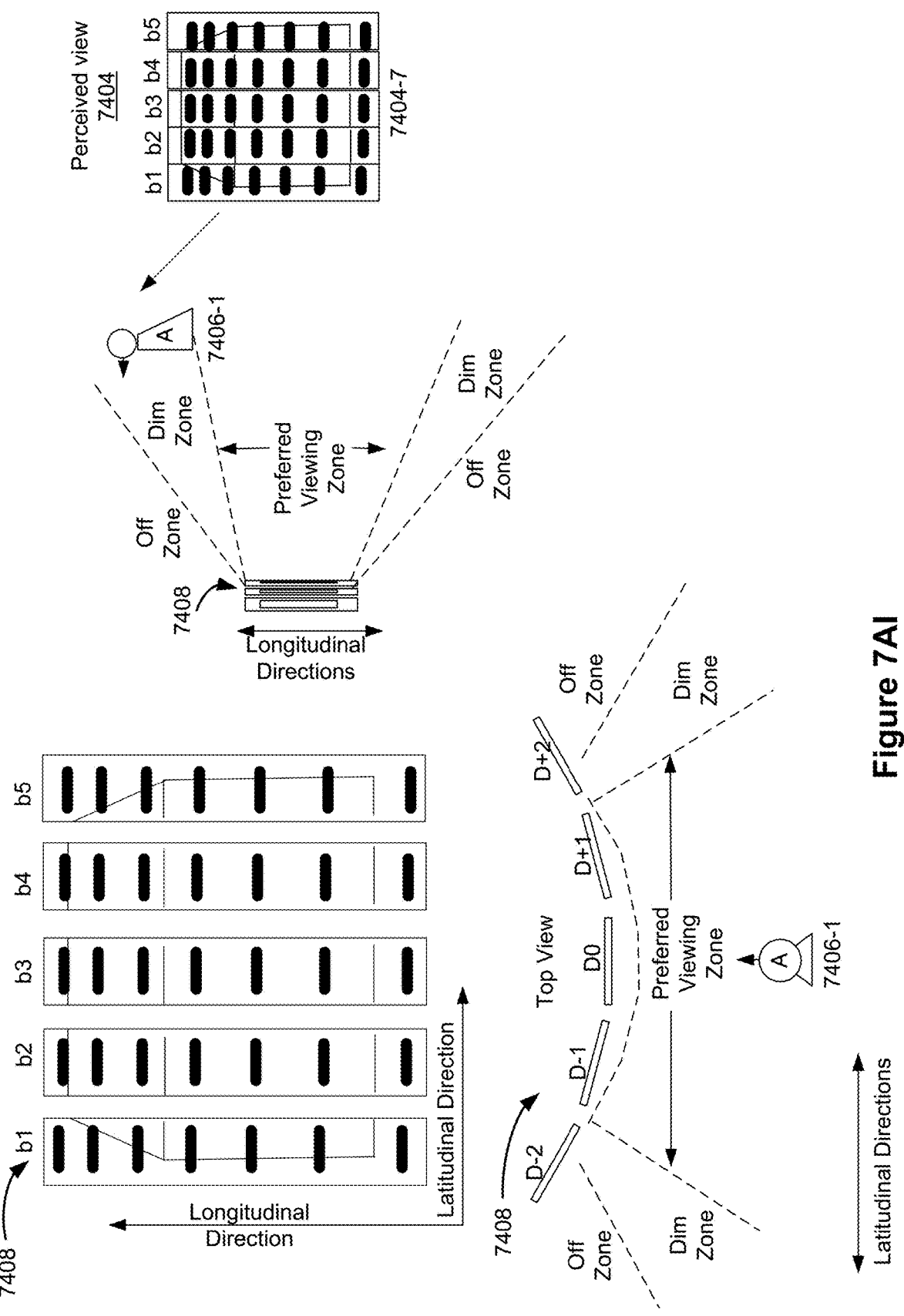
Figure 7A:
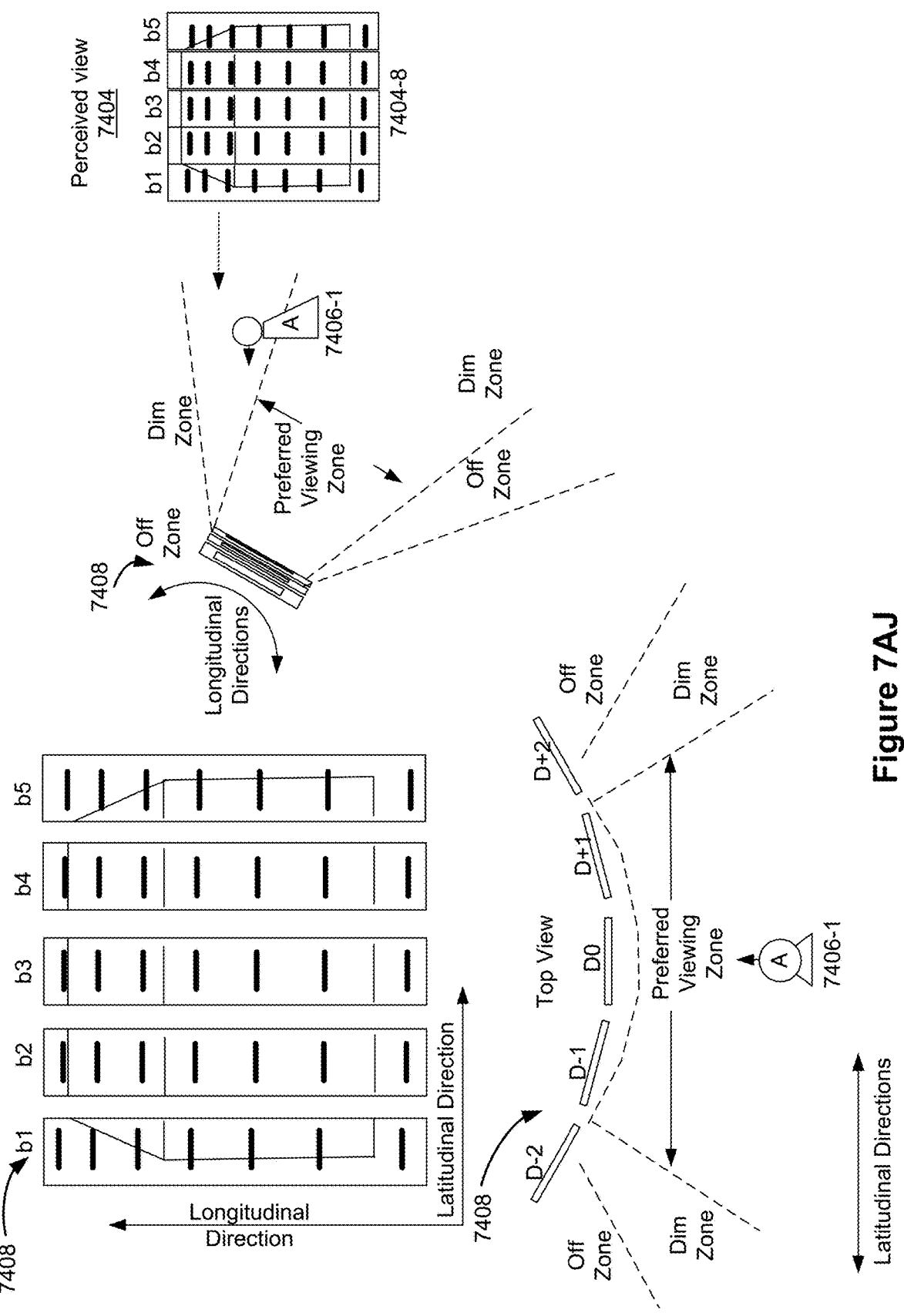
Figure 7A:
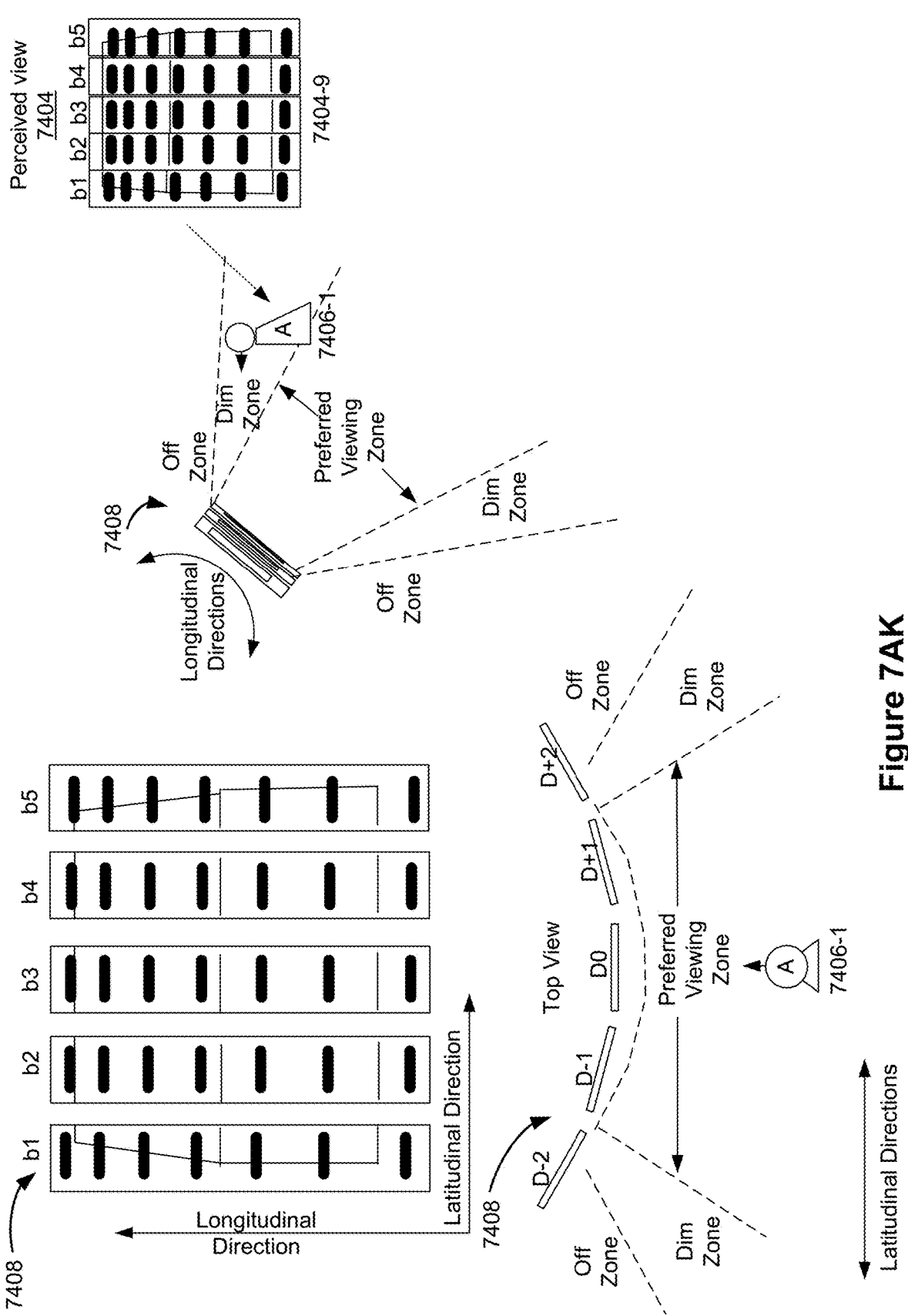
Figure 7A:
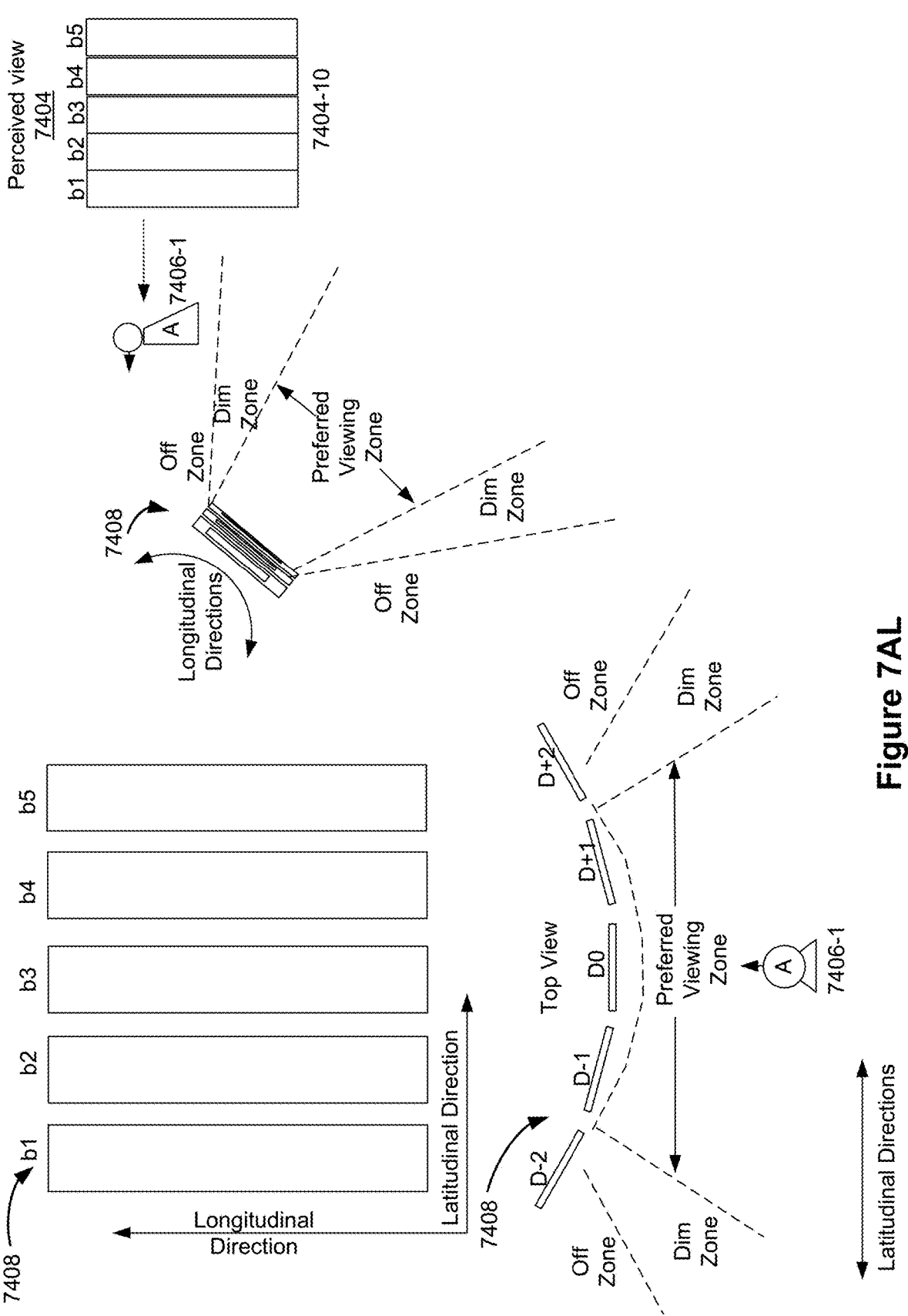
Figure 7A:
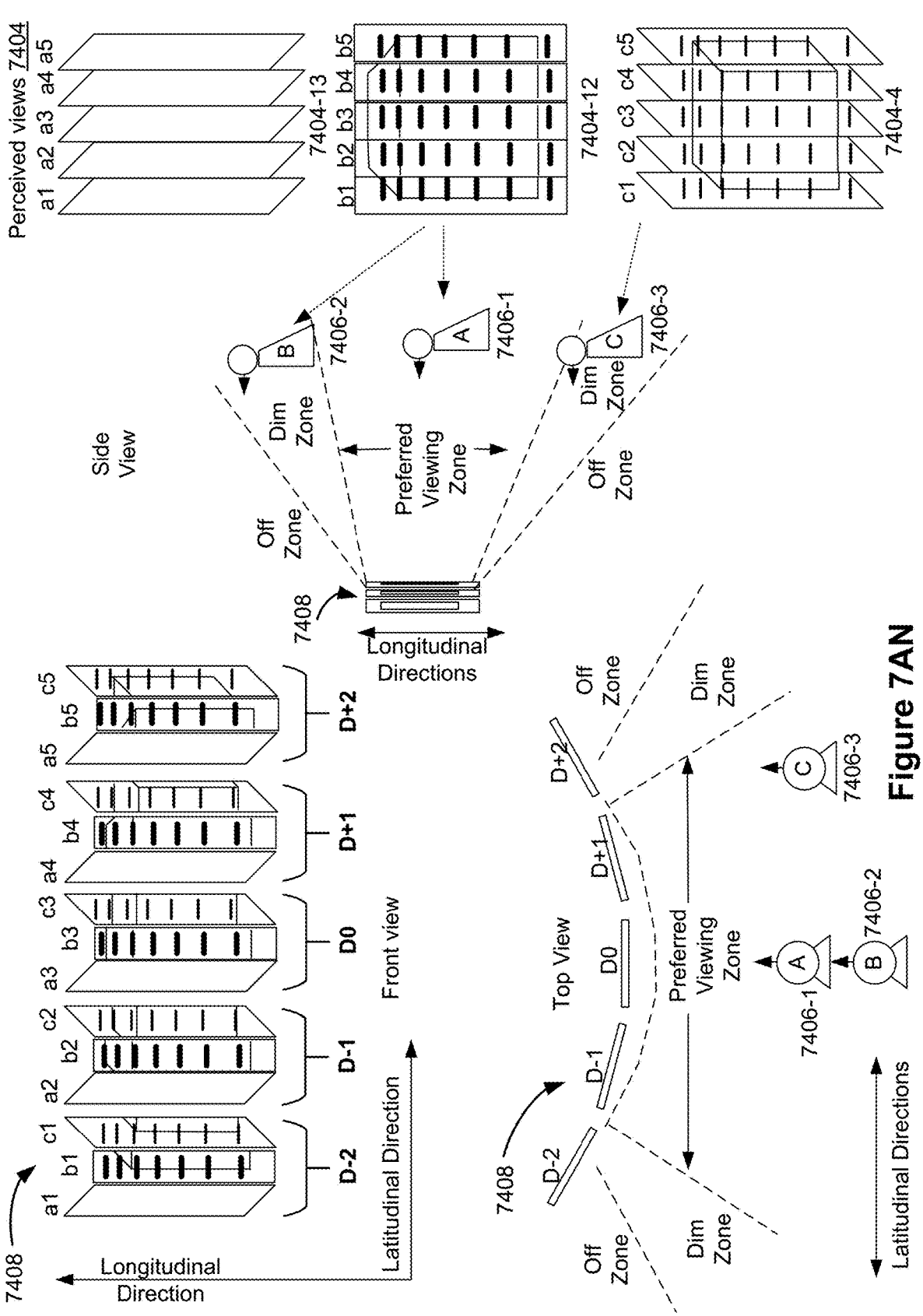
Figure 7A:
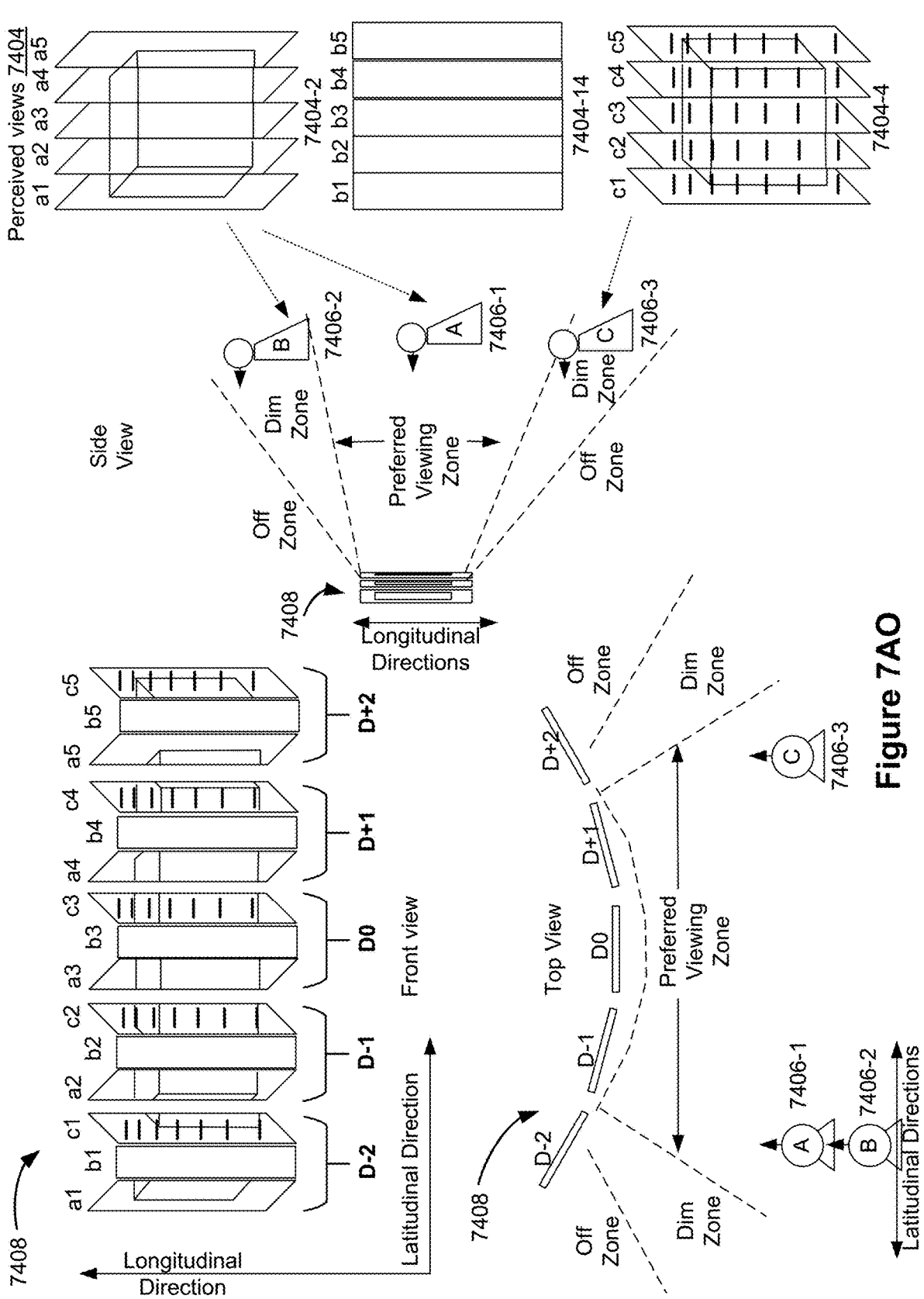
Figure 7A:
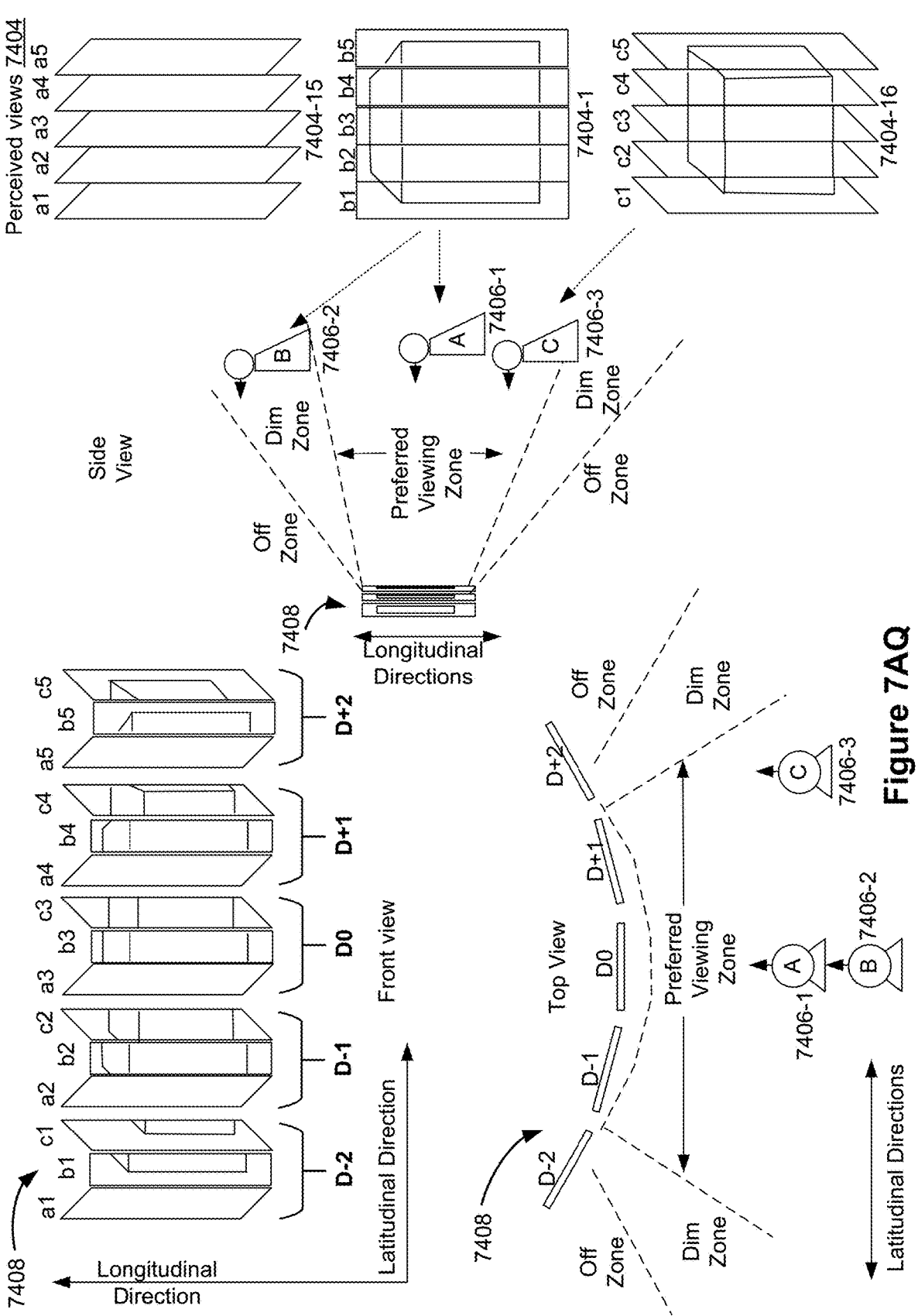

In FIGS. 7U-7AB2, the representation 7006 of the first user 7202 that is displayed via the second display generation component 7102 also have different appearances that correspond to the different appearances of the first user 7202 (e.g., the different appearances of the representation 7006 are labeled as representations 7006-g, 7006-h, 7006-i, 7006-j, and 7006-k in FIGS. 7U-7Y, and shown as 7006-1, 7006-m, and 7006-n in FIGS. 7Z-7AB2). In some embodiments, the appearances of the representation 7006 of the first user 7202 are generated based on the actual appearances of the first user 7202 (e.g., different appearances based on movement of facial features, change in identity of the first user, visual changes that are not due to movement of the body of the first user, and/or other changes described above), and, optionally, configured and/or adjusted based on configuration inputs from the first user 7202. As shown in FIGS. 7U-7AB2, in addition to changes in appearance that is generated based on movement of the portion of the body of the first user 7202 (e.g., head movement, eye movement, facial movement, and/or other body movements), the difference in appearance in the representation 7006 of the first user 7202 also includes differences in visual properties, such as the tone, shade, tint, texture, color, luminance, translucency, and/or other visual properties of the representation 7006 of the first user 7202 (e.g., visual properties of the representations 7006-g through 7006-k, and visual properties of the representations 7006-1 through 7006-n).

As described with respect to FIGS. 7U-7AB2, as the environmental parameters associated with the physical environment in which the representation 7006 is displayed (e.g., location B 7000-b, and/or the physical environment of the second display generation component 7102 (which, optionally, also includes the first display generation component 7100, the first user 7202, and/or the second user 7204) change, the values of the display parameters of the representation 7006 of the first user 7202 are modified by different amounts, due to the differences in the values of the visual properties of representation 7006 of the first user 7202, in accordance with some embodiments. In some embodiments, the change in the environmental parameters associated with the physical environment includes changes in actual ambient lighting in the physical environment in which the representation 7006 of the first user 7202 is displayed, and/or changes in position(s) and/or viewing angle(s) of one or more external viewers (e.g., the second user 7204, and/or other viewers) that are in positions to view the representation 7006 of the first user 7202 via the second display generation component 7102.

FIG. 7U-7W illustrate a scenario that is analogous to that shown in FIGS. 7A-7B, where, when the first user 7202 of a first visual appearance (e.g., a first skin tone, a first type of facial features, and/or other visual characteristics) has a first spatial relationship to the first display generation component 7100 and is viewing CGR content displayed via the first display generation component 7100, the representation 7006 of the first user 7202 (e.g., shown as representation 7006-*g*) is displayed via the second display generation component 7102 and made visible to an external viewer (e.g., the second user 7204, and/or another viewer in front of the second display generation component 7102). In some embodiments, the representation 7006 of the first user 7202 is displayed via the second display generation component 7102, in accordance with a determination that a view of the physical environment in which the second display generation component 7102 is located is made visible to the first user 7202 via the first display generation component 7100 (e.g., as part of a mixed reality environment, and/or in a passthrough view of the physical environment of the first display generation component). In some embodiments, the representation 7006 of the first user 7202 is displayed with one or more graphical elements that indicates the status associated with the first user 7202 (e.g., overlay 7008, progress bar 7004, and/or other indicators of the status of the content displayed via the first display generation component 7100, the level of immersion, and/or other status information associated with the first user 7202). In some embodiments, the representation 7006 of the first user 7202 is displayed via the second display generation component 7102 independent of the content shown via the first display generation component 7100 and/or the level of immersion with which the content is shown. In some embodiments, the representation 7006 of the first user 7202 is displayed via the second display generation component 7102 independent of whether an external viewer is viewing the representation of the first user 7202 and/or the viewing angle of the external viewer relative to content displayed via the second display generation component 7102. In some embodiments, representation 7006 of the first user 7202, and/or the graphical elements that indicate the status associated with the first user are updated in real-time or substantially real-time in accordance with the methods described with respect to FIGS. 7A-7T and FIGS. 8-11.

In some embodiments, the representation 7006 of the first user 7202 has a baseline appearance (e.g., a default appearance that is generated based on the visual appearance of the first user 7202, configured by the first user 7202, and/or automatically configured by the computer system), where the baseline appearance is optionally adjusted (e.g., dimmed, or otherwise reduced in visual prominence) based on changes in the environmental conditions associated with the physical environment in which the representation 7006 of the first user 7202 is displayed (e.g., darkening of ambient lighting, movement of the external viewer from a preferred viewing zone near the center of the second display generation component 7102 into a dimmed viewing zone to the side of the second display generation component 7102, and/or other changes that affect the viewing condition of the external viewer). In some embodiments, the baseline appearance of the representation 7006 of the first use 7202 already includes a default amount of blurring, desaturation, and/or darkening applied to the still photo or video of the first user 7202 based on the visual properties of the appearance of the first user.

In some embodiments, the baseline appearance of the representation 7006 of the first user 7202 is generated based on a still image of the first user 7202, a real-time video feed of the first user 7202, and/or a generic avatar of an average user (e.g., a hypothetical average person of a respective gender, age, ethnicity, and/or other personal characteristics that generally affect a visual appearance of the hypothetical average person), and, optionally, modified in accordance with configuration inputs of the first user and/or automatically configured based on one or more personal characteristics known about the first user).

In some embodiments, the baseline appearance of the representation 7006 of the first user 7202 has a first set of values for a first set of visual properties (e.g., shape, color, tone, tint, luminance, translucency, and/or other visual properties). In some embodiments, the first set of values includes a respective set of baseline values for a respective visual property of the first set of visual properties that is used for different portions (e.g., pixels, facial features, and/or other types of portions) of the representation 7006 of the first user 7202. In some embodiments, a small number of representative baseline values are used for a respective visual property of the first set of visual properties of the baseline representation of the first user.

In some embodiments, the baseline representation of the first user is displayed via the second display generation component 7102 when the environmental conditions of the physical environment in which the representation 7006 of the first user 7202 is displayed meet default display criteria. In some embodiments, the environmental conditions that meet the default display criteria include a condition that the first user 7202 is viewing, via the first display generation component 7100, a passthrough view of the physical environment in which the representation 7006 of the first user 7202 is displayed, a condition that the ambient lighting of the physical environment in which the representation 7006 of the first user 7202 is displayed is normal ambient lighting (e.g., within a first range of brightness, within a first range of color temperature, and/or lighting conditions that do not perceivably alter the visual appearance of the representation 7006 of the first user 7202), and/or a condition that an external viewer that is in a position to view the representation 7006 of the first user 7202 via the second display generation component 7102 is in a preferred viewing zone of the second display generation component 7102 (e.g., within a first range of viewing angles in the latitudinal direction, and/or within a second range of viewing angles in longitudinal directions, and/or in a central region in front of the display area of the second display generation component 7102).

In FIGS. 7U-7W, the value of at least one display parameter of the representation 7006 of the first user 7202 is adjusted (e.g., indicated by the addition of a first filter 7402-*a* applied to the representation 7006-*g* of the first user 7202 in FIG. 7U-7W) from the baseline appearance of the representation 7006 of the first user 7202 in accordance with the environmental conditions associated with the physical environment in which the representation 7006 of the first user 7202 is displayed. In some embodiments, the adjustment is for display parameters such as, color, tone, tint, shade, luminance, translucency, and/or a combination of two or more of the above, of the representation 7006 of the first user 7202. In some embodiments, the amount of adjustment is a respective amount of a respective display parameter, such as a first amount for a first display parameter, a second amount for a second display parameter, and so on. In some embodiments, the first filter 7402-*a* in FIG. 7U-7W represents a first set of filters that are applied to the baseline representation of the first user 7202 to alter the values of the first set of display parameters of the baseline appearance of the representation 7006 of the first user 7202. In some embodiments, the first set of filters, when applied to the baseline appearance of the representation 7006 of the first user 7202, reduces the visual prominence (e.g., reduces color saturation, luminance, opacity, image resolution, image contrast, dynamic range, and/or other display parameters) of the representation 7006 of the first user 7202 relative to the baseline appearance of the representation 7006 of the first user 7202. In some embodiments, the first set of filters changes the visual prominence of the representation 7006 of the first user 7202 by a first amount that corresponds to the characteristics of the ambient lighting (e.g., directionality, brightness, color temperature, and/or other properties of light).

In some embodiments, as shown in FIGS. 7U-7V, the overall change in the appearance of the representation 7006 of first user 7202 (e.g., as shown in FIG. 7U-7V) is based on the application of the first filter 7402-_a_ and based on the movement of the first user 7202 (e.g., the movement of the portion of the body of the first user that is represented in the representation 7006, and/or the movement of the first user's face, eyes, and/or head) relative to the first display generation component 7100.

For example, as shown in FIGS. 7U-7V, the second user 7204 is in a preferred viewing zone in front of the second display generation component 7102 in this example, while the first user 7202 is viewing CGR content via the first display generation component 7100 in a mixed reality mode, and/or with an intermediate level of immersion (e.g., the CGR content includes both virtual content from movie X and a representation of the physical environment including the representation 7010 of the second user 7204 and the representations of the physical objects and surfaces near the second user 7204, in a three-dimensional environment). As a result, the representation 7006 of the first user 7202 is shown via the second display generation component 7102 to the second user 7204, and includes movement that corresponds to the movement of the first user 7202 relative to the first display generation component 7100. For example, as shown in FIGS. 7U-7V, the first user 7202 moves rightward relative to the first display generation component 7100, and the representation 7006 of the first user 7202 shown via the second display generation component is changed to reflect the movement of the first user 7202, in accordance with some embodiments.

In some embodiments, the representation 7006 of the first user 7202 and the graphical elements that indicate the status associated with the first user 7202 are displayed at different simulated depths relative to the surface of the second display generation component 7102. For example, the representation 7006 of the first user 7202 is displayed at a simulated depth that is greater than the other graphical elements that indicate the status associated with the first user 7202 (e.g., overlay 7008, progress bar 7004, and/or other graphical elements). In some embodiments, the representation 7006 of the first user 7202 has a curved profile and/or has a profile that follows a contour of a portion of the body of the first user 7202 (e.g., following the contour of the first user's face and/or eye region if the first display generation component 7100 is an inner display of an HMD, or following a curved contour that wrap around at least the front of the head of the first user 7202).

In FIG. 7W following FIG. 7V, the second user 7402 moved relative to the second display generation component 7102 (e.g., in the leftward direction relative to the front of the second display generation component 7102, or in another longitudinal direction and/or latitudinal direction relative to the second display generation component 7102), while still remaining in the preferred viewing zone of the second display generation component 7102, in accordance with some embodiments. In response to detecting the movement of the second user 7402, the computer system displays the representation 7006 of the first user 7202 (e.g., shown as representation 7006-_i_ in FIG. 7W) with a simulated parallax effect (e.g., moved in the leftward direction relative to the surface of the second display generation component 7102, and/or moved in a direction relative to the surface of the second display generation component that corresponds the movement direction of the second user 7204), in accordance with some embodiments.

In some embodiments, as shown in FIG. 7W, the other graphical elements (e.g., the overlay 7008, the progress bar 7004, and/or other graphical elements that indicate other status information associated with the first user 7202 and/or the computer system) that have smaller simulated depth(s) relative to the surface of the second display generation component 7102 are shown with less simulated parallax effect as compared to the representation 7006 of the first user 7202 (e.g., moved by smaller amounts relative to the surface of the second display generation component 7102, as compared to the representation 7006 of the first user 7202).

In FIG. 7W, the viewing angle of the second user 7204 relative to the representation 7006 of the first user 7202 displayed via the second display generation component 7102 is still within the preferred viewing zone (e.g., in the preferred viewing zones in both the latitudinal direction and the longitudinal direction of the second display generation component, and/or within a central region in front of the second display generation component); and as a result, the first filter 7402-_a_ that is applied to the representation 7006-_i_ of the first user 7202 is the same as that applied to the representation 7006-_h_ of the first user 7202 in FIG. 7V, in accordance with some embodiments. In some embodiments, the representation 7006-_i_ shows a different viewing perspective of the representation 7006 of first user 7202 from the viewing perspective of the representation 7006-_h_, due to the change in viewing angle of the second user 7204 relative to the representation 7006 of the first user 7202 shown via the second display generation component 7102.

In FIG. 7X, the appearance of the first user 7202, the relative position of the first user 7202 and the first display generation component 7100, and the viewing angle of the second user 7204 for the representation 7006 of the first user 7202 on the second display generation component 7102 are the same or substantially the same as those shown in FIG. 7U. However, in FIG. 7X, the ambient lighting in the physical environment (e.g., location B 7000-_b_, or another physical environment in which the representation 7006 of the first user 7202 is displayed) has been changed relative to the ambient lighting in the environment shown in FIG. 7U (and relative to the ambient lighting in the environment shown in FIGS. 7V and 7W).

In this particular example, the ambient lighting in the physical environment is reduced, made dimmer, reduced in color temperature, becomes more saturated in color, and/or became darker in tone or shade; and as a result, the computer system changes the appearance of the representation 7006 of the first user 7202 from the baseline appearance by a greater amount (e.g., as indicated in FIG. 7X by the thicker, darker, and/or stronger filter 7402-_b_ that is applied to the baseline representation of the first user 7202), as compared to the amount of change that is caused by the first filter 7402-_a_ in FIG. 7U, in accordance with some embodiments.

In some embodiments, the second filter 7402-*b* is chosen based on the visual properties of the baseline representation of the first user 7202 (e.g., the color, tone, tint, luminance, texture, and/or other visual properties that affect the appearance of the representation 7006 of the first user 7202 under different real and/or simulated lighting conditions).

In some embodiments, the amount of the change that is applied to a respective display parameter (e.g., color, tint, luminance, texture, or other display parameters that are visually affected by ambient lighting) of the default appearance of the representation 7006 of the first user 7202 is determined in accordance with a first curve or functional relationship between the respective display parameter and a measure of a respective property of the ambient lighting (e.g., color, tint, luminance, color temperature, and/or other properties that affect the appearance of the representation of the first user).

In some embodiments, if the ambient lighting is changed further relative to the ambient lighting in the environment shown in FIG. 7X, for example, if the ambient lighting is further reduced, made dimmer, reduced in color temperature, becomes more saturated in color, and/or became darker in tone or shade as compared to that shown in FIG. 7X, the computer system changes the appearance of the representation 7006 of the first user 7202 from the baseline appearance by an even greater amount (e.g., to the state of the third filter 7402-*c* shown in FIG. 7Y that is applied to the baseline representation of the first user 7202), as compared to the second filter 7402-*b* in FIG. 7X.

In some embodiments, the enhanced filter 7402-*c* in FIG. 7X is chosen based on the visual properties of the baseline appearance of the representation 7006 of the first user 7202 (e.g., the color, tone, tint, luminance, texture, and/or other visual properties that affect the appearance of the representation 7006 of the first user 7202 under different lighting conditions).

In some embodiments, the amount of the change in a respective display parameter of the representation 7006 of the first user 7202 is determined in accordance with the same first curve or functional relationship between the respective display parameter and a measure of a respective property of the ambient lighting (e.g., color, tint, luminance, color temperature, and/or other properties that affect the appearance of the representation 7006 of the first user 7202), as that used in the second filter 7402-*b* in FIG. 7X, and the first filter 7402-*a* in FIG. 7U (and in FIGS. 7V and 7W).

In some embodiments, the first curve or functional relationship between the respective display parameter (e.g., color, tint, luminance, color temperature, and/or other visual properties that are affect by ambient lighting) and a measure of a respective property of the ambient lighting (e.g., color, tint, luminance, color temperature, and/or other properties that would affect the appearance of the representation of the first user) used in the filters 7402-*a* and 7402-*b*, is selected in accordance with the one or more visual properties of the baseline representation of the first user 7202 (e.g., color, tone, tint, texture, and other visual properties that would be affected by ambient lighting). In some embodiments, a respective curve or functional relationship corresponds to a respective range of values for a respective visual property, and if the value of the respective visual property of the baseline representation of the first user falls within the respective range of values, the filter used to modify the respective display parameter of the baseline representation of the first user is chosen to be the respective filter. If the value of the respective visual property of the baseline representation of the first user does not fall within the respective range of values, the filter used to modify the respective display parameter of the baseline representation of the first user is chosen to be another filter different from the respective filter, in accordance with some embodiments. In some embodiments, the exact amount of change that is applied by the respective filter is determined based on the first curve or functional relationship (e.g., for a first value of the property of ambient lighting, a first amount of change is applied to the respective display parameter of the baseline representation of the first user; for a second value (e.g., greater or less than the first value) of the property of ambient lighting, a second amount of change (e.g., greater or less than the first amount of change) is applied to the respective display parameter of the baseline representation of the first user; and for a third value (e.g., greater or less than the first value, and/or greater or less than the second value) of the property of ambient lighting, a third amount of change (e.g., greater or less than the first amount of change, and/or greater or less than the second amount of change) is applied to the respective display parameter of the baseline representation of the first user). In some embodiments, the curve or functional relationship is a monotonic relationship (e.g., increasing, or decreasing through the whole range of values for the property of ambient light). In some embodiments, the curve or functional relationship is a linear relationship. In some embodiments, the curve or functional relationship is a non-linear relationship. In some embodiments, the respective curves or function relationships for different combinations of a respective display parameter of the representation and a respective property of ambient light have different shapes. In some embodiments, the respective curves or function relationships for a respective combination of display parameter of the representation and property of ambient light have different shapes for different ranges of values for the visual property of the representation of the first user.

In FIG. 7Y, the appearance of the first user 7202, the relative position of the first user 7202 and the first display generation component 7100, and the ambient lighting in the physical environment (e.g., location B 7000-*b*, or another physical environment in which the representation 7006 of the first user 7202 is displayed) are the same as those shown in FIGS. 7U and 7X. However, the viewing angle of the second user 7204 for the representation 7006 of the first user 7202 on the second display generation component 7102 has changed relative to that shown in FIG. 7U.

In this particular example shown in FIG. 7Y, the second user 7204 has moved to a viewing angle that is outside of the preferred viewing zone relative to the second display generation component 7201 (e.g., moved outside of the preferred viewing zone in the longitudinal direction, and/or moved outside of the preferred viewing zone in the latitudinal direction); and as a result, the computer system changes the appearance of the representation 7006 of the first user 7202 from the baseline appearance by a greater amount (e.g., as indicated in FIG. 7Y by the thicker, darker, and/or stronger filter 7402-*c* that is applied to the baseline representation of the first user), as compared to the amount of change applied in FIG. 7U (e.g. the change applied by the filter 7402-*a*). In some embodiments, the filter 7402-*c* is chosen based on the visual properties of the baseline representation of the first user (e.g., the color, tone, tint, luminance, texture, and/or other visual properties that affect the appearance of the representation of the first user under different lighting conditions). In some embodiments, a first amount of change in a respective display parameter of the baseline representation of the first user is determined in accordance with the same curve or functional relationship between the respective display parameter and a measure of a respective property of the ambient lighting (e.g., color, tint, luminance, color temperature, and/or other properties that affect the appearance of the representation of the first user), as that used in the filter 7402-a in FIG. 7U (and in FIGS. 7V and 7W), and the filter 7402-b in FIG. 7X. In addition, a second amount of change in the respective display parameter of the baseline representation of the first user is determined in accordance with a second curve or functional relationship between the respective display parameter and a measure of a respective viewing angle or viewing range (e.g., a first range of angles corresponding to a preferred viewing zone, a second range of viewing angles corresponding to a dimmed viewing zone, and/or other ranges of viewing angles that corresponding to further dimmed viewing zone (s) and/or off zones). The second curve or functional relationship is also used to select both the filter 7402-a and 7402-c, based on the viewing angle of the second user 7204.

In some embodiments, the second curve or functional relationship between the respective display parameter (e.g., color, tint, luminance, color temperature, and/or other visual properties that are affect by viewing angle of the second user 7402) and the viewing angle of the second user 7402 used in the filters 7402-a and 7402-c, is selected in accordance with the one or more visual properties of the baseline representation of the first user 7202 (e.g., color, tone, tint, texture, and other visual properties that would be affected by ambient lighting). In some embodiments, a respective curve or functional relationship corresponds to a respective range of values for a respective visual property, and if the value of the respective visual property of the baseline representation of the first user falls within the respective range of values, the filter used to modify the respective display parameter of the baseline representation of the first user is chosen to be the respective filter. If the value of the respective visual property of the baseline representation of the first user does not fall within the respective range of values, the filter used to modify the respective display parameter of the baseline representation of the first user is chosen to be another filter different from the respective filter, in accordance with some embodiments. In some embodiments, the exact amount of change that is applied by the respective filter is determined based on the second curve or functional relationship (e.g., for a first viewing angle or range of viewing angles, a first amount of change is applied to the respective display parameter of the baseline representation of the first user; for a second viewing angle or range of viewing angles (e.g., greater or less than the first viewing angle or range of viewing angles), a second amount of change (e.g., greater or less than the first amount of change) is applied to the respective display parameter of the baseline representation of the first user; and for a third viewing angle or range of viewing angles (e.g., greater or less than the first viewing angle or range of viewing angles, and/or greater or less than the second viewing angle or range of viewing angles), a third amount of change (e.g., greater or less than the first amount of change, and/or greater or less than the second amount of change) is applied to the respective display parameter of the baseline representation of the first user). In some embodiments, the curve or functional relationship is a monotonic relationship (e.g., increasing, or decreasing through the whole range of values for the property of ambient light). In some embodiments, the curve or functional relationship is a linear relationship. In some embodiments, the curve or functional relationship is a non-linear relationship. In some embodiments, the respective curves or function relationships for different combinations of a respective display parameter of the representation and the viewing angle have different shapes. In some embodiments, the respective curves or function relationships for a respective combination of display parameter of the representation and viewing angle have different shapes for different ranges of values for the visual property of the representation of the first user. In some embodiments, a first respective display parameter of the representation of the first user is a function of both a measure of a property of ambient light and the viewing angle of the external viewer, and the function has different shapes for different ranges of values for the visual property of the representation of the first user.

FIGS. 7Z, 7AA1, and 7AB1 illustrate the same changes in ambient lighting and viewing angle as those shown in FIGS. 7U, 7X, and 7Y, in accordance with some embodiments. For example, the change in ambient lighting shown in FIG. 7AA1 relative to FIG. 7Z is the same as that shown in FIG. 7X relative to FIG. 7U; and the change in viewing angle shown in FIG. 7AB1 relative to FIG. 7Z is the same as the change in viewing angle shown in FIG. 7Y relative to FIG. 7U. However, for the same change in ambient lighting, the filter 7402 that is applied to the baseline representation of the first user is different, depending on the visual properties of the baseline representation of the first user. FIG. 7AA2 illustrate the same user interfaces displayed via the first display generation component 7100 and the second display generation component 7102 shown in FIG. 7AA1, now displayed via the inward-facing displays 7100 of the HMD 7100a and the outward-facing displays 7102 of the HMD 7100a, in accordance with some embodiments. FIG. 7AB2 illustrate the same user interfaces displayed via the first display generation component 7100 and the second display generation component 7102 shown in FIG. 7AB1, now displayed via the inward-facing displays 7100 of the HMD 7100a and the outward-facing displays 7102 of the HMD 7100a, in accordance with some embodiments. The user interfaces shown in other Figures, such as FIGS. 7X, 7U, 7V, 7X, 7Y, and 7Z, can be displayed using HMD 7100a in an analogous manner as those shown in FIGS. 7AA2 and 7AB2. FIGS. 7AA2, and 7AB2 illustrate the same changes in ambient lighting and viewing angle as those shown in FIGS. 7U, 7X, and 7Y, in accordance with some embodiments. For example, the change in ambient lighting shown in FIG. 7AB1 relative to FIG. 7Z is the same as that shown in FIG. 7X relative to FIG. 7U; and the change in viewing angle shown in FIG. 7AB2 relative to FIG. 7Z is the same as the change in viewing angle shown in FIG. 7Y relative to FIG. 7U. However, for the same change in ambient lighting, the filter 7402 that is applied to the baseline representation of the first user is different, depending on the visual properties of the baseline representation of the first user.

For example, in some embodiments, the filter 7402 that is applied to the baseline representation of the first user shown in FIG. 7Z (e.g., the filter 7402 is shown as filter 7402-d in FIG. 7Z) is different from the filter 7402 that is applied to the baseline representation of the first user shown in FIG. 7U (e.g., the filter 7402 is shown as 7402-a in FIG. 7U), because the visual properties of the baseline representations of the first user 7202 are different in FIG. 7Z and FIG. 7U.

Similarly, in some embodiments, the ambient lighting shown in FIGS. 7AA1 and 7AA2 is the same as the ambient lighting shown in FIG. 7X, and the filter 7402 that is applied to the baseline representation of the first user shown in FIGS. 7AA1 and 7AA2 (e.g., the filter 7402 is shown as 7402-e in FIGS. 7AA1 and 7AA2) is different from the filter 7402 that is applied to the baseline representation of the first user shown in FIG. 7X (e.g., the filter 7402 is shown as 7402-*b* in FIG. 7X), because the visual properties of the baseline representations of the first user are different in FIG. 7AA1 (and FIG. 7AA2) and FIG. 7X.

Furthermore, in some embodiments, as shown in the comparison between FIG. 7AA1 (and FIG. 7AA2) following FIG. 7Z and FIG. 7X following FIG. 7U, for the same amount of change in ambient lighting (e.g., the same amount of change in color, tint, luminance, color temperature, and/or other visual properties of ambient lighting that affect the visual appearance of the representation of the first user), the value of a respective display parameter (e.g., color, texture, luminance, translucency, and/or other display parameters that is affected by the ambient lighting conditions) of the baseline representation of the first user is changed by different amounts (e.g., the amount of change in the respective display parameter as shown in FIG. 7AA1 (and FIG. 7AA2) following FIG. 7Z is different from the amount of change in the respective display parameter as shown in FIG. 7X following FIG. 7U), due to the difference in the values of a respective visual property of the baseline appearance of the representation 7006 of the first user 7202 in FIG. 7Z and FIG. 7U.

In some embodiments, the amount of the change in a respective display parameter of the representation 7006 of the first user 7202 is determined in accordance with a third curve or functional relationship between the respective display parameter and a measure of a respective property of the ambient lighting (e.g., color, tint, luminance, color temperature, and/or other properties that affect the appearance of the representation of the first user). In some embodiments, the third curve or functional relationship between the respective display parameter and the measure of the respective property of the ambient lighting (e.g., color, tint, luminance, color temperature, and/or other properties that affect the appearance of the representation of the first user) used in the filter 7402-*d* and the filter 7402-*e*, is selected in accordance with the one or more visual properties of the baseline representation 7006 of the first user 7202 (e.g., color, tone, tint, texture, and other visual properties that would be affected by ambient lighting). The third curve or functional relationship that are used to generate the filter 7402-*d* and the filter 7402-*e* (e.g., as shown in FIGS. 7AA1 (and FIGS. 7AA2) and 7Z) has properties similar to those of the first curve or functional relationship used to generate the filter 7402-*a* and the filter 7402-*b* (e.g., as shown in FIGS. 7U and 7X), as described above with respect to FIGS. 7U-7X, and are different from the first curve or functional relationship (e.g., in the exact shape of the curve, and the slope of the curve for different value ranges of the respective property of the ambient lighting), in accordance with some embodiments.

FIGS. 7AB1 and 7AB2, as compared to FIG. 7Z, illustrate that, for the same change in the viewing angle of the second user 7204, the filter 7402 that is applied to the baseline representation of the first user is different (e.g., the change shown in FIGS. 7AB1 and 7AB2 relative to Figure Z is different from the change shown in FIG. 7Z relative to FIG. 7U), depending on the visual properties of the baseline representation of the first user. For example, the filter 7402-*d* that is applied to the baseline representation of the first user shown in FIG. 7Z is different from the filter 7402-*a* that is applied to the baseline representation of the first user in FIG. 7U, because the visual properties of the baseline representations of the first user are different in FIG. 7Z and FIG. 7U. The ambient lighting shown in FIGS. 7AB1 and 7AB2 is the same as the ambient lighting shown in FIG. 7Y. The filter 7402-*f* that is applied to the baseline representation of the first user shown in FIGS. 7AB1 and 7AB2 is different from the filter 7402-*c* that is applied to the baseline representation of the first user in FIG. 7Y, because the visual properties of the baseline appearances of the representation of the first user are different in FIG. 7AB1 (and FIG. 7AB2) and FIG. 7Y. For the same amount of change in the viewing angle of the second user 7204 (e.g., the same amount of change viewing angle, and/or the same transition between viewing zones that affect the visual appearance of the representation of the first user), the value of a respective display parameter (e.g., color, texture, luminance, translucency, and/or other display parameters that is affected by the ambient lighting conditions) of the baseline representation of the first user is changed by different amounts, due to the difference in the visual properties of the baseline representations of the first user in FIG. 7U and the baseline representation of the first user in FIG. 7Z, in accordance with some embodiments.

In some embodiments, the amount of the change in a respective display parameter of the baseline representation of the first user shown in FIG. 7Z and FIG. 7AB1 (and FIG. 7AB2) is determined in accordance with a fourth curve or functional relationship between the respective display parameter and the viewing range or viewing angle of the second user 7204. In some embodiments, the fourth curve or functional relationship between the respective display parameter and the viewing angle and/or viewing range of the second user 7204 that is used generate the filter 7402-*d* in FIG. 7Z and the filter 7402-*f* in FIGS. 7AB1 and 7AB2, is selected in accordance with the one or more visual properties of the baseline representation 7006 of the first user 7202 (e.g., color, tone, tint, texture, and other visual properties that would be affected by the viewing angle of the second user) shown in FIG. 7Z and FIGS. 7AB1 and 7AB2. The fourth curve or functional relationship is different from the second curve or functional relationship used to generate the filter 7402-*a* in FIG. 7U and the filter 7402-*c* in FIG. 7Y, due to the difference in the visual properties of the baseline representation 7006 of the first user 7202 shown in FIGS. 7U and 7Z (e.g., meeting first appearance criteria versus not meeting the first appearance criteria, or different based on other appearance criteria), in accordance with some embodiments.

In some embodiments, the amount of change in the visual appearance of the baseline representation of the first user caused by a respective lighting change from a default lighting condition to the current lighting condition in the environment (e.g., the environment in which the representation of the first user is displayed, and the environment of the second display generation component, the first display generation component, the second user, and/or the first user) is selected to generate an amount of perceived change that is substantially the same across respective representations of the first user that have different visual appearances and/or values for the one or more visual properties that would be visually affected by ambient lighting. For example, as shown in FIGS. 7U and 7X, and in FIGS. 7Z and 7AA1 (and in FIG. 7Z and FIG. 7AA2), the same amount of change in the ambient lighting causes different amounts of changes in one or more display parameters of the representations 7006 of the first user 7202, depending on the different visual properties of the representations of the first user, respectively in FIGS. 7U and 7X, and in FIGS. 7Z and 7AA1 (and in FIG. 7Z and FIG. 7AA2). However, in some embodiments, the different amounts of changes in the set of one or more display parameters of the representations of the first user in FIGS. 7U and 7X, and in FIGS. 7Z and 7AA1 (and in FIG. 7Z and FIG. 7AA2), respectively correspond to the same amount or substantially the same amount of perceived change in the representations of the first user for the same change in ambient lighting.

In some embodiments, the amount of change in a respective display parameter of the baseline representation of the first user that is caused by a respective change in viewing angle of the second user 7204 (e.g., relative to the representation of the first user, and optionally, relative to the second display generation component, relative to the first display generation component, and/or relative to the first user) is selected to generate an amount of perceived change that is substantially the same across respective representations of the first user that have different visual appearances and/or values for one or more visual properties that would be affected by viewing angle. For example, as shown in FIGS. 7U and 7Y, and in FIGS. 7Z and 7AB1 (and in FIG. 7A and FIG. 7AB2), the same amount of change in the viewing angle of the second user 7402 causes different amounts of changes in a respective display parameter of the different representations 7006 of the first user 7202, depending on the different visual properties of the representations 7006 of the first user 7202, respectively in FIGS. 7U and 7Y, and in FIGS. 7Z and 7AB1 (and in FIG. 7Z and FIG. 7AB2). However, in some embodiments, the different amounts of changes in the respective display parameter of the representations of the first user in FIGS. 7U and 7Y, and in FIGS. 7Z and 7AB1 (and in FIG. 7Z and FIG. 7AB2) correspond to the same amount or substantially the same amount of perceived change in the representations of the first user for the same or substantially the same change in the viewing angle of the second user.

In some embodiments, a greater amount of change is applied to a respective display parameter of the representation 7006 of the first user 7202 for a given amount of change in the environmental conditions, such as the change in ambient lighting and/or the change in viewing angle of the second user, for representations of the first user that have visual properties meeting first appearance criteria than for representations of the first user that have visual properties that do not meet the first appearance criteria.

For example, in some embodiments, the first appearance criteria are used to identify representations of the first user of which visual saliency is less affected by the reduction of ambient lighting and/or a change in viewing angle to a less preferred viewing angle. In a more specific example, if the visual saliency of the representation of the first user is less affected by the reduction in ambient lighting and/or the change in viewing angle to a less preferred viewing angle for a first set of value ranges than a second set of value ranges of a first set of visual properties of the representation of the first user, a greater amount of change can be applied to a first set of display parameters of the representation of the first user that has the first set of value ranges for the first set of visual properties of the representation, and still keep the representation of the first user sufficiently visible to the second user. Sometimes, for a second set of visual properties of the representation of the first user, different from the first set of visual properties, if the visual saliency of the representation of the first user is more affected by the reduction in ambient lighting and/or the change in viewing angle to a less preferred viewing angle for a third set of value ranges than a fourth set of value ranges of the second set of visual properties, a smaller amount of change can be applied to a second set of display parameters of the representation of the first user that has the third set of value ranges for the second set of visual properties, to keep the representation of the first user sufficiently visible to the second user.

In some embodiments, the first set of visual properties include skin tone, luminance, texture, opacity, translucency, color temperature, tint, shade, and other visual properties that are affected by ambient lighting and/or viewing angle of an external viewer. In some embodiments, when reducing visual prominence of the representation 7006 of the first user 7202 due to a change in ambient lighting and/or a viewing angle of the second user 7204 (e.g., to a dimmer, cooler, and/or fuzzier lighting condition, and/or to a less preferred viewing angle), a larger amount of change is applied to a first display parameter of a first representation of the first user, in accordance with a determination that the first representation of the first user has a lighter tone, a greater luminance, a smoother texture, and/or less translucency, as compared to another representation of the first user that has a darker tone, a lower luminance, a rougher texture, and/or more translucency. In some embodiments, when reducing visual prominence of the representation 7006 of the first user 7202 due to a change in ambient lighting and/or a viewing angle of the second user 7204 (e.g., to a dimmer, cooler, and/or fuzzier lighting, and/or to a less preferred viewing angle), a smaller amount of change is applied to a second display parameter (e.g., same as the first display parameter, or different from the first display parameter) of a second representation (e.g., same as the first representation, or different from the first representation) of the first user, in accordance with a determination that the second representation of the first user has a lighter tone, a greater luminance, a smoother texture, and/or less translucency, as compared to another representation of the first user that has a darker tone, a lower luminance, a rougher texture, and/or more translucency. In some embodiments, a smaller amount of change is applied to a respective display parameter of the representations of the first user in order to keep the representations sufficiently visible while still reflecting the changes in the ambient lighting and/or the viewing angle of the second user, in accordance with some embodiments.

In some embodiments, the representation 7006 of the first user 7202 is a graphical depiction of a portion of the body of the first user (e.g., an avatar, an animated or static two-dimensional model, an animated or static three-dimensional model, and/or a stylized rendition of a face, upper body, or whole body of the first user that is in a position to view content presented via the first display generation component 7100). More details of the representation 7006 of the first user 7202 is provided with respect to FIGS. 7A-7T and 7AC-7AQ and FIGS. 8-11 and 13. In some embodiments, although the representation 7006 of the first user 7202 is displayed via the second display generation component 7102 while the first user is viewing CGR content via the first display generation component in the examples shown in FIGS. 7U-7AB2, the techniques described with respect to FIGS. 7U-7AB2 are optionally used when a representation of a user is displayed via a display generation component to a viewer of the content displayed via the display generation component, without requiring the user to be viewing content via a different display generation component or seeing a representation of the viewer via the different display generation component.

In some embodiments, when the filter 7402 is applied to the representation 7006 of the first user 7202 and the amount of changes applied to a respective display parameter of the representation 7006 of the first user 7202 through the use of the filter 7402 are adjusted in accordance with the amount of changes occurring in the ambient lighting relative to a default ambient lighting, and/or in accordance with the amount of changes in the viewing angle of the second user 7204 relative to the preferred viewing angle or range, the display parameters of the other graphical elements that indicate the status associated with the first user 7202 are, optionally, unaltered by the filter 7402, optionally remains independent of the changes applied to the representation 7006 of the first user 7202, or, are optionally visually enhanced or visually deemphasized relative to their original appearance. More details related to the graphical elements that indicate the status associated with the first user, the level of immersion, and the representation of the first user can be found in FIGS. 7A-7T and 7AC-7AQ and associated descriptions, as well as FIGS. 8-13 and associated descriptions.

FIGS. 7AC1-7AQ illustrate a computer system that changes respective value of one or more display parameters of an object other than a viewing perspective of the object, in response to detecting one or more movements that change the viewing angle of a viewer relative to the object, in accordance with some embodiments. In some embodiments, the object is a representation 7006 of the first user 7202 as described with respect to FIGS. 7A-7AB2. In some embodiments, the object includes one or more graphical elements that indicate a status associated with the first user 7202 as described with respect to FIGS. 7A-7AB2. In some embodiments, the object is a representative of a three-dimensional object, a two-dimensional object, a user interface object, and/or other types of object that is displayed to an external viewer via a display generation component. In FIGS. 7AC1-7AQ, the object 7404 is represented by a cube that has six different faces and that can be viewed with different viewing perspectives (e.g., labeled as view 7404-1, view 7404-2, view 7404-3, and so on) depending on the viewing angles of the external viewer 7406 (e.g., viewer A, labeled as 7406-1; viewer B labeled as 7406-2; and viewer C, labeled as 7406-3), in accordance with some embodiments. A person skilled in the art would appreciate that the object 7404 may have a different appearance and/or shape from the cube shown in FIGS. 7AC1-7AO in actual embodiments. Furthermore, in some embodiments, the computer system optionally displays different objects concurrently in the same scene using the display generation component, and the different objects optionally have different behaviors, analogous behaviors, and/or the same behaviors as those described with the object 7404 in FIGS. 7AC1-7AO.

FIG. 7AC1 and FIG. 7AC2 illustrate a display generation component 7408 that is configured to displays an object to a viewer that is facing toward the display side of the display generation component 7408, from a respective viewing angle relative to the display side of the display generation component 7408. As an illustrative example, the display generation component 7408 described with respect to FIGS. 7AC1-7AQ corresponds to the second display generation component 7102 and includes some or all of the features described with respect to the second display generation component 7102 in FIGS. 7A-7AB2, and FIGS. 8-12 in accordance with some embodiments. In some embodiments, the display generation component 7102 described with respect to FIGS. 7AC1-7AQ includes display assembly 3-108, optionally including a lenticular lens panel or array 3-110 shown in FIG. 1G, which serves as an outward-facing display of an HMD (e.g., HMD 1-100, HMD 7100a, or another HMD). In some embodiments, the display generation component 7408 described with respect to FIGS. 7AC1-7AQ (optionally, excluding FIGS. 7AC2, 7AM2, and 7AP2 that shows the display generation component 7408 as an outward-facing display of an HMD) is a type of display that does not share the same features as the second display generation component 7102 described with respect to FIGS. 7A-7AB2 and FIGS. 8-12. For example, in some embodiments, the display generation component 7408 includes an HMD that does not include an inward-facing display. In some embodiments, the display generation component is a heads-up display, a standalone display, a projector, and/or other types of displays that are not HMDs. In some embodiments, some or all of the features of the display generation component 7408 described with respect to FIGS. 7AC1-7AQ and FIG. 13 are also implemented for the second display generation component 7102 and/or the first display generation component 7100 described with respect to FIGS. 7A-7AB2 and FIGS. 8-12.

In some embodiments, the display generation component 7408 described with respect to FIGS. 7AC1-7AQ is an outward facing display of an IMD (e.g., display assembly 3-108, optionally including a lenticular lens panel or array 3-110 shown in FIG. 1G, which serves as an outward-facing display of an HMD (e.g., HMD 1-100, HMD 7100a, or another IMD). In some embodiments, the display generation component 7408 described with respect to FIGS. 7AC1-7AQ is a standalone display that is not associated with another display generation component and is not part of an HMD. In some embodiments, the display generation component 7408 described with respect to FIGS. 7AC1-7AQ is a display that is a heads-up display that displays content for viewing by multiple viewers. In some embodiments, the display generation component 7408 described with respect to FIGS. 7AC1-7AQ displays objects with different simulated depths relative to the surface of the display generation component 7408. In some embodiments, the display generation component 7408 described with respect to FIGS. 7AC1-7AQ includes multiple sub-components (e.g., sub-components a1-a5, b1-b5, c1-c5, and additional sub-components) that are individually controlled to display respective sub-portions of an object for viewing at a respective viewing angle or angular range (e.g., a lenticular lens panel or array 3-110 shown in FIG. 1G, or another type of display that includes arrays of sub-components serving different viewing angles).

A schematic front view representation of the display generation component 7408 is shown in the upper left region of FIG. 7AC1, where the display generation component 7408 includes a plurality of sub-components that are grouped in two different ways (e.g., based on location in the latitudinal direction of the display generation component, and based on viewing angle in the latitudinal direction of the display generation component), in accordance with some embodiments.

In this illustrative example, the display generation component 7408 is shown to include fifteen sub-components, divided into five location groups (e.g., groups D−2, D−1, D0, D+1, and D+2) based on their locations relative to the center of the display region of the display generation component 7408, in accordance with some embodiments. As a person skilled in the art would appreciate, an actual implementation of the display generation component 7408 optionally includes many more groups of sub-components distributed across finely spaced locations along the latitudinal dimension of the display generation component 7408. In this illustrative example, the display generation component 7408 is a lenticular display (e.g., a lenticular lens panel or array 3-110, as described with reference to FIG. 1G, or another type of lenticular display) with elongated sub-components (e.g., sub-components a1-a5, b1-b5, and c1-c5) that are distributed at different locations in the latitudinal direction of the display generation component 7408, and that respectively extend along the longitudinal direction of the display generation component 7408.

In some embodiments, the latitudinal direction of the display generation component 7408 corresponds a horizontal or substantially horizontal direction of the display area when the display generation component 7408 is oriented in the upright orientation (e.g., with its bottom edge and top edge substantially parallel to a floor of a physical environment), and/or in an upright orientation relative to a viewer of the content shown on the display generation component (e.g., with its side edges substantially parallel to the longitudinal axis of the viewer).

In some embodiments, the longitudinal direction of the display generation component 7408 corresponds a vertical or substantially vertical direction of the second generation component 7408 (e.g., a direction that is perpendicular or substantially perpendicular to the latitudinal direction of the display generation component, a direction that is perpendicular or substantially perpendicular to the floor, and/or a direction that is parallel or substantially parallel to a center axis of a viewer).

In some embodiments, a respective group of sub-components at a respective location (e.g., a respective one of the locations occupied by the groups D−2, D−1, D0, D+1, D+2, or another location) along the latitudinal direction of the display generation component 7408 is further divided into multiple groups of sub-components that are distributed along the longitudinal direction of the second display generation component, with a respective sub-component or a respective subset of sub-components corresponding a respective pixel of the display area of the display generation component. For example, a sub-component a1 located in the group D−2 optionally is made up of multiple sub-components distributed along the longitudinal directions, in accordance with some embodiments. In some embodiments, there are fewer sub-components per unit length in the longitudinal direction as compared to the latitudinal direction, and as a result the computer system is able to provide fewer different views for viewing angles in the longitudinal direction, as compared to the viewing angles in the latitudinal direction.

In some embodiments, as shown in the schematic front view representation of the display generation component 7408 in the upper left portion of FIG. 7AC1, the sub-components of the display generation component 7408 are further divided into three groups based on the viewing angle or viewing zones of the external viewer in the latitudinal direction. For example, in a first group of the sub-components (e.g., the group including sub-components b1, b2, b3, b4, and b5, or another set of sub-components) that corresponds to a first viewing angle or viewing range (e.g., the 0 degree angle, or a preferred viewing zone that spans a first range of viewing angles in the latitudinal direction of the display generation component), the first group of sub-components respectively face toward a first direction that corresponds to the first viewing angle or viewing range in the latitudinal direction, in accordance with some embodiments. In a second group of the sub-components (e.g., the group including sub-components a1, a2, a3, a4, and a5, or another set of sub-components) that corresponds to a second viewing angle or viewing range (e.g., the 60 degree angle left of the center of the display, or a dimmed viewing zone that spans a second range of viewing angles in the latitudinal direction of the display generation component), the second group of sub-components respectively face toward a second direction that corresponds to the second viewing angle or viewing range (e.g., facing at an angle toward the left side of the display generation component, or facing another direction that corresponds to the second viewing angle or viewing range), in accordance with some embodiments. In a third group of the sub-components (e.g., the group including sub-components c1, c2, c3, c4, and c5, or another set of sub-components) that corresponds to a third viewing angle or viewing range (e.g., the 60 degree angle right of the center of the display, or a dimmed viewing zone that spans a third range of viewing angles in the latitudinal direction of the display generation component), the third group of sub-components respectively face toward a third direction that corresponds to the third viewing angle or viewing range (e.g., facing at an angle toward the right side of the display generation component, or facing another direction that corresponds to the third viewing angle or viewing range), in accordance with some embodiments.

Although only three groups of sub-components (group a1-a5, group b1-b5, and group c1-c5) corresponding to three viewing angles and/or viewing ranges are illustrated in the example shown in FIG. 7AC1, a person skilled in the art would appreciate that, in an actual implementation of the display generation component 7408, a respective group of sub-components that is located at a respective location along the latitudinal direction of the display generation component may be distributed into more than three groups corresponding to three different viewing angles or viewing ranges (e.g., are distributed into five groups, six groups, seven groups, ten groups, fifteen groups, thirty groups, or other even or odd number of groups for which different viewing perspectives can be generated by the computer system). In some embodiments, the individual sub-components corresponding to the same viewing angle or viewing range (e.g., sub-components a1, a2, a3, a4, and a5, sub-components b1, b2, b3, b4, and b5, sub-components c1, c2, c3, c4, and c5, or other sub-components that face toward the same direction) from the different location groups (e.g., groups D−2, D−1, D0, D+1, D+2, or other location groups) collectively display a respective view (e.g., view 7404-1, 7404-2, 7404-3, or another view) of the object 7404 that corresponds to the viewing angle or viewing range, such that a viewer at that viewing angle or in the viewing range can perceive the respective view of the object with an appropriate viewing perspective. For example, the sub-components a1, b1, and c1 in the location group D−2 display a left portion of the object with different perspectives that correspond to different viewing angles (e.g., view from the left, view from the front, and view from the right); the sub-components a3, b3, and c3 in the location group D0 display a central portion of the object with different perspectives that correspond to different viewing angles (e.g., view from the left, view from the front, and view from the right), and the sub-components a5, b5, and c5 in the location group D+2 display a right portion of the object with different perspectives that correspond to different viewing angles (e.g., view from the left, view from the front, and view from the right), in accordance with some embodiments.

The lower left region of FIG. 7AC1 shows a schematic top view of the display generation component 7408, in accordance with some embodiments. In this illustrative example, the groups of sub-components (e.g., location groups D−2, D−1, D0, D+1, and D+2) along the latitudinal direction of the display generation component 7408 are shown to be distributed along a curved profile of the surface of the display generation component 7408, in accordance with some embodiments. In a more specific example, as shown in lower left portion of FIG. 7AC1, the profile of the display area of the display generation component 7408 is concave, with the group of sub-components located at the center location DO at the apex of the profile (e.g., defined as a point, line, and/or region on the surface of the display generation component that is the closest to a viewer facing straight toward the center of the display), and the groups of sub-components located at locations D−1 and D+1 adjacent to the center location DO rotated away and/or pushed backward relative to the apex of the profile. In some embodiments, additional groups of sub-components located at additional locations flanking the center location DO and located farther away from the center location DO are rotated further away and/or pushed further backward relative to the apex of the profile. In some embodiments, the profile of the display area of the display generation component 7408 includes a central portion that is relatively flat, and optionally include multiple groups of sub-components corresponding to different locations in the relatively flat region of the profile; and includes additional groups of sub-components that are distributed along the curved side portions of the display area of the display generation component 7408 and rotated to face away from the central portion of the display area. For example, the display generation component 7408 has a surface profile that is similar to that of a ski goggle that wrap around the face of a wearer, where the object is displayed on the outer surface of the display generation component 7408 for viewing by a viewer other than the wearer of the display generation component 7408, in accordance with some embodiments.

In some embodiments, as shown in the schematic top view of the display generation component 7408 in FIG. 7AC1, the preferred viewing zone of the display generation component in the latitudinal direction includes a wide angular range (e.g., an angular range of 60 degrees, 90 degrees, 120 degrees, or an even greater angular range) extending from a center axis of the display area of the display generation component 7408. In some embodiments, multiple viewers located at different positions along the latitudinal direction of the display generation component 7408 are able to perceive different views of the same object that are displayed via different groups of sub-components that correspond to the different viewing angles of the different viewers.

In some embodiments, the preferred viewing zone in the latitudinal direction includes multiple groups of sub-components corresponding to different viewing angles in the viewing range of the preferred viewing zone, wherein the sub-components of a respective group of sub-components corresponding to a respective viewing angle respectively display different portions of a respective view of the object 7404 corresponding to the respective viewing angle, and collectively complete the respective view of the object 7404 corresponding to the respective viewing angle.

FIG. 7AC2 includes a schematic top view (bottom left) and a schematic side view (top left) of the display generation component 7408, in which the sub-components a1-a5, b1-b5, and c1-c5 are enclosed in a curved casing (e.g., such as that of a display assembly 1-108, front cover assembly 3-108 shown in FIGS. 1B and 1G), to show a possible form factor of the display generation component 7408, in accordance with some embodiments. The display generation component 7408 shown in FIG. 7AC2 include sensors (e.g., sensors 3-120 and other sensors) and hardware controls (e.g., buttons 1-128 and 1-132, and other controls, dials, and/or crowns) in the same housing as the sub-components a1-a5, b1-b5, and c1-c5, in accordance with some embodiments. FIG. 7AC2 also includes viewers 7406 positioned relative to the display generation component 7408, and their perceived views provided via the display generation component 7408, in accordance with some embodiments. FIG. 7AC2 in comparison to FIG. 7AC1 is illustrative of how the methods and processes described with respect to FIGS. 7AC1-7AQ can be applicable to a display generation component that is an outward-facing display of an HMD, in accordance with some embodiments, and therefore, similar Figures are not produced for some of the FIGS. 7AC1-7AQ in the interest of brevity. FIG. 7AM2 is analogous to FIG. 7AM1, and FIG. 7AP2 is analogous to FIG. 7AP1, in a manner similar to how FIG. 7AC2 is analogous and related to FIG. 7AC1.

In FIGS. 7AC1 and 7AC2, three viewers A, B, and C (e.g., labeled as viewer 7406-1, viewer 7406-2, and viewer 7406-3) are located at different viewing angles in the preferred viewing zone in the latitudinal direction of the display generation component 7408. A first group of sub-components (e.g., sub-component b1, b2, b3, b4, and b5) corresponding to a first viewing angle or viewing range, collectively displays a first view 7404-1 (e.g., a centered view, or another view) of the object 7404 (e.g., a cube, or another object) that corresponds to the first viewing angle or viewing range, where the viewer A located at the first viewing angle or in the first viewing range is able to perceive the first view 7404-2 of the object via the first group of sub-components, in accordance with some embodiments. Similarly, a second group of sub-components (e.g., sub-component a1, a2, a3, a4, and a5) corresponding to a second viewing angle or viewing range, collectively displays a second view 7404-2 (e.g., a left view, or another view) of the object 7404 (e.g., a cube, or another object) that corresponds to the second viewing angle or viewing range, where the viewer B located at the second viewing angle or in the second viewing range is able to perceive the second view 7404-2 of the object via the second group of sub-components, in accordance with some embodiments. Similarly, a third group of sub-components (e.g., sub-component c1, c2, c3, c4, and c5) corresponding to a third viewing angle or viewing range, collectively displays a third view 7404-3 (e.g., a right view, or another view) of the object 7404 (e.g., a cube, or another object) that corresponds to the third viewing angle or viewing range, where the viewer C located at the third viewing angle or in the third viewing range is able to perceive the third view 7404-3 of the object via the third group of sub-components, in accordance with some embodiments.

In the lower left portion of FIGS. 7AC1 and 7AC2, it is illustrated that there can be multiple viewing zones in the latitudinal direction relative to the display generation component 7408, including a preferred viewing zone in the center, two or more dimmed viewing zones flanking the preferred viewing zone, and a pair of off zones outside of the dimmed viewing zones, in accordance with some embodiments. In the right portion of FIG. 7AC1 and the top left portion of FIG. 7AC2, it is further illustrated in a schematic side view of the display generation component 7408, that similar to the latitudinal direction, there can be multiple viewing zones in the longitudinal direction relative to the display generation component 7408, as well, in accordance with some embodiments. In some embodiments, there is a preferred viewing zone in the center, two or more dimmed viewing zones flanking the preferred viewing zone, and a pair of off zones outside of the dimmed viewing zones in the longitudinal direction.

In this illustrative example, the sub-components (e.g., sub-components a1, b1, c1, a2, b2, c2, . . . , a5, b5, and c5) of the display generation component 7408 are shown to be on respective planes that are substantially parallel to the longitudinal direction of the display generation component, or have longitudinal axes that are substantially parallel to the longitudinal direction of the display generation component. In some embodiments, a respective elongated sub-component (e.g., sub-component a1, sub-component b1, sub-component c1, or another sub-component) occupies an entirely length of the display area in the longitudinal direction, and the respective elongated sub-component is responsible for displaying a respective sub-portion of a respective view of the object 7404 that corresponds to a respective latitudinal viewing angle, and that corresponds to one of several possible longitudinal viewing angles depending on the longitudinal viewing angle that is currently occupied by a viewer.

In some embodiments, as shown in the schematic side view of the display generation component 7404 in the right portion of FIG. 7AC1 and the top portion of FIG. 7AC2, the preferred viewing zone of the display generation component 7408 in the longitudinal direction includes a narrower angular range (e.g., an angular range of 20 degrees, 30 degrees, 50 degrees, 60 degrees, or a greater angular range) centered around the center plane intersecting the display area of the display generation component 7408. In some embodiments, multiple viewers (e.g., viewer A, viewer B, viewer C, or another viewer) located at different positions along the longitudinal direction of the display generation component 7408 are able to perceive different views of the same object (e.g., view 7404-1, view 7404-2, view 7404-3, or another view of the object 7404) that are displayed via different groups of sub-components that correspond to the different latitudinal viewing angles (e.g., group b1-b5, group a1-a5, group c1-c5, or another group of sub-components that correspond to a respective viewing angle or viewing range in the latitudinal direction), if the multiple users are also located at different latitudinal positions.

However, in some embodiments, different viewers concurrently located at different longitudinal viewing angles but at the same latitudinal viewing angle would not perceive different views of the object from the same group of sub-components that corresponds to the latitudinal viewing angle. In some embodiments, the computer system choses to display a respective view of the object 7404 that corresponds to the latitudinal viewing angle shared by the multiple viewers, and that corresponds to the longitudinal viewing angle of one of the multiple viewers (e.g., the viewer in a preferred viewing zone, the viewer in the dimmed viewing zone, the viewer that share the same longitudinal viewing angle or viewing zone with the most number of other viewers, or a viewer chosen according to another set of criteria).

In some embodiments, the preferred viewing zone and the dimmed viewing zones in the longitudinal direction for a respective latitudinal viewing angle are supported by the same group of sub-components corresponding to the respective latitudinal viewing angle.

For example, in some embodiments, the view 7404-1 of the object 7404 perceived by the viewer A is provided via the first group of sub-components (e.g., sub-components b1, b2, b3, b4, and b5, or another group of sub-components) that corresponds to the latitudinal viewing angle of viewer A, even as viewer A moves up and down along the longitudinal direction of the display generation component 7408. In some embodiments, the computer system adjusts the respective view of the object 7404 displayed via the first group of sub-components (e.g., sub-components b1, b2, b3, b4, and b5, or another group of sub-components) such that the respective view of the object 7404 has an appropriate perspective for both the latitudinal viewing angle and the longitudinal viewing angle of the viewer A.

Similarly, in some embodiments, the view 7404-2 of the object 7404 perceived by the viewer B is provided via the second group of sub-components (e.g., sub-components a1, a2, a3, a4, and a5, or another group of sub-components) that corresponds to the latitudinal viewing angle of viewer B, even as viewer B moves up and down along the longitudinal direction of the display generation component 7408. In some embodiments, the computer system adjusts the respective view of the object 7404 displayed via the second group of sub-components (e.g., sub-components a1, a2, a3, a4, and a5, or another group of sub-components) such that the respective view has an appropriate perspective for both the latitudinal viewing angle and the longitudinal viewing angle of the viewer B.

Similarly, in some embodiments, the respective view 7404-3 of the object 7404 perceived by the viewer C is provided via the third group of sub-components (e.g., sub-components c1, c2, c3, c4, and c5, or another group of sub-components) that corresponds to the latitudinal viewing angle of viewer C, even as viewer C moves up and down along the longitudinal direction of the display generation component 7408. In some embodiments, the computer system adjusts the respective view of the object displayed via the third group of sub-components (e.g., sub-components c1, c2, c3, c4, and c5, or another group of sub-components) such that the respective view has an appropriate perspective for both the latitudinal viewing angle and the longitudinal viewing angle of the viewer C.

In the particular example scenario shown in FIGS. 7AC1 and 7AC2, the viewers A, B, and C are concurrently present in front of the display generation component 7408, at different latitudinal viewing angles and different longitudinal viewing angles. The viewing angles of viewers A, B, and C are all located within the preferred viewing zone in the latitudinal direction and the preferred viewing zone in the longitudinal direction, in FIGS. 7AC1 and 7AC2. In some embodiments, different views of the object 7404 are presented to the viewers A, B, and C, based on their respective latitudinal viewing angles and longitudinal viewing angles, without introducing a difference the visual prominence of the object based on the difference in the viewing angles of the different viewers in the latitudinal direction and/or the longitudinal direction.

FIGS. 7AD-7AG illustrate an example scenario in which a respective viewer (e.g., viewer A 7406-1, or another viewer) moves in the latitudinal direction relative to the display generation component 7408, and as a result causing the computer system to display different views of the object 7404 (e.g., view 7404-1, view 7404-3, view 7404-4, view 7404-5, or another view of the object 7404) that correspond to the different latitudinal viewing angles of the respective viewer during the movement of the respective viewer, e.g., using different groups of the sub-components that correspond to the different latitudinal viewing angles of the respective viewer (e.g., a group of sub-components b1-b5, a group of sub-components c1-c5, or another group of sub-components), in accordance with some embodiments.

In FIG. 7AD, the respective viewer (e.g., viewer A 7406-1, or another viewer) is located at a position that corresponds to a first latitudinal viewing angle in the preferred viewing zone in the latitudinal direction, and that corresponds to a first longitudinal viewing angle in the preferred viewing zone in the longitudinal direction, in accordance with some embodiments. A first view 7404-1 of the object 7404 is displayed via a first group of sub-components corresponding to the first latitudinal viewing angle (e.g., the sub-components b1, b2, b3, b4, and b5, or another first group of sub-components), where the first view 7404-1 of the object 7404 has a viewing perspective that corresponds to the first latitudinal viewing angle and the first longitudinal viewing angle of the viewer A. In FIG. 7AD, only the group of sub-components that corresponds to the viewing angle of the viewer A is shown in the schematic front view of the display generation component 7408, and the other sub-components of the display generation component 7408 are omitted from the schematic front view of the display generation component 7408 in FIG. 7AD, in the interest of improving visual clarity of FIG. 7AD.

In FIG. 7AD, the first view 7404-1 of the object 7404 is displayed with a first level of visual prominence that corresponds to the preferred viewing zones (e.g., without dimming, and/or other reduction of visual prominence based on less preferred viewing angles; and/or shown with a respective amount of dimming and/or other adjustments of display parameter(s) selected based on the characteristics of the ambient lighting (e.g., as described with respect to FIGS. 7U-7AB2 and FIG. 11)).

In some embodiments, in the scenarios shown in FIGS. 7AD, in accordance with a determination that the latitudinal viewing angles that correspond to one or more other groups of sub-components (e.g., the group of sub-components a1-a5, the group of sub-components c1-c5, and/or other groups of sub-components that correspond to latitudinal viewing angles that are not currently occupied by a viewer) are not currently occupied by a viewer, the computer system optionally turns off, reduces the power of, and/or dims the one or more other groups of sub-components, and/or reduces the visual prominence of the content (e.g., ceases to display, dims, makes more translucent, and/or reduces the visual prominence of the content (e.g., including the object 7404, and/or some or all of other content)) shown via the one or more other groups of sub-components.

In FIG. 7AE following FIG. 7AD, the respective viewer (e.g., viewer A 7406-1, or another viewer) has moved to a new location that corresponds to a second latitudinal viewing angle in the preferred viewing zone in the latitudinal direction, and that still corresponds to the first longitudinal viewing angle in the preferred viewing zone in the longitudinal direction (e.g., the viewer moved in the latitudinal direction but did not move in the longitudinal direction). A second view 7404-3 of the object 7404 is displayed via a second group of sub-components corresponding to the second latitudinal viewing angle (e.g., the sub-components c1, c2, c3, c4, and c5, or another second group of sub-components different from the first group of sub-components), where the second view 7404-3 of the object 7404 has a viewing perspective that corresponds to the second latitudinal viewing angle and the first longitudinal viewing angle, in accordance with some embodiments.

In FIG. 7AE, the visual prominence of the second view 7404-3 of the object is stilled displayed with the first level of visual prominence that corresponds to the preferred viewing zones (e.g., without dimming, and/or other reduction of visual prominence based on less preferred viewing angles; and/or shown with the respective amount of dimming and/or other adjustments of display parameter(s) selected based on the characteristics of the ambient lighting), as it was done in the first view 7404-1 in FIG. 7AD.

In some embodiments, in the scenario shown in FIG. 7AE, in accordance with a determination that the latitudinal viewing angles that correspond to one or more other groups of sub-components (e.g., the group of sub-components a1-a5, the group of sub-components b1-b5, and/or other groups of sub-components that correspond to latitudinal viewing angles that are not currently occupied by a viewer) are not currently occupied by a viewer, the computer system optionally turns off, reduces the power of, and/or dims the one or more other groups of sub-components, and/or reduces the visual prominence of the content (e.g., ceases to display, dims, makes more translucent, and/or reduces the visual prominence of the content (e.g., including the object 7404, and/or some or all of other content)) shown via the one or more other groups of sub-components.

In FIG. 7AF, following FIG. 7AE or directly following FIG. 7AD, the respective viewer (e.g., viewer A 7406-1, or another viewer) has moved to another location that corresponds to a third latitudinal viewing angle in the dimmed viewing zone in the latitudinal direction, and that still corresponds to the first longitudinal viewing angle in the preferred viewing zone in the longitudinal direction (e.g., the respective viewer moved in the latitudinal direction but did not move in the longitudinal direction). A third view 7404-4 of the object 7404 is displayed via a third group of sub-components corresponding to the third latitudinal viewing angle (e.g., the sub-components c1, c2, c3, c4, and c5, or another third group of sub-components different from the first and second groups of sub-components), where the third view 7404-4 of the object 7404 has a viewing perspective that corresponds to the third latitudinal viewing angle and the first longitudinal viewing angle.

In FIG. 7AF, the same group of sub-components c1-c5 are used to generated the third view 7404-4 of the object 7404, as that used to generate the second view 7404-3 of the object 7404 in FIG. 7AE, in accordance with some embodiments. As a person skilled in the art can appreciate, FIGS. 7AE and 7AF are merely illustrative, an actual implementation of a display generation component 7408 may include many more groups of sub-components corresponding to different latitudinal viewing angles, and the third view 7404-4 of the object 7404 that corresponds to the third latitudinal viewing angle shown in FIG. 7AF are optionally provided using a different group of sub-components than those used to provide the second view 7404-3 of the object 7404 in FIG. 7AE, in accordance with some embodiments. In some embodiments, however, it is also possible to use the same group of sub-components to provide respective views that correspond to a range of latitudinal viewing angles (e.g., different viewing angles in the same viewing zone, and/or different viewing angles across two or more adjacent viewing zones). For example, in FIGS. 7AE and 7AF, viewer A 7406-1 is the only viewer in front of the display generation component 7408, and the computer system optionally utilizes the same group of sub-components to generate the different views of the object 7404 that corresponds to the changing latitudinal viewing angle of viewer A, as viewer A moved from the position in the preferred viewing zone to the new position in the dimmed viewing zone, in accordance with some embodiments.

In FIG. 7AF, the third view 7404-4 of the object 7404 is displayed with a second level of visual prominence that corresponds to the dimmed viewing zone (e.g., with dimming, and/or other reduction of visual prominence based on the less preferred viewing angles; and/or shown with an increased amount of dimming and/or other adjustments of display parameter(s) as compared to the amount of dimming and/or other adjustment of display parameter(s) selected based on the characteristics of the ambient lighting alone), that is lower than the first level of visual prominence shown in FIGS. 7AD and 7AE.

In some embodiments, in the scenario shown in FIG. 7AF, even though the viewer A 7406-1 is still in the preferred viewing zone in the longitudinal direction, the view of the object 7404 that is displayed for the latitudinal viewing angle of the viewer A is reduced in visual prominence in accordance with a determination that the latitudinal viewing angle of the viewer A is now in the angular range of the dimmed viewing zone in the latitudinal direction.

In some embodiments, as the viewer A 7404-1 continues to move further away from the preferred viewing zone in the dimmed viewing zone in the latitudinal direction, the computer system increases the amount of dimming and/or other reduction of visual prominence of the view of the object 7404 displayed for the current latitudinal viewing angle of the viewer A.

In some embodiments, as the viewing angle continues to change in the latitudinal direction, the same group of sub-components (e.g., sub-components c1-c5, or another group of sub-components) may be used to show a different viewing perspectives of the object 7404 that correspond to the changing latitudinal viewing angle of the viewer A. In some embodiments, as the viewing angle continues to change in the latitudinal direction, a different group of sub-components may be used to show the different viewing perspectives of the object 7404 that correspond to the changing latitudinal viewing angle of the viewer A.

In FIG. 7AG, following FIG. 7AF, or directly following FIG. 7AD or FIG. 7E, the respective viewer (e.g., viewer A 7406-1, or another viewer) has moved to another location that corresponds to a fourth latitudinal viewing angle in the off zone in the latitudinal direction (e.g., the right off zone, or another off zone), and that still corresponds to the first longitudinal viewing angle in the preferred viewing zone in the longitudinal direction (e.g., the viewer moved in the latitudinal direction but did not move in the longitudinal direction), in accordance with some embodiments. Because the respective viewer has entered the off zone in the latitudinal direction (e.g., the zone or viewing angles that faces toward the peripheral region of the display area of the display generation component), the computer system does not display a view of the object 7404 (e.g., shown as the off-view 7404-5 of the object 7404 in FIG. 7AG) to the respective viewer, even though the respective viewer is still within the preferred viewing zone in the longitudinal direction of the display generation component 7408. In some embodiments, the computer system turns off the sub-components (e.g., sub-components c1-c5, sub-components b1-b5, or another group of sub-components) that previously provided a view of the object to the respective viewer immediately before the respective viewer moved into the off zone in the latitudinal direction. In some embodiments, the computer system optionally turns off the sub-components corresponding viewing angles that are not occupied by a viewer. In some embodiments, the computer system does not turn off the sub-components, and merely cease to display a view of the object (and optionally maintains display of some or all of other content) if the sub-components correspond to viewing angles that are not occupied by a viewer. In FIG. 7AG, as the viewer A continues to move rightward in the latitudinal direction in the off zone, the computer system maintains the sub-components in the off state and continues to forgo displaying a view of the object 7404 (and optionally maintains display of some or all of other content on these sub-components).

Although FIGS. 7AD-7AG show the movement of the respective viewer (e.g., viewer A 7406-1, or another viewer) in a respective direction that causes the respective viewer to move from the preferred viewing zone to the dimmed viewing zone, and then to the off zone in the latitudinal direction, a movement in the reverse direction is also possible, and causes the computer system to increase the visual prominence of the view of the object 7404 as the respective viewer moves from the off zone to the dimmed viewing zone, and then into the preferred viewing zone in the latitudinal direction. In some embodiments, the computer system updates the view of the object 7404 as the current latitudinal viewing angle is changed, optionally using the same group of sub-components that correspond to a range of viewing angles in the latitudinal direction, or using different groups of sub-components that correspond to different viewing angles and/or ranges of viewing angles in the latitudinal direction.

In some embodiments, the change in visual prominence for the object 6404 in accordance with the changing viewing angle of the respective viewer as described above with respect to FIGS. 7AC1-7AG applies to some graphical elements and not for all of the graphical elements displayed via the display generation component 7408. For example, in some embodiments, the change in visual prominence is applied to graphical elements displayed in a first display layer and not applied to graphical elements in a different display layer. In some embodiments, the display generation component 7408 is the outward facing display generation component of an HMD, and the change in visual prominence is applied to the representation of a portion of the body of the user wearing the HMD, and not applied to other graphical elements that indicate the status associated with the user wearing the HMD (e.g., the overlay 7008, the progress bar 7004, and/or other graphical elements displayed via the outward facing display generation component of the HMD).

FIG. 7AH, following FIG. 7AD, 7AE, or 7AF, illustrate that, instead of and/or in addition to the proactive movement of the respective viewer (e.g., viewer A 7404-1, or another viewer) relative to the display generation component 7408 and the physical environment, proactive movement of the display generation component 7408 relative to the respective viewer and the physical environment also causes the viewing angle of the respective viewer to change, in accordance with some embodiments.

In some embodiments, in accordance with a determination that the position of the respective viewer (e.g., viewer A 7404-1, or another viewer) has changed from being in the preferred viewing zone in the latitudinal direction (e.g., as shown in FIG. 7AD or FIG. 7AE) to bring in the dimmed viewing zone in the latitudinal direction (e.g., as shown in FIG. 7AH) (e.g., due to the movement of the display generation component 7408, or relative movement of the display generation component 7408 and the respective viewer), the computer system changes the view of the object 7404 displayed to the respective viewer (optionally, using a different group of sub-components, or using the same group of sub-components), and also decrease the visual prominence of the view of the object 7404, based on the change in the viewing angle of the respective viewer in the latitudinal direction.

In some embodiments, in accordance with a determination that the position of the respective viewer has changed from being in the off zone in the latitudinal direction (e.g., as shown in FIG. 7AG) to being in the dimmed viewing zone in the latitudinal direction (e.g., as shown in FIG. 7AH), the computer system optionally turns on sub-components that correspond to the current viewing angle of the respective viewer in the dimmed viewing zone (e.g., if they were previously turned off), and displays a view 7404-6 of the object 7404 with a level of visual prominence that is selected based on the current viewing angle of the respective viewer in the latitudinal direction, and optionally based on the ambient lighting.

FIG. 7AI, following FIG. 7AD, illustrates that, instead of and/or in addition to moving relative to the display generation component 7408 in the latitudinal direction, the respective viewer (e.g., viewer A 7406-1, or another viewer) can also move relative to the display generation component 7408 in the longitudinal direction and causing the viewing angle of the respective viewer to change in the longitudinal direction, in accordance with some embodiments.

In FIG. 7AI, in accordance with a determination that the respective viewer (e.g., viewer A 7406-1, or another viewer) has moved from a position in the preferred viewing zone in the longitudinal direction (e.g., as shown in FIG. 7AD) into the dimmed viewing zone in the longitudinal direction (e.g., as shown in FIG. 7AI), the computer system changes the view of the object displayed to the respective viewer (e.g., from the view 7404-1 in FIG. 7AD to the view 7404-7 in FIG. 7AI) (e.g., using the same group of sub-components b1-b5, or using a different group of sub-components that correspond to the current viewing angle of the respective viewer in the longitudinal direction), and also decrease the visual prominence of the view of the object 7404 (e.g., the view 7404-7 in FIG. 7AI has a reduced level of visual prominence as compared to the view 7404-1 in FIG. 7AD), based on the change in the viewing angle of the respective viewer in the longitudinal direction.

In some embodiments, in accordance with a determination that the respective viewer (e.g., viewer A 7406-1, or another viewer) has moved further upward in the longitudinal direction and moved into the off zone in the longitudinal direction, the computer system ceases to display a view of the object (or displays an off-view 7404-5 of the object shown in FIG. 7AG), and optionally turns off the group of sub-components that were displaying a view of the object 7404 while the respective viewer was still in the dimmed viewing zone in the longitudinal direction. In some embodiments, the computer system does not display a view of the object to the respective viewer in the off zone in the longitudinal direction, even if the respective viewer is still in the preferred viewing zone in the latitudinal direction. In some embodiments, the computer system optionally continues to display one or more other graphical elements with normal visual prominence, or with reduced but visible level of visual prominence, to the viewer(s) in the off zones in the longitudinal direction and/or the latitudinal direction of the display generation component 7408.

FIG. 7AJ following FIG. 7AD or FIG. 7AI illustrates that, instead of and/or in addition to the proactive movement of the respective viewer (e.g., viewer A 7406-1, or another viewer) relative to the display generation component 7408 and the physical environment, proactive movement of the display generation component 7408 relative to the respective viewer and the physical environment also causes the viewing angle of the respective viewer to change, in accordance with some embodiments.

In some embodiments, in accordance with a determination that the position of the respective viewer has changed from being in the preferred viewing zone in the longitudinal direction (e.g., as shown in FIG. 7AD) to being in the dimmed viewing zone in the longitudinal direction (e.g., as shown in FIG. 7AJ), the computer system changes the view of the object 7404 displayed to the respective viewer (optionally, using a different group of sub-components, or using the same group of sub-components), and also decreases the visual prominence of the view of the object 7404, based on the change in the viewing angle of the respective viewer in the longitudinal direction.

In some embodiments, in accordance with a determination that the position of the respective viewer has changed from a higher position in the upper dimmed viewing zone in the longitudinal direction (e.g., as shown in FIG. 7AI) to a lower position in the upper dimmed viewing zone in the longitudinal direction (e.g., as shown in FIG. 7AJ) (e.g., due to the movement of the respective viewer and/or due to the movement of the display generation component 7408 in the physical environment), the computer system optionally reduces the amount of reduction in visual prominence that has been made previously to the view of the object 7404 (e.g., the level of reduction made to the view 7404-8 in FIG. 7AJ is less than the level of reduction made to the view 7404-7 shown in FIG. 7I, but is greater than the level of reduction, if any, made to the view 7404-1 shown in FIG. 7AD.

FIG. 7AK, following FIG. 7AJ, illustrates that, the respective viewer (e.g., viewer A 7406-1, or another viewer) has moved further away from the preferred viewing zone and higher in the upper dimmed viewing zone in the longitudinal direction; and as a result, the computer system changes the view of the object 7404 displayed to the respective viewer (e.g., using the same group of sub-components b1-b5, or using a different group of sub-components that correspond to the current viewing angle of the respective viewer in the longitudinal direction), and further decreases the level of visual prominence of the view of the object 7404, based on the change in the viewing angle of the respective viewer in the longitudinal direction.

FIG. 7AL, following FIG. 7AK, illustrates that, the respective viewer (e.g., viewer A 7406-1, or another viewer) has moved further away from the preferred viewing zone and into the upper off zone in the longitudinal direction; and as a result, the computer cease to display a view of the object 7404 to the respective viewer (or displays an off-view 7404-10, or the off-view 7404-5 in FIG. 7AG) and optionally, turns off the sub-components that previously displayed the view of the object 7404 to the respective user in the upper dimmed viewing zone (e.g., the group of sub-components b1-b5, or another group of sub-components), even though the respective viewer is still in the preferred viewing zone or the dimmed viewing zone in the latitudinal direction.

In some embodiments, in accordance with a determination that the respective viewer has changed from being in the off zone in the longitudinal direction (e.g., as shown in FIG. 7AL) to being in the dimmed viewing zone in the longitudinal direction (e.g., as shown in FIG. 7AK) (e.g., due to the movement of the display generation component 7408 and/or the movement of the respective viewer in the physical environment), the computer system turns on sub-components that correspond to the current viewing angle of the viewer (if they had been turned off), and displays the view of the object 7404 with a level of visual prominence that is selected based on the current viewing angle of the respective viewer in the latitudinal direction, and optionally based on the ambient lighting.

In some embodiments, in accordance with a determination that the respective viewer has changed from being in the dimmed viewing zone in the longitudinal direction (e.g., as shown in FIG. 7AK) back into the preferred viewing zone in the longitudinal direction (e.g., as shown in FIG. 7AD), the computer system displays the view of the object 7404 with a level of visual prominence that is selected based the ambient lighting, without a reduction of visual prominence due to the viewing angle of the respective viewer in the longitudinal direction.

In some embodiments, the change in visual prominence for the object 7404 in accordance with the changing viewing angle of the respective viewer as described above with respect to FIGS. 7AC1-7AL apply to some graphical elements but not for all of the graphical elements displayed via the display generation component 7408. For example, in some embodiments, the change in visual prominence is applied to graphical elements displayed in a first display layer and not applied to graphical elements displayed in a different display layer of the display generation component 7408. In some embodiments, the display generation component 7408 is the outward facing display generation component of an HMD, and the change in visual prominence described herein is applied to the representation of a portion of the body of the user wearing the HMD, and not applied to other graphical elements that indicate the status associated with the user wearing the UND (e.g., the overlay 7006, the progress bar 7004, and/or other graphical elements displayed by the display generation component).

FIGS. 7AM1-7AQ illustrate a few example scenarios where there are multiple viewers 7406 in front of the display generation component 7408, and how their movement(s) relative to the display generation component 7408 (and/or analogously, how movement(s) of the display generation component 7408 relative to the respective viewers 7406) impact the view(s) of the object 7404 that are displayed to respective viewers at their respective viewing angles, e.g., in terms of the viewing perspective of the object 7404 and the level of visual prominence of the object 7404 in the respective views, in accordance with some embodiments. It is to be noted that, some of the example scenarios are compatible with each other, and may take effect together in some situations where the conditions for multiple of these example are met; while some of the example scenarios are alternatives of one another and do not take effect together in some situations where the conditions for multiple of these example are met, in accordance with various embodiments.

FIGS. 7AM1 and 7AM2 illustrate an example scenarios where three viewers (e.g., viewer A 7406-1, viewer B 7406-2, and viewer C 7406-3, or other viewers) are present in front of the display generation component 7408, where the three viewers are located at different viewing angles in the preferred viewing zone in the latitudinal direction, but are located in different viewing zones in the longitudinal direction. In this example, viewer A is in the preferred viewing zone in both the longitudinal direction and the latitudinal direction; viewer B is to the left of viewer A in the preferred viewing zone in the latitudinal direction, and in the higher dimmed viewing zone in the longitudinal direction; and viewer C is to the right of viewer A in the preferred viewing zone in the latitudinal direction, and in the lower dimmed viewing zone in the longitudinal direction. Based on the respective viewing angles of the different viewers, the computer system displays different views of the object 7404 and optionally reduces the level of visual prominence of some of the view(s) based on the respective viewing angles of the different viewers, in accordance with some embodiments.

Specifically, as shown in FIGS. 7AM1 and 7AM2, the computer system displays a first view 7404-1 of the object 7404 that corresponds to the viewing angles of the viewer A in the latitudinal direction and in the longitudinal direction (e.g., using the group of sub-components b1-b5, or another group of sub-components that correspond to the latitudinal viewing angle of the viewer A), in accordance with some embodiments. Since the viewing angles of the viewer A are in the preferred viewing zones in both the latitudinal direction and the longitudinal direction, the computer system displays the view 7404-1 of the object 7404 with the standard level of visual prominence, and without a reduction in visual prominence based on the viewing angles of the viewer A, in accordance with some embodiments.

Furthermore, as shown in FIG. 7AM1 and FIG. 7AM2, the computer system displays a second view 7404-11 of the object 7404 that corresponds to the viewing angles of the viewer B 7406-2 in the latitudinal direction and in the longitudinal direction (e.g., using the group of sub-components a1-a5, or another group of sub-components that correspond to the latitudinal viewing angle of the viewer B), in accordance with some embodiments. Since the viewing angle of the viewer B in the longitudinal direction is in the dimmed viewing zone in the longitudinal direction, the computer system reduces the visual prominence of the object 7404 in the view 7404-11 of the object 7404 that is displayed to the viewer B (e.g., using the group of sub-components a1-a5, or another group of sub-components that correspond to the latitudinal viewing angle of the viewer B). In some embodiments, the computer system optionally does not reduce the visual prominence of other graphical elements displayed via the display generation component 7408 (e.g., via the group of sub-components a1-a5, or another group of sub-components that correspond to the latitudinal viewing angle of the viewer B), or reduce their visual prominence by a greater or lesser amount.

As shown in FIGS. 7AM1 and 7AM2, the computer system displays a third view 7404-4 of the object 7404 that corresponds to the viewing angles of the viewer C 7406-3 in the latitudinal direction and in the longitudinal direction (e.g., using the group of sub-components c1-c5, or another group of sub-components that correspond to the latitudinal viewing angle of the viewer C), in accordance with some embodiments. Since the viewing angle of the viewer C in the longitudinal direction is in the dimmed viewing zone in the longitudinal direction, the computer system reduces the visual prominence of the object 7404 in the view 7404-4 of the object 7404 that is displayed to the viewer C (e.g., using the group of sub-components c1-c5, or another group of sub-components that corresponds to the latitudinal viewing angle of the viewer C). In some embodiments, the computer system optionally does not reduce the visual prominence of other graphical elements displayed via the display generation component 7408 (e.g., via the group of sub-components c1-c5, or another group of sub-components that correspond to the latitudinal viewing angle of the viewer C), or reduce their visual prominence by a greater or lesser amount.

In some embodiments, since the viewer B is further away from the preferred viewing zone in the longitudinal direction, as compared to the viewer C (e.g., as indicated by the respective eye levels of the viewer B and viewer C relative to the display generation component 7408 in the longitudinal direction), the computer system applies a greater amount of reduction to the visual prominence of the object in the view 7404-11 displayed to the viewer B (as compared to the view 7404-4 displayed to the viewer C), relative to the default or standard level of visual prominence chosen based on factors other than the viewing angle(s) of the viewer (e.g., the level of visual prominence chosen based on the ambient lighting, the level of immersion with which content is displayed on the other side of the display generation component, and/or the visual characteristics of the object 7404).

In FIGS. 7AM1-7AQ, although three viewers are shown to be concurrently present in front of the display generation component 7408, it is possible that one of the viewers is not present in some scenarios, and it is also possible that more viewers are concurrently present in front of the display generation component 7408 in some scenarios.

FIG. 7AN following FIG. 7AM1 (or FIG. 7AM2) illustrates that, one of the viewers has moved (e.g., relative to the display generation component 7408 and the other viewers) in the physical environment, and as a result, impacting the view of the object 7404 that is displayed to the viewer that has moved and the view of the object 7404 that is displayed to a viewer that has not moved, in accordance with some embodiments.

FIG. 7AN is also illustrative of an embodiment where if two viewers are seeing the object 7404 from the same or substantially the same latitudinal angle (e.g., latitudinal angles that are served by the same group of sub-components) and one of the two viewers is outside of the preferred viewing zone in the longitudinal direction while the other viewer is within the preferred viewing zone in the longitudinal direction, the level of visual prominence of the object 7404 is reduced in the view provided to both viewers at the shared latitudinal viewing angle to a level that corresponds to the dimmed viewing zone in the longitudinal direction.

For example, as shown in FIG. 7AN following FIG. 7AM1 (or FIG. 7AM2), the viewer B has moved to a latitudinal position that is substantially the same as that of the viewer A, while viewer B and viewer A remain in their respective viewing zones in the longitudinal direction (e.g., with viewer B remaining in the upper dimmed viewing zone, and viewer A remaining in the preferred viewing zone in the longitudinal direction). An example scenario in which this can occur is when viewer B is in a standing position and viewer A is in a sitting position, and viewer B has moved to a position behind viewer A and looking toward the display generation component 7404 over the head or shoulder of viewer A. As shown in FIG. 7AN, in response to detecting that the viewer B who is in a dimmed viewing zone in the longitudinal direction has moved to the same or substantially the same viewing angle as viewer A who is in a preferred viewing zone in the longitudinal direction and seeing an undimmed view of the object at the current viewing angle of viewer A (e.g., the view 7404-1 shown in FIG. 7AM1 and FIG. 7AM2), the computer system reduces the visual prominence of the view of the object 7404 (to display the view 7404-12 in FIG. 7AN) that is displayed (e.g., using the group of sub-components b1-b5, or another group of sub-components that corresponds to the latitudinal viewing angle of the viewer A), without changing the viewing perspective of the view of the object 7404 that is displayed to the viewer A (e.g., the view 7404-12 in FIG. 7AN has the same viewing perspective as the view 7404-1 in FIG. 7AM1 and FIG. 7AM2).

In some embodiments, as shown in FIG. 7AN, the viewer B perceives the same view 7404-12 of the object 7404 as the viewer A, while the viewer B is located at the same or substantially the same latitudinal viewing angle as viewer A, even though the viewer B has a different viewing angle from the viewer A in the longitudinal direction.

In some embodiments, the display generation component 7408 is a lenticular display (e.g., a lenticular lens panel or array 3-110, as described with reference to FIG. 1G, or another type of lenticular display), and the same view (e.g., the view 7404-12, or another view) is displayed to multiple viewers (e.g., viewer A and viewer B, or another pair of viewers) occupying the same or substantially the same latitudinal viewing angle, but different longitudinal viewing angles, using the same group of sub-components of the display generation component (e.g., sub-components b1-b5, or another group of sub-components that corresponds to a respective latitudinal viewing angle shared by multiple viewers).

In some embodiments, the display generation component is a lenticular display (e.g., a lenticular lens panel or array 3-110, as described with reference to FIG. 1G, or another type of lenticular display), and the different views are displayed to multiple viewers occupying the same or substantially the same latitudinal viewing angle, but different longitudinal viewing angles, using different groups of sub-components of the display generation component that correspond to the same or substantially the same latitudinal viewing angles but different longitudinal viewing angles.

As shown in FIG. 7AN, after the viewer B has moved to the same or substantially the same viewing angle as viewer A in the latitudinal direction, while remaining in the same dimmed viewing zone in the longitudinal direction, the computer system ceases to display a view of the object 7404 to the viewing angle previously occupied by the viewer B (or displays an off-view 7404-13 shown in FIG. 7AN) and optionally turns off the group of sub-components that were previously used to display a view of the object 7404 to the viewer B (e.g., the group of sub-components a1-a5, or another group of sub-components that correspond to the viewing angle in the latitudinal direction of viewer A in FIG. 7AM1 and FIG. 7AM2), because no viewer is currently occupying the viewing angle previously occupied by the viewer B in the latitudinal direction.

In some embodiments, the computer system optionally ceases display of some graphical elements, while continuing to display other graphical elements without reducing the visual prominence of said other graphical elements after the viewer B has moved away from the viewing angle corresponding to the group of sub-components a1-a5. In some embodiments, the off-view 7404-13 corresponds to a state of the sub-components a1-a5 where the object 7404 is no longer displayed, but one or more other graphical elements are optionally displayed with the standard visual prominence or with a reduced but visual level of visual prominence.

In the example shown in FIG. 7AN, the view 7404-4 of the object 7404 displayed to viewer C has not changed before and after the movement of the viewer B, because the viewer B has not moved into the same viewing angle as viewer C, and viewer C has not moved relative to the display generation component 7408. In some embodiments, viewer C does not need be present for the change described above to occur. In some embodiments, if viewer C is not present, the computer system optionally turns off the group of sub-components c1-c5, or only display some of the graphical elements other than the object 7404 using the group of sub-components a1-a5.

FIG. 7AO following FIG. 7AM1 (or FIG. 7AM2) illustrates another example scenario where one of the viewers has moved (e.g., relative to the display generation component 7408 and to the other viewers) in the physical environment, and as a result, impacting the view of the object that is displayed to the viewer that has moved and the view of the object that is displayed to a viewer that has not moved, in accordance with some embodiments.

FIG. 7AO is further illustrative of an embodiment where if two viewers are seeing the object 7404 from the same or substantially the same latitudinal angle (e.g., latitudinal angles that are served by the same group of sub-components) and one of the two viewers is outside of the preferred viewing zone in the longitudinal direction while the other viewer is within the preferred viewing zone in the longitudinal direction, the view of the object is provided to the two viewers at a level that corresponds to the preferred viewing zone and not reduced to the level that corresponds to the dimmed viewing zone in the longitudinal direction, in accordance with some embodiments.

For example, as shown in FIG. 7AO following FIG. 7AM1 (or FIG. 7AM2), viewer A 7406-1 has moved to a latitudinal position that is substantially the same as that of the viewer B 7406-2, while viewer A and viewer B remain in their respective viewing zones in the longitudinal direction (e.g., with viewer B remaining in the dimmed viewing zone, and viewer A remaining in the preferred viewing zone in the longitudinal direction). An example scenario that this can occur is when viewer B is in a standing position, and viewer A initially is in a sitting position at a first latitudinal position and then moved to and sat down at a position in front of viewer B, while still facing toward the display generation component 7408.

As shown in FIG. 7AO, in response to detecting that the viewer A who is in a preferred viewing zone in the longitudinal direction has moved to the same or substantially the same latitudinal viewing angle as viewer B who is in a dimmed viewing zone in the longitudinal direction and seeing a dimmed view of the object (e.g., view 7404-11 in FIGS. 7AM1 and 7AM2) at the current latitudinal viewing angle of viewer B, the computer system increases the visual prominence of the view of the object 7404 (e.g., from level of the view 7404-11 to the level of the view 7404-2 in FIG. 7AO) that is displayed (e.g., using the group of sub-components a1-a5, or another group of sub-components that corresponds to the latitudinal viewing angle of the viewer B), without changing the viewing perspective of the object 7404 that is displayed to the viewer B (e.g., view 7404-11 and view 7404-2 show the object 7404 with the same viewing perspective), in accordance with some embodiments.

In some embodiments, the viewer A 7406-1 perceives the same view of the object 7404 (e.g., the view 7402-2 in FIG. 7AO) as the viewer B, while the viewer A is located at the same or substantially the same latitudinal viewing angle as the viewer B, even though the viewer A has a different viewing angle from the viewer B in the longitudinal direction.

In some embodiments, the display generation component 7408 is a lenticular display (e.g., a lenticular lens panel or array 3-110, as described with reference to FIG. 1G, or another type of lenticular display), and the same view of the object 7404 is displayed to multiple viewers occupying the same or substantially the same latitudinal viewing angle, but different longitudinal viewing angles, using the same group of sub-components of the display generation component.

In some embodiments, the display generation component is a lenticular display (e.g., a lenticular lens panel or array 3-110, as described with reference to FIG. 1G, or another type of lenticular display), and different views of the object 7404 are displayed to multiple viewers occupying the same or substantially the same latitudinal viewing angle, but different longitudinal viewing angles, using different groups of sub-components of the display generation component that correspond to the same or substantially the same latitudinal viewing angles but different longitudinal viewing angles.

As shown in FIG. 7AO, after the viewer A has moved to the same or substantially the same viewing angle as viewer B in the latitudinal direction, while remaining in the same preferred viewing zone in the longitudinal direction, the computer system turns off the group of sub-components that were previously used to display a view of the content to the viewer A (e.g., the group of sub-components b1-b5, or another group of sub-components that correspond to the viewing angle in the latitudinal direction of viewer A in FIG. 7AM1 and FIG. 7AM2), because no viewer is currently occupying the viewing angle previously occupied by the viewer A in the latitudinal direction. In some embodiments, the computer system optionally turns off display of some graphical elements, while continuing to display other graphical elements without reducing the visual prominence of said other graphical elements after the viewer A has moved away from the viewing angle corresponding to the group of components b1-b5.

In the example shown in FIG. 7AO, the view of the object 7404 displayed to viewer C (e.g., view 7404-4, or another view of the object 7404) has not changed before and after the movement of the viewer A, because the viewer A has not moved into the same viewing angle as viewer C in the latitudinal direction, and viewer C has not moved relative to the display generation component. In some embodiments, viewer C does not need be present for the changes described above to occur. In some embodiments, if viewer C is not present, the computer system optionally turns off the group of sub-components c1-c5, or only display the graphical elements other than the object 7404 using the group of components a1-a5.

FIG. 7AP1 following FIG. 7AM1 (and FIG. 7AP2 following FIG. 7AM2) illustrates another example scenario where one of the viewers has moved (e.g., relative to the display generation component 7408 and to the other viewers) in the physical environment, and as a result, impacting the view of the object 7404 that is displayed to the viewer that has moved but not the view of the object 7404 that is displayed to a viewer that has not moved, in accordance with some embodiments.

FIGS. 7AP1 and 7AP2 are further illustrative of an embodiment where if two viewers are seeing the object 7404 from the same or substantially the same latitudinal viewing angle (e.g., the latitudinal angles that are served by the same group of sub-components) and one of the two viewers is outside of the preferred viewing zone in the longitudinal direction while the other viewer is within the preferred viewing zone in the longitudinal direction, the view of the object 7404 is provided to the viewers at the shared latitudinal viewing angle at the level that corresponds to the preferred viewing zone in the longitudinal direction and not reduced to the level that corresponds to the dimmed viewing zone in the longitudinal direction.

For example, as shown in FIG. 7AP1 following FIG. 7AM1 and in FIG. 7AP2 following FIG. 7AM2, viewer B 7406-2 has moved to a latitudinal position that is substantially the same as that of the viewer A 7406-1, while viewer B and viewer A remain in their respective viewing zones in the longitudinal direction (e.g., with viewer B remaining in the dimmed viewing zone, and viewer A remaining in the preferred viewing zone in the longitudinal direction). An example scenario that this can occur is when viewer B is in a standing position and viewer A is in a sitting position, and viewer B has moved to a position behind viewer A and looking toward the display generation component 7408 over the shoulder or head of viewer A.

As shown in FIGS. 7AP1 and 7AP2, in response to detecting that the viewer B who is in a dimmed viewing zone in the longitudinal direction has moved to the same or substantially the same latitudinal viewing angle as viewer A who is in a preferred viewing zone in the longitudinal direction and seeing an undimmed view of the object 7404 (e.g., view 7404-1 in FIGS. 7AP1 and 7AP2) at the current viewing angle of viewer A, the computer system maintains the visual prominence of the view of the object (e.g., view 7404-1 in FIGS. 7AP1 and 7AP2 and in FIGS. 7AM1 and 7AM2) that is displayed (e.g., using the group of sub-components b1-b5, or another group of sub-components that corresponds to the latitudinal viewing angle of the viewer A) and maintains the viewing perspective of the view that is displayed to the viewer A.

In some embodiments, the viewer B perceives the same view of the object (e.g., view 7404-1 in FIGS. 7AP1 and 7AP2) as the viewer A while the viewer B is located at the same or substantially the same latitudinal viewing angle as viewer A, even though the viewer B has a different viewing angle in the longitudinal direction from the viewer A.

In some embodiments, the display generation component is a lenticular display (e.g., a lenticular lens panel or array 3-110, as described with reference to FIG. 1G, or another type of lenticular display), and the same view of the object 7404 (e.g., view 7404-1 in FIGS. 7AP1 and 7AP2, or another view of the object 7404) is displayed to multiple viewers (e.g., viewer A and viewer B, or another pair of viewers) occupying the same or substantially the same latitudinal viewing angle, but different longitudinal viewing angles, using the same group of sub-components of the display generation component (e.g., sub-components b1-b5, or another group of sub-components that correspond to the same latitudinal viewing angle and/or range of viewing angles).

In some embodiments, the display generation component 7408 is a lenticular display (e.g., a lenticular lens panel or array 3-110, as described with reference to FIG. 1G, or another type of lenticular display), and different views of the object 7404 are displayed to multiple viewers (e.g., viewer A and viewer B, or another pair of viewers) occupying the same or substantially the same latitudinal viewing angle, but different longitudinal viewing angles, using different groups of sub-components of the display generation component that correspond to the same or substantially the same latitudinal viewing angles but different longitudinal viewing angles.

As shown in FIGS. 7AP1 and 7AP2, after the viewer B has moved to the same or substantially the same viewing angle as viewer A in the latitudinal direction, while remaining in the same dimmed viewing zone in the longitudinal direction, the computer system ceases to display the view of the object (e.g., ceases displaying view 7404-11 shown in FIGS. 7AM1 and 7AM2 or another view of the object, and optionally displays an off-view 7404-15 shown in FIGS. 7AP1 and 7AP2), and optionally turns off the group of sub-components that were previously used to display a view of the object 7404 to the viewer B (e.g., the group of sub-components a1-a5, or another group of sub-components that correspond to the viewing angle in the latitudinal direction of viewer B in FIGS. 7AM1 and 7AM2), because no viewer is currently occupying the viewing angle previously occupied by the viewer B in the latitudinal direction.

In some embodiments, the off-view 7404-15 corresponds to a state in which the computer system optionally ceases display of some graphical elements including the object 7404, while continuing to display other graphical elements, optionally without reducing the visual prominence of said other graphical elements or displaying them with reduced but visible level of visual prominence, after the viewer B has moved away from the viewing angle corresponding to the group of components a1-a5.

In the example shown in FIGS. 7AP1 and 7AP2, the view of the object 7404 (e.g., view 7404-4, or another view of the object 7404) displayed to viewer C has not changed before and after the movement of the viewer B, because the viewer B has not moved into the same latitudinal viewing angle as viewer C, and viewer C has not moved relative to the display generation component 7408. In some embodiments, viewer C does not need be present for the changes described above to occur. In some embodiments, if viewer C is not present, the computer system optionally turns off the group of sub-components c1-c5, or only display some of the graphical elements other than the object 7404 using the group of components c1-c5.

FIG. 7AQ following FIG. 7AP1 (or FIG. 7AP2) illustrates another example scenario in which one of three viewers moves relative to the display generation component 7408 while the other two viewers located at the same or substantially the same latitudinal viewing angle do not move relative to the display generation component. In this example, as shown in FIGS. 7AP1 and 7AP2, viewer C is located at a different latitudinal viewing angle from that shared by the viewer A and viewer B (e.g., viewers A and B are located at the same or substantially the same latitudinal viewing angle and seeing the same view of the object (e.g., view 7404-1, or another view of the object 7404) provided by the same group of sub-elements (e.g., the group of sub-components b1-b5, or another group of sub-components that correspond to the latitudinal viewing angle of the viewers A and B), and viewer C was seeing a view of the object (e.g., view 7404-4 in FIGS. 7AP1 and 7AP2) provide by a different group of sub-components (e.g., the group of sub-components c1-c5, or another group of sub-components that corresponds to the latitudinal viewing angle of viewer C). In FIG. 7AQ, the viewer C has moved from the dimmed viewing zone to the preferred viewing zone in the longitudinal direction, and as a result, the view of the object 7404 provided by the group of sub-components c1-c5 to the viewer C is no longer reduced in visual prominence (e.g., changed from the view 7404-4 shown in FIGS. 7AP1 and 7AP2 to the view 7404-16 shown in FIGS. 7AP1 and 7AP2) (e.g., because the viewer C is now in the preferred viewing zones in both the latitudinal direction and the longitudinal direction), and with a viewing perspective adjusted based on the change in the viewing angle of viewer C in the longitudinal direction (e.g., the viewing perspective of the object 7404 in view 7404-16 is different from the viewing perspective of the object 7404 in view 7404-4), in accordance with some embodiments. In FIG. 7AQ, the view of the object 7404 provided to the viewer A and viewer B (e.g., view 7401 of the object, or another view of the object 7404) is unchanged despite of the movement of the viewer C in the longitudinal direction, in accordance with some embodiments.

More details of the display generation component and the changes in the views of the object due to the relative movements between the viewer and the display generation component, and/or the relative movement the between the viewers, in accordance with various embodiments, are provided with respect to FIGS. 7A-7AT and FIGS. 8-13, and accompanying descriptions.

In some embodiments, input gestures used in the various examples and embodiments described herein (e.g., with respect to FIGS. 7A-7AQ, and FIGS. 8-13) include air gestures performed by movement of the user's finger(s)

relative to other finger(s) or part(s) of the user's hand) for interacting with a virtual or mixed-reality environment, in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

Typically, in implementations in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's gaze to determine the target of the user input (e.g., for direct inputs, as described below). Thus, in implementations involving air gestures, the input gesture is, for example, a gaze toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's gaze on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein (e.g., with respect to FIGS. 7A-7AQ, and FIGS. 8-13) include pinch inputs and tap inputs, for interacting with a virtual or mixed-reality environment, in accordance with some embodiments. For example, the pinch inputs and tap inputs described below are performed as air gestures.

In some embodiments, a pinch input is one or more of: a pinch gesture, a long pinch gesture, a pinch and drag gesture, or a double pinch gesture. For example, a pinch gesture includes movement of two or more fingers of a hand to make contact with one another, that is, optionally, followed by an immediate (e.g., within 0-1 seconds) break in contact from each other. A long pinch gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input is performed by the same hand (e.g., the user pinches two or more fingers to make contact with one another and moves the same hand to the second position with the drag gesture). In some embodiments, the pinch input is performed by a first hand of the user and the drag input is performed by the second hand of the user (e.g., the user's second hand moves from the first position to the second position while the user continues the pinch input with the user's first hand. In some embodiments, an input gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand.

In some embodiments, input gestures used in the various examples and embodiments described herein (e.g., with respect to FIGS. 7A-7AQ, and FIGS. 8-13) optionally include discrete, small motion gestures performed by movement of the user's finger(s) relative to other finger(s) or part(s) of the user's hand, optionally, without requiring major movement of the user's whole hand or arm away from their natural location(s) and posture(s)) to perform operations immediately prior to or during the gesture) for interacting with a virtual or mixed-reality environment, in accordance with some embodiments.

In some embodiments, the input gestures are detected by analyzing data or signals captured by a sensor system (e.g., sensors 190, FIG. 1A; image sensors 314, FIG. 3). In some embodiments, the sensor system includes one or more imaging sensors (e.g., one or more cameras such as motion RGB cameras, infrared cameras, depth cameras, and/or other types of imaging sensors). For example, the one or more imaging sensors are components of or provide data to a computer system (e.g., computer system 101 in FIG. 1A (e.g., a portable electronic device or an HMD)) that includes a display generation component (e.g., display generation component 120 in FIGS. 1A, 3, and 4 (e.g., a touch-screen display that serves as a display and a touch-sensitive surface, a stereoscopic display, and/or a display with a pass-through portion). In some embodiments, the one or more imaging sensors include one or more rear-facing cameras on a side of a device opposite from a display of the device. In some embodiments, the input gestures are detected by a sensor system of a head mounted system (e.g., a VR headset that includes a stereoscopic display that provides a left image for the user's left eye and a right image for the user's right eye). For example, one or more cameras that are components of the head mounted system are mounted on the front and/or underside of the head mounted system. In some embodiments, one or more imaging sensors are located in a space in which the head mounted system is used (e.g., arrayed around head mounted system in various locations in a room) such that the imaging sensors capture images of the head mounted system and/or the user of the head mounted system. In some embodiments, the input gestures are detected by a sensor system of a heads-up device (such as a heads-up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g. infrared emitter) and/or sound emitter (e.g., ultrasound emitter). For example, while light (e.g., light from an array of infrared light emitters having a predetermined pattern) is projected onto a hand, an image of the hand under illumination of the light is captured by the one or more cameras and the captured image is analyzed to determine a position and/or configuration of the hand. Using signals from image sensors directed to the hand to determine input gestures, as opposed to using signals of touch-sensitive surfaces or other direct contact mechanism or proximity-based mechanisms allow the user to freely choose whether to execute large motions or remaining relatively stationary when providing the input gestures with his/her hand, without experiencing constraints imposed by a specific input device or input region.

In some embodiments, a tap input is, optionally, a tap input of a thumb over index finger (e.g., over a side of the index finger adjacent to the thumb) of a user's hand. In some embodiments, a tap input is detected without requiring lift-off of the thumb from the side of the index finger. In some embodiments, a tap input is detected in accordance with a determination that downward movement of the thumb are followed by upward movement of the thumb, with the thumb making contact with the side of the index finger for less than a threshold amount of time. In some embodiments, a tap-hold input is detected in accordance with a determination that the thumb moves from the raised position to the touch-down position and remains in the touch-down position for at least a first threshold amount of time (e.g., the tap time threshold or another time threshold that is longer than the tap time threshold). In some embodiments, the computer system requires that the hand as a whole remains substantially stationary in location for at least the first threshold amount of time in order to detect the tap-hold input by the thumb on the index finger. In some embodiments, the touch-hold input is detected without requiring that the hand as a whole is kept substantially stationary (e.g., the hand as a whole may move while the thumb rests on the side of the index finger). In some embodiments, a tap-hold-drag input is detected when the thumb touches down on the side of the index finger and the hand as a whole moves while the thumb rests on the side of the index finger.

In some embodiments, a flick gesture is, optionally, a push or flick input by a movement of a thumb across index finger (e.g., from the palm side to the back side of the index finger). In some embodiments, the extension movement of the thumb is accompanied by upward movement away from the side of the index finger, e.g., as in an upward flick input by the thumb. In some embodiments, the index finger moves in the opposite direction from that of the thumb during the forward and upward movement of the thumb. In some embodiments, a reverse flick input is performed by the thumb moving from an extended position to a retracted position. In some embodiments, the index finger moves in the opposite direction from that of the thumb during the backward and downward movement of the thumb.

In some embodiments, a swipe gesture is, optionally, a swipe input by a movement of a thumb along index finger (e.g., along a side of the index finger adjacent to the thumb or on the side of the palm). In some embodiments, the index finger is optionally in an extended state (e.g., substantially straight) or a curled up state. In some embodiments, the index finger moves between the extended state and the curled up state during the movement of the thumb in a swipe input gesture.

In some embodiments, different phalanges of various fingers correspond to different inputs. A tap input of thumb over various phalanges of various fingers (e.g., index finger, middle finger, ring finger, and, optionally, pinky finger) are optionally mapped to different operations. Similarly, in some embodiments, different push or click inputs can be performed by the thumb across different fingers and/or different parts of a finger to trigger different operations in a respective user interface contact. Similarly, in some embodiments, different swipe inputs performed by the thumb along different fingers and/or in different directions (e.g., toward the distal or proximal end of a finger) trigger different operations in a respective user interface context.

In some embodiments, the computer system treats tap inputs, flick inputs, and swipe inputs are treated as different types of inputs based on movement types of the thumb. In some embodiments, the computer-system treats inputs having different finger locations that are tapped, touched, or swiped by the thumb as different sub-input-types (e.g., proximal, middle, distal subtypes, or index, middle, ring, or pinky subtypes) of a given input type (e.g., a tap input type, a flick input type, a swipe input type, and/or other input types). In some embodiments, the amount of movement performed by the moving finger (e.g., thumb) and or other movement metrics associated with the movement of the finger (e.g., speed, initial speed, ending speed, duration, direction, and/or movement pattern) is used to quantitatively affect the operation that is triggered by the finger input.

In some embodiments, the computer-system recognizes combination input types that combines a sequence of movements by the thumb, such as a tap-swipe input (e.g., touch-down of thumb on a finger followed by swiping along the side of the finger), a tap-flick input (e.g., touch-down of thumb over a finger followed by a flick across the finger from palm side to back side of the finger), and/or a double tap input (e.g., two consecutive taps on the side of a finger at about the same location).

In some embodiments, the gesture inputs are performed by an index finger instead of the thumb (e.g., index finger performs the tap or swipe on the thumb, or the thumb and the index finger move toward each other to perform a pinch gesture). In some embodiments, a wrist movement (e.g., a flick of the wrist in a horizontal direction, or a vertical direction) is performed immediately preceding, immediately succeeding (e.g., within a threshold amount of time) or contemporaneously with the finger movement inputs to trigger additional operations, different operations, or modified operations in the current user interface context, as compared to the finger movement inputs without the modifier input by the wrist movement. In some embodiments, the finger input gestures performed with the user's palm facing the user's face are treated as a different type of gestures from finger input gestures performed with the user's palm facing away from the user's face. For example, a tap gesture performed with the user's palm facing the user performs an operation with added (or reduced) privacy safeguard as compared to an operation (e.g., the same operation) performed in response to a tap gesture performed with the user's palm facing away from the user's face.

Although one type of finger input may be used to trigger a type of operation in the examples provided in this disclosure, other types of finger input are optionally used for triggering the same type of operation in other embodiments.

Additional descriptions regarding FIGS. 7A-7AQ are provided below in references to methods 800, 900, 1000, 1100, 1200, and 1300 described with respect to FIGS. 8-13 below.

FIG. 8 is a flowchart of a method 8000 of displaying XR content to a user via a first display generation component and updating status information associated with the user via a second display generation component, in accordance with some embodiments.

The method 8000 is performed at a computer system (e.g., the computer system 101 in FIG. 1A, and/or the computer system described with respect to FIGS. 7A-7AQ) that is in communication with a first display generation component, a second display generation component and one or more input devices (e.g., cameras, controllers, touch-sensitive surfaces, joysticks, buttons, gloves, watches, motion sensors, biometric sensors, and/or orientation sensors). In some embodiments, the first display generation component and the second display component are each a heads-up display, a head-mounted display (HMD), a display, a touchscreen, or a projector, or are separate displays of and/or enclosed in the same housing of a heads-up display, a head-mounted display (HMD), a display, a touchscreen, or a projector. In some embodiments, the first display generation component is the first display generation component 7100 described with respect to FIGS. 7A-7T, and the second display generation component is the second display generation component 7102 described with respect to FIGS. 7A-7T. In some embodiments, the first display generation component is a display component facing the user and provides an XR experience to the user, and the second display generation component is a display component facing away from the user and toward an external environment of the user and optionally provides status information related to the first display generation component (e.g., displayed content, operational state, and/or other status information) and/or the user (e.g., movement of the user's eyes, attention state of the user, and/or other indication of user input) to other users in the external environment. In some embodiments, the first display generation component and the second display generation component form a two-sided display device (e.g., a two-sided HMD (e.g., HMD 7100a in FIGS. 7G2, 7H2, 7L2, 7M2, 7N2, 7AA2, 7AB2; HMD 1-100 in FIG. 1B, or another HMD)) that displays a first user interface on a first side corresponding to the first display generation component (e.g., inward-facing displays, and/or display assembly 1-120 in FIG. 1C), and a second user interface on the second side corresponding to the second display generation component (e.g., outward-facing displays, and/or display assembly 1-108 in FIG. 1i). In some embodiments, the computer system is an integrated device with one or more processors and memory enclosed in the same housing as the first and the second display generation components and at least some of the one or more input devices. In some embodiments, the computer system includes a computing component (e.g., a server, a mobile electronic device such as a smart phone or tablet device, a wearable device such as a watch, wristband, or earphones, a desktop computer, a laptop computer, and/or other device) that includes one or more processors and memory that is separate from the display generation components and/or the one or more input devices. In some embodiments, the display generation components and the one or more input devices are integrated and enclosed in the same housing. In some embodiments, the first display generation component includes two or more display components (e.g., at least one display component for each eye) that display slightly different images to form a stereoscopic view of the three-dimensional environment of the XR experience. In some embodiments, the second display generation component includes a lenticular display component (e.g., a lenticular lens panel or array 3-110, as described with reference to FIG. 1G, or another type of lenticular display) that display a three-dimensional view of the user's face and/or eyes and/or the status information related to the content display of the first display generation component. In some embodiments, the second display generation component is a low resolution, smaller, simpler, mono-stereoscopic, mono-chromatic, low power, and/or secondary display, while the first display generation component is a higher resolution, bigger, more complex, stereoscopic, full-color, full power, and/or primary display of the computer system. In some embodiments, the second display generation component is used by the computer system to display status information, event information, state information related to the computer system, in particular, notifications and prompts for the user to place the first display generation component into a preset spatial relationship relative to the user's eyes to view additional available content related to the current context. In some embodiments, the second display generation component is used by the computer system when the first display generation component is not placed in front of the user's eyes (or more generally, not in a position for the user to fully enjoy the XR content displayed on the first display generation component), and/or when the display generation components of the computer system (e.g., as parts of a single HMD) are placed on the desk, in the user's hands, in a container (e.g., a backpack, a holder, a case, etc.), or in a standby state (e.g., plugged in a charging station, set in a low power mode, etc.), etc. In some embodiments, while displaying information using the second display generation component, the computer system continues to monitor the spatial relationship between the user (e.g., the first user, or any user) and the first display generation component (e.g., using sensors (e.g., motion sensors, orientation sensors, image sensors, touch-sensors, etc.) attached to or enclosed in the housing of the first display generation component, and/or external sensors (e.g., motion sensors, orientation sensors, image sensors, etc.)). In some embodiments, in response to detecting relative movement between the first display generation component and the user (e.g., in response to the user picking up the display generation components enclosed in the same housing or attached to the same support structure and turning the display side of the first display generation component toward the user's eyes or face, and/or in response to the user putting the HMD including the first and second display generation components on his/her head, etc.), in accordance with a determination that the first spatial relationship between the user and the first display generation component is met, the computer system displays the computer-generated experience corresponding to the state of the computer system at the time when the first spatial relationship is met.

In performing the method 8000, while a representation of a three-dimensional environment (e.g., XR content 7002 in FIGS. 7A-F, or other AR and/or VR environment or experiences) is visible via the first display generation component (e.g., a view of one or more virtual elements and/or a representation of one or more portions of a physical environment are visible via digital and/or optical passthrough provided by the first display generation component), the computer system displays (8002), via the second display generation component, a respective visual representation of a portion of a body of a user (e.g., representation 7006 for the first user 7202 in FIGS. 7A-7B, or representation 7208 for the third user 7206 in FIGS. 7D-7E, or other representation of the portion of the body of the user) who is in a position to view the three-dimensional environment via the first display generation component. In some embodiments, the portion of the body of the user includes a portion of a human body (e.g., torso, head, face, and/or eyes), or an entirety of a human body. In some embodiments, the respective visual representation of the portion of the body of the user is a computer-generated image (e.g., a realistic or stylized image generated based on a camera view of the user's face and/or eyes) or a camera view of the user's face and/or eyes (e.g., when the user is wearing the HMD, and the user's face and/or eyes are facing the inner display of the HMD, and the HMD is blocking others' direct view of the user's face and/or eyes and the user's direct view of the surrounding environment). In some embodiments, displaying the respective visual representation of the portion of the body includes: in accordance with a determination that the user meets first criteria, wherein the first criteria require an identity of the user to meet a first condition in order for the first criteria to be met (e.g., the user is a registered user for the computer system, the user has gone through an enrollment process for the computer system, the user's facial features and/or eyes have been captured and modelled previously in a registration process, and/or the user's identity has been verified by the computer system as a primary user of the computer system), displaying (8004) a first visual representation of the portion of the body (e.g., the representation 7006 for the first user 7202 in FIGS. 7A-7B) (e.g., displaying a computer-generated image or camera view of the user's face and/or eyes in accordance with the current appearance or a stored appearance of the user's face and/or eyes behind the HMD (e.g., while the user is viewing the first computer-generated environment with a first level of immersion (e.g., the user can see the outside environment through a pass-through view provided via the HMD))); and in accordance with a determination that the user does not meet the first criteria (e.g., the user is not a registered user for the computer system, the user has not gone through an enrollment process for the computer system, the user's facial features and/or eyes have not been captured and modelled previously in a registration process, and/or the user's identity has not been verified by the computer system as a primary user of the computer system), displaying (8006) a second visual representation of the portion of the body (e.g., representation 7208 for the third user 7206 in FIGS. 7D-7E), wherein the second visual representation has a lower level of fidelity than the first visual representation (e.g., displaying a lower fidelity or generic computer-generated image of the user's face and/or eyes, optionally, in accordance with a current appearance of the user's face and/or eyes behind the HMD (e.g., while the user is viewing the first computer-generated three-dimensional environment with the first level of immersion (e.g., the user can see the outside environment through a pass-through view provided via the HMD))). In the method 8000, while displaying, via the second display generation component, the respective visual representation of the portion of the body (e.g., the representation 7006 for the first user 7202 in FIGS. 7A-7B, or the representation 7208 for the third user 7206 in FIGS. 7D-7E), the computer system detects (8008) a first change in appearance of the portion of the body of the user while the user is in a position to view the three-dimensional environment via the first display generation component (e.g., the change in appearance is due to movement of the portion of the body of the user (e.g., the first user 7202 and the third user 7206) relative to the first display generation component 7100 in FIGS. 7A-7B and FIGS. 7D-7E). In some embodiments, the first change in appearance of the body of the user includes changes caused by the movement of the user's eyes (e.g., opening, closing, blinking, squinting, winking, eyerolling, and/or other intentional and/or unintentional eye movements), eyebrows (e.g., twitching, rising, lowering, flashing, furrowing, and/or other movements of eyebrows that accompany speech and/or that form part of a facial expression), forehead (e.g., forming creases or furrows), nose (e.g., twitching, flaring, and/or wriggling), mouth (e.g., opening, smiling, closing, puckering, and/or other movements that produce speech and/or form part of a facial expression), and/or other portions of the user's face (e.g., cheeks, ears, and/or chin). In some embodiments, the first change in appearance of the body of the user are changes in appearance that would be visible to another person facing the user, but for the visual barrier that is present between the user and said other person (e.g., the presence of the HMD, or the first display generation component and/or second display generation component placed between the user and said other person). In some embodiments, the first change in appearance of the user does not include visible changes that are caused by the overall movement of the user's head relative to his/her neck, and/or the overall movement of the user in the physical environment.

In the method 8000, in response to detecting the first change in appearance of the portion of the body of the user while the user is in a position to view the three-dimensional environment via the first display generation component, the computer system updates (8010) an appearance of the respective visual representation of the portion of the body that is displayed via the second display generation component based on the first change in appearance of the portion of the body of the user (e.g., as illustrated in the change in appearance of the representation 7006-*b* for the first user 7202 in FIG. 7B relative to the appearance of the representation 7006-*a* for the first user 7202 in FIG. 7A, and in the change in appearance of the representation 7208-*b* for the third user 7206 in FIG. 7E relative to the appearance of the representation 7208-*a* for the third user 7206 in FIG. 7D). In some embodiments, in accordance with a determination that the user meets the first criteria (e.g., the first user 7202 in FIGS. 7A-7B meets the first criteria), the computer system changes (8012) an appearance of the first visual representation of the portion of the body based on the first change in appearance of the portion of the body of the user (e.g., changing the appearance of the representation 7006 for the first user 7202 based on the change in appearance of the portion of the body of the first user (e.g., movement of the portion of the body of the first user in FIGS. 7A-7B and/or other changes in appearance of the portion of the body of the first user 7202)) (e.g., displaying real-time updates to the computer-generated image or camera view of the user's face and/or eyes in accordance with the real-time movement of the user's face and/or eyes behind the HMD during a respective period of time (e.g., while the user is viewing the first computer-generated environment with a first level of immersion (e.g., the user can see the outside environment through a pass-through view provided via the HMD))). In some embodiments, the real-time updates and/or real-time movements, optionally, include updates and/or movements that have some computational and/or signal processing delays (e.g., delays that are less than 0.5, 0.25, 0.1, 0.05, or 0.01 seconds and/or an amount that is not perceptible to most users). In some embodiments, in accordance with a determination that the user does not meet the first criteria (e.g., the third user 7206 does not meet the first criteria in FIGS. 7D-7E), the computer system changes (8014) an appearance of the second visual representation of the portion of the body based on the first change in appearance of the portion of the body of the user (e.g., changing the appearance of the representation 7208 for the third user 7206 based on the change in appearance of the portion of the body of the first user (e.g., movement of the portion of the body of the third user 7206 in FIGS. 7D-7E and/or other changes in appearance of the portion of the body of the first user 7206)) (e.g., displaying real-time updates to a lower fidelity or generic computer-generated image of the user's face and/or eyes in accordance with the real-time movement of the user's face and/or eyes behind the HMD during the respective period of time (e.g., while the user is viewing the first computer-generated environment with the first level of immersion (e.g., the user can see the outside environment through a pass-through view provided via the HMD))). In some embodiments, the real-time updates and/or the real-time movements, optionally, include updates and movements that have some computational and/or signal processing delays (e.g., delays that are less than 0.5, 0.25, 0.1, 0.05, or 0.01 seconds and/or an amount that is not perceptible to most users). For example, in some embodiments, when the user's eyes moved (e.g., blinked, closed, squinted, winked, looked the side, and/or moved in other visible ways), in accordance with a determination that the user meets the first criteria, the computer system updates the computer-generated image or camera view of the user's face and/or eyes in accordance with the real-time movement of the user's eyes behind the HMD (e.g., the portions of the computer-generated image or camera view that correspond to the user's eyes show visual changes that correspond to the movement of the user's eyes), where the visual changes are produced with the same or similar level of visual fidelity as the initially displayed computer-generated image or camera view of the user's face and/or eyes; and in accordance with a determination that the user does not meet the first criteria, the computer system updates the lower fidelity or generic computer-generated image of the user's face and/or eyes in accordance with the real-time movement of the user's eyes behind the HMD (e.g., the portions of the lower fidelity computer-generated image or generic image that correspond to the user's eyes show visual changes that correspond to the movement of the user's eyes), where the visual changes are produced with the same or similar level of visual fidelity as the initially displayed computer-generated image or generic image of the user's face and/or eyes (e.g., a lower level of fidelity as compared to that used for a user that meets the first criteria). In some embodiments, the change in appearance in the first visual representation more closely corresponds to the real-time movement of the user's face and/or eyes when the user meets the first criteria, while the changes in appearance in the second visual representation less closely corresponds to the real-time movement of the user's face and/or eyes (e.g., generic, or canned movements) when the user does not meet the first criteria. For example, this is illustrated in FIGS. 7A-7B, in contrast to FIGS. 7D-7E. In some embodiments, in accordance with a determination that the XR content is being displayed via the first display generation component 7100 with a respective level of immersion that corresponds to displaying a combination of virtual content and a representation of the physical environment a mixed reality display mode, the computer system displays one or more graphical elements that represent the status associated with the user, including for example an overlay 7008 that indicates the status of the XR content that is displayed via the first display generation component 7100, and a respective representation of a portion of the body of the user that is in the first spatial relationship with the first display generation component 7100 to view the XR content displayed via the first display generation component. In some embodiments, as illustrated in FIGS. 7A-7B and FIGS. 7D-7E, if the computer system determines that the user that has the first spatial relationship with the first display generation component 7100 meets first criteria, where the first criteria are used by the computer system to determine whether the user is an enrolled user (also referred to as a primary user) for the computer system or a guest user for the computer system, the computer system displays a higher fidelity representation for the portion of the body of the user (e.g., the representation 7006 for the first user 7202 in FIGS. 7A-7B); and if the computer system determines that the user that has the first spatial relationship with the first display generation component 7100 does not meet the first criteria, the computer system displays a lower fidelity representation for the portion of the body of the user (e.g., the representation 7208 for the third user 7206 in FIGS. 7D-7E).

In some embodiments, the portion of the body of the user is a portion of a face of the user (e.g., upper portion of the face, a portion of the face including the eye brows, eyes, and nose, and/or a portion of the face that is blocked by the IMD). For example, as shown in FIGS. 7A-7B, the portion of the body of the first user 7202 that is represented in the representation includes at least a portion of the face of the first user 7202; and as shown in FIGS. 7D-7E, the portion of the body of the third user 7206 that is represented in the representation 7208 includes at least a portion of the face of the third user 7202, in accordance with some embodiments. Although the portion of the body of the first user 7202 and the third user 7206 in FIGS. 7A-7B and 7D-7E also include a portion of the body outside the face of the user, in some embodiments, the portion of the body of the user includes only the face (e.g., the portion of the face that is blocked by the AMD, the first display generation component, and/or the second display generation component) and not the torso or neck portion of the user. In some embodiments, the portion of the face that is represented on the second display generation component (e.g., upper portion of the face above the mouth, or eyes and eyebrows) encompasses the portion of the face that produces movements that cause visual changes in the respective visual representation of the portion of the face (e.g., the portion that include the eyes). In some embodiments, the portion of the face that is represented on the second display generation component (e.g., upper portion of the face above the mouth, or eyes and eyebrows) is encompassed within the portion of the face that produces movements that cause visual changes in the respective visual representation of the portion of the face (e.g., the whole face, or the upper portion of the face above the mouth). In some embodiments, the portion of the body of the user includes the user's face, and not portions of the user that is outside of the user's face. In some embodiments, the portion of the body of the user includes the user's head, and not portions of the user that is outside of the user's head. In some embodiments, the portion of the body of the user includes the user's head, neck, and chest, and not portions of the user that is beyond the user's chest. Displaying, via the second display generation component, the respective visual representation of a portion of the body of the user who is in a position to view the three-dimensional environment via the first display generation component, wherein the portion of the body of the user is a portion of a face of the user, provides improved visual feedback to a viewer of the second display generation component (e.g., improved visual feedback regarding the portion of the body of the user who is in the position to view the three-dimensional environment via the first display generation component).

In some embodiments, the portion of the body of the user includes an eye region of the user (e.g., one or two eyes, and optionally, eyebrows and a portion of the nose between the eyes). For example, as shown in FIGS. 7A-7B, the portion of the body of the first user 7202 that is represented in the representation 7006 includes at least an eye region of the first user 7202; and as shown in FIGS. 7D-7E, the portion of the body of the third user 7206 that is represented in the representation 7208 includes at least an eye region of the third user 7202, in accordance with some embodiments. Although the portion of the body of the first user 7202 and the third user 7206 in FIGS. 7A-7B and 7D-7E also include a portion of the body outside the eye region of the user, in some embodiments, the portion of the body of the user includes only the eye region of the user (e.g., the portion of the face that is blocked by the HMD, the first display generation component, and/or the second display generation component) and not the lower portion of the face, or the torso or neck portion of the user. Displaying, via the second display generation component, the respective visual representation of a portion of the body of the user who is in a position to view the three-dimensional environment via the first display generation component, wherein the portion of the body of the user includes an eye region of the user, provides improved visual feedback to a viewer (e.g., of the second display generation component) (e.g., improved visual feedback regarding the user who is in the position to view the three-dimensional environment via the first display generation component).

In some embodiments, the first visual representation of the portion of the body includes a first degree of information about the portion of the body of the user, and the second visual representation of the portion of the body includes a second degree of information about the portion of the body of the user, wherein the second degree of information has less information than the first degree of information (e.g., the first degree of information includes the shape, color, eye lashes, and eyebrows of the eyes of the user, while the second degree of information includes a generic image of a pair of eyes that do not correspond to the shape, color, eye lashes and eyebrows of the eyes of the user). In some embodiments, the first degree of information includes the color, shape, and/or size of the eyes and skin color surrounding the eyes of the user, and the second degree of information includes less information and/or less accurate information about the color, shape, and/or size of the eyes and skin color surrounding the eyes of the user. For example, this is illustrated in FIGS. 7D-7E in contrast to FIGS. 7A-7B, where in FIGS. 7A-7B, the first user 7202 meets the first criteria, and the representation 7006 of the portion of the body of the first user 7202 includes more information about the portion of the body of the first user 7202, as compared to information that the representation 7208 of the portion of the body of the third 7206 contained about the portion of the body of the third user 7206, where the third user does not meet the first criteria. For example, in some embodiments, the representation 7208 for the third user 7206 is more blurred, darkened, and/or otherwise obfuscated than the representation 7006 for the first user 7202, when the representation is generated from the images of the respective users. In some embodiments, the base image of the portion of the body of the first user contains more information about the portion of the body of the first user (e.g., the image used is a camera view or actual image of the first user, and/or a high resolution image of the first user), than the base image of the portion of the body of the third user about the portion of the body of the third user (e.g., the image used is a generic image of the third user 7206, and/or a down-sampled image of the third user 7206). Displaying the first visual representation of the portion of the body, the first visual representation including the first degree of information about the portion of the body of the user, and displaying the second visual representation of the portion of the body, the second visual representation including a second degree of information about the portion of the body of the user, the second degree of information having less information than the first degree of information, provides improved visual feedback to a viewer (e.g., a viewer via the second display generation component) (e.g., improved visual feedback regarding the user who is in the position to view the three-dimensional environment via the first display generation component).

In some embodiments, the portion of the body of the user includes at least a first region of the body that includes a first respective body feature (e.g., eyes, eyes and eye brows, or other more recognizable and individualized features of a person) and a second region of the body that does not include the first respective body feature, and wherein a first portion of the second visual representation that corresponds to the first region of the body has a lower visual fidelity than a second portion of the second visual representation that corresponds to the second region of the body. For example, as shown in FIGS. 7D-7E, the portion of the representation 7208 that corresponds to the third user's eye region is darkened more than the portion of the representation 7208 that corresponds to the region below the eyes (e.g., third user's cheek region and/or mouth region), in accordance with some embodiments. In some embodiments, the computer system uses a darkening and/or blurring gradient filter on the image of the third user 7206 to generate the representation 7208 of the portion of the body for the third user 7206. For example, as shown in FIG. 7D-7E, the gradient filter gets darker as it gets closer to a more recognizable portion of the body of the third user (e.g., the eye region). In some embodiments, the computer system does not apply the darkening and/or blurring gradient filter to the image of the first user 7202 or uses a weaker filter on the image of the first user 7202. For example, as shown in FIGS. 7A-7B, the representation 7006 for the first user 7202 does not include a lower fidelity portion for the eye region of the first user. In some embodiments, the second visual representation includes a gradient filter than reduces the visual fidelity of the computer-generated image or generic image of the user that does not meet the first criteria by a greater amount in the first portion of the second visual representation that corresponds to the first region of the body, and reduces the visual fidelity of the computer-generated image or generic image of the user that does not meet the first criteria by a lesser amount in the second portion of the second visual representation that corresponds to the second region of the body. In some embodiments, the second visual representation includes a darkening and/or blurring gradient that gets increasing darker and/or blurrier as it gets closer to a more recognizable portion of the body (e.g., the first region of the body, such as the eyes, or the eyes and eyebrows). Displaying the first portion of the second visual representation, corresponding to the first region of the body that includes a first respective body feature, with a lower visual fidelity than the second portion of the second visual representation, corresponding to the second region of the body that does not include the first respective body feature, provides improved security/privacy to the user who is in the position to view the three-dimensional environment via the first display generation component (e.g., improved security/privacy by displaying a respective portion of the visual representation of a region of the body of the user with lower fidelity).

In some embodiments, displaying the respective visual representation of the portion of the body includes applying a mask to a first respective image of the portion of the body (e.g., a computer-generated image, a camera image, and/or or a generic image of the portion of the body) to generate the respective visual representation (e.g., the first visual representation, the second visual representation, or both). In some embodiments, the first respective image of the portion of the body includes an image on a curved surface (e.g., a contoured surface that mimics the contours of the face of the user, or a curved surface on which an image of the face or eye region of the face is wrapped), and the mask is a curved mask that alters at least one visual property (e.g., luminance, blur radius, resolution, color saturation, and/or other visual properties that affect the visual fidelity of the image) across the curved surface of the first respective image of the portion of the body. For example, as shown in FIGS. 7A-7B and/or FIGS. 7D-7E, the representation 7006 and/or the representation 7208 for the portion of the body of the user (e.g., the first user 7202 and/or the third user 7206) who has the first spatial relationship with the first display generation component 7100 are generated by an image on a curved surface (e.g., a contoured surface that corresponds to the contour of the face of the user and/or the surface of the second display generation component) and a curved mask that alters the luminance, blur radius, color, and/or other visual properties of the image, in accordance with some embodiments. In some embodiments, the mask is, for example, the gradient mask 7210 applied to the image of the portion of the body of the third user 7206 to generate the representation 7208 in FIGS. 7D-7E. For example, in some embodiments, the first respective image of the portion of the body includes an image that shows the eyes and regions of the face between the eyes and below the eyes, as well as the regions around the temple areas, and these facial features are laid out on a curved surface that follow the contour of the face in the regions near the eyes, between the eyes, around cheeks and temples. In some embodiments, the mask is a curved mask that have the same or similar (e.g., simplified) contour as the image of the portion of the body. Displaying the respective visual representation of the portion of the body of the user, including applying a curved mask to a first respective image of the portion of the body to generate the respective visual representation, the first respective image including an image on a curved surface, where the curved mask alters at least one visual property across the curved surface of the respective image, provides improved visual feedback to a viewer (e.g., improved visual feedback regarding the first respective image of the portion of the body).

In some embodiments, displaying the respective visual representation of the portion of the body includes applying a gradient mask to a second respective image of the portion of the body (e.g., a computer-generated image, a camera image, and/or or a generic image of the portion of the body) to generate the respective visual representation (e.g., the first visual representation, the second visual representation, or both) of the portion of the body. In some embodiments, the gradient mask alters at least one visual property (e.g., luminance, blur radius, resolution, color saturation, and/or other visual properties that affect the visual fidelity of the image) across a first region of the second respective image of the portion of the body that corresponds to a first body feature of the user (e.g., eyes, eyes and brows, or other more recognizable and individualized features of a person) (optionally, without altering the at least one visual property of a second region of the second respective image of the portion of the body that does not correspond to the first body feature of the user). For example, as shown in FIGS. 7D-7E, the gradient mask 7210 is applied to the image of the portion of the body of the third user 7206 that alters the display property (e.g., darkens, desaturates, and/or blurs) the eye region and/or the torso region of the portion of the body of the user, in accordance with some embodiments. For example, in some embodiments, the second respective image of the portion of the body includes an image that shows the eyes and regions of the face between the eyes and below the eyes, as well as the regions around the temple areas, and the gradient mask darkens and/or blurs the portion of the second respective image that corresponds to the eyes and brows, without darkening and/or blurring the portion of the second respective image that correspond to the cheeks and temples. In some embodiments, the gradient gets darker and blurrier as it gets closer to the eyes from the region below the eyes. Displaying the respective visual representation of the portion of the body of the user, including applying a gradient mask to a second respective image of the portion of the body to generate the respective visual representation, where the gradient mask alters a visual property across a first region of the second respective image of the portion, corresponding to a second respective body feature of the user, provides improved visual feedback to a viewer (e.g., improved visual feedback regarding the first body feature). In some embodiments, the first respective image of the portion of the body is different from the second respective image of the portion of the body. In some embodiments, the first respective image of the portion of the body is the same as the second respective image of the portion of the body. In some embodiments, the first respective body feature is different from the second respective body feature. In some embodiments, the first respective body feature is the same as the second respective body feature.

In some embodiments, the second respective body feature of the user includes eyes of the user, and wherein the gradient mask alters the at least one visual property (e.g., luminance, blur radius, resolution, color saturation, and/or other visual properties that affect the visual fidelity of the image) of the second respective image of the portion of the body in a region including and above the eyes of the user (e.g., eyes, eyes and brows) (e.g., without altering the at least one visual property of a second region of the second respective image of the portion of the body below the eyes of the user). For example, as shown in FIGS. 7D-7E, the gradient mask 7210 alters at least one visual properties (e.g., darkens, desaturates, and/or blurs) the region of the third user's face above the eyes of the third user 7206, while leaving a region below the eyes unaltered and/or altered to a lesser extent, in accordance with some embodiments. Displaying the respective visual representation of the portion of the body of the user, including applying the gradient mask that alters a visual property of the second respective image of the portion of the body in a region including and above the eyes of the user, provides improved visual feedback to a viewer (e.g., improved visual feedback regarding the eyes of the user).

In some embodiments, a representation of a first body feature (e.g., pupils, irises, and/or outlines of the eyes) in the portion of the body of the user is visible in both the first visual representation and the second visual representation of the portion of the body. For example, as shown in FIGS. 7A-7B and 7D-7E, the eyes and/or pupils of the first user 7202 are visible in the representation 7006 for the first user 7202 (FIGS. 7A-7B) and the eyes and/or pupils of the third user 7206 are visible in the representation 7208 for the third user 7206 (FIGS. 7D-7E), in accordance with some embodiments. In some embodiments, the representation of the first body feature has a higher level of fidelity (e.g., has higher luminance, contains more detailed and/or more accurate information regarding the shape, size, outline, color, individual characteristics of the first body feature, has higher color fidelity, higher resolution, and/or less blurring) in the first visual representation than in the second visual representation of the portion of the body. Displaying the respective visual representation of the portion of the body of the user, wherein a representation of a first body feature (e.g., pupils, irises, and/or outlines of the eyes) in the portion of the body of the user is visible in both the first visual representation and the second visual representation of the portion of the body, provides improved visual feedback to a viewer (e.g., improved visual feedback regarding the first body feature).

In some embodiments, in the method 8000, the computer system automatically detects (e.g., without requiring an explicit input corresponding to a request from the user to identify the current user of the device) whether the user meets the first criteria. For example, in FIGS. 7A and 7D, the computer system automatically determines whether the first user 7202 and the third user 7206 meets the first criteria (e.g., the criteria to determine whether the user is an enrolled user or a guest user for the computer system), respectively, in accordance with some embodiments. In some embodiments, the computer system initiates the process to determine whether the user meets the first criteria in response to detecting the user putting the HAD on his/her head, in response to detecting presence of eyes facing toward the first display generation component, and/or in response to detecting the presence of other people in front of the second display generation component or in the surrounding physical environment of the user. Detecting whether the user meets the first criteria is automatically performed by the computer device (e.g., automatic detection without requiring further user input).

In some embodiments, the computer system utilizes data collected from one or more biometric sensors (e.g., sensors that capture biometric features, such as irises, pupils, voiceprint, fingerprint, and/or facial features) to determine whether the identity of the user meets the first criteria (e.g., stored biometric information that corresponds to a primary user or enrolled user). For example, in FIGS. 7A and 7D, the computer system utilizes data collected from one or more biometric sensors to determine whether the first user 7202 and the third user 7206 meets the first criteria (e.g., the criteria to determine whether the user is an enrolled user or a guest user for the computer system), respectively, in accordance with some embodiments. Determining, by the computer system, of whether the identity of the user meets the first criteria, causes the computer device to automatically perform the step of utilizing data collected from one or more biometric sensors to determine whether the identity of the user meets the first criteria (e.g., automatic utilization of data collected from one or more biometric sensors, without requiring further user input). Utilizing data collected from one or more biometric sensors to determine whether the identity of the user meets the first criteria, provides improved security/privacy.

In some embodiments, the respective visual representation (e.g., the first visual representation, the second visual representation, or both) of the portion of the body includes a representation of a skin tone of the portion of the body (e.g., a skin tone of the face of the user as detected by one or more cameras is reproduced or is used as the basis to produce the skin tone of the respective image of the portion of the body in the respective visual representation). For example, in FIGS. 7A-7B, the representation 7006 for the first user 7202 includes a representation of a skin tone of the portion of the body of the first user 7202 (e.g., a darker tone than that of the representation 7208 for the third user 7206, a skin tone that is in a stored image of the first user, or a skin tone that is detected using one or more cameras of the computer system), in accordance with some embodiments. For example, in FIGS. 7D-7E, the representation 7208 for the third user 7206 includes a representation of a skin tone of the portion of the body of the third user 7206 (e.g., a lighter tone than that of the representation 7006 for the first user 7202, or a skin tone that is detected in real-time using one or more cameras of the computer system), in accordance with some embodiments. In some embodiments, the real-time detection of skin-tone, optionally, includes detection of skin tone that has some computational and/or signal processing delays (e.g., delays that are less than 0.5, 0.25, 0.1, 0.05, or 0.01 seconds and/or an amount that is not perceptible to most users). Displaying the respective visual representation of the portion of the body of the user, including a representation of a skin tone of the portion of the body, provides improved visual feedback to a viewer (e.g., improved visual feedback regarding skin tone of the portion of the body of the user).

In some embodiments, in accordance with a determination that the user does not meet the first criteria, the computer system detects the skin tone of the portion of the body, while the user is using the computer system, to generate the second visual representation of the portion of the body (e.g., a representation of the skin tone of the portion of the body as detected in real-time is included in the second visual representation of the portion of the body). For example, in FIGS. 7D-7E, the representation 7208 for the third user 7206 includes a representation of a skin tone of the portion of the body of the third user 7206 that is detected using one or more cameras of the computer system in real-time, while the third user 7206 is using the computer system, in accordance with some embodiments. In some embodiments, in accordance with a determination that the user meets the first criteria, the computer system does not detect the skin tone of the portion of the body in real-time but uses a stored skin tone to generate the representation of the skin tone in the first visual representation of the portion of the body. In some embodiments, the real-time detection of skin tone, optionally, includes detection of skin tone that has some computational and/or signal processing delays (e.g., delays that are less than 0.5, 0.25, 0.1, 0.05, or 0.01 seconds and/or an amount that is not perceptible to most users). In some embodiments, irrespective of whether the user meets the first criteria, the computer system detects the skin tone of the user in real-time and generates the respective visual representation of the portion of the user based on the detected skin tone. Determining, by the computer system, that the user does not meet the first criteria causes the computer system to automatically perform the operation of detecting the skin tone of the portion of the body, while the user is using the computer system, to generate the second visual representation of the portion of the body (e.g., automatic detection of the skin tone of the portion of the body without requiring further user input).

In some embodiments, in accordance with a determination that the user meets the first criteria, the computer system displays the first visual representation of the portion of the body based on a stored skin tone of the portion of the body that was detected in a previous use of the computer system by the user (e.g., a representation of the skin tone of the portion of the body as detected during a prior enrollment of the user as a primary user of the computer system is included in the first visual representation of the portion of the body). For example, in FIGS. 7A-7B, the representation 7006 for the first user 7202 includes a representation of a skin tone of the portion of the body of the first user 7202 that is based on a stored skin tone of the portion of the body that was detected in a previous use of the computer system by the first user 7202 (e.g., the skin tone in the representation 7006 for the first user 7202 may be different from the current skin tone of the first user 7202, as shown in FIGS. 7A-7B), in accordance with some embodiments. In some embodiments, in accordance with a determination that the user does not meet the first criteria, the computer system does not have any previously stored information on the skin tone of the portion of the body and detects the skin tone of the portion of the body in real-time to generate the representation of the skin tone in the second visual representation of the portion of the body. In some embodiments, the real-time detection of skin tone, optionally, includes detection of skin tone that has some computational and/or signal processing delays (e.g., delays that are less than 0.5, 0.25, 0.1, 0.05, or 0.01 seconds and/or an amount that is not perceptible to most users). Determining, by the computer system, that the user meets the first criteria causes the computer system to automatically perform the operation of displaying the second visual representation of the portion of the body based on a stored skin tone of the portion of the body that was detected in a previous use of the computer system by the user (e.g., automatic display of the second visual representation based on a stored skin tone of the user without requiring further user input).

In some embodiments, the computer system generates the representation of the skin tone of the portion of the body in accordance with a detected skin tone of a face of the user (e.g., detected in real time (e.g., optionally, accounting for some computational and/or signal processing delays (e.g., delays that are less than 0.5, 0.25, 0.1, 0.05, or 0.01 seconds and/or an amount that is not perceptible to most users)) (e.g., for the guest user and/or the primary user), and/or detected from a previous enrollment session (e.g., for the primary user)). For example, in some embodiments, the representation 7006 for the first user 7202 in FIGS. 7A-7B and/or the representation 7208 for the third user 7206 in FIGS. 7D-7E include respective representations of the skin tone for the portion of the body of the user, based on a detected skin tone of a face of the first user 7202 (e.g., detected in real-time and/or while the first user is using the computer system, or detected during previous use of the computer system by the first user) and/or a face of the third user 7206 (e.g., detected in real-time, and/or while the third user is using the computer system), respectively. In some embodiments, the real-time detection of skin tone, optionally, includes detection of skin tone that has some computational and/or signal processing delays (e.g., delays that are less than 0.5, 0.25, 0.1, 0.05, or 0.01 seconds and/or an amount that is not perceptible to most users). Detecting, by the computer system, the skin tone of a face of the user, causes the computer to automatically perform the operation of generating the representation of the skin tone of the portion of the body (e.g., automatically generate the representation of the skin tone of the portion of the body without requiring further user input).

In some embodiments, the computer system generates the representation of the skin tone of the portion of the body in accordance with a detected skin tone of a hand of the user (e.g., detected in real time (e.g., optionally, accounting for some computational and/or signal processing delays (e.g., delays that are less than 0.5, 0.25, 0.1, 0.05, or 0.01 seconds and/or an amount that is not perceptible to most users)) (e.g., for the guest user and/or the primary user), and/or detected from a previous enrollment session (e.g., for the primary user)). For example, in some embodiments, the representation 7006 for the first user 7202 in FIGS. 7A-7B and/or the representation 7208 for the third user 7206 in FIGS. 7D-7E include respective representations of the skin tone for the portion of the body of the user, based on a detected skin tone of a hand of the first user 7202 (e.g., detected in real-time and/or while the first user is using the computer system, or detected during previous use of the computer system by the first user) and/or a hand of the third user 7206 (e.g., detected in real-time, and/or while the third user is using the computer system), respectively. In some embodiments, the real-time detection of skin tone, optionally, includes detection of skin tone that has some computational and/or signal processing delays (e.g., delays that are less than 0.5, 0.25, 0.1, 0.05, or 0.01 seconds and/or an amount that is not perceptible to most users). Detecting, by the computer system, the skin tone of a hand of the user, causes the computer to automatically generate the representation of the skin tone of the portion of the body (e.g., automatically generate the representation of the skin tone of the portion of the body without requiring further user input).

In some embodiments, the computer system updates the appearance of the respective visual representation of the portion of the body based on the first change in appearance of the body of the user includes animating the respective visual representation of the portion of the body (e.g., animating the first visual representation (e.g., a higher fidelity computer-generated image or camera view) of the eyes, eyeballs, eye lids, eye brows, nose, and/or area between the eyes and eye brows, and/or animating the second visual representation (e.g., a lower fidelity computer-generated image or generic image) of the eyes, eyeballs, eye lids, eye brows, nose, and/or area between the eyes and eye brows) based on movement of the portion of the body (e.g., movements of the eyes, eyeballs, eye lids, eye brows, nose, and/or area between the eyes and eye brows). For example, in some embodiments, the representation 7006 for the first user 7202 in FIGS. 7A-7B and/or the representation 7208 for the third user 7206 in FIGS. 7D-7E are animated based on the change in appearance of the portion of the body of the first user 7202 (e.g., caused by visual changes of one or more visual properties (e.g., color, size, and/or shape), and movement of the body features in the portion of the body (e.g., eyes, brows, and/or cheeks) of the user) (e.g., detected in real-time and/or while the first user is using the computer system) and/or the third user 7206 (e.g., detected in real-time, and/or while the third user is using the computer system), respectively. In some embodiments, the animation of the representation 7006 and/or the detection of the change in appearance of the portion of the body of the user, optionally, includes animated changes and detected changes that have some computational and/or signal processing delays (e.g., delays that are less than 0.5, 0.25, 0.1, 0.05, or 0.01 seconds and/or an amount that is not perceptible to most users). In some embodiments, animating the respective visual representation of the portion of the body based on the movement of the portion of the body includes, in accordance with a determination that the user meets the first criteria, changing the appearance of the first visual representation of the portion of the body based on the first change in appearance of the body of the user includes animating the first visual representation of the portion of the body (e.g., animating a visual representation (e.g., a higher fidelity computer-generated image or camera view) of the eyes, eyeballs, eye lids, eye brows, nose, and/or area between the eyes and eye brows) based on movement of the portion of the body (e.g., movements of the eyes, eyeballs, eye lids, eye brows, nose, and/or area between the eyes and eye brows); and in accordance with a determination that the user does not meet the first criteria, changing the appearance of the second visual representation of the portion of the body based on the first change in appearance of the body of the user includes animating the first visual representation of the portion of the body (e.g., animating a visual representation (e.g., a lower fidelity computer-generated image or a generic image) of the eyes, eyeballs, eye lids, eye brows, nose, and/or area between the eyes and eye brows) based on movement of the portion of the body (e.g., movements of the eyes, eyeballs, eye lids, eye brows, nose, and/or area between the eyes and eye brows). Updating the appearance of the respective visual representation based on the first change in appearance of the body of the user, including animating the respective visual representation of the portion of the body based on movement of the portion of the body, provides improved visual feedback to a view (e.g., improved visual feedback regarding the appearance of the body of the user).

In some embodiments, animating the respective visual representation of the portion of the body based on movement of the portion of the body includes animating a visual representation of an eye (e.g., one or both eyes) of the user (e.g., a high fidelity computer-generated image or a camera view of the eyes of the user that meets the first criteria, and/or a low fidelity computer-generated image or a generic image of the eyes of the user that does not meet the first criteria) based on movement of the eye (e.g., one or both eyes) of the user (e.g., the animation is generated in accordance with real-time direction, magnitude, type of movements, and/or appearance of the eye of the user while the user is using the computer system, rather than based on pre-recorded movement of the eye of the user; and/or the live movement and visual appearance of the eye of the user are used to generate corresponding movement of the visual representation of the eye shown via that second display generation component). In some embodiments, the real-time animated changes to the representation of the portion of the body of the user and/or the detected change in appearance and movement of the portion of the body of the user, optionally, includes animated changes and/or detected changes and movements that have some computational and/or signal processing delays (e.g., delays that are less than 0.5, 0.25, 0.1, 0.05, or 0.01 seconds and/or an amount that is not perceptible to most users). For example, in some embodiments, the representation 7006 for the first user 7202 in FIGS. 7A-7B include a representation of the eyes of the first user 7202, and/or the representation 7208 for the third user 7206 in FIGS. 7D-7E include the representation of the eyes of the third user 7206. The representation of the eyes of the first user 7202 and/or the third user 7206 are animated based on the real-time movement of the eyes of the first user 7202 and/or the third user 7206, respectively, in accordance with some embodiments. In some embodiments, the real-time animated changes to the representation of the portion of the body of the user and/or the detected change in appearance and movement of the portion of the body of the user, optionally, includes animated changes and/or detected changes and movements that have some computational and/or signal processing delays (e.g., delays that are less than 0.5, 0.25, 0.1, 0.05, or 0.01 seconds and/or an amount that is not perceptible to most users). Animating a visual representation of an eye of the user, based on movement of the eye of the user, provides improved visual feedback to a view (e.g., improved visual feedback regarding the movement of the eye of the user).

In some embodiments, animating the respective visual representation of the portion of the body based on movement of the portion of the body includes animating a visual representation of a cheek (e.g., one or both cheeks) of the user (e.g., a high fidelity computer-generated image or a camera view of the cheeks of the user that meets the first criteria, and/or a low fidelity computer-generated image or a generic image of the cheeks of the user that does not meet the first criteria) based on movement of the cheek (e.g., one or both cheek) of the user (e.g., the animation is generated in accordance with real-time direction, magnitude, type of movements, and/or appearance of the cheek of the user while the user is using the computer system, rather than based on pre-recorded movement of the cheek of the user; and/or the live movement and visual appearance of the cheek of the user are used to generate corresponding movement of the visual representation of the cheek shown via that second display generation component). For example, in some embodiments, the representation 7006 for the first user 7202 in FIGS. 7A-7B include a representation of the cheeks below the eyes of the first user 7202, and/or the representation 7208 for the third user 7206 in FIGS. 7D-7E include the representation of the cheeks below the eyes of the third user 7206. The representation of the cheeks of the first user 7202 and/or the third user 7206 are animated based on the real-time movement of the cheeks of the first user 7202 and/or the third user 7206, respectively, in accordance with some embodiments. In some embodiments, the real-time animated changes to the representation of the portion of the body of the user and/or the detected change in appearance and movement of the portion of the body of the user, optionally, includes animated changes and/or detected changes and movements that have some computational and/or signal processing delays (e.g., delays that are less than 0.5, 0.25, 0.1, 0.05, or 0.01 seconds and/or an amount that is not perceptible to most users). Animating a visual representation of an eye of the user, based on movement of the cheek of the user, provides improved visual feedback to a view (e.g., improved visual feedback regarding the movement of the cheek of the user).

In some embodiments, displaying the respective visual representation of the portion of the body includes: in accordance with the determination the user meets the first criteria, and in accordance with a determination that the user has disabled using the first visual representation of the portion of the body of the user on the second display generation component, forgoing displaying the first visual representation of the portion of the body and displaying the second visual representation of the portion of the body. For example, in FIGS. 7A-7B, if the first user 7202 has disabled the use for the representation 7006 for the first user, the computer system would display the representation 7208 in place of the representation 7006 for the first user, in accordance with some embodiments. In some embodiments, updating the appearance of the respective visual representation of the portion of the body based on the first change in appearance of the body of the user includes: in accordance with the determination the user meets the first criteria, and in accordance with a determination that the user has disabled using the first visual representation of the portion of the body of the user on the second display generation component, forgoing changing the appearance of the first visual representation of the portion of the body based on the first change in appearance of the body of the user, and changing the appearance of the second visual representation of the portion of the body based on the first change in appearance of the body of the user. In some embodiments, the computer system detects a user input that corresponds to a request to disable the use of the higher fidelity computer-generated image or camera view of the user's eyes and/or face on the second display generation component, and the computer system in response to detecting the user input, switches from displaying and updating the first visual representation of the user's eyes and/or face to displaying and updating the second visual representation of the user's eyes and/or face based on the change in appearance of the user's eyes and/or face. In some embodiments, the computer system disables the use of the first visual representation of the portion of the body of the user for a period of time (e.g., the current usage session, a day, two hours, a user-specified time period, until the next power-up of the computer system, or until the primary user reenables the use of the first visual representation), and restores the use of the first visual representation for the user that meets the first criteria after the period of time has expired. Determining, by the computer system, that the user meets the first criteria, together with the determination that the user has disabled using the first visual representation of the portion of the body of the user on the second display generation component, causes the computer system to automatically perform the operation of forgoing displaying the first visual representation of the portion of the body and displaying the second visual representation of the portion of the body (e.g., automatically forgo displaying the first visual representation without further user input).

In some embodiments, while displaying the respective visual representation of the portion of the body of the user via the second display generation component, the computer system displays, via the second display generation component, status information associated with the display of the representation of the three-dimensional environment via the first display generation component. For example, in some embodiments, while displaying the representation 7006 for the first user 7202 via the second display generation component 7102 in FIGS. 7A-7B, and while displaying the representation 7208 for the third user 7206 via the second display generation component 7102 in FIGS. 7D-7E, the computer system also displays an overlay 7008 and the graphical elements 7004 to indicate the status information associated with the display of XR content 7002 via the first display generation component 7100. In some embodiments, displaying the status information includes displaying one or more indicators of the level of immersion with which the three-dimensional environment is displayed via the first display generation component. In some embodiments, displaying the status information includes displaying one or more indicators of the content that is displayed in the three-dimensional environment via the first display generation component. In some embodiments, displaying the status information includes displaying one or more indicators of the progress of content playback in the three-dimensional environment that is displayed via the first display generation component. In some embodiments, the status information is displayed in a different display layer from the respective visual representation of the portion of the body of the user. In some embodiments, the treatment mask (e.g., a gradient mask that darkens and/or blurs the respective visual representation of the portion of the body) is applied to the respective visual representation of the portion of the body of the user, while the treatment mask is not applied to the display layer of the status information. In some embodiments, the status information is displayed on top of the respective visual representation with the treatment mask applied to the respective visual representation before the overlay of the status information is applied to the respective visual representation of the portion of the body. Displaying, via the second display generation component, status information associated with the display of the representation of the three-dimensional environment via the first display generation component, while displaying the respective visual representation of the portion of the body of the user via the second display generation component, provides improved visual feedback to a viewer (e.g., improved visual feedback regarding status information associated with the display of the representation of the three-dimensional environment via the first display generation component).

In some embodiments, the computer system displays and updates the respective visual representation of the portion of the body in accordance with a determination that the representation of the three-dimensional environment is displayed with a first level of immersion (e.g., displaying a pass-through view of the physical environment, and/or an augmented reality view of the physical environment) via the first display generation component (e.g., the first level of immersion does not include more than a first threshold amount of virtual content (e.g., a first threshold quantity of virtual content, a first threshold ratio between virtual content and representation of physical environment, a first spatial extent of virtual content in the representation of the three-dimensional environment, and/or a threshold value based on other measures of the level of immersion). This is illustrated in FIGS. 7A-7B and 7D-7E, for example, where the representation 7006 and the representation 7208 of the portion of the body of the user is updated based on the change in appearance of the portion of the body of the user, in accordance with a determination that the XR content 7002 is displayed with a first level of immersion (e.g., a mixed reality mode). In some embodiments, the computer detects that a current level of immersion with which the representation of the three-dimensional environment is displayed via the first display generation component has increased (e.g., the amount of virtual content, the ratio between virtual content versus passthrough content, and/or the spatial extent covered by virtual content, in the representation of the three-dimensional environment have increased, e.g., due to progression of an experience or program that is already started, due to events occurring in the computer system, and/or due to user requests). In response to detecting that the current level of immersion with which the representation of the three-dimensional environment is displayed via the first display generation component has increased: in accordance with a determination that the current level of immersion does not meet immersion criteria, wherein the immersion criteria require that an amount of virtual content in the representation of the three-dimensional environment exceeds a first threshold amount of virtual content (e.g., a first threshold quantity of virtual content, a first threshold ratio between virtual content and representation of physical environment, a first spatial extent of virtual content in the representation of the three-dimensional environment, and/or a threshold value based on other measures of the level of immersion) in order for the immersion criteria to be met, the computer system continues to differentiate display of the respective visual representation of the portion of the body of the user via the second display generation component based on whether the user meets the first criteria (and, optionally, to update the appearance of the respective visual representation of the portion of the body of the user in accordance with the changes in appearance of the portion of the body of the user); and in accordance with a determination that the current level of immersion meets the immersion criteria (e.g., the representation of the three-dimensional environment is displayed via the first display generation component with a second level of immersion that is higher than the first level of immersion (e.g., the second level of immersion is a fully immersive level, that completely blocks out the view of the surrounding physical environment), and/or an amount of virtual content in the representation of the three-dimensional environment exceeds the first threshold amount of virtual content (e.g., the first threshold quantity of virtual content, the first threshold ratio between virtual content and representation of physical environment, the first spatial extent of virtual content in the representation of the three-dimensional environment, and/or the threshold value based on other measures of the level of immersion)), the computer system displays content on the second display generation component, irrespective of whether the user meets the first criteria (e.g., displaying only the status information, or displaying a generic representation of the portion of the user, irrespective of whether the primary user or the guest user is using the computer system) (e.g., the second display generation component show the same appearance when the user viewing content in a fully immersive way using the first display generation component). For example, as illustrated in FIGS. 7A-7B and 7D-7E, if the level of immersion increases but not reaching a threshold level of immersion, the computer system continues to differentiate the display of the representation of the portion of the body of the user based on whether the user meets the first criteria (e.g., representation 7006 or another representation that corresponds to a higher fidelity representation of the portion of the body of the first user 7202 is displayed when the first user 7202 is determined to meet the first criteria; and representation 7208 or another representation that corresponds to a lower fidelity representation of the portion of the body of the third user 7206 is displayed when the third user 7206), in accordance with some embodiments. However, as illustrated in FIGS. 7C and 7F, if the level of immersion increases and reaches a threshold level of immersion, the computer system no longer differentiates the display of the representation of the portion of the body of the user based on whether the user meets the first criteria (e.g., the same representation is used, or no representation of the portion of the body of the user is displayed) when displaying, via the second display generation component 7102 the overlay 7008 for the status of the XR content, in accordance with some embodiments. In some embodiments, as the current level of immersion increases (e.g., continuously, or through discrete levels), the visual clarity and/or prominence of the respective representation of the portion of the body of the user decreases (e.g., the representations for enrolled user and guest user become invisible or indistinguishable when the level of immersion reaches a threshold level of immersion (e.g., a fully immersive level, or another highly immersive level)). Correspondingly, in some embodiments, embodiments, as the current level of immersion decreases (e.g., continuously, or through discrete levels), the visual clarity and/or prominence of the respective representation of the portion of the body of the user increases (e.g., the representations for enrolled user and guest user become visible and/or distinguishable when the level of immersion drops below the threshold level of immersion (e.g., a fully immersive level, or another highly immersive level)). (e.g., the computer system causes the computer-generated three-dimensional environment displayed via the first display generation component to transition between the different levels of immersion in response to a sequence of one or more events (e.g., natural termination or progression of an application or experience; the start, stop, or pausing of an experience in response to a user input, and/or other sequence of events)). In some embodiments, the increasing levels of immersion (e.g., increase through a continuum or a number of discrete levels) correspond to increasing amount of virtual content that is present in the computer-generated environment and/or decreasing amount of passthrough content (e.g., views and/or representations of the surrounding physical environment) present in the computer-generated environment. In some embodiments, increasing levels of immersion correspond to different modes of content display that have increasing image fidelity and/or spatial extent (e.g., angular extent, spatial depth, and/or other measurement of fidelity or extent) for the computer-generated content, and decreasing image fidelity and/or spatial extent for representations of the surrounding physical environment. In some embodiments, a first level of immersion is a pass-through mode where the physical environment is fully visible to the user through the first display generation component (e.g., as a camera view of the physical environment or through a transparent portion of the first display generation component)) and the computer-generated environment includes the pass-through view of the physical environment with a minimal amount of virtual elements concurrently visible as the view of the physical environment or including virtual elements that are peripheral (e.g., indicators and controls displayed in the peripheral region of the display) to the user's view of the physical environment. In some embodiments, a second level of immersion is a mixed reality mode where the pass-through view of the physical environment is augmented with virtual elements generated by the computer system and have positions in the computer-generated environment that correspond to the central portion of the user's view of the physical environment and/or have positions in the computer-generated environment that correspond to locations and objects in the physical environment (e.g., the virtual content is integrated with the physical environment in the view of the computer-generated environment). In some embodiments, the second level of immersion includes a number of discrete sub-levels or a continuous range in that correspond to different amounts of virtual content relative to the representations of the physical environment in the three-dimensional environment. In some embodiments, a third level of immersion corresponds to a virtual reality mode in which that user's view of the physical environment is completely replaced or blocked by the view of virtual content provided by the first display generation component. In some embodiments, there are four different levels of immersion, where the first level of immersion corresponds to the pass-through mode of the first display generation component, the second level of immersion includes two sub-levels A and B that correspond to two separate sub-modes of the first display generation component (e.g., second level—A where a user interface or user interface objects are displaying in the main portion of the user's field of view while the pass-through view of the physical environment is displayed in the background of the user interface or user interface objects; and second level—B where virtual elements are integrated with representations of physical objects in the physical environment in an augmented reality view of the physical environment), and the third level of immersion corresponds to virtual reality mode of the first display generation component. Detecting, by the computer system, that the current level of immersion with which the representation of the three-dimensional environment is displayed via the first display generation component has increased, causes the computer system to automatically perform the operations of (i) continuing to differentiate display of the respective visual representation via the second display generation component based on whether the user meets the first criteria, when the computer system determines that the current level of immersion does not meet immersion criteria; and (ii) displaying content on the second display generation component, irrespective of whether the user meets the first criteria, when the computer system determines that the current level of immersion meets the immersion criteria (e.g., automatically adjust content that is displayed via the second display generation component in accordance with automatic determination of whether the current level of immersion meets the immersion criteria, without requiring further user input).

In some embodiments, while displaying, in accordance with the determination that the user meets the first criteria, the first visual representation of the portion of the body of the user via the second display generation component, the computer system detects a first user input (e.g., starting an immersive experience or application, starting playback of a three-dimensional media, entering a shared three-dimensional experience or communication session, toggling or pressing a hardware control on the HMD, providing a mode switching gesture (e.g., hand shielding over the eyes, hand closing/opening in front of eyes, and other suitable gestures), selecting a selectable control in a graphical user interface, and/or using a voice command to select a respective level of immersion or activate the DND mode) that corresponds to a request to switch a display mode of the second display generation component (e.g., toggling on/off the Do Not Disturb mode, where in the DND mode, the second display generation component does not display the representation of the user's eyes, and, optionally, the first display generation component does not display a representation of the physical environment; or starting or stopping other immersive experiences, media, and/or applications). In response to detecting the first user input that corresponds to the request to switch the display mode of the second display generation component (e.g., switching the DND mode from the OFF state to the ON state; or starting other immersive experiences, media, and/or applications), the computer system ceases to display the first visual representation of the portion of the body of the user (e.g., optionally, replacing it with the second visual representation or not displaying any visual representation of the portion of the body) via the second display generation component (and optionally, switching to a fully immersive mode on the first display generation component). While the first visual representation is not displayed via the second display generation component in accordance with the first user input that corresponds to the request to switch the display mode of the second display generation component, the computer system detects a second user input (e.g., pausing and/or stopping an immersive experience or application, pausing and/or stopping playback of a three-dimensional media, pausing and/or exiting a shared three-dimensional experience or communication session, toggling or pressing a hardware control on the MD, providing a mode switching gesture (e.g., hand shielding over the eyes, hand closing/opening in front of eyes, and other suitable gestures), selecting a selectable control in a graphical user interface, and/or using a voice command to select a respective level of immersion or deactivate the DND mode) that corresponds to a new request to switch the display mode of the second display generation component (e.g., switching the DND mode from the ON state to the OFF state; or stopping other immersive experiences, media, and/or applications). In response to detecting the second user input that corresponds to the new request to switch the display mode of the second display generation component, the computer system redisplays the first visual representation of the portion of the body of the user, in accordance with the determination that the user meets the first criteria (and optionally, switching back to a less immersive mode on the first display generation component). For example, in FIGS. 7A-7B, if the user provides a user input that corresponds to a request to turn on a DND mode, or increases the level of immersion to above a threshold of immersion (e.g., to a fully immersive state, or another high level of immersion), the computer system ceases to display the representation 7006 of the portion of the body of the first user 7202 with the overlay 7008 (e.g., displays only the overlay 7008 (e.g., in the manner shown in location B of FIG. 7C) or displays a generic representation 7208 for the first user 7202 (e.g., in the manner shown in location B in FIG. 7D-7E)) via the second display generation component 7102, in accordance with some embodiments. In FIG. 7C, if the user provides a user input that corresponds to a request to turn off a DND mode, or decreases the level of immersion to below the threshold level of immersion (e.g., to a mixed reality mode, to an intermediate level of immersion, or a passthrough mode), the computer system redisplays the representation 7006 of the portion of the body of the first user 7202, optionally, with the overlay 7008 via the second display generation component 7102, in accordance with some embodiments. Detecting, by the computer system, that the first user input that corresponds to the request to switch the display mode of the second display generation component, causes the computer system to automatically perform the operation of ceasing to display the first visual representation of the portion of the body of the user via the second display generation component (e.g., automatically cease to display the first visual representation without requiring further user input). The computer system automatically detects a second user input, corresponding to a new request to switch the display mode of the second display generation component, while the first visual representation is not displayed via the second display generation component, without requiring further user inputs. The detection, by the computer system, the second user input that corresponds to the new request to switch the display mode of the second display generation component, causes the computer system to automatically perform the operation of redisplaying the first visual representation of the portion of the body of the user when the computer system determines that the user meets the first criteria (e.g., automatically redisplay the first visual representation without requiring further user input).

In some embodiments, the computer system provides other special display modes for displaying the status information associated with the first user, such as a DND mode, a private mode, a parental control mode, or other modes, where the manner by which the status information is displayed and/or updated on the second display generation component is adjusted from the manner by which the status information is displayed and/or updated on the second display generation component when such special modes are not turned on (e.g., the manners as described above with respect to FIGS. 7A-7F, and FIGS. 7K-7O).

For example, a private mode is optionally activated by the computing system or the first user to hide the status information associated with the XR content that is currently displayed by the first display generation component, and/or status information associated with the first user's attention state. In some embodiments, while the private mode is turned on (e.g., in response to the first user's request), the representation 7006 of the portion of the first user 7202 and/or the overlay 7008 indicating the status of the XR content are no longer updated, cease to be displayed, and/or are replaced with other placeholder content on the second display generation component 7102, so that they no longer reflect the changes that are detected in the appearance of the portion of the body of the first user 7202 and/or the changes in the XR content that is being displayed via the first display generation component 7100. In some embodiments, the private mode is activated in response to a user request (e.g., a preset gesture input by the first user 7202, activation of a control on the HMD, and/or a voice command) that is detected by the computing system (e.g., when the computing system is using the mixed reality mode or the virtual reality mode to display the XR content to the first user 7202, and/or before the XR content is started). In some embodiments, the private mode is activated in response to the user accessing certain XR content that is associated with a respective privacy level that is above a first threshold privacy level (e.g., a default privacy level, and/or a privacy level associated with the first user). In some embodiments, while the private mode is turned on, the representation 7006 of the portion of the body of the first user 7202 and/or the overlay 7008 indicating the status of the XR content are no longer updated, cease to be displayed, and/or are replaced with other placeholder content, such that they no longer reflect the changes in the level of immersion with which the XR content is displayed by the first display generation component 7100. The private mode allows the first user 7202 to enjoy more privacy and share less information regarding his/her own attention state, appearance, level of immersion, and/or the content he/she is viewing using the first display generation component 7100 through the status information displayed via second display generation component 7102, in accordance with some embodiments.

In some embodiments, the DND mode is turned on proactively by the first user 7202, and/or automatically by the computer system based on a respective set of conditions, to indicate to the outside environment that the first user 7202 does not wish to be interrupted or disturbed by others in the outside environment during his/her engagement with the XR content. In some embodiments, the DND mode is optionally applicable to other intrusive events occurring within the computer system and/or in the surrounding physical environment. For example, in some embodiments, in response to activation of the DND mode, the computer system optionally activates noise cancellation to block sounds from the surrounding environment, stops/pauses presentation of notifications and/or alerts via the first display generation component 7100, reduces intrusiveness of the manner by which notifications and/or alerts are presented in the XR environment shown via the first display generation component 7100 (e.g., opting for visual alert rather than audio alert, opting for an short alert sound rather than a voice output, and/or reducing visual prominence of the notification and alert), automatically transfers calls to voicemail without notifying the first user 7202, and/or displays a do-not-disturb sign via the second display generation component 7102. In some embodiments, one or more ways that the computer system uses to reduce intrusiveness of events to the first user 7202 are accompanied by changes to how the representation of the physical environment (e.g., the representation 7010 of the second user 7204, representation of location B, and/or the representation of the portion of the physical environment in front of the first user 7202) is made visible via the first display generation component 7100, and/or changes to how status information is displayed via the second display generation component 7102. In some embodiments, the DND mode is optionally turned on while the computer system is displaying the XR content using the mixed reality mode, or the virtual reality mode. In some embodiments, in response to the DND mode being turned on, the computer system optionally displays a visual indicator (e.g., text label "DND" on the outer display of the HMD, a red edge is lit around the outer display of the HMD, and/or other indications) via the second display generation component 7102 to indicate that the DND mode is active. In some embodiments, while the DND mode is active on the computer system, the overlay indicating the status of the XR content is optionally updated in accordance with the change in the XR content displayed via the first display generation component 7100, but the representation of the portion of the body of the first user 7202 is no longer updated, is replaced by placeholder content, or ceases to be displayed via the second display generation component 7102 (e.g., irrespective of the changes in the appearance of the portion of the body of the first user (e.g., changes in the first user's eyes, eye region, and/or face), and/or changes in the level of immersion with which the XR content is displayed via the first display generation component 7100).

In some embodiments, the parental control mode is turned on to override the normal display of status information by the second display generation component 7100 (e.g., as described with respect to FIGS. 7A-7F, and FIGS. 7K-7O). The parental control mode is turned on such that a parent, teacher, or supervisor is able to see and monitor the XR content that is presented to the first user 7202 and optionally the inputs provided by the first user 7202 to change and/or interact with the XR content. In some embodiments, the parental control mode is optionally turned on by the first user 7202, or the second user 7204 (e.g., through a gesture input, a touch input on the second display generation component 7102, or activation of a control on the housing of the HMTD, and/or a voice command) while XR content is being presented via the first display generation component 7100. In some embodiments, the parental control mode is optionally turned on (e.g., through an interaction with a user interface presented via the first display generation component 7100, an interaction with a user interface presented via the second display generation component 7102, and/or an interaction with the housing or other input devices of the computer system) before XR content that meets parental control criteria is started on the first display generation component 7100, and remains turned on while the XR content that meets the parental control criteria is displayed via the first display generation component 7100. In some embodiments, while the parental control mode is turned on, the computer system displays the same XR content via both the first display generation component 7100 and the second display generation component 7102 at the same time (or with limited time lag due to hardware and/or software constraints), optionally, irrespective of the changes in the level of immersion and/or whether private mode is turned on. In some embodiments, the computer system only displays the virtual content portion of the XR content shown via the first display generation component 7100 on the second display generation component 7102. In some embodiments, while the parental control mode is turned on, the computer system does not display the representation 7006 of the portion of the body of the first user 7202 as part of the status information shown using the second display generation component 7202 (e.g., if the parental control mode is merely used to monitor the content shown to the first user 7202, and not the first user 7202 himself/herself). In some embodiments, while the parental control mode is turned on, the computer system displays the representation 7006 of the portion of the body of the first user 7202 and the XR content with comparable visibility (e.g., the visibility of the representation 7006 is enhanced as compared to the previous level of visibility it had when the parental control mode was not turned on) as the XR content (e.g., if the parental control mode is used to monitor the content shown to the first user, as well as the attention state and appearance of the portion of the body of the first user). In some embodiments, whether the representation of the portion of the body of the first user is displayed via the second display generation component 7102 during the parental control mode is determined in accordance with the manner by which the parental control mode is activated (e.g., using a first type of input vs. using a second type of input, and/or using a first control vs. using a second control). In some embodiments, whether the representation of the portion of the body of the first user is displayed via the second display generation component 7102 during the parental control mode is determined in accordance with whether the private mode is turned on. For example, if the private mode is turned on, the representation of the portion of the body of the first user 7202 is not displayed with the status information of the XR content via the second display generation component 7102; and if the private mode is not turned on, the representation of the portion of the body of the first user 7202 is displayed with the status information of the XR content via the second display generation component 7201. In some embodiments, while the parental control mode is turned on, the change (e.g., increase and/or decrease, and/or continuous change and/or discrete changes) in the level of immersion by which the XR content is presented via the first display generation component 7100 does not alter the information and content shown via the second display generation component 7102 (e.g., the same XR content (or the virtual portion thereof) is still shown on both the first display generation component 7100 and the second display generation component 7102, optionally, with the current visibility level of the representation of the portion of the body of the first user unchanged, or without display of the representation of the portion of the body of the first user).

It should be understood that the particular order in which the operations in FIG. 8 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 10000, 11000, 12000, and 13000) are also applicable in an analogous manner to method 8000 described above with respect to FIG. 8. For example, the gestures, gaze inputs, physical objects, user interface objects, and/or animations described above with reference to method 8000 optionally have one or more of the characteristics of the gestures, gaze inputs, physical objects, user interface objects, and/or animations described herein with reference to other methods described herein (e.g., methods 9000, 10000, 11000, 12000, and 13000). For brevity, these details are not repeated here.

FIG. 9 is a flowchart of a method 9000 of displaying an alert in response to detecting a start of media capture, in accordance with some embodiments.

The method 9000 is performed at a computer system including a first display generation component, a second display generation component (e.g., the first display generation component and the second display component are each a heads-up display, a head-mounted display (HMD), a display, a touchscreen, or a projector, or are separate displays of and/or enclosed in the same housing of a heads-up display, a head-mounted display (HMD), a display, a touchscreen, or a projector) and one or more input devices (e.g., cameras, controllers, touch-sensitive surfaces, joysticks, buttons, gloves, watches, motion sensors, biometric sensors, and/or orientation sensors). In some embodiments, the first display generation component and the second display generation component form a two-sided display device (e.g., a two-sided HMD (e.g., HMD 7100*a* in FIGS. 7G2, 7H2, 7L2, 7M2, 7N2, 7AA2, 7AB2; HMD 1-100 in FIG. 1B, or another HMD)) that displays a first user interface on a first side corresponding to the first display generation component (e.g., inward-facing displays, and/or display assembly 1-120 in FIG. 1C), and a second user interface on the second side corresponding to the second display generation component (e.g., outward-facing displays, and/or display assembly 1-108 in FIG. 1). More details of the computer system are provided in the description of the method 8000 above and are not repeated in the interest of brevity.

In performing the method 9000, while a representation of a three-dimensional environment is visible via the first display generation component (e.g., a view of one or more virtual elements and/or a representation of one or more portions of a physical environment via digital or optical passthrough are visible to a user who is in a position to view content displayed via the first display generation component), the computer system displays, via the second display generation component, one or more graphical elements (e.g., icons, graphics, text, colors, and/or animated visual changes thereof) that provide a visual indication of a status associated with a user who is in a position to view the representation of the three-dimensional environment that is visible via the first display generation component (e.g., a set of graphical elements to indicate the status of computer-generated content shown via the first display generation component, a set of graphical elements to indicate the status of the level of immersion with which the computer-generated content is shown via the first display generation component, a set of one or more graphical elements to indicate the status of the appearance of the user that is blocked by the first display generation component, and/or one or more sets of graphical elements to indicate other aspects of the status associated with the user), wherein displaying the one or more graphical elements includes changing the one or more graphical elements to represent changes in the status associated with the user who is in a position to view content that is visible via the first display generation component. For example, as shown in FIGS. 7G1-7G2 and 7J, the computer system displays XR content 7002 via the first display generation component, and displays, via the second display generation component 7102, one or more graphical elements that provides a visual indication of a status associated with a user (e.g., status associated with the first user 7202, including an overlay 7008 which provides an indication of the status of the XR content and the level of immersion, an app name 7306, and a representation 7006 of a portion of the body of the first user 7202) who is in a position to view the XR content 7002 via the first display generation component 7100. In some embodiments, the level of immersion can be another level of immersion (e.g., a higher level of immersion, or a lower level of immersion), and the user can be another user (e.g., the third user 7206), and the one or more graphical elements are displayed in accordance with the descriptions with respect to FIGS. 7A-7F, and 7K-7O, for example. In some embodiments, the visual indication of status includes a visual indication of computer-generated content that is displayed via the first display generation component, a visual indication of a level of immersion with which the computer-generated content is being presented via the first display generation component, and/or a visual indication of an appearance of the user (e.g., the appearance of a portion of a user's body (e.g., the portion blocked by the HMD, the eyes, the upper portion of the face, and/or the whole face), the user's facial expressions, the state of the user's eyes, and/or emotion or attention states of the user).

In some embodiments, the visual indication of status (e.g., the visual indication of the computer-generated content, alone or in combination with other aspects of the visual indication of status) is different from the content shown via the first display generation component, and/or has less details, less resolution, less saturation, and/or is more blurred than the content shown via the first display generation component. In some embodiments, the visual indication of status (e.g., the visual indication of the level of immersion, alone or in combination with other aspects of the visual indication of status) is different from a simple code (e.g., numerical, or textual) that designates a level in a plurality of levels, and optionally, uses the presence and appearance of the representation of the user's eyes or face to indicate the level of immersion. In some embodiments, the visual indication of status (e.g., the visual indication of the appearance of the user, alone or in combination with other aspects of the visual indication of status) is, optionally, different from a raw camera view or optical passthrough view of the user's eyes or face, and, optionally, applies visual effects and filters to change the appearance of a computer-generated image or camera view of the user's eyes or face. In some embodiments, the visual indication of the computer-generated content shown via the first display generation component is represented by shapes, colors, and distribution of colors, luminance, and/or other display properties in a first display layer shown via the second display generation component; and in response to detecting changes in the computer-generated content that is visible via the first display generation component, the computer system changes the visual indication of the computer-generated content, such as the shapes, colors, and distribution of colors, luminance, and/or other display properties in the first display layer shown via the second display generation component in accordance with (but not exactly replicating) the changes in the shapes, colors, luminance, and/or other display properties in the computer-generated content. In some embodiments, the visual indication of the level of immersion shown via the first display generation component is represented by the presence and/or appearance of a representation of a portion of the user in a second display layer shown via the second display generation component; and in response to detecting changes in the level of immersion for the XR content shown via the first display generation component, the computer system changes the visual indication of the level of immersion, such as by increasing or decreasing the visibility, level of details, and/or visual prominence of the representation of the portion of the user in accordance with a decrease or increase of the level of immersion. In some embodiments, the visual indication of the portion of the body of the user is a computer-generated image (e.g., a stored or enrolled image with likeness to a primary user, or a generic image for a guest user) or camera view of the portion of the body of the user; and in response to detecting changes in the appearance of the portion of the body of the user (e.g., due to movement or changes in the body features in the portion of the body, such as movement of the eyes, brows, nose, and/or cheeks, and/or overall attention state, facial expressions, and/or emotions), the computer system changes the visual indication of the appearance of the portion of the body of the user, such as by creating animated changes and movements (e.g., mimicking the movement of the body features and/or change in overall attention state, facial expression, and/or emotions) in the computer-generated image and/or camera view of the portion of the body of the user, in accordance with the changes in the appearance of the portion of the body of the user. In some embodiments, the visual representation of one aspect of the status (e.g., the visual representation of the computer-generated content, the visual representation of the level of immersion, the visual representation of the portion of the body of the user, and/or the visual representation of other types of status associated with the user) is displayed on the outside display of the HMD at a first display depth, and the visual representation of another, different, aspect of the status (e.g., the visual representation of the computer-generated content, the visual representation of the level of immersion, the visual representation of the portion of the body of the user, and/or the visual representation of other types of status associated with the user) is displayed on the outside display of the HMD at a second display depth that is different from the first display depth (e.g., deeper or farther away from an outside viewer of the second display generation component (e.g., the image of the user's eyes are displayed at a first graphic layer behind a second graphical layer that displays the one or more graphical elements that provides visual indication of the content in the first computer-generated three-dimensional environment)). In some embodiments, the first display generation component and the second display component are respectively integrated in the same device (e.g., a head-mounted display, or two-sided display device), with the first display generation component facing the user, and the second display generation component facing the outside environment when the integrated device is placed in a position relative to the user during normal operation (e.g., when the HMD is wore on the user's head and/or placed in front of the user's eyes).

In performing the method 9000, while displaying the one or more graphical elements via the second display generation component and while the representation of the three-dimensional environment is visible via the first display generation component, the computer system detects (9004) a first event (e.g., activation of a shutter button on the computer system or display generation component(s), activation of a software control in a media capture application, and/or satisfaction of a set of conditions to automatically start media capture using the computer system) that corresponds to a start of media capture using the computer system (e.g., video recording, audio recording, and/or image capturing of the physical environment surrounding the first display generation component and the second display generation component). In response to detecting the first event that corresponds to the start of media capture using the computer system, the computer system displays (9006), via the second display generation component, a first visual alert that indicates the start of media capture, wherein first visual alert is displayed concurrently with at least a portion of the one or more graphical elements that represent the status associated with the user who is in a position to view content that is visible via the first display generation component (e.g., displaying a visual effect, an animation, and/or a visual indicator, concurrently with the one or more graphical elements, and/or displaying an animated change of the one or more graphical elements that are not caused by the changes in the content displayed via the first display generation component, the change in the level of immersion, the changes in the appearance of the user, or the changes in other aspects of the status associated with the user). For example, in some embodiments, as shown in FIG. 7G1 and FIG. 7G2, in response to detecting that the first user has started media capture (e.g., by pressing and holding a button 7302, or by another input) using the computer system, the computer system displays a visual alert 7304 via the second display generation component 7102, where the visual alert 7304 is concurrently visible with the graphical elements that represent the status associated with the first user 7202 (e.g., status associated with the first user 7202, including an overlay 7008 which provides an indication of the status of the XR content and the level of immersion, an app name 7306, and a representation 7006 of a portion of the body of the first user 7202). In another example, in some embodiments, as shown in FIG. 7J, in response to detecting that the first user has started media capture (e.g., by pressing and releasing the button 7302, or by another input) using the computer system, the computer system displays a visual alert 7310 via the second display generation component 7102, where the visual alert 7310 is concurrently visible with the graphical elements that represent the status associated with the first user 7202 (e.g., status associated with the first user 7202, including an overlay 7008 which provides an indication of the status of the XR content and the level of immersion, an app name 7306, and a representation 7006 of a portion of the body of the first user 7202).

In some embodiments, the one or more graphical elements change their appearances over a period of time (e.g., the computer system displays real-time or periodic updates to the one or more graphical elements in accordance with the real-time or periodic changes occurring in the computer-generated three-dimensional environment during the respective period of time, and/or in accordance with real-time or periodic changes occurring to the appearance of the portion of the body of the user). In some embodiments, the real-time changes and/or updates, optionally, include changes and/or updates that have some computational and/or signal processing delays (e.g., delays that are less than 0.5, 0.25, 0.1, 0.05, or 0.01 seconds and/or an amount that is not perceptible to most users). For example, as shown in FIGS. 7I-7J, the one or more graphical elements (e.g., including an overlay 7008 which provides an indication of the status of the XR content and a representation 7006 of a portion of the body of the first user 7202, and other graphical elements (e.g., progress bar, application name, and/or other indicators) that are updated based on the status of the XR content, the change in appearance of the user, and/or the level of immersion) change their appearance over a period of time (e.g., while the alert 7304 remains displayed via the second display generation component during the media capture that has been started), in accordance with some embodiments. Displaying the one or more graphical elements, which change their appearances over a period of time, provide improved visual feedback to the user (e.g., improved visual feedback regarding the changes in the status associated with the user who is in the position to view content that is visible via the first display generation component).

In some embodiments, displaying the one or more graphical elements includes displaying, via the second display generation component, a first set of graphical elements of the one or more graphical elements (e.g., application icons, application names, content from the applications that has appearances unique to the applications, or other identifiers of applications) that indicates one or more active applications shown in the three-dimensional environment. For example, as shown in FIGS. 7G1-7J, the computer system displays a graphical element that indicates the application that is active in the XR content shown via the first display generation component 7100 includes an application called "App A," in accordance with some embodiments. In some embodiments, the computer system detects that a first application is no longer an active application (e.g., the user has closed the first application, moved his/her attention to another application, and/or pushed the first application to a background process) in the three-dimensional environment, and optionally, a second application has become an active application (e.g., the user has started the second application, moved his/her attention to the second application, and/or brought the second application to the foreground) in the three-dimensional environment, and in response, the computer system changes the first set of graphical elements of the one or more graphical elements (e.g., replacing the first set of graphical elements with another set of graphical elements, or changes the composition and/or appearance of the first set of graphical elements) to indicate that the first application is no longer active and/or the second application has become active in the three-dimensional environment. Displaying, via the second display generation component, the first set of graphical elements that indicates one or more active applications shown in the three-dimensional environment, provides improved visual feedback to the user (e.g., improved visual feedback regarding active applications shown in the three-dimensional environment).

In some embodiments, displaying the one or more graphical elements includes displaying, via the second display generation component, a second set of graphical elements of the one or more graphical elements (e.g., a computer-generated image of a portion of the body of the user, a generic image of a portion of the body of the user, and/or a camera view of a portion of the body of the user, and/or a manner of displaying the above based on the current level of immersion) that indicates a status of the user (e.g., an appearance of a portion of a body of the user, an attention or emotion state of the user, and/or a level of immersion engaged by the user). For example, as shown in FIGS. 7G1-7J, the computer system displays the representation 7006 of a portion of the body of the first user 7202 via the second display generation component to indicate the status of the first user 7202, in accordance with some embodiments. In some embodiments, the computer system detects that the appearance of the portion of the body of the user has changed (e.g., due to movement of one or more body features within the portion of the body of the user, due to change in facial expression, attention state, and/or emotional state, due to change in ambient lighting, due to change in virtual light (e.g., virtual light cast by content shown in the three-dimensional environment) shown on the portion of the body of the user); and in response, the computer system changes the second set of graphical elements of the one or more graphical elements (e.g., replacing the second set of graphical elements with another set of graphical elements, or changes the composition and/or appearance of the second set of graphical elements) to indicate the changes of the appearance of the portion of the body of the user. Displaying, via the second display generation component, the second set of graphical elements that indicates a respective status of the user, provides improved visual feedback to the user (e.g., improved visual feedback regarding the status of the user).

In some embodiments, the second set of graphical elements that indicates the respective status of the user includes a representation of a portion of a body of the user (e.g., a computer-generated image, a generic image, or a camera image of the portion of the body of the user (e.g., eyes, upper portion of the face, or the face of the user)). For example, as shown in FIGS. 7G1-7J, the computer system displays the representation 7006 of a portion of the body of the first user 7202, where the representation 7006 includes a representation of the eyes of the first user 7202, in accordance with some embodiments. Displaying, via the second display generation component, the second set of graphical elements that indicates the respective status of the user, including a representation of a portion of a body of the user, provides improved visual feedback to the user (e.g., improved visual feedback regarding the representation of the user).

In some embodiments, changing the one or more graphical elements to represent changes in the status associated with the user includes: changing an appearance of the representation of the portion of the body of the user (e.g., changing and/or animating the shapes, colors, positions, outlines, distribution of colors and luminance values, and/or other visual features of the representation of the portion of the body of the user) in accordance with changes in the appearance of the portion of the body of the user (e.g., changes to the shapes, colors, positions, outlines, distribution of colors and luminance values, and/or other visual features of the portion of the body of the user due to the movements of body features, change in facial expressions, attention state, and/or emotional states of the user). For example, the representation 7006 of the portion of the body of the first user 7202 as shown in FIGS. 7G1-7J is updated in appearance in accordance with changes in the appearance of the portion of the body of the first user, e.g., in the manners described with respect to FIGS. 7A-7B and/or FIGS. 7L1-7O, in some embodiments. In some embodiments, when light from the ambient physical environment change, and/or when the virtual light from the virtual content and/or when the virtual light from the virtual content and passthrough content shown via the first display generation component changes (e.g., due to change in the three-dimensional environment), the physical and virtual light cast on the portion of the body of the user changes the visual appearance of the portion of the user, and as a result, the computer system changes the appearance of the representation of the portion of the body of the user on the second display generation component, in accordance with the change in the virtual and physical light and the resulting change in the appearance of the portion of the body of the user. Changing an appearance of the representation of the portion of the body of the user, in accordance with changes in the appearance of the portion of the body of the user, provides improved visual feedback to the user (e.g., improved visual feedback regarding changes in the appearance of the portion of the body of the user).

In some embodiments, changing the one or more graphical elements to represent changes in the status associated with the user includes: animating one or more portions of the representation of the portion of the body of the user (e.g., animating portions that correspond to the eyes, nose, brows, cheeks, mouth, and/or other movable body features of the user in the portion of the body of the user) in accordance with movement of one or more body features that change the appearance of the portion of the body of the user (e.g., real-time movement and expressions of the eyes, nose, brows, cheeks, mouth, and/or other movable body features of the user in the portion of the body of the user). In some embodiments, the animation is generated in accordance with real-time direction, magnitude, type of movements, and/or appearance of the different body features of the user while the user is using the computer system, rather than based on pre-recorded movement of the body features of the user; and/or the live movement and visual appearance of the body features of the user are used to generate corresponding movement of the visual representations of the body features shown via that second display generation component). In some embodiments, the real-time movements, optionally, includes detected movements that have some computational and/or signal processing delays (e.g., delays that are less than 0.5, 0.25, 0.1, 0.05, or 0.01 seconds and/or an amount that is not perceptible to most users). For example, the representation 7006 of the portion of the body of the first user 7202 as shown in FIGS. 7G1-7J is animated in accordance with movement of body features (e.g., eyes, cheeks, and/or other portions) in the portion of the body of the first user 7202 that changes in the appearance of the portion of the body of the first user, e.g., in the manners described with respect to FIGS. 7A-7B and/or FIGS. 7L1-7O, in some embodiments. In some embodiments, when the user blinks, closes his/her eyes, look to the side, rolled his/her eyes, raises, furrows, or flashes his/her eyebrows, twitches his/her nose, smiles, showing different facial expressions or emotions, yawn, or otherwise moved one or more body features that change the appearance of the portion of the body of the user represented in the representation of the portion of the body of the user, the computer system animates one or more portions of the representation of the portion of the body of the user (e.g., showing the same or analogous movements of the body features in the computer-generated image, generic image, or camera view of the portion of the body of the user) according to the movement of their corresponding body features in the portion of the body of the user. Animating one or more portions of the representation of the portion of the body of the user, in accordance with movement of one or more body features that change the appearance of the portion of the body of the user, provides improved visual feedback to the user (e.g., improved visual feedback regarding changes in the appearance of the portion of the body of the user).

In some embodiments, displaying the one or more graphical elements includes displaying, via the second display generation component, a third set of graphical elements (e.g., based on presence and/or visual effect applied to a computer-generated image of a portion of the body of the user, a generic image of a portion of the body of the user, and/or a camera view of a portion of the body of the user) that indicates a level of immersion with which the three-dimensional environment is presented to the user via the first display generation component (e.g., absence of the representation of the portion of the body of the user indicates a fully immersive or highest level of immersion, concurrent display of an indication of content of the three-dimensional environment and a representation of the portion of the body of the user indicates a partially immersive or intermediate level of immersion, and display of the representation of the portion of the body of the user without displaying an indication of computer-generated content indicates a fully pass-through or lowest level of immersion). In some embodiments, the level of immersion is indicated by the presence and/or absence of the representation of the portion of the body of the user, and the presence of the overlay that indicates the status of the XR content displayed via the first display generation component. For example, in FIGS. 7G1-7J, the representation 7006 of the portion of the body of the first user 7202 is concurrently visible with the overlay 7008 that indicates the status of the XR content displayed via the first display generation component, which indicates that the XR content is displayed in a mixed reality mode, or an intermediate level of immersion. If the level of immersion changes, e.g., increases to a fully immersive state, the representation 7006 of the portion of the body of the first user 7202 would cease to be displayed and only the overlay 7008 would be displayed via the second display generation component 7102 (e.g., in the manner shown in FIG. 7C), in accordance with some embodiments. If the level of immersion changes, e.g., decreases to a lower level of immersion in a mixed reality mode, the representation 7006 of the portion of the body of the first user 7202 and the overlay 7008 remain displayed via the second display generation component, but their changed appearance would indicate that the level of immersion has decreased (e.g., in the manner shown in FIG. 7N1 following FIG. 7M1, and FIG. 7N2 following FIG. 7M2), in accordance with some embodiments. If the level of immersion changes, e.g., decreases to an even lower level of immersion (e.g., a passthrough mode), the representation 7006 of the portion of the body of the first user 7202 ceases to be displayed and only the overlay 7008 remains displayed via the second display generation component 7102 to indicate that the level of immersion has decreased to a complete pass-through state (e.g., in the manner shown in FIG. 7O), in accordance with some embodiments. Displaying, via the second display generation component, a third set of graphical elements that indicates a level of immersion with which the three-dimensional environment is presented to the user via the first display generation component, provides improved visual feedback to the user (e.g., improved visual feedback regarding a level of immersion with which the three-dimensional environment is presented to the user).

In some embodiments, displaying, via the second display generation component, the first visual alert that indicates the start of media capture includes: displaying a respective change in visual appearance of respective content displayed via the second display generation component, where the respective change in visual appearance of the respective content (e.g., animated light that is overlaid on top or below the status indications on the second display generation component and/or visual effects (e.g., variations of values and/or spatial distributions of values for one or more display properties, such as color, luminance, sharpness, blur radius, and/or resolution) applied to part or all of the status indications on the second display generation component) expands from a first portion of the second display generation component (e.g., a side, corner, or region that is closer to the control for media capture, or a region that is selected without consideration of the location of the control for media capture) toward a second portion of the second display generation component (e.g., a side, corner, or region that is farther away from the control for media capture, or a region that is selected without consideration of the location of the control for media capture). In some embodiments, the change in visual appearance spreads or propagates from one side, corner, or portion of the display region of the second display generation component to another side, corner, or portion of the display region of the second display generation component). For example, in FIG. 7H1 following FIG. 7G1, and FIG. 7H2 following FIG. 7G2, the alert 7304 expands from a lower left corner of the display side of the second display generation component 7102 toward the upper right corner of the display side of the second display generation component 7102, in accordance with some embodiments. Similarly, in FIG. 7J, the alert 7310 expands from a lower left corner of the display side of the display side of the second display generation component 7102 toward the upper right corner of the display side of the second display generation component, in accordance with some embodiments. In some embodiments, the alert 7304 and/or the alert 7310 would expand from the lower right corner of the display side of the second display generation component 7102 toward the upper left corner of the display side of the second display generation component 7102 if the lower right corner of the display side of the second display generation component 7102 corresponds to the side of the HMD that has the control used to start the media capture (e.g., represented as control 7302 on the side of the first display generation component, and represented as control 7302' on the side of the second display generation component, in FIGS. 7G1-7J), for example. In some embodiments, the first portion of the second display generation component is in a central region of the display region of the second display generation component, and the change in visual appearance expands from the central region of the display region of the second display generation component toward the peripheral regions of the display regions of the second display generation component. In some embodiments, the first portion of the second display generation component is in a first side or corner region of the display region of the second display generation component that is on the side of the control for starting the media capture, and the change in visual appearance expands or propagates from the first side or corner region of the display region of the second display generation component toward a second, opposite side or corner of the display regions of the second display generation component. Displaying, via the second display generation component, a change in visual appearance of content, where the change in visual appearance expands from a first portion of the second display generation component toward a second portion of the second display generation component, provides improved visual feedback to the user (e.g., improved visual feedback regarding the first visual alert that indicates the start of media capture).

In some embodiments, displaying, via the second display generation component, the first visual alert that indicates the start of media capture includes: displaying a change in visual appearance of a three-dimensional shape (e.g., projecting animated light and colors onto a three-dimensional mesh (e.g., a mesh that corresponds to the three-dimensional contours of the user's face and/or the surface of the second display generation component)) via the second display generation component. For example, the alert 7304 in FIGS. 7G1-7I and/or the alert 7310 in FIG. 7J includes a change in visual appearance of a three-dimensional shape via the second display generation component 7102, in accordance with some embodiments. In some embodiments, the change in visual appearance is animated light and colors that expand from the central region of the display region of the second display generation component toward the peripheral regions of the display regions of the second display generation component, across a three-dimensional mesh or surface that wrap around the head, face, or eyes of the user. In some embodiments, the change in visual appearance is animated light and colors that expands or propagates from a first side or corner region of the display region of the second display generation component toward a second, opposite side or corner of the display regions of the second display generation component, across a three-dimensional mesh or surface that wrap around the head, face, or eyes of the user. Displaying, via the second display generation component, a change in visual appearance of a three-dimensional shape, provides improved visual feedback to the user (e.g., improved visual feedback regarding the first visual alert that indicates the start of media capture).

In some embodiments, detecting the first event that corresponds to the start of media capture using the computer system includes: detecting activation of a first hardware control (e.g., a hardware or solid-state button, switch, touch-sensitive surface, toggle, a digital crown and/or dial, that is located on a remote control device, the computer system, the first display generation component, the second display generation component, and/or the HMD comprising the first display generation component and the second display generation component), wherein the media capture is started in response to detecting the activation of the first hardware control. For example, in FIGS. 7G1 (and 7G2) and 7J, the media capture is started in response to the activation of the hardware control 7302 (e.g., also represented as control 7302' on the second display generation component 7102) by the first user 7202, in accordance with some embodiments. In some embodiments, the computer system wait until the media capture is successfully started before displaying the first visual alert that indicates the start of media capture. In some embodiments, the computer system does not wait until the media capture is successfully started before displaying the first visual alert that indicates the start of media capture, and instead, displays the first visual alert in response to detecting the activation of the first hardware control. Detecting, by the computer system, activation of a first hardware control causes the computer system to automatically perform the operation of starting the media capture (e.g., automatically start media capture without requiring further user input).

In some embodiments, displaying, via the second display generation component, the first visual alert that indicates the start of media capture includes: displaying a respective change in visual appearance of respective content displayed via the second display generation component, where the respective change in visual appearance of the respective content (e.g., animated light that is overlaid on top or below the status indications on the second display generation component and/or visual effects (e.g., variations of values and/or spatial distributions of values for one or more display properties, such as color, luminance, sharpness, blur radius, and/or resolution) applied to part or all of the status indications on the second display generation component) expands outward from a respective portion (e.g., a side, corner, or central region) of the second display generation component that is proximate to the first hardware control, across at least a portion of a first respective display region of the second display generation component. For example, in FIGS. 7G1 (and 7G2) and/or FIG. 7J, if the lower right corner of the display side of the second display generation component 7102 corresponds to the side of the HMD that has the control used to start the media capture (e.g., represented as control 7302 on the side of the first display generation component, and represented as control 7302' on the side of the second display generation component, in FIGS. 7G-7J), the alert 7304 (FIGS. 7G1 and 7G2) and/or the alert 7310 (FIG. 7J) would expand from the lower right corner of the display side of the second display generation component 7102 toward the upper left corner of the display side of the second display generation component 7102, in accordance with some embodiments. In some embodiments, the first hardware control is a button, a digital crown, or another type of hardware control located on the edge or rim of the HMD encompassing the first display generation component and the second display generation component. Displaying a respective change in visual appearance of respective content displayed via the second display generation component, where the respective change in visual appearance of the respective content expands outward from a respective portion of the second display generation component that is proximate to the first hardware control, across at least a portion of a first respective display region of the second display generation component, provides improved visual feedback to the user (e.g., improved visual feedback regarding provides improved visual feedback to the user (e.g., improved visual feedback regarding the alarm type and alarm time from a single user interface).

In some embodiments, the activation of the first hardware control corresponds to a down-click of the first hardware control. For example, as shown in FIGS. 7G1 and 7G2, the activation of the control 7302 corresponds to a down-click of the control 7302 (e.g., after the control 7302 is pressed and held down for at least a threshold amount of time without being released), which, optionally, starts a video capturing of the physical environment by the computer system, in accordance with some embodiments. In some embodiments, the media capture is started and the first visual alert is displayed, in response to detecting the down-click of the first hardware control without detecting the up-click of the first hardware control or irrespective of whether the up-click of the first hardware control has been detected. Activating the first hardware control, corresponding to a down-click of the first hardware control, provides additional control options (e.g., starting a video capture of the physical environment) without cluttering the UI with additional displayed controls (e.g., additional control options via the first hardware control).

In some embodiments, the activation of the first hardware control corresponds to an up-click of the first hardware control following a down-click of the first hardware control. For example, as shown in FIG. 7J, the activation of the control 7302 corresponds to an up-click of the control 7302 (e.g., after the control 7302 is pressed and released before a threshold amount of time has passed), which, optionally, starts a still image capturing of the physical environment by the computer system, in accordance with some embodiments. In some embodiments, the media capture is started and the first visual alert is displayed, in response to detecting the up-click of the first hardware control after having detected the down-click of the first hardware control. Activating the first hardware control, corresponding to an up-click of the first hardware control following a down-click of the first hardware control, provides additional control options (e.g., starting a still image capture of the physical environment) without cluttering the UI with additional displayed controls (e.g., additional control options via the first hardware control).

In some embodiments, displaying, via the second display generation component, the first visual alert that indicates the start of media capture includes: in accordance with a determination that the start of media capture includes a start of still media capture (e.g., a single photo, or a limited number of individual photos), displaying the first visual alert with a first visual appearance; and in accordance with a determination that the start of media capture includes a start of video media capture (e.g., a video, a continuous sequence of image frames that are sufficient forms a video), displaying the first visual alert with a second visual appearance that is different from the first visual appearance. For example, in FIGS. 7G1 and 7G2 and FIG. 7J, the alert 7304 that is displayed in response to the start of video capture (FIGS. 7G1 and 7G2) has a different visual appearance from the alert 7310 that is displayed in response to the start of still image capture (FIG. 7J), in some embodiments. In some embodiments, in accordance with a determination that the start of media capture includes a start of audio-only media capture, the computer system optionally displays another visual alert to indicate the start of audio-only media capture. In some embodiments, video media capture includes synchronous image and audio capture. In some embodiments, video media capture includes image capture without audio capture. Determining, by the computer system, that the start of media capture includes a start of still media capture, causes the computer system to automatically display the first visual alert with a first visual appearance (e.g., automatically display the first visual alert with a first visual appearance without requiring further user input). Determining, by the computer device, that the start of media capture includes a start of video media capture, causes the computer system to automatically display the first visual alert with a second visual appearance that is different from the first visual appearance (e.g., automatically display the first visual alert with a second visual appearance without requiring further user input).

In some embodiments, displaying the first visual alert with the first visual appearance includes displaying the first visual alert with a first color (e.g., red, blue, or another set of one or more colors), and wherein displaying the first visual alert with the second visual appearance includes displaying the first visual alert with a second color (e.g., white, yellow, or another set of one or more colors different from the set of colors used for the first visual appearance) different from the first color. For example, in FIGS. 7G1 and 7G2 and FIG. 7J, the alert 7304 that is displayed in response to the start of video capture (FIGS. 7G1 and 7G2) has a different color from the alert 7310 that is displayed in response to the start of still image capture (FIG. 7J), in some embodiments. Displaying the first visual alert with the first visual appearance, including displaying the first visual alert with a first color, and displaying the first visual alert with the second visual appearance, including displaying the first visual alert with a second color different from the first color, provides improved visual feedback to the user (e.g., improved visual feedback regarding the first visual alert).

In some embodiments, displaying the first visual alert with the first visual appearance includes displaying a first animated sequence (e.g., a flash of color(s), expanding circles or other shapes, pulsating light, and/or other animated changes, that propagate across the display region of the second display generation component), and wherein displaying the first visual alert with the second visual appearance includes displaying a second animated sequence (e.g., a periodic variation of color(s), propagating linear wavefronts or wavefronts of other shapes, patterns of light, continuous glows, and/or other animated changes that are different from the first animated sequence, that propagate across the display region of the second display generation component) that is different from the first animated sequence. For example, in FIGS. 7G1 and 7G2 and FIG. 7J, the alert 7304 that is displayed in response to the start of video capture (FIGS. 7G1 and 7G2) has a different animated sequence from the alert 7310 that is displayed in response to the start of still image capture (FIG. 7J), in some embodiments. In some embodiments, visual feedback for video media capture is animated (e.g., as pulses of light running across the display area, and/or other types of animated visual alerts) and visual feedback for still image capture is not animated (e.g., is a static and/or stationary indicator, or another type of static visual feedback). Displaying the first visual alert with the first visual appearance, including displaying a first animated sequence, and displaying the first visual alert with the second visual appearance, including displaying a second animated sequence that is different from the first animated sequence, provides improved visual feedback to the user (e.g., improved visual feedback regarding the first visual alert).

In some embodiments, the first visual alert is spatially asymmetrical across a second respective display region of the second display generation component. For example, in FIGS. 7G1 and 7G2 and FIG. 7J, the alert 7304 that is displayed in response to the start of video capture (FIGS. 7G1 and 7G2) and/or the alert 7310 that is displayed in response to the start of still image capture (FIG. 7J) are asymmetrical (e.g., biased toward the side that does not have the control 7302), in some embodiments. Providing a first visual alert that is spatially asymmetrical across a second respective display region of the second display generation component, provides improved visual feedback to the user (e.g., improved visual feedback regarding the first visual alert). In some embodiments, the first respective display region of the second display generation component is the same as the second respective display region of the second display generation component. In some embodiments, the first respective display region of the second display generation component is different from the second respective display region of the second display generation component.

In some embodiments, the first visual alert is visually biased (e.g., is more visually prominent (e.g., has a greater intensity, luminance, faster changes, and/or more color saturation and/or opacity), and/or has more rapid changes) toward a first side (e.g., bottom side, top side, left side, right side, or a side that is closer to the control of media capture) of the second respective display region of the second display generation component. For example, in FIGS. 7G1 and 7G2 and FIG. 7J, the alert 7304 that is displayed in response to the start of video capture (FIGS. 7G1 and 7G2) and/or the alert 7310 that is displayed in response to the start of still image capture (FIG. 7J) are asymmetrical (e.g., biased toward a side that does not have the control 7302, biased toward the bottom of the second respective display region of the second display generation component 7102), in some embodiments. Providing a first visual alert that is visually biased toward a first side of the second respective display region of the second display generation component, provides improved visual feedback to the user (e.g., improved visual feedback regarding the first visual alert).

In some embodiments, the first visual alert is visually biased (e.g., is more visually prominent (e.g., has a greater intensity, luminance, faster changes, and/or more color saturation and/or opacity), and/or has more rapid changes) toward a first corner (e.g., upper left, upper right, lower left, lower right, or a corner that is closer to the control of media capture) of the second respective display region of the second display generation component. For example, in FIGS. 7G1 and 7G2 and FIG. 7J, the alert 7304 that is displayed in response to the start of video capture (FIGS. 7G1 and 7G2) and/or the alert 7310 that is displayed in response to the start of still image capture (FIG. 7J) are asymmetrical (e.g., biased toward a corner of the second respective display region of the second display generation component 7102), in some embodiments. Providing a first visual alert that is visually toward a first corner of the second respective display region of the second display generation component, provides improved visual feedback to the user (e.g., improved visual feedback regarding the first visual alert).

In some embodiments, the computer system detects continuation of media capture after the start of media capture. In response to detecting the continuation of media capture, the computer system displays a second visual alert for at least a portion of a time period in which the media capture is continued after the start of media capture. For example, in FIG. 7H1 following FIG. 7G1 and in FIG. 7H2 following FIG. 7G2, the computer system detects continuation of media capture (e.g., continuation of video capture) after the start of media capture, and the computer system displays an alert 7304-b (e.g., a continuation of 7304-a in FIGS. 7G1 and 7G2), to indicate the continuation of media capture, in accordance with some embodiments. In some embodiments, the second visual alert is of the same type and nature as the first visual alert and is simply repeated or extended in duration. In some embodiments, the second visual alert has a different appearance from the first visual alert (e.g., is less visually prominent than the first visual alert, is more visually prominent than the first visual alert). Detecting, by the computer system, the continuation of media capture, causes the computer system to automatically display a second visual alert for at least a portion of a time period in which the media capture is continued after the start of media capture (e.g., automatically display a second visual alert without requiring further user input).

In some embodiments, the media capture includes video capture, and the second visual alert is maintained while the video capture is continued. For example, in FIG. 7H1 following FIG. 7G1 and in FIG. 7H2 following FIG. 7G2, the computer system detects continuation of media capture (e.g., continuation of video capture) after the start of media capture, and the computer system displays an alert 7304-b (e.g., a continuation of 7304-a in FIGS. 7G1 and 7G2) and maintains display of the alert 7304-b while the media capture is continued, in accordance with some embodiments. Maintaining the second visual alert, while the video capture is continued, provides improved visual feedback to the user (e.g., improved visual feedback regarding the second visual alert).

In some embodiments, the computer system detects termination of media capture (e.g., automatic termination of the media capture and/or termination of media capture caused by user request (e.g., the user has pressed a hardware button on the HMD, selected the stop option in a camera user interface displayed via the first display generation component, and/or stopped a process or application that is performing the media capture using an application user interface of the process or application, provided a voice command or gesture command to stop or pause the media capture) and/or system limitations (e.g., lack of data storage, file access authority, and/or lighting or stability conditions; and/or preestablished limitations on the duration, file size, and/or subject matter of the media capture)) after the start and the continuation of media capture. In response to detecting the termination of media capture, the computer system ceases to display the second visual alert. For example, in FIG. 7H1 following FIG. 7G1 and in FIG. 7H2 following FIG. 7G2, the computer system detects continuation of media capture (e.g., continuation of video capture) after the start of media capture, and the computer system displays an alert 7304-b (e.g., a continuation of 7304-a in FIGS. 7G1 and 7G2), to indicate the continuation of media capture; and in response to detecting termination of the media capture, the computer system ceases to display the alert 7304-b, in accordance with some embodiments. Detecting, by the computer system, termination of media capture after the start and the continuation of media capture, causes the computer system to automatically cease to display the second visual alert (e.g., automatically cease to display the second visual alert without requiring further user input).

In some embodiments, ceasing to display the second visual alert includes: causing cessation of changes in visual appearance of content displayed via the second display generation component, where the cessation of the changes in visual appearance (e.g., cessation of animated light and/or visual effects applied to part or all of the status indications on the second display generation component) expands toward a respective portion (e.g., a side, corner, or central region) of the second display generation component that is proximate to the first hardware control, across at least a portion of a display region of the second display generation component. For example, as shown in FIG. 7I following FIG. 7H1 (or FIG. 7H2), in response to detecting the termination of media capture (e.g., video capture), the computer system ceases to display the alert 7304-*b*, and shows the alert 7304-*b* moving toward a portion of the display region of the second display generation component 7102 from which the alert first emerged in response to the start of the media capture. In some embodiments, if the lower right corner of the display side of the second display generation component 7102 corresponds to the side of the HMD that has the control used to start the media capture (e.g., represented as control 7302 on the side of the first display generation component, and represented as control 7302' on the side of the second display generation component, in FIGS. 7G1-7J), the alert 7304 (FIGS. 7G1 and 7G2) and/or the alert 7310 (FIG. 7J) would expand from the lower right corner of the display side of the second display generation component 7102 toward the upper left corner of the display side of the second display generation component 7102 when the media capture is first started, and would retract from the upper left corner of the display side of the second display generation component 7102 toward the lower right corner of the display side of the second display generation component 7102, in accordance with some embodiments. Ceasing to display the second visual alert, including causing cessation of changes in visual appearance of content displayed via the second display generation component, provides improved visual feedback to the user (e.g., improved visual feedback regarding the second visual alert).

In some embodiments, after a respective termination of media capture is detected, the computer system plays back, via the first display generation component, a first media content item that is produced as a result of the media capture. For example, after the respective termination of media capture (e.g., in FIGS. 7I and 7J), the video and/or still images resulted from the media capture can be displayed or played back by the computer system via the first display generation component 7100. In some embodiments, the media captured through the media capturing process are stored as one or more media files in a media library locally on the computer system and/or uploaded to another computer system (e.g., a companion device, such as a desktop computer or a mobile device, a smart phone, or a tablet device; or a remote server). In some embodiments, the media library is searchable using one or more keywords related to the automatically stored context (e.g., time, location, program used, duration, username, file size, and/or other types of metadata associated with the media files) and automatically recognized subject matter in the captured media. In some embodiments, the captured can be viewed in a user interface of a viewer application (e.g., a printing application, a browser application, a camera application, a photo editing application, and/or a media editor application) and/or an application (e.g., a teleconference application, a camera application, a media capture application, a surveillance application, an electronic game, and other applications) from which the media capture was started. Playing back, by the computer system via the first display generation component, a first media content item that is produced as a result of the media capture, after a respective termination of media capture is detected, reduces the number of inputs needed to perform playback of the first media content item.

It should be understood that the particular order in which the operations in FIG. 9 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 10000, 11000, 12000, and 13000) are also applicable in an analogous manner to method 9000 described above with respect to FIG. 9. For example, the gestures, gaze inputs, physical objects, user interface objects, and/or animations described above with reference to method 9000 optionally have one or more of the characteristics of the gestures, gaze inputs, physical objects, user interface objects, and/or animations described herein with reference to other methods described herein (e.g., methods 8000, 10000, 11000, 12000, and 13000). For brevity, these details are not repeated here.

FIG. 10 is a flowchart of a method 10000 of changing a level of immersion with which XR content is displayed via a first display generation component in response to detecting an event, and changing the appearance of the status information associated with the user that is displayed via a second display generation component, in accordance with the change in the level of immersion, in accordance with some embodiments.

The method 10000 is performed at a computer system including a first display generation component, a second display generation component (e.g., the first display generation component and the second display component are each a heads-up display, a head-mounted display (HMD), a display, a touchscreen, or a projector, or are separate displays of and/or enclosed in the same housing of a heads-up display, a head-mounted display (HMD), a display, a touchscreen, or a projector) and one or more input devices (e.g., cameras, controllers, touch-sensitive surfaces, joysticks, buttons, gloves, watches, motion sensors, biometric sensors, and/or orientation sensors). In some embodiments, the first display generation component and the second display generation component form a two-sided display device (e.g., a two-sided HMD (e.g., HMD 7100a in FIGS. 7G2, 7H2, 7L2, 7M2, 7N2, 7AA2, 7AB2; HMD 1-100 in FIG. 1B, or another HMD)) that displays a first user interface on a first side corresponding to the first display generation component (e.g., inward-facing displays, and/or display assembly 1-120 in FIG. 1C), and a second user interface on the second side corresponding to the second display generation component (e.g., outward-facing displays, and/or display assembly 1-108 in FIG. 1). More details of the computer system are provided in the description of the method 8000 above and are not repeated in the interest of brevity.

In some embodiments, in the method 10000, while a representation of a three-dimensional environment is visible via the first display generation component (e.g., a view of one or more virtual elements and/or a representation of one or more portions of a physical environment are visible via digital and/or optical passthrough provided by the first display generation component), the computer system displays (10002), via the second display generation component, one or more graphical elements (e.g., icons, graphics, text, colors, and/or animated visual changes thereof) that represent a status associated with a user who is in a position to view content that is visible via the first display generation component (e.g., a set of graphical elements to indicate the status of computer-generated content shown via the first display generation component, a set of graphical elements to indicate the status of the level of immersion with which the computer-generated content is shown via the first display generation component, a set of one or more graphical elements to indicate the status of the appearance of the user that is blocked by the first display generation component, and/or one or more sets of graphical elements to indicate other aspects of the status associated with the user), wherein displaying the one or more graphical elements that represent the status associated with the user includes: in accordance with a determination that a current level of immersion with which the representation of the three-dimensional environment is provided via the first display generation component is a first level of immersion, displaying (10004) the one or more graphical elements that represent the status associated with the user with a first appearance that is based on a first set of one or more visual properties and the status associated with the user (e.g., a first set of visual filters, and/or a first set of processing steps for generating a first overlay from the content displayed via the first display generation component); and in accordance with a determination that the current level of immersion is a second level of immersion different from the first level of immersion (e.g., a higher level of immersion, or a lower level of immersion), displaying (10006) the one or more graphical elements that represent the status associated with the user with a second appearance that is based on a second set of one or more visual properties, different from the first set of one or more visual properties, and the status associated with the user (e.g., a second set of visual filters different from the first set of visual filters, and/or a second set of processing steps for generating the first overlay from the content displayed via the first display generation component that is different from the first set of processing steps). For example, in FIGS. 7K and 7L1 (and 7L2), the XR content 7002 is displayed via the first display generation component 7100 with a first example level of immersion (e.g., a level of immersion that corresponds to a fully immersive state, or a highly immersive state), and the one or more graphical elements that represent the status associated with the first user 7202 are displayed with a first example appearance that is based on a first example set of visual properties (e.g., the representation of the portion of the body of the first user 7202 is not visible, while the overlay 7008 indicating the status of the XR content 7002 has a high visibility); in FIGS. 7M1 and 7M2, the XR content 7002 is displayed via the first display generation component 7100 with a second example level of immersion (e.g., a level of immersion that corresponds to an intermediate level of immersion, and/or a mixed reality mode), and the one or more graphical elements that represent the status associated with the first user 7202 are displayed with a second example appearance that is based on a second example set of visual properties (e.g., the representation 7006 of the portion of the body of the first user 7202 is visible concurrently with the overlay 7008 indicating the status of the XR content 7002, where the overlay optionally has a lower visibility than that shown in FIGS. 7L1 and 7L2); in FIGS. 7N1 and 7N2, the XR content 7002 is displayed via the first display generation component 7100 with a third example level of immersion (e.g., a level of immersion that corresponds to an intermediate level of immersion, and/or a mixed reality mode that is less immersive than that shown in FIGS. 7M1 and 7M2), and the one or more graphical elements that represent the status associated with the first user 7202 are displayed with a third example appearance that is based on a third example set of visual properties (e.g., the representation 7006 of the portion of the body of the first user 7202 is visible concurrently with the overlay 7008 indicating the status of the XR content 7002, where the representation 7006 of the portion of the body of the first user is more visible than that shown in FIGS. 7M1 and 7M2, while the overlay 7008 optionally has a lower visibility than that shown in FIGS. 7M1 and 7M2);

and in FIG. 7O, the XR content 7002 is displayed via the first display generation component 7100 with a fourth example level of immersion (e.g., a level of immersion that corresponds to a lowest level of immersion, and/or a passthrough mode), and the one or more graphical elements that represent the status associated with the first user 7202 are displayed with a fourth example appearance that is based on a fourth example set of visual properties (e.g., the representation 7006 of the portion of the body of the first user 7202 has a higher visibility than that shown in FIGS. 7L1, 7M1, and 7N1 (and in FIGS. 7L2, 7M2, and 7N2), while the overlay 7008 indicating the status of the XR content 7002 is not visible or has a lower visibility than that shown in FIGS. 7L1, 7M1, and 7N1 (and in FIGS. 7L2, 7M2, and 7N2)), in accordance with some embodiments. In some embodiments, any pair of example levels of immersion selected from the first example, second example, third example, and fourth example levels of immersion can be used as the first level of immersion and the second level of immersion mentioned herein.

In the method 10000, while displaying the representation of the three-dimensional environment via the first display generation component with the first level of immersion and displaying the one or more graphical elements that represent the status associated with the user with the first appearance that is based on the first set of one or more visual properties and the status associated with the user, the computer system detects (10008) that first criteria for changing the current level of immersion are met. In response to detecting that the first criteria for changing the current level of immersion are met (10010): the computer system changes (10012) from displaying one or more virtual elements in the three-dimensional environment with the first level of immersion to displaying the one or more virtual elements in the three-dimensional environment with the second level of immersion, via the first display generation component; and the computer system changes (10014) from displaying the one or more graphical elements that represent the status associated with the user with the first appearance that is based on the first set of one or more visual properties and the status associated with the user to displaying the one or more graphical elements that represent the status associated with the user with the second appearance that is based on the second set of one or more visual properties and the status associated with the user, via the second display generation component. For example, in FIG. 7M1 following FIG. 7L1 and in FIG. 7M2 following FIG. 7L1, the computer system detects that the criteria for changing the level of immersion are met (e.g., in accordance with detection of the presence of the second user 7204 in front of the second display generation component 7102, in accordance with a determination that the second user 7204 is calling out the name of the first user 7102 and/or making a gesture in an attempt to engage the first user 7202, and/or in accordance with other determinations required by the criteria for changing the level of immersion), and in response, the computer system changes from displaying the XR content 7002 with the first example level of immersion (e.g., fully immersive mode, or a highly immersive level) to displaying the XR content 7002 with the second example level of immersion (e.g., a mixed reality mode, or an intermediate level of immersion); and the computer system also changes from displaying the graphical elements that are associated with the user with the first example appearance to displaying the graphical elements that are associated with the user with the second example appearance. In another example, in FIG. 7N1 following FIG. 7M1 and in FIG. 7N2 following FIG. 7M2, the computer system detects that the criteria for changing the level of immersion are met (e.g., in accordance with detecting that the first user 7202 is paying attention to the physical environment, such as the second user 7204 in front of the second display generation component 7102, in accordance with a determination that the second user 7204 is calling out the name of the first user 7102 and/or making a gesture in an attempt to engage the first user 7202, and/or in accordance with other determinations required by the criteria for changing the level of immersion), and in response, the computer system changes from displaying the XR content 7002 with the second example level of immersion (e.g., an intermediate level of immersion that is more immersive than that shown in FIGS. 7N1 and 7N2) to displaying the XR content 7002 with the third example level of immersion (e.g., an intermediate level of immersion that is less immersive than that shown in FIGS. 7M1 and 7M2); and the computer system also changes from displaying the graphical elements that are associated with the user with the second example appearance to displaying the graphical elements that are associated with the user with the third example appearance. In yet another example, in FIG. 7O following FIG. 7N1 or FIG. 7N2, the computer system detects that the criteria for changing the level of immersion are met (e.g., in accordance with detecting that the first user 7202 is continuing to pay attention to the physical environment, such as the second user 7204 in front of the second display generation component 7102, in accordance with a determination that the second user 7204 is within a threshold distance of the first user or is in the first user's way; and/or in accordance with other determinations required by the criteria for changing the level of immersion), and in response, the computer system changes from displaying the XR content 7002 with the third example level of immersion (e.g., a mixed reality mode, and/or an intermediate level of immersion) to displaying the XR content 7002 with the fourth example level of immersion (e.g., a lowest level of immersion, and/or a passthrough mode); and the computer system also changes from displaying the graphical elements that are associated with the user with the third example appearance to displaying the graphical elements that are associated with the user with the fourth example appearance. In some embodiments, a reversal of the direction of the change in the level of immersion, the change in the XR content display, and the change in the appearance of the one or more graphical elements that indicate the status associated with the user, from those described above are also possible, in accordance with some embodiments.

In some embodiments, displaying the one or more graphical elements that represent the status associated with the user includes: in accordance with the determination that the current level of immersion with which the representation of the three-dimensional environment is provided via the first display generation component is the first level of immersion, displaying a first respective representation of a first respective portion of a body of the user (e.g., a computer-generated image, a generic image, or a camera view of the portion of the body of the user (e.g., the eyes, the upper portion of the face, the head, the upper body, or other characteristic and identifying body features of the user), and/or a modified version of any of the above) with a first level of fidelity (e.g., with a first level of blurring, darkening, and/or color and/or shape fidelity); and in accordance with the determination that the current level of immersion is the second level of immersion different from the first level of immersion (e.g., a higher level of immersion, or a lower level of immersion), displaying the first respective representation of the first respective portion of the body of the user with a second level of fidelity (e.g., with a second level of blurring, darkening, and/or color and/or shape fidelity), different from the first level of fidelity. For example, as shown in FIGS. 7M1, 7N1, and 7O (and in FIGS. 7M2, 7N2, and 7O), the XR content 7002 are displayed with decreasing levels of immersion, and the representations 7006 of the portion of the body of the first user 7202 (e.g., including the eyes, and/or face of the first user 7202) as displayed via the second display generation component 7102 have increasing fidelity, in accordance with some embodiments. In some embodiments, a higher level of immersion corresponds to a lower level of fidelity of the first respective representation of the first respective portion of the body of the user. In some embodiments, the first respective representation of the first respective portion of the body of the user is displayed in a separate display layer from one or more graphical elements that represent the content displayed via the first display generation component; and the first respective representation of the body of the user and the one or more graphical elements, as well as their visual interplay, convey the level of immersion with which the content is displayed via the first display generation component. Determining, by the computer system, that the current level of immersion with which the representation of the three-dimensional environment is provided via the first display generation component is the first level of immersion, causes the computer system to automatically perform the operation of displaying a first respective representation of a first respective portion of a body of the user with a first level of fidelity (e.g., automatically display a first respective representation of a first respective portion of a body of the user with a first level of fidelity without requiring additional user input). The determination, by the computer system, that the current level of immersion is the second level of immersion different from the first level of immersion, causes the computer system to automatically perform the operation of displaying the first respective representation of the first respective portion of the body of the user with a second level of fidelity, different from the first level of fidelity (e.g., automatically display a first respective representation of a first respective portion of a body of the user with a second level of fidelity without requiring additional user input).

In some embodiments, changing from displaying the one or more graphical elements with the first appearance to displaying the one or more graphical elements with the second appearance includes: changing from displaying the first respective representation of the first respective portion of the body of the user (e.g., a computer-generated image, a generic image, or a camera view of the portion of the body of the user (e.g., the eyes, the upper portion of the face, the head, the upper body, or other characteristic and identifying body features of the user), and/or a modified version of any of the above) with the first level of fidelity to displaying the first respective representation of the first respective portion of the body of the user with the second level of fidelity (e.g., reducing the visibility and clarity of the first respective representation of the first respective portion of the body of the user when the level of immersion increases, increasing the visibility and clarity of the first respective representation of the first respective portion of the body of the user when the level of immersion decreases, ceasing to display the respective representation of the first respective portion of the body of the user when the level of immersion is a level that corresponds to a fully immersive experience, and/or displaying a pass-through view of the first respective portion of the body of the user when the level of immersion is a level that corresponds to a complete pass-through state of the first display generation component). For example, as shown in FIGS. 7M1, 7N1, and 7O (and in FIGS. 7M2, 7N2, and 7O), the XR content 7002 are displayed with decreasing levels of immersion, and the representations 7006 of the portion of the body of the first user 7202 (e.g., including the eyes, and/or face of the first user 7202) as displayed via the second display generation component 7102 have increasing fidelity, in accordance with some embodiments. Correspondingly, when the computer system transitions from the level of immersion shown in FIG. 7M1 to the level of immersion shown in FIG. 7N1 (or from the level of immersion shown in FIG. 7M2 to the level of immersion shown in FIG. 7N2), the fidelity of the representation 7006 of the portion of the body of the first user 7202 increases, in accordance with some embodiments. Correspondingly, when the computer system transitions from the level of immersion shown in FIG. 7N1 to the level of immersion shown in FIG. 7O (or from the level of immersion shown in FIG. 7N2 to the level of immersion shown in FIG. 7O), the fidelity of the representation 7006 of the portion of the body of the first user 7202 further increases, in accordance with some embodiments. Detecting, by the computer system, that the first criteria for changing the current level of immersion are met, causes the computer system to automatically perform the operation of changing from displaying the one or more graphical elements with the first appearance to displaying the one or more graphical elements with the second appearance, including changing from displaying the first respective representation of the first respective portion of the body of the user with the first level of fidelity to displaying the first respective representation of the first respective portion of the body of the user with the second level of fidelity (e.g., automatically change a respective level of fidelity for displaying the first respective representation of the first respective portion of the body of the user without requiring additional user input).

In some embodiments, detecting that the first criteria for changing the current level of immersion are met includes detecting that the user is paying attention to a first respective physical environment surrounding the user (e.g., to objects or people that are not part of the extended reality experience (e.g., a game, a movie, a conference call, an application user interface, and/or other partially immersive three-dimensional experiences) provided inside the three-dimensional environment, and/or to objects and people that are calling for the attention of the user from outside of the extended reality experience (e.g., from the first respective physical environment surrounding the user)). For example, as shown in FIG. 7O following FIG. 7N1 and FIG. 7O following FIG. 7N2, the computer system determines that first user 7202 is paying attention to the physical environment surrounding the first user 7202 (e.g., the location B that is in front of the display side of the second display generation component, and/or the portion of the physical environment that includes the second user 7204); and in response, the computer system changes the level of immersion with which the XR content 7002 is displayed via the first display generation component 7100, and also changes the appearance of the graphical elements that indicate the status associated with the first user (e.g., changing the appearance of the overlay 7008 and/or the appearance of the representation 7006 for the portion of the body of the first use 7202), in accordance with some embodiments. In some embodiments, the computer system determines that the user is paying attention to the first respective physical environment surrounding the user based on a determination that the user's attention shifting from computer-generated content (e.g., application windows, virtual objects, virtual experiences, and/or augmented reality experiences) to an object or person that does not form part of the three-dimensional extended reality experience generated by the computer. In some embodiments, the computer system determines that the user is paying attention to the first respective physical environment surrounding the user in response to detecting the user verbally and/or gesturally engage another person present in the first respective physical environment surrounding the user (e.g., saying hi, calling out someone's name, or other socially understood ways of getting someone's attention). Detecting, by the computer system, that the first criteria for changing the current level of immersion are met, including detecting that the user is paying attention to a first respective physical environment surrounding the user, enables the computer system to automatically change from displaying virtual elements in the three-dimensional environment with the first level of immersion to displaying the virtual elements in the three-dimensional environment with the second level of immersion and enables the computer system to automatically change from displaying the graphical elements with the first appearance to displaying the graphical elements that represent the status associated with the user with the second appearance (e.g., automatically change the display of virtual elements with a respective level of immersion and change the graphical elements with a respective appearance without requiring further user inputs and/or without displaying additional controls).

In some embodiments, detecting that the first criteria for changing the current level of immersion are met includes detecting that a person (e.g., a first respective person) in a physical environment (e.g., a second respective physical environment) surrounding the user is paying attention to the user (e.g., people that are not part of the extended reality experience (e.g., a game, a movie, a conference call, an application user interface, and/or other partially immersive three-dimensional experiences) provided inside the three-dimensional environment are calling for the attention of the user from outside of the extended reality experience (e.g., from the physical environment surrounding the user)). For example, as shown in FIG. 7M1 following FIG. 7N1 and FIG. 7M2 following FIG. 7N2, the computer system determines that second user 7204 is paying attention to the first user 7202 (e.g., by calling out the name of the first user, waving to the first user 7202, and/or making other gestures to engage the first user 7202); and in response, the computer system changes the level of immersion with which the XR content 7002 is displayed via the first display generation component 7100, and also changes the appearance of the graphical elements that indicate the status associated with the first user (e.g., changing the appearance of the overlay 7008 and/or displaying the representation 7006 for the portion of the body of the first use 7202), in accordance with some embodiments. In some embodiments, the computer system determines that a person in the physical environment is paying attention to the user in response to detecting that the person in the physical environment of the user verbally and/or gesturally engages the user (e.g., saying hi, calling out the user's name, or other socially understood ways of getting the user's attention). Detecting, by the computer system, that the first criteria for changing the current level of immersion are met, including detecting that a person in a physical environment surrounding the user is paying attention to the user, enables the computer system to automatically change from displaying virtual elements in the three-dimensional environment with the first level of immersion to displaying the virtual elements in the three-dimensional environment with the second level of immersion and enables the computer system to automatically change from displaying the graphical elements with the first appearance to displaying the graphical elements that represent the status associated with the user with the second appearance (e.g., automatically change the display of virtual elements with a respective level of immersion and change the graphical elements with a respective appearance without requiring further user inputs and/or without displaying additional controls).

In some embodiments, the computer system determines an object of a person's attention (e.g., the user, an object in the physical environment, and/or another person in the physical environment) based on a gaze (e.g., location of a gaze, a duration that a gaze is maintained at a location, and the spatial and temporal stability of the gaze at a location) of the person (e.g., the user, or another person in the surrounding physical environment that is paying attention to the user). For example, as shown in FIGS. 7N1 and 7N2, the computer system detects that the first user 7202 is paying attention to the second user or the surrounding physical environment based on a gaze 7316 of the first user 7202 directed to the representation 7010 of the second user 7204 or the representation of the physical environment (e.g., the representation 7312 of the physical object 7314, or representation of other portions of the physical environment), in accordance with some embodiments. In some embodiments, the computer system detects that an object and/or person is present at the location of the user's gaze, and/or detects that the user's gaze is tracking the movement of the object and/or person in the physical environment; and in response, the computer system determines that the user is paying attention to the object and/or person in the physical environment surrounding the user. In some embodiments, the computer system detects that a person present in the physical environment is looking at the user, and/or the person's gaze is tracking the user's movement in the physical environment; and in response, the computer system determines that the person in the physical environment is paying attention to the user. Determining, by the computer system, an object of a person's attention based on a gaze, enables the computer system to determine whether the person is paying attention (e.g., to the object, or another user, etc.) without displaying additional controls.

In some embodiments, the computer system determines an object of a person's attention (e.g., the user, an object in the physical environment, and/or another person in the physical environment) based on body pose (e.g., waving, pointing, clapping, leaning toward someone, using a hand to shield the eyes to look, cupping a hand behind the ears to listen, and/or other gestures and/or postures that indicate the person is paying attention to and/or trying to draw attention of someone) of the person (e.g., the user, or another person in the surrounding physical environment that is paying attention to the user). For example, in FIG. 7M1 following FIG. 7L1 and in FIG. 7M2 following FIG. 7L2, the computer system determines that the second user 7204 is paying attention to the first user 7202 based on the body pose of the second user 7204 (e.g., based on the waving gesture of the second user 7204, based on the second user leaning toward the first user 7202, and/or based on other poses of the second user 7204), in accordance with some embodiments. In some embodiments, the computer system detects that another person is present in the physical environment, and the user is waving or pointing at the person while speaking; and in response, the computer system determines that the user is paying attention to the other person in the physical environment surrounding the user. In some embodiments, the computer system detects that another person that is present in the physical environment and is waving at the user or tapping the user's shoulder; and in response, the computer system determines that the person in the physical environment is paying attention to the user. Determining, by the computer system, an object of a person's attention based on body pose, enables the computer system to determine whether the person is paying attention (e.g., to the object, or another user) without displaying additional controls.

In some embodiments, the computer system determines an object of a person's attention (e.g., the user, an object in the physical environment, and/or another person in the physical environment) based on the person (e.g., the user, or another person in the surrounding physical environment that is paying attention to the user) calling out a name or identifier (e.g., full name, nickname, or how the object is usually called or addressed the by the person or by others) of the object (e.g., another person in the surrounding physical environment, the user, or an object in the physical environment). For example, in FIG. 7M1 following FIG. 7L1 and in FIG. 7M2 following FIG. 7L1, the computer system determines that the second user 7204 is paying attention to the first user 7202, optionally, based on the second user 7204 calling out the name of the first user 7202, in accordance with some embodiments. In some embodiments, the computer system detects that another person is present in the physical environment and the user is calling out a name of the person; and in response, the computer system determines that the user is paying attention to the other person in the physical environment surrounding the user. In some embodiments, the computer system detects the user is calling out a name of an object in the physical environment, such as "door," "cat," or some other object's name; and in response, the computer system determines that the user is paying attention to the object. In some embodiments, the computer system detects that another person that is present in the physical environment and is calling out the name of the user; and in response, the computer system determines that the person in the physical environment is paying attention to the user. Determining, by the computer system, an object of a person's attention based on the person calling out a name or an identifier of the object, enables the computer system to determine whether the person is paying attention (e.g., to the object, or another user, etc.) without displaying additional controls.

In some embodiments, detecting that the first criteria for changing the current level of immersion are met includes detecting that an object (e.g., another person, a pet, a piece of furniture, a moving vehicle, and/or another object that would require the user's attention to avoid injury or keep the user's safety) in the physical environment (e.g., a physical environment in which the user is positioned) is in the user's way or is approaching the user. For example, in FIG. 7M1 following FIG. 7L1 and in FIG. 7M2 following FIG. 7L2, the computer system determines that the criteria for changing the level of immersion are met, optionally, in accordance with a determination that the second user 7204 is approaching the first user 7202 or in the first user's way, in accordance with some embodiments. In some embodiments, the computer system detects that another person is walking toward the user or that the user is walking toward the other person, and that the user has gotten into less than a threshold distance of the other person; and in response, the computer system determines that the first criteria for changing the current level of immersion are met. In some embodiments, the computer system detects that the user is walking toward a wall or a piece of furniture or that a moving object is approaching the user, and that the user has gotten into less than a threshold distance of the wall, furniture or moving object; and in response, the computer system determines that the first criteria for changing the current level of immersion are met. Detecting, by the computer system, that the first criteria for changing the current level of immersion are met, including detecting that an object in the physical environment is in the user's way or is approaching the user, enables the computer system to automatically change from displaying virtual elements in the three-dimensional environment with the first level of immersion to displaying the virtual elements in the three-dimensional environment with the second level of immersion and enables the computer system to automatically change from displaying the graphical elements with the first appearance to displaying the graphical elements that represent the status associated with the user with the second appearance (e.g., automatically change the display of virtual elements with a respective level of immersion and change the graphical elements with a respective appearance without requiring further user inputs and/or without displaying additional controls).

In some embodiments, displaying the one or more graphical elements that represent the status associated with the user includes: displaying a first set of graphical elements of the one or more graphical elements that represents a status of content that is displayed via the first display generation component (e.g., the status of content includes the name, application, type of content, type of media, and/or progress of the content that is shown in the three-dimensional environment), and wherein displaying the first set of graphical elements includes: in accordance with the determination that the current level of immersion with which the representation of the three-dimensional environment is provided via the first display generation component is the first level of immersion, displaying the first set of graphical elements with a first set of values for a first display property (e.g., with a first level of opacity, blurring, darkening, and/or color and/or shape fidelity); and in accordance with the determination that the current level of immersion is the second level of immersion (e.g., a higher level of immersion, or a lower level of immersion than the first level of immersion), displaying the first set of graphical elements with a second set of values for the first display property (e.g., with a second level of blurring, darkening, and/or color and/or shape fidelity), different from the first set of values for the first display property. For example, in FIGS. 7L1, 7M1, and 7N1 (and in FIGS. 7L2, 7M2, and 7N2), the status of the XR content 7002 is indicated by the appearance of the overlay 7008 that is displayed via the second display generation component, and the overlay 7008 have different values for a first display property (e.g., opacity, luminance, and/or blur radius) in FIGS. 7L1, 7M1, and 7N1 (and in FIGS. 7L2, 7M2, and 7N2) to correspond to different levels of immersion used for the XR content display in FIGS. 7L1, 7M1, and 7N1 (and in FIGS. 7L2, 7M2, and 7N2), in accordance with some embodiments. In some embodiments, a higher level of immersion corresponds to lower values of opacity, lower level of luminance, higher level of blurring, and/or lower level of color and/or shape fidelity. In some embodiments, changing from displaying the one or more graphical elements with the first appearance to displaying the one or more graphical elements with the second appearance includes: changing from displaying the first set of graphical elements with the first set of values for the first display property to displaying the first set of graphical elements with the second set of values for the first display property (e.g., reducing the opacity, luminance, and/or color and shape fidelity of the overlay that corresponds to the status of the content that is being displayed via the first display generation component, when the level of immersion increases). Determining, by the computer system, that the current level of immersion with which the representation of the three-dimensional environment is provided via the first display generation component is the first level of immersion, causes the computer system to automatically perform the operation of displaying the first set of graphical elements with a first set of values for a first display property (e.g., automatically display the first set of graphical elements with a first set of values without requiring additional user input). Determining, by the computer system, that the current level of immersion is the second level of immersion, causes the computer system to automatically perform the operation of displaying the first set of graphical elements of the one or more graphical elements with a second set of values for the first display property, different from the first set of values for the first display property (e.g., automatically display the first set of graphical elements with a second set of values without requiring additional user input).

In some embodiments, displaying the one or more graphical elements that represent the status associated with the user includes displaying a representation of the user underlying the first set of graphical elements that represents the status of the content that is displayed via the first display generation component, and wherein displaying the first set of graphical elements includes: in accordance with a determination that the current level of immersion with which the representation of the three-dimensional environment is provided via the first display generation component has increased (e.g., from the first level of immersion to the second level of immersion, from the second level of immersion, or between another set of two levels), changing values of the first display property (e.g., opacity, blur level, and/or other image filters) of the first set of graphical elements (e.g., from a first set of values to a second set of values) to increase visibility of the representation of the user from a first level of visibility to a second level of visibility (e.g., by changing the values of one or more display properties of the first set of graphical elements (e.g., reducing the opacity of the overlay that represents the content displayed via the first display generation component) to reveal the representation of the user more clearly). For example, as shown in FIGS. 7M1 and 7N1 (and in FIGS. 7M2 and 7N2), the graphical elements that represent the status associated with the first user 7202 includes the overlay 7008 that indicate the status of the XR content 7002 displayed via the first display generation component 7100, and the representation 7006 of the portion of the body of the first user 7202; and when the level of immersion increases (e.g., from that shown in FIGS. 7M1 and 7M2 to that shown in FIGS. 7N1 and 7N2), the computer system changes the values of the first display property of the graphical elements, to increase the visibility of the representation 7006 of the portion of the body of the first user (e.g., from the visibility level shown in FIGS. 7M1 and 7M2 to that shown in FIGS. 7N1 and 7N2), in accordance with some embodiments. Determining, by the computer system, that the current level of immersion with which the representation of the three-dimensional environment is provided via the first display generation component has increased, causes the computer system to automatically perform the operation of changing values of the first display property of the first set of graphical elements to increase visibility of the representation of the user from a first level of visibility to a second level of visibility (e.g., automatically changing values of the first display property of the first set of graphical elements without requiring additional user input).

In some embodiments, the representation of the user includes a representation of a portion of a body of the user (e.g., the user's face, eyes, and/or head). For example, as shown in FIGS. 7M1 and 7N1 and in FIGS. 7M2 and 7N2, the graphical elements that represent the status associated with the first user 7202 includes the representation 7006 of the portion of the body of the first user 7202; and when the level of immersion increases (e.g., from that shown in FIGS. 7M1 and 7M2 to that shown in FIGS. 7N1 and 7N2), the computer system increase the visibility of the representation 7006 of the portion of the body of the first user (e.g., from the visibility level shown in FIGS. 7M1 and 7M2 to that shown in FIGS. 7N1 and 7N2), in accordance with some embodiments. In some embodiments, displaying the one or more graphical elements that represent the status associated with the user includes displaying the representation of the portion of the body of the user underlying the first set of graphical elements that represents the status of the content that is displayed via the first display generation component. In some embodiments, displaying the first set of graphical elements includes: in accordance with a determination that the current level of immersion with which the representation of the three-dimensional environment is provided via the first display generation component has increased (e.g., from the first level of immersion to the second level of immersion, from the second level of immersion, or between another set of two levels), changing values of the first display property (e.g., opacity, blur level, and/or other image filters) of the first set of graphical elements (e.g., from a first set of values to a second set of values) to increase visibility of the representation of the portion of the body of the user from a first level of visibility to a second level of visibility (e.g., by changing the values of one or more display properties of the first set of graphical elements (e.g., reducing the opacity of the overlay that represents the content displayed via the first display generation component) to reveal the representation of the portion of the body of the user more clearly). Providing the representation of the user, including a representation of a portion of a body of the user, provides improved visual feedback to the user (e.g., improved visual feedback regarding the representation of the user).

In some embodiments, detecting that the first criteria for changing the current level of immersion are met includes detecting at least one of a first set of user interactions with the computer system that corresponds to explicit user requests to change the current level of immersion (e.g., the first set of user interactions includes a user input that activates a control for changing the current level of immersion (e.g., the user pressing a button, turning on a switch, and/or activating a hardware or software control that is configured to change the current level of immersion (e.g., increase the level of immersion, decrease the level of immersion), the user starting or stopping an immersive experience, application, and/or media playback in the three-dimensional environment, entering and/or exiting a shared three-dimensional experience or communication session, activating and/or deactivating the DND mode) and/or the user providing a mode switching gesture (e.g., hand shielding over the eyes, hand closing/opening in front of eyes, and other suitable gestures) or a voice command for changing the level of immersion)). For example, in some embodiments, the computer system detects that the first criteria for changing the level of immersion are met in accordance with a determination that the first user 7202 has made an explicit request to the current the current level of immersion (e.g., by providing a verbal command in FIGS. 7M1 and 7M2 and/or FIGS. 7N1 and 7N2, stopping playback of the XR content 7002, turn on a DND mode using a hardware or graphical user interface provided by the computer system, and/or providing other interactions that corresponds to a request to change the level of immersion). In some embodiments, as the current level of immersion increases (e.g., continuously, or through discrete levels), the visual clarity and/or prominence of the respective representation of the portion of the body of the user decreases (e.g., the representations for enrolled user and guest user become invisible or indistinguishable when the level of immersion reaches a threshold level of immersion (e.g., a fully immersive level, or another highly immersive level)). Correspondingly, in some embodiments, embodiments, as the current level of immersion decreases (e.g., continuously, or through discrete levels), the visual clarity and/or prominence of the respective representation of the portion of the body of the user increases (e.g., the representations for enrolled user and guest user become visible and/or distinguishable when the level of immersion drops below the threshold level of immersion (e.g., a fully immersive level, or another highly immersive level)). (e.g., the computer system causes the computer-generated three-dimensional environment displayed via the first display generation component to transition between the different levels of immersion in response to a sequence of one or more events (e.g., natural termination or progression of an application or experience; the start, stop, or pausing of an experience in response to a user input, etc.)). In some embodiments, the increasing levels of immersion (e.g., increase through a continuum or a number of discrete levels) correspond to increasing amount of virtual content that is present in the computer-generated three-dimensional environment and/or decreasing amount of passthrough content (e.g., views and/or representations of the surrounding physical environment) present in the computer-generated environment. In some embodiments, increasing levels of immersion correspond to different modes of content display that have increasing image fidelity and/or spatial extent (e.g., angular extent, spatial depth, etc.) for the computer-generated content, and decreasing image fidelity and/or spatial extent for representations of the surrounding physical environment. In some embodiments, a first level of immersion is a pass-through mode where the physical environment is fully visible to the user through the first display generation component (e.g., as a camera view of the physical environment or through a transparent portion of the first display generation component)) and the computer-generated environment includes the pass-through view of the physical environment with a minimal amount of virtual elements concurrently visible as the view of the physical environment or including virtual elements that are peripheral (e.g., indicators and controls displayed in the peripheral region of the display) to the user's view of the physical environment. In some embodiments, a second level of immersion is a mixed reality mode where the pass-through view of the physical environment is augmented with virtual elements generated by the computer system and have positions in the computer-generated environment that correspond to the central portion of the user's view of the physical environment and/or have positions in the computer-generated environment that correspond to locations and objects in the physical environment (e.g., the virtual content is integrated with the physical environment in the view of the computer-generated environment). In some embodiments, the second level of immersion includes a number of discrete sub-levels or a continuous range in that correspond to different amounts of virtual content relative to the representations of the physical environment in the three-dimensional environment. In some embodiments, a third level of immersion corresponds to a virtual reality mode in which that user's view of the physical environment is completely replaced or blocked by the view of virtual content provided by the first display generation component. In some embodiments, there are four different levels of immersion, where the first level of immersion corresponds to the pass-through mode of the first display generation component, the second level of immersion includes two sub-levels A and B that correspond to two separate sub-modes of the first display generation component (e.g., second level—A where a user interface or user interface objects are displaying in the main portion of the user's field of view while the pass-through view of the physical environment is displayed in the background of the user interface or user interface objects; and second level—B where virtual elements are integrated with representations of physical objects in the physical environment in an augmented reality view of the physical environment), and the third level of immersion corresponds to virtual reality mode of the first display generation component. Detecting, by the computer system, that the first criteria for changing the current level of immersion are met, including detecting at least one of a first set of user interactions with the computer system that corresponds to explicit user requests to change the current level of immersion, enables the computer system to automatically change from displaying virtual elements in the three-dimensional environment with the first level of immersion to displaying the virtual elements in the three-dimensional environment with the second level of immersion and enables the computer system to automatically change from displaying the graphical elements with the first appearance to displaying the graphical elements that represent the status associated with the user with the second appearance (e.g., automatically change the display of virtual elements with a respective level of immersion and change the graphical elements with a respective appearance without requiring further user inputs and/or without displaying additional controls).

In some embodiments, the at least one of the first set of user interactions with the computer system that corresponds to explicit user requests to change the current level of immersion includes detecting a user input that activates a hardware control of the computer system (e.g., pressing on a button on the HMD, toggling a switch on a controller, holding the HMD with both hands instead of not touching the HMD, and/or otherwise activating and/or manipulating a control of the computer system). For example, in some embodiments, the computer system detects that the first criteria for changing the level of immersion are met in accordance with a determination that the first user 7202 has activated a hardware control in FIGS. 7M1 and 7M2 and/or FIGS. 7N1 and 7N2 to trigger the change in the level of immersion. Detecting, by the computer system, the at least one of the first set of user interactions with the computer system that corresponds to explicit user requests to change the current level of immersion, including detecting a user input that activates a hardware control of the computer system, enables the computer system to automatically change from displaying virtual elements in the three-dimensional environment with the first level of immersion to displaying the virtual elements in the three-dimensional environment with the second level of immersion and enables the computer system to automatically change from displaying the graphical elements with the first appearance to displaying the graphical elements that represent the status associated with the user with the second appearance (e.g., automatically change the display of virtual elements with a respective level of immersion and change the graphical elements with a respective appearance without requiring further user inputs and/or without displaying additional controls).

In some embodiments, detecting the at least one of the first set of user interactions with the computer system that corresponds to explicit user requests to change the current level of immersion includes detecting that the user has entered or exited an immersive experience in the three-dimensional environment (e.g., started or stopped a three-dimensional movie, a computer-generated immersive experience, an augmented reality game, a virtual reality game, and/or other immersive environment, media playback, or experiences). For example, in some embodiments, the computer system detects that the first criteria for changing the level of immersion are met in accordance with a determination that an immersive experience has been stopped in FIGS. 7L1 and 7L2 to trigger a decrease in the level of immersion, and/or started in FIG. 7O to trigger an increase in the level of immersion. Detecting, by the computer system, the at least one of the first set of user interactions with the computer system that corresponds to explicit user requests to change the current level of immersion, including detecting that the user has entered or exited an immersive experience in the three-dimensional environment, enables the computer system to automatically change from displaying virtual elements in the three-dimensional environment with the first level of immersion to displaying the virtual elements in the three-dimensional environment with the second level of immersion and enables the computer system to automatically change from displaying the graphical elements with the first appearance to displaying the graphical elements that represent the status associated with the user with the second appearance (e.g., automatically change the display of virtual elements with a respective level of immersion and change the graphical elements with a respective appearance without requiring further user inputs and/or without displaying additional controls).

In some embodiments, detecting the at least one of the first set of user interactions with the computer system that corresponds to explicit user requests to change the current level of immersion includes detecting that the user has started to or ceased to pay attention to a currently playing media in the three-dimensional environment (e.g., the user's attention state has changed from focusing on the currently playing media to focusing on something else in the three-dimensional environment or something in the physical environment; the user's attention state has changed from focusing on something else to focusing on the currently playing media; and/or the user has fallen asleep or seemed bored while watching immersive media). For example, in some embodiments, the computer system detects that the first criteria for changing the level of immersion are met in accordance with a determination that the first user 7202 in FIGS. 7N1 and 7N2 has ceased to pay attention to the media in the XR content 7002 and decreases in the level of immersion with which the XR content is presented via the first display generation component 7100. Detecting, by the computer system, the at least one of the first set of user interactions with the computer system that corresponds to explicit user requests to change the current level of immersion, including detecting that the user has started to or ceased to pay attention to a currently playing media in the three-dimensional environment, enables the computer system to automatically change from displaying virtual elements in the three-dimensional environment with the first level of immersion to displaying the virtual elements in the three-dimensional environment with the second level of immersion and enables the computer system to automatically change from displaying the graphical elements with the first appearance to displaying the graphical elements that represent the status associated with the user with the second appearance (e.g., automatically change the display of virtual elements with a respective level of immersion and change the graphical elements with a respective appearance without requiring further user inputs and/or without displaying additional controls).

In some embodiments, detecting the at least one of the first set of user interactions with the computer system that corresponds to explicit user requests to change the current level of immersion includes detecting that the user has started or ended playback of media (e.g., an application, a movie, a game, a shared experience, and/or another type of immersive experience or environment) in the three-dimensional environment. For example, in some embodiments, the computer system detects that the first criteria for changing the level of immersion are met in accordance with a determination that the first user 7202 in FIG. 7O has started playback of media in the three-dimensional environment shown via the first display generation component, and increases in the level of immersion with which the media is presented via the first display generation component 7100. Detecting, by the computer system, the at least one of the first set of user interactions with the computer system that corresponds to explicit user requests to change the current level of immersion, including detecting that the user has started or ended playback of media in the three-dimensional environment, enables the computer system to automatically change from displaying virtual elements in the three-dimensional environment with the first level of immersion to displaying the virtual elements in the three-dimensional environment with the second level of immersion and enables the computer system to automatically change from displaying the graphical elements with the first appearance to displaying the graphical elements that represent the status associated with the user with the second appearance (e.g., automatically change the display of virtual elements with a respective level of immersion and change the graphical elements with a respective appearance without requiring further user inputs and/or without displaying additional controls).

In some embodiments, displaying the one or more graphical elements that represent the status associated with the user includes: in accordance with a determination that the current level of immersion with which the representation of the three-dimensional environment is provided via the first display generation component is a respective level of immersion that is greater than a threshold level of immersion (e.g., the respective level of immersion corresponds to a fully immersive way of displaying the representation of the three-dimensional environment that includes a fully virtual environment, and/or a minimal amount of representation of the physical environment, and/or the respective level of immersion corresponds to an operating mode of the computer system that provides the representation of the three-dimensional environment in a highly immersive way that is different from that provided in an augmented reality mode and/or a pass-through mode of the computer system), displaying a first set of graphical elements of the one or more graphical elements in a first display layer (e.g., with a first simulated depth relative to the surface of the second display generation component, and/or a first simulated depth relative to a viewer of the one or more graphical elements), and displaying a second set of graphical elements of the one or more graphical elements, different from the first set of graphical elements of the one or more graphical elements, in a second display layer, different from the first display layer (e.g., with a second simulated depth, different from the first simulated depth, relative to the surface of the second display generation component, and/or a second simulated depth, different from the first simulated depth, relative to a viewer of the one or more graphical elements). For example, as shown in FIGS. 7AM1 and 7AM2, the computer system, in accordance with a determination that the current level of immersion is an intermediate level of immersion that is greater than a threshold level of immersion and a mix of virtual content (e.g., the XR content 7002 includes the movie content, user interface objects, and other virtual content and representations of physical surfaces and objects (e.g., user 7204, object 7314, and wall and floor of location B) in the physical environment (e.g., physical environment shared by the first user 7202 and the second user 7204, and/or physical environment of the first display generation component 7100 and the second display generation component 7102)) is displayed via the first display generation component 7100, the computer system displays a representation 7006 of the first user 7202 in a first display layer and graphical elements 7004 and 7008 in one or more second display layers that has a different depth than the first display layer (e.g., that has a smaller depth from the viewpoint of the second user 7204 than the first display layer), in accordance with some embodiments. In some embodiments, in accordance with the determination that the current level of immersion with which the representation of the three-dimensional environment is provided via the first display generation component is a respective level of immersion that is greater than the threshold level of immersion, the computer system further displays a third set of graphical elements of the one or more graphical elements, in a third display layer different from the first and/or second display layer (e.g., with a third simulated depth different from the first and/or second simulated depths). In some embodiments, the first set of graphical elements include a representation of the user that is in a position to view the representation of the three-dimensional environment displayed via the first display generation component, and the second set of graphical elements include an indication of the content that is displayed via the first display generation component (e.g., an indication of the visual properties and/or changes in visual properties of the virtual content of the three-dimensional environment that is displayed via the first display generation component). In some embodiments, the third set of graphical elements include one or more indicators of the metadata and/or status of the experience that is provided via the first display generation component (e.g., text, progress indicator, and/or other user interface objects that indicate the subject matter, title, progress, and/or status of the three-dimensional experience that is provided via the first display generation component). In some embodiments, the second set of graphical elements and the third set of graphical elements are displayed with the same simulated depth. In some embodiments, at least some graphical elements of the first set of graphical elements, the second set of graphical elements, and/or the third set of graphical elements are updated in real-time, or substantially real-time in accordance with the changes in the aspects of the status associated with the user that they represent. In some embodiments, the different display layers are made visible or otherwise discernable to a viewer based on simulated parallax effects applied to the graphical elements shown in the different display layers (e.g., showing different amount of parallax effect based on the simulated depths of the graphical elements and their angles relative to the viewpoint), and/or optionally, based on different views of the graphical elements that are displayed and/or changed (e.g., changing the views of the graphical elements by different amounts based on the simulated depths of the graphical elements and the viewer's viewing angle) depending on the changes in the viewpoint of the viewer with respect to the display (e.g., the second display generation component, the outward facing display generation component, and/or a lenticular display (e.g., a lenticular lens panel or array 3-110, as described with reference to FIG. 1G, or another type of lenticular display) that shows different views of a user interface when viewed from different angles). Determining, by the computer system, that the current level of immersion with which the representation of the three-dimensional environment is provided via the first display generation component is a respective level of immersion that is greater than a threshold level of immersion, causes the computer system to automatically perform the operation of displaying a first set of graphical elements in a first display layer and displaying a second set of graphical elements, different from the first set of graphical elements, in a second display layer different from the first display layer (e.g., automatically display the first set of graphical elements and the second set of graphical elements, without requiring further user input).

In some embodiments, in response to detecting that the first criteria for changing the current level of immersion are met, changing from displaying the one or more graphical elements with the first appearance to displaying the one or more graphical elements with the second appearance, includes reducing visual prominence of at least one of the first set of graphical elements in the first display layer and the second set of graphical elements in the second display layer (e.g., ceasing to display, or reducing opacity and/or color saturation of, increasing the translucency of the at least one of the first and second sets of graphical elements, and/or otherwise reducing visual obscuration on other set(s) of graphical elements displayed in one or more underlying display layers). This is illustrated in FIGS. 7N1 and 7N2 and/or FIG. 7O, for example, where in response to detecting that the criteria for changing the level of current level of immersion are met (e.g., due to the attention of the first user 7202 being directed to the representation 7010 of the second user 7204, and/or due to the second user 7204 signaling to the first user for attention), the computer system reduces the level of immersion with which the XR content 7002 is displayed via the first display generation component 7100, and the computer system further reduces the visual prominence (e.g., increasing the translucency, and/or reducing the coverage area) of the overlay 7008 relative to the representation 7006 of the first user 7202 shown via the second display generation component 7102 (e.g., as shown in FIGS. 7N1 and 7N2), and ceasing to display the overlay 7008 and the progress bar 7004 while maintaining display of the representation 7006 of the first user on the second display generation component 7102 (e.g., as shown in FIG. 7O). For example, in some embodiments, in response to detecting that the first criteria for reducing the level of immersion from the first level of immersion to the second level of immersion (e.g., from a fully immersive level to a partially immersive level, or to the pass-through mode) are met, the computer system ceases to display or making more translucent the one or more indicators of the metadata and/or status of the experience that is provided via the first display generation component (e.g., text, progress indicator, and/or other user interface objects that indicate the subject matter, title, progress, and/or status of the three-dimensional experience that is provided via the first display generation component), while maintains display of the representation of the face and/or eyes of the user (e.g., shown in an underlying display layer, and previously partially obscured by the one or more indicators of the metadata and/or status of the experience). In another example, in response to detecting that the first criteria for reducing the level of immersion from the first level of immersion to the second level of immersion (e.g., from a fully immersive level to a partially immersive level, or to the pass-through mode) are met, the computer system ceases to display or making more translucent an indication of the content that is displayed via the first display generation component (e.g., an indication of the visual properties and/or changes in visual properties of the virtual content of the three-dimensional environment that is displayed via the first display generation component), while maintains display of the representation of the face and/or eyes of the user (e.g., shown in an underlying display layer, and previously partially obscured by the indicator of the virtual content). In some embodiments, the computer system reduces the visual prominence of at least one of the first set of graphical elements in accordance with a determination that, prior to detecting that the first criteria are met, the first level of immersion with which the representation of the three-dimensional environment is provided via the first display generation component is greater than the threshold level of immersion, and after detecting that the first criteria are met, the second level of immersion with which the representation of the three-dimensional environment is provided via the first display generation component is lower than the threshold level of immersion. In some embodiments, the computer system increases the visual prominence of at least one of the first set of graphical elements (or restores the higher visual prominence that was reduced earlier due to reduction of the level of immersion) in accordance with a determination that, prior to detecting that the first criteria are met, the first level of immersion with which the representation of the three-dimensional environment is provided via the first display generation component is lower than the threshold level of immersion, and after detecting that the first criteria are met, the second level of immersion with which the representation of the three-dimensional environment is provided via the first display generation component is greater than the threshold level of immersion. Determining, by the computer system, that (i) prior to detecting that the first criteria are met, the first level of immersion with which the representation of the three-dimensional environment is provided via the first display generation component is greater than the threshold level of immersion, and (ii) after detecting that the first criteria are met, the second level of immersion with which the representation of the three-dimensional environment is provided via the first display generation component is less than the threshold level of immersion, causes the computer system to automatically perform the operation of reducing visual prominence of at least one of the first set of graphical elements in the first display layer and the second set of graphical elements in the second display layer (e.g., automatically reduce the visual prominence of a respective first set of graphical elements without requiring further user input).

In some embodiments, the first set of graphical elements displayed in the first display layer is displayed with a first simulated depth (e.g., a first simulated depth relative to the surface of the second display generation component, or a first simulated depth relative to the viewer of the first set of graphical elements), and the second set of graphical elements displayed in the second display layer is displayed with a second simulated depth (e.g., a second simulated depth relative to the surface of the second display generation component, or a second simulated depth relative to the viewer of the first set of graphical elements), different from the first simulated depth. This is illustrated, for example, in FIGS. 7N1 and 7N2, where the representation 7006 of the first user 7202 is displayed with a greater simulated depth (and optionally visually obscured by) as compared to the overlay 7008 and the progress bar 7004 on the second display generation component, in accordance with some embodiments. In some embodiments, the computer system displays a respective graphical element with a respective simulated depth in accordance with a plurality of techniques, such as changing the displayed size, the displayed shape, and/or changing how the respective graphical element is positioned relative to another graphical element with a different simulated depth, how the respective graphical element is obscured by another graphical element with a different simulated depth, and/or how the respective element obscures another graphical element with a different simulated depth, e.g., as a viewer of the respective graphical element moves relative to the second display generation component in the physical environment. In some embodiments, the different simulated depths of the graphical elements are made visible or otherwise discernable to a viewer based on simulated parallax effects applied to the graphical elements shown with the different simulated depths (e.g., showing different amount of parallax effect based on the simulated depths of the graphical elements and their angles relative to the viewpoint), and/or optionally, based on different views of the graphical elements that are displayed and/or changed (e.g., changing the views of the graphical elements by different amounts based on the simulated depths of the graphical elements and the viewer's viewing angle) depending on the changes in the viewpoint of the viewer with respect to the display (e.g., the second display generation component, the outward facing display generation component, and/or a lenticular display (e.g., a lenticular lens panel or array 3-110, as described with reference to FIG. 1G, or another type of lenticular display) that shows different views of a user interface when viewed from different angles). Displaying the first set of graphical elements with a first simulated depth, and displaying the second set of graphical elements with a second simulated depth, different from the first simulated depth, provides improved visual feedback to the user (e.g., improved visual feedback regarding the simulated depths).

In some embodiments, displaying the one or more graphical elements that represent the status associated with the user further includes displaying a third set of graphical elements of the one or more graphical elements, different from the first set of graphical elements and the second set of graphical elements, in a third display layer, different from the first display layer and the second display layer. For example, in FIGS. 7N, the graphical elements such as the progress bar 7004 and the movie title "Movie X" are displayed in a display layer that is different from the overlay 7008, while the overlay 7008 is displayed in a displayer that is between the representation 7006 of the first user 7202 and the graphical elements such as the progress bar 7004 and the movie title, in accordance with some embodiments. In some embodiments, changing, in response to detecting that the first criteria for changing the current level of immersion are met, from displaying the one or more graphical elements with the first appearance to displaying the one or more graphical elements with the second appearance, includes reducing visual prominence of at least two graphical elements in different sets of graphical elements among the first set of graphical elements in the first display layer, the second set of graphical elements in the second display layer, and the third set of graphical elements in the third display layer (e.g., ceasing to display, or reducing opacity and/or color saturation of, increasing the translucency of the at least two graphical elements in two different sets of the first, second, and third sets of graphical elements, and/or otherwise reducing visual obscuration on other set(s) of graphical elements displayed in one or more underlying display layers). This is illustrated in, for example, FIGS. 7L1-7O, where, in response to detecting that the first criteria for changing the current level of immersion are met (e.g., based on the attention of the first user 7202 moving to the representation 7010 of the second user 7204 and/or based on the second user 7204 signaling to the first user 7202 for attention), the computer system changes the level of immersion with which XR content is displayed via the first display generation component 7100 (e.g., from a fully immersive level to an intermediate level, and from an intermediate level to a passthrough mode), and the computer system reduces the visual prominence (e.g., making more translucent and/or ceasing display) of the overlay 7008 and the graphical elements such as the progress bar 7004 and the movie title, relative to the representation 7006 of the first user 7202, where the overlay 7008, the graphical elements such as the progress bar 7004 and the movie title, are displayed on at least two different display layers which are both different from the display layer of the representation 7006 of the first user 7202. In some embodiments, in response to detecting that the first criteria for reducing the level of immersion from the first level of immersion to the second level of immersion (e.g., from a fully immersive level to the pass-through mode, or otherwise transitioning through at least one intermediate level of immersion) are met, the computer system ceases to display or making more translucent the one or more indicators of the metadata and/or status of the experience that is provided via the first display generation component (e.g., text, progress indicator, and/or other user interface objects that indicate the subject matter, title, progress, and/or status of the three-dimensional experience that is provided via the first display generation component) and the indication of the content that is displayed via the first display generation component (e.g., an indication of the visual properties and/or changes in visual properties of the virtual content of the three-dimensional environment that is displayed via the first display generation component), while maintains display of the representation of the face and/or eyes of the user (e.g., shown in an underlying display layer, and previously partially obscured by the indicators of metadata and/or status of the experience, and the indicator of the virtual content). In some embodiments, the computer system reduces the visual prominence of the at least two graphical elements in different sets of graphical elements corresponding to different display layers, in accordance with a determination that a transition from the first level of immersion to the second level of immersion goes through at least one intermediate level of immersion between the first level of immersion and the second level of immersion (e.g., from a fully immersive level to the pass-through mode, or otherwise transitioning through at least one intermediate level of immersion). In some embodiments, the computer system does not reduce the visual prominence of at least two graphical elements in different sets of graphical elements corresponding to different display layers, in accordance with a determination that the transition from the first level of immersion to the second level of immersion does not go through an intermediate level of immersion (e.g., goes between two adjacent levels of immersion, from the mixed reality mode to the passthrough mode, or from the fully immersive mode to the mixed reality mode, rather than from the fully immersive mode to passthrough mode directly). Detecting, by the computer system, that the first criteria for changing the current level of immersion are met, causes the computer system to automatically perform the operation of changing displaying the one or more graphical elements with the first appearance to displaying the one or more graphical elements with the second appearance, including automatically reducing visual prominence of at least two of the first set of graphical elements in the first display layer, the second set of graphical elements in the second display layer, and the third set of graphical elements in the third display layer in accordance with a determination that a transition from the first level of immersion to the second level of immersion goes through at least one intermediate level of immersion between the first level of immersion and the second level of immersion (e.g., automatically reduce the visual prominence of at least two of the first set of graphical elements, the second set of graphical elements, and the third set of graphical elements, without requiring further user input).

In some embodiments, the first set of graphical elements displayed in the first display layer and the second set of graphical elements displayed in the second display layer (and, optionally, the third set of graphical elements displayed in the third display layer) have different visual characteristics (e.g., different colors, different levels of translucency, different levels of color saturation, different levels of brightness, and/or different levels of image resolution). This is illustrated in FIGS. 7M1 and 7M2, for example. In FIGS. 7M1 and 7M2, the overlay 7008 is displayed in a different display layer from the progress bar 7004, and the overlay 7008 have animated movements, colors, translucency, shape, and/or other visual characteristics that are based on the visual characteristics changes, and/or progress of the XR content that is displayed via the first display generation component, while the progress bar 7004 has a shape, color, opacity, and movement that is different from the overlay 7008, in accordance with some embodiments. For example, in some embodiments, a respective set of graphical elements correspond to the representation of the body of the user that is in a position to view content provided via the first display generation component is displayed in a display layer underlying the display layer(s) of other sets of graphical elements, and the respective set of graphical elements is displayed with a respective set of color(s) or tone(s) that corresponds to a skin tone of the user and/or a color of ambient lighting. In some embodiments, a respective set of graphical elements correspond to the virtual content in the representation of the three-dimensional environment is displayed in a display layer between the display layer showing the representation of the body of the user and the display layer(s) of other sets of graphical elements, and the respective set of graphical elements is displayed with a respective set of color(s) or with a level of brightness, and, optionally with animated changes thereof, that correspond to the colors, brightness, and changes thereof, of the virtual content. In some embodiments, a respective set of graphical elements correspond to the metadata and status of the experience is displayed in a display layer overlaying the display layer showing the representation of the body of the user and the display layer showing the indication of the virtual content, and the respective set of graphical elements are graphical user interface elements that have relatively static appearances that do not change with the virtual content and/or the state of the body of the user, but may update to indicate the changes in the status of the experience (e.g., progress of the 3D movie, or other changes in the experience). Displaying the first set of graphical elements and the second set of graphical elements with different visual characteristics, provides improved visual feedback to the user (e.g., improved visual feedback regarding the sets of graphical elements).

In some embodiments, the first set of graphical elements displayed in the first display layer and the second set of graphical elements displayed in the second display layer (and, optionally, the third set of graphical elements displayed in the third display layer) are animated with different animations (e.g., if the first set of graphical elements corresponds to the representation of the body of the user, the first set of graphical elements is animated in accordance with the change in appearance (e.g., movement and/or other visual changes) of the body of the user; and if the second set of graphical elements corresponds to the status of the virtual content displayed via the first display generation component, the second set of graphical elements is animated in accordance with the changes in the virtual content that is displayed via the first display generation component). In some embodiments, the first set of graphical elements displayed in the first display layer and the second set of graphical elements displayed in the second display layer are both animated, but the animation in the first display layer and the animation in the second display layer are not synchronized and are based on different real-time changes (e.g., respectively based on the changes in the appearance of the body of the user that is viewing in the three-dimensional environment via the first display generation component, and the changes in the appearance of the virtual content displayed via the first display generation component). This is illustrated in FIGS. 7M1 and 7M2, for example. In FIGS. 7M1 and 7M2, the overlay 7008 is displayed in a different display layer from the progress bar 7004, and from the representation 7006 of the first user 7202; and the overlay 7008 have animated changes in shapes, colors, translucency, and/or other visual characteristics that are based on the visual characteristics changes, and/or progress of the XR content that is displayed via the first display generation component, while the progress bar 7004 is largely static and is updated based on the progress of the movie X, in accordance with some embodiments. The representation 7006 of the first user 7202 is animated in accordance with the movement of the portion of the body of the first user that is represented in the representation 7006, in accordance with some embodiments. Animating, with different animations, the first set of graphical elements displayed in the first display layer and the second set of graphical elements displayed in the second display layer, provides improved visual feedback to the user (e.g., improved visual feedback regarding graphical elements displayed in different display layers).

In some embodiments, at least one of the first set of graphical elements displayed in the first display layer and the second set of graphical elements displayed in the second display layer (and optionally, the third set of graphical elements displayed in the third display layer) is partially transparent. This is illustrated, for example, in FIGS. 7M1 and 7M2 where the overlay 7008 displayed in a display layer above the representation 7006 of the first user 7202 is partially transparent and reveals visual characteristics of the representation 7006 of the first user 7202 in various portions of the overlay 7008, in accordance with some embodiments. In some embodiments, if the second set of graphical elements displayed in the second display layer overlays the first set of graphical elements displayed in the first display layer, the values of one or more visual properties of the first set of graphical elements at different positions (e.g., a first position, a second position, or another position relative to the display area of the second display generation component) have an impact on the values of one or more visual properties of the second set of graphical elements at those different positions (e.g., the first position, the second position, or said other position relative to the display area of the second display generation component), or vice versa. Displaying at least one of the first set of graphical elements displayed in the first display layer and the second set of graphical elements displayed in the second display layer as partially transparent graphical elements, provides improved visual feedback to the user (e.g., improved visual feedback regarding the graphical elements).

In some embodiments, displaying the one or more graphical elements that represent the status associated with the user includes: in accordance with a determination that the representation of the three-dimensional environment corresponds to a first type of activity (e.g., a real-time communication session (e.g., a video call, a virtual conference call, a collaboration session in a virtual meeting room), a virtual gaming experience, or another type of activity) of a plurality of types of activities supported by the three-dimensional environment, displaying a first graphical element that corresponds to the first type of activity (e.g., in a first display layer, in a second display layer, or in another display layer that displays graphical elements indicating the status of the virtual content and/or the metadata related to the experience) (e.g., without displaying a second graphical element that corresponds to a second type activity); and in accordance with a determination that the representation of the three-dimensional environment corresponds to a second type of activity (e.g., a mediation experience, an exercise session, a three-dimensional movie experience, or another type of activity), different from the first type of activity, of the plurality of types of activities supported by the three-dimensional environment, displaying a second graphical element that corresponds to the second type of activity (e.g., in the first display layer, in the second display layer, or in another display layer that displays graphical elements indicating the status of the virtual content and/or the metadata related to the experience) (e.g., without displaying the first graphical element that corresponds to the first type of activity). For example, in FIGS. 7M1 and 7M2, if the XR content displayed via the first display generation component 7100 corresponds to a first type of activity, such as a three-dimensional movie, the computer system displays, via the second display generation component 7102, the progress bar 7004 that indicates the progress of the movie and displays the overlay 7008 that corresponds to the visual content of the movie; and if the XR content displayed via the first display generation 7100 is a second type of activity, such as a shared experience or a communication session, the computer system displays, via the second display generation component 7102, a different set of graphical elements that correspond to the second type of activity (e.g., indicator of a type of communication session such as an overlay of a steady color or appearance, and/or an indicator of a type of communication session), in accordance with some embodiments. Determining, by the computer system, that the representation of the three-dimensional environment corresponds to a first type of activity of a plurality of types of activities supported by the three-dimensional environment, causes the computer system to automatically perform the operation of displaying a first graphical element that corresponds to the first type of activity (e.g., automatically display a graphical element corresponding to activity type without requiring further user input). Determining, by the computer system, that the representation of the three-dimensional environment corresponds to a second type of activity, different from the first type of activity, of the plurality of types of activities supported by the three-dimensional environment, causes the computer system to automatically perform the operation of displaying a second graphical element that corresponds to the second type of activity (e.g., automatically display a graphical element corresponding to activity type without requiring further user input).

In some embodiments, the first type of activity corresponds to a communication activity supported by the three-dimensional environment, and the second type of activity is distinct from a communication activity (e.g., the second type of activity is a meditation activity, a solo gaming activity, an exercise activity, or another type of activity that does not involve real-time communication with another user in the three-dimensional environment). For example, in FIGS. 7M1 and 7M2, if the XR content displayed via the first display generation component 7100 corresponds to a first type of activity, such as a communication session, the computer system displays, via the second display generation component 7102, an indicator of a type of communication session such as an overlay of a steady color or appearance; and if the XR content displayed via the first display generation component 7100 corresponds to a second type of activity, such as a three-dimensional movie, the computer system displays, via the second display generation component 7102, an overlay 7008 that corresponds to the visual content of the movie, in accordance with some embodiments. Displaying the first graphical element that corresponds to the first type of activity and displaying the second graphical element that corresponds to the second type of activity provide improved visual feedback to the user (e.g., improved visual feedback regarding a respective type of activity).

In some embodiments, displaying the first graphical element that corresponds to the first type of activity includes displaying a respective graphical element with a first value for a respective display property of the respective graphical element (e.g., displaying the respective graphical element with a first color, a first shape, a first texture, a first graphical design, or another first value for another display property); and displaying the second graphical element that corresponds to the second type of activity includes displaying the respective graphical element with a second value, different from the first value, for the respective display property of the respective graphical element (e.g., displaying the respective graphical element with a second color different from the first color, a second shape different from the first shape, a second texture different from the first texture, a second graphical design different from the first graphical design, or another second value different from the first value for another display property). For example, in FIGS. 7M1 and 7M2, if the XR content displayed via the first display generation component 7100 corresponds to a first type of activity, such as a communication session, the computer system displays, via the second display generation component 7102, an overlay of a steady green color; and if the XR content displayed via the first display generation component 7100 corresponds to a second type of activity, such as a meditation session, the computer system displays, via the second display generation component 7102, an overlay of a slow moving white color, in accordance with some embodiments. In some embodiments, in accordance with a determination that the computer system is providing a live communication session in the three-dimensional environment via the first display generation component, the computer system displays a green indicator (e.g., a green dot, a blinking telephone symbol, and/or a translucent green overlay) to indicate that the representation of the three-dimensional environment displayed via the first display generation component correspond to a live communication session; and in some embodiments, in accordance with a determination that the computer system is providing media display (e.g., playing a three-dimensional movie, and/or providing an interactive music video (e.g., with dancing and/or singing visual effects)) in the three-dimensional environment via the first display generation component, the computer system displays a blue indicator (e.g., a blue dot, a blinking music note symbol, and/or a translucent blue overlay) to indicate that the representation of the three-dimensional environment displayed via the first display generation component correspond to a media display session. Other examples of the differences in display properties are optionally used to distinguish different types of activities that are supported by the three-dimensional environment, in accordance with various embodiments. Displaying the first graphical element that corresponds to the first type of activity, including displaying a respective graphical element with a first value for a respective display property of the respective graphical element, and displaying the second graphical element that corresponds to the second type of activity, including displaying the respective graphical element with a second value, different from the first value, for the respective display property of the respective graphical element, provides improved visual feedback to the user (e.g., improved visual feedback regarding a respective graphical element and its corresponding type of activity).

In some embodiments, displaying the one or more graphical elements that represent the status associated with the user includes displaying a respective representation of a portion of a body of the user, where displaying the respective representation of the portion of the body of the user includes: in accordance with a determination that ambient lighting meets first lighting criteria (e.g., the ambient light comes from a first direction relative to the first display generation component and/or the user, has a first color or color temperature, has a first level of intensity, and/or has first values for a set of characteristics of ambient light), displaying the respective representation of the portion of the body of the user with a first appearance that is based on the ambient lighting (e.g., the first appearance includes first simulated light and/or shadow, a first set of hues, a first level of fidelity, and/or a first brightness level in the respective representation of the portion of the body of the user); and in accordance with a determination that ambient lighting meets second lighting criteria different from the first lighting criteria (e.g., the ambient light comes from a second direction different from the first direction relative to the first display generation component and/or the user, has a second color or color temperature different from the first color temperature, has a second level of intensity different from the first level of fidelity, and/or has second values different from the first values for the set of characteristics of ambient light), displaying the respective representation of the portion of the body of the user with a second appearance, different from the first appearance, that is based on the ambient lighting (e.g., the second appearance includes second simulated light and/or shadow different from the first simulated light and/or shadow, a second set of hues different from the first set of hues, a second level of fidelity different from the first level of fidelity, and/or a second brightness level different from the first brightness level in the respective representation of the portion of the body of the user). For example, in FIGS. 7AM1 and 7AM2, FIG. 7U, and FIG. 7X, the representation 7006 of the first user 7202 includes a representation of the face of the first user 7202, and the representation of the face of the first user 7202 includes simulated shadows, highlights, and/or shades that are generated based on the characteristics of the ambient lighting (e.g., brightness, color temperature, color, and/or direction of ambient lighting) of the environment in which the representation of the face of the first user 7202 is displayed via the second display generation component 7102, in accordance with some embodiments. In some embodiments, the representation of the face of the first user is reduced in visual prominence (e.g., increased in translucency, reduced in luminance, reduced in contrast, and/or reduced in color saturation) when the ambient light is changed (e.g., dimmed, darkened, and/or reduced in directionality), in accordance with some embodiments. Determining, by the computer system, that ambient lighting meets first lighting criteria, causes the computer system to automatically perform the operation of displaying the respective representation of the portion of the body of the user with a first appearance that is based on the ambient lighting (e.g., automatically display the respective representation of the portion of the body of the user with a respective appearance based on lighting criteria). Determining, by the computer system, that ambient lighting meets second lighting criteria, different from the first lighting criteria, causes the computer system to automatically perform the operation of displaying the respective representation of the portion of the body of the user with a second appearance, different from the first appearance, that is based on the ambient lighting (e.g., automatically display the respective representation of the portion of the body of the user with a respective appearance based on lighting criteria).

In some embodiments, the determination that ambient lighting meets the first lighting criteria includes a determination that ambient light is in a first direction relative to the user (e.g., coming in from the top, top left, left, or another first direction relative to the user), displaying the respective representation of the portion of the body of the user with the first appearance that is based on the ambient lighting includes displaying the respective representation of the portion of the body of the user with first simulated light in the first direction relative to the representation of the portion of the body of the user (e.g., showing simulated highlighted regions on the top, top left, left, or another portion close to the location of the simulated light source, and/or showing simulated shadows on regions on the bottom, lower right, right, or another portion farther away from the location of the simulated light source). In some embodiments, the simulated highlighting and shadows on the representation of the portion of the body of the user are based on a three-dimensional mode of the representation of the portion of the body of the user reacting to simulated light coming from the first direction relative to the three-dimensional model of the representation of the portion of the body of the user. In some embodiments, the determination that ambient lighting meets the second lighting criteria includes a determination that ambient light is in a second direction (e.g., coming in from the bottom, lower right, right, or another second direction relative to the user), different from the first direction, relative to the user, and displaying the respective representation of the portion of the body of the user with the second appearance that is based on the ambient lighting includes displaying the respective representation of the portion of the body of the user with second simulated light in the second direction relative to the representation of the portion of the body of the user (e.g., showing simulated highlighted regions on the bottom, bottom right, right, or another portion close to the location of the simulated light source, and/or showing simulated shadows on regions on the top, upper left, left, or another portion farther away from the location of the simulated light source). In some embodiments, the simulated highlighting and shadows on the representation of the portion of the body of the user are based on the three-dimensional mode of the representation of the portion of the body of the user reacting to simulated light coming from the second direction relative to the three-dimensional model of the representation of the portion of the body of the user. For example, in FIGS. 7AM1 and 7AM2, FIG. 7U, and FIG. 7X, the representation 7006 of the first user 7202 includes a representation of the face of the first user 7202, and the representation of the face of the first user 7202 includes simulated shadows, highlights, and/or shades that are generated based on the directionality of the ambient lighting, in accordance with some embodiments. Determining, by the computer system, that ambient lighting meets the second lighting criteria, including determining that ambient light is in a second direction, different from the first direction, relative to the user, causes the computer system to automatically perform the operation of displaying the respective representation of the portion of the body of the user with the second appearance that is based on the ambient lighting, including displaying the respective representation of the portion of the body of the user with second simulated light in the second direction relative to the representation of the portion of the body of the user (e.g., automatically display the respective representation of the portion of the body of the user with first simulated light coming from a direction that is based on a direction of ambient light relative to the user).

In some embodiments, displaying the respective representation of the portion of the body of the user includes: in accordance with a determination that ambient lighting meets third lighting criteria different from the first lighting criteria and the second lighting criteria (e.g., the ambient light does not have a strong directional quality and comes from substantially all directions around the first display generation component and/or the user, and/or does not have a strong color or has a neutral color), displaying the respective representation of the portion of the body of the user with a third appearance, different from the first appearance and the second appearance (e.g., the third appearance includes third simulated light and/or shadow different from the first and second simulated light and/or shadow, a third set of hues different from the first and second sets of hues in the respective representation of the portion of the body of the user). In some embodiments, the determination that ambient lighting meets the third lighting criteria includes a determination that ambient light does not have a dominant directionality and/or comes from substantially all directions around the user with substantially the same intensity, and/or a determination that the ambient does not meet the first lighting criteria and the second lighting criteria, and displaying the respective representation of the portion of the body of the user with the third appearance includes displaying the respective representation of the portion of the body of the user with neutral simulated light relative to the representation of the portion of the body of the user (e.g., showing a fixed amount of simulated highlighted regions and/or simulated shadows on various regions of the representation of the portion of the body of the user, without indicating a particular directionality of the ambient light). For example, in FIGS. 7AM1 and 7AM2, FIG. 7U, and FIG. 7X, the representation 7006 of the first user 7202 includes a representation of the face of the first user 7202, and the representation of the face of the first user 7202 includes reduced shadows and highlights if the ambient lighting does not have strong directionality, in accordance with some embodiments. Determining, by the computer device, that ambient lighting meets third lighting criteria different from the first lighting criteria and the second lighting criteria, causes the computer device to automatically perform the operation of displaying the respective representation of the portion of the body of the user with a third appearance, different from the first appearance and the second appearance (e.g., automatically display the respective representation of the portion of the body of the user with an appearance that is based on ambient lighting meeting third lighting criteria).

In some embodiments, the determination that the current level of immersion with which the representation of the three-dimensional environment is provided via the first display generation component is the first level of immersion includes a determination that a comparison between a respective amount of virtual content and a respective amount of passthrough content that are currently presented via the first display generation component (e.g., a comparison based on pixel occupancy (e.g., absolute numbers of pixels respectively used to represent virtual content and passthrough content, and/or total display areas respectively occupied by virtual content and passthrough content), a ratio between pixels representing virtual content and pixels representing passthrough content, and/or other indications of relative visual dominance of virtual content and passthrough content) corresponds to a first relative weight (e.g., a first ratio, a first score, or another measure of relative dominance or importance) between virtual content and passthrough content, and the determination that the current level of immersion with which the representation of the three-dimensional environment is provided via the first display generation component is the second level of immersion includes a determination that the comparison between the respective amount of virtual content and the respective amount of passthrough content that are currently presented via the first display generation component corresponds to a second relative weight (e.g., a second ratio, a second score, or another measure of relative dominance or importance) between virtual content and passthrough content, different from the first relative weight. In some embodiments, the first relative weight is below a first threshold weight and the second relative weight is above the first threshold weight (e.g., the first level of immersion is a lower level of immersion compared to the second level of immersion (e.g., the first level of immersion is passthrough mode, and the second level of immersion is a mixed reality mode or fully immersive mode)). In some embodiments, the first relative weight is below a second threshold weight, and the second relative weight is above a third threshold weight that is higher than the second threshold weight (e.g., the first level of immersion is a lower level of immersion compared to the second level of immersion, and there are one more intermediate levels of immersion between the first level of immersion and the second level of immersion) (e.g., the first level of immersion is passthrough mode, the second level of immersion is a fully immersive mode, and there are one or more mixed reality mode with various levels of immersion between the passthrough mode and the fully immersive mode). In some embodiments, the first relative weight is above a first threshold weight and the second relative weight is below the first threshold weight (e.g., the first level of immersion is a higher level of immersion compared to the second level of immersion (e.g., the second level of immersion is passthrough mode and the first level of immersion is a mixed reality mode or fully immersive mode, or the second level of immersion is a mixed reality mode and the first level of immersion is a fully immersive mode)). In some embodiments, the first relative weight is higher than a second threshold weight, and the second relative weight is lower than a third threshold weight that is lower than the second threshold weight (e.g., the first level of immersion is a higher level of immersion compared to the second level of immersion, and there are one more intermediate levels of immersion between the first level of immersion and the second level of immersion) (e.g., the first level of immersion is a fully immersive mode, the second level of immersion is a passthrough mode, and there are one or more mixed reality mode with various levels of immersion between the passthrough mode and the fully immersive mode). For example, in the transition illustrated in FIGS. 7L1-7O, the level of immersion is determined in accordance with a relative weight (e.g., a ratio, a score, or another measure of relative dominance or importance) between the virtual content and the passthrough content in the three-dimensional environment provided via the first display generation component 7100. For example, in FIGS. 7L1 and 7L2, all or substantially all content displayed via the first display generation component is virtual content, and the level of immersion is determined to be a high level of immersion; in FIGS. 7M1 and 7M2, passthrough content is displayed with the virtual content, and a relative weight between virtual content and passthrough content is reduced to a level that corresponds to a first intermediate level of immersion; in FIGS. 7N1 and 7N2, the spatial extent and/or pixel occupation level of passthrough content is increased further, and the relative weight between virtual content and passthrough content is reduced further to correspond to a level of a second intermediate level of immersion that is lower than the first intermediate level of immersion; and in FIG. 7O, the virtual content ceases to be displayed and passthrough content occupies all of the display area of the first display generation component, and the relative weight between virtual content and passthrough content is reduced to a level that corresponds to the passthrough mode or the lowest level of immersion, in accordance with some embodiments. Determining, by the computer system, that the current level of immersion with which the representation of the three-dimensional environment is provided via the first display generation component is a first or a second level of immersion includes automatically determining, by the computer system, that a comparison between a respective amount of virtual content and a respective amount of passthrough content that are currently presented via the first display generation component corresponds to a first or a second relative weight between virtual content and passthrough content (e.g., automatically determine that a comparison between a respective amount of virtual content and a respective amount of passthrough content corresponds to a first or a second relative weight between virtual content and passthrough content, without requiring additional user input). Determining, by the computer system, that the current level of immersion with which the representation of the three-dimensional environment is provided via the first display generation component is the first or the second level of immersion, enables the computer system to automatically display the graphical elements that represent the status associated with the user with a first or second appearance that is based on a first set of one or more visual properties and the status associated with the user (e.g., automatically display graphical elements with a first or second appearance without requiring further user inputs and/or without displaying additional controls).

It should be understood that the particular order in which the operations in FIG. 10 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 11000, 12000, and 13000) are also applicable in an analogous manner to method 10000 described above with respect to FIG. 10. For example, the gestures, gaze inputs, physical objects, user interface objects, and/or animations described above with reference to method 10000 optionally have one or more of the characteristics of the gestures, gaze inputs, physical objects, user interface objects, and/or animations described herein with reference to other methods described herein (e.g., methods 8000, 9000, 11000, 12000, and 13000). For brevity, these details are not repeated here.

FIG. 11 is a flowchart of a method 11000 of displaying an alert for an incoming communication request via a first display generation component or a second display generation component depending on whether the computer system or a wearable device corresponding to the computer system is worn by the user, in accordance with some embodiments.

The method 11000 is performed at a computer system including a first display generation component, a second display generation component (e.g., the first display generation component and the second display component are each a heads-up display, a head-mounted display (HMD), a display, a touchscreen, or a projector, or are separate displays of and/or enclosed in the same housing of a heads-up display, a head-mounted display (HMD), a display, a touchscreen, or a projector) and one or more input devices (e.g., cameras, controllers, touch-sensitive surfaces, joysticks, buttons, gloves, watches, motion sensors, biometric sensors, and/or orientation sensors). In some embodiments, the first display generation component and the second display generation component form a two-sided display device (e.g., a two-sided HMD (e.g., HMD 7100a in FIGS. 7G2, 7H2, 7L2, 7M2, 7N2, 7AA2, 7AB2; HMD 1-100 in FIG. 1B, or another HMD)) that displays a first user interface on a first side corresponding to the first display generation component (e.g., inward-facing displays, and/or display assembly 1-120 in FIG. 1C), and a second user interface on the second side corresponding to the second display generation component (e.g., outward-facing displays, and/or display assembly 1-108 in FIG. 1i). More details of the computer system are provided in the description of the method 8000 above and are not repeated in the interest of brevity.

In the method 11000, the computer system detects (11002) receipt of a first incoming communication request (e.g., receipt of an incoming request to start a shared experience, a VR or AR conference call, a group game in a shared AR or VR environment, a request to establish a voice or video communication session between the user and one or more other users, a calendar reminder for joining a prescheduled conference or meeting at the present time or with a short period of time (e.g., in 1, 2, 5, 15, 30, 60 minutes, or another threshold amount of time)). In response to detecting the receipt of the first incoming communication request, the computer system selectively displays (11004) an alert regarding the receipt of the first incoming communication request via one of the first display generation component and the second display generation component (e.g., via the first display generation component, or via the second display generation component, depending on whether a first set of conditions are met), wherein selectively displaying the alert includes: in accordance with a determination that the first display generation component has a first spatial relationship with a user (e.g., the display area of the first display generation component is facing toward the user, the first display generation component is worn on the user's head, and/or the user's eyes are detected in front of the display area provided by the first display generation component) (e.g., in some embodiments, further in accordance with a determination that the HMD is worn on the user's head, a wrist band or watch is worn on the user's wrist, a backpack containing the computer system or a component thereof is worn on the user's back), displaying (11006), via the first display generation component, a first alert indicating the receipt of the first incoming communication request (e.g., without concurrently displaying an alert via the second display generation component regarding the receipt of the first incoming communication request); and in accordance with a determination that the first display generation component does not have the first spatial relationship with the user (e.g., the display area of the first display generation component is not facing toward the user, the first display generation component is not worn on the user's head, the user's eyes are not detected in front of the display area provided by the first display generation component, and/or the display area of the second display generation component is facing toward the user), displaying (11008), via the second display generation component, a second alert (e.g., an alert that is different in appearance from the first alert) indicating the receipt of the first incoming communication request (e.g., without concurrently displaying an alert via the first display generation component regarding the receipt of the first incoming communication request). For example, as shown in FIG. 7S, in response to detecting the receipt of a first incoming communication request, in accordance with a determination that the first display generation component 7100 has the first spatial relationship with the first user 7202, the computer system displays the alert 7346 via the first display generation component 7100; and as shown in FIG. 7Q, in response to detecting the receipt of a first incoming communication request, in accordance with a determination that the first display generation component 7100 does not have the first spatial relationship with the first user 7202, the computer system displays the alert 7318 via the second display generation component 7102, in some embodiments.

In some embodiments, in response to detecting the receipt of the first incoming communication request, the computer system generates a non-visual output (e.g., an audio alert, a speech alert, a ringtone, a vibration, or a combination of the above) to accompany the alert that is displayed via said one of the first display generation component and the second display generation component. For example, in FIG. 7Q, the computer system, optionally, generates a non-visual alert to accompany the alert 7318, in accordance with some embodiments. In another example, in FIG. 7S, the computer system, optionally, generates a non-visual alert to accompany the alert 7346, in accordance with some embodiments. In some embodiments, generating the non-visual output includes: in accordance with a determination that the first display generation component has the first spatial relationship with the user, generating a first non-visual output to accompany the first alert; and in accordance with a determination that the first display generation component does not have the first spatial relationship with the user, generating a second non-visual output to accompany the second alert. In some embodiments, the first alert and the second alert have different visual appearances, and the first non-visual output and the second non-visual output have the same output type and output characteristics. In some embodiments, the first alert and the second alert have different visual appearances, and the first non-visual output and the second non-visual output have the same output type and different output characteristics. In some embodiments, the first alert and the second alert have different visual appearances, and the first non-visual output and the second non-visual output have the different output types and different output characteristics. In some embodiments, the first alert and the second alert have the same visual appearances, and the first non-visual output and the second non-visual output have the same output type and characteristics. In some embodiments, the first alert and the second alert have the same visual appearances, and the first non-visual output and the second non-visual output have the same output type and different output characteristics. In some embodiments, the first alert and the second alert have the same visual appearances, and the first non-visual output and the second non-visual output have the different output types and output characteristics. Detecting, by the computer system, the receipt of the first incoming communication request, causes the computer system to automatically perform the operation of generating a non-visual output to accompany the alert that is displayed via said one of the first display generation component and the second display generation component (e.g., automatically generate a non-visual output to accompany the alert without requiring further user input).

In some embodiments, the second display generation component provides a display region on an exterior of a head-mounted device (e.g., an HMD that is not currently worn on the user's eyes or head). For example, in FIGS. 7P-7T, the first display generation component 7100 represents the inner display of an HMD, and the second display generation component 7102 represents the outer display of the HMD; and the computer system displays the alert 7318 on the outer display of the HMD, in accordance with some embodiments. Displaying a second alert indicating the receipt of the first incoming communication request via a display region on an exterior of a head-mounted device enables the computer system to provide visual feedback to the user in a manner that is easily perceived by the user without requiring the user to put on the head-mounted device or miss the alert for the incoming communication request.

In some embodiments, while displaying, via the second display generation component, the second alert indicating the receipt of the first incoming communication request and generating the non-visual output (e.g., a second non-visual output that accompany the second alert), the computer system detects a first user input that corresponds to a request to mute the non-visual output (e.g., activating a button on the exterior of the HMD, picking up the HMD, putting the first display generation component in front of the user's eyes, and/or other user inputs to mute a visual and/or non-visual alerts of the second display generation component). In response to detecting the first user input, the computer system ceases to generate the non-visual output (and optionally ceasing to display the second alert via the second display generation component). For example, in FIG. 7Q, the computer system, optionally, generates a non-visual output to accompany the alert 7318 displayed via the second display generation component 7102; and in response to detecting a user's input that corresponds to a request to mute the non-visual output, the computer ceases to generate the non-visual output, in accordance with some embodiments. Detecting, by the computer system while displaying the second alert, a first user input that corresponds to a request to mute the non-visual output, causes the computer system to automatically perform the operation of ceasing to generate the non-visual output (e.g., automatically cease to generate the non-visual output without requiring further user input).

In some embodiments, In response to detecting the first user input, the computer system displays, via the first display generation component, a first user interface object (e.g., an accept button, a reject button, or another user interface object that disposes of the first incoming communication request (e.g., send to voicemail, and/or send an automatic reply)) that, when selected by the user, cause the computer system to accept or reject the first incoming communication request. For example, as shown in FIG. 7R following 7Q, after the first user has provided the input to mute the non-visual alert that accompanied the alert 7318 that was displayed via the second display generation component 7102, the computer system detects that the first display generation component 7100 has the first spatial relationship with the first user 7202 (as shown in FIG. 7R); and in response, the computer system displays a user interface object 7322 via the first display generation component 7100, where the first user interface object 7322 includes options 7324 for accepting or rejecting the first incoming communication request, in accordance with some embodiments. In some embodiments, the computer system displays the first user interface object via the first display generation component, without requiring the user to place the first display generation component into the first spatial relationship with the user (e.g., without requiring the user to put on the HMD, without requiring the user to put the wrist band or watch on his/her wrist, without requiring the user to put the backpack containing a component of the computer system on his/her back, and/or without requiring detecting the user's eyes in front of the first display generation component). Displaying, via the first display generation component, the first user interface object that, when selected by the user, causes the computer system to accept or reject the first incoming communication request, provides improved visual feedback to the user (e.g., improved visual feedback regarding the first incoming communication request).

In some embodiments, in response to detecting the first user input, the computer system continues to display the second alert via the second display generation component. For example, in FIG. 7Q, after the user has muted the non-visual alert that accompanied the alert 7318, the computer system continues to display the alert 7318 via the second display generation component 7102, in accordance with some embodiments. Continuing to display the second alert via the second display generation component, in response to detecting the first user input, provides improved visual feedback to the user (e.g., improved visual feedback regarding the receipt of the first incoming communication request).

In some embodiments, after detecting the first user input, the computer system continues to maintain display of an option to accept the first incoming communication request (and, optionally, continuing to display the second alert via the second display generation component, and/or displaying the first user interface object via the first display generation component for accepting or rejecting the first incoming communication request) (e.g., the first user input that mutes the second non-visual alert does not reject the first incoming communication request). While continuing to maintain display of the option to accept the first incoming communication request after detecting the first user input, the computer system detects a second user input that corresponds to a request to decline the first incoming communication request (e.g., the second user input is of the same input type, and/or using the same control on an input device of the first user input, and/or is a repeat of the first user input; or the second user input is of a different input type, and/or using a different control on the input device of the first user input). In response to detecting the second user input, the computer system declines the first incoming communication request. For example, in FIG. 7Q, if, after the user has provided an input to mute the non-visual output that accompanied the display of the alert 7318, the computer system, optionally, detects, another input that corresponds to a request to decline the first incoming communication request, the computer system declines the first incoming communication request according to the new input, in accordance with some embodiments. For example, in some embodiments, the computer system mutes the non-visual alert of the first incoming communication request in response to a first activation of a button on the exterior of the HMD without rejecting the first incoming communication request, and the computer system rejects the first incoming communication request in response to a second activation of the same button. Detecting, by the computer system, a second user input that corresponds to a request to decline the first incoming communication request, while continuing to maintain display of the option to accept the first incoming communication request after detecting the first user input, causes the computer system to automatically perform the operation of declining the first incoming communication request (e.g., automatically decline the first incoming communication request without requiring further user input).

In some embodiments, detecting the second user input that corresponds to the request to decline the first incoming communication request includes detecting activation of a hardware control that is in communication with the computer system (e.g., a button or switch on the exterior of the HMD, or a button or control on an external input device). For example, in FIG. 7Q, while the alert 7318 is still displayed and after the non-visual alert accompanying the alert 7318 has been muted by a first user input, the computer system detects a second input to decline the first communication request, where the second input includes activation of a hardware control (e.g., control 7302, control 7302', or another hardware control) on the first display generation component 7100, the second display generation component 7102, or the HMD including the first display generation component 7100 and the second display generation component 7102, in accordance with some embodiments. Detecting, by the computer system, the second user input that corresponds to the request to decline the first incoming communication request, causes the computer system to automatically perform the operation of detecting activation of a hardware control that is in communication with the computer system (e.g., automatically detect activation of a hardware control without requiring further user input).

In some embodiments, in response to detecting the second user input, the computer system ceases to display the second alert via the second display generation component. For example, in FIG. 7Q, while the alert 7318 is still displayed and after the non-visual alert accompanying the alert 7318 has been muted by a first user input, the computer system detects a second input to decline the first communication request, where the second input causes the computer system to cease to display the alert 7318 via the second display generation component 7102, in accordance with some embodiments. Detecting, by the computer system, the second user input, causes the computer system to automatically perform the operation of ceasing to display the second alert via the second display generation component (e.g., automatically cease to display the second alert without requiring further user input).

In some embodiments, in accordance with a determination that the first incoming communication request is neither accepted nor rejected within a first threshold amount of time (e.g., 30 seconds, 1, 2, 5, 10, 15, or 30 minutes) after the receipt of the first incoming communication request, the computer system ceases to display the second alert via the second display generation component (and, optionally, ceasing to generate the non-visual output if it has not already been muted by the first user input, and/or ceasing to maintain the option to reject or accept the first incoming communication request). In some embodiments, in FIG. 7Q, if the first incoming communication request is not accepted or rejected or otherwise disposed of by a user input, the computer system ceases to display the alert 7318 (and ceases to output the non-visual output that, optionally, accompanied the alert 7318) after a threshold amount of time has elapsed since the receipt of the first incoming communication request, in accordance with some embodiments. Determining, by the computer system, that the first incoming communication request is neither accepted nor rejected within a first threshold amount of time after the receipt of the first incoming communication request, causes the computer system to automatically perform the operation of ceasing to display the second alert via the second display generation component (e.g., automatically cease to display the second alert without requiring further user input).

In some embodiments, the first threshold amount of time is selected in accordance with a charging state of at least one of the computer system, the first display generation component, and the second display generation component (e.g., whether the HMD is connected to a charging station or power source, whether the HMD has more than a threshold amount of charge, such as 5, 10, 15, 25, 50% charged and/or connected to a power source, and/or whether the HMD is on a power save mode). In some embodiments, in FIG. 7Q, if the first incoming communication request is not accepted or rejected or otherwise disposed of by a user input, the computer system ceases to display the alert 7318 (and ceases to output the non-visual output that, optionally, accompanied the alert 7318) after a threshold amount of time has elapsed since the receipt of the first incoming communication request, where the threshold amount of time is chosen based on a charging state of the first display generation component 7100, the second display generation component 7102, and/or the HMD including the first display generation component 7100 and the second display generation component 7102, in accordance with some embodiments. Determining, by the computer system, a charging state of at least one of the computer system, the first display generation component, and the second display generation component, causes the computer system to automatically select the first threshold amount of time (e.g., automatically select the first threshold amount of time without requiring further user input).

In some embodiments, while displaying the second alert via the second display generation component, the computer system detects that a first set of conditions are met, wherein the first set of condition includes a condition that is met when the first display generation component is placed into the first spatial relationship with the user (e.g., with its display region facing toward the user, or placed in front of the user's eyes) (and, optionally, that the HMD comprising the first display generation component and the second display generation component is worn on the user's head, and/or that the user's eyes are detected in front of the display region of the first display generation component). In response to detecting that the first set of conditions are met, the computer system ceases to display the second alert via the second display generation component (and, optionally, the computer system displays the user interface object(s) for accepting the first incoming communication request, rejecting the first incoming communication request, and/or sending an automatic reply or send the caller to voicemail). For example, as shown in FIG. 7R following FIG. 7Q, while the computer system displays the alert 7318 via the first display generation component, the computer system detects that the first user 7202 has moved to a position in location A 7000-*a* (e.g., putting the HMD on the first user's head, and/or put the display side of the first display generation component 7100 in front of the first user's eyes) such that the first user is in a position to view content presented via the first display generation component; and in response, the computer system ceases to display the alert 7318 via the second display generation component (e.g., the alert 7318 is replaced with other content (e.g., representation 7006 of the portion of the body of the first user 7202, overlay 7326 that indicates the status associated with the content displayed via the first display generation component, and/or other graphical elements that represent the status associated with the first user)), in accordance with some embodiments. Detecting, by the computer system, that a first set of conditions are met while displaying the second alert via the second display generation component, including a condition that is met when the first display generation component is placed into the first spatial relationship with the user, causes the computer system to automatically perform the operation of ceasing to display the second alert via the second display generation component (e.g., automatically cease to display the second alert without requiring further user input).

In some embodiments, while displaying the second alert via the second display generation component, the computer system detects that a second set of conditions are met, wherein the second set of conditions includes a condition that is met when the a first biometric feature has been detected by the computer system (e.g., eyes have been detected in front of the display region of the first display generation component, and/or optionally, valid biometric authentication information (e.g., user's irises, facial features, and/or fingerprint) have been detected). In response to detecting that the second set of conditions are met, the computer system ceases to display the second alert via the second display generation component (and, optionally, the computer system displays the user interface object(s) for accepting the first incoming communication request, rejecting the first incoming communication request, and/or sending an automatic reply or send the caller to voicemail). For example, as shown in FIG. 7R following FIG. 7Q, while the computer system displays the alert 7318 via the first display generation component, the computer system detects that the first user's eyes are detected (e.g., using the sensor 7104 on the display side of the first display generation component 7100, in the location A 7000-*a*) such that the first user is able to view content presented via the first display generation component; and in response, the computer system ceases to display the alert 7318 via the second display generation component (e.g., the alert 7318 is replaced with other content (e.g., representation 7006 of the portion of the body of the first user 7202, overlay 7326 that indicates the status associated with the content displayed via the first display generation component, and/or other graphical elements that represent the status associated with the first user)), in accordance with some embodiments. Detecting, by the computer system, that a second set of conditions are met while displaying the second alert via the second display generation component, including a condition that is met when a first biometric feature has been detected by the computer system, causes the computer system to automatically perform the operation of ceasing to display the second alert via the second display generation component (e.g., automatically cease to display the second alert without requiring further user input).

In some embodiments, in response to detecting that the first set of conditions are met, the computer system displays, via the first display generation component, a second user interface object that includes information regarding the first incoming communication request (e.g., the caller, type of communication, invitees or attendees of the communication session, and/or other information related to the communication request). For example, as shown in FIG. 7R following FIG. 7Q, while the computer system displays the alert 7318 via the first display generation component, the computer system detects that the first user 7202 has moved to a position in location A 7000-*a* (e.g., putting the HMD on the first user's head, and/or put the display side of the first display generation component 7100 in front of the first user's eyes) such that the first user is in a position to view content presented via the first display generation component; and in response, the computer system displays a user interface object 7322 that includes information about the first incoming communication request (e.g., including the identity of the caller, the type of communication requested, and/or other information related to the incoming communication request), in accordance with some embodiments. As shown in FIG. 7R, the first user interface object 7322 is displayed in a three-dimensional environment of an XR experience 7320 (e.g., a VR environment, or an AR environment that includes a representation of the physical environment (e.g., a representation of the physical object 7314 and the location B 7000-B) among virtual content (e.g., the user interface object 7322, and/or other virtual content), in accordance with some embodiments. In some embodiments, the computer system displays a first user interface object (e.g., an accept button, a reject button, or another user interface object that disposes of the first incoming communication request (e.g., send to voicemail, switch to a different device for the call, and/or send an automatic reply)) that, when selected by the user, cause the computer system to accept or reject the first incoming communication request. Detecting, by the computer system that the first set of conditions are met, causes the computer system to automatically perform the operation of displaying, via the first display generation component, a second user interface object that includes information regarding the first incoming communication request (e.g., automatically display a second user interface object without requiring further user input).

In some embodiments, displaying the second user interface object that includes the information regarding the first incoming communication request includes: in accordance with a determination that the user has accepted the first incoming communication request on another device (e.g., a mobile device, a desktop computer, a tablet device, a companion device that has been paired with the HMD, and/or another HMD that is also associated with the user) that is in communication with the computer system, displaying first information in the second user interface object (e.g., displaying a textual and/or graphical prompt indicating that the communication request has been accepted on another device, and an option is available for switching to the HMD to continue the communication session); and in accordance with a determination that the user has not accepted the first incoming communication request, displaying second information, different from the first information, in the second user interface object (e.g., displaying a textual and/or graphical prompt indicating that the communication request has not been accepted on another device, and an option is available for accepting the communication request using the HMD). In some embodiments, in FIG. 7R, if at the time that the computer system detects that the first user 7202 is in a position to view content presented via the first display generation component (e.g., the first user 7202 has moved to a position in front of the display side of the first display generation component 7100, the first user 7202 has put the HMD on his head, and/or the eyes of the first user 7202 has been detected in front of the display side of the first display generation component, and/or other relevant conditions described herein have been met), the computer system also determines that the first incoming communication request has not been accepted using a different device (e.g., a companion device of the computer system, another computer system associated with the first user 7202, and/or a device that is in close proximity communication (e.g., Bluetooth, or other similar communication type) with the computer system); in accordance with the determination that the first incoming communication request has not been accepted using a different device, the computer system displays the user interface object 7322 with the option to accept and/or decline the incoming communication request. However, if the computer system also determines that the first incoming communication request has already been accepted using a different device (e.g., a companion device of the computer system, another computer system associated with the first user 7202, and/or a device that is in close proximity communication (e.g., Bluetooth, or other similar communication type) with the computer system); in accordance with the determination that the first incoming communication request has been accepted using a different device, the computer system displays the user interface object 7322 with the option to continue with the communication session using the first display generation component 7100 (e.g., different information from that shown in the user interface object 7322 in FIG. 7R), in accordance with some embodiments. In some embodiments, in accordance with a determination that the user has accepted the first incoming communication request on another device (e.g., a mobile device, a desktop computer, a tablet device, a companion device that has been paired with the HMD, and/or another HMD that is also associated with the user) that is in communication with the computer system, the computer system displays a respective user interface object that, when selected, causes the computer system to continue the communication session using the computer system (e.g., the HMD, and/or the first display generation component) instead of the other device; and in accordance with a determination that the user has not accepted the first incoming communication request, the computer system displays a respective user interface object that, when selected, causes the computer system to accept the communication request using the computer system (e.g., the HMD, and/or the first display generation component). Determining, by the computer system, that the user has accepted the first incoming communication request on another device that is in communication with the computer system, causes the computer system to automatically perform the operation of displaying first information in the second user interface object (e.g., automatically display first information in the second user interface object without requiring further user input). Determining, by the computer system, that the user has not accepted the first incoming communication request, causes the computer system to automatically perform the operation displaying second information, different from the first information, in the second user interface object (e.g., automatically display second information in the second user interface object without requiring further user input).

In some embodiments, in accordance with a determination that a third set of conditions are met (e.g., in accordance with a determination that the first set of conditions are met, and/or in accordance with a determination that the second set of conditions are met, and/or in accordance with a determination that the incoming communication request was received while the first set of conditions are and and/or the second set of conditions are met), the computer system displays, via the first display generation component, a first notification that corresponds to the first incoming communication request (e.g., the first notification is a viewpoint-locked or head-locked user interface element (e.g., a dot, a banner, or another type of user interface element)). While displaying the first notification, detecting an input that includes first gaze input directed to the first notification. In response to detecting the input that includes the first gaze input directed to the first notification, the computer system expands the first notification to display a first user interface object (e.g., an "accept" button, or an "OK" button) that, when selected (e.g., by an air tap or air pinch gesture, optionally, detected in conjunction with a gaze input directed to the first user interface object), causes the computer system to accept the first incoming communication request. For example, as shown in FIGS. 7S, when the computer system detects receipt of the first incoming communication request, in accordance with a determination that the first user 7202 is wearing the backpack 7340 that includes a component of the computer system (or the first user 7202 has put the HMD on his/her head, the first user 7202 is wearing a wrist band or watch that has been paired with the computer system, and/or the first user 7202 is otherwise wearing a wearable device corresponding to the computer system), the computer system displays a first notification (e.g., a notification, an indicator 7346, a heads-up indicator that is displayed at a first position (e.g., the top center of the display region, the upper left corner of the display region, and/or other positions) relative to the display region of the first display generation component and/or the viewpoint of the first user 7202), and/or a banner, dot, or other objects), in accordance with some embodiments. In FIG. 7T, in response to detecting a gaze input 7348 of the first user 7202 that is directed to the indicator 7346, the indicator 7346 is expanded to show the user interface object 7322 that includes an option 7324-*a* that, when selected, causes the computer system to accept the first incoming communication request, in accordance with some embodiments. In some embodiments, the computer system detects selection of the first user interface object; and in response, the computer system starts the communication session that corresponds to the first incoming communication request on the computer system and displays a user interface of the communication session via the first display generation component. In some embodiments, the computer system detects an input in which the first gaze input is moved away from the first notification, and in response to detecting that the first gaze input has moved away from the first notification, the computer system ceases to display the first notification after a threshold amount of time without requiring further inputs from the user. In some embodiments, the computer system displays a respective selectable option (e.g., a "do not answer" or "ignore" option) that, when selected by a selection input (e.g., by an air tap or air pinch gesture, optionally, detected in conjunction with a gaze input directed to the respective selectable option), causes the computer system to cease to display the first notification, and optionally, reject the communication request. Determining, by the computer system, that a third set of conditions are met, causes the computer system to automatically perform the operation of displaying, via the first display generation component, a first notification that corresponds to the first incoming communication request (e.g., automatically display a first notification without requiring further user input). Detecting, by the computer system while displaying the first notification, an input that includes first gaze input directed to the first notification, causes the computer system to automatically perform the operation of expanding the first notification to display a first user interface object (e.g., automatically expand first notification without requiring further user input). Displaying the first user interface object that, when selected, enables the computer system to accept the first incoming communication request without displaying additional controls.

In some embodiments, displaying the first notification includes displaying an indication of a caller (e.g., a user-name, and/or an avatar of a second user or group that initiated the communication request) of the first incoming communication request. For example, in FIG. 7S, the indicator 7346 that is a notification of the first incoming communication request, optionally, includes an indication of a caller of the first incoming communication request (e.g., an avatar, username, group name, and/or other identifiers of the caller), in accordance with some embodiments. Displaying the first notification, including displaying an indication of a caller of the first incoming communication request, provides improved visual feedback to the user (e.g., improved visual feedback regarding an indication of a caller).

In some embodiments, the first notification is viewpoint-locked to a current viewpoint of the user in the three-dimensional environment. In some embodiments, while a first view of the three-dimensional environment that corresponds to a first viewpoint of the user is visible via the first display generation component, the computer system displays the first notification at a first position in the three-dimensional environment (e.g., before the first user interface object is displayed, or while the first notification and the first user interface object are concurrently displayed), wherein the first notification displayed at the first position has a second spatial relationship with the first viewpoint. While the first notification is displayed via the first display generation component (e.g., before the first user interface object is displayed, or while the first notification and the first user interface object are concurrently displayed), the computer system detects first movement of the current viewpoint of the user from the first viewpoint to a second viewpoint in the three-dimensional environment. In response to detecting the first movement of the current viewpoint of the user from the first viewpoint to the second viewpoint: the computer system displays, via the first display generation component, a second view of the three-dimensional environment that corresponds to the second viewpoint of the user, and the computer system displays, via the first display generation component, the first notification at a second position in the three-dimensional environment, wherein the first notification displayed at the second position has the second spatial relationship with the second viewpoint. For example, in FIG. 7S, the indicator 7346 which is a notification for the first incoming communication request is displayed in a first view of the three-dimensional environment shown via the first display generation component 7100, the indicator 7346 has a first spatial relationship with the current viewpoint of the first user 7202 for the first view of the three-dimensional environment; and if the current viewpoint of the first user 7202 moves (e.g., due to movement of the first user 7202 in the physical environment, movement of the first display generation component 7100 relative to the physical environment, and/or movement of one or more cameras of the computer system that captures the physical environment) and the current viewpoint of the user is now a second viewpoint, the computer system updates the view of the three-dimensional environment displayed via the first display generation component 7100 to a second view that corresponds to the second viewpoint of the first user 7202, and the computer system updates the position of the indicator 7346 in the three-dimensional environment, such that the new position of the indicator 7346 still has the same spatial relationship with the current viewpoint of the first user 7202 (e.g., the second viewpoint), in accordance with some embodiments. Displaying the first notification at a first position in the three-dimensional environment, while a first view of the three-dimensional environment that corresponds to a first viewpoint of the user is visible via the first display generation component, the first notification being displayed at the first position having a second spatial relationship with the first viewpoint, provides improved visual feedback to the user (e.g., improved visual feedback regarding the three-dimensional environment). Detecting, by the computer system while the first notification is displayed via the first display generation component, the first movement of the current viewpoint of the user from the first viewpoint to the second viewpoint, causes the computer system to automatically perform the operations of (i) displaying, via the first display generation component, a second view of the three-dimensional environment that corresponds to the second viewpoint of the user and (ii) displaying, via the first display generation component, the first notification at a second position in the three-dimensional environment (e.g., automatically display a second view of the three-dimensional environment and the first notification at a second position in the three-dimensional environment, without requiring further user input).

In some embodiments, the first user interface object is world-locked to the three-dimensional environment. In some embodiments, while a third view of the three-dimensional environment that corresponds to a third viewpoint of the user is visible via the first display generation component, the computer system displays the first user interface object at a third position in the three-dimensional environment (e.g., after a gaze input is detected on the first notification, and/or while the first notification and the first user interface object are concurrently displayed). While the first user interface object is displayed via the first display generation component, the computer system detects second movement of the current viewpoint of the user from the third viewpoint to a fourth viewpoint in the three-dimensional environment. In response to detecting the second movement of the current viewpoint of the user from the third viewpoint to the fourth viewpoint: the computer system displays, via the first display generation component, a fourth view of the three-dimensional environment that corresponds to the fourth viewpoint of the user, and the computer system displays the first notification at the third position in the three-dimensional environment. For example, in FIGS. 7R and 7T, the user interface object 7322 includes selectable options 7324 for accepting and/or rejecting the first incoming communication request and is displayed in a third view of the three-dimensional environment shown via the first display generation component 7100, where the user interface object 7322 is displayed at a third position in the three-dimensional environment; and if the current viewpoint of the first user 7202 moves (e.g., due to movement of the first user 7202 in the physical environment, movement of the first display generation component 7100 relative to the physical environment, and/or movement of one or more cameras of the computer system that captures the physical environment) and the current viewpoint of the user is now a fourth viewpoint, the computer system updates the view of the three-dimensional environment displayed via the first display generation component 7100 to a fourth view that corresponds to the fourth viewpoint of the first user 7202, and the computer system does not update the position of the user interface object 7322 in the three-dimensional environment, such that the user interface object 7322 is still at the third position in the three-dimensional environment in the fourth view of the three-dimensional environment, in accordance with some embodiments. Displaying the first user interface object at a third position in the three-dimensional environment, while a third view of the three-dimensional environment that corresponds to a third viewpoint of the user is visible via the first display generation component, provides improved visual feedback to the user (e.g., improved visual feedback regarding the three-dimensional environment). Detecting, by the computer system while the first user interface object is displayed via the first display generation component, second movement of the current viewpoint of the user from the third viewpoint to a fourth viewpoint in the three-dimensional environment, causes the computer system to automatically perform the operations of (i) displaying, via the first display generation component, a fourth view of the three-dimensional environment that corresponds to the fourth viewpoint of the user; and (ii) displaying the first notification at the third position in the three-dimensional environment (e.g., automatically display a fourth view of the three-dimensional environment and the first notification at the third position in the three-dimensional environment, without requiring further user input).

In some embodiments, while a fifth view of the three-dimensional environment that corresponds to a fifth viewpoint of the user is visible via the first display generation component, the computer system displays the first notification at a fourth position in the three-dimensional environment (e.g., before the first user interface object is displayed, or while the first notification and the first user interface object are concurrently displayed), wherein the first notification displayed at the fourth position has a third spatial relationship with the fifth viewpoint. While the first notification is displayed via the first display generation component (e.g., before the first user interface object is displayed, or while the first notification and the first user interface object are concurrently displayed), the computer system detects third movement of the current viewpoint of the user from the fifth viewpoint to a sixth viewpoint in the three-dimensional environment. In response to detecting the third movement of the current viewpoint of the user from the fifth viewpoint to the sixth viewpoint: the computer system displays, via the first display generation component, a sixth view of the three-dimensional environment that corresponds to the sixth viewpoint of the user, and the computer system displays, via the first display generation component, the first notification in the sixth view of the three-dimensional environment, including: in accordance with a determination that the first notification has not been expanded to include the first user interface object, displaying the first notification (e.g., unexpanded, without the first user interface object) at a fifth position in the three-dimensional environment, wherein the first notification displayed at the fifth position has the third spatial relationship with the sixth viewpoint (e.g., the first notification is viewpoint-locked, when not expanded); and in accordance with a determination that the first notification has been expanded and includes the first user interface object, displaying the first notification (e.g., expanded and including the first user interface object) at the fourth position in the three-dimensional environment (e.g., the first notification is world-locked, when expanded and including the first user interface object). For example, in FIGS. 7S and 7T, the indicator 7346 which is a notification for the first incoming communication request is displayed in a fifth view of the three-dimensional environment shown via the first display generation component 7100, the indicator 7346 has a fourth position in the three-dimensional environment and a third spatial relationship with the current viewpoint of the first user 7202 for the first view of the three-dimensional environment. If the current viewpoint of the first user 7202 moves (e.g., due to movement of the first user 7202 in the physical environment, movement of the first display generation component 7100 relative to the physical environment, and/or movement of one or more cameras of the computer system that captures the physical environment) and the current viewpoint of the user is now a sixth viewpoint, the computer system updates the view of the three-dimensional environment displayed via the first display generation component 7100 to a sixth view that corresponds to the sixth viewpoint of the first user 7202. If the computer system determines that the indicator 7346 has not been expanded to show the user interface object 7322 (e.g., as shown in FIG. 7S), the computer system updates the position of the indicator 7346 in the three-dimensional environment, such that the new position of the indicator 7346 still has the same third spatial relationship with the current viewpoint of the first user 7202 (e.g., the sixth viewpoint), in accordance with some embodiments. If the computer system determines that the indicator 7346 has been expanded to show the user interface object 7322 (e.g., as shown in FIG. 7T), the computer system does not update the position of the user interface object 7322 and the indicator 7346 in the three-dimensional environment, such that the user interface object 7322 and the indicator 7346 are still at the same position in the three-dimensional environment in the sixth view of the three-dimensional environment, in accordance with some embodiments. Displaying the first notification at a fourth position in the three-dimensional environment, while a fifth view of the three-dimensional environment that corresponds to a fifth viewpoint of the user is visible via the first display generation component, the first notification displayed at the fourth position has a third spatial relationship with the fifth viewpoint, provides improved visual feedback to the user (e.g., improved visual feedback regarding the three-dimensional environment). Detecting, by the computer system, the third movement of the current viewpoint of the user from the fifth viewpoint to the sixth viewpoint, causes the computer system to automatically perform the operations of displaying, via the first display generation component, a sixth view of the three-dimensional environment that corresponds to the sixth viewpoint of the user and displaying, via the first display generation component, the first notification in the sixth view of the three-dimensional environment, including displaying the first notification at a fifth position in the three-dimensional environment in accordance with a determination that the first notification has not been expanded to include the first user interface object and displaying the first notification at the fourth position in the three-dimensional environment in accordance with a determination that the first notification has been expanded and includes the first user interface object (e.g., automatically display notifications at respective positions in the three-dimensional environment without requiring further user input).

In some embodiments, while the first user interface object is displayed via the first display generation component (e.g., in some embodiments, in accordance with a determination that the HMD is worn on the user's head, a wrist band or watch is worn on the user's wrist, or a backpack containing the computer system or a component thereof is worn on the user's back), the computer system detects a third user input (e.g., a gaze input or a gaze and dwell input that is directed to the first user interface object, optionally, detected in conjunction with a tap or pinch air gesture) that selects the first user interface object (e.g., an "accept" button, an "OK" button, or another type of affordance that responds to the first incoming communication request in a respective manner); and in response to detecting the third user input, the computer system accepts the first incoming communication request (or transferring to voicemail, generating an automatic reply, declining the request, depending on which one of the displayed options is selected by the user input). For example, as shown in FIGS. 7R and/or 7T, while the user interface object 7322 is displayed via the first display generation component 7100 and while the first user 7202 is in a position to view content displayed via the first display generation component 7100, the computer system, optionally, detects a user input that selects the option 7324-a for accepting the first incoming communication request (e.g., a gaze input directed to the option 7324-a in conjunction with an air tap or air pinch gesture, or selection of the option 7324-a using a cursor and a confirmation input on a remote control device); and in response to detecting the user input that selects the option 7324-a for accepting the first incoming communication request, the computer system accepts the first incoming communication request and, optionally, displays a user interface of the communication session via the first display generation component, in accordance with some embodiments. In some embodiments, accepting the first incoming communication request includes starting a telephone call, a video call, a teleconference, a VoIP call, a live chat session, a shared three-dimensional experience, an online gaming session, and/or other real-time live communication sessions, with the requesting user of the first incoming communication request. In some embodiments, the computer system displays a first plurality of user interface objects including the first user interface object and one or more other user interface objects, when the first plurality of user interface objects includes respective user interface objects that corresponding to a first plurality of operations with respect to the first incoming communication request.

The computer system detects a user input selecting a respective user interface object of the first plurality of user interface objects; and in response to detecting the user input selecting the respective user interface object of the first plurality of user interface objects: in accordance with a determination that the respective user interface object is the first user interface object, performing a first operation with respect to the first incoming communication request; in accordance with a determination that the respective user interface object is a second user interface object different from the first user interface object, performing a second operation different from the first operation, with respect to the first incoming communication request; and optionally, in accordance with a determination that the respective user interface object is a third user interface object different from the first user interface object and the second user interface object, performing a third operation different from the first and second operations, with respect to the first incoming communication request. In some embodiments, the first plurality of operations include one or more operations selected from: accepting the first incoming communication request, ignoring the first incoming communication request, rejecting the first incoming communication request, transferring the requester of the first incoming communication request to voicemail, generating an automatic reply to the requester of the first incoming communication request, starting a first type of communication session (e.g., a voice-only communication session, or a telephone call) when accepting the first incoming communication request, starting a second type of communication session (e.g., a video communication session, or a video call) when accepting the first incoming communication request, starting a third type of communication session (e.g., a shared three-dimensional experience, an AR-enabled video call, or a VR call); and/or starting a mixed-modality communication session in which users with different device capabilities and/or preferences participate with different call modes (e.g., voice-only, video, AR-enabled, and/or VR-enabled). Detecting, by the computer system while the first user interface object is displayed via the first display generation component, a third user input that selects the first user interface object, causes the computer system to automatically perform the operation of accepting the first incoming communication request (e.g., automatically accept the first incoming communication request without requiring further user input).

In some embodiments, the second alert does not include a textual element. In some embodiments, the second alert is an animated light pattern. In some embodiments, the first alert does not include any textual element either. In some embodiments, the first alert includes a textual element conveying some information regarding the first incoming communication request. For example, as shown in FIG. 7Q, the alert 7318 does not include a textual element, in accordance with some embodiments. Displaying an alert for an incoming communication request without including a textual element allows the alert to be perceived from a distance by the user, and improves the effectiveness and efficiency of the computer system when providing alert for the incoming communication request.

In some embodiments, while displaying the second alert via the second display generation component, the computer system detects that the first display generation component is placed into the first spatial relationship with the user. In response to detecting that the first display generation component has been placed into the first spatial relationship with the user (e.g., the user puts the HMD on his/her head, the user puts the display region of the first display generation component in front of his/her eyes), the computer system displays, via the first display generation component, information about the first incoming communication request that was not displayed in the second alert (e.g., the information includes the caller identity, the type of communication requested, the application associated with the communication request, the status of the call request (e.g., waiting to be picked up or rejected, sent to voicemail, or picked up on another companion device) and/or other types of information). For example, in FIG. 7Q, the alert 7318 is displayed via the second display generation component 7102 and does not include the caller information about the first incoming communication request; and in FIG. 7R, the computer system, in response to detecting that the first user 7202 has the first spatial relationship with the first display generation component 7100 (e.g., the first user 7202 has put the HMD on his/her head, or the computer system has detected presence of eyes of the first user in front of the display side of the first display generation component 7100, and/or satisfaction of other relevant conditions), displays information about the first incoming communication request that was not displayed in the alert 7318 (e.g., the computer system now displays the caller's identity "Mom", and/or other information about the first incoming communication request), in accordance with some embodiments. Detecting, by the computer system while displaying the second alert via the second display generation component, that the first display generation component is placed into the first spatial relationship with the user, causes the computer system to automatically perform the operation of displaying, via the first display generation component, information about the first incoming communication request that was not displayed in the second alert (e.g., automatically display information about the first incoming communication request without requiring further user input).

In some embodiments, selectively displaying the alert includes: in accordance with the determination that the first display generation component has the first spatial relationship with the user (e.g., the display area of the first display generation component is facing toward the user, the first display generation component is worn on the user's head, and/or the user's eyes are detected in front of the display area provided by the first display generation component), forgoing displaying, via the second display generation component, the second alert indicating the receipt of the first incoming communication request. For example, as shown in FIG. 7S, in contrast to the scenario shown in FIG. 7Q, the computer system does not display the alert 7318 via the second display generation component 7102 if the computer system detects the receipt of the first incoming communication request while the first user 7202 has the first spatial relationship with the first display generation component 7100 to view content displayed via the first display generation component (e.g., the first user is wearing the HMD, the wrist band or watch, and/or the backpack 7340 including a component of the computer system, the first user is facing the display side of the first display generation component, and/or eyes of the first user are detected in front of the display side of the first display generation component), the computer system does not display the alert 7318 via the second display generation component 7102 (as shown in FIG. 7S, where the second display generation component displays the overlay 7342 that indicates the status of the XR content 7328 that is displayed via the first display generation component, and optionally, a representation of a portion of the body of the first user 7202), in accordance with some embodiments. Determining, by the computer system, that the first display generation component has the first spatial relationship with a user, causes the computer system to automatically perform the operation of forgoing displaying, via the second display generation component, the second alert indicating the receipt of the first incoming communication request (e.g., automatically forgoing display of the second alert without requiring further user input).

In some embodiments, the computer system detects receipt of a second incoming communication request, wherein the first incoming communication request is of a first type (e.g., a shared three-dimensional XR session) and the second incoming communication request is of a second type (e.g., a video call or a voice call) different from the first type. In response to detecting the receipt of the second incoming communication request: in accordance with a determination that the first display generation component does not have the first spatial relationship with the user, forgoing displaying, via the second display generation component, a respective alert indicating the receipt of the second incoming communication request (e.g., an alert analogous to the second alert described above is not displayed via the second display generation component). For example, in FIG. 7Q, if the incoming communication request is of a second type that is different from a first type associated with the first incoming communication request, the computer system does not display the alert 7318 that would have been displayed for a communication request of the first type, via the second display generation component 7102, in accordance with some embodiments. Detecting, by the computer system, receipt of a second incoming communication request of a second type, along with a determination, by the computer system, that the first display generation component does not have the first spatial relationship with the user, causes the computer system to automatically perform the operation of forgoing displaying, via the second display generation component, a respective alert indicating the receipt of the second incoming communication request (e.g., automatically forgoing display of a respective alert without requiring further user input).

In some embodiments, while the first alert is displayed via the first display generation component in accordance with the determination that the first display generation component has the first spatial relationship with the user, the computer system detects that the first display generation component no longer has the first spatial relationship with the user (e.g., the HMD is taken off the user's head, or the first display generation component is removed from in front of the user's face). In response to detecting that the first display generation component no longer has the first spatial relationship with the user, the computer system ceases to display the first alert via the first display generation component, and forgoes displaying the second alert via the second display generation component. For example, in FIG. 7S, the computer system displays an indicator 7346 via the first display generation component 7100 in response to detecting the receipt of the first incoming communication request and in accordance with a determination that the first user has the first spatial relationship with the first display generation component 7100; and if the first user 7202 ceases to have the first spatial relationship with the first display generation component 7100 (e.g., the first user takes off the HMD, the first user moves out of the location A 7000-*a*, and/or satisfaction of other relevant conditions) while the indicator 7202 is displayed (e.g., before the user interface object 7322 is displayed in response to user interaction with the indicator 7346, or after the user interface object 7322 is displayed in response to user interaction with the indicator 7346), the computer system ceases to display the indicator 7346 (and the user interface object 7322 if it is already displayed), and the computer system also does not display the alert 7318 via the second display generation component (e.g., in contrast to the scenario shown in FIG. 7Q), in accordance with some embodiments. For example, in some embodiments, if the HMD is taken off of the user's head (or alternatively, if the wrist band or watch is taken off the user's wrist, or the backpack containing a component of the computer system is taken off the user's back) while the first alert is displayed via the first display generation component, the computer system mutes the first incoming communication request (e.g., ceases to display the first alert on the first display generation component, and ceases to generate any non-visual alert regarding the first incoming communication request), but the computer system also does not display the second alert via the second display generation component, even though the first display generation component no longer has the first spatial relationship with the user. In other words, in some embodiments, if the computer system has already displayed the first alert regarding the first communication request via the first display generation component, it will not display the second alert via the second display generation component once the HMD is taken off the user's head; however, if the computer system has displayed the second alert regarding the first communication request via the second display generation component, it will display the first alert via the first display generation component once the HMD is put onto the user's head. Detecting, by the computer system that the first display generation component no longer has the first spatial relationship with the user, causes the computer system to automatically perform the operations of (i) ceasing to display the first alert via the first display generation component, and (ii) forgoing displaying the second alert via the second display generation component (e.g., automatically cease to display the first alert and forgo display of the second alert without requiring further user input).

In some embodiments, while displaying, via the first display generation component, a user interface of a respective communication session (e.g., a communication session corresponding to the first incoming communication request, a communication session corresponding to an outgoing communication request, or another communication session) that is ongoing (e.g., displaying a communication user interface including respective representations of other users participating in a live communication session in the three-dimensional environment (e.g., displaying a user interface of a video, augmented reality, and/or virtual reality communication session, a mixed modality communication session of the above, and/or a shared three-dimensional, virtual reality or mixed reality experience)), the computer system displays, via the second display generation component, a first visual indication that indicates that the respective communication session is ongoing (e.g., displaying a hue or translucent overlay of a respective color (e.g., blue, green, or another color or combination of colors), a respective animated movement pattern (e.g., pulses of illumination, waves of intensity variations, or other visual changes), and/or other visual characteristics and/or changes thereof). In accordance with a determination that the respective communication session is no longer active (e.g., paused and/or terminated, due to interrupted connection and/or proactive termination inputs by the user), the computer system ceases to display the first visual indication via the second display generation component (e.g., to indicate that the respective communication session is interrupted and/or has ended). For example, in FIG. 7R and FIG. 7T, after the first user accepts the incoming communication request (e.g., by selecting "Y" to answer the call from "Mom"), the computer system displays the user interface of the communication session via the first display generation component 7100, and also displays a visual indication via the second display generation component 7102 that indicates the communication session is currently ongoing. In some embodiments, the visual indication includes an overlay analogous to the overlay 7008 shown in FIG. 7C, and optionally includes a steady color or animated changes that corresponds to the communication session. In some embodiments, after the communication session is over, the computer system ceases to display the visual indication, and optionally displays a different visual indication regarding the current status associated with the first user, in accordance with some embodiments. In some embodiments, in accordance with a determination that the first display generation component has the first spatial relationship with the portion of the body of the user (e.g., the user is wearing the HMD that has the first display generation component as the inner display generation component, and/or the display side of the first display generation component is facing toward the eyes of the user) and that the respective communication session is ongoing, the computer system displays a user interface of the respective communication session via the first display generation component and displays, via the second display generation component, a first visual indication that indicates that the respective communication session is ongoing; the computer system subsequently detects that the respective communication session has been terminated (e.g., through interaction by the user with the user interface of the respective communication session, through the action of another participant of the respective communication session, and/or through other events); and in response to detecting that the respective communication session has been terminated, the computer system ceases to display the user interface of the respective communication session via the first display generation component, and ceases to display the first visual indication via the second display generation component, and optionally displays another user interface via the first display generation component, and another indication via the second display generation component to indicate the current status associated with the user. Displaying, via the second display generation component, a first visual indication that indicates that the respective communication session is ongoing, while displaying, via the first display generation component, a user interface of a respective communication session, provides improved visual feedback to the user (e.g., improved visual feedback ongoing communication). Determining, by the computer system, that the respective communication session is no longer active, causes the computer system to automatically perform the operation of ceasing to display the first visual indication via the second display generation component (e.g., automatically cease to display the first visual indication without requiring additional user input).

It should be understood that the particular order in which the operations in FIG. 11 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 12000, and 13000) are also applicable in an analogous manner to method 11000 described above with respect to FIG. 11. For example, the gestures, gaze inputs, physical objects, user interface objects, and/or animations described above with reference to method 11000 optionally have one or more of the characteristics of the gestures, gaze inputs, physical objects, user interface objects, and/or animations described herein with reference to other methods described herein (e.g., methods 8000, 9000, 10000, 12000, and 13000). For brevity, these details are not repeated here.

FIG. 12 is a flowchart of a method 12000 of changing one or more display parameters of a representation of a portion of the body of a user in response to detecting changes in one or more environmental parameters associated with a physical environment in which the representation of the portion of the body of the user is displayed, in accordance with some embodiments.

As disclosed herein, when displaying a representation of a portion of a body of a user via a display generation component (e.g., an external display of an HMD worn by the user, a display that is obscuring an external viewer's direct view of the portion of the body of the user located behind the display, or another display that displays a representation of a portion of a body of a user (optionally, when the user is not physically present in the same physical environment as the display)), in response to detecting one or more changes in a set of environmental parameters associated with a physical environment in which the representation of the portion of the body of the user is displayed, the computer system changes at least a value of a first display parameter of the representation of the portion of the body of the user according to the one or more changes in the set of environmental parameters. For example, a change in ambient lighting and/or a change in the viewing angle of a viewer of the representation of the portion of the body of the user cause the computer system to change (e.g., increase, decrease, and/or otherwise change a value of) the color, brightness, translucency, and/or other display parameters of the representation of the portion of the body of the user, e.g., to reflect the changes in the environmental parameters and/or simulate the effect of the change in the external environment on the view of the representation of the portion of the body of the user. However, in some embodiments, depending on the visual characteristics of the representation of the portion of the body of the user, the computer system applies different amounts of changes to the one or more display parameters of the representation of the portion of the body of the user for the same amount and/or type of changes in the environmental parameters of the external environment in which the representation of the portion of the body of the user is displayed. Customizing the amount of change applied to a display parameter of the representation of the portion of the body of the user based on the visual characteristics of the representation of the portion of the body of the user, in response to and in accordance with a change in the environmental parameters associated with a physical environment in which the representation of the portion of the body of the user is displayed, balances the benefit of using the appearance of the representation of the portion of the body of the user to provide feedback to a viewer regarding the change in the environmental parameter of the physical environment, and the need to maintain sufficient visual saliency and/or realism of the representation of the portion of the body for different representations of the user with different visual characteristics, thereby making the computer system more efficient in communicating with the viewer about the states of the computer system, the user, and/or the physical environment.

The method 12000 is performed at a computing system (e.g., the computer system 101 in FIG. 1A, and/or the computer system described with respect to FIGS. 7A-7AQ)

including a first display generation component (e.g., display generation component 7100, or another display generation component), a second display generation component (e.g., display generation component 7102, or another display generation component different from the first display generation component) and one or more input devices (e.g., sensors, cameras, touch-sensitive surfaces, buttons, controls, proximity sensors, motion sensors, and/or other input devices). In some embodiments, the first display generation component and the second display generation component form a two-sided display device (e.g., a two-sided HMD (e.g., HMD 7100a in FIGS. 7G2, 7H2, 7L2, 7M2, 7N2, 7AA2, 7AB2; HMD 1-100 in FIG. 1B, or another HMD)) that displays a first user interface on a first side corresponding to the first display generation component (e.g., inward-facing displays, and/or display assembly 1-120 in FIG. 1C), and a second user interface on the second side corresponding to the second display generation component (e.g., outward-facing displays, and/or display assembly 1-108 in FIG. 1).

In the method 12000, while a representation of a three-dimensional environment (e.g., a view of one or more virtual elements and/or a representation of one or more portions of a physical environment via digital or optical passthrough) is visible via the first display generation component, the computer system displays (12002), via the second display generation component, a representation of a portion of a body (e.g., a portion of a human body) (e.g., the visual representation is a computer-generated image (e.g., a realistic or stylized image generated based on a camera view of the user's eyes) or a camera view of the user's eyes) (e.g., when the user is wearing the HMD, and the user's face or eyes are facing the inner display of the HMD, and the HMD is blocking others' direct view of the user's face or eyes and the user's direct view of the surrounding environment). For example, as shown in FIGS. 7U-7W, and FIG. 7Z, a representation 7006 of a portion of a body of the first user 7202 is displayed via the second display generation component 7102, while XR content 7002 is displayed and visible via the first display generation component 7100, in accordance with some embodiments.

In the method 12000, while displaying the representation of the portion of the body via the second display generation component, the computer system detects (12004) one or more changes in a first set of environmental parameters associated with a physical environment in which the representation of the portion of the body is displayed via the second display generation component. In some embodiments, the physical environment in which the representation of the portion of the body is displayed is the same physical environment in which the portion of the body is physically present, the same physical environment in which the second display generation component (and the first display generation component) is present, and/or the same physical environment in which a viewer who is in a position to view content displayed via the second display generation component is physically present. Optionally, the second display generation component, the viewer of the second display generation component, and the portion of the body occupy different sub-portions of the physical environment which optionally have different ambient lighting and different spatial relationships to one another and to the physical environment as a whole. In some embodiments, the one or more changes include a change in a first environmental parameter corresponding to an ambient light level of a physical environment (e.g., a first portion of the physical environment) in which the representation of the portion of the body is displayed, a change in a second environmental parameter corresponding to a viewing angle of another person that is in a position to view the content displayed via the second display generation component, a change in a third environmental parameter corresponding to a tone and/or other visual properties of ambient lighting of a physical environment (e.g., the first portion of the physical environment, and/or a second portion of the physical environment) in which the representation of the portion of the body is displayed and/or in which other people that are in positions to view the content displayed via the second display generation component are present; and/or other changes in other environmental parameters corresponding to the physical environment in which the representation of the portion of the body is displayed via the second display generation component. For example, as illustrated in FIG. 7X following FIG. 7U, in FIG. 7AA1 following FIG. 7Z, and in FIG. 7AA2 following FIG. 7Z, the computer system detects a change in ambient lighting in the location B 7000-b in which the representation 7006 of the portion of the body of the first user 7202 is displayed. As further illustrated in FIG. 7Y following FIG. 7U, in FIG. 7AB1 following FIG. 7Z, and in FIG. 7AB2 following FIG. 7Z, the computer system detects a change in the viewing angle of a viewer 7204 relative to the representation 7006 of the portion of the body of the first user 7202.

In the method 12000, in response to detecting the one or more changes in the first set of environmental parameters associated with the physical environment in which the representation of the portion of the body (e.g., of the first user 7202) is displayed via the second display generation component, the computer system changes (12006) a respective value of a first display parameter for the representation of the portion of the body (e.g., including a display parameter that determines a visual emphasis of the representation of the portion of the body such as a brightness parameter, a saturation parameter, a contrast parameter, or other visual parameter that may affect the visibility and/or visual prominence of the representation of the portion of the body to a viewer at a respective viewing position and/or angle) in accordance with the one or more changes in the first set of environmental parameters associated with the physical environment in which the representation of the portion of the body is displayed via the second display generation component (e.g., including a respective set of environmental parameters associated with a respective portion of the physical environment in which the portion of the body is present, a respective set of environmental parameters associated with a respective portion of the physical environment in which the second display generation component is present, and/or a respective set of environmental parameters associated with a portion of the physical environment in which the viewer of the second display generation component is present). In some embodiments, changing (12006) a respective value of a first display parameter for the representation of the portion of the body includes: in accordance with a determination that one or more visual properties of the representation of the portion of the body meet first appearance criteria (e.g., has a first color, a first skin tone, and/or other first visual characteristics), changing (12008) the respective value of the first display parameter for the representation of the portion of the body by a first amount; and in accordance with a determination that the one or more visual properties of the representation of the portion of the body meet second appearance criteria different from the first appearance criteria (e.g., the representation of the portion of the body does not meet the first appearance criteria and/or meets some other appearance criteria different from the first appearance criteria) (e.g., has a second color, a second skin tone, and/or other second visual characteristics), changing (12010) the respective value of the first display parameter for the representation of the portion of the body by a second amount, different from the first amount. This is illustrated, for example, by a comparison between the scenario shown in FIG. 7X following FIG. 7U and the scenario shown in FIG. 7AA1 (or FIG. 7AA2) following FIG. 7Z. In these two example scenarios, the computer system detects a change in ambient lighting in the location B 7000-*b* in which the representation 7006 of the portion of the body of the first user 7202 is displayed, and changes the display parameters of the representation 7006 of the portion of the body of the first user. However, the changes to the display parameters of the representation 7006 of the portion of the body of the first user 7202 are carried out using two different filters 7402-*b* and 7402-*e*, depending on the visual properties of the representation 7006 of the portion of the body (e.g., the representations 7006-*g* and 7006-*j* in FIGS. 7U and 7X have different visual properties that meet different appearance criteria from the representation 7006-1 and 7006-*m* in FIG. 7Z and FIGS. 7AA1 and 7AA2). This is further illustrated, for example, by a comparison between a scenario shown in FIG. 7Y following FIG. 7U and a scenario shown in FIG. 7AB1 (or FIG. 7AB2) following FIG. 7Z. In these two example scenarios, the computer system detects a change in the viewing angle of a viewer 7204 relative to the representation 7006 of the portion of the body of the first user 7202, and changes the display parameters of the representation 7006 of the portion of the body of the first user using two different filters 7402-*c* and 7402-*f*, depending on the visual properties of the representation 7006 of the portion of the body (e.g., the representation 7006-*g* and 7006-*k* in FIGS. 7U and 7Y have different visual properties that meet different appearance criteria from the representation 7006-1 in FIG. 7Z and representation 7006-*n* in FIGS. 7AB1 and 7AB2).

In some embodiments, the one or more changes in the first set of environmental parameters associated with the physical environment in which the representation of the portion of the body is displayed via the second display generation component include a respective change in a measure of a first characteristic of ambient light (e.g., including a measure of brightness, color temperature, tone, frequency, energy distribution of frequencies, and/or other characteristics of lighting conditions) in the physical environment in which the representation of the portion of the body is displayed via the second display generation component. In some embodiments, in response to detecting one or more changes in the measure of the first characteristic of ambient light in the physical environment in which the portion of the body is displayed via the second display generation component: in accordance with a determination that the one or more visual properties of the representation of the portion of the body meet first appearance criteria, the computer system changes the respective value of the first display parameter for the representation of the portion of the body by a first amount that is based on the change in the measure of the first characteristic of the ambient light, and based on the one or more visual properties of the representation of the portion of the body; and in accordance with a determination that the one or more visual properties of the representation of the portion of the body meet second appearance criteria different from the first appearance criteria, the computer system changes the respective value of the first display parameter for the representation of the portion of the body by a second amount that is based on the change in the measure of the first characteristic of the ambient light, and based on the one or more visual properties of the representation of the portion of the body, where the second amount is different from the first amount due to the difference in the one or more visual properties of the representation of the portion of the body in the two scenarios. For example, when the ambient light changes (e.g., increased in brightness, decreased in brightness, or changed toward a warmer tone, or changed toward a cooler tone) by a respective amount in the physical environment in which the representation of the portion of the body is displayed, depending on whether the visual properties of the representation (e.g., the tone, color, luminance, blur radius, translucency, color saturation, whether it is a camera feed or a stylized avatar, and/or other visual properties) meet first appearance criteria or the second appearance criteria (e.g., respective thresholds values for the individual visual properties and/or combinations of the visual properties, and/or conditions related to the visual properties), the computer system changes the values for one or more visual properties of the representation of the portion of the body by different amounts, e.g., to maintain and/or improve the visibility of the representation of the portion of the body in different ambient lighting conditions. This is illustrated, for example, by a comparison between the scenario shown in FIG. 7X following FIG. 7U and the scenario shown in FIGS. 7AA1 and 7AA2 following FIG. 7Z. In these two example scenarios, the computer system detects a change in ambient lighting in the location B 7000-*b* in which the representation 7006 of the portion of the body of the first user 7202 is displayed, and changes the display parameters of the representation 7006 of the portion of the body of the first user. However, the changes to the display parameters of the representation 7006 of the portion of the body of the first user 7202 are carried out using two different filters 7402-*b* and 7402-*e*, depending on the visual properties of the representation 7006 of the portion of the body (e.g., the representation 7006-*g* and 7006-*j* in FIGS. 7U and 7X have different visual properties that meet different appearance criteria from the representation 7006-1 in FIG. 7Z and the representation 7006-*m* in FIGS. 7AA1 and 7AA2). Detecting, by the computing system, of the one or more changes in the first set of environmental parameters associated with the physical environment in which the representation of the portion of the body is displayed via the second display generation component, including detection of a respective change in a measure of a first characteristic of ambient light in the physical environment, causes the computing system to automatically perform the operation of changing a respective value of a first display parameter for the representation of the portion of the body in accordance with the one or more changes in the first set of environmental parameters associated with the physical environment in which the representation of the portion of the body is displayed via the second display generation component (e.g., automatically change a respective value of a first display parameter without requiring further user input).

In some embodiments, the one or more changes in the first set of environmental parameters associated with the physical environment in which the representation of the portion of the body is displayed via the second display generation component include a respective change in a viewing angle of a viewer that is at a position to view content displayed via the second display generation component (e.g., the viewing angle is defined relative to a front-and-center viewing position and/or another optimal viewing position or region, in front of the display region of the second display generation component, and/or including viewing angle from a position above, below, within, to the left of, or to the right of, the optimal viewing region) in the physical environment in which the representation of the portion of the body is displayed via the second display generation component. In some embodiments, the second display generation component has a curved display surface or a flat surface, and depending on the viewing angle of the viewer, the visual properties of the content shown on different portions of the display surface may appear differently to a viewer at differ- ent viewing angles relative to the display surface. In some embodiments, to compensate the differences in the visual properties of content displayed via the second display gen- eration component that are resulted from the different view- ing angles of the external viewer, the computer system changes the values of the visual properties of the content based on the viewing angle of the external viewer. In some embodiments, the computer system displays the representa- tion of the portion of the body via the second display generation component with different values for the visual properties of the representation of the portion of the body based on the viewing angle of the external viewer, e.g., in order to maintain some symmetry between the how well the user behind the second display generation component can see the external viewer (e.g., through the passthrough por- tion of the HMD including the first display generation component and the second display generation component) and how well the viewer in front of the second display generation component can see the representation of the user (e.g., through the displayed representation of the portion of the body of the user as shown via the second display generation component). In some embodiments, the com- puter system implements different amounts of changes in the visual properties of the representation of the portion of the body for the same change in the viewing angle of the external viewer, depending on the visual properties of the representation of the portion of the body (e.g., depending on the absolute values, and/or whether the values meet certain criteria or conditions). In some embodiments, in response to detecting one or more changes in the viewing angle of a viewer who is in a position to view content displayed via the second display generation component: in accordance with a determination that the one or more visual properties of the representation of the portion of the body meet first appear- ance criteria, the computer system changes the respective value of the first display parameter for the representation of the portion of the body by a third amount that is based on the changes in the viewing angle of the viewer, and based on the one or more visual properties of the representation of the portion of the body; and in accordance with a determination that the one or more visual properties of the representation of the portion of the body meet second appearance criteria different from the first appearance criteria, the computer system changes the respective value of the first display parameter for the representation of the portion of the body by a fourth amount that is based on the changes in the viewing angle of the viewer, and based on the one or more visual properties of the representation of the portion of the body, where the fourth amount is different from the third amount due to the difference in the one or more visual properties of the representation of the portion of the body in the two scenarios. For example, when the viewing angle of the viewer who is in a position to view content displayed via the second display generation component changes by a respective amount from a center position to a peripheral position in the latitudinal direction or in the longitudinal direction relative to the second display generation compo- nent, depending on whether the visual properties of the representation (e.g., the tone, color, luminance, blur radius, translucency, color saturation, whether it is a camera feed or a stylized avatar, and/or other visual properties) meet first appearance criteria or the second appearance criteria (e.g., respective thresholds values for the individual visual prop- erties and/or combinations of the visual properties, and/or conditions related to the visual properties), the computer system changes the values for one or more visual properties of the representation of the portion of the body by different amounts, e.g., to maintain and/or improve the visibility of the representation of the portion of the body to the viewer at the different viewing angles. For example, in the two con- trasting examples shown in FIG. 7Y following FIG. 7U and FIGS. 7AB1 and 7AB2 following FIG. 7Z, the computer system detects a change in the viewing angle of a viewer 7204 relative to the representation 7006 of the portion of the body of the first user 7202, and changes the display param- eters of the representation 7006 of the portion of the body of the first user using two different filters 7402-c and 7402-e, depending on the visual properties of the representation 7006 of the portion of the body (e.g., the representation 7006-g and 7006-k in FIGS. 7U and 7Y have different visual properties that meet different appearance criteria from the representation 7006-1 in FIG. 7Z and the representation 7006-n in FIGS. 7AB1 and 7AB2). More details of how a change in viewing angle of an external viewer of a display generation component (e.g., the second display generation component 7102, or another display generation component) impacts the values of one or more display parameters of the representation of an object (e.g., the representation of a portion of the body of the first user 7202, or another user) are described with respect to FIGS. 7AC1-7AQ and FIG. 13, in accordance with various embodiments. Detecting, by the computing system, of the one or more changes in the first set of environmental parameters associated with the physical environment in which the representation of the portion of the body is displayed via the second display generation com- ponent, including detection of a respective change in a viewing angle of a viewer that is at a position to view content displayed via the second display generation component, causes the computing system to automatically perform the operation of changing a respective value of a first display parameter for the representation of the portion of the body in accordance with the one or more changes in the first set of environmental parameters associated with the physical environment in which the representation of the portion of the body is displayed via the second display generation com- ponent (e.g., automatically change a respective value of a first display parameter without requiring further user input).

In some embodiments, changing the respective value of the first display parameter for the representation of the portion of the body in accordance with the one or more changes in the first set of environmental parameters associ- ated with the physical environment in which the represen- tation of the portion of the body is displayed, includes: in accordance with a determination that the one or more changes in the first set of environmental parameters include a respective change in a first environmental parameter of the first set of environmental parameters (and optionally, does not include a respective change in a second environmental parameter of the first set of environmental parameters), changing the respective value of the first display parameter in accordance with a first relationship between the first display parameter and the first environmental parameter; and in accordance with a determination that the one or more changes in the first set of environmental parameters include a respective change in a second environmental parameter of the first set of environmental parameters (and optionally, does not include a respective change in the first environmental parameter of the first set of environmental parameters), changing the respective value of the first display parameter in accordance with a second relationship between the first display parameter and the second environmental parameter, wherein the second relationship is different from the first relationship (e.g., the first relationship and the second relationship are represented by functional curves with different shapes, domains, and/or signs of correlation, that respectively correspond to different environmental parameters). For example, in FIG. 7X and FIG. 7U, the computer system uses a first functional relationship between a respective display parameter and a respective property of ambient lighting to select the filter 7402 (e.g., filter 7402-*a* and filter 7402-*b*) for changing the value of the respective display parameter of the representation 7006 of the portion of the body of the first user 7202 based on the current value of the respective property of the ambient lighting. In FIG. 7Y following FIG. 7U, the computer uses a second functional relationship between a respective display parameter and a viewing angle of the viewer 7402 to select the filter 7402 (e.g., filter 7402-*a* and 7402-*c*) for changing the value of the respective display parameter of the representation 7006 of the portion of the body of the first user 7202 based on the current value of the viewing angle of the second user 7402 relative to the second display generation component. The second functional relationship is different from the first functional relationship, and respectively correspond to two different environmental parameters that can change. Similarly, in FIG. 7Z and FIGS. 7AA1 and 7AA2, the computer system uses a third functional relationship between the respective display parameter and the respective property of ambient lighting to select the filter 7402 (e.g., filter 7402-*d* and filter 7402-*e*) for changing the value of the respective display parameter of the representation 7006 of the portion of the body of the first user 7202 based on the current value of the respective property of the ambient lighting. Similarly, in FIGS. 7AB1 and 7AB2 following FIG. 7Z, the computer uses a fourth functional relationship between the respective display parameter and the viewing angle of the viewer 7402 to select the filter 7402 (e.g., filter 7402-*a* and 7402-*f*) for changing the value of the respective display parameter of the representation 7006 of the portion of the body of the first user 7202 based on the current value of the viewing angle of the second user 7402 relative to the second display generation component. The third functional relationship is different from the fourth functional relationship, and respectively correspond to two different environmental parameters that can change. Determining, by the computing system, that the one or more changes in the first set of environmental parameters include a respective change in a first environmental parameter of the first set of environmental parameters, causes the computing system to automatically perform the operation of changing the respective value of the first display parameter in accordance with a first relationship between the first display parameter and the first environmental parameter (e.g., automatically change the respective value of the first display parameter without requiring further user input). Determining, by the computing system, that the one or more changes in the first set of environmental parameters include a respective change in a second environmental parameter of the first set of environmental parameters, causes the computing system to automatically perform the operation of changing the respective value of the first display parameter in accordance with a second relationship between the first display parameter and the second environmental parameter, wherein the second relationship is different from the first relationship (e.g., automatically change the respective value of the first display parameter without requiring further user input).

In some embodiments, changing the respective value of the first display parameter for the representation of the portion of the body by the first amount in accordance with the determination that the one or more visual properties of the representation of the portion of the body meet the first appearance criteria, includes changing the respective value of the first display parameter in accordance with a third relationship between the first display parameter and a respective environmental parameter of the first set of environmental parameters that has been changed; and changing the respective value of the first display parameter for the representation of the portion of the body by the second amount in accordance with the determination that the one or more visual properties of the representation of the portion of the body meet the second appearance criteria, includes changing the respective value of the first display parameter in accordance with a fourth relationship between the first display parameter and the respective environmental parameter of the first set of environmental parameters that has been changed (e.g., the environmental parameter corresponding to the characteristic of the ambient light, or the viewing angle of the external viewer), wherein the fourth relationship is different from the third relationship (e.g., the third relationship and the fourth relationship are represented by functional curves with different shapes, domains, and/or signs of correlation, that respectively correspond to visual properties of the representation of the portion of the body that meet different appearance criteria). For example, in the two example scenarios in FIG. 7X following FIG. 7U, and in FIGS. 7AA1 and 7AA2 following FIG. 7Z, the computer system uses two different functional relationships between a respective display parameter and a respective property of ambient lighting to select the filter 7402 (e.g., filter 7402-*c* and filter 7402-*e*) for changing the value of the respective display parameter of the representation 7006 of the portion of the body of the first user 7202 based on the current value of the respective property of the ambient lighting. In some embodiments, the two different functional relationships respectively correspond to the visual properties of the representation 7006 of the portion of the body (e.g., the representation 7006-*g* and 7006-*j* in FIGS. 7U and 7X have different visual properties that meet different appearance criteria from the representation 7006-1 in FIG. 7Z and the representation 7006-*m* in FIGS. 7AA1 and 7AA2). Similarly, in the two example scenarios shown in FIG. 7Y following FIG. 7U and in FIGS. 7AB1 and 7AB2 following 7Z, the computer uses two different functional relationship between a respective display parameter and a viewing angle of the viewer 7402 to select the filter 7402 (e.g., filter 7402-*c* and 7402-*f*) for changing the value of the respective display parameter of the representation 7006 of the portion of the body of the first user 7202 based on the current value of the viewing angle of the second user 7402 relative to the second display generation component. The two different functional relationships respectively correspond to the visual properties of the representation 7006 of the portion of the body (e.g., the representation 7006-*g* and 7006-*k* in FIGS. 7U and 7Y have different visual properties that meet different appearance criteria from the representation 7006-1 in FIG. 7Z and the representation 7006-*n* in FIGS. 7AB1 and 7AB2). Determining, by the computing system, that one or more visual properties of the representation of the portion of the body meet first appearance criteria, causes the computing system to automatically perform the operation of changing the respective value of the first display parameter in accordance with a third relationship between the first display parameter and a respective environmental parameter of the first set of environmental parameters that has been changed (e.g., automatically change the respective value of the first display parameter in accordance with a third relationship, without requiring further user input). Determining, by the computing system, that the one or more visual properties of the representation of the portion of the body meet second appearance criteria different from the first appearance criteria, causes the computing system to automatically perform the operation of changing the respective value of the first display parameter in accordance with a fourth relationship, different from the third relationship, between the first display parameter and the respective environmental parameter of the first set of environmental parameters that has been changed (e.g., automatically change the respective value of the first display parameter in accordance with a fourth relationship, without requiring further user input).

In some embodiments, changing the respective value of the first display parameter in accordance with the third relationship for the representation of the portion of the body (e.g., of the user) that meets the first appearance criteria and changing the respective value of the first display parameter in accordance with the fourth relationship for the representation of the portion of the body that meets the second appearance criteria produce less than a threshold amount of difference (e.g., no difference, and/or a unperceivable or negligible amount of difference for an average viewer) between a first perceived change in the first display parameter for the representation of the portion of the body that meets the first appearance criteria and a second perceived change in the first display parameter for the representation of the portion of the body that meets the second appearance criteria. For example, in some embodiments, for a respective change in a first environmental parameter, the first display parameter of the representation of the user is to be changed by a corresponding amount in accordance with a respective standard functional relationship between the first environmental parameter and the first display property; however, such a "standard" amount of change in the first display parameter would be affect the visibility of the representation of the portion of the body differently depending on whether the visual properties of the representation of the portion of the body meet the first appearance criteria or the second appearance criteria. Therefore, the "standard" amount of change is further modified in accordance with the third relationship between the first display parameter and the first environmental parameter if the one or more visual properties of the representation of the portion of the body meet the first appearance criteria, and modified in accordance with the fourth relationship between the first display parameter and the first environmental parameter if the one or more visual properties of the representation of the portion of the body meet the second appearance criteria. In some embodiments, the third relationship and the fourth relationship between the first display parameter and the first environmental parameter are configured such that they produce the same or similar perceived amount of change in the first display parameter for the representation of the portion of the body for the same amount of change in the first environmental parameter. Similarly, different relationships between the first display parameter and a second environmental parameter are used for representations of the portion of the body that meet respectively the first appearance criteria and the second appearance criteria to modify a "standard" change in the first display parameter caused by a given amount of change in the second environmental parameter, such that they produce the same or similar perceived amount of change in the first display parameter for the representation of the portion of the body for the same amount of change in the second environmental parameter. For example, the perceived change between the representation 7006-*j* modified by the filter 7402-*b* in FIG. 7X and the representation 7006-*g* modified by filter 7402-*a* in FIG. 7U is substantially the same to the perceived change between the representation 7006-*m* modified by the filter 7402-*e* in FIGS. 7AA1 and 7AA2 and the representation 7006-1 modified by the filter 7402-*d* in FIG. 7Z. In another example, the perceived change between the representation 7006-*k* modified by the filter 7402-*c* in FIG. 7Y and the representation 7006-*g* modified by filter 7402-*a* in FIG. 7U is substantially the same to the perceived change between the representation 7006-*n* modified by the filter 7402-*f* in FIGS. 7AB1 and 7AB2 and the representation 7006-1 modified by the filter 7402-*d* in FIG. 7Z. Determining, by the computing system, that one or more visual properties of the representation of the portion of the body meet the first appearance criteria and meet the second appearance criteria, causes the computing system to automatically perform the operation of changing the respective value of the first display parameter in accordance with the third relationship and the fourth relationship, including producing less than a threshold amount of difference between a first perceived change in the first display parameter for the representation of the portion of the body that meets the first appearance criteria and a second perceived change in the first display parameter for the representation of the portion of the body that meets the second appearance criteria (e.g., automatically change the respective value of the first display parameter, including produce less than a threshold amount of difference, without requiring further user input).

In some embodiments, changing the respective value of the first display parameter in accordance with the third relationship for the representation of the portion of the body (e.g., of the user) that meets the first appearance criteria produces a greater amount of change in the first display parameter for a given amount of change in the respective environmental parameter, than changing the respective value of the first display parameter in accordance with the fourth relationship for the representation of the portion of the body that meets the second appearance criteria. For example, in some embodiments, if the representation of the portion of the body has a lighter tone (e.g., has a set of lighter tones, or has tones lighter than a threshold tone), the amount of change in the first display parameter (e.g., dimming, and/or reduction in luminance) that is caused by a given amount of change in the first environmental parameter (e.g., a given amount of change in the ambient light or a given change in viewing angle of the external user), is greater than if the representation of the portion of the body has a darker tone (e.g., has a set of darker tones, or has tones darker than a threshold tone). For example, in some embodiments, a greater amount of change is made to the representation 7006 of the first user 7202 by the filter 7402-*b* in FIG. 7X, as compared to the change made to the representation 7006 of the first user 7202 by the filter 7402-*e* in FIGS. 7AA1 and 7AA2, for the same starting ambient light and the same amount of change in the ambient light, in accordance with the difference in the visual properties of the representation 7006 in the two example scenarios in FIG. 7X and FIGS. 7AA1 and 7AA2. In another example, in some embodiments, a greater amount of change is made to the representation 7006 of the first user 7202 by the filter 7402-*c* in FIG. 7Y, as compared to the change made to the representation 7006 of the first user 7202 by the filter 7402-*f* in FIGS. 7AB1 and 7AB2, for the same starting viewing angle and the same amount of change in the viewing angle of the viewer 7402. Determining, by the computing system, that one or more visual properties of the representation of the portion of the body meet the first appearance criteria, causes the computing system to automatically perform the operation of changing the respective value of the first display parameter in accordance with the third relationship, including producing a greater amount of change in the first display parameter for a given amount of change in the respective environmental parameter, than changing the respective value of the first display parameter in accordance with the fourth relationship for the representation of the portion of the body that meets the second appearance criteria (e.g., automatically change the respective value of the first display parameter, including producing a greater amount of change for a given amount of change in the respective environmental parameter than that in accordance with the fourth relationship, without requiring further user input).

In some embodiments, changing the respective value of the first display parameter in accordance with the third relationship for the representation of the portion of the body (e.g., of the user) that meets the first appearance criteria produces a lesser amount of change in the first display parameter for a given amount of change in the respective environmental parameter, than changing the respective value of the first display parameter in accordance with the fourth relationship for the representation of the portion of the body that meets the second appearance criteria. For example, in some embodiments, if the representation of the portion of the body has a lighter tone (e.g., has a set of lighter tones, or has tones lighter than a threshold tone), the amount of change in the first display parameter (e.g., dimming, and/or reduction in luminance) that is caused by a given amount of change in the first environmental parameter (e.g., a given amount of change in the ambient light or a given change in viewing angle of the external user), is less than if the representation of the portion of the body has a darker tone (e.g., has a set of darker tones, or has tones darker than a threshold tone). For example, in some embodiments, a smaller amount of change is made to the representation 7006 of the first user 7202 by the filter 7402-*b* in FIG. 7X, as compared to the change made to the representation 7006 of the first user 7202 by the filter 7402-*e* in FIGS. 7AA1 and 7AA2, for the same starting ambient light and the same amount of change in the ambient light, in accordance with the difference in the visual properties of the representation 7006 in the two example scenarios in FIG. 7X and FIGS. 7AA1 and 7AA2. In another example, in some embodiments, a smaller amount of change is made to the representation 7006 of the first user 7202 by the filter 7402-*c* in FIG. 7Y, as compared to the change made to the representation 7006 of the first user 7202 by the filter 7402-*f* in FIGS. 7AB1 and 7AB2, for the same starting viewing angle and the same amount of change in the viewing angle of the viewer 7402. Determination, by the computing system, that one or more visual properties of the representation of the portion of the body meet the first appearance criteria, causes the computing system to automatically perform the operation of changing the respective value of the first display parameter in accordance with the third relationship, including producing a lesser amount of change in the first display parameter for a given amount of change in the respective environmental parameter, than changing the respective value of the first display parameter in accordance with the fourth relationship for the representation of the portion of the body that meets the second appearance criteria (e.g., automatically change the respective value of the first display parameter, including producing a lesser amount of change in the first display parameter for a given amount of change in the respective environmental parameter, than that in accordance with the fourth relationship, without requiring further user input).

In some embodiments, the representation of the portion of the body is a graphical depiction of the portion of the body (e.g., an avatar, an animated or static two-dimensional model, an animated or static three-dimensional model, and/or a stylized rendition of a face, upper body, or whole body of a user that is in a position to view content presented via the first display generation component). For example, in FIGS. 7U-7AB2, the representation 7006 of the first user includes a graphical depiction of a portion of the body of the first user, such as the face, head, and/or upper body of the first user 7202, in accordance with some embodiments. Providing a graphical depiction of the portion of the body, as the representation of the portion of the body, provides improved visual feedback to the user (e.g., improved visual feedback regarding the representation of the portion of the body).

In some embodiments, the representation of the portion of the body includes a representation of at least a portion of a face of a user (e.g., the user who is in a position to view content displayed via the first display generation component, and whose face is blocked by the presence of the first display generation component and the second display generation component from external viewers who are in positions to view content displayed via the second display generation component). For example, in FIGS. 7U-7AB2, the representation 7006 of the first user includes a representation 7006 of the first user 7202, which includes a representation of the face of the first user 7202, in accordance with some embodiments. Providing a representation of at least a portion of a face of a user, as the representation of the portion of the body, provides improved visual feedback to the user (e.g., improved visual feedback regarding the representation of the portion of the body).

In some embodiments, displaying, via the second display generation component, the representation of the portion of the body includes displaying animated movements of the representation of the portion of the body in accordance with movement of the portion of the body. For example, in some embodiments, the portion of the body includes eyes of a user, and the representation of the portion of the body includes representation of the user's eyes that are animated in accordance with real movement of the eyes of the user. In another example, in some embodiments, the portion of the body includes the face of a user, and the representation of the portion of the body are animated to show facial expressions that are based on the real movement of the face of the user that produce changes in facial expressions. As shown in FIGS. 7U-7V, the representation 7006 of the first user 7202 shown via the second display generation component 7102 is animated in accordance with the movement of the first user 7202, including movement of the portion of the body of the first user 7202, relative to the first display generation component 7100, in accordance with some embodiments. Displaying animated movements of the representation of the portion of the body in accordance with movement of the portion of the body provides improved visual feedback to the user (e.g., improved visual feedback regarding the representation of the portion of the body).

In some embodiments, while the representation of the three-dimensional environment is visible via the first display generation component, the computer displays, via the second display generation component, content other than the representation of the portion of the body, concurrently with the representation of the portion of the body, wherein changing the respective value of the first display parameter for the representation of the portion of the body in response to detecting the one or more changes in the first set of environmental parameters associated with the physical environment in which the representation of the portion of the body is displayed via the second display generation component, includes changing the respective value of the first display parameter for the representation of the portion of the body (e.g., reducing luminance, increasing translucency, reducing color saturation, and/or otherwise changing the visual appearance of the representation of the portion of the body to increase or decrease the visual prominence of the representation of the portion of the body) relative to the content other than the representation of the portion of the body. For example, in some embodiments, when changing the display parameter(s) of the representation of the portion of the body in accordance with detected changes in one or more environmental parameters associated with the physical environment in which the representation of the portion of the body is displayed, the amount of change in the display parameter(s) of the representation of the portion of the body is greater than the amount of change, if any, in the same display properties of the content other than the representation of the portion of the body, that is caused by the changes in the one or more environmental parameters. For example, as shown in FIG. 7X relative to FIG. 7U, FIG. 7Y relative to FIG. 7U, FIGS. 7AA1 and 7AA2 relative to Figure Z, and FIGS. 7AB1 and 7AB2 relative to FIG. 7Z, the appearance of the representation 7006 of the first user 7202 is modified by the filter 7402 due to the change in environmental conditions such as the ambient lighting and/or viewing angle of the viewer 7402, while the appearances of other graphical elements, such as the appearances of the overlay 7008 and the progress bar 7004, are not modified by the filter 7402, in accordance with some embodiments. Detecting, by the computing system, of the one or more changes in the first set of environmental parameters associated with the physical environment in which the representation of the portion of the body is displayed via the second display generation component, causes the computing system to automatically perform the operation of changing the respective value of the first display parameter for the representation of the portion of the body, including changing the respective value of the first display parameter for the representation of the portion of the body relative to the content other than the representation of the portion of the body (e.g., automatically change the respective value of the first display parameter for the representation of the portion of the body relative to content other than the representation of the portion of the body, without requiring further user input).

In some embodiments, the content other than the representation of the portion of the body that is concurrently displayed with the representation of the portion of the body via the second display generation component includes one or more indications of a status of the first display generation component (e.g., an indication of whether the first display generation component is displaying a passthrough view of the physical environment, or is displaying a virtual environment without displaying a passthrough view of the physical environment). In some embodiments, the one or more indications of a status of the first display generation component includes an indication of the type of content (e.g., media content, application content, device control content, communication content, and other types of content) that is displayed via the first display generation component, an operational state of the first display generation component (e.g., parental control is active, a DND mode is active, a sleep mode, a private mode, a real-time communication session is on-going, and/or other states or modes). For example, as shown in FIG. 7X relative to FIG. 7U, FIG. 7Y relative to FIG. 7U, FIGS. 7AA1 and 7AA2 relative to Figure Z, and FIGS. 7AB1 and 7AB2 relative to FIG. 7Z, the appearance of the representation 7006 of the first user 7202 is modified by the filter 7402 due to the change in environmental conditions such as the ambient lighting and/or viewing angle of the viewer 7402, while graphical elements that indicate the status of the first display generation component 7100, such as the overlay 7008 and the progress bar 7004, are not modified by the filter 7402, in accordance with some embodiments. Concurrently displaying, via the second display generation component, one or more indications of a status of the first display generation component, provides improved visual feedback to the user (e.g., improved visual feedback regarding the status of the first display generation component).

In some embodiments, displaying the content other than the representation of the portion of the body, concurrently displayed with the portion of the body, via the second display generation component, includes changing one or more visual properties of the content other than the representation of the portion of the body in accordance with a change in a level of immersion with which virtual content of the three-dimensional environment is displayed via the first display generation component (e.g., the level of immersion is determined based on relative amount of virtual content and content representing the physical environment, a comparison between respective total display areas occupied by the virtual content and the content representing the physical environment, and/or a ratio between the number of pixel occupied by the virtual content and the number of pixels occupied by the content representing the physical environment)). For example, as shown in FIG. 7X relative to FIG. 7U, FIG. 7Y relative to FIG. 7U, FIGS. 7AA1 and 7AA2 relative to Figure Z, and FIGS. 7AB1 and 7AB2 relative to FIG. 7Z, the appearance of the representation 7006 of the first user 7202 is modified by the filter 7402 due to the change in environmental conditions such as the ambient lighting and/or viewing angle of the viewer 7402, while the overlay 7008 that indicates a level of immersion with which XR content 7002 is displayed via the first display generation component 7100, is not modified by the filter 7402, in accordance with some embodiments. More details of the different levels of immersion, indications of the level of immersion, how levels of immersion may change, are provided with respect to FIGS. 7A-7T and FIGS. 8-11. Displaying the content other than the representation of the portion of the body via the second display generation component, including changing one or more visual properties of the content other than the representation of the portion of the body in accordance with a change in a level of immersion with which virtual content of the three-dimensional environment is displayed via the first display generation component, provides improved visual feedback to the user (e.g., improved visual feedback regarding the level of immersion with which virtual content of the three-dimensional environment is displayed via the first display generation component).

It should be understood that the particular order in which the operations in FIG. 12 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 11000, and 13000) are also applicable in an analogous manner to method 12000 described above with respect to FIG. 12. For example, the gestures, gaze inputs, physical objects, user interface objects, and/or animations described above with reference to method 12000 optionally have one or more of the characteristics of the gestures, gaze inputs, physical objects, user interface objects, and/or animations described herein with reference to other methods described herein (e.g., methods 8000, 9000, 10000, 11000, and 13000). For brevity, these details are not repeated here.

FIG. 13 is a flowchart of a method 13000 of changing respective values of one or more display parameters of an object other than a viewing perspective of the object, in response to detecting one or more movements that change the viewing angle of a viewer relative to the object, in accordance with some embodiments.

As disclosed herein, when the viewing angle of a respective viewer relative to an object displayed via a display generation component changes (e.g., due to movement of the display generation component, and/or movement of the respective viewer), the computer system changes values of one or more display parameters of the object that affect the visual prominence of the object if the change in viewing angle causes the respective viewer to move out of a preferred viewing zone for the object. In some embodiments, when multiple viewers are present in the environment of the display generation component, and as a respective viewer moves from one viewing zone to another viewing zone relative to the object displayed via the display generation component, the computer system changes the values of one or more display parameters of the object that affect the visual prominence of the object for the respective viewer, and optionally changes the values of the one or more display parameters of the object that is displayed for another viewer who is in the same viewing zone with the respective viewer before and/or after the movement of the respective viewer, in accordance with various embodiments. Changing the values of one or more display parameters of the object based on a change in viewing angle of a respective viewer provides improved feedback to the viewer(s) in the environment (e.g., by indicating the movement of the viewers in the environment and/or the change in relative viewing angle of the viewers in the environment), and provides improved security and privacy for the user whose representation and/or status is displayed as the object via the display generation component (e.g., by changing the values of the display parameters of the representation of the user, optionally relative to other status indicators associated with the status of the user).

In some embodiments, the method 13000 is performed at a computing system (e.g., computer system 101 in FIG. 1A or computer system 140 in FIG. 4, and/or the computer system described with respect to FIGS. 7A-7AQ and FIGS. 1A-12) including at least a first display generation component (and optionally, a second display generation component) and one or more input devices. In some embodiments, the first display generation component is a standalone display that is independent of another display generation component. In some embodiments, the first display generation component is part of a head-mounted device (HMD) that includes the first display generation component facing away from the user wearing the HMD (e.g., displaying content for viewing by an external viewer who is not wearing the HMD), and includes a second display generation component facing toward the user who is wearing the HMD. It is to be noted that, here the first display generation component may be referred to as a second display generation component in other examples provided in this disclosure, and vice versa. In some embodiments, the method 13000 is illustrated in FIGS. 7AC1-7AQ. In some embodiments, the first display generation component described in method 13000 is used as and/or has the features of the second display generation component 7102 in FIGS. 7A-7AB2 and FIGS. 1A-12. In some embodiments, the first display generation component described in method 13000 is used as and/or has the features of the first display generation component 7100 in FIGS. 7A-7AB2 and FIGS. 1A-12. In some embodiments, the first display generation component described in FIGS. 7AC1-7AQ and the method 13000 have features independent of those described with respect to FIGS. 7A-7AB2 and FIGS. 1A-12.

In the method 13000, the computer system displays (13002), via the first display generation component, a first object (e.g., a virtual object, a user interface object, a respective visual representation of a portion of a body (e.g., a portion of a human body, and/or a portion of the face of a user whose face is blocked by an HMD)). For example, as shown in FIGS. 7AC1-7AQ, an object, such as a cube, or another type of object such as a representation 7006 of a portion of the body of the first user 7202 in FIGS. 7A-7AB2, graphical elements such as overlay 7008 or progress bar 7004, application windows, three-dimensional models, user interface controls, images, graphics, and/or other virtual objects, is displayed via the display generation component 7408, in accordance with some embodiments.

In the method 13000, while displaying the first object via the first display generation component, the computer system detects (13004) (e.g., via one or more sensors of the computer system) one or more movements (e.g., movements of the first display generation component and/or of a first viewer who is in a position to view content displayed via the first display generation component) that change a viewing angle of a first viewer relative to content (e.g., including the first object, and/or other content concurrently displayed with the first object) that is displayed via the first display generation component (e.g., relative to the portion of the first display generation component that displays the content and/or relative to the user who is wearing the HMD that includes the first display generation component as the outward facing display generation component). In some embodiments, the movements that change the viewing angle of the first viewer relative to the content that is displayed via the first display generation component are detected via one or more sensors (e.g., cameras, motion sensors, proximity sensors, light sensors, and other sensors of movement, position, and/or proximity) that are part of the computer system and/or that are in communication with the computer system. This is illustrated in FIG. 7AE following FIG. 7AD, FIG. 7AF following FIG. 7AD or FIG. 7AE, FIG. 7AG following FIG. 7AD, FIG. 7AE or FIG. 7AF, FIG. 7AH following FIG. 7AD, where relative movements between the viewer A 7406-1 and the display generation component 7408 cause the viewing angle of the viewer A 7406-1 to change in the latitudinal direction of the display generation component 7408, in accordance with some embodiments. This is further illustrated in FIG. 7AI following FIG. 7AD, and FIG. 7AJ following FIG. 7AI or FIG. 7AD, where relative movements between the viewer A 7406-1 and the display generation component 7408 cause the viewing angle of the viewer A 7406-1 to change in the longitudinal direction of the display generation component 7408, in accordance with some embodiments. This is further illustrated in FIGS. 7AM1-7AQ, where a respective viewer 7406 among viewers A, B, and C move in the longitudinal direction or in the latitudinal direction to change the viewing angle of the respective viewer 7406 relative to the display generation component 7408, in accordance with some embodiments.

In the method 13000, in response to detecting the one or more movements that change the viewing angle of the first viewer relative to the content that is displayed via the first display generation component, in accordance with a determination that the change in the viewing angle of the first viewer meets first criteria (e.g., the change causes the viewing angle to switch between different viewing zones (e.g., as shown in FIG. 7AF following FIG. 7AD or 7AE, and FIG. 7AG following FIG. 7AD, 7AE, or 7AF), and/or that the change in viewing angle of the first viewer causes the first viewer to enter the same viewing angle or viewing range of another viewer in the latitudinal direction of the display generation component (e.g., as shown in FIG. 7AN following FIG. 7AM1 or 7AM2, FIG. 7AO following FIG. 7AM1 or 7AM2, FIG. 7AP1 or 7AP2 following FIG. 7AM1 or 7AM2, FIG. 7AP1 or 7AP2 following FIG. 7AM1 or 7AM2, and FIG. 7AQ following FIG. 7AP1 or 7AP2)), the computer system changes (13006) a value of at least a first display parameter of the first object other than a viewing perspective of the first object (e.g., a display parameter that determines a visual emphasis of the representation of the portion of the body such as a brightness parameter, a saturation parameter, a contrast parameter, or other visual parameter). For example, in addition to changing a viewing perspective of the first object, the computer system also changes at least one display parameter that affects the visual emphasis of the first object, e.g., relative to the external environment and/or relative to other content displayed concurrently with the first object, in accordance with the change in the viewing angle of the first viewer relative to the content displayed via the first display generation component. In some embodiments, in response to detecting the one or more movements that change the viewing angle of the first viewer relative to the content that is displayed via the first display generation component, the computer system changes (optionally, without requiring the change in viewing angle to meet the first criteria) a value of at least a first display parameter of the first object other than a viewing perspective of the first object (e.g., without regard to whether or not the change in the viewing angle of the first viewer meets first criteria). In some embodiments, in response to detecting the one or more movements that change the viewing angle of the first viewer relative to the content that is displayed via the first display generation component, in accordance with a determination that the change in the viewing angle of the first viewer does not meet the first criteria (e.g., the change does not cause the viewing angle to switch between different viewing zones, and/or the change in viewing angle of the first viewer does not cause the first viewer to enter the same viewing angle or viewing range of another viewer in the latitudinal direction of the display generation component) the computer system forgoing changing the value of at least the first display parameter of the first object. This is illustrated in FIGS. 7AF, 7AG, 7AH, 7AI, 7AJ, 7AK, 7AL, where the views 7404-4, 7404-5, 7404-6, 7404-7, 7404-8, 7404-9, and 7404-10 of the first object (e.g., the cube shown in the figures, and/or another object, such as the representation 7006 of the portion of the body of the first user 7202, graphical elements that indicate status associated with the first user 7202, and other visual content shown in FIGS. 7A-7AB2) are dimmed, undimmed, and/or otherwise modified by respective filters or removal of previously applied filters (e.g., in addition to changing the viewing perspective of the first object based on the updated viewing angle of the viewer A), in accordance with some embodiments. This is further illustrated in FIGS. 7AM1-7AQ, where when multiple viewers are present, movement of one viewer may cause the view displayed to the moving viewer and, optionally, another viewer to be modified in terms of display parameters other than the viewing perspective of the first object (e.g., dimmed, undimmed, and/or otherwise modified by respective filters or removal of previously applied filters), in accordance with some embodiments.

In some embodiments, changing the value of at least the first display parameter for the first object other than the viewing perspective of the first object includes, changing the value of at least the first display parameter of the first object in accordance with at least one of a movement direction and a movement magnitude of the one or more movements relative to the content that is displayed via the first display generation component. For example, as described with respect to FIG. 7AF-7AG, the amount of change applied to display parameters of the view 7404 of the first object increases based on the movement direction and movement magnitude of the viewer A (e.g., reduced in visual prominence by greater amounts in views 7404-4, 7404-5 as viewer 7404-1 moves farther away from the preferred viewing zone in the latitudinal direction). In another example, as described with respect to FIG. 7AJ-7AL, the amount of change applied to display parameters of the view 7404 of the first object increases based on the movement direction and movement magnitude of the viewer A (e.g., reduced in visual prominence by greater amounts in views 7404-8, 7404-9, and 7404-10, as viewer 7404-1 moves farther away from the preferred viewing zone in the longitudinal direction). As described with respect to FIGS. 7AD-7AL, reversal of the movement direction changes the direction of the change that is applied to the view of the first object, and a smaller amount of movement corresponds to a smaller amount of change that is applied to the view of the first object, in accordance with some embodiments. In some embodiments, the viewing angle of the first viewer is changed in a direction and/or by an amount that is determined by the direction and/or magnitude of the movement of the first viewer relative to the first display generation component and/or the direction and/or magnitude of the movement of the first display generation component relative to the first viewer (e.g., caused by movement of the user (e.g., the user's head, or the user as a whole) that is wearing an HMD including the first display generation component as the outward facing display generation component, or caused by movement of the user's hand holding the first display generation component with the first displaying generation component facing away from the user), and the computer system changes the values of one or more display parameters of the first object in accordance with the amount and direction that the viewing angle of the first viewer is changed relative to the content displayed via the first display generation component. In some embodiments, the changes in the one or more display parameters are made in accordance with a determination that the viewing angle of the first viewer has crossed a respective threshold value (e.g., entered from a preferred viewing zone into a dimmed viewing zone, from a dimmed viewing zone to a further dimmed viewing zone or an off zone, or vice versa). Changing the value of at least the first display parameter of the first object in accordance with at least one of a movement direction and a movement magnitude of the one or more movements relative to the content that is displayed via the first display generation component, provides improved visual feedback to the user (e.g., improved visual feedback regarding movement direction and/or movement magnitude).

In some embodiments, the one or more movements that change the viewing angle of the first viewer relative to the content that is displayed via the first display generation component includes at least a first movement of the first viewer (e.g., vertical movement, horizontal movement, depth movement, rotational movement, and/or various combinations of the above movements, of the first viewer in the physical environment of the first viewer and the first display generation component) relative to the first display generation component (e.g., while the first display generation component is stationary and/or moving in the physical environment). For example, in FIGS. 7AE-7AG and FIGS. 7AI, 7AK, and 7AL, the change in the viewing angle of the viewer A 7406-1 is caused by the movement of the viewer A relative to the display generation component 7408 in the physical environment, in accordance with some embodiments. In some embodiments, the movements that change the viewing angle of the first viewer relative to the content that is displayed via the first display generation component are detected via one or more sensors (e.g., cameras, motion sensors, proximity sensors, light sensors, and other sensors of movement, position, and/or proximity) that are part of the computer system and/or that are in communication with the computer system. In some embodiments, the first movement includes a latitudinal movement of the first viewer in a latitudinal direction of the first display generation component (e.g., a horizontal direction, a left-and-right direction of the display region of the first display generation component, a direction that is substantially parallel to a bottom edge of the display region of the first display generation component). In some embodiments, the first movement includes a longitudinal movement of the first viewer in a longitudinal direction of the first display generation component (e.g., a vertical direction, a up and down direction of the display region of the first display generation component, a direction that is substantially perpendicular to a bottom edge of the display region of the first display generation component). In some embodiments, the first movement includes a rotational movement relative to the display region of the first display generation component, such as a clockwise rotation or a counter-clockwise rotation that is caused by the first viewer tilting his/her head relative to the display region of the first display generation component. In some embodiments, the first movement of the first viewer is caused by the first viewer walking around a user wearing an HMD that includes the first display generation component as the outward facing display generation component. In some embodiments, the first movement of the first viewer is caused by the first viewer moving higher or lower relative to the user wearing the HMD that includes the first display generation component as the outward facing display generation component (e.g., the first viewer standing up while the user wearing the HMD remains sitting, the first viewer sitting down while the user wearing the HMD remains standing, the first viewer standing up from a sitting position while the user wearing the HMD remains standing, the first viewer sitting down from a standing position while the user wearing the HMD remains sitting down, the first viewer standing up from a sitting position while the user wearing the HMD remains sitting down, or the first viewer sitting down from a standing position while the user wearing the HMD remains standing). Detecting, by the computing system, of the one or more movements that change the viewing angle of the first viewer relative to the content that is displayed via the first display generation component, including at least a first movement of the first viewer relative to the first display generation component, causes the computing system to automatically perform the operation of changing a value of at least a first display parameter of the first object in accordance with a determination that the change in the viewing angle of the first viewer meets first criteria (e.g., automatically change a value of a first display parameter of the first object without requiring further user input).

In some embodiments, the one or more movements that change the viewing angle of the first viewer relative to the content that is displayed via the first display generation component includes at least a second movement of the first display generation component (e.g., vertical movement, horizontal movement, depth movement, rotational movement, and/or various combinations of the above movements, of the first display generation component in the physical environment of the first viewer and the first display generation component) relative to the first viewer (e.g., while the first viewer is stationary and/or moving in the physical environment). For example, in FIG. 7AH and FIG. 7AJ, the change in the viewing angle of the viewer A 7406-1 is caused by the movement of the display generation component 7408 in the physical environment, relative to the viewer A, in accordance with some embodiments. In some embodiments, the movements that change the viewing angle of the first viewer relative to the content that is displayed via the first display generation component are detected via one or more sensors (e.g., cameras, motion sensors, proximity sensors, light sensors, and other sensors of movement, position, and/or proximity) that are part of the computer system and/or that are in communication with the computer system. In some embodiments, the second movement includes a latitudinal movement of the first display generation component in a latitudinal direction of the first viewer (e.g., a horizontal direction, a left-and-right direction of the first viewer, a direction that is substantially parallel to a floor supporting the first viewer). In some embodiments, the second movement includes a longitudinal movement of the first display generation component in a longitudinal direction of the first viewer (e.g., a vertical direction, a up and down direction of the first viewer, a direction that is substantially perpendicular to a floor that supports the first viewer). In some embodiments, the second movement includes a rotational movement relative to the first viewer, such as a clockwise rotation or a counter-clockwise rotation that is caused by the user wearing an HMD tilting his/her head relative to the first viewer. In some embodiments, the second movement of the user wearing the HMD with the first display generation component as the outward facing display generation component is caused by the user walking around the first viewer. In some embodiments, the second movement of the user wearing the HMD with the first display generation component as the outward facing display generation component is caused by the user turning his/her head left and right in front of the first viewer. In some embodiments, the second movement of the user wearing the HMD is caused by the first user tilting his/her head backward and forward in front of the first viewer. In some embodiments, the second movement of the user is caused by the user moving higher or lower relative to the first viewer (e.g., the user standing up while the first viewer remains sitting, the user sitting down while the first viewer remains standing, the user standing up from a sitting position while the first viewer remains standing, the user sitting down from a standing position while the first viewer remains sitting down, the user standing up from a sitting position while the first viewer remains sitting down, or the user sitting down from a standing position while the first viewer remains standing). In some embodiments, the first display generation component is a standalone display that is held by the user, or by a stand that moves and swivels relative to the first viewer, and the second movement of the first display generation component is caused by the movement of the hand of the user holding the first display generation component or the movement of the stand on which the first display generation component is placed. Detecting, by the computing system, of the one or more movements that change the viewing angle of the first viewer relative to the content that is displayed via the first display generation component, including at least a second movement of the first display generation component relative to the first viewer, causes the computing system to automatically perform the operation of changing a value of at least a first display parameter of the first object in accordance with a determination that the change in the viewing angle of the first viewer meets first criteria (e.g., automatically change a value of at least a first display parameter of the first object without requiring further user input).

In some embodiments, changing the value of at least the first display parameter of the first object other than the viewing perspective of the first object includes changing the value of at least the first display parameter of the first object and changing a value of at least the first display parameter of other content that is concurrently displayed via the first display generation component with the first object. For example, as described with respect to FIGS. 7AD-7AL, the change that is applied to the display parameters of the view 7404 of the first object is applied to all, or substantially all content of the first display generation component, (e.g., by modifying the operating parameters of the display or the group of sub-components that corresponds to the viewing angle of the viewer, and/or by applying a filter across the entire display region of the display generation component), in accordance with some embodiments. In some embodiments, the change in the first display parameter is applied to all or substantially all content, including the first object (e.g., a stylistic representation or a camera view of a portion of the body of the user who is blocked from view of the first viewer by the presence of the first display generation component, or another type of virtual object) and other content (e.g., content that indicates a status of the computer system or the level of immersion with which three-dimensional content is presented to the user who is blocked from view of the first viewer by the presence of the first display generation component, or other types of content), that is displayed via the first display generation component during the one or more movements that changed the viewing angle of the first viewer. In some embodiments, the entire or substantially all portions of the display region of the first display generation component are dimmed, such that content shown on the first display generation component is reduced in visual emphasis relative to the physical environment in which the content is displayed. In some embodiments, the first object is displayed on a lenticular display (e.g., a lenticular lens panel or array 3-110, as described with reference to FIG. 1G, or another type of lenticular display) consisting of an array of display elements and changing the value of at least the first display parameter of the first object includes changing values of an operation parameter that corresponds to the first display parameter of the first object on the entire array of display elements by the same amount or turning all of them off. Changing the value of at least the first display parameter of the first object and changing a value of at least the first display parameter of other content that is concurrently displayed via the first display generation component with the first object, provides improved visual feedback to the user (e.g., improved visual feedback regarding the first object and other concurrently displayed content).

In some embodiments, changing the value of at least the first display parameter of the first object other than the viewing perspective of the first object includes changing the value of at least the first display parameter of the first object without changing a value of at least the first display parameter of at least a portion of other content that is concurrently displayed via the first display generation component with the first object. For example, as described with respect to FIGS. 7AD-7AL, the change that is applied to the display parameters of the view 7404 of the first object is applied to some content of the first display generation component and not to other content of the display generation component (e.g., change is applied to the representation 7006 of the first user 7202, but not to the progress bar 7004, or change is applied to a group of sub-components of the display generation component 7408 that correspond to the viewing angle of one viewer that moved, but not to another group of sub-components that correspond to another viewer that has not moved or whose movement did not meet the first criteria), in accordance with some embodiments. In some embodiments, the change in the first display parameter is applied to a subset, less than all of the content shown on the first display generation component, e.g., including the first object (e.g., a stylistic representation or a camera view of a portion of the body of the user who is blocked from view of the first viewer by the presence of the first display generation component, or another type of virtual object), but not including other content (e.g., content that indicates a status of the computer system or the level of immersion with which three-dimensional content is presented to the user who is blocked from view of the first viewer by the presence of the first display generation component, or other types of content), that is displayed via the first display generation component during the one or more movements that changed the viewing angle of the first viewer. In some embodiments, the subset of the display elements of the display region of the first display generation component are dimmed, such that the first object is reduced in visual emphasis relative to the physical environment and relative to the other content that is concurrently displayed in the display region of the first display generation component. In some embodiments, the first object and the other content are displayed on different display layers with different display depths away from the external viewer, and the content displayed on the same display layer as the first object are dimmed by a first amount, while content displayed on different layer(s) from the first object are not dimmed or dimmed by a second amount different from the first amount (e.g., a smaller amount than, or a larger amount than the first amount). In some embodiments, the first object is displayed on a lenticular display (e.g., a lenticular lens panel or array 3-110, as described with reference to FIG. 1G, or another type of lenticular display) consisting of an array of display elements, and changing the value of at least the first display parameter of the first object includes changing values of an operation parameter that corresponds to the first display parameter of the first object on a subset of the array of display elements without changing the values of the operation parameter on another subset of the array of display elements, or changing the values by a lesser amount. Changing the value of at least the first display parameter of the first object without changing a value of at least the first display parameter of at least a portion of other content that is concurrently displayed via the first display generation component with the first object, provides improved visual feedback to the user (e.g., improved visual feedback regarding content, such as content indicating a status of the computer system, the level of immersion, a display layer, and/or display depth of the content, etc.).

In some embodiments, content displayed via the first display generation component, including the first object displayed via the first display generation component, consists of sub-portions (e.g., portions that are joined spatially to form the entirety of the content) of the content (e.g., columns of pixels, or other sub-groups of pixels) respectively displayed via individual display elements of an array of display elements (e.g., an array of lenticular display elements (e.g., rows, columns, or other arrangements of linear display elements), an array of modular display elements with other shapes (e.g., circular shape, diamond shape, rectangular shape, square shape, or other shapes) and/or that are arranged in other repeated patterns (e.g., a honeycomb pattern, diagonal pattern, or other patterns), or other arrangement of repeated display elements) of the first display generation component, and changing the value of at least the first display parameter of the first object other than the viewing perspective of the first object includes changing a respective value of a first operation parameter of at least a subset of the array of display elements of the first display generation component (e.g., changing (e.g., reducing, increasing, turning on, or turning off) the operation power, brightness, and/or other operation parameter for a subset of the columns or rows of linear display elements). For example, as shown in FIGS. 7AE-7AL, the display generation component 7408 includes different groups of sub-components that correspond to different viewing angles in the latitudinal direction, and the individual sub-components in a respective group of sub-components (e.g., the group of sub-components a1-a5, the group of sub-components b1-b5, and the group of sub-components c1-c5) respectively display a portion of the view 7404 of the first object that collectively form the entirety of the view 7404 of the first object. When modifying the display parameters of the view 7404 of the first object in response to detecting a change in the viewing angle of viewer A 7406-1 in the latitudinal direction and/or in the longitudinal direction that meets first criteria, the computer system changes the display parameters of different portions of the view 7404 that are provided by a respective group of sub-components for one viewer, optionally, without changing the display parameters of the view that is provided by another group of sub-components corresponding to the viewing angle of another viewer, in accordance with some embodiments. Changing the value of at least the first display parameter of the first object other than the viewing perspective of the first object, including changing a respective value of a first operation parameter of at least a subset of the array of display elements of the first display generation component, provides improved visual feedback to the user (e.g., improved visual feedback regarding the object displayed from respective subsets of the array of display elements).

In some embodiments, the change in the viewing angle that meets the first criteria includes a first change in the viewing angle of the first viewer from a first viewing angle to a second viewing angle, the first viewing angle is within a first longitudinal viewing zone, and the second viewing angle is within a second longitudinal viewing zone that is separated from the first longitudinal viewing zone by a first threshold angle in a longitudinal direction relative to the first display generation component. For example, in some embodiments, the first longitudinal viewing zone is a preferred viewing zone that spans a first range of angles in the longitudinal direction of the first display generation component (e.g., the range of angles that is closest to the central axis that passes through a center point on the surface of the first display generation component), and the second longitudinal viewing zone is a first dimmed zone that spans a second range of angles above or below the first range of angles in the longitudinal direction of the first display generation component. In some embodiments, the positions of the first longitudinal viewing zone and the second longitudinal viewing zone are swapped in a different scenario from that described above (e.g., when the viewer moves from the dimmed viewing zone into the preferred viewing zone, rather than from the preferred viewing zone to the dimmed viewing zone). In some embodiments, there are multiple dimmed viewing zones in addition to the preferred viewing zone that span the longitudinal direction, and at least one of the first longitudinal viewing zone and the second longitudinal viewing zone is selected from the different dimmed viewing zones. In some embodiments, one or more viewing zones may be off-zones, where a viewing angle in the off-zone may constitute a condition to turn off a subset or all of display elements corresponding to the viewing angle. In some embodiments, at least one of the first longitudinal viewing zone and the second longitudinal viewing zone is selected from the off-zones that are in the longitudinal direction. This is illustrated in FIGS. 7AI-7AL following FIG. 7AD, where the change in the viewing angle in the longitudinal direction across different viewing zones (e.g., preferred viewing zone, dimmed viewing zone, and off zone) in the longitudinal direction cause the display parameters of the views 7404 to change in accordance with the relative movement between viewer A 7406-1 and the display generation component 7408 (e.g., display parameters of the views 7404-7, 7404-8, 7404-9, and 7404-10 are change based on the movement of the viewer A and/or the movement of the display generation component in the longitudinal direction), in accordance with some embodiments. Determining, by the computing system, that the change in the viewing angle of the first viewer meets first criteria, including a first change in the viewing angle from a first viewing angle, within a first longitudinal viewing zone, to a second viewing angle, within a second longitudinal viewing zone, causes the computing system to automatically perform the operation of changing a value of at least a first display parameter of the first object in accordance with a determination that the change in the viewing angle meets first criteria (e.g., automatically change a value of at least a first display parameter of the first object without requiring further user input).

In some embodiments, the change in the viewing angle that meets the first criteria includes a second change in the viewing angle of the first viewer from a third viewing angle (e.g., same as the first viewing angle, or different from the first viewing angle) to a fourth viewing angle (e.g., same as the second viewing angle, or different from the second viewing angle), the third viewing angle is within a first latitudinal viewing zone, and the fourth viewing angle is within a second latitudinal viewing zone that is separated from the first latitudinal viewing zone by a second threshold angle in a latitudinal direction relative to the first display generation component. For example, in some embodiments, the first latitudinal viewing zone is a preferred viewing zone that spans a first range of angles in the latitudinal direction of the first display generation component (e.g., the range of angles that is closest to the central axis that passes through a reference point (e.g., a reference point that is based on the center of the user's head for a display generation component that is worn on the user's head, a reference point that is located behind the surface of the display generation component, and/or a reference point that is based on a size, curvature, and/or other spatial characteristics of the display generation component) relative to a surface of the first display generation component), and the second latitudinal viewing zone is a first dimmed zone that spans a second range of angles to the left or right of the first range of angles in the latitudinal direction of the first display generation component. In some embodiments, the positions of the first latitudinal viewing zone and the second latitudinal viewing zone are swapped in a different scenario from that described above (e.g., when the viewer moves from the dimmed viewing zone into the preferred viewing zone, rather than from the preferred viewing zone to the dimmed viewing zone). In some embodiments, there are multiple dimmed viewing zones in addition to the preferred viewing zone that span the latitudinal direction, and at least one of the first latitudinal viewing zone and the second latitudinal viewing zone is selected from the different dimmed viewing zones. In some embodiments, one or more viewing zones may be off-zones, where a viewing angle in the off-zone may constitute a condition to turn off a subset or all of display elements corresponding to the viewing angle. In some embodiments, at least one of the first latitudinal viewing zone and the second latitudinal viewing zone is selected from the off-zones that are in the latitudinal direction. For example, in FIGS. 7AD and 7AE, the viewer A 7406-1 is moved in the viewing range that is centered in front of the display generation component 7408 and that corresponds to the preferred viewing range in the latitudinal direction; in FIG. 7AF, the viewer 7406-1 is moved further in the latitudinal direction and moved out of the preferred viewing zone and entered the dimmed viewing zone in the latitudinal direction; and in FIG. 7AG, the viewing 7406-1 is moved further in the latitudinal direction and moved out of the dimmed viewing zone and entered the off zone in the latitudinal direction. In FIGS. 7AD-7AG, the viewer A 7406-1 has remained at the same viewing angle in the longitudinal direction, as the viewer A traversed the different viewing zones in the latitudinal direction, in accordance with some embodiments. Determining, by the computing system, that the change in the viewing angle of the first viewer meets first criteria, including a second change in the viewing angle from a third viewing angle, within a first latitudinal viewing zone, to a fourth viewing angle, within a second latitudinal viewing zone, causes the computing system to automatically perform the operation of changing a value of at least a first display parameter of the first object in accordance with a determination that the change in the viewing angle meets first criteria (e.g., automatically change a value of at least a first display parameter of the first object without requiring further user input).

In some embodiments, in response to detecting the one or more movements that change the viewing angle of the first viewer relative to the content that is displayed via the first display generation component, in accordance with a determination that the change in the viewing angle of the first viewer does not meet the first criteria (e.g., the change does not cause the viewing angle to switch between different viewing zones), the computer system forgoes changing the value of at least the first display parameter of the first object. For example, in some embodiments, the one or more movements that change the viewing angle of the first viewer changes the viewing angle within the same longitudinal viewing zone and/or the same latitudinal viewing zone, and as a result, the computer system does not change the value of the first display parameter for the first object in response to the one or more movements. In some embodiments, the one or more movements that change the viewing angle of the first viewer changes the viewing angle in the longitudinal direction and not in the latitudinal direction. In some embodiments, the one or more movements that change the viewing angle of the first viewer changes the viewing angle in the latitudinal direction and not in the longitudinal direction. In some embodiments, the one or more movements that change the viewing angle of the first viewer in both the longitudinal direction and the latitudinal direction, but may cross viewing zones in one of the longitudinal direction and the latitudinal direction but not in both the longitudinal direction and the latitudinal direction, and as a result may cause a change in the first display parameter of the first object due to the movement that crossed the viewing zones in one direction, but not due to the movement that does not cross the viewing zones in the other direction. For example, in FIG. 7AE following FIGS. 7AD, when the viewer A 7406-1 moved laterally in the preferred viewing zone in the latitudinal direction, the computer system changes the viewing perspective of the first object in the view 7404-4 to correspond to the changed viewing angle in the latitudinal direction; however, the change in viewing angle in the latitudinal direction does not meet the first criteria because it does not cause the viewer A to enter a different viewing zone in the latitudinal direction, and as a result, the computer system does not change the display parameters of the view 7404 to reduce the visual prominence of the view 7404 of the first object, in accordance with some embodiments. Determining, by the computing system, that the change in the viewing angle of the first viewer does not meet the first criteria, in response to detecting the one or more movements that change the viewing angle of the first viewer relative to the content that is displayed via the first display generation component, causes the computing system to automatically perform the operation of forgoing changing the value of at least the first display parameter of the first object (e.g., automatically forgo changing the value of at least the first display parameter of the first object without additional user input).

In some embodiments, the one or more movements that change the viewing angle of the first viewer relative to the content that is displayed via the first display generation component includes: a first movement that meets the first criteria and causes a change in the value of the first display parameter of the first object, and a second movement that does not meet the first criteria and does not cause a change in the value of the first display parameter of the first object, wherein the first movement is in a first direction and the second movement is in a second direction different from the first direction (e.g., the first direction is a latitudinal direction, and the second direction is a longitudinal direction of the first display generation component; or vice versa). In some embodiments, the first movement and the second movement are movements that occur at different points in time. In some embodiments, the first movement and the second movement are components of the same movement by the first display generation component or the first viewer. For example, the movement of the viewer A 7406-1 in the longitudinal direction shown in FIG. 7AI meets the first criteria and caused the computer system to reduce the visual prominence of the view 7404 of the first object (e.g., as shown in view 7404-7), while the movement of the viewer 7406-1 in the latitudinal direction shown in FIG. 7AE does not meet the first criteria and does not cause the computer system to reduce the visual prominence of the view 7404 of the first object (e.g., as shown in view 7404-3), in accordance with some embodiments. Detecting, by the computing system, of a first movement in a first direction that meets the first criteria, causes the computing device to automatically perform the operation of changing the value of the first display parameter of the first object (e.g., automatically change the value of the first display parameter without additional user input). The detection, by the computing system, of a second movement in a second direction that does not meet the first criteria causes the computing device to automatically perform the operation of not changing the value of the first display parameter of the first object (e.g., automatically not change the value of the first display parameter without additional user input).

In some embodiments, in response to detecting the one or more movements that change the viewing angle of the first viewer relative to the content that is displayed via the first display generation component, the computer system changes an appearance of the first object in accordance with a change in the viewing perspective of the first object (e.g., the change in viewing perspective that is caused by the change in the viewing angle of the first viewer). In some embodiments, the change in the viewing perspective occurs in response to the change in the viewing angle of the first viewer, irrespective of whether or not the change in the viewing angle meets the first criteria, and irrespective of whether or not the value of the first display parameter of the first object is changed in response to the change in the viewing angle of the first viewer. In some embodiments, the first display generation component has a display region that is formed by an array of individual display elements (e.g., an array of linear display elements in a lenticular display (e.g., a lenticular lens panel or array 3-110, as described with reference to FIG. 1G, or another type of lenticular display), or an array of display elements with other geometries and/or in other spatial arrangements), and the images corresponding to different views of the first object as displayed by different subsets of the array of individual display elements are directed to different viewing angles, such that a respective viewing perspective of the first object corresponding to a respective viewing angle is directed to the first viewer at the respective viewing angle, and not to viewers at other viewing angles. For example, in FIGS. 7AD-7AF, the viewing perspective of the first object is updated (e.g., different viewing perspectives are shown in views 7404-1, 7404-3, and 7404-4) in accordance with the current viewing angle of the viewer A 7406-1 in the latitudinal direction, as the position of the viewer A changes relative to the display generation component 7408, in accordance with some embodiments. In another example, in FIGS. 7AD and 7AI-7AK, the viewing perspective of the first object is updated (e.g., different viewing perspectives are shown in views 7404-1, 7404-7, 7404-8, and 7404-9) in accordance with the current viewing angle of the viewer A 7406-1 in the longitudinal direction, as the position of the viewer A changes relative to the display generation component 7408, in accordance with some embodiments. Changing an appearance of the first object in accordance with a change in the viewing perspective of the first object, in response to detecting the one or more movements that change the viewing angle of the first viewer relative to the content that is displayed via the first display generation component, provides improved visual feedback to the user (e.g., improved visual feedback regarding viewing angle of the first viewer).

In some embodiments, the first display generation component displays the content on a display region with a curved profile in a depth dimension that is different from a longitudinal dimension and a latitudinal dimension of the display region. For example, as shown in FIGS. 7AC1-7AQ, the schematic top view of the display generation component 7408 in the lower left region of FIGS. 7AC1-7AQ shows that the display region of the display generation component 7408 has a curved profile in the depth dimension that is different from the latitudinal direction and the longitudinal direction of the display generation component, in accordance with some embodiments. In some embodiments, the display region is formed by an array of display elements (e.g., columns of elongated display elements in a lenticular display generation component (e.g., a lenticular lens panel or array 3-110, as described with reference to FIG. 1G, or another type of lenticular display)) that are spatially arranged on a curved surface that has different distances or depth from a vertical plane placed in front of the first display generation component (e.g., vertical direction is defined as the direction of the gravity, or an upright direction of the user wearing the HMD with the first display generation component as the outward facing display generation component). In some embodiments, the first display generation component includes a display region that follow the profile of a user's face and wraps around the temples of the user wearing the HMD with the first display generation component as an outward facing display generation component. Displaying the content on a display region with a curved profile in a depth dimension that is different from a longitudinal dimension and a latitudinal dimension of the display region, provides improved visual feedback to the user (e.g., improved visual feedback from displaying content on a curved profile display region).

In some embodiments, the first object is displayed with a simulated depth behind a surface of the first display generation component. For example, in some embodiments, the computer system displays a simulated parallax effect in the appearance of the first object, as the relative positions of the first viewer and the surface of the first display generation component change (e.g., the view of the first object is modified in accordance with the change in viewing angle of the first viewer to simulate a non-zero depth of the first object from the surface of the display region of the first display generation component). For example, as described with respect to FIGS. 7AC-7AQ, the first object can be a three-dimensional object that has respective sizes in the latitudinal direction, the longitudinal direction, and the depth direction relative to the surface of the display generation component 7408, the first object is displayed with a simulated depth away from the surface of the display generation component 7408, and the first object optionally includes a representation 7006 of a portion of the body of the first user 7202 described in FIGS. 7A-7AB2 and is displayed with a simulated depth behind an overlay 7008 and progress bar 7004, in accordance with some embodiments. Displaying the first object with a simulated depth provides improved visual feedback to the user (e.g., improved visual feedback regarding displayed content depth).

In some embodiments, changing the value of at least the first display parameter of the first object other than the viewing perspective of the first object includes ceasing to display the first object. For example, as shown in FIG. 7AG, the computer system ceases to display a view of the first object (e.g., represented as an "off view" 7404-5 in FIG. 7AG) when the viewer A 7406-1 enters into the off zone in the latitudinal direction of the display generation component 7408, in accordance with some embodiments. In another example, as shown in FIG. 7AL, the computer system ceases to display a view of the first object (e.g., represented as an "off view" 7404-10 in FIG. 7AL) when the viewer A 7406-1 enters into the off zone in the longitudinal direction of the display generation component 7408, in accordance with some embodiments. In some embodiments, the computer system temporarily turns off the display elements that are configured to display content to the viewers at the current viewing angle of the first viewer (e.g., these display elements would be able to display content other than the first object, or any content in some situations, to viewers at the current viewing angle of the first viewer). In some embodiments, the computer system temporarily ceases to display the portions of the first object while continuing to display other content using the display elements that are configured to display content to the viewers at the current viewing angle of the first viewer. Changing the value of at least the first display parameter of the first object other than the viewing perspective of the first object, including ceasing to display the first object, provides improved visual feedback to the user (e.g., improved visual feedback regarding the displayed object(s)).

In some embodiments, changing the value of at least the first display parameter of the first object other than the viewing perspective of the first object includes at least one of changing a luminance (e.g., increasing or decreasing the luminance), changing a color saturation (e.g., increasing or decreasing color saturation), or changing a translucency (e.g., increasing or decreasing an opacity or translucency) of the first object. In some embodiments, to reduce the luminance of the first object, the computer system reduces the power used by all or a subset of the display elements of the first display generation component on which respective portions of the first object are displayed. As described with respect to FIGS. 7AE-7AL, the computer system changes the luminance, color saturation, and/or the translucency of the first object, when the position of the viewer A 7406-1 moves in and out of different viewing zones in the latitudinal direction and/or the longitudinal direction of the display generation component 7408, to increase the visual prominence or decrease the visual prominence of the view 7404 of the first object, in accordance with some embodiments. Changing a luminance, or a color saturation, or a translucency, provides improved visual feedback to the user (e.g., improved visual feedback regarding the displayed object(s)).

In some embodiments, in accordance with the determination that the change in the viewing angle of the first viewer meets the first criteria, changing the value of at least the first display parameter of the first object other than the viewing perspective of the first object includes: in accordance with a determination that, during a first portion of the one or more movements, the viewing angle of the first viewer is changed by a first angular amount in a first movement direction (e.g., latitudinal direction, or a longitudinal direction), changing the value of the first display parameter of the first object in a first value changing direction (e.g., an increasing direction, or a decreasing direction); and in accordance with a determination that, during a second portion of the one or more movements following the first portion of the one or more movements, the viewing angle of the first viewer is changed by a second angular amount in the first movement direction (e.g., latitudinal direction, or a longitudinal direction), changing the value of the first display parameter of the first object further in the first value changing direction (e.g., an increasing direction, or a decreasing direction). For example, if a first portion of the one or more movements causes the viewing angle to transition from being within the preferred viewing zone to being within a dimmed viewing zone, the computer system reduces the luminance value, reduces the color saturation, and/or increases the translucency of the first object; and in some embodiments, as the one or more movements continues in the same direction, the viewing angle continues to change in the dimmed viewing zone in a direction away from the preferred viewing zone, and the computer system continues to reduce the luminance value, reduce the color saturation value, and/or increase the translucency of the first object. In some embodiments, the change in the value of the first display parameter is gradual in the dimmed zone as the viewing angle changes continuously in the dimmed viewing zone. In some embodiments, if a first portion of the one or more movements causes the viewing angle change within a dimmed viewing zone, the computer system changes the luminance value, the color saturation, and/or the translucency of the first object gradually in an increasing direction or in a decreasing direction, depending on whether the viewing angle is moving toward the preferred viewing zone, or moving away from the preferred viewing zone. For example, as described with respect to FIGS. 7AI-7AK, the amount of change applied to the display parameters of the view 7404 of the first object is adjusted gradually through multiple levels as the viewing angle of the viewer A 7406-1 changes within the same viewing zone (e.g., the dimmed viewing zone) in the longitudinal direction, in accordance with some embodiments. Changing the value of the first display parameter of the first object in a first value changing direction, in accordance with a determination that the viewing angle of the first viewer is changed by a first angular amount in a first movement direction during a first portion of the movements, together with changing the value of the first display parameter of the first object further in the first value changing direction, in accordance with a determination that the viewing angle of the first viewer is changed by a second angular amount in the first movement direction during a second portion of the movements, provides improved visual feedback to the user (e.g., improved visual feedback regarding the displayed object).

In some embodiments, in accordance with the determination that the change in the viewing angle of the first viewer is in a direction away from a first viewing range (e.g., the preferred viewing range, the front and center viewing zone), the value of the first display parameter of the first object is changed in the first value changing direction (e.g., an increasing direction, or a decreasing direction). For example, in some embodiments, as the viewing angle of the first viewer becomes increasingly larger relative to the preferred viewing range in front of the first display generation component, the computer system reduces the visual emphasis of the first object by increasing degrees (e.g., dims the first object more and more, increasing the translucency of the first object more and more). For example, as described with respect to FIGS. 7AI-7AK, the amount of change applied to the display parameters of the view 7404 of the first object is increased gradually through multiple levels as the viewing angle of the viewer A 7406-1 becomes larger and farther away from the preferred viewing zone in the longitudinal direction, in accordance with some embodiments. Determining, by the computing system, that the change in the viewing angle of the first viewer is in a direction away from a first viewing range, causes the computing system to automatically perform the operation of changing the value of the first display parameter of the first object in the first value changing direction (e.g., automatically change the value of the first display parameter in the first value changing direction without requiring further user input).

In some embodiments, in accordance with a determination that the change in the viewing angle of the first viewer is in a direction toward the first viewing range (e.g., the preferred viewing range, the front and center viewing zone), the value of the first display parameter of the first object is changed in a second value changing direction different from (e.g., opposite or substantially opposite) the first value changing direction. For example, in some embodiments, as the viewing angle of the first viewer becomes increasingly smaller toward the preferred viewing range in front of the first display generation component, the computer system restores the visual emphasis of the first object (e.g., increasing the visual emphasis by increasing degrees (e.g., dims the first object less and less, restoring the translucency of the first object more and more)). For example, as described with respect to FIGS. 7AI-7AK, the amount of change applied to the display parameters of the view 7404 of the first object is decreased gradually through multiple levels as the viewing angle of the viewer A 7406-1 becomes smaller and closer to the preferred viewing zone in the longitudinal direction, in accordance with some embodiments. Determining, by the computing system, that the change in the viewing angle of the first viewer is in a direction away from a first viewing range, causes the computing system to automatically perform the operation of changing the value of the first display parameter of the first object in a second value changing direction, different from the first value changing direction (e.g., automatically change the value of the first display parameter in the second value changing direction without requiring further user input).

In some embodiments, displaying the first object includes: in accordance with a determination that the first viewer is present at a first viewing position from which the content that is displayed via the first display generation component is visible, displaying a first view of the first object via the first display generation component; and in accordance with a determination that a second viewer, different from the first viewer, is present at a second viewing position, different from the first viewing position, from which the content that is displayed via the first display generation component is visible, displaying a second view of the first object via the first display generation component. In some embodiments, the first view and the second view of the first object are concurrently displayed via the first display generation component, e.g., utilizing different subsets of the display elements of the first display generation component. In some embodiments, display of the first view and display of the second view of the first object are multiplexed in time, using the same set of display elements of the first display generation component, and are directed respectively to the respective viewing angles associated with the first viewing position and the second viewing position. In some embodiments, the first viewer and the second viewer are present at their respective viewing positions at the same time. In some embodiments, the first viewer and the second viewer are not present at their respective viewing positions at the same time. As illustrated in FIGS. 7AC1 and 7AC2, three viewers, viewer A 7406-1, viewer B 7406-2, and viewer C 7406-3 are present in front of the display generation component 7408, and the computer system displays different views 7404-1, 7404-2, and 7404-3 of the first object to viewer A, viewer B, and viewer C, respectively, in accordance with some embodiments. Displaying a first view of the first object via the first display generation component, in accordance with a determination that the first viewer is present at a first viewing position from which the content that is displayed via the first display generation component is visible, and displaying a second view of the first object via the first display generation component, in accordance with a determination that a second viewer, different from the first viewer, is present at a second viewing position, different from the first viewing position, provides improved visual feedback to the viewer (e.g., improved visual feedback based on a viewing position of the viewer).

In some embodiments, the first display generation component is a lenticular display (e.g., a lenticular lens panel or array 3-110, as described with reference to FIG. 1G, or another type of lenticular display). For example, as shown in FIGS. 7AC1 and 7AC2, the display generation component 7408 is shown to include columns of sub-components that are individually controlled to display different sub-portions of a respective view of the first object, and/or display different views to different viewing angles in the latitudinal direction, in accordance with some embodiments. In some embodiments, the first display generation component includes columns of elongated display elements that are divided into different subsets of display elements that display different views of the first object that correspond to different viewing angles. In some embodiments, the different subsets of the display elements are individually controlled to have different values for the first display parameter of the first object to change the level of visual emphasis of the first object relative to other content that is concurrently displayed with the first object and/or of the physical environment in which the first object is displayed by different amounts. In some embodiments, the different subsets of display elements are positioned behind optical elements that direct the images displayed via a respective subset of the display elements toward their corresponding viewing angle, and optionally, suppress the images of other display elements that do not corresponding to said viewing angle.

In some embodiments, in response to detecting the one or more movements that change the viewing angle of the first viewer: in accordance with a determination that the one or more movements that change the viewing angle of the first viewer relative to the content also change a viewing angle of a second viewer different from the first viewer (e.g., the second viewer is concurrently present in the physical environment facing toward the first display generation component, and are located at different positions (e.g., different latitudinal positions, different longitudinal positions, and/or different depth positions relative to the content displayed via the first display generation component)), and that the change in the viewing angle of the second viewer meets second criteria (e.g., the same as the first criteria, and/or different from the first criteria) (e.g., the change causes of the viewing angle of the second viewer to switch between different viewing zones), the computer system changes the value of at least the first display parameter for the first object other than the viewing perspective of the first object, including changing a first value of the first display parameter for the first object by a first amount for the first viewer and changing a second value of the first display parameter for the first object by a second amount, different from (e.g., greater than, or less than) the first amount, for the second viewer. For example, in some embodiments, the first viewer and the second viewer may be located in different horizontal viewing zones (e.g., both located in visible zones in the latitudinal direction, or one is located in a dim zone and the other is located in the visible zone in the latitudinal direction) or located in the same horizontal viewing zones (e.g., both located in visible zones or dimmed zones in the latitudinal direction), and the one or more movements that change the viewing angles of the first viewer and the second viewer may cause the first and second viewers to move differently relative to the viewing zones in the longitudinal direction (e.g., with the first viewer moving from the visible zone into the dimmed zone or an off zone, with the second viewer moving from the dimmed zone to a visible zone in the longitudinal direction, and/or otherwise causing different changes in viewing zones for the first viewer and the second viewer in the longitudinal direction); and as a result, different amounts of change are applied to the value of the first display parameter for the first object for the first viewer and the second viewer, respectively. Similarly, the one or more movements may cause different transitions between viewing zones for the first viewer and the second viewer in the longitudinal direction, and as a result, causing different amounts of change to be applied to the value of the first display parameter for the first object for the first viewer and the second viewer, respectively. As illustrated in FIGS. 7AM1 and 7AM2, for different viewers A, B, and C at different latitudinal viewing angles, the computer system applies different amounts of changes to the view 7404 (e.g., view 7404-1 for viewer A, view 7404-11 for viewer B, and view 7404-4 for viewer C) of the first object (e.g., as compared to the undimmed views 7404 shown in FIGS. 7AC1 and 7AC2) depending on the different viewing angles of the viewers A, B, and C in the longitudinal direction, in accordance with some embodiments. Determining, by the computing system, that the one or more movements that change the viewing angle of the first viewer relative to the content also change a viewing angle of a second viewer different from the first viewer, and that the change in the viewing angle of the second viewer meets second criteria, causes the computing system to automatically perform the operation of changing the value of at least the first display parameter for the first object other than the viewing perspective of the first object, including automatically changing a first value of the first display parameter for the first object by a first amount for the first viewer and changing a second value of the first display parameter for the first object by a second amount, for the second viewer (e.g., automatically change the values of the first display parameter for different users without requiring further user input).

In some embodiments, in response to detecting the one or more movements that change the viewing angle of the first viewer: in accordance with a determination that the one or more movements that change the viewing angle of the first viewer relative to the content does not change a viewing angle of a third viewer different from the first viewer (e.g., the third viewer (e.g., same as the second viewer, or different from the second viewer) is concurrently present in the physical environment facing toward the first display generation component, and are located at different positions (e.g., different latitudinal positions, different longitudinal positions, and/or different depth positions relative to the content displayed via the first display generation component)), the computer system forgoes changing the value of at least the first display parameter for the first object other than the viewing perspective of the first object for the third viewer. For example, in some embodiments, the first viewer and the third viewer may be located in different horizontal viewing zones (e.g., both located in visible zones in the latitudinal direction, or one is located in a dim zone and the other is located in the visible zone in the latitudinal direction) or located in the same horizontal viewing zones (e.g., both located in visible zones or dimmed zones in the latitudinal direction), and the one or more movements that change the viewing angles of the first viewer does not cause change in the viewing angle of the third viewer; and as a result, change is applied to the value of the first display parameter for the first object for the first viewer, without causing a change to the value of the first display parameter for the first object for the third viewer. Similarly, the one or more movements may cause a transition between viewing zones for the first viewer, without causing a transition between viewing zones for the third viewer, in the longitudinal direction; and as a result, the movement causes a change to be applied to the value of the first display parameter for the first object for the first viewer, without causing a change to be applied to the value of the first display parameter for the first object for the third viewer. As illustrated in FIGS. 7AM1 and 7AM2 following FIGS. 7AC1 and 7AC2, viewer B 7406-2 has moved upward in the longitudinal direction, viewer C 7406-3 has moved downward in the longitudinal direction, and viewer A 7406-1 has remained at the same position relative to the display generation component 7408; and as a result, the computer system changed the views of the first object displayed to viewer B and viewer C (e.g., view 7404-11 is displayed to viewer B, and view 7404-4 is displayed to viewer C), without changing the view displayed to the viewer A (e.g., view 7404-1 is still displayed to viewer A), in accordance with some embodiments. Determining, by the computing system, that the one or more movements that change the viewing angle of the first viewer relative to the content does not change a viewing angle of a third viewer different from the first viewer, causes the computing system to automatically perform the operation of forgoing changing the value of at least the first display parameter for the first object other than the viewing perspective of the first object for the third viewer (e.g., automatically forgo changing the values of the first display parameter without requiring further user input).

In some embodiments, in response to detecting the one or more movements that change the viewing angle of the first viewer: in accordance with a determination that the first viewer and a fourth viewer are in a same viewing zone in a latitudinal direction (e.g., in a same visible zone or dimmed zone in the latitudinal direction, and/or viewing the first object via the same subset of display elements corresponding to a respective latitudinal viewing angle and/or viewing perspective), and that the one or more movements change the viewing angle of the first viewer relative to the first object in a longitudinal direction without changing a viewing angle of the fourth viewer relative to the first object in the longitudinal direction (e.g., the first viewer moves in the longitudinal direction relative to the first display generation component, while the fourth viewer stays stationary relative to the first display generation component, and/or the first viewer stands up or sits down to transition between longitudinal viewing zones, while the fourth viewer remains in the same longitudinal viewing zone as before), the computer system changes the value of at least the first display parameter for the first object other than the viewing perspective of the first object for the first viewer, and the value of at least the first display parameter for the first object for the fourth viewer. As illustrated in FIG. 7AN relative to FIG. 7AM1 or FIG. 7AM2, after the viewer B 7406-2 moves to the same latitudinal viewing angle as the viewer A 7406-1, viewer A and viewer B are seeing the same view 7404-12 of the first object that corresponds to the latitudinal viewing angle shared by viewer A and viewer B, and the computer system changes the display parameters of the view 7404 of the first object to reduce the visual prominence of the view 7404 of the first object (e.g., shown as view 7404-12 in FIG. 7AN) such that both the viewer B who has moved, and the viewer A who has not moved are shown a view of the first object with reduced visual prominence, in accordance with some embodiments. Determining, by the computing system, that the first viewer and a fourth viewer are in a same viewing zone in a latitudinal direction, and that the one or more movements change the viewing angle of the first viewer relative to the first object in a longitudinal direction without changing a viewing angle of the fourth viewer relative to the first object in the longitudinal direction. causes the computing system to automatically perform the operation of changing the value of at least the first display parameter for the first object other than the viewing perspective of the first object for the first viewer, without changing the value of at least the first display parameter for the first object for the fourth viewer (e.g., automatically adjust or maintain the value of the first display parameter for a respective viewer according to a viewing zone and/or viewing angle, without requiring further user input).

In some embodiments, in response to detecting the one or more movements that change the viewing angle of the first viewer: in accordance with a determination that the first viewer and a fourth viewer are in a same viewing zone in a latitudinal direction (e.g., in a same visible zone or dimmed zone in the latitudinal direction, and/or viewing the first object via the same subset of display elements corresponding to a respective latitudinal viewing angle and/or viewing perspective), and that the one or more movements change the viewing angle of the first viewer relative to the first object in a longitudinal direction without changing a viewing angle of the fourth viewer relative to the first object in the longitudinal direction (e.g., the first viewer moves in the longitudinal direction relative to the first display generation component, while the fourth viewer stays stationary relative to the first display generation component, and/or the first viewer stands up or sits down to transition between longitudinal viewing zones, while the fourth viewer remains in the same longitudinal viewing zone as before), the computer system forgoes changing the value of at least the first display parameter for the first object other than the viewing perspective of the first object for the first viewer and for the fourth viewer. As illustrated in FIGS. 7AP1 and 7AP2, after the viewer B 7406-2 moves to the same latitudinal viewing angle as the viewer A 7406-1, viewer A and viewer B are seeing the same view 7404-12 of the first object that corresponds to the latitudinal viewing angle shared by viewer A and viewer B, and the computer system does not change the display parameters of the view 7404 of the first object (e.g., shown as view 7404-1 in FIGS. 7AP1 and 7AP2) such that the viewer B who has moved and viewer A who has not moved are both shown a view of the first object that is not reduced in visual prominence, in accordance with some embodiments. Determining, by the computing system, that the first viewer and a fourth viewer are in a same viewing zone in a latitudinal direction, and that the one or more movements change the viewing angle of the first viewer relative to the first object in a longitudinal direction without changing a viewing angle of the fourth viewer relative to the first object in the longitudinal direction, causes the computing system to automatically perform the operation of forgoing changing the value of at least the first display parameter for the first object other than the viewing perspective of the first object for the first viewer and for the fourth viewer (e.g., automatically forgo changing the value of the first display parameter without requiring further user input).

In some embodiments, in response to detecting the one or more movements that change the viewing angle of the first viewer: in accordance with a determination that the first viewer and a fifth viewer are separated by at least a first threshold distance (e.g., in the longitudinal direction, in the latitudinal direction, and/or in the depth direction), and that the change in the viewing angle of the first viewer meets the first criteria (e.g., the change causes the viewing angle to switch between different viewing zones), the computer system changes the value of at least the first display parameter for the first object other than the viewing perspective of the first object for the first viewer, without changing the value of at least the first display parameter for the first object other than the viewing perspective of the first object for the fifth viewer (optionally, irrespective of whether the one or more movements have changed a viewing angle of the fifth viewer relative to the content that is displayed via the first display generation component). In some embodiments, the one or more movements may change the respective viewing angles of the first viewer and one or more other viewers relative to the first object, and cause the viewing respective angles for these viewers to transition between viewing zones in the longitudinal direction and/or in the latitudinal direction, and in turn causing changes in the respective values of the first display parameters of the first object for the first viewer and at least a second viewer among the one or more other viewers. However, in some embodiments, the computer system does not change the respective of the first display parameter of the first object for a third viewer among the one or more other viewers in accordance with a determination that the third viewer is at least a threshold distance away from the first viewer and the second viewer (e.g., while the first viewer and the second viewer are not more than the threshold distance away from each other), in accordance with some embodiments. As illustrated in FIGS. 7AM1-7AP2, the views of the first object displayed to viewer A and viewer B are changed based on the movement of the viewer A or the movement of the viewer B, but the view of the first object (e.g., view 7404-4) has not changed for the viewer C, in accordance with some embodiments. Determining, by the computing system, in response to detecting the one or more movements that change the viewing angle of the first viewer, that the first viewer and a fifth viewer are separated by at least a first threshold distance, and that the change in the viewing angle of the first viewer meets the first criteria, causes the computing system to automatically perform the operation of changing the value of the first display parameter for the first object for the first viewer, without changing the value of the first display parameter for the first object for the fifth viewer, relative to the content that is displayed via the first display generation component (e.g., automatically change, without requiring further user input, the value of the first display parameter of the first object for the first viewer without changing the value of the first display parameter of the first object for the fifth viewer, irrespective of whether the movements that change the viewing angle of the first viewer have changed a viewing angle of the fifth viewer).

In some embodiments, while displaying the first object via the first display generation component, the computer system detects one or more movements, the computer system detects one or more additional movements that change the viewing angle of the fifth viewer relative to the content that is displayed via the first display generation component. In some embodiments, the movements, including the additional movements, that change the viewing angle of the fifth viewer relative to the content that is displayed via the first display generation component are detected via one or more sensors (e.g., cameras, motion sensors, proximity sensors, light sensors, and other sensors of movement, position, and/or proximity) that are part of the computer system and/or that are in communication with the computer system. In response to detecting the one or more additional movements that change the viewing angle of the fifth viewer relative to the content that is displayed via the first display generation component, in accordance with a determination that the change in the viewing angle of the fifth viewer meets third criteria (e.g., same as the first criteria, and/or the changes causes the viewing angle to switch between viewing zones), the computer system changes the value of at least the first display parameter of the first object other than the viewing perspective of the first object for the fifth viewer, without changing the value of at least the first display parameter for the first object other than the viewing perspective of the first object for the first viewer (e.g., irrespective of whether the one or more additional movements have changed the viewing angle of the first viewer relative to the content that is displayed via the first display generation component). In some embodiments, the one or more additional movements may change the respective viewing angles of the fifth viewer and one or more other viewers relative to the first object, and cause the viewing respective angles for these viewers to transition between viewing zones in the longitudinal direction and/or in the latitudinal direction, and in turn causing changes in the respective value of the first display parameters of the first object for the fifth viewer and optionally other viewers that are not more than a threshold distance from the fifth viewer. However, in some embodiments, the computer system does not change the respective of the first display parameter of the first object for the first viewer and the second viewer among the one or more other viewers in accordance with a determination that the third viewer is at least a threshold distance away from the first viewer and the second viewer (e.g., while the first viewer and the second viewer are not more than the threshold distance away from each other), in accordance with some embodiments. As illustrated in FIG. 7AQ following FIG. 7AP1 or 7AP2, the viewer C 7406-3 moves in the longitudinal direction from the dimmed viewing zone to the preferred viewing zone in the longitudinal direction, and as a result, the computer system changes the view of the first object displayed to the viewer C (e.g., from view 7404-4 in FIGS. 7AP1 and 7AP2 to view 7404-16 in FIG. 7AQ), without changing the view displayed to viewer A and viewer B (e.g., view 7404-1 displayed to viewer A, and viewer B in FIGS. 7AP1 and 7AP2 and FIG. 7AQ), in accordance with some embodiments. Determining, by the computing system, that the one or more additional movements that change the viewing angle of the fifth viewer relative to the content that is displayed via the first display generation component, in accordance with a determination, by the computing system, that the change in the viewing angle of the fifth viewer meets third criteria, causes the computing system to automatically perform the operation of changing the value of at least the first display parameter of the first object for the fifth viewer without changing the value of at least the first display parameter for the first object for the first viewer (e.g., automatically change the value of the first display parameter of the first object for the fifth viewer without changing the value of the first display parameter of the first object for the first viewer, without requiring further user input).

In some embodiments, in response to detecting the one or more movements that change the viewing angle of the first viewer relative to the content that is displayed via the first display generation component: in accordance with a determination that the one or more movements include latitudinal movement relative to the content that is displayed via the first display generation component, the computer system changes the value of at least the first display parameter of the first object other than the viewing perspective of the first object for the first viewer and for another viewer different from the first viewer (e.g., irrespective of the effect of the movements on the viewing angle of said other viewer relative to the content displayed via the first display generation component). In some embodiments, in response to detecting the one or more movements that change the viewing angle of the first viewer relative to the content that is displayed via the first display generation component: in accordance with a determination that the one or more movements does not include latitudinal movement relative to the content that is displayed via the first display generation component, forgoing changing the value of at least the first display parameter of the first object for the first viewer and for another viewer different from the first viewer. As illustrated in FIGS. 7AD-7AH, movements that change the viewing angle of the viewer A 7406-1 in the latitudinal direction of the display generation component 7408 causes the visual prominence of the view 7404 of the first object to be changed relative to a standard visual prominence (e.g., the visual prominence shown in the view 7404 in FIGS. 7AC1 and 7AC2), in accordance with a determination that the viewing angle causes a change in viewing zones of the viewer A, in accordance with some embodiments. Determining, by the computing device, that the one or more movements include latitudinal movement relative to the content that is displayed via the first display generation component, in response to detecting the one or more movements that change the viewing angle of the first viewer relative to the content that is displayed via the first display generation component, causes the computing system to automatically perform the operation of changing a value of the first display generation component of the first object for the first viewer and for another viewer different from the first viewer (e.g., automatically change the value of the first display parameter of the first object for the first viewer and for another viewer without requiring further user input).

In some embodiments, while displaying the first object via the first display generation component, the computer system detects a respective movement that causes a sixth viewer, different from the first viewer, to move from a first viewing zone to a second viewing zone corresponding to a first direction (e.g., the latitudinal direction, or the longitudinal direction) relative to the first display generation component, while remaining in a third viewing zone corresponding to a second direction (e.g., the longitudinal direction, or the latitudinal direction), different from the first direction, relative to the first display generation component (e.g., the sixth viewer moves in the latitudinal direction from a first viewing zone to a second viewing zone, while remains in the dimmed viewing zone or the off zone in the longitudinal direction). In response to detecting the respective movement that causes the sixth viewer to move from the first viewing zone to the second viewing zone corresponding to the first direction relative to the first display generation component, while remaining in the third viewing zone corresponding to the second direction relative to the first display generation component: in accordance with a determination that the third viewing zone corresponds to a first level of visual emphasis for the first object and the second viewing zone corresponds to a second level of visual emphasis for the first object that is higher than the first level of visual emphasis, and that the first viewer is located in the first viewing zone, the computer system reduces a respective visual emphasis of the first object for the first viewer from the second level of visual emphasis to the first level of visual emphasis. For example, in accordance with some embodiments, while the first viewer is located in the second viewing zone in the latitudinal direction and has a view of the first object with the second level of visual emphasis, the sixth viewer who is in the third viewing zone in the longitudinal direction and thus has a view of the first object with the first level of visual emphasis moves latitudinally from the first viewing zone to the same viewing zone as the first viewer. As a result, the computer system reduces the visual emphasis of the first object for the first viewer to the first level of visual emphasis, while maintaining the visual emphasis of the first object for the sixth viewer at the first level of visual emphasis. As illustrated in FIG. 7AN following FIG. 7AM1 or 7AM2, the viewer B 7406-2 moves in the latitudinal direction to the latitudinal viewing angle occupied by viewer A 7406-1 (as shown in FIG. 7AN) while the viewer B remains in the dimmed viewing zone in the longitudinal direction. After viewer B 7406-2 has moved into the latitudinal viewing angle as viewer A 7406-1, because viewer B 7406-2 is in the dimmed viewing zone in the longitudinal direction, the computer system reduces the visual prominence of the view of the first object provided to the viewer A 7404 from view 7404-1 shown in FIGS. 7AM1 and 7AM2 to view 7404-12 in FIG. 7AN, in accordance with some embodiments. Determining, by the computing system, that the third viewing zone corresponds to a first level of visual emphasis for the first object and the second viewing zone corresponds to a second level of visual emphasis for the first object that is higher than the first level of visual emphasis, and that the first viewer is located in the first viewing zone, in response to detecting the respective movement that causes the sixth viewer to move from the first viewing zone to the second viewing zone corresponding to the first direction relative to the first display generation component, while remaining in the third viewing zone corresponding to the second direction relative to the first display generation component, causes the computing system to automatically perform the operation of reducing a respective visual emphasis of the first object for the first viewer from the second level of visual emphasis to the first level of visual emphasis (e.g., automatically reduces a respective visual emphasis of the first object without requiring further user input).

In some embodiments, while displaying the first object via the first display generation component, the computer system detects a respective movement that causes the first viewer to move from a first viewing zone to a second viewing zone corresponding to a first direction (e.g., the latitudinal direction, or the longitudinal direction) relative to the first display generation component, while remaining in a third viewing zone corresponding to a second direction (e.g., the longitudinal direction, or the latitudinal direction), different from the first direction, relative to the first display generation component (e.g., the first viewer moves in the latitudinal direction from a first viewing zone to a second viewing zone, while remains in the dimmed viewing zone or the off zone in the longitudinal direction). In response to detecting the respective movement that causes the first viewer to move from the first viewing zone to the second viewing zone corresponding to the first direction relative to the first display generation component, while remaining in the third viewing zone corresponding to the second direction relative to the first display generation component: in accordance with a determination that the third viewing zone corresponds to a first level of visual emphasis for the first object and the second viewing zone corresponds to a second level of visual emphasis for the first object that is lower than the first level of visual emphasis, and that a seventh viewer is located in the second viewing zone with a respective view of the first object at the second level of visual emphasis, the computer system increases a respective visual emphasis of the first object for the seventh viewer from the second level of visual emphasis to the first level of visual emphasis. For example, in accordance with some embodiments, while the seventh viewer is located in the second viewing zone in the latitudinal direction and has a view of the first object with the second level of visual emphasis, the first viewer who is in first viewing zone in the latitudinal direction and in the third viewing zone in the longitudinal direction and thus has a view of the first object with the first level of visual emphasis moves latitudinally from the first viewing zone to the same viewing zone as the seventh viewer. As a result, the computer system increases the visual emphasis of the first object for the seventh viewer to the first level of visual emphasis, while maintaining the visual emphasis of the first object for the first viewer at the first level of visual emphasis. As illustrated in FIG. 7AO following FIG. 7AM1 or 7AM2, the viewer A 7406-1 who is in the preferred viewing zone in both the latitudinal direction and the longitudinal direction moved laterally into the latitudinal viewing angle of the viewer B 7406-2, where the computer system previously displays view 7404-11 with reduced visual prominence to viewer B 7406-2 before the movement of viewer A, and displays view 7404-2 without reduced visual prominence to viewer B 7406-2 after the movement of viewer A into the same latitudinal viewing angle as viewer B, in accordance with some embodiments. Determining, by the computing system, that the third viewing zone corresponds to a first level of visual emphasis for the first object and the second viewing zone corresponds to a second level of visual emphasis for the first object that is lower than the first level of visual emphasis, and that a seventh viewer is located in the second viewing zone with a respective view of the first object at the second level of visual emphasis, in response to detecting, by the computing system, that the respective movement that causes the first viewer to move from the first viewing zone to the second viewing zone corresponding to the first direction relative to the first display generation component, while remaining in the third viewing zone corresponding to the second direction relative to the first display generation component, causes the computing system to automatically perform the operation of increasing a respective visual emphasis of the first object for the seventh viewer from the second level of visual emphasis to the first level of visual emphasis (e.g., automatically increases a respective visual emphasis without requiring further user input).

In some embodiments, the first object is a representation of a portion of a body. In some embodiments, the representation of the portion of the body is a representation of a portion of a body of a user who is wearing an HMD that has the first display generation component as the outward facing display generation component and that has another display generation component as the inward facing display generation component. In some embodiments, the portion of the body of the user is a face of the user. In some embodiments, the portion of the body of the user includes eyes of the user. In some embodiments, the representation of the portion of a body includes a graphical representation of the portion of the body. In some embodiments, the representation of the portion of the body includes a camera view of the portion of the body. In some embodiments, the representation of the portion of the body includes a simulated camera view of the portion of the body. As described with respect to FIGS. 7AC1 and 7AC2, the first object shown in FIGS. 7AC1-7AQ is merely an example, and can include a representation of a portion of a body, such as the representation 7006 of the first user 7202 in FIGS. 7A-7AB2, and/or a representation of a face, head, or another portion of a user, in accordance with some embodiments. Displaying, via the first display generation component, the first object, wherein the first object is a representation of a portion of a body, provides improved visual feedback to the user (e.g., improved visual feedback regarding the first object).

In some embodiments, the first object is animated in accordance with movement of the portion of the body. For example, in some embodiments, the portion of the body includes eyes of the user that are blocked by the presence of the first display generation component, and the first object is animated to show movement of the eyes of the user in accordance with actual movement of the eyes of the user (e.g., blinking, closed, open, looking left and right, and/or rolling eye balls). In some embodiments, the portion of the body includes a portion of the face of the user that is blocked by the presence of the first display generation component, and the first object is animated to show movement of the portion of the face (e.g., simulated movement of facial features in the representation of the face of the user that show change in facial expressions) in accordance with actual movement of the portion of the face of the user (e.g., facial movements that change the facial expressions of the user (e.g., movement of the brows, eyes, nose, cheeks, and/or mouth)). As described with respect to FIGS. 7AC1 and 7AC2, the first object shown in FIGS. 7AC1-7AQ is merely an example, and can include a representation of a portion of a body, such as the representation 7006 of the first user 7202 in FIGS. 7A-7AB2, and/or a representation of a face, head, or another portion of a user, in accordance with some embodiments. As described with respect to FIGS. 7A-7AB2, the representation 7006 of the portion of the body of the user 7202 is animated based on the movement of the portion of the body of the first user 7202, in accordance with some embodiments. Displaying, via the first display generation component, the first object, wherein the first object is animated in accordance with movement of the portion of the body, provides improved visual feedback to the user (e.g., improved visual feedback regarding the first object).

In some embodiments, the first object is displayed concurrently with first content (e.g., status information, and/or other content) at a time prior to detecting the one or more movements that change the viewing angle of the first viewer, and the method includes changing a value of at least the first display parameter of the first content in conjunction with changing the value of at least the first display parameter of the first object, in response to detecting the one or more movements that change the viewing angle of the first viewer. In some embodiments, changing the values of the first display parameter of the first content and the first object include ceasing to display both the first content and the first object. As described with respect to FIGS. 7AE-7AL, the first object shown in FIGS. 7AE-7AL is merely an example, and can include a representation of a portion of a body, such as the representation 7006 of the first user 7202 in FIGS.

7A-7AB2, which can be concurrently displayed with other graphical elements that indicate the status associated with the first user 7202, in accordance with some embodiments. As further described with respect to FIGS. 7AE-7AL, when the display parameters of the view 7404 of the first object is changed due to the change in viewing angle(s) of the viewers, the computer system optionally changes the display parameters of the other graphical elements that indicate the status associated with the first user (e.g., reducing the visual prominence by dimming, reducing contrast, reducing resolution, and/or making other changes to the graphical elements and the representation 7006 of the first user 7202), in accordance with some embodiments. Detecting, by the computing system, the one or more movements that change the viewing angle of the first viewer, causes the computing system to automatically perform the operation of changing a value of the first display parameter of the first content in conjunction with changing the value of the first display parameter of the first object (e.g., automatically change, without requiring further user input, a value of the first display parameter of the first content together with the value of the first display parameter of the first object).

In some embodiments, the first object is displayed concurrently with first content (e.g., status information, and/or other content) at a time prior to detecting the one or more movements that change the viewing angle of the first viewer, and the computer maintains a value of at least the first display parameter of the first content while changing the value of at least the first display parameter of the first object, in response to detecting the one or more movements that change the viewing angle of the first viewer. In some embodiments, changing the values of the first display parameter of the first object include ceasing to display the first object while maintaining display of the first content. In some embodiments, changing the values of the first display parameter of the first object include reducing visual prominence of the first object relative to the first content. As described with respect to FIGS. 7AE-7AL, the first object shown in FIGS. 7AE-7AL is merely an example, and can include a representation of a portion of a body, such as the representation 7006 of the first user 7202 in FIGS. 7A-7AB2, which can be concurrently displayed with other graphical elements that indicate the status associated with the first user 7202, in accordance with some embodiments. As further described with respect to FIGS. 7AE-7AL, when the display parameters of the view 7404 of the first object is changed due to the change in viewing angle(s) of the viewers, the computer system optionally maintains the display parameters of the other graphical elements that indicate the status associated with the first user (e.g., the progress bar 7004, and/or other graphical elements), while reducing the visual prominence of the representation 7006 of the first user 7202, in accordance with some embodiments. Detecting, by the computing system, one or more movements that change the viewing angle of the first viewer, causes the computing system to automatically perform the operation of maintaining a value of the first display parameter of the first content while changing the value of the first display parameter of the first object (e.g., automatically maintain a value of the first display parameter of the first content while changing the value of the first display parameter of the first object without requiring further user input).

It should be understood that the particular order in which the operations in FIG. 13 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 11000, and 12000) are also applicable in an analogous manner to method 12000 described above with respect to FIG. 13. For example, the gestures, gaze inputs, physical objects, user interface objects, and/or animations described above with reference to method 13000 optionally have one or more of the characteristics of the gestures, gaze inputs, physical objects, user interface objects, and/or animations described herein with reference to other methods described herein (e.g., methods 8000, 9000, 10000, 11000, and 12000). For brevity, these details are not repeated here.

The operations described above with reference to FIGS. 8, 9, 10, 11, 12, and 13 are, optionally, implemented by components depicted in FIGS. 1A-6. In some embodiments, aspects/operations of methods 8000, 9000, 10000, 11000, 12000, and 13000 may be interchanged, substituted, and/or added between these methods. For brevity, these details are not repeated here.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

It will also be understood that, although the terms first, second, etc. are, in some instances, used herein to describe various elements, these elements should not be limited by these terms. These terms are only used to distinguish one element from another. For example, a first input could be termed a second input, and, similarly, a second input could be termed a first input, without departing from the scope of the various described embodiments. The first input and the second input are both inputs, and they may be the same input, or different inputs, depending on the context.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve user input for XR experiences. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve user input for XR experiences. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Account-ability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A method, comprising:
at a computer system including a first display generation component, a second display generation component and one or more input devices:
while a representation of a three-dimensional environment is visible via the first display generation component, displaying, via the second display generation component, one or more graphical elements that provide a visual indication of a status associated with a user who is in a position to view the representation of the three-dimensional environment that is visible via the first display generation component, wherein displaying the one or more graphical elements includes changing the one or more graphical elements to represent changes in the status associated with the user who is in a position to view content that is visible via the first display generation component;
while displaying the one or more graphical elements via the second display generation component and while the representation of the three-dimensional environment is visible via the first display generation component, detecting, via the one or more input devices, a first event that corresponds to a start of media capture of a physical environment in which the computer system is located using one or more sensors of the computer system; and
in response to detecting the first event that corresponds to the start of media capture of the physical environment in which the computer system is located using the one or more sensors of the computer system, displaying, via the second display generation component that is visible from the physical environment, a first visual alert that indicates the start of media capture, wherein first visual alert is displayed concurrently with at least a portion of the one or more graphical elements that represent the status associated with the user who is in a position to view content that is visible via the first display generation component.

2. The method of claim 1, wherein the one or more graphical elements change their appearances over a period of time.

3. The method of claim 1, wherein displaying the one or more graphical elements includes displaying, via the second display generation component, a first set of graphical elements of the one or more graphical elements that indicates one or more active applications shown in the three-dimensional environment.

4. The method of claim 1, wherein displaying the one or more graphical elements includes displaying, via the second display generation component, a second set of graphical elements of the one or more graphical elements that indicates a respective status of the user.

5. The method of claim 4, wherein the second set of graphical elements that indicates the respective status of the user includes a representation of a portion of a body of the user.

6. The method of claim 5, wherein changing the one or more graphical elements to represent changes in the status associated with the user includes:
changing an appearance of the representation of the portion of the body of the user in accordance with changes in the appearance of the portion of the body of the user.

7. The method of claim 5, wherein changing the one or more graphical elements to represent changes in the status associated with the user includes:
animating one or more portions of the representation of the portion of the body of the user in accordance with movement of one or more body features that change the appearance of the portion of the body of the user.

8. The method of claim 1, wherein displaying the one or more graphical elements includes displaying, via the second display generation component, a third set of graphical elements that indicates a level of immersion with which the three-dimensional environment is presented to the user via the first display generation component.

9. The method of claim 1, wherein displaying, via the second display generation component, the first visual alert that indicates the start of media capture includes:

displaying a change in visual appearance of content displayed via the second display generation component, where the change in visual appearance expands from a first portion of the second display generation component toward a second portion of the second display generation component.

10. The method of claim 1, wherein displaying, via the second display generation component, the first visual alert that indicates the start of media capture includes:

displaying a change in visual appearance of a three-dimensional shape via the second display generation component.

11. The method of claim 1, wherein detecting the first event that corresponds to the start of media capture using the computer system includes:

detecting activation of a first hardware control, wherein the media capture is started in response to detecting the activation of the first hardware control.

12. The method of claim 11, wherein displaying, via the second display generation component, the first visual alert that indicates the start of media capture includes:

displaying a respective change in visual appearance of respective content displayed via the second display generation component, where the respective change in visual appearance of the respective content expands outward from a respective portion of the second display generation component that is proximate to the first hardware control, across at least a portion of a first respective display region of the second display generation component.

13. The method of claim 11, wherein the activation of the first hardware control corresponds to a down-click of the first hardware control.

14. The method of claim 11, wherein the activation of the first hardware control corresponds to an up-click of the first hardware control following a down-click of the first hardware control.

15. The method of claim 1, wherein displaying, via the second display generation component, the first visual alert that indicates the start of media capture includes:

in accordance with a determination that the start of media capture includes a start of still media capture, displaying the first visual alert with a first visual appearance; and in accordance with a determination that the start of media capture includes a start of video media capture, displaying the first visual alert with a second visual appearance that is different from the first visual appearance.

16. The method of claim 15, wherein displaying the first visual alert with the first visual appearance includes displaying the first visual alert with a first color, and wherein displaying the first visual alert with the second visual appearance includes displaying the first visual alert with a second color different from the first color.

17. The method of claim 15, wherein displaying the first visual alert with the first visual appearance includes displaying a first animated sequence, and wherein displaying the first visual alert with the second visual appearance includes displaying a second animated sequence that is different from the first animated sequence.

18. The method of claim 1, wherein the first visual alert is spatially asymmetrical across a second respective display region of the second display generation component.

19. The method of claim 18, wherein the first visual alert is visually biased toward a first side of the second respective display region of the second display generation component.

20. The method of claim 18, wherein the first visual alert is visually biased toward a first corner of the second respective display region of the second display generation component.

21. The method of claim 1, including:

detecting continuation of media capture after the start of media capture; and in response to detecting the continuation of media capture, displaying a second visual alert for at least a portion of a time period in which the media capture is continued after the start of media capture.

22. The method of claim 21, wherein the media capture includes video capture, and the second visual alert is maintained while the video capture is continued.

23. The method of claim 21, including:

Detecting termination of media capture after the start and the continuation of media capture; and in response to detecting the termination of media capture, ceasing to display the second visual alert.

24. The method of claim 23, wherein ceasing to display the second visual alert includes:

causing cessation of changes in visual appearance of content displayed via the second display generation component, where the cessation of the changes in visual appearance expands toward a respective portion of the second display generation component that is proximate to a first hardware control, across at least a portion of a display region of the second display generation component.

25. The method of claim 1, including:

after a respective termination of media capture is detected, playing back, via the first display generation component, a first media content item that is produced as a result of the media capture.

26. A non-transitory computer-readable storage medium storing one or more programs configured to be executed by one or more processors of a computer system that is in communication with a first display generation component, a second display generation component, and one or more input devices, the one or more programs including instructions for:

while a representation of a three-dimensional environment is visible via the first display generation component, displaying, via the second display generation component, one or more graphical elements that provide a visual indication of a status associated with a user who is in a position to view the representation of the three-dimensional environment that is visible via the first display generation component, wherein displaying the one or more graphical elements includes changing the one or more graphical elements to represent changes in the status associated with the user who is in a position to view content that is visible via the first display generation component;

while displaying the one or more graphical elements via the second display generation component and while the representation of the three-dimensional environment is visible via the first display generation component, detecting, via the one or more input devices, a first event that corresponds to a start of media capture of a physical environment in which the computer system is located using one or more sensors of the computer system; and in response to detecting the first event that corresponds to the start of media capture of the physical environment in which the computer system is located using the one or more sensors of the computer system, displaying, via the second display generation component that is visible from the physical environment, a first visual alert that indicates the start of media capture, wherein first visual alert is displayed concurrently with at least a portion of the one or more graphical elements that represent the status associated with the user who is in a position to view content that is visible via the first display generation component.

27. A computer system that is in communication with a first display generation component, a second display generation component, and one or more input devices, the computer system comprising:

one or more processors; and memory storing one or more programs configured to be executed by the one or more processors, the one or more programs including instructions for:

while a representation of a three-dimensional environment is visible via the first display generation component, displaying, via the second display generation component, one or more graphical elements that provide a visual indication of a status associated with a user who is in a position to view the representation of the three-dimensional environment that is visible via the first display generation component, wherein displaying the one or more graphical elements includes changing the one or more graphical elements to represent changes in the status associated with the user who is in a position to view content that is visible via the first display generation component;

while displaying the one or more graphical elements via the second display generation component and while the representation of the three-dimensional environment is visible via the first display generation component, detecting, via the one or more input devices, a first event that corresponds to a start of media capture of a physical environment in which the computer system is located using one or more sensors of the computer system; and in response to detecting the first event that corresponds to the start of media capture of the physical environment in which the computer system is located using the one or more sensors of the computer system, displaying, via the second display generation component that is visible from the physical environment, a first visual alert that indicates the start of media capture, wherein first visual alert is displayed concurrently with at least a portion of the one or more graphical elements that represent the status associated with the user who is in a position to view content that is visible via the first display generation component.

28. The non-transitory computer-readable storage medium of claim 26, wherein displaying the one or more graphical elements includes displaying, via the second display generation component, a second set of graphical elements of the one or more graphical elements that indicates a respective status of the user.

29. The non-transitory computer-readable storage medium of claim 26, wherein displaying the one or more graphical elements includes displaying, via the second display generation component, a third set of graphical elements that indicates a level of immersion with which the three-dimensional environment is presented to the user via the first display generation component.

30. The non-transitory computer-readable storage medium of claim 26, wherein detecting the first event that corresponds to the start of media capture using the computer system includes:

detecting activation of a first hardware control, wherein the media capture is started in response to detecting the activation of the first hardware control.

31. The non-transitory computer-readable storage medium of claim 26, wherein displaying, via the second display generation component, the first visual alert that indicates the start of media capture includes:

in accordance with a determination that the start of media capture includes a start of still media capture, displaying the first visual alert with a first visual appearance; and in accordance with a determination that the start of media capture includes a start of video media capture, displaying the first visual alert with a second visual appearance that is different from the first visual appearance.

32. The non-transitory computer-readable storage medium of claim 26, wherein the one or more programs include instructions for:

detecting continuation of media capture after the start of media capture; and in response to detecting the continuation of media capture, displaying a second visual alert for at least a portion of a time period in which the media capture is continued after the start of media capture.

33. The non-transitory computer-readable storage medium of claim 26, wherein the one or more programs include instructions for:

after a respective termination of media capture is detected, playing back, via the first display generation component, a first media content item that is produced as a result of the media capture.

34. The computer system of claim 27, wherein displaying the one or more graphical elements includes displaying, via the second display generation component, a second set of graphical elements of the one or more graphical elements that indicates a respective status of the user.

35. The computer system of claim 27, wherein displaying the one or more graphical elements includes displaying, via the second display generation component, a third set of graphical elements that indicates a level of immersion with which the three-dimensional environment is presented to the user via the first display generation component.

36. The computer system of claim 27, wherein detecting the first event that corresponds to the start of media capture using the computer system includes:

detecting activation of a first hardware control, wherein the media capture is started in response to detecting the activation of the first hardware control.

37. The computer system of claim 27, wherein displaying, via the second display generation component, the first visual alert that indicates the start of media capture includes:

in accordance with a determination that the start of media capture includes a start of still media capture, displaying the first visual alert with a first visual appearance; and in accordance with a determination that the start of media capture includes a start of video media capture, displaying the first visual alert with a second visual appearance that is different from the first visual appearance.

38. The computer system of claim 27, wherein the one or more programs include instructions for:

detecting continuation of media capture after the start of media capture; and in response to detecting the continuation of media capture, displaying a second visual alert for at least a portion of a time period in which the media capture is continued after the start of media capture.

39. The computer system of claim 27, wherein the one or more programs include instructions for:

after a respective termination of media capture is detected, playing back, via the first display generation component, a first media content item that is produced as a result of the media capture.

\* \* \* \* \*